US012461711B2

(12) United States Patent
Chen et al.

(10) Patent No.: US 12,461,711 B2
(45) Date of Patent: Nov. 4, 2025

(54) INFORMATION PROCESSING METHOD AND TERMINAL DEVICE

(71) Applicant: Shanghai Cambricon Information Technology Co., Ltd., Pudong New Area (CN)

(72) Inventors: Tianshi Chen, Pudong New Area (CN); Shaoli Liu, Pudong New Area (CN); Zai Wang, Pudong New Area (CN); Shuai Hu, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 1018 days.

(21) Appl. No.: 16/760,235

(22) PCT Filed: Sep. 13, 2018

(86) PCT No.: PCT/CN2018/105463
§ 371 (c)(1),
(2) Date: Jul. 23, 2020

(87) PCT Pub. No.: WO2019/085655
PCT Pub. Date: May 9, 2019

(65) Prior Publication Data

US 2021/0182077 A1 Jun. 17, 2021

(30) Foreign Application Priority Data

Oct. 30, 2017 (CN) ......................... 201711036374.9

(51) Int. Cl.
*G06F 40/58* (2020.01)
*G06F 7/544* (2006.01)
(Continued)

(52) U.S. Cl.
CPC .......... *G06F 7/5443* (2013.01); *G06F 9/3001* (2013.01); *G06F 9/445* (2013.01);
(Continued)

(58) Field of Classification Search
None
See application file for complete search history.

(56) References Cited

U.S. PATENT DOCUMENTS 5,047,954 A 9/1991 Corona et al.
5,283,839 A 2/1994 Edelman et al.
(Continued)

FOREIGN PATENT DOCUMENTS

CA 2317593 C 6/2009
CN 85109589 A 6/1986
(Continued)

OTHER PUBLICATIONS

CN201711211933.5—Second Office Action mailed on Jun. 9, 2021, 12 pages.
(Continued)

*Primary Examiner* — Quynh H Nguyen
(74) *Attorney, Agent, or Firm* — Getech Law LLC; Jun Ye

(57) ABSTRACT

Disclosed are an information processing method and a terminal device. The method comprises: acquiring first information, wherein the first information is information to be processed by a terminal device; calling an operation instruction in a calculation apparatus to calculate the first information so as to obtain second information; and outputting the second information. By means of the embodiments in the present disclosure, a calculation apparatus of a terminal device can be used to call an operation instruction to
(Continued)

process first information, so as to output second information of a target desired by a user, thereby improving the information processing efficiency.

6 Claims, 170 Drawing Sheets

(51) Int. Cl.

| | |
|---|---|
| ***G06F 9/30*** | (2018.01) |
| ***G06F 9/445*** | (2018.01) |
| ***G06F 40/263*** | (2020.01) |
| ***G06N 3/02*** | (2006.01) |
| ***G06N 3/04*** | (2023.01) |
| ***G06N 3/08*** | (2023.01) |
| ***G06T 1/20*** | (2006.01) |
| ***G06T 1/60*** | (2006.01) |
| ***G06T 3/4046*** | (2024.01) |
| ***G06T 3/4053*** | (2024.01) |
| ***G06T 5/20*** | (2006.01) |
| ***G06T 5/50*** | (2006.01) |
| ***G06T 7/20*** | (2017.01) |
| ***G06V 10/70*** | (2022.01) |
| ***G06V 10/82*** | (2022.01) |
| ***G06V 10/94*** | (2022.01) |
| ***G10L 15/00*** | (2013.01) |
| *G06N 3/063* | (2023.01) |
| *G06N 3/082* | (2023.01) |
| *G06N 3/084* | (2023.01) |

(52) U.S. Cl.

CPC ............ *G06F 40/263* (2020.01); *G06F 40/58* (2020.01); *G06N 3/02* (2013.01); *G06N 3/04* (2013.01); *G06N 3/08* (2013.01); *G06T 1/20* (2013.01); *G06T 1/60* (2013.01); *G06T 3/4046* (2013.01); *G06T 3/4053* (2013.01); *G06T 5/20* (2013.01); *G06T 5/50* (2013.01); *G06T 7/20* (2013.01); *G06V 10/70* (2022.01); *G06V 10/82* (2022.01); *G06V 10/94* (2022.01); *G10L 15/00* (2013.01); *G06N 3/063* (2013.01); *G06N 3/082* (2013.01); *G06N 3/084* (2013.01); *G06T 2207/10016* (2013.01); *G06T 2207/20084* (2013.01); *G06V 2201/07* (2022.01)

(56) References Cited

U.S. PATENT DOCUMENTS

| | | | |
|---|---|---|---|
| 6,047,081 | A | 4/2000 | Groezinger et al. |
| 6,477,555 | B1 | 11/2002 | Hartung |
| 6,954,509 | B2 | 10/2005 | Bohnhoff et al. |
| 7,065,545 | B2 | 6/2006 | Quintero-de-la-Garza |
| 8,200,726 | B2 | 6/2012 | Gunnels et al. |
| 8,706,971 | B1 * | 4/2014 | Nayak ................. G06F 12/0873 711/141 |
| 9,094,576 | B1 | 7/2015 | Karakotsios |
| 9,430,164 | B1 | 8/2016 | Botelho et al. |
| 9,542,626 | B2 | 1/2017 | Martinson et al. |
| 9,542,933 | B2 | 1/2017 | Mortensen |
| 9,824,684 | B2 | 11/2017 | Yu et al. |
| 9,864,933 | B1 | 1/2018 | Cosic |
| 9,959,272 | B1 | 5/2018 | Canek et al. |
| 10,032,463 | B1 | 7/2018 | Rastrow et al. |
| 10,467,201 | B1 * | 11/2019 | Merritt .................. G06F 16/215 |
| 10,664,963 | B1 | 5/2020 | Rossi et al. |
| 11,113,578 | B1 | 9/2021 | Brandt et al. |
| 2002/0015326 | A1 | 2/2002 | Rolandi et al. |
| 2003/0208664 | A1 | 11/2003 | Singh |
| 2005/0149465 | A1 | 7/2005 | Nugent |
| 2006/0110068 | A1 | 5/2006 | Luo et al. |
| 2007/0061152 | A1 † | 3/2007 | Doi |
| 2007/0061550 | A1 | 3/2007 | Barlow et al. |
| 2007/0156685 | A1 | 7/2007 | Inoue et al. |
| 2008/0208597 | A1 | 8/2008 | Chino et al. |
| 2008/0243279 | A1 | 10/2008 | Sherman |
| 2009/0113180 | A1 | 4/2009 | Banerjee et al. |
| 2011/0040821 | A1 | 2/2011 | Eichenberger et al. |
| 2011/0112981 | A1 | 5/2011 | Park et al. |
| 2011/0135167 | A1 | 6/2011 | Imaoka |
| 2011/0153707 | A1 | 6/2011 | Ginzburg et al. |
| 2011/0193876 | A1 | 8/2011 | Handa et al. |
| 2011/0292062 | A1 | 12/2011 | Hirotani |
| 2012/0054311 | A1 | 3/2012 | Mizuno et al. |
| 2012/0216188 | A1 | 8/2012 | Tsirkin |
| 2014/0233820 | A1 | 8/2014 | Wu et al. |
| 2014/0257813 | A1 | 9/2014 | Mortensen |
| 2014/0281386 | A1 | 9/2014 | Fox et al. |
| 2014/0281406 | A1 | 9/2014 | Dixon et al. |
| 2014/0337989 | A1 | 11/2014 | Orsini et al. |
| 2015/0060060 | A1 | 3/2015 | Colvin et al. |
| 2015/0269119 | A1 | 9/2015 | Derby et al. |
| 2015/0370559 | A1 | 12/2015 | Gschwind et al. |
| 2016/0078863 | A1 | 3/2016 | Chung et al. |
| 2016/0125253 | A1 | 5/2016 | Visvanathan et al. |
| 2016/0188725 | A1 | 6/2016 | Wang et al. |
| 2016/0342418 | A1 | 11/2016 | Nicolas et al. |
| 2016/0378661 | A1 | 12/2016 | Gray et al. |
| 2017/0083965 | A1 | 3/2017 | Sun |
| 2017/0103311 | A1 | 4/2017 | Henry et al. |
| 2017/0139713 | A1 | 5/2017 | Gschwind et al. |
| 2017/0177348 | A1 | 6/2017 | Ould-Ahmed-Vall et al. |
| 2017/0193368 | A1 | 7/2017 | Rejith et al. |
| 2017/0193397 | A1 | 7/2017 | Deshmukh et al. |
| 2017/0194001 | A1 | 7/2017 | Mortensen |
| 2017/0200067 | A1 | 7/2017 | Zhou et al. |
| 2017/0206227 | A1 | 7/2017 | Hwang et al. |
| 2017/0262284 | A1 | 9/2017 | Bradbury et al. |
| 2017/0337657 | A1 | 11/2017 | Cornell |
| 2018/0068463 | A1 | 3/2018 | Risser |
| 2018/0082172 | A1 | 3/2018 | Patel et al. |
| 2018/0136912 | A1 | 5/2018 | Venkataramani et al. |
| 2018/0150947 | A1 | 5/2018 | Lu et al. |
| 2018/0189580 | A1 | 7/2018 | Lee et al. |
| 2018/0240257 | A1 | 8/2018 | Li et al. |
| 2018/0300850 | A1 | 10/2018 | Johnson et al. |
| 2018/0315165 | A1 | 11/2018 | Navarrete Michelini et al. |
| 2018/0336464 | A1 | 11/2018 | Karras et al. |
| 2018/0350030 | A1 | 12/2018 | Simons et al. |
| 2019/0005383 | A1 | 1/2019 | Kantor et al. |
| 2019/0050723 | A1 | 2/2019 | Kong et al. |
| 2019/0079999 | A1 | 3/2019 | Min et al. |
| 2019/0080165 | A1 | 3/2019 | Takahashi et al. |
| 2019/0138922 | A1 | 5/2019 | Liu et al. |
| 2019/0139191 | A1 | 5/2019 | Liu et al. |
| 2019/0188567 | A1 | 6/2019 | Yao et al. |
| 2019/0236814 | A1 | 8/2019 | Shlens et al. |
| 2020/0193225 | A1 | 6/2020 | Olmeda Reino et al. |
| 2020/0250539 | A1 | 8/2020 | Liu et al. |
| 2021/0097326 | A1 | 4/2021 | Chen et al. |
| 2021/0150685 | A1 | 5/2021 | Chen et al. |
| 2021/0158484 | A1 | 5/2021 | Chen et al. |
| 2021/0182077 | A1 | 6/2021 | Chen et al. |
| 2021/0182666 | A1 | 6/2021 | Han et al. |
| 2021/0192245 | A1 | 6/2021 | Chen et al. |
| 2021/0209448 | A1 | 7/2021 | Navarrete Michelini et al. |
| 2022/0058772 | A1 | 2/2022 | Chuang et al. |

FOREIGN PATENT DOCUMENTS

| | | | |
|---|---|---|---|
| CN | 101072166 | A | 11/2007 |
| CN | 101078985 | A | 11/2007 |
| CN | 101084485 | A | 12/2007 |
| CN | 101187861 | A | 5/2008 |
| CN | 101208898 | A | 6/2008 |
| CN | 101295405 | A | 10/2008 |
| CN | 101315770 | A | 12/2008 |
| CN | 101340585 | A | 1/2009 |
| CN | 101369233 | A | 2/2009 |

(56) References Cited

FOREIGN PATENT DOCUMENTS

| | | | | |
|---|---|---|---|---|
| CN | 101515998 | A | | 8/2009 |
| CN | 101556565 | A | | 10/2009 |
| CN | 101615113 | A | | 12/2009 |
| CN | 101617311 | A | | 12/2009 |
| CN | 101620524 | A | | 1/2010 |
| CN | 101685388 | A | | 3/2010 |
| CN | 101779434 | A | | 7/2010 |
| CN | 101794239 | A | | 8/2010 |
| CN | 101819570 | A | | 9/2010 |
| CN | 101833441 | A | | 9/2010 |
| CN | 101833468 | A | | 9/2010 |
| CN | 101876892 | A | | 11/2010 |
| CN | 101944067 | A | | 1/2011 |
| CN | 102004628 | A | | 4/2011 |
| CN | 102005743 | A | | 4/2011 |
| CN | 102012893 | A | | 4/2011 |
| CN | 102014475 | A | | 4/2011 |
| CN | 102098623 | A | | 6/2011 |
| CN | 102103479 | A | | 6/2011 |
| CN | 102346894 | A | | 2/2012 |
| CN | 102360344 | A | | 2/2012 |
| CN | 102375805 | A | | 3/2012 |
| CN | 102495998 | A | † | 6/2012 |
| CN | 102508643 | A | | 6/2012 |
| CN | 102520906 | A | | 6/2012 |
| CN | 102541814 | A | | 7/2012 |
| CN | 102724482 | A | | 10/2012 |
| CN | 102750127 | A | | 10/2012 |
| CN | 102831387 | A | | 12/2012 |
| CN | 102880341 | A | | 1/2013 |
| CN | 103002147 | A | | 3/2013 |
| CN | 103064086 | A | | 4/2013 |
| CN | 103238133 | A | | 8/2013 |
| CN | 103294648 | A | | 9/2013 |
| CN | 103309813 | A | | 9/2013 |
| CN | 103368701 | A | | 10/2013 |
| CN | 103502935 | A | | 1/2014 |
| CN | 103530276 | A | | 1/2014 |
| CN | 103646007 | A | | 3/2014 |
| CN | 103646009 | A | | 3/2014 |
| CN | 103699360 | A | | 4/2014 |
| CN | 103856727 | A | | 6/2014 |
| CN | 103874964 | A | | 6/2014 |
| CN | 103975302 | A | | 8/2014 |
| CN | 103999037 | A | | 8/2014 |
| CN | 104011649 | A | | 8/2014 |
| CN | 104011651 | A | | 8/2014 |
| CN | 104038864 | A | | 9/2014 |
| CN | 104040482 | A | | 9/2014 |
| CN | 104077138 | A | | 10/2014 |
| CN | 104081337 | A | | 10/2014 |
| CN | 104094182 | A | | 10/2014 |
| CN | 104123250 | A | | 10/2014 |
| CN | 104157285 | A | | 11/2014 |
| CN | 104219505 | A | | 12/2014 |
| CN | 104350492 | A | | 2/2015 |
| CN | 104376326 | A | | 2/2015 |
| CN | 104376842 | A | | 2/2015 |
| CN | 104423926 | A | | 3/2015 |
| CN | 104461970 | A | | 3/2015 |
| CN | 104537630 | A | | 4/2015 |
| CN | 104583938 | A | | 4/2015 |
| CN | 104850845 | A | | 8/2015 |
| CN | 104915322 | A | | 9/2015 |
| CN | 104937542 | A | | 9/2015 |
| CN | 104937543 | A | | 9/2015 |
| CN | 104956323 | A | | 9/2015 |
| CN | 105068998 | A | | 11/2015 |
| CN | 105069304 | A | | 11/2015 |
| CN | 105094749 | A | | 11/2015 |
| CN | 105122228 | A | | 12/2015 |
| CN | 105160340 | A | | 12/2015 |
| CN | 105354006 | A | | 2/2016 |
| CN | 105405443 | A | | 3/2016 |
| CN | 105446970 | A | | 3/2016 |
| CN | 105468335 | A | | 4/2016 |
| CN | 105468546 | A | | 4/2016 |
| CN | 105488565 | A | | 4/2016 |
| CN | 105512676 | A | | 4/2016 |
| CN | 105512723 | A | | 4/2016 |
| CN | 105609141 | A | | 5/2016 |
| CN | 105703978 | A | | 6/2016 |
| CN | 105719327 | A | | 6/2016 |
| CN | 105721354 | A | | 6/2016 |
| CN | 105787888 | A | | 7/2016 |
| CN | 105830040 | A | | 8/2016 |
| CN | 105849690 | A | | 8/2016 |
| CN | 105869024 | A | | 8/2016 |
| CN | 105869117 | A | | 8/2016 |
| CN | 105892989 | A | | 8/2016 |
| CN | 105895082 | A | | 8/2016 |
| CN | 105912667 | A | | 8/2016 |
| CN | 105913039 | A | | 8/2016 |
| CN | 105930902 | A | | 9/2016 |
| CN | 105956608 | A | | 9/2016 |
| CN | 205582481 | U | | 9/2016 |
| CN | 106022468 | A | | 10/2016 |
| CN | 106067031 | A | | 11/2016 |
| CN | 106095834 | A | | 11/2016 |
| CN | 106096542 | A | | 11/2016 |
| CN | 106126507 | A | | 11/2016 |
| CN | 106127672 | A | | 11/2016 |
| CN | 106228512 | A | | 12/2016 |
| CN | 106296667 | A | | 1/2017 |
| CN | 106302837 | A | | 1/2017 |
| CN | 106328127 | A | | 1/2017 |
| CN | 106408086 | A | | 2/2017 |
| CN | 106408595 | A | | 2/2017 |
| CN | 106484682 | A | | 3/2017 |
| CN | 106503055 | A | | 3/2017 |
| CN | 106529668 | A | | 3/2017 |
| CN | 106548208 | A | | 3/2017 |
| CN | 104169907 | B | | 4/2017 |
| CN | 106560809 | A | | 4/2017 |
| CN | 106575219 | A | | 4/2017 |
| CN | 106604216 | A | | 4/2017 |
| CN | 106650581 | A | | 5/2017 |
| CN | 106650922 | A | | 5/2017 |
| CN | 106709532 | A | | 5/2017 |
| CN | 106778472 | A | | 5/2017 |
| CN | 106778928 | A | | 5/2017 |
| CN | 106780367 | A | | 5/2017 |
| CN | 106782501 | A | | 5/2017 |
| CN | 106815321 | A | | 6/2017 |
| CN | 106844627 | A | | 6/2017 |
| CN | 106845549 | A | | 6/2017 |
| CN | 106850673 | A | | 6/2017 |
| CN | 106887225 | A | | 6/2017 |
| CN | 106898350 | A | | 6/2017 |
| CN | 106898353 | A | | 6/2017 |
| CN | 106951961 | A | | 7/2017 |
| CN | 106952224 | A | | 7/2017 |
| CN | 106952235 | A | | 7/2017 |
| CN | 106970896 | A | | 7/2017 |
| CN | 106990940 | A | | 7/2017 |
| CN | 106991077 | A | | 7/2017 |
| CN | 106991476 | A | | 7/2017 |
| CN | 106991477 | A | | 7/2017 |
| CN | 106991478 | A | | 7/2017 |
| CN | 107003843 | A | | 8/2017 |
| CN | 107038159 | A | | 8/2017 |
| CN | 107067825 | A | | 8/2017 |
| CN | 107111486 | A | | 8/2017 |
| CN | 107133018 | A | | 9/2017 |
| CN | 107169503 | A | | 9/2017 |
| CN | 107171932 | A | | 9/2017 |
| CN | 107194938 | A | | 9/2017 |
| CN | 107203775 | A | | 9/2017 |
| CN | 107220929 | A | † | 9/2017 |
| CN | 107221337 | A | | 9/2017 |
| CN | 107239824 | A | | 10/2017 |
| CN | 107240185 | A | | 10/2017 |
| CN | 107247930 | A | | 10/2017 |
| CN | 107293296 | A | † | 10/2017 |

(56) References Cited

FOREIGN PATENT DOCUMENTS

| | | | |
|---|---|---|---|
| CN | 107301383 | A | 10/2017 |
| CN | 107301453 | A | 10/2017 |
| CN | 107301454 | A | 10/2017 |
| CN | 107305484 | A | 10/2017 |
| CN | 106447034 | B | 7/2019 |
| CN | 106920545 | B | 7/2020 |
| EP | 0097858 | B1 | 12/1991 |
| EP | 0475732 | B1 | 12/1998 |
| EP | 2851786 | A1 | 3/2015 |
| GB | 2515145 | B | 12/2015 |
| IN | 106952235 | A | 7/2017 |
| JP | 2006031475 | A | 2/2006 |
| WO | 2005086443 | A1 | 9/2005 |
| WO | 2010064728 | A1 | 6/2010 |
| WO | 2014105123 | A1 | 7/2014 |
| WO | 2017021322 | A1 | 2/2017 |
| WO | 2017027638 | A1 | 2/2017 |
| WO | 2017048647 | A1 | 3/2017 |
| WO | 2017077121 | A1 | 5/2017 |
| WO | 2017084331 | A1 | 5/2017 |
| WO | 2017124648 | A1 | 7/2017 |

OTHER PUBLICATIONS

CN201711212125.0—Second Office Action mailed on Jul. 12, 2021, 37 pages.
CN20171124402.0—Notice of Grant, mailed on Jul. 15, 2022, 5 pages.
CN201810799954.1—First Office Action mailed on Feb. 2, 2021, 40 pages.
CN201810849488.3—Second Office Action mailed on Mar. 2, 2021, 11 pages.
CN201810849496.8—Notice of Grant mailed on Jul. 8, 2021, 4 pages.
CN201810849497.2—Notice of Grant mailed on Nov. 5, 2020, 4 pages.
CN201810849498.7—Notice of Grant mailed on May 8, 2021, 4 pages.
CN201810849499.1—First Office Action mailed on May 21, 2020, 11 pages.
CN201810849509.1—First Office Action mailed on Mar. 30, 2020, 9 pages.
CN201810849509.1—Second Office Action mailed on Oct. 9, 2020, 11 pages.
CN201811436410.5—Notice of Grant mailed on Nov. 5, 2020, 4 pages.
CN201811440571.1—Notice of Grant mailed on May 7, 2021, 4 pages.
CN201910070501.X—Notice of Grant mailed on Feb. 9, 2021, 4 pages.
CN202010190142.4—Chinese Office Action mailed on Dec. 20, 2022, 11 pages (With brief English explanation).
CN202010336354.9—Chinese Office Action mailed on Dec. 30, 2022, 11 pages (With brief English explanation).
Xufei Liu, "Say goodbye to Photoshop, Decryption of neural network based skin adjustment technic", Computer Fan, Apr. 15, 2017, 2 pages.
CN201711036374.9—Office Action mailed on Mar. 23, 2023, 8 pages. (With Brief English Explanations).
CN201880002336.8—Office Action mailed on Mar. 31, 2023, 8 pages. (With Brief English Explanations).
CN202010189354.0—Office Action mailed on Mar. 30, 2023, 8 pages. (With Brief English Explanations).
CN202010190143.9—Office Action mailed on Mar. 23, 2023, 10 pages.(With Brief English Explanations).
CN202010309559.8—First Office Action mailed on Mar. 8, 2023, 8 pages. (With Brief English Translation).
CN201711212656.X, Official Action mailed Nov. 27, 2019, 8 pages.
CN201711212123.1, Official Action mailed Nov. 26, 2019, 15 pages.
CN201711212995.8, Official Action mailed Nov. 27, 2019, 8 pages.
PCT/CN2018/105463, International Search Report issued Dec. 3, 2018, 9 pages.
CN201911058910.4—Second Office Action, mailed Jul. 4, 2022, 6 pages. (With Brief English Explanation).
CN 201711244020.3, First Office Action, mailed Jan. 7, 2022, 14 pages, (with English translation).
CN 201810800664.4, Office Action, mailed Apr. 8, 2022, 8 pages, (With brief English explanation).
CN 201810800665.9—Office Action, mailed Apr. 8, 2022, 8 pages. (With brief English explanation).
CN 201810801238.2, Office Action, mailed Jan. 10, 2022, 10 pages, (With brief English explanation).
CN201711212125.0, Chinese Office Action Issued Apr. 12, 2022, 11 pages, (With brief English explanation).
CN201810799954.1, Chinese Office Action Issued Apr. 8, 2022, 8 pages. (With brief English explanation).
Development Tutorial for ARM Cortex-A9 Multi-cores embedded system, 2016, 5 Pages. (With brief English explanation ).
Frank Vahid et al., "Embedded Systems Design: A Unified Hardware/Software Introduction", 2004, pp. 42.
CN201811436410.5, Chinese Office Action Issued Apr. 30, 2020, 7 pages, No English Translation.
CN201811440571.1, Chinese Office Action Issued Apr. 30, 2020, 31 pages, No English Translation.
CN201811440571.1, Chinese Office Action Issued Nov. 4, 2020, 5 pages, No English Translation.
PCT/CN2018/105463, International Search Report Issued Dec. 3, 2018, 9 pages, No English Translation.
CN201910070501.X, Chinese Office Action Issued Oct. 29, 2020, 3 pages, No English Translation.
CN201910070501.X, Chinese Office Action Issued Nov. 5, 2020, 16 pages, No English Translation.
CN201910067288.7, Chinese Office Action Issued Oct. 29, 2020, 11 pages, No English Translation.
CN201910067288.7, Chinese Office Action Issued May 5, 2020, 14 pages, No English Translation.
CN201711212125.0, Chinese Office Action Issued Dec. 16, 2020, 50 pages, No English Translation.
CN201711212122.7, Chinese Office Action Issued Jul. 17, 2020, 14 pages, No English Translation.
CN201711212123.1, Chinese Office Action Issued May 21, 2020, 14 pages, No English Translation.
CN201711212123.1, Chinese Office Action Issued Nov. 26, 2019, 15 pages, No English Translation.
CN201711212660.6, Chinese Office Action Issued Dec. 16, 2020, 16 pages, No English Translation.
CN201711211933.5, Chinese Office Action Issued Dec. 16, 2020, 28 pages, No English Translation.
CN201711212991.X, Chinese Office Action Issued Dec. 7, 2020, 14 pages, No English Translation.
CN201711212991.X, Chinese Office Action Issued Aug. 26, 2020, 5 pages, No English Translation.
CN201711212995.8, Chinese Office Action Issued Jun. 28, 2020, 10 pages, No English Translation.
CN201711212995.8, Chinese Office Action Issued Nov. 27, 2020, 8 pages, No English Translation.
CN201711212656.X, Chinese Office Action Issued Jun. 28, 2020, 10 pages, No English Translation.
CN201711212656.X, Chinese Office Action Issued Nov. 27, 2019, 8 pages, No English Translation.
CN201711212994.3, Chinese Office Action Issued Nov. 20, 2020, 41 pages, No English Translation.
CN201810801239.7, Chinese Office Action Issued Apr. 29, 2020, 32 pages, No English Translation.
CN201810801239.7, Chinese Office Action Issued Oct. 16, 2020, 7 pages, No English Translation.
CN201810801236.3, Chinese Office Action Issued Apr. 23, 2020, 29 pages, No English Translation.
CN201810799987.6, Chinese Office Action Issued Oct. 19, 2020, 6 pages, No English Translation.
CN201810799987.6, Chinese Office Action Issued May 11, 2020, 26 pages, No English Translation.

(56) References Cited

OTHER PUBLICATIONS

CN201810800001.2, Chinese Office Action Issued May 13, 2020, 33 pages, No English Translation.
CN201810800001.2, Chinese Office Action Issued Nov. 4, 2020, 10 pages, No English Translation.
CN201810849509.1, Chinese Office Action Issued Mar. 30, 2020, 3 pages, No English Translation.
CN201810849509.1, Chinese Office Action Issued Oct. 9, 2020, 4 pages, No English Translation.
CN201810849480.7, Chinese Office Action Issued May 22, 2020, 6 pages, No English Translation.
CN201810849484.5, Chinese Office Action Issued Jul. 3, 2020, 6 pages, No English Translation.
CN201810849483.0, Chinese Office Action Issued Jul. 30, 2020, 8 pages, No English Translation.
CN201810849497.2, Chinese Office Action Issued May 26, 2020, 7 pages, No English Translation.
CN201810849486.4, Chinese Office Action Issued Apr. 26, 2020, 9 pages, No English Translation.
CN201810849486.4, Chinese Office Action Issued Jan. 5, 2021, 7 pages, No English Translation.
CN201810849492.X, Chinese Office Action Issued Apr. 22, 2020, 8 pages, No English Translation.
CN201810849492.X, Chinese Office Action Issued Jan. 7, 2021, 5 pages, No English Translation.
CN201810849479.4, Chinese Office Action Issued Apr. 26, 2020, 8 pages, No English Translation.
CN201810849479.4, Chinese Office Action Issued Nov. 4, 2020, 21 pages, No English Translation.
CN201810849491.5, Chinese Office Action Issued Apr. 22, 2020, 10 pages, No English Translation.
CN201810849491.5, Chinese Office Action Issued Dec. 8, 2020, 7 pages, No English Translation.
CN201810849498.7, Chinese Office Action Issued Jul. 1, 2020, 7 pages, No English Translation.
CN201810849496.8, Chinese Office Action Issued Aug. 3, 2020, 18 pages, No English Translation.
CN201810849485.X, Chinese Office Action Issued Apr. 21, 2020, 8 pages, No English Translation.
CN201810849485.X, Chinese Office Action Issued Jan. 7, 2021, 4 pages, No English Translation.
CN201810849499.1, Chinese Office Action Issued May 21, 2020, 7 pages, No English Translation.
CN2018108494883, Chinese Office Action Issued Jul. 23, 2020, 8 pages, No English Translation.
Chou et al., "VEGAS: Soft Vector Processor with Scratchpad Memory", FPGA '11: Proceedings of the 19th ACM/SIGDA international symposium on Field programmable gate arrays, Feb. 2011, 10 pages.
"Learning BLAS library—ROT", Cocoonyang, dated Mar. 17, 2017, 1 page.
CN 201711212123.1—First Office Action mailed on Dec. 26, 2019, 37 pages.
CN 201911062123.7—First Office Action, mailed Oct. 9, 2021, 16 pages. (with English translation).
CN 201911058910.4—First Office Action, mailed Dec. 2, 2021, 17 pages. (with English translation).
CN 01811440484.6—First Office Action, mailed Nov. 1, 2021, 20 pages. (with English translation).
CN 201711212991.X—Third Office Action, mailed Apr. 2, 2021, 33 pages. (with English translation).
CN 201810800665.9—Second Office Action, mailed Nov. 11, 2021, 18 pages. (with English translation).
CN 201810799988.0—First Office Action, mailed Apr. 6, 2021, 22 pages. (with English translation).
CN 201810801236.3—Second Office Action, mailed Feb. 3, 2021, 20 pages. (with English translation).
CN 201810799954.1—First Office Action, mailed Feb. 2, 2021, 40 pages. (with English translation).
CN 201810799954.1—Second Office Action, mailed Nov. 10, 2021, 20 pages. (with English translation).
CN 201810800664.4—First Office Action, mailed Feb. 1, 2021, 67 pages. (with English translation).
CN 201810800664.4—Second Office Action, mailed Nov. 24, 2021, 19 pages. (with English translation).
CN 201810801238.2—First Office Action, mailed Mar. 18, 2021, 88 pages. (with English translation).
CN 201810849509.1—Third Office Action, mailed Mar. 22, 2021, 19 pages. (with English translation).
EP 18873474.3—Extended European Search Report, mailed Sep. 2, 2021, 7 pages.
EP 18873474.3—Communication pursuant to Rules 70(2) and 70a(2) EPC, mailed Sep. 21, 2021, 1 page.
CN 201810849484.5—Second Office Action, mailed Apr. 6, 2021, 13 pages. (with English translation).
CN 201810801238.2—Second Office Action, mailed Sep. 14, 2021, 25 pages. (with English translation).
CN 201911058839.X—First Office Action, mailed Oct. 26, 2021, 21 pages. (with English translation).
CN 201711212991.X—Rejection Decision, mailed Nov. 26, 2021, 10 pages. (with brief English explanation).
CN 201810800665.9—First Office Action, mailed Feb. 8, 2021, 33 pages. (with brief English explanation).
Zhijian Lu, "The Research on Parallel Architecture for FPGA-Based Convolutional Neural Networks", Apr. 1, 2014, 51 pages. (with English Abstract).
Unknown Author, "The Latest Development of Speech Recognition Framework—Deep Full-Sequence Convolutional Neural Network Debut", Aug. 5, 2016, 9 pages. (with English Abstract).
"Learning BLAS library—ROT", Cocoonyang, dated Mar. 17, 2017, 2 pages (With Brief English Explanation).
CN201711211933.5—First Office Action mailed on Dec. 16, 2020, 19 pages.
CN201711212122.7—First Office Action mailed on Jul. 17, 2020, 30 pages.
CN201711212123.1—Second Office Action mailed on May 21, 2020, 36 pages.
CN201711212125.0—First Office Action mailed on Dec. 16, 2020, 36 pages.
CN201711212656.X—First Office Action mailed on Nov. 27, 2019, 15 pages.
CN201711212656.X—Second Office Action mailed on Jun. 28, 2020, 21 pages.
CN201711212660.6—First Office Action mailed on Dec. 16, 2020, 31 pages.
CN201711212991.X—First Office Action mailed on Aug. 26, 2020, 15 pages.
CN201711212991.X—Third Office Action mailed on Apr. 2, 2021, 33 pages.
CN201711212994.3—Second Office Action mailed on Jul. 13, 2021, 16 pages.
CN201711212994.3, Chinese Office Action mailed Nov. 20, 2020, 42 pages, (With Brief English Explanation).
CN201711212995.8—First Office Action mailed on Nov. 27, 2019, 15 pages.
CN201711212995.8—Second Office Action mailed on Jun. 28, 2020, 22 pages.
CN201810849480.7—First Office Action mailed on May 22, 2020, 10 pages.
CN201810799987.6—First Office Action mailed on May 11, 2020, 17 pages.
CN201810799987.6—Second Office Action mailed on Oct. 19, 2020, 11 pages.
CN201810800001.2—First Office Action mailed on May 13, 2020, 25 pages.
CN201810800001.2—Second Office Action mailed on Nov. 4, 2020, 28 pages.
CN201810801236.3—First Office Action mailed on Apr. 23, 2020, 23 pages.
CN201810801239.7—First Office Action mailed on Apr. 29, 2020, 24 pages.

(56) References Cited

OTHER PUBLICATIONS

CN201810801239.7—Second Office Action mailed on Oct. 16, 2020, 13 pages.
CN201810849479.4—First Office Action mailed on Apr. 26, 2020, 16 pages.
CN201810849479.4—Second Office Action mailed on Nov. 4, 2020, 16 pages.
CN201810849483.0—First Office Action mailed on Jul. 30, 2020, 16 pages.
CN201810849484.5—First office Action mailed on Jul. 3, 2020, 10 pages.
CN201810849485.X—First Office Action mailed on Apr. 21, 2020, 15 pages.
CN201810849485.X—Second Office Action mailed on Jan. 7, 2021, 11 pages.
CN201810849486.4—First Office Action mailed on Apr. 26, 2020, 19 pages.
CN201810849486.4—Second Office Action mailed on Jan. 5, 2021, 16 pages.
CN201810849488.3—First Office Action mailed Jul. 23, 2020, 16 pages.
CN201810849491.5—First Office Action mailed on Apr. 22, 2020, 18 pages.
CN201810849492.X—First Office Action mailed on Apr. 22, 2020, 15 pages.
CN201810849492.X—Second Office Action mailed on Jan. 7, 2021, 13 pages.
CN201810849496.8—First Office Action mailed on Aug. 3, 2020, 17 pages.
CN201810849497.2, Chinese Office Action mailed May 26, 2020, 13 pages.
CN201810849498.7—First Office Action mailed on Jul. 1, 2020, 12 pages.
CN201811436410.5—First Office Action mailed on Apr. 30, 2020, 13 pages.
CN201811440571.1—First Office Action mailed on Apr. 30, 2020, 20 pages.
CN201811440571.1—Second Office Action mailed on Nov. 4, 2020, 12 pages.
CN201910067288.7—First Office Action mailed on May 22, 2020, 29 pages.
CN201910067288.7—Second Office Action mailed on Oct. 29, 2020, 27 pages.
CN201910070501.X—First Office Action mailed on May 11, 2020, 29 pages.
CN201910070501.X—Second Office Action mailed on Oct. 29, 2020, 9 pages.
PCT/CN2018/105463—International Search Report and Written Opinion mailed on Dec. 3, 2018, 12 pages.
Xufei Liu, "Say goodbye to Photoshop, Decryption of neural network based skin adjustment technic", Computer Fan, Apr. 15, 2017, 3 pages (With Brief English Explanation).
Abdel-Hamid et al., "Convolutional Neural Networks for Speech Recognition", IEEE/ACM Transactions on Audio, Speech, and Language Processing, vol. 22, No. 10, pp. 1533-1545, Oct. 2014, 13 pages.
Huang et al., "An Analysis of Convolutional Neural Networks for speech Recognition", 2015 IEEE International Conference on Acoustics, Speech and Signal Processing (ICASSP), Apr. 19, 2015, 5 pages.
Qian et al., "Very deep convolutional neural networks for robust speech recognition", 2016 IEEE Spoken Language Technology Workshop (SLT), 2016, 8 pages.
Sainath et al., "Improvements to deep convolutional neural networks for LVCSR", 2013 IEEE workshop on automatic speech recognition and understanding, 2013, 6 pages.
Tung et al., "Deep Neural Network Compression By In-parallel Pruning-quantization" IEEE Transactions On Pattern Analysis And Machine Intelligence, vol. 42, No. 3, 2018, pp. 568-579.
U.S. Appl. No. 17/119,029—Non-Final Office Action mailed on Sep. 26, 2023, 11 pages.
U.S. Appl. No. 17/119,093—Final Office Action mailed on Feb. 22, 2024, 32 pages.
U.S. Appl. No. 17/119,093—Non-Final Office Action mailed on Jun. 21, 2023, 35 pages.
U.S. Appl. No. 17/119,148—Non-Final Office Action mailed on May 10, 2023, 11 pages.
U.S. Appl. No. 17/119,148—Notice of Allowance mailed on Nov. 22, 2023, 10 pages.
U.S. Appl. No. 17/119,193—Non-Final Office Action mailed on Aug. 23, 2023, 46 pages.
U.S. Appl. No. 17/119,213—Non-Final Office Action mailed on Aug. 25, 2023, 15 pages.
U.S. Appl. No. 17/119,234—Non-Final Office Action mailed on Sep. 13, 2023, 34 pages.
U.S. Appl. No. 17/119,269—Non-Final Office Action mailed on Aug. 7, 2023, 16 pages.
U.S. Appl. No. 17/119,269—Notice of Allowance mailed on Feb. 27, 2024, 10 pages.
U.S. Appl. No. 17/119,309—Corrected Notice of Allowability mailed on Mar. 24, 2023, 8 pages.
U.S. Appl. No. 17/119,309—Non-Final Office Action mailed on Aug. 24, 2022, 50 pages.
U.S. Appl. No. 17/119,309—Notice of Allowance mailed on Jun. 20, 2023, 15 pages.
U.S. Appl. No. 17/119,309—Notice of Allowance mailed on Mar. 9, 2023, 11 pages.
U.S. Appl. No. 17/119,347—Non-Final Office Action mailed on Aug. 15, 2023, 23 pages.
U.S. Appl. No. 17/119,347—Notice of Allowance mailed on Feb. 23, 2024, 12 pages.
U.S. Appl. No. 17/119,029—Notice of Allowance mailed on Apr. 11, 2024, 10 pages.
U.S. Appl. No. 17/119,213—Notice of Allowance mailed on Mar. 21, 2024, 17 pages.
U.S. Appl. No. 17/119,093—Final Rejection mailed on Mar. 26, 2024, 30 pages.
U.S. Appl. No. 17/119,193—Notice of Allowance mailed on Apr. 4, 2024, 16 pages.
U.S. Appl. No. 17/119,269—Notice of Allowability mailed on Apr. 4, 2024, 3 pages.
U.S. Appl. No. 17/119,347—Supplemental Notice of Allowability mailed on Apr. 16, 2024, 2 pages.
U.S. Appl. No. 17/119,234—Final rejection mailed on Jun. 4, 2024, 39 pages.
U.S. Appl. No. 17/119,234—Non-Final Office Aciton mailed on Jan 17, 2025, 38 pages.
Abadi et al., "TensorFlow: Large-Scale Machine Learning on Heterogeneous Distributed Systems", Preliminary White Paper, Nov. 9, 2015, 19 pages.
EP18873474.3—Communication pursuant to Article 94(3) mailed on Jan. 28, 2025, 5 pages

* cited by examiner
† cited by third party

| | | | |
|---|---|---|---|
| Opcode | Register or immediate | Register/ immediate | ... |

| | | | | | |
|---|---|---|---|---|---|
| Power-bit data | 00000 | 00000 | 00000 | 00011 | 00100 |
| Exponential value | 0 | 3 | 4 | 1 | Set to zero |

| | | | | | |
|---|---|---|---|---|---|
| Power-bit data | 00000 | 00001 | 00010 | 00011 | 11111 |
| Exponential value | 0 | 1 | 2 | 3 | Set to zero |

| | | | | | |
|---|---|---|---|---|---|
| Power-bit data | 00000 | 00001 | 00010 | 00011 | 11111 |
| Exponential value | 0 | 2 | 4 | 6 | Set to zero |

| | | | | | |
|---|---|---|---|---|---|
| Power-bit data | 11111 | 11110 | 11101 | 11100 | 00000 |
| Exponential value | 0 | 1 | 2 | 3 | Set to zero |

| | | | | | |
|---|---|---|---|---|---|
| Opcode | A stream to which the source address belongs | Source address | A stream to which the source address belongs | Source address | The amount of data |
| Opcode | Register 1 | | Register 2 | | Register 3 |

| 1st beat | 2nd beat | 3rd beat | 4th beat | 5th beat | 6th beat | 7th beat | 8th beat | 9th beat |
|---|---|---|---|---|---|---|---|---|
| Transfer a piece of data | | | | | | | | |
| Address+1 | Transfer a piece of data | | | | | | | |
| | Address+1 | Transfer a piece of data | | | | | | |
| | | Address + row width - 2 | Transfer a piece of data | | | | | |
| | | | Address+1 | Transfer a piece of data | | | | |
| | | | | Address+1 | Transfer a piece of data | | | |
| | | | | | Address + row width - 2 | Transfer a piece of data | | |
| | | | | | | Address+1 | Transfer a piece of data | |
| | | | | | | | Address+1 | Transfer a piece of data |

FIG. 153

INFORMATION PROCESSING METHOD AND TERMINAL DEVICE

CROSS-REFERENCE TO RELATED APPLICATION(S) INFORMATION

This application claims the benefit of and priority to International PCT Patent Application No. PCT/CN2018/105463, filed Sep. 13, 2018; which claims the benefit of and priority to Chinese Patent Application No. 201711036374.9, filed Oct. 30, 2017; both of which are incorporated herein by reference in their entirety.

TECHNICAL FIELD

The present disclosure relates to the technical field of information processing technology, and particularly to an information processing method and a terminal device.

BACKGROUND

With the growing information technology and people's ever-increasing demand, the need for timeliness of information is becoming stronger. At present, terminal devices obtain information by general-purpose processors. For instance, a general-purpose processor may run an application to obtain the current location of an object or the current scene of the user (e.g., indoor or outdoor). However, this way of obtaining information by a general-purpose processor running a software program may be limited by the operating speed of the general-purpose processor, and in particular, when the general-purpose processor has a large load, the efficiency of obtaining information may be low and the delay may be long.

SUMMARY

An example of the present disclosure provides an information processing method and a terminal device. A computation device in the terminal device may be used to process first information and output target information needed by the user so that the efficiency of information processing may be improved.

A first example of the present disclosure provides a computation device configured to perform machine learning computations of a machine learning model. The computation device includes a computation unit and a controller unit, where the computation unit includes a primary processing circuit and a plurality of secondary processing circuits.

The controller unit is configured to obtain input data and a computation instruction.

The controller unit is further configured to parse the computation instruction to obtain a plurality of operation instructions, and send the plurality of operation instructions and the input data to the primary processing circuit.

The primary processing circuit is configured to pre-process the input data, and transfer data and operation instructions to the plurality of secondary processing circuits.

The plurality of secondary processing circuits are configured to perform intermediate operations in parallel according to the data and the operation instructions transferred by the primary processing circuit to obtain a plurality of intermediate results, and transfer the plurality of intermediate results to the primary processing circuit.

The primary processing circuit is further configured to post-process the plurality of intermediate results to obtain a computation result of the computation instruction.

A second example of the present disclosure provides a machine learning operation device which includes one or more of the computation devices of the first aspect. The machine learning operation device is configured to obtain data to be operated and control information from another processing device, perform specified machine learning operations, and transfer execution results to another processing device through an I/O interface.

If the machine learning operation device includes a plurality of the computation devices, the plurality of the computation devices are connected to each other in a specific structure and transfer data to each other.

The plurality of the computation devices are interconnected and transfer data to each other through a PCIE bus so that they can support large scale machine learning operations. The plurality of the computation devices share a same control system or have separate control systems. The plurality of the computation devices share a memory or have their own memories. A way of interconnecting the plurality of the computation devices may be any interconnection topology.

A third example of the present disclosure provides a combined processing device which includes the machine learning processing device, a general interconnection interface, and another processing device. The machine learning operation device interacts with another processing device to perform operations specified by the user. The combined processing device further includes a storage device. The storage device is connected to the machine learning operation device and another processing device respectively, and is configured to store data of the machine learning operation device and another processing device.

A fourth example of the present disclosure provide a neural network chip which includes the computation device of the first aspect, the machine learning operation device of the second aspect, or the combined processing device.

A fifth example of the present disclosure provide a neural network chip package structure which includes the neural network chip.

A sixth example of the present disclosure provide a board card which includes the chip package structure.

A seventh example of the present disclosure provides an electronic device which includes the neural network chip or the board card of the sixth aspect.

An example of the present disclosure further provides a computation method of performing a machine learning model. The computation method is applied to a computation device that is configured to perform machine learning computations. The computation device includes an operation unit and a controller unit. The operation unit includes a primary processing circuit and a plurality of secondary processing circuits. The method includes:

obtaining, by the controller unit, data, a machine learning model, and a computation instruction; parsing, by the controller unit, the computation instruction to obtain a plurality of operation instructions, and sending the plurality of operation instructions and the data to the primary processing circuit; pre-processing the data by the primary processing circuit, and transferring, by the primary processing circuit, the data and the operation instructions to the plurality of secondary processing circuits; performing, by the plurality of secondary processing circuits, intermediate operations in parallel according to the data and the operation instructions transferred by the primary processing circuit to obtain a plurality of intermediate results, and transferring the plurality of intermediate results to the primary processing circuit; and post-processing, by the primary processing circuit, the plurality of intermediate results to obtain an computation result of the computation instruction.

In some examples, the electronic device includes a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

In some examples, the vehicle includes an airplane, a ship, and/or a car. The household electrical appliance includes a television, an air conditioner, a microwave oven, a refrigerator, a rice cooker, a humidifier, a washing machine, an electric lamp, a gas cooker, and a range hood. The medical equipment includes a nuclear magnetic resonance spectrometer, a B-ultrasonic scanner, and/or an electrocardiograph.

An example of the present disclosure provides an information processing method that can be applied to a terminal device that includes a computation device. The computation device stores an instruction set which includes at least one operation instruction. The method includes:

obtaining first information, where the first information is to be processed by the terminal device;

calling the operation instruction in the computation device to process the first information, so as to obtain second information; and outputting the second information.

In some possible examples, the obtaining the first information includes: pre-processing raw information to obtain the first information. The first information is in a preset format. The pre-processing includes at least one of: data deduplication, data encoding, data conversion, and normalization.

In some possible examples, the operation instruction includes at least one of: a matrix-multiply-vector instruction, a vector-multiply-matrix instruction, a matrix-multiply-scalar instruction, a tensor operation instruction, a matrix addition instruction, a matrix subtraction instruction, a matrix retrieving instruction, a matrix loading instruction, a matrix saving instruction, and a matrix moving instruction.

In some possible examples, when the first information is voice information, the calling the operation instruction in the computation device to process the first information, so as to obtain the second information includes:

calling a voice recognition algorithm in the computation device to recognize the voice information, so as to obtain the second information.

The second information is text information. The voice recognition algorithm includes at least one operation instruction for voice recognition.

In some possible examples, when the first information is image information, the calling the operation instruction in the computation device to process the first information, so as to obtain the second information includes:

calling an image style changing algorithm in the computation device to change the style of the image information, so as to obtain the second information.

The style of the second information differs from that of the first information. The image style changing algorithm includes at least one operation instruction for changing the painting style or the image style.

In some possible examples, when the first information is image information that includes at least one object to be recognized, the calling the operation instruction in the computation device to process the first information, so as to obtain the second information includes:

calling an object detection algorithm in the computation device to perform object detection on the image information, so as to obtain the second information. The second information includes at least the location of an object. The object detection algorithm includes at least one operation instruction for object detection.

In some possible examples, when the first information is voice information to be translated, the calling the operation instruction in the computation device to process the first information, so as to obtain the second information includes:

calling a language translation algorithm in the computation device to translate the voice information, so as to obtain the second information.

The first information differs from the second information. The language translation algorithm includes at least one operation instruction for language translation.

In some possible examples, when the first information is a sentence of a conversation, the calling the operation instruction in the computation device to process the first information, so as to obtain the second information includes: a response to the sentence of the conversation. The response should have a logical connection with the content of the first information, and the two pieces of information can form a logical conversation. In these examples, a plurality of pieces of the first information and the second information form a meaningful conversation according to the order of time, that is, a case of a chatbot.

In some possible examples, when the first information is a history of a user including a product browsing history, and basic personal information (age, gender, etc.), the calling the operation instruction in the computation device to process the first information, so as to obtain the second information includes: product/service information recommended to the user, such as clothes, movies, and services.

The present disclosure provides a data processing device with interconnection circuit. In the interconnection circuit, one or more transaction data sources are connected to one or more transaction data destinations by interconnected nodes. The data processing device includes at least one input end and at least one output end. Each input end includes a plurality of input ports and output ports, at least two multiplexers, and at least one buffer. The data processing device further includes: a buffer allocation circuit which is connected to the multiplexers and is configured to control the multiplexers for allocating a temporary storage position for input transaction data according to a current state of the buffer; a routing selection circuit which is connected to the buffer and is configured to select an output end for transaction data in a buffer queue; an arbitration circuit which is configured to determine a buffer queue with transmission priority and give a plurality of transaction data transfer that compete for the same output end the occupation right to the output channel in turn according to a preset arbitration strategy; and a multiplexer circuit which is connected to the output ports and the output end, and is configured to transfer data in the interconnection circuit.

Regarding the data processing device with interconnection circuit provided by the present disclosure, the buffer includes a plurality of storage positions, where each of the storage positions is associated with each of the input ports. In this way, transaction data is temporarily stored in a corresponding storage position before the transaction data arrives at an input port and is transferred to a corresponding output port.

Regarding the data processing device with interconnection circuit provided by the present disclosure, the routing selection circuit is configured to determine an output end associated with a destination source according to address information of transaction data to be transferred which is stored in the storage position.

Regarding the data processing device with interconnection circuit provided by the present disclosure, the storage position includes at least one storage part. The buffer allocation circuit is configured to allocate the storage position of transaction data.

Regarding the data processing device with interconnection circuit provided by the present disclosure, the multiplexer circuit connects the storage part to the output end so that a transfer channel can be built for transaction data that obtains the occupation right to the output channel.

Regarding the data processing device with interconnection circuit provided by the present disclosure, the arbitration circuit further includes a priority register. The priority register is configured to store a reference number of a buffer queue with the transmission priority.

The arbitration circuit is further configured to check the priority register to determine whether the buffer queue has obtained the occupation right to the output channel.

Regarding the data processing device with interconnection circuit provided by the present disclosure, after the arbitration circuit allows the transaction data to obtain the occupation right to the output channel, the arbitration circuit is configured to query whether the output end is being occupied, and allow the transaction data with the occupation right to the channel to complete transfer when the output end is idle.

In addition, the present disclosure provides a data processing method of interconnection circuit. The above-mentioned data processing device with interconnection circuit is used for processing data in accordance with this method. The data processing method includes the following steps:

- a Step 1: receiving, by the multiplexer circuit, transaction data;
- a Step 2: allocating, by the buffer allocation circuit, a temporary storage position for the transaction data;
- a Step 3: selecting, by the routing selection circuit, an output end for the transaction data;
- a Step 4: determining, by the arbitration circuit, a buffer queue with transmission priority according to the transmission request of the transaction data, and giving a plurality of transaction data transfer that compete for the same output end the occupation right to the output channel in turn according to a preset arbitration strategy; and
- a Step 5: allocating, by the multiplexer circuit, the transfer channel to the transaction data that obtains the occupation right to the data channel, and transferring the transaction data to a downstream node of the interconnection circuit.

Regarding the data processing method of interconnection circuit provided by the present disclosure, the Step 4 further includes:

a Step 41: polling, by the arbitration circuit, in each period, so that different buffer queues obtain the transmission priority respectively, or, after all the transmission of a buffer queue finishes, giving the transmission priority to another buffer queue.

Regarding the data processing method of interconnection circuit provided by the present disclosure, the Step 4 further includes:

a Step 42: determining, by the arbitration circuit, whether the output end requested by the transaction data with transmission priority is occupied; if the output end is occupied, waiting for arbitration of a next period; if the output end is not occupied, checking, by the arbitration circuit, whether there are a plurality of pieces of transaction data requesting for the same output end according to the transmission requests of the transaction data; if there are a plurality of pieces of transaction data requesting for the same output end, giving, by the arbitration circuit, the occupation right to the output channel to the plurality of pieces of transaction data that compete for the same transfer channel in turn; and if there is no transaction data requesting for the same output end, performing the Step 5.

Technical Effects of the Present Disclosure Include:

(1) multiple buffers are set at each input end, storage positions can be flexibly allocated according to different input data, each buffer can be flexibly configured to be associated with different output ends and be controlled by a storage allocation circuit;

(2) there is no need to reserve space for prediction data, instead, the buffers can be allocated dynamically, so that the storage can be saved and power consumption overhead may be reduced;

(3) in a case where a large count of transaction data sources and destinations are to be connected, there is no need to set a separate buffer for each output port when setting buffers for the input port, only several buffers or even two buffers are enough; in this way, especially when interconnection circuit only has a small amount of data communication, the data transfer requirements may be satisfied, the storage may be saved, and the power consumption overhead may be reduced; and (4) there is a unified arbitration for the transaction data to be sent of each input end, so that the utilization of the data channel may be improved as the data transfer request of each input end is comprehensively considered by the arbitration circuit.

Therefore, the present disclosure can select a corresponding transfer channel for multiple transaction data arriving at the aggregation nodes in the interconnection circuit according to their destinations, and can arbitrate the data transfer requests competing for the same transfer channel at the same time, thereby improving the transaction data processing speed of the interconnection circuit, achieving good data flow control and improving the data throughput rate in interconnection circuit.

In a second aspect, an example of the present disclosure provides a terminal device which includes a function unit configured to perform the method of the first aspect.

In a third aspect, an example of the present disclosure provides another terminal device. The terminal device includes: a storage device, a processor, and a computer program that is stored in the storage device and can run on the processor. The processor executes the computer program to implement the method of any example of the first aspect.

In a fourth aspect, the present disclosure provides a computer readable storage medium which stores program codes that can be executed by a computing equipment. The program codes include an instruction for performing the method of any example of the first aspect.

In a fifth aspect, the present disclosure provides a computer program product which includes an instruction. When the product runs on a computer, the product enables the computer to perform the method of any example of the first aspect.

The present disclosure provides a matrix operation device which is configured to perform a matrix operation according to a matrix operation instruction. The device includes:

a storage unit configured to store a matrix;

a register unit configured to store a matrix address, where the matrix address is where the matrix is stored in the storage unit; and a matrix operation unit configured to obtain a matrix operation instruction, obtain a matrix address in the register unit according to the matrix operation instruction, then obtain a corresponding matrix in the storage unit according to the matrix address, and perform a matrix operation according to the matrix to obtain a matrix operation result.

Optionally, the Device Includes:

an instruction caching unit configured to store a matrix operation instruction to be executed.

Optionally, the Device Includes:

an instruction processing unit configured to obtain the matrix operation instruction from the instruction caching unit, and process the matrix operation instruction to provide to the matrix operation unit.

Optionally, the Instruction Processing Unit Includes:

- an instruction fetching module configured to obtain the matrix operation instruction from the instruction caching unit;
- a decoding module configured to decode the matrix operation instruction; and
- an instruction queue configured to sequentially store the decoded matrix operation instruction.

Optionally, the Device Further Includes:

a dependency processing unit configured to determine whether the matrix operation instruction and a previous matrix operation instruction access the same matrix before the matrix operation unit obtains the matrix operation instruction; if yes, after the previous matrix operation instruction is executed, providing the matrix operation instruction to the matrix operation unit; otherwise, providing the matrix operation instruction to the matrix operation unit directly.

Optionally, when the matrix operation instruction accesses the same matrix as the previous matrix operation instruction does, the dependency processing unit is configured to store the matrix operation instruction in a storage queue, and after the previous matrix operation instruction is executed, provide the matrix operation instruction in the storage queue to the matrix operation unit.

Optionally, the storage unit is further configured to store the matrix operation result. Optionally, the device further includes:

an input/output unit configured to store the matrix in the storage unit, or obtain the matrix operation result from the storage unit.

Optionally, the storage unit is a scratchpad memory.

Optionally, the matrix operation instruction includes an opcode and at least one operation field. The opcode is for indicating a function of the matrix operation instruction, and the operation field is for indicating data information of the matrix operation instruction.

Optionally, the matrix operation unit includes a matrix addition component, a matrix multiplication component, a matrix-scalar multiplication component, and a non-linear operation component.

Optionally, the matrix operation unit has a structure of multiple pipeline stages. The matrix multiplication component and the matrix-scalar multiplication component are in a first pipeline stage, the matrix addition component are in a second pipeline stage, and the non-linear operation component are in a third pipeline stage.

The present disclosure provides a convolution neural network forward operation device, which includes an instruction storage unit, a controller unit, a data access unit, an interconnection module, a primary operation module, and a plurality of secondary operation modules.

The instruction storage unit is configured to read an instruction through the data access unit and store the instruction.

The controller unit is configured to read the instruction from the instruction storage unit and decode the instruction into a control signal for controlling the behavior of other modules, where the other modules include the data access unit, the primary operation module, and the plurality of secondary operation modules.

The data access unit is configured to perform a reading/writing operation of data or instruction between external address space and the device.

The secondary operation modules are configured to perform a convolution operation of input data and a convolution kernel in a convolution neural network algorithm.

The interconnection module is configured to transfer data between the primary operation module and the secondary operation modules. Before a forward operation of a neural network fully connected layer starts, the primary operation module is configured to transfer input data to each secondary operating through the interconnection module. After the computation process of the secondary operation modules is completed, the interconnection module is configured to splice output scalars of the respective secondary operation modules stage by stage to obtain an intermediate vector and send the intermediate vector back to the primary operation module.

The primary operation module is configured to splice intermediate vectors of all input data into an intermediate result, and perform subsequent operations on the intermediate result.

Optionally, the primary operation module is configured to add biased data to the intermediate result, and then perform an activation operation.

Optionally, the plurality of secondary modules are configured to use the same input data and their respective convolution kernels to compute their respective output scalars in parallel.

Optionally, an activation function active used by the primary operation module may be any of the following non-linear functions: sigmoid, tan h, relu, softmax, or may be a linear function.

Optionally, the interconnection module forms a data channel for continuous or discrete data between the primary operation module and the plurality of secondary operation modules. The interconnection module has any of the following structures: a tree structure, a ring structure, a grid structure, a hierarchical interconnection, and a bus structure.

Optionally, the primary operation module includes a first storage unit, a first operation unit, a first data dependency determination unit, and a first storage unit.

The first storage unit is configured to cache input data and output data used by the primary operation module during a computation process.

The first operation unit is configured to perform various operational functions of the primary operation module.

The data dependency determination unit is a port for the first operation unit to read/write the first storage unit, so as to ensure that there is no consistency conflict in reading data from and writing data to the first storage unit. The data dependency determination unit is configured to read an input neuron vector from the first storage unit, and send the vector to the secondary operation modules through the interconnection module.

An intermediate result vector from the interconnection module is sent to the first operation unit.

Optionally, each secondary operation module includes a second operation unit, a second data dependency determination unit, a second storage unit, and a third storage unit.

The second operation unit is configured to receive a control signal sent by the controller unit and perform an arithmetic logic operation.

The second data dependency determination unit is configured to perform a reading/writing operation on the second storage unit and the third storage unit during a computation process to ensure that there is no consistency conflict between the reading and writing operations on the second storage unit and the third storage unit.

The second storage unit is configured to cache input data and an output scalar, where the output scalar is obtained from the computation performed by the secondary operation module.

The third storage unit is configured to cache a convolution kernel required by the secondary operation module in the computation process.

Optionally, the first and second data dependency determination units may ensure that there is no consistency conflict in reading and writing by the following method: determining whether there is dependency between a control signal that has not been executed and data of a control signal that is being executed. If there is no dependency, the control signal is allowed to be issued immediately; otherwise, the control signal is not allowed to be issued until all control signals on which the control signal is dependent have been executed.

Optionally, the data access unit is configured to read in at least one of the following from the external address space: input data, biased data, or a convolution kernel.

The present disclosure provides a method of performing a forward operation of a single-layer convolution neural network, which includes:

a step S1, pre-storing an IO instruction in a starting address of an instruction storage unit;

a step S2, the operation starts, reading, by the controller unit, the IO instruction from the starting address of the instruction storage unit, and according to a control signal decoded from the instruction, reading, by the data access unit, all corresponding convolution neural network operation instructions from external address space, and caching the instructions in the instruction storage unit;

a step S3, reading, by the controller unit, a next IO instruction from the instruction storage unit, and according to a control signal decoded from the instruction, reading, by the data access unit, all data required by a primary operation unit from the external address space, and storing the data in a first storage unit of the primary operation unit;

a step S4, reading, by the controller unit, a next IO instruction from the instruction storage unit, and according to a control signal decoded from the instruction, reading, by the data access unit, convolution kernel data required by a secondary operation unit from the external address space;

a step S5, reading, by the controller unit, a next CONFIG instruction from the instruction storage unit, and according to a control signal decoded from the instruction, configuring various constants required by the computation of the neural network layer;

a step S6, reading, by the controller unit, a next COMPUTE instruction from the instruction storage unit, and according to a control signal decoded from the instruction, sending, by the primary operation module, input data in a convolution window to each secondary operation module through an interconnection module and saving the input data to a second storage unit of the secondary module; and then moving the convolution window according to the instruction;

a step S7, according to the control signal decoded from the COMPUTE instruction, reading, by an operation unit of the secondary operation module, the convolution kernel from a third storage unit; reading the input data from the second storage unit to complete the convolution operation of the input data and the convolution kernel; and returning an obtained output scalar through the interconnection module;

a step S8, in the interconnection module, splicing output scalars returned from respective secondary operation modules stage by stage to obtain a complete intermediate vector;

a step S9, obtaining, by the primary operation module, the intermediate vector returned by the interconnection module; traversing all input data by the convolution window; splicing, by the primary operation module, all returned vectors into an intermediate result; according to the control signal decoded from the COMPUTE instruction, reading biased data from the first storage unit, adding the intermediate result and the biased data in a vector addition unit to obtain a bias result; activating the bias result by the activation unit, and writing final output data back to the first storage unit; and a step S10, reading, by the controller unit, a next IO instruction from the instruction storage unit, and according to a control signal decoded from the instruction, storing, by the data access unit, the output data in the first storage unit to a specified address in the external address space, then the operation finishes.

The present disclosure provides a method of performing a forward operation of a multi-layer convolution neural network, which includes:

when an upper layer of the convolution neural network is executed, using, by an operation instruction of this layer, an output data address of the upper layer stored in the primary operation unit as an input data address of this layer, and changing a convolution kernel and biased data address in the instruction to an address corresponding to this layer.

The present disclosure provides a convolution neural network forward operation device, which includes an instruction storage unit, a controller unit, a data access unit, an interconnection module, a primary operation module, and a plurality of secondary operation modules.

The instruction storage unit is configured to read an instruction through the data access unit and store the instruction.

The controller unit is configured to read the instruction from the instruction storage unit and decode the instruction into a control signal for controlling the behavior of other modules, where the other modules include the data access unit, the primary operation module, and the plurality of secondary operation modules.

The data access unit is configured to perform a reading/writing operation of data or instruction between external address space and the device.

The interconnection module is configured to connect the primary operation module and the secondary operation modules.

The primary operation module is configured to perform function activation operations of a fully connected layer algorithm of an artificial neural network.

The plurality of secondary operation modules are configured to perform multiplication and addition of input neurons and weight parameters of the fully connected layer algorithm of the artificial neural network.

The interconnection module is configured to transfer data between the primary operation module and the secondary operation modules. Before a forward operation of the neural network fully connected layer starts, the primary operation module is configured to transfer input neuron vectors to each secondary operation module through the interconnection module. After the computation process of the secondary operation modules is completed, the interconnection module is configured to splice output neuron values of the respective secondary operation modules stage by stage to obtain an intermediate result vector and send the intermediate result vector back to the primary operation module for subsequent computation.

Optionally, the plurality of secondary modules are configured to use the same input neuron vectors and their respective weight vectors to compute their respective output neuron values in parallel. The weight vector of each secondary operation module is a row vector in a weight matrix corresponding to the secondary operation module.

Optionally, an activation function active used by the primary operation module may be any of the following non-linear functions: sigmoid, tan h, relu, softmax, or may be a linear function.

Optionally, the primary operation module is configured to add biased data to the intermediate result, and then perform an activation operation.

Optionally, the interconnection module forms a data channel for continuous or discrete data between the primary operation module and the plurality of secondary operation modules. The interconnection module has any of the following structures: a tree structure, a ring structure, a grid structure, a hierarchical interconnection, and a bus structure.

Optionally, the primary operation module includes a first storage unit, a first operation unit, a first data dependency determination unit, and a first storage unit.

The neuron caching unit is configured to cache input data and output data used by the primary operation module during computations.

The first operation unit is configured to perform various operational functions of the primary operation module.

The data dependency determination unit is a port for the first operation unit to read/write the first storage unit, so as to ensure that there is no consistency conflict in reading data from and writing data to the first storage unit. The data dependency determination unit is configured to read an input neuron vector from the first storage unit, and send the vector to the secondary operation modules through the interconnection module.

An intermediate result vector from the interconnection module is sent to the first operation unit.

Optionally, each secondary operation module includes a second operation unit, a second data dependency determination unit, a second storage unit, and a third storage unit.

The second operation unit is configured to receive a control signal sent by the controller unit and perform an arithmetic logic operation.

The second data dependency determination unit is configured to perform a reading/writing operation on the second storage unit and the third storage unit during a computation process to ensure that there is no consistency conflict between the reading and writing operations on the second storage unit and the third storage unit.

The second storage unit is configured to cache data of an input neuron vector and cache an output neuron value obtained by the secondary processing module.

The third storage unit is configured to cache a weight vector required by the secondary operation module in the computation process.

Optionally, the first and second data dependency determination units may ensure that there is no consistency conflict in reading and writing by the following method: determining whether there is dependency between a control signal that has not been executed and data of a control signal that is being executed. If there is no dependency, the control signal is allowed to be issued immediately; otherwise, the control signal is not allowed to be issued until all control signals on which the control signal is dependent have been executed.

The present disclosure provides a method of performing a forward operation of a fully connected layer of a single-layer artificial neural network by using a device for performing a forward operation of a fully connected layer of an artificial neural network. The method includes:

a step S1.1, storing an initial instruction in an instruction storage unit;

a step S1.2, reading an instruction from the instruction storage unit;

a step S1.3, decoding the instruction;

a step S1.4, performing a corresponding operation according to a control signal obtained by decoding; and a step S1.5, writing an operation result back to a corresponding storage unit.

The method of performing a forward operation of a fully connected layer of a single-layer artificial neural network by using a device for performing a forward operation of a fully connected layer of an artificial neural network further includes:

a step S2.1, pre-storing an IO instruction in the instruction storage unit;

a step S2.2, the operation starts, reading, by a controller unit, the IO instruction from the instruction storage unit, and according to the control signal obtained by decoding, reading, by a data access unit, all corresponding fully connected layer operation instructions of the neural network from external address space, and storing the instructions in the instruction storage unit;

a step S2.3, reading, by the controller unit, a next IO instruction from the instruction storage unit, and according to the control signal obtained by decoding, reading, by the data access unit, all data required by a primary operation unit from the external address space, and storing the data in a first storage unit of the primary operation unit;

a step S2.4, reading, by the controller unit, a next IO instruction from the instruction storage unit, and according to the control signal obtained by decoding, reading, by the data access unit, weight matrix data required by a secondary operation unit from the external address space;

a step S2.6, reading, by the controller unit, a next COMPUTE instruction from the instruction storage unit, and according to the control signal obtained by decoding, sending, by a primary operation module, an input neuron vector to each secondary operation module through an interconnection module and saving the input neuron vector to a second storage unit of the secondary operation module;

a step S2.7, according to the control signal decoded from the COMPUTE instruction, reading, by a second operation unit of the secondary operation module, a weight vector from a third storage unit; reading the input neuron vector from the second storage unit to complete a dot product computation of the weight vector and the input neuron vector; and returning an intermediate result through the interconnection module;

a step S2.8, in the interconnection module, splicing intermediate results returned from respective secondary operation modules stage by stage to obtain a complete intermediate result vector;

a step S2.9, obtaining, by the primary operation module, a return value from the interconnection module; according to the control signal decoded from the COMPUTE instruction, reading a bias vector from the first storage unit, adding the return value and the bias vector in a vector addition unit to obtain an addition result; activating the addition result by an activation unit, and writing a final output neuron vector back to the first storage unit; and a step S2.10, reading, by the controller unit, a next IO instruction from the instruction storage unit, and according to the control signal obtained by decoding, storing, by the data access unit, the output neuron vector in the storage unit to a specified address in the external address space, then the operation finishes.

The following step is performed between S2.4 and S2.6:

a step S2.5, reading, by the controller unit, a next CONFIG instruction from the instruction storage unit, and according to the control signal obtained by decoding, configuring various constants required by the computation of the neural network layer.

The present disclosure provides a method of performing a forward operation of a fully connected layer of a multi-layer artificial neural network, which includes:

when an upper fully connected layer of the artificial neural network is executed, using, by an operation instruction of a next layer, an output neuron address of the upper layer stored in the primary operation unit as an input neuron address of this layer, and changing a weight address and/or a bias address in the instruction to an address corresponding to this layer.

The present disclosure provides a device for performing a pooling operation. The device includes an instruction storage unit, a controller unit, a data access unit, and an operation module.

The instruction storage unit is configured to read an instruction through the data access unit and cache the instruction.

The controller unit is configured to read the instruction from the instruction storage unit and decode the instruction into a control signal for controlling the behavior of the operation module, and then distribute the control signal to the operation module.

The data access unit is configured to access external address space, and complete the loading and storing of data.

The operation module is configured to perform an operation of finding a maximum of a maxpooling operation, or perform accumulation and multiplication of an avgpooling operation.

The operation module includes an operation unit, a data dependency determination unit, and a neuron storage unit.

The neuron storage unit is configured to cache input data and output data used by the operation module during computations.

The operation unit is configured to perform various operational functions of the operation module.

The data dependency determination unit is a port for the operation unit to read/write the neuron storage unit, so as to ensure that there is no consistency conflict in reading data from and writing data to the neuron storage unit.

Regarding maxpooling, in a forward operation, the operation module sequentially compares the size of each input vector and takes a maximum to obtain an output vector.

Regarding maxpooling, in a forward operation, the operation module cyclically reads input vectors of a pooling kernel, performs the above-mentioned size comparison operation, obtains a new output vector of the kernel, and saves an index vector corresponding to each output vector until the pooling operation of the current layer ends.

Regarding maxpooling, in a backward training, the operation module outputs an input gradient vector to a corresponding storage position through the data access unit according to the index vector stored during the forward operation to obtain an output gradient vector.

Regarding avgpooling, in a forward operation, the operation module 4 accumulates each input vector successively, then multiplies by 1/kernel_size to obtain an output vector, where kernel_size represents the size of the pooling kernel; the operation module 4 cyclically reads an input vector of a new kernel, performs the above-mentioned accumulation and multiplication to obtain an output vector of the new kernel until the end of the pooling operation of this layer.

Regarding avgpooling, in a backward training, the operation module multiplies an input gradient vector by 1/kernel_size, and outputs the input gradient vector to a corresponding storage position through the data access unit to obtain an output gradient vector.

Regarding the device that performs a pooling operation, the data dependency determination unit is configured to determine whether there is dependency between a control signal that has not been executed and data of a control signal that is being executed. If there is no dependency, the control signal group is allowed to be issued immediately; otherwise, the control signal group is not allowed to be issued until all control signals on which the control signal group is dependent have been executed.

The present disclosure provides a method of performing a pooling operation of a single-layer artificial neural network, which includes:

reading an instruction and caching the instruction;

decoding the instruction into a control signal, and distributing the control signal to the operation module for performing the pooling operation; and performing, by the operation module, an operation of finding a maximum of a maxpooling operation, or performing accumulation and multiplication of an avgpooling operation.

Regarding maxpooling, in a forward operation, the method includes: sequentially comparing, by the operation module, the size of each input vector, and taking a maximum to obtain an output vector.

Regarding maxpooling, in the forward operation, the method includes: cyclically reading, by the operation module, input vectors of a pooling kernel, performing the above-mentioned size comparison operation, obtaining a new output vector of the kernel, and saving an index vector corresponding to each output vector until the pooling operation of the current layer ends.

Regarding maxpooling, in a backward training, the method includes: outputting, by the operation module, an input gradient vector to a corresponding storage position through the data access unit according to the index vector stored during the forward operation to obtain an output gradient vector.

Regarding avgpooling, in a forward operation, the method includes: accumulating, by the operation module, each input vector successively, then multiplying by 1/kernel_size to obtain an output vector, where kernel_size represents the size of the pooling kernel; cyclically reading, by the operation module, an input vector of a new kernel, performing the above-mentioned accumulation and multiplication to obtain an output vector of the new kernel until the end of the pooling operation of this layer.

Regarding avgpooling, in a backward training, the method includes: multiplying, by the operation module, an input gradient vector by 1/kernel_size, and outputting the input gradient vector to a corresponding storage position through the data access unit to obtain an output gradient vector.

The present disclosure provides a method of performing a pooling operation of a multi-layer artificial neural network, which includes:

after the execution of a previous layer in the multi-layer artificial neural network is completed, using, by an operation instruction of a next layer, an output neuron vector or output gradient vector computed by an operation module as an input neuron vector or input gradient vector for the training of the next layer; performing, by the next layer, a computation according to the method.

The present disclosure provides a device for performing a batch normalization operation, which includes an instruction storage unit, a controller unit, a data access unit, and an operation module.

The instruction storage unit is configured to read an instruction via the data access unit and cache the instruction.

The controller unit is configured to read the instruction from the instruction storage unit and decode the instruction into a micro-instruction for controlling the behavior of other units or modules, and distribute the micro-instruction to the units or modules respectively.

The data access unit is configured to access external address space, and complete the loading and storing of data.

The operation module is configured to perform a forward process or backward process of a batch normalization operation.

The operation module includes an operation unit, a data dependency determination unit, a neuron caching unit, and an intermediate value caching unit.

The operation unit is configured to receive a micro-instruction sent by the controller unit and perform an arithmetic logic operation.

The data dependency determination unit is configured to read/write the neuron caching unit to ensure that there is no consistency conflict between the reading and writing of data used by instructions.

The neuron caching unit is configured to cache input neuron data and output neuron data.

The intermediate value caching unit is configured to cache intermediate value data required in a computational process of the operation module.

The operation unit is configured to perform the following computational process in a forward process of a batch normalization operation:

$$y=f(x)=\text{alpha}*(x-E[x])/\text{sqrt}(\text{var}(x)+eps)+\text{beta}.$$

X denotes input neuron data; y denotes output neuron data; alpha and beta denote learning parameters which update constantly during a backward training and are used in a formula of computing output neuron data y; a minimal constant eps; a mean value E[x] denoting an average value of the neuron data x of the input data where E[x] is obtained by taking the size of a batch as a total amount; and var[x] denotes a variance of corresponding input neuron data x where var[x] is obtained by taking the size of a batch as a total amount.

The operation unit is configured to perform the following computational process in a backward process of a batch normalization operation:

it is assumed that a gradient introduced by a pixel is dl/dY, a gradient output by the backward process is dl/dx, an output of the forward process is Y, and other parameters denote the similar meaning as those of the forward process. A gradient that is output after the batch normalization backward propagation is dl/dx=(alpha/sqrt(var(x)+eps))*(dl/dY−mean(dl/dY)−mean(dl/dY*Y)*Y), where mean denotes an operation of finding a mean. A gradient of the learning parameter alpha is dl/dalpha=(Σdl/dY)*Y. A gradient of the learning parameter beta is dl/dbeta=Σdl/dY. Values of the learning parameters are updated according to the two gradients.

The present disclosure provides a method of performing a batch normalization operation, which includes:

reading and caching the instruction by an instruction storage unit;

decoding the instruction into a micro-instruction for controlling an operation module;

and using the operation module to perform a forward process or backward process of a batch normalization operation.

The operation module uses a neuron caching unit to cache input neuron data and output neuron data, and uses an intermediate value caching unit to cache intermediate value data required in a computational process.

The operation unit is configured to perform the following computational process in a forward process of a batch normalization operation:

$$y=f(x)=\text{alpha}*(x-E[x])/\text{sqrt}(\text{var}(x)+eps)+\text{beta}.$$

X denotes input neuron data; y denotes output neuron data; alpha and beta denote learning parameters which update constantly during a backward training and are used in a formula of computing output neuron data y; a minimal constant eps; a mean value E[x] denoting an average value of the neuron data x of the input data where E[x] is obtained by taking the size of a batch as a total amount; and var[x] denotes a variance of corresponding input neuron data x where var[x] is obtained by taking the size of a batch as a total amount.

It is assumed that a gradient introduced by a pixel is dl/dY, a gradient output by the backward process is dl/dx, an output of the forward process is Y, and other parameters denote the similar meaning as those of the forward process. A gradient that is output after the batch normalization backward propagation is dl/dx=(alpha/sqrt(var(x)+eps))*(dl/dY−mean(dl/dY)−mean(dl/dY*Y)*Y), where mean denotes an operation of finding a mean. A gradient of the learning parameter alpha is dl/dalpha=(Σdl/dY)*Y. A gradient of the learning parameter beta is dl/dbeta=Σdl/dY. Values of the learning parameters are updated according to the two gradients.

The present disclosure provides a device for performing neural network operations and matrix/vector operations, which includes a storage unit, a register unit, a control unit, an operation unit, and a scratchpad memory.

The storage unit is configured to store a neuron/matrix/vector.

The register unit is configured to store a neuron address/matrix address/vector address. The neuron address is an address in the storage unit where the neuron is stored. The matrix address is an address in the storage unit where the matrix is stored. The vector address is an address in the storage unit where the vector is stored.

The control unit is configured to perform a decoding operation, read an instruction, and control each unit or module according to the instruction.

The operation unit is configured to obtain the neuron address/matrix address/vector address from the register unit according to the instruction, then obtain a corresponding neuron/matrix/vector in the storage unit according to the neuron address/matrix address/vector address, and perform an operation on data of the obtained neuron/matrix/vector to obtain an operation result.

The neuron/matrix/vector data participating in the computation of the operation unit is temporarily stored in the scratchpad memory and is read by the operation unit from the scratchpad memory when needed.

The scratchpad memory can support neuron/matrix/vector data of different sizes.

The register unit is a scalar register for storing scalars during a computational process.

The operation unit includes a vector multiplication component, an accumulation component, and a scalar multiplication component.

The operation unit is configured to perform a neural network/matrix/vector operation of the device. The operation includes a forward operation of a convolution neural network, a training operation of a convolution neural network, a pooling operation of a neural network operation, a forward operation of a full connection neural network, a training operation of a full connection neural network, a batch normalization operation, a RBM neural network operation, a matrix-vector multiplication operation, a matrix-matrix addition/subtraction operation, a vector outer product operation, a vector inner product operation, vector four basic arithmetic operations, a vector logic operation, a vector transcendental function operation, a vector comparison operation, an operation of finding a maximum/minimum of a vector, a vector circular shift operation, and an operation to generate a random vector that has a certain distribution.

The device further includes an instruction caching unit configured to store an operation instruction to be executed. Preferably, the instruction caching unit is a reordering cache.

The device further includes an instruction queue configured to cache a decoded instruction in order, and send the decoded instruction to a dependency processing unit.

The device further includes a dependency processing unit and a storage queue. The dependency processing unit is configured to determine whether the operation instruction and a previous operation instruction access the same neuron/matrix/vector storage address before the operation unit fetches the instruction. If the operation instruction and the previous operation instruction access the same neuron/matrix/vector storage address, the dependency processing unit stores the operation instruction in the storage queue; otherwise, the dependency processing unit directly provides the operation instruction to the operation unit, and after the previous operation instruction is executed, provides the operation instruction in the storage queue to the operation unit. The storage queue is configured to store an instruction that has dependency on data of a previous instruction, and submit the instruction after the dependency is eliminated.

An instruction set of the device adopts a Load/Store structure. The operation unit does not operate on the data in a memory.

Preferably, the instruction set of the device adopts a VLIW (very long instruction word) architecture, and includes instructions with a fixed-length.

An operation instruction executed by the operation unit includes at least one opcode and at least 3 operands. The opcode is for indicating a function of the operation instruction, and the operation unit performs different operations by identifying one or more opcodes. The operands are for indicating data information of the operation instruction, where the data information is an immediate or a register number.

Preferably, when the operation instruction is a neural network operation instruction, the neural network operation instruction includes at least one opcode and 16 operands.

Preferably, when the operation instruction is a matrix-matrix operation instruction, the matrix-matrix operation instruction includes at least one opcode and at least 4 operands.

Preferably, when the operation instruction is a vector operation instruction, the vector operation instruction includes at least one opcode and at least 3 operands.

Preferably, when the operation instruction is a matrix-vector operation instruction, the matrix-vector operation instruction includes at least one opcode and at least 6 operands.

The present disclosure provides a device for performing neural network operations and matrix/vector operations, which includes:

an instruction fetching module configured to fetch a next instruction to be executed from an instruction sequence and send the instruction to a decoding module;

the decoding module configured to decode the instruction and send the decoded instruction to an instruction queue;

the instruction queue configured to sequentially cache the instruction decoded by the decoding module and send it to a dependency processing unit;

a scalar register to be used during operations;

the dependency processing unit configured to determine whether there is data dependency between a current instruction and a previous instruction, and if there is data dependency, store the current instruction in a storage queue;

the storage queue configured to cache the current instruction that has data dependency on the previous instruction, and issue the current instruction after the dependency between the current instruction and the previous instruction is eliminated;

a reordering cache configured to cache an instruction when the instruction is being executed, and after the execution is completed, determine whether the instruction is an earliest instruction among unsubmitted instructions in the reordering cache, if the instruction is the earliest instruction, submit the instruction;

an operation unit configured to perform all neural network operations and matrix/vector operations;

a scratchpad memory configured to temporarily store neuron/matrix/vector data participating in the computation of the operation unit, where the data is read by the operation unit when needed, and the scratchpad memory supports data of different sizes; and an IO memory access module configured to directly access the scratchpad memory and read/write data from/in the scratchpad memory.

The present disclosure provides a method of performing neural network operations and matrix/vector instructions, which includes:

a step S1, fetching, by an instruction fetching module, a neural network operation and matrix/vector instruction, and sending the instruction to a decoding module;

a step S2, decoding the instruction by the decoding module, and sending the instruction to an instruction queue;

a step S3, in the decoding module, sending the instruction to an instruction receiving module;

a step S4, sending, by the instruction receiving module, the instruction to a micro-instruction decoding module for micro-instruction decoding;

a step S5, obtaining, by the micro-instruction decoding module, a neural network opcode and a neural network operation operand of the instruction from a scalar register, and at the same time decoding the instruction into a micro-instruction for controlling each functional component, and sending the micro-instruction to a micro-instruction issuing queue;

a step S6, after obtaining required data, sending the instruction to the dependency processing unit; analyzing, by a dependency processing unit, whether there is data dependency between the instruction and a previous instruction that has not been executed; if there is data dependency, the instruction waits in a storage queue until it no longer has data dependency on the previous instruction that has not been executed;

a step S7: sending the micro-instruction corresponding to the instruction to an operation unit; and a step S8, fetching, by the operation unit, required data from a scratchpad memory according to an address and a size of the required data, and then performing a neural network operation and/or matrix/vector operation corresponding to the instruction in the operation unit.

The present disclosure provides a data distribution device based on a fractal tree network structure, which includes:

a central node which serves as a communication data center of an on-chip network and is configured to broadcast or multicast communication data to a plurality of leaf nodes;

the plurality of leaf nodes which serve as communication data nodes of the on-chip network and are configured to transfer communication data to the central nodes; and a repeater module configured to connect the central node and the plurality of leaf nodes, and retransmit communication data.

The plurality of leaf nodes are divided into N groups. Each group includes the same count of leaf nodes. The central node is communicatively connected to each group of leaf nodes through the repeater module separately. A communication structure formed by each group of leaf nodes is self-similar. The plurality of leaf nodes and the central node are communicatively connected as a complete n-ary tree through a plurality of layers of the repeater modules.

Each node includes a local scratchpad structure which is configured to store a subset of distribution data of the central node.

Each leaf node has an identifier (id). The serial number of id sequentially increases from a topological side of the complete n-ary tree.

The data distribution device share a clock signal.

The repeater module includes a local scratchpad structure which is configured to store data.

The present disclosure provides a data distribution method using the data distribution device. When the method is used, communication data is distributed to the plurality of leaf nodes through the central node. During the process, after a data sender is ready to send data, the sender sends a data valid signal and puts the data in a bus; after a data receiver is ready to receive the data, the receiver sends a signal indicating being ready to receive data; when both the data valid signal and the signal indicating being ready to receive data are detected, the data sender acknowledges that the data has been sent and received by the data receiver.

When communication data is broadcast from the central node to the plurality of leaf nodes, first, based on a handshake protocol, the data is transferred from the central node and then temporarily stored in the local caches of the repeater modules which are directly connected to the central node. After each successful handshake, the data is transferred and temporarily stored in the local cache of an intermediate repeater module in a next layer. Finally, the data is input to repeater modules directly connected to the leaf nodes, and the repeater modules separately distribute the data to the groups of leaf nodes that are connected to the repeater modules.

If the handshake protocol between a data sender and a data receiver is successful at a next clock tick, the data is transferred by means of pipeline into the data receiver's local cache for storage. If the handshake protocol is unsuccessful, the data is stored in the local cache of a current layer. The current layer then serves as the data receiver of a previous layer, and stops sending a signal indicating being ready to receive data, so that the data in the local cache of the current layer stops updating. The data is kept in the current layer until the handshake protocol succeeds.

When communication data is multicast from the central node to the plurality of leaf nodes, first, based on a handshake protocol, the data is transferred from the central node and then temporarily stored in the local caches of the repeater modules which are directly connected to the central node. After each successful handshake, the data is transferred and temporarily stored in the local cache of an intermediate repeater module in a next layer. Finally, the data is input to repeater modules directly connected to the leaf nodes, and the repeater modules separately distribute the data to the groups of leaf nodes that are connected to the repeater modules.

When receiving data, each of the leaf nodes selects data of a preset bandwidth according to a corresponding id of the leaf node.

The present disclosure provides a computation device for sparsely connected artificial neural networks, which includes:

a mapping unit configured to convert input data into a storage mode in which input neurons and weights are in a one-to-one correspondence, and store them in a storage device and/or cache;

the storage device configured to store data and instructions; and an operation unit configured to perform a corresponding operation on the data according to an instruction stored in the storage device, where the operation unit mainly performs a three-step operation: step 1, multiplying the input neurons and the weights; step 2, performing an adder tree operation where the weighted output neurons processed in the step 1 are subject to a stage-by-stage summation in the adder tree, or adding a bias to the output neurons to obtain biased output neurons; and step 3, performing an activation function operation to obtain final output neurons.

The one-to-one correspondence in the mapping unit is expressed as follows.

The First Instance:

using 1 to represent connection, 0 to represent connectionless, and a character string of 0 and 1 formed with the connection state between each output and all inputs to represent connection relations of the output; or using 1 to represent connection, 0 to represent connectionless, and a character string of 0 and 1 formed with the connection state between each input and all outputs to represent connection relations of the input.

The Second Instance:

using a distance from a position of a first connection of an output to a first input neuron, a distance from a second input neuron of the output to a previous input neuron, a distance from a third input neuron of the output to a previous input neuron . . . in a similar fashion, until all inputs of the output are exhausted, so as to represent connection relations of the output.

The artificial neural network computation device further includes a DMA configured to read/write data or instructions in the storage device and the cache.

The artificial neural network computation device further includes:

an instruction cache configured to store special-purpose instructions; and a control unit configured to read the special-purpose instructions from the instruction cache, and decode them into instructions for the operation unit.

The artificial neural network computation device further includes:

an input neuron cache configured to cache input neuron data that is input to the operation unit; and a weight cache configured to cache weight data.

The artificial neural network computation device further includes:

an output neuron cache configured to cache output neurons that are output by the operation unit; and a mapping unit configured to convert input data into a storage mode in which input neurons and weights are in a one-to-one correspondence and output them to the operation unit instead of storing them in a storage device.

The artificial neural network computation device further includes an input neuron cache and/or a weight cache. The input neuron cache is configured to cache input neuron data that is input into the operation unit. The weight cache is configured to cache weight data. The mapping unit is configured to convert input data into a storage mode in which input neurons and weights are in a one-to-one correspondence, and output them into the input neuron cache and/or the weight cache.

An activation function performed by the operation unit in the step 3 may be a sigmoid function, a tan h function, or a ReLU function.

The present disclosure provides a computation method of sparsely connected artificial neural networks, which includes:

a step 1, converting input data into a storage mode in which input neurons and weights are in a one-to-one correspondence, where the correspondence is expressed as:

a first instance:

using 1 to represent connection, 0 to represent connectionless, and a character string of 0 and 1 formed with the connection status between each output and all inputs to represent connection relations of the output; or using 1 to represent connection, 0 to represent connectionless, and a character string of 0 and 1 formed with the connection state between each input and all outputs to represent connection relations of the input.

a second instance:

using a distance from a position of a first connection of an output to a first input neuron, a distance from a second input neuron of the output to a previous input neuron, a distance from a third input neuron of the output to a previous input neuron . . . in a similar fashion, until all inputs of the output are exhausted, so as to represent connection relations of the output;

a step 2, multiplying the input neurons and the weight data;

a step 3, performing an adder tree operation where the weighted output neurons processed in the step 1 are subject to a stage-by-stage summation in the adder tree, or a bias is added to the output neurons to obtain biased output neurons; and a step 4, performing an activation function operation to obtain final output neurons, where the activation function may be a sigmoid function, a tan h function, or a ReLU function.

The present disclosure provides a neural network processing system including:

at least one on-chip storage medium configured to store data transferred from the external of the neural network processing system or to store data generated during the processing;

at least one on-chip address index module configured to map to a correct storage address according to an index of input when performing an operation;

a multi-core processing module which is composed of a plurality of core processing modules and is configured to perform a vector multiply-add operation of a neural network operation; and at least one ALU module configured to obtain input data from the multi-core processing module or the on-chip storage medium to perform non-linear operations that cannot be completed by the multi-core processing module.

The plurality of core processing modules share the on-chip storage medium and the ALU module, or the plurality of core processing modules have independent on-chip storage media and ALU modules.

The data generated during the processing includes a result of the processing or an intermediate operation result.

When the neural network processing system performs processing, the same input neuron is sent to the plurality of core processing modules, and different input weights are assigned to different core processing modules. The plurality of core processing modules perform vector inner product operations on the input neuron and the input weights respectively to obtain different output neurons.

When the neural network processing system performs a two-dimensional or multi-dimensional operation, an input feature map is sent to the plurality of core processing modules, and each of the plurality of core processing modules processes a layer of an output feature map.

When the neural network processing system performs a two-dimensional or multi-dimensional operation, an input feature map is sent to the plurality of core processing modules, and each of the plurality of core processing modules processes a different area of an output feature map.

After each of the plurality of core processing modules completes processing the current output feature map, the multi-core processing module processes a new output feature map.

When the neural network processing system performs a one-dimensional operation, the same input is sent to the plurality of core processing modules respectively, and the plurality of core processing modules respectively process different output neurons. After each of the plurality of core processing modules completes processing the current output neurons, the multi-core processing module processes new input.

The plurality of core processing modules of the multi-core processing module may be isomorphic or heterogeneous.

The Present Disclosure Provides a Neural Network Processing Method Including:

- mapping, by an on-chip address index module, to a correct storage address according to an index of input;
- obtaining input data from an on-chip storage medium according to the storage address;
- sending the input data to a multi-core processing module or the ALU module;

performing, by the multi-core processing module, a vector multiply-add operation of the neural network operation, and performing, by the ALU module, a non-linear operation that cannot be completed by the multi-core processing module according to a processing result of the multi-core processing module or the input data obtained from the on-chip storage medium; and storing data generated during processing in the on-chip storage medium.

The Method Further Includes:

sending the same input neuron to a plurality of core processing modules separately, and assigning different input weights to different core processing modules; performing, by the plurality of core processing modules, vector inner product operations on the input neuron and the input weights to obtain different output neurons.

The present disclosure provides a device which is configured to perform a forward operation of an artificial neural network and supports discrete data representation. The device includes an instruction caching unit, a controller unit, a data access unit, an interconnection module, a primary operation module, and a plurality of secondary operation modules.

The instruction caching unit is configured to read in an instruction through the data access unit and cache the instruction.

The controller unit is configured to read the instruction from the instruction caching unit, and decode instruction into a micro-instruction for controlling the behavior of the interconnection module, the primary operation module, and the secondary operation modules.

The data access unit is configured to write discrete data or continuous data from external address space to corresponding data caching units of the primary operation module and each of the secondary operation modules, or read discrete data or continuous data from the data caching units to the external address space.

At a stage when the forward operation of each layer of the neural network starts, the primary operation module transfers discrete or continuous input neuron vectors of this layer to all the secondary operation modules through the interconnection module. After the secondary modules finish their computations, the interconnection module splices discrete or continuous output neuron values of each secondary operation module layer by layer to obtain an intermediate result vector. During the process above, when the input data is a mixture of discrete data and continuous data, the secondary operation modules adopt corresponding preset computation methods for different discrete data.

The primary operation module is configured to complete a subsequent computation using the intermediate result vector. When the input data is a mixture of discrete data and continuous data, the primary operation module adopts corresponding preset computation method for different discrete data.

The discrete data representations refer to presenting real continuous data with specific discrete numbers.

The plurality of secondary operation modules are configured to use the same discrete or continuous input neuron vectors and different discrete or continuous weight vectors of each secondary operation module to compute their discrete or continuous output neuron values in parallel.

The primary operation module is configured to perform any of the following operations on the intermediate result vector:

an operation of adding a bias, in other words, to add a bias to the intermediate result vector;

an operation of activating the intermediate result vector, where an activation function active is any one of the non-linear functions: sigmoid, tan h, relu, and softmax, or a linear function;

a sampling operation, in other words, to compare the intermediate result vector with a random number, if the intermediate result vector is greater than the random number, output 1;

and if the intermediate result vector is less than the random number, output 0; or a pooling operation, including maximum pooling or average pooling.

Each of the secondary operation module includes an input neuron caching unit which is configured to cache discrete or continuous input neuron vectors.

The interconnection module forms a data channel for continuous or discrete data between the primary operation module and the plurality of secondary operation modules.

The primary operation module includes an operation unit, a data dependency determination unit, and a neuron caching unit.

The neuron caching unit is configured to cache discrete or continuous input data and output data used by the primary operation module during computations.

The operation unit is configured to complete various computational functions of the primary operation module. When input data is a mixture of discrete data and continuous data, the operation unit adopts corresponding preset computation method for different discrete data.

The data dependency determination unit is a port for the operation unit to read/write the neuron caching unit, so as to ensure that there is no consistency conflict in reading continuous or discrete data from and writing continuous or discrete data to the neuron caching unit. The data dependency determination unit is configured to read an input continuous or discrete neuron vector from the neuron caching unit, and send the vector to the secondary operation modules through the interconnection module.

An intermediate result vector from the interconnection module is sent to the operation unit.

Each secondary operation module includes an operation unit, a data dependency determination unit, a neuron caching unit, and a weight caching unit.

The operation unit is configured to receive the micro-instruction sent by the controller unit and perform an arithmetic logic operation. When the input data is a mixture of discrete data and continuous data, the operation unit adopts corresponding preset computation method for different discrete data.

The data dependency determination unit is configured to read/write the neuron caching unit which supports discrete data representations and the weight caching unit which supports discrete data representations during computations, and to ensure that there is no consistency conflict in reading and writing the neuron caching unit which supports discrete data representations and the weight caching unit which supports discrete data representations.

The neuron caching unit is configured to cache data of an input neuron vector and cache an output neuron value obtained by the secondary operation module.

The weight caching unit is configured to cache a weight vector in a discrete or continuous representation required by the secondary operation module in the computation process.

The data dependency determination unit may ensure that there is no consistency conflict in reading and writing by the following method: determining whether there is dependency between a micro-instruction that has not been executed and data of a micro-instruction that is being executed. If there is no dependency, the micro-instruction is allowed to be issued immediately; otherwise, the micro-instruction is not allowed to be issued until all micro-instructions on which the micro-instruction is dependent have been executed.

Each of the operation units in the primary operation module or the secondary operation modules includes an operation decision unit and a mixed data operation unit. When input data is mixed data, the operation decision unit decides what kind of operation should be performed on the mixed data according to discrete data in the mixed data, and then, the mixed data operation unit performs a corresponding operation according to a decision result of the operation decision unit.

Each of the operation units in the primary operation module or the secondary operation modules further includes a data type determination unit and at least one of a discrete data operation unit and a continuous data operation unit. When input data is all discrete data, the discrete data operation unit performs a corresponding operation on the input discrete data by means of a look-up table. When the input data is all continuous data, the continuous data operation unit performs a corresponding operation.

Each of the operation units in the primary operation module or the secondary operation modules further includes a continuous/discrete data conversion unit. The continuous/discrete data conversion unit includes a pre-processing module, a distance computation module, and a determination module. It is assumed that there are M discrete data ($M=2m$, $m\geq 1$), and M discrete data correspond to M values in a preset range [−zone, zone].

The pre-processing module pre-processes input continuous data x by using a clip (−zone, zone) operation to obtain pre-processed data y in the range [−zone, zone], where if $x<-zone$, then $y=-zone$; if $x\geq zone$, then $y=zone$; if $-zone<x<zone$, then the pre-processed data $y=x$;

the distance computation module computes a distance between the pre-processed data y and the above values; and the determination module computes and outputs discrete data according to the distance.

The Above Also Includes One or More of the Following:

- the preset range [−zone, zone] being [−1,1] or [−2,2];
- absolute values of the M values are reciprocals of the power of 2; or the determination module performs the following steps:
- outputting discrete data corresponding to a value nearest to the pre-processed data y, if there are two values that are in equal distance to the pre-processed data, outputting discrete data corresponding to any one of the two values; or
- computing a normalization probability of the pre-processed data y to any one of two nearest values, and comparing a normalization probability of any one of the two nearest values and a random number z which is in the range of (0, 1) and is generated by a random number generation module, and if z is less than the probability, outputting the discrete data, otherwise, outputting the other discrete data.

The present disclosure provides a method of performing a forward operation of a single-layer artificial neural network by using a device for performing a forward operation. The method includes:

reading, by a data access unit, all artificial neural network operation instructions related to the forward operation of a current layer of the artificial neural network from external address space, and caching the instructions in an instruction caching unit;

reading, by a continuous/discrete data conversion module, continuous data of the current layer of the neural network that needs to be converted from the external address space, converting the continuous data into discrete data, and storing the discrete data back to the external address space;

reading, by the data access unit, all discrete or continuous data related to the forward operation of the current layer of the artificial neural network required by a primary operation module from the external address space to a neuron caching unit of the primary operation module;

reading, by the data access unit, weight matrix data in a discrete representation or a continuous representation required by a secondary operation module from the external address space;

configuring various constants in a discrete or continuous representation required by the forward operation of the current layer of the neural network;

sending, by the primary operation module, an input neuron vector to each secondary operation module through an interconnection module, and saving the input neuron vector to a neuron caching unit of the secondary operation module that supports a discrete data representation;

reading, by an operation unit of the secondary operation module, a weight vector from a weight caching unit, and reading an input neuron vector from a neuron caching unit of the secondary operation module; if the vectors do not include a discrete data representation, performing a dot product operation on the weight vector and the input neuron vector; if the vectors include a discrete data representation, based on a discrete data operation module, determining a corresponding bit operation according to the value of the discrete data in place of the dot product operation, and returning an obtained neuron value through the interconnection module;

in the interconnection module, splicing neuron values returned by each secondary operation module stage by stage to obtain a complete intermediate result vector;

reading, by the primary operation module, a bias vector in a discrete representation or a continuous representation from the neuron caching unit of the primary operation module, adding the bias vector to the intermediate result vector returned by the interconnection module, activating the addition result to obtain an output neuron vector, and writing the output neuron vector to the neuron caching unit of the primary operation module; and storing, by the data access unit, the output neuron vector in the neuron caching unit of the primary operation module to a specified address in the external address space.

The present disclosure provides a method of performing a batch normalization operation by using a device for performing a forward operation. The method includes:

reading, by a data access unit, all artificial neural network operation instructions related to the batch normalization forward operation from external address space, and caching the instructions in an instruction caching unit;

reading, by a continuous/discrete data conversion module, continuous data of the current layer of the neural network that needs to be converted from the external address space, converting the continuous data into discrete data, and storing the discrete data back to the external address space;

reading, by the data access unit, all discrete or continuous data related to the batch normalization forward operation of the current layer required by a primary operation module from the external address space to a neuron caching unit of the primary operation module;

configuring various constants in a discrete or continuous representation required by the batch normalization forward operation of the current layer;

sending, by the primary operation module, an input neuron vector to each secondary operation module via an interconnection module, and saving the input neuron vector to a neuron caching unit of the secondary operation module that supports a discrete data representation;

reading, by an operation unit of the secondary operation module, a weight vector from a weight caching unit, and reading an input neuron vector from a neuron caching unit of the secondary operation module; for the input vector, computing a mean and a standard deviation in the scale of each batch, and returning an obtained neuron value through the interconnection module;

in the interconnection module, splicing neuron values returned by each secondary operation module stage by stage to obtain a complete intermediate result vector;

reading, by the primary operation module, an input neuron vector in a discrete representation or a continuous representation from the neuron caching unit of the primary operation module, subtracting the input neuron vector by the mean returned by the interconnection module, dividing the difference by the standard deviation to obtain an output neuron vector, and writing the output neuron vector to the neuron caching unit of the primary operation module; and storing, by the data access unit, the output neuron vector in the neuron caching unit of the primary operation module to a specified address in the external address space.

The present disclosure provides a method of performing a forward operation of a multi-layer artificial neural network. The method includes:

for each layer, performing a method in accordance with the method of a forward operation of a single-layer artificial neural network or the method of a batch normalization operation, where after the execution of a previous layer of the artificial neural network, using an output neuron address of the previous layer stored in a primary operation module as an input neuron address of a current layer, and performing the method of a forward operation of a single-layer artificial neural network or the method of a batch normalization operation on the current layer.

The Present Disclosure Provides a Neural Network Operation Device, Including:

- an operation module configured to perform neural network operations; and
- a power conversion module which is connected to the operation module and is configured to convert input neuron data and/or output neuron data of the neural network operations into power neuron data.

In Some Examples, the Power Conversion Module Includes:

- a first power conversion unit configured to convert neuron data output by the operation module into power neuron data; and
- a second power conversion unit configured to convert neuron data input to the operation module into power neuron data.

In some examples, the operation module further includes a third power conversion unit configured to convert power neuron data into non-power neuron data.

In Some Examples, the Neural Network Operation Device Further Includes:

- a storage module configured to store data and operation instructions; and
- a control module configured to control the interaction of data and operation instructions. The control module is configured to receive data and operation instructions sent by the storage module, and decode the operation instructions into operation micro-instructions.

The operation module includes an operation unit configured to receive data and operation micro-instructions sent by the control module, and perform neural network operations on weight data and neuron data received by the operation unit according to the operation micro-instructions.

In some examples, the control module includes: an operation instruction caching unit, a decoding unit, an input neuron caching unit, a weight caching unit, and a data control unit.

The operation instruction caching unit is connected to the data control unit and is configured to receive an operation instruction sent by the data control unit.

The decoding unit is connected to the operation instruction caching unit and is configured to read the operation instruction from the operation instruction caching unit and decode the operation instruction into an operation micro-instruction.

The input neuron caching unit is connected to the data control unit and is configured to obtain corresponding power neuron data from the data control unit.

The weight caching unit is connected to the data control unit and is configured to obtain corresponding weight data from the data control unit.

The data control unit is connected to the storage module, and is configured to realize the interaction of data and operation instructions between the storage module and one of the operation instruction caching unit, the weight caching unit, and the input neuron caching unit.

The operation unit is respectively connected to the decoding unit, the input neuron caching unit, and the weight caching unit. The operation unit receives an operation micro-instruction, power neuron data, and weight data, and then performs a corresponding neural network operation on the power neuron data and the weight data according to the operation micro-instruction.

In some examples, the neural network operation device further includes: an output module which includes an output neuron caching unit configured to receive neuron data output by the operation module.

The Power Conversion Module Includes:

- a first power conversion unit which is connected to the output neuron caching unit and is configured to convert neuron data output by the output neuron caching unit into power neuron data; and
- a second power conversion unit which is connected to the storage module and is configured to convert neuron data input to the storage module into power neuron data.

The operation module further includes: a third power conversion unit which is connected to the operation unit and is configured to convert power neuron data to non-power neuron data.

In some examples, the first power conversion unit is further connected to the data control unit, and is configured to convert neuron data output by the operation module to power neuron data and send the power neuron data to the data control unit. The power neuron data is then used as input data for a next layer of a neural network operation.

In some examples, the power neuron data includes a sign bit and a power bit. The sign bit denotes a sign of the power neuron data. The power bit denotes power bit data of the power neuron data. The sign bit includes data with one bit or more bits. The power bit includes data with m bits where m is a positive integer greater than 1.

In some examples, the neural network operation device further includes a storage module. A coding table is pre-stored in the storage module. The coding table includes power bit data and exponential values, and is used for obtaining a corresponding exponential value of power bit data according to each power bit data of power neuron data.

In some examples, the coding table further includes one or more zero-setting power bit data. Power neuron data corresponding to the zero-setting power bit data is 0.

In some examples, corresponding power neuron data of greatest power bit data is 0, or corresponding power neuron data of smallest power bit data is 0.

In some examples, a correlation of the coding table is that a highest bit of the power bit data represents a zero-setting bit, and the other m−1 bits of the power bit data correspond to the exponential values.

In some examples, a correlation of the coding table is a positive correlation. The storage module pre-stores an integer value x and a positive integer value y. x is a corresponding exponential value of smallest power bit data. x denotes a bias value, and y denotes a stride.

In some examples, x is a corresponding exponential value of smallest power bit data, and 0 is corresponding power neuron data of greatest power bit data. (power bit data+x)*y is a corresponding exponential value of power bit data other than the smallest and the largest power bit data.

In some examples, y=1, a value of x=−2m−1.

In some examples, a correlation of the coding table is a negative correlation. The storage module pre-stores an integer value x and a positive integer value y. x is a corresponding exponential value of greatest power bit data. x denotes a bias value, and y denotes a stride.

In some examples, x is a corresponding exponential value of greatest power bit data, and 0 is corresponding power neuron data of smallest power bit data. (power bit data−x)*y is a corresponding exponential value of power bit data other than the smallest and the largest power bit data.

In some examples, y=1, and a value of x is 2m−1.

In some examples, a process of converting neuron data to power neuron data includes:

$$s_{out}=s_{in}$$

$$d_{out+}=\lfloor \log_2(d_{in+}) \rfloor$$

where $d_{in}$ denotes input data of the power conversion unit, $d_{out}$ denotes output data of the power conversion unit, $s_{in}$ denotes a sign of the input data, $s_{out}$ denotes a sign of the output data, $d_{in+}$ denotes a positive part of the input data $d_{in+}=d_{in}\times s_{in}$, $d_{out+}$ denotes positive part of the output data, $d_{out+}=d_{out}\times s_{out}$, and $\lfloor x \rfloor$ denotes a flooring operation on the data x; or $$s_{out}=s_{in}$$

$$d_{out+}=\lceil \log_2(d_{in+}) \rceil$$

where $d_{in}$ denotes input data of the power conversion unit, $d_{out}$ denotes output data of the power conversion unit, $s_{in}$ denotes a sign of the input data, $s_{out}$ denotes a sign of the output data, $d_{in+}$ denotes a positive of the input data, $d_{in+}=d_{in}\times s_{in}$, $d_{out+}$ denotes a positive part of the output data $d_{out+}=d_{out}\times s_{out}$, $\lceil x \rceil$ denotes a ceiling operation on the data x; or $$s_{out}=s_{in}$$

$$d_{out+}=[\log_2(d_{in+})]$$

where $d_{in}$ denotes input data of the power conversion unit, $d_{out}$ denotes output data of the power conversion unit, $s_{in}$ denotes a sign of the input data, $s_{out}$ denotes a sign of the output data, $d_{in+}$ denotes a positive part of the input data $d_{in+}=d_{in}s_{in}$, $d_{out+}$ denotes a positive part of the output data, $d_{out+}=d_{out}\times s_{out}$, and [x] denotes a rounding operation on the data x.

According to another aspect of the present disclosure, a neural network operation method is provided. The method includes:

performing a neural network operation; and prior to performing the neural network operation, converting input neuron data of the neural network operation to power neuron data; and/or after performing the neural network operation, converting output neuron data of the neural network operation to power neuron data.

In some examples, prior to performing the neural network operation, the step of converting the input neuron data of the neural network operation to power neuron data includes:

converting non-power neuron data in the input data to power neuron data; and receiving and storing an operation instruction, the power neuron data, and weight data.

In some examples, between the step of receiving and storing the operation instruction, the power neuron data, and the weight data, and the step of performing the neural network operation, the method further includes:

reading the operation instruction and decoding the operation instruction to operation micro-instructions.

In some examples, in the step of performing the neural network operation, the method includes performing the neural network operation on the weight data and the power neuron data according to the operation micro-instructions.

In some examples, after performing the neural network operation, the step of converting the output neuron data of the neural network operation to power neuron data includes:

outputting neuron data obtained after the neural network operation; and converting non-power neuron data in the neuron data obtained after the neural network operation to power neuron data.

In some examples, the method includes: converting non-power neuron data in the neuron data obtained after the neural network operation to power neuron data and sending the power data to the data control unit, using the power data as input power neurons of a next layer of the neural network operation; repeating the step of performing the neural network operation and the step of converting non-power neuron data into power neuron data until a last layer of the neural network operation is completed.

In some examples, the method includes: pre-storing an integer value x and a positive integer value y. x denotes a bias value, and y denotes a stride. A power neuron data range representable by the neural network operation device can be adjusted by changing the integer value x and the positive integer value y pre-stored in the storage module.

According to yet another aspect of the present disclosure, a method of using the neural network operation device is provided. A power neuron data range representable by the neural network operation device can be adjusted by changing an integer value x and a positive integer value y pre-stored in a storage module.

According to an aspect of the present disclosure, a neural network operation device is provided. The device includes:

an operation module configured to perform neural network operations; and a power conversion module which is connected to the operation module and is configured to convert input data and/or output data of the neural network operations into power neuron data.

In some examples, the input data includes input neuron data and input weight data. The output data includes output neuron data and output weight data. The power data includes power neuron data and power weight data.

In some examples, the power conversion module includes:

a first power conversion unit configured to convert output data of the operation module into power neuron data; and a second power conversion unit configured to convert input data of the operation module into power neuron data.

In some examples, the operation module further includes a third power conversion unit configured to convert power data into non-power data.

In some examples, the neural network operation device further includes:

a storage device configured to store data and operation instructions; and a control module configured to control the interaction of data and operation instructions. The control module is configured to receive data and operation instructions sent by the storage module, and decode the operation instructions into operation micro-instructions.

The operation module includes an operation unit configured to receive data and operation micro-instructions sent by the control module, and perform neural network operations on weight data and neuron data received by the operation unit according to the operation micro-instructions.

In some examples, the control module includes: an operation instruction caching unit, a decoding unit, an input neuron caching unit, a weight caching unit, and a data control unit.

The operation instruction caching unit is connected to the data control unit and is configured to receive an operation instruction sent by the data control unit.

The decoding unit is connected to the operation instruction caching unit and is configured to read the operation instruction from the operation instruction caching unit and decode the operation instruction into an operation micro-instruction.

The input neuron caching unit is connected to the data control unit and is configured to obtain corresponding power neuron data from the data control unit.

The weight caching unit is connected to the data control unit and is configured to obtain corresponding power weight data from the data control unit.

The data control unit is connected to the storage module, and is configured to realize the interaction of data and operation instructions between the storage module and one of the operation instruction caching unit, the weight caching unit, and the input neuron caching unit.

The operation unit is respectively connected to the decoding unit, the input neuron caching unit, and the weight caching unit. The operation unit receives an operation micro-instruction, power neuron data, and power weight data, and then performs a corresponding neural network operation on the power neuron data and the power weight data according to the operation micro-instruction.

In some examples, the neural network operation device further includes: an output module which includes an output neuron caching unit configured to receive neuron data output by the operation module.

The Power Conversion Module Includes:

a first power conversion unit which is connected to the output neuron caching unit and the operation unit, and is configured to convert neuron data output by the output neuron caching unit into power neuron data and convert power data output by the operation unit to power weight data; and a second power conversion unit which is connected to the storage module and is configured to convert neuron data and weight data that are input to the storage module into power neuron data and power weight data respectively.

The operation module further includes: a third power conversion unit which is connected to the operation unit and is configured to convert power neuron data and power weight data to non-power neuron data and non-power weight data.

In some examples, the first power conversion unit is further connected to the data control unit, and is configured to convert neuron data and weight data that are output by the operation module to power neuron data and power weight data, and send the power neuron data and the power weight data to the data control unit. The power neuron data and the power weight data are then used as input data for a next layer of a neural network operation.

In some examples, the power neuron data includes a sign bit and a power bit. The sign bit denotes a sign of the power neuron data. The power bit denotes power bit data of the power neuron data. The sign bit includes data with one bit or more bits. The power bit includes data with m bits, where m is a positive integer greater than 1.

A value of weight data indicated by the power weight data is expressed as a power exponential value of the weight data value. The power weight data includes a sign bit and a power bit. The sign bit uses one or more bits to indicate the sign of the weight data. The power bit uses m bits to indicate the power bit data of the weight data, where m is a positive integer greater than 1.

In some examples, the neural network operation device further includes a storage module. A coding table is pre-stored in the storage module. The coding table includes power bit data and exponential values, and is used for obtaining a corresponding exponential value of power bit data according to each power bit data of power neuron data and power weight data.

In some examples, the coding table further includes one or more zero-setting power bit data. Power neuron data and power weight data corresponding to the zero-setting power bit data are 0.

In some examples, corresponding power neuron data and power weight data of greatest power bit data is 0, or corresponding power neuron data and power weight data of smallest power bit data is 0.

In some examples, a correlation of the coding table is that a highest bit of the power bit data represents a zero-setting bit, and the other m−1 bits of the power bit data correspond to the exponential values.

In some examples, a correlation of the coding table is a positive correlation. The storage module pre-stores an integer value x and a positive integer value y. x is a corresponding exponential value of smallest power bit data. x denotes a bias value, and y denotes a stride.

In some examples, x is a corresponding exponential value of smallest power bit data, and 0 is corresponding power neuron data and power weight data of greatest power bit data. (power bit data+x)*y is a corresponding exponential value of power bit data other than the smallest and the largest power bit data.

In some examples, y=1, a value of $x=-2^{m-1}$.

In some examples, a correlation of the coding table is a negative correlation. The storage module pre-stores an integer value x and a positive integer value y. x is a corresponding exponential value of greatest power bit data. x denotes a bias value, and y denotes a stride.

In some examples, x is a corresponding exponential value of greatest power bit data, and 0 is corresponding power neuron data and power weight data of smallest power bit data. (power bit data−x)*y is a corresponding exponential value of power bit data other than the smallest and the largest power bit data.

In some examples, y=1, and a value of x is $2^{m-1}$.

In some examples, a process of converting neuron data and weight data to power neuron data and power weight data includes:

$$s_{out}=s_{in}$$

$$d_{out+}=\lfloor \log_2(d_{in+}) \rfloor$$

where $d_{in}$ denotes input data of the power conversion unit, $d_{out}$ denotes output data of the power conversion unit, $s_{in}$ denotes a sign of the input data, $s_{out}$ denotes a sign of the output data, $d_{in+}$ denotes a positive part of the input data $d_{in+}=d_{in}\times s_{in}$, $d_{out+}$ denotes positive part of the output data, $d_{out+}=d_{out}\times s_{out}$, and $\lfloor x \rfloor$ denotes a flooring operation on the data x; or $$s_{out}=s_{in}$$

$$d_{out+}=\lceil \log_2(d_{in+}) \rceil$$

where $d_{in}$ denotes input data of the power conversion unit, $d_{out}$ denotes output data of the power conversion unit, $s_{in}$ denotes a sign of the input data, $s_{out}$ denotes a sign of the output data, $d_{in+}$ denotes a positive of the input data, $d_{in+}=d_{in}\times s_{in}$, $d_{out+}$ denotes a positive part of the output data $d_{out+}=d_{out}\times s_{out}$, $\lceil x \rceil$ denotes a ceiling operation on the data x; or $$s_{out}=s_{in}$$

$$d_{out+}=[\log_2(d_{in+})]$$

where $d_{in}$ denotes input data of the power conversion unit, $d_{out}$ denotes output data of the power conversion unit, $s_{in}$ denotes a sign of the input data, $s_{out}$ denotes a sign of the output data, $d_{in+}$ denotes a positive part of the input data $d_{in+}=d_{in}s_{in}$, $d_{out+}$ denotes a positive part of the output data, $d_{out+}=d_{out}\times s_{out}$, and [x] denotes a rounding operation on the data x.

According to another aspect of the present disclosure, a neural network operation method is provided. The method includes:

performing a neural network operation; and prior to performing the neural network operation, converting input data of the neural network operation to power data; and/or after performing the neural network operation, converting output data of the neural network operation to power data.

In some examples, the input data includes input neuron data and input weight data. The output data includes output neuron data and output weight data. The power data includes power neuron data and power weight data.

In some examples, prior to performing the neural network operation, the step of converting the input data of the neural network operation to power data includes:

converting non-power data in the input data to power data; and receiving and storing an operation instruction and the power data.

In some examples, between the step of receiving and storing the operation instruction and the power data, and the step of performing the neural network operation, the method further includes:

reading the operation instruction and decoding the operation instruction to operation micro-instructions.

In some examples, in the step of performing the neural network operation, the method includes performing the neural network operation on the power weight data and the power neuron data according to the operation micro-instructions.

In some examples, after performing the neural network operation, the step of converting the output data of the neural network operation to power data includes:

outputting data obtained after the neural network operation; and converting non-power data in the data obtained after the neural network operation to power data.

In some examples, the method includes: converting non-power data in the data obtained after the neural network operation to power data and sending the power data to the data control unit, using the power data as input data of a next layer of the neural network operation; repeating the step of performing the neural network operation and the step of converting non-power data into power data until a last layer of the neural network operation is completed.

In some examples, the method includes: pre-storing an integer value x and a positive integer value y. x denotes a bias value, and y denotes a stride. A power data range representable by the neural network operation device can be adjusted by changing the integer value x and the positive integer value y pre-stored in the storage module.

According to yet another aspect of the present disclosure, a method of using the neural network operation device is provided. A power data range representable by the neural network operation device can be adjusted by changing an integer value x and a positive integer value y pre-stored in a storage module.

According to an aspect of the present disclosure, an operation device is provided. The device includes:

an operation control module configured to determine partitioning information; and an operation module configured to partition, transpose, and merge an operation matrix according to the partitioning information to obtain a transposed matrix of the operation matrix.

In some examples, the operation device further includes:

an address storage module configured to store address information of the operation matrix; and a data storage module configured to store the operation matrix and store the transposed matrix after an operation.

The operation control module is configured to fetch the address information of the operation matrix from the address storage module, and obtain the partitioning information according to the address information of the operation matrix by analyzing. The operation module is configured to fetch the address information and the partitioning information of the operation matrix from the operation control module, fetch the operation matrix from the data storage module according to the address information of the operation matrix, and partition, transpose, and merge the operation matrix according to the partitioning information to obtain a transposed matrix of the operation matrix, and then feed the transposed matrix of the operation matrix back to the data storage module.

In some examples, the operation module includes a matrix partitioning unit, a matrix operation unit, and a matrix merging unit.

The matrix partitioning unit is configured to obtain the address information and partitioning information of the operation matrix from the operation control module, fetch the operation matrix from the data storage module according to the address information of the operation matrix, and partition the operation matrix according to the partitioning information to obtain n partitioned matrices.

The matrix operation unit is configured to obtain the n partitioned matrices, and transpose the n partitioned matrices to obtain transposed matrices of the n partitioned matrices.

The matrix merging unit is configured to obtain and merge the transposed matrices of the n partitioned matrices to obtain a transposed matrix of the operation matrix, and feed the transposed matrix of the operation matrix back to the data storage module, where n is a natural number.

In some examples, the operation module further includes a caching unit configured to cache the n partitioned matrices for the matrix operation unit to obtain.

In some examples, the operation control module includes an instruction processing unit, an instruction caching unit, and a matrix determination unit.

The instruction caching unit is configured to store a matrix operation instruction to be executed.

The instruction processing unit is configured to obtain the matrix operation instruction from the instruction caching unit, decode the matrix operation instruction, and obtain address information of the operation matrix from the address storage module according to the decoded matrix operation instruction.

The matrix determination unit is configured to analyze the address information of the operation matrix to obtain the partitioning information.

In some examples, the operation control module further includes a dependency processing unit configured to determine whether the decoded matrix operation instruction and the address information of the operation matrix conflict with a previous operation. If there is a conflict, the decoded matrix operation instruction and the address information of the operation matrix are temporarily stored. If there is no conflict, the decoded matrix operation instruction and the address information of the operation matrix are issued to the matrix determination unit.

In some examples, the operation control module further includes an instruction queue memory configured to cache a decoded matrix operation instruction and address information of an operation matrix that conflict with a previous operation. When the conflict is resolved, the decoded matrix operation instruction and the address information of the operation matrix stored in the instruction queue memory are transferred to the matrix determination unit.

In some examples, the instruction processing unit includes an instruction fetching unit and a decoding unit.

The instruction fetching unit is configured to obtain a matrix operation instruction from the instruction caching unit, and transfer the matrix operation instruction to the decoding unit.

The decoding unit is configured to decode the matrix operation instruction, fetch address information of an operation matrix from the address storage module according to the decoded matrix operation instruction, and transfer the decoded matrix operation instruction and fetched address information of the operation matrix to the dependency processing unit.

In some examples, the device further includes an input/output module configured to input operation matrix data to the data storage module. The input/output module is further configured to obtain a transposed matrix from the data storage module after an operation, and output the transposed matrix after the operation.

In some examples, the address storage module includes a scalar register file or a general memory unit. The data storage module includes a scratchpad memory or a general memory unit. The address information of the operation matrix is starting address information of the matrix and size information of the matrix.

According to another aspect of the present disclosure, an operation method is provided. The method includes:

determining, by an operation control module, partitioning information; and partitioning, transposing, and merging, by an operation module, an operation matrix according to the partitioning information to obtain a transposed matrix of the operation matrix.

In some examples, determining the partitioning information by the operation control module includes:

fetching, by the operation control module, address information of the operation matrix from an address storage module; and obtaining, by the operation control module, the partitioning information according to the address information of the operation matrix.

In some examples, fetching, by the operation control module, the address information of the operation matrix from the address storage module includes:

obtaining an operation instruction by an instruction fetching unit, and transferring the operation instruction to a decoding unit;

decoding, by the decoding unit, the operation instruction, fetching the address information of the operation matrix from the address storage module according to the decoded operation instruction, and transferring the decoded operation instruction and the address information of the operation matrix to a dependency processing unit; and analyzing, by the dependency processing unit, whether there is data dependency between the decoded operation instruction and a previous instruction that has not been executed; if there is data dependency, the decoded instruction and address information of the corresponding operation matrix wait in an instruction queue memory until the decoded operation instruction no longer has data dependency on the previous instruction that has not been executed.

In some examples, partitioning, transposing, and merging, by the operation module, the operation matrix according to the partitioning information to obtain a transposed matrix of the operation matrix includes:

fetching, by the operation module, the operation matrix from the data storage module according to the address information of the operation matrix, and partitioning the operation matrix into n partitioned matrices according to the partitioning information;

transposing, by the operation module, the n partitioned matrices respectively to obtain transposed matrices of the n partitioned matrices; and merging, by the operation module, the transposed matrices of the n partitioned matrices to obtain a transposed matrix of the operation matrix, and feeding the transposed matrix of the operation matrix back to the data storage module, where n is a natural number.

In some examples, merging, by the operation module, the transposed matrices of the n partitioned matrices to obtain the transposed matrix of the operation matrix, and feeding the transposed matrix of the operation matrix back to the data storage module includes:

receiving, by a matrix merging unit, the transposed matrix of each partitioned matrix, when a count of the transposed matrices of the partitioned matrices received by the matrix merging unit reaches a total count of partitioned blocks, merging all the partitioned matrices to obtain the transposed matrix of the operation matrix; feeding the transposed matrix back to a specified address of the data storage module; and directly accessing the data storage module by an input/output module, and reading the transposed matrix of the operation matrix obtained in an operation from the data storage module.

According to an aspect of the present disclosure, a data filtering device is provided. The device includes:

a storage unit configured to store data;

a register unit configured to store an address of the data in the storage unit; and a data filtering module configured to obtain the data address in the register unit, obtain the corresponding data in the storage unit according to the data address, and filter the obtained data to obtain a data filtering result.

In some examples, the data filtering module includes a data filtering unit configured to filter data obtained by the unit.

In some examples, the data filtering module further includes: an I/O unit, an input data caching unit, and an output data caching unit.

The I/O unit is configured to move data stored in the storage unit to the input data caching unit.

The input data caching unit is configured to store data moved by the I/O unit.

The data filtering unit is configured to use data transferred from the input data caching unit as input data, filter the input data, and transfer output data to the output data caching unit.

The output data caching unit is configured to store output data.

In some examples, the input data includes data to be filtered and position information data. The output data includes filtered data, or filtered data and related information thereof.

In some examples, the data to be filtered is a vector or an array. The position information data is a binary code, a vector, or an array. The related information includes a vector length, an array size, and space occupied.

In some examples, the data filtering unit is configured to scan each component of the position information data. If the component is 0, the data filtering unit deletes a component of the data to be filtered corresponding to the component 0; and if the component is 1, the data filtering unit retains a component of the data to be filtered corresponding to the component 1. Optionally, if the component is 1, the data filtering unit deletes a component of the data to be filtered corresponding to the component 1; and if the component is 0, the data filtering unit retains a component of the data to be filtered corresponding to the component 0. After finishing scanning, the data filtering unit obtains and outputs the filtered data.

In some examples, the data filtering module further includes: a structure transformation unit configured to transform a storage structure of input data and/or output data.

Another aspect of the present disclosure provides a data filtering method which uses the data filtering device above to filter data. The method includes:

a step A: obtaining, by the data filtering module, a data address in the register unit;

a step B: obtaining corresponding data in the storage unit according to the data address;

and a step C: filtering the data to obtain a data filtering result.

In some examples, the step A includes: obtaining, by the data filtering unit, an address of data to be filtered and an address of position information data from the register unit.

The step B includes:

a sub-step B1: transferring, by the I/O unit, the data to be filtered and the position information data in the storage unit to the input data caching unit; and a sub-step B2: transferring, by the input data caching unit, the data to be filtered and the position information data to the data filtering unit.

The step C includes: filtering, by the data filtering unit, the data to be filtered according to the position information data, and transferring the output data to the output data caching unit.

In some examples, between the sub-step B1 and the sub-step B2, the method further includes:

determining whether to transform a storage structure, if the storage structure needs to be transformed, performing a sub-step B3; if the storage structure does not need to be transformed, directly performing the sub-step B2;

The sub-step B3 is as follows: transferring, by the input data caching unit, the data to be filtered to the structure transformation unit; and transforming the storage structure by the structure transformation unit, transferring the transformed data to be filtered back to the input data caching unit, and then performing the sub-step B2.

According to an aspect of the present disclosure, a neural network processor is provided. The processor includes: a memory, a scratchpad memory, and a heterogeneous kernel.

The memory is configured to store data and an instruction of a neural network operation.

The scratchpad memory is connected to the memory through a memory bus.

The heterogeneous kernel is connected to the scratchpad memory through a scratchpad memory bus. The heterogeneous kernel is configured to read data and an instruction of a neural network operation through the scratchpad memory, complete the neural network operation, transfer an operation result to the scratchpad memory, and control the scratchpad memory to write the operation result to the memory.

In some examples, the heterogeneous kernel includes:

a plurality of computation kernels of at least two different types which are configured to perform neural network operations or neural network layer operations; and one or a plurality of logic control kernels configured to determine whether a special-purpose kernel and/or a general-purpose kernel execute(s) a neural network operation or a neural network layer operation according to data of the neural network operation.

In some examples, the plurality of computation kernels include x general-purpose kernels and y special-purpose kernels. The special-purpose kernels are dedicated to performing specified neural network/neural network layer operations, and the general-purpose kernels are configured to execute arbitrary neural network/neural network layer operations.

In some examples, the general-purpose kernel is CPU and the special-purpose kernel is NPU.

In some examples, the scratchpad memory includes a shared scratchpad memory and/or a non-shared scratchpad memory. The shared scratchpad memory is correspondingly connected to at least two kernels of the heterogeneous kernel through the scratchpad memory bus. The non-shared scratchpad memory is correspondingly connected to a kernel in the heterogeneous kernel through the scratchpad memory bus.

In some examples, the logic control kernel is connected to the scratchpad memory through the scratchpad memory bus, and is configured to read data of a neural network operation through the scratchpad memory, and determine whether to use the special-purpose kernel and/or the general-purpose kernel as a target kernel to execute a neural network operation and/or a neural network layer operation according to a type and a parameter of a neural network model of data of the neural network operation.

In some examples, the logic control kernel is configured to directly send a signal to the target kernel through a control bus or send a signal to the target kernel through the scratchpad memory, thereby controlling the target kernel to perform the neural network operation and/or the neural network layer operation.

Another aspect of the present disclosure provides a neural network operation method which uses the neural network processor above to perform a neural network operation. The method includes:

reading, by the logic control kernel in the heterogeneous kernel, data and an instruction of a neural network operation from the memory through the scratchpad memory; and according to a type and a parameter of a neural network model of the data of the neural network operation, determining, by the logic control kernel in the heterogeneous kernel, whether the special-purpose kernel and/or the general-purpose kernel execute(s) the neural network operation and/or the neural network layer operation.

In some examples, according to the type and the parameter of the neural network model of the data of the neural network operation, determining, by the logic control kernel in the heterogeneous kernel, whether the special-purpose kernel and/or the general-purpose kernel execute(s) the neural network operation and/or the neural network layer operation includes:

according to the type and the parameter of the neural network model of the data of the neural network operation, determining, by the logic control kernel in the heterogeneous kernel, whether there is a qualified special-purpose kernel;

if a special-purpose kernel m is qualified, the special-purpose kernel m serves as the target kernel, sending, by the logic control kernel in the heterogeneous kernel, a signal to the target kernel, and sending addresses corresponding to the data and the instruction of the neural network operation to the target kernel;

obtaining, by the target kernel, the data and the instruction of the neural network operation from the memory through the shared or non-shared scratchpad memory according to the addresses, performing the neural network operation, and outputting an operation result to the memory through the shared or non-shared scratchpad memory, thereby finishing the operation;

if there is no special-purpose kernel that is qualified, sending, by the logic control kernel in the heterogeneous kernel, a signal to the general-purpose kernel, and sending addresses corresponding to the data and the instruction of the neural network operation to the general-purpose kernel; and obtaining, by the general-purpose kernel, the data and the instruction of the neural network operation from the memory through the shared or non-shared scratchpad memory according to the addresses, performing the neural network operation, and outputting an operation result to the memory through the shared or non-shared scratchpad memory, thereby finishing the operation.

In some examples, the qualified special-purpose kernel refers to a special-purpose kernel that supports a specified neural network operation and is capable of performing an operation on the scale of the specified neural network.

In some examples, according to the type and the parameter of the neural network model of the data of the neural network operation, determining, by the logic control kernel in the heterogeneous kernel, whether the special-purpose kernel and/or the general-purpose kernel execute(s) the neural network operation includes:

parsing, by the logic control kernel in the heterogeneous kernel, the type and the parameter of the neural network model of the data, determining whether there is a qualified special-purpose kernel for each neural network layer respectively, and allocating a corresponding general-purpose kernel or special-purpose kernel to each neural network layer to obtain a kernel sequence corresponding to the neural network layers;

sending, by the logic control kernel in the heterogeneous kernel, the addresses corresponding to the data and the instruction of the neural network layer to the special-purpose kernel or the general-purpose kernel corresponding to the neural network layer, and sending the serial number of a next special-purpose kernel or general-purpose kernel in the kernel sequence to the special-purpose kernel or the general-purpose kernel corresponding to the neural network layer;

reading, by the special-purpose kernel and the general-purpose kernel corresponding to the neural network layer, the data and the instruction of the neural network layer operation from the addresses, performing the neural network layer operation, and transferring an operation result to a designated address of the shared and/or the non-shared scratchpad memory; and controlling, by the logic control kernel, the shared and/or the non-shared scratchpad memory to write the operation result of the neural network layer back to the memory, thereby finishing the operation.

In some examples, the qualified special-purpose kernel refers to a special-purpose kernel that supports a specified neural network layer operation and is capable of performing complete an operation on the scale of the specified neural network layer.

In some examples, the neural network operation includes a spiking neural network operation. The neural network layer operation includes a convolution operation of a neural network layer, a fully connected layer, a splicing operation, an element-wise addition/multiplication operation, a Relu operation, a pooling operation, and/or a Batch Norm operation.

The present disclosure provides a processing device including:

a coarse-grained pruning unit configured to perform a coarse-grained pruning operation on weights of a neural network to obtain pruned weights;

an operation unit configured to train the neural network according to the pruned weights.

The coarse-grained pruning unit is configured to:

select M weights from the weights of the neural network through a sliding window, where M is an integer greater than 1, and when the M weights satisfy a preset condition, set all or part of the M weights to zero.

Further, the preset condition is: the amount of information of the M weights being less than a first preset threshold.

Further, the amount of information of the M weights is an arithmetic mean of absolute values of the M weights, a geometric mean of the absolute values of the M weights, or a maximum value of the M weights. The first preset threshold is a first threshold, a second threshold, or a third threshold. The amount of information of the M weights being less than the first preset threshold includes:

the arithmetic mean of the absolute values of the M weights being less than the first threshold, or the geometric mean of the absolute values of the M weights being less than the second threshold, or the maximum value of the M weights being less than the third threshold.

Further, the coarse-grained pruning unit is configured to repeatedly perform a coarse-grained pruning operation on the weights of the neural network and train the neural network according to the pruned weights until no weight satisfies the preset condition under the premise that precision does not suffer a loss of a preset amount.

Further, the preset amount is x %, where x is between 0 and 5.

Further, the neural network includes a fully connected layer, a convolution layer, and/or a LSTM (long short-term memory) layer. Weights of the fully connected layer are a two-dimensional matrix (Nin, Nout), where Nin denotes a count of input neurons, Nout denotes a count of output neurons, and the fully connected layer has Nin*Nout weights. Weights of the convolution layer are a four-dimensional matrix (Nfin, Nfout, Kx, Ky), where Nfin denotes a count of input feature maps, Nfout denotes a count of output feature maps, (Kx, Ky) is a size of a convolution kernel, and the convolution layer has Nfin*Nfout*Kx*Ky weights. Weights of the LSTM layer are composed of the weights of m fully connected layers, where m is an integer greater than 0. Weights of an $i^{th}$ fully connected layer are (Nin_i, Nout_i), where i is an integer greater than 0 and less than or equal to m. Nin_i denotes a count of input neurons of the weights of the $i^{th}$ fully connected layer, and Nout_i denotes a count of output neurons of the weights of the $i^{th}$ fully connected layer.

When a coarse-grained pruning operation is performed on the weights of the fully connected layer, a size of the sliding window is Bin*Bout, where Bin is an integer greater than 0 and less than or equal to Nin, and Bout is an integer greater than 0 and less than or equal to Nout.

In the case above, the coarse-grained pruning unit is configured to enable the sliding window to slide along a direction of Bin with a stride being Sin, or slide along a direction of Bout with a stride being Sout, where Sin is a positive integer greater than 0 and less than or equal to Bin, and Sout is a positive integer greater than 0 and less than or equal to Bout.

The coarse-grained pruning unit is configured to select M values from the Nin*Nout weights through the sliding window, and when the M weights satisfy the preset condition, set all or part of the M weights to zero, where M=Bin*Bout.

When a coarse-grained pruning operation is performed on the weights of the convolution layer, the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky.

In the case above, the coarse-grained pruning unit is configured to enable the sliding window to slide along a direction of Bfin with a stride being Sfin, or slide along a direction of Bfout with a stride being Sfout, or slide along a direction of Bx with a stride being S, or slide along a direction of By with a stride being Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By.

The coarse-grained pruning unit is configured to select M weights from the Nfin*Nfout*Kx*Ky weights through the sliding window, and when the M weights satisfy the preset condition, set all or part of the M weights to zero, where M=Bfin*Bfout*Bx*By.

When a coarse-grained pruning operation is performed on the weights of the LSTM layer, a size of the sliding window is Bin_i*Bout_i, where Bin_i is an integer greater than 0 and less than or equal to Nin_i, and Bout_i is an integer greater than 0 and less than or equal to Nout_i.

In the case above, the coarse-grained pruning unit is configured to enable the sliding window to slide along a direction of Bin_i with a stride being Sin_i, or slide along a direction of Bout_i with a stride being Sout_i, where Sin_i is a positive integer greater than 0 and less than or equal to Bin_i, and Sout_i is a positive integer greater than 0 and less or equal to Bout_i.

The coarse-grained pruning unit is configured to select M values from the Bin_i*Bout_i weights through the sliding window, and when the M weights satisfy the preset condition, set all or part of the M weights to zero, where M=Bin_i*Bout_i.

Further, the operation unit is configured to use a back propagation algorithm to perform retraining according to a pruned weight.

Further, the processing device further includes:

a quantization unit configured to, after a coarse-grained pruning operation is performed on weights of a neural network and before the neural network is retrained according to the pruned weights, quantize the weights of the neural network and/or perform a first operation on the weights of the neural network so as to reduce a count of bits of the weights of the neural network.

The present disclosure provides an acceleration device including:

a storage unit configured to store input neurons, output neurons of a neural network, pruned neural network weights, and instructions, where the neural network is a trained neural network model obtained by training pruned weights;

a coarse-grained pruning unit configured to perform a coarse-grained pruning operation on the weights of the neural network to obtain the pruned weights, and store the pruned weights in the storage unit;

a coarse-grained selection unit configured to receive the input neurons and the position information of a target weight, and select a corresponding neuron of the target weight, where the target weight is a weight whose absolute value is greater than a second preset threshold; and an operation unit configured to receive the input target weight and the corresponding neuron of the target weight, perform an operation according to the target weight and the corresponding neuron of the target weight, and retransfer the output neuron to the storage unit.

The storage unit is also configured to store an intermediate result generated during the operation process of the operation unit.

Further, the acceleration device further includes:

an instruction control unit configured to receive the instructions, decode the instructions to obtain control information, and control the operation unit according to the control information.

Further, the storage unit is configured to store a target weight and position information of the target weight.

Further, the acceleration device further includes:

a pre-processing unit configured to pre-process original data, and input the pre-processed data into the storage part. The above-mentioned original data includes input neurons, output neurons, and weights.

Further, the pre-processing includes data segmentation, Gauss filtering, binarization, regularization, and/or normalization.

Further, the acceleration device further includes:

an instruction caching unit configured to cache the instruction. The instruction caching unit is an on-chip cache.

Further, the acceleration device further includes:

a target weight caching unit configured to cache the target weight. The target weight caching unit is an on-chip cache.

Further, the acceleration device further includes:

a target weight location caching unit configured to cache the position information of the target weight. The target weight location caching unit is an on-chip cache.

Further, the acceleration device further includes:

an input neuron caching unit configured to cache the input neurons. The input neuron caching unit is an on-chip cache.

Further, the acceleration device further includes:

an output neuron caching unit configured to cache the output neurons. The output neuron caching unit is an on-chip cache.

Further, the target weight location caching unit is configured to cache the position information of the target weight. The target weight location caching unit is configured to make each connection weight in the input data correspond to a corresponding input neuron.

Further, the acceleration device further includes:

a direct memory access (DMA) unit which is in the storage unit and is configured to read/write data from/in the instruction caching unit, the coarse-grained pruning unit, the target weight caching unit, the target weight location caching unit, the input neuron caching unit, or the output neuron caching unit.

Further, the operation unit includes at least one of the following: a multiplier configured to multiply first input data by second input data to obtain data after multiplication; an adder tree configured to add third input data stage by stage in the adder tree, or add the third input data to fourth input data to obtain data after addition; and an activation function operation unit configured to perform an activation function operation on fifth data to obtain output data, where the activation function is a sigmoid, tan h, relu, or softmax function operation.

Further, the operation unit further includes a pooling unit which is configured to perform a pooling operation on sixth input data to obtain output data after pooling operation, where the pooling operation includes: average pooling, max pooling, or median pooling.

The present disclosure provides an acceleration device including:

a storage unit configured to store input neurons, output neurons of a neural network, pruned neural network weights, and instructions, where the neural network is a trained neural network model obtained by training pruned weights;

a coarse-grained pruning unit configured to prune the weights of the neural network to obtain the pruned weights, and store the pruned weights in the storage unit;

an operation unit configured to train the neural network according to the pruned weights to obtain a trained neural network;

a coarse-grained selection unit configured to receive the input neurons and position information of a target weight, and select a corresponding input neuron of the target weight, where the target weight is a weight whose absolute value is greater than a second preset threshold and is a trained weight; and an operation unit configured to receive the input target weight and the corresponding input neuron of the target weight, perform an operation according to the target weight and the corresponding input neuron of the target weight, and retransfer the output neuron to the storage unit.

The storage unit is also configured to store an intermediate result generated during the operation process of the operation unit.

Further, the acceleration device further includes:

an instruction control unit configured to receive the instructions, decode the instructions to obtain control information, and control the operation unit according to the control information.

Further, the storage unit is configured to store a target weight and position information of the target weight.

Further, the acceleration device further includes:

a pre-processing unit configured to pre-process original data and input pre-processed data into the storage part. The above-mentioned original data includes input neurons, output neurons, and weights of the trained neural network.

Further, the pre-processing includes data segmentation, Gauss filtering, binarization, regularization, and/or normalization.

Further, the acceleration device further includes:

an instruction caching unit configured to cache the instructions. The instruction caching unit is an on-chip cache.

Further, the acceleration device further includes:

a target weight caching unit configured to cache the target weight. The target weight caching unit is an on-chip cache.

Further, the acceleration device further includes:

a target weight location caching unit configured to cache the position information of the target weight. The target weight location caching unit is an on-chip cache.

Further, the acceleration device further includes:

an input neuron caching unit configured to cache the input neurons. The input neuron caching unit is an on-chip cache.

Further, the acceleration device further includes:

an output neuron caching unit configured to cache the output neurons. The output neuron caching unit is an on-chip cache.

Further, the target weight location caching unit is configured to cache the position information of the target weight. The target weight location caching unit is configured to make each connection weight in the input data correspond to a corresponding input neuron.

Further, the acceleration device further includes:

a direct access unit DMA which is in the storage unit and is configured to read/write data from/in the instruction caching unit, the coarse-grained pruning unit, the target weight caching unit, the target weight location caching unit, the input neuron caching unit, or the output neuron caching unit.

Further, the operation unit includes at least one of the following: a multiplier configured to multiply first input data by second input data to obtain data after multiplication; an adder tree configured to add third input data stage by stage in the adder tree, or add the third input data to fourth input data to obtain data after addition; and an activation function operation unit configured to perform an activation function operation on fifth data to obtain output data, where the activation function is a sigmoid, tan h, relu or softmax function operation.

Further, the operation unit further includes a pooling unit which is configured to perform a pooling operation on sixth input data to obtain data after pooling operation, where the pooling operation includes: average pooling, max pooling, or median pooling.

The present disclosure provides a processing method including:

performing a coarse-grained pruning operation on weights of a neural network to obtain pruned weights; and training the neural network according to the pruned weights.

The performing a coarse-grained pruning operation on the weights of the neural network to obtain the pruned weights includes:

selecting M weights from the weights of the neural network through a sliding window, where M is an integer greater than 1, and when the M weights satisfy a preset condition, setting all or part of the M weights to zero to obtain the pruned weights.

Further, the preset condition is:

the amount of information of the M weights being less than a first preset threshold.

Further, the amount of information of the M weights is an arithmetic mean of absolute values of the M weights, a geometric mean of the absolute values of the M weights, or a maximum value of the M weights. The first preset threshold is a first threshold, a second threshold, or a third threshold. The amount of information of the M weights being less than the first preset threshold includes:

the arithmetic mean of the absolute values of the M weights being less than the first threshold, or the geometric mean of the absolute values of the M weights being less than the second threshold, or the maximum value of the M weights being less than the third threshold.

Further, the method above may also include:

repeatedly performing a coarse-grained pruning operation on the weights of the neural network and training the neural network according to the pruned weights until no weight satisfies the preset condition under the premise that precision does not suffer a loss of a preset amount.

Further, the preset amount is x %, where x is between 0 and 5.

Further, the neural network includes a fully connected layer, a convolution layer, and/or a LSTM (long short-term memory) layer. Weights of the fully connected layer are a two-dimensional matrix (Nin, Nout), where Nin denotes a count of input neurons, Nout denotes a count of output neurons, and the fully connected layer has Nin*Nout weights. Weights of the convolution layer are a four-dimensional matrix (Nfin, Nfout, Kx, Ky), where Nfin denotes a count of input feature maps, Nfout denotes a count of output feature maps, (Kx, Ky) is a size of a convolution kernel, and the convolution layer has Nfin*Nfout*Kx*Ky weights. Weights of the LSTM layer is composed of the weights of m fully connected layers, where m is an integer greater than 0. Weights of an $i^{th}$ fully connected layer are (Nin Nout_i), where i is an integer greater than 0 and less than or equal to m. Nin_i denotes a count of input neurons of the weights of the $i^{th}$ fully connected layer, and Nout_i denotes a count of output neurons of the weights of the $i^{th}$ fully connected layer. Performing coarse-grained pruning on the neural network includes:

when a coarse-grained pruning operation is performed on weights of a fully connected layer of the neural network, and a size of the sliding window is Bin*Bout, where Bin is an integer greater than 0 and less than or equal to Nin, and Bout is an integer greater than 0 and less than or equal to Nout, sliding, by the sliding window, along a direction of Bin with a stride being Sin, or sliding along a direction of Bout with a stride being Sout, where Sin is a positive integer greater than 0 and less than or equal to Bin, and Sout is a positive integer greater than 0 and less or equal to Bout; and selecting M values from the Nin*Nout weights through the sliding window, and when the M weights satisfy the preset condition, setting all or part of the M weights to zero, where M=Bin*Bout.

When a coarse-grained pruning operation is performed on weights of a convolution layer of the neural network, the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky.

In the case above, performing a coarse-grained pruning operation on the neural network includes: sliding, by the sliding window, along a direction of Bfin with a stride being Sfin, or sliding along a direction of Bfout with a stride being Sfout, or sliding along a direction of Bx with a stride being S, or sliding along a direction of By with a stride being Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By;

selecting M values from the Nfin*Nfout*Kx*Ky weights through the sliding window, and when the M weights satisfy the preset condition, setting all or part of the M weights to zero, where M=Bfin*Bfout*Bx*By.

When a coarse-grained pruning operation is performed on weights of a LSTM layer of the neural network, a size of the sliding window is Bin_i*Bout_i, where Bin_i is an integer greater than 0 and less than or equal to Nin_i, and Bout_i is an integer greater than 0 and less than or equal to Nout_i. Performing a coarse-grained pruning operation on the weights of the LSTM layer of the neural network includes:

sliding, by the sliding window, along a direction of Bin_i with a stride being Sin_i, or sliding along a direction of Bout_i with a stride being Sout_i, where Sin_i is a positive integer greater than 0 and less than or equal to Bin_i, and Sout_i is a positive integer greater than 0 and less or equal to Bout_i;

selecting M values from the Bin_i*Bout_i weights through the sliding window, and when the M weights satisfy the preset condition, setting all or part of the M weights to zero, where M=Bin_i*Bout_i.

Further, training the neural network according to the pruned weights includes: using a back propagation algorithm to retrain the neural network according to the pruned weights.

Further, between performing a coarse-grained pruning operation on the neural network and retraining, the method includes:

quantifying the weights of the neural network and/or performing a first operation on the weights of the neural network so as to reduce a count of bits of the weights of the neural network.

An aspect of the present disclosure provides a neural network operation device. The neural network operation device includes one or a plurality of the above-mentioned acceleration devices, which is configured to obtain data to be operated and control information from another processing device, perform specified neural network operations, and transfer execution results to another processing device through an I/O interface.

When the neural network operation device includes a plurality of the computation devices, the plurality of the computation devices are connected to each other in a specific structure and transfer data to each other, where through an express external device interconnection bus, in other words, a PCIE bus, the plurality of the computation devices are interconnected and transfer data to each other to support large scale neural network operations; the plurality of the computation devices share a same control system, or have separate control systems; the plurality of the computation devices share a memory, or have their own memories; and an interconnection method of the plurality of the computation devices can be any interconnection topology.

The present disclosure provides a neural network chip. The neural network chip includes the above-mentioned processing device, acceleration device and/or neural network operation device.

The present disclosure provides a chip package structure which includes the neural network chip described in the sixth aspect.

The present disclosure provides a board card includes the neural network chip described in the sixth aspect or the chip package structure described in the seventh aspect.

The present disclosure provides an electronic device which includes the board card described in the eighth aspect.

Further, the electronic device includes a data processing device, a robot, a computer, a printer, a scanner, a tablet, a smart terminal, a mobile phone, a traffic recorder, a navigator, a sensor, a webcam, a cloud server, a camera, a video camera, a projector, a watch, a headphone, a mobile storage, a wearable device, a vehicle, a household appliance, and/or a medical equipment.

Further, the vehicle includes an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment includes a nuclear magnetic resonance spectrometer, a B-ultrasonic scanner, and/or an electrocardiograph.

The present disclosure provides a processing device including a storage unit, a coarse-grained selection unit, and an operation unit.

The storage unit is configured to store input neurons, output neurons, weights, and instructions of a neural network.

A coarse-grained pruning unit configured to perform coarse-grained pruning on the weights of the neural network to obtain the pruned weights, and store the pruned weights and position information of a target weight in the storage unit, where the target weight is a weight whose absolute value is greater than a second preset threshold. The coarse-grained pruning unit is further configured to:

select M weights from the weights of the neural network through a sliding window, where M is an integer greater than 1, and and when the M weights satisfy a preset condition, set all or part of the M weights to zero.

The operation unit is configured to performing training according to the pruned weights. During the training process, weights that are set to zero remain zero.

The coarse-grained selection unit is configured to receive input neurons and the position information of the target weight, and select a corresponding input neuron of the target weight according to the position information of the target weight.

The operation unit is configured to finish the neural network operation to obtain an output neuron according to the input target weight and the input neuron corresponding to the target weight, and transfer the output neuron as the input neuron of a next layer to the storage unit.

Further, the preset condition is:

the amount of information of the M weights being less than a first preset threshold.

Further, the amount of information of the M weights is an arithmetic mean of absolute values of the M weights, a geometric mean of the absolute values of the M weights, or a maximum value of the M weights. The first preset threshold is a first threshold, a second threshold, or a third threshold. The amount of information of the M weights being less than the first preset threshold includes:

the arithmetic mean of the absolute values of the M weights being less than the first threshold, or the geometric mean of the absolute values of the M weights being less than the second threshold, or the maximum value of the M weights being less than the third threshold.

Further, the coarse-grained pruning unit and the operation unit are configured to repeatedly performing a coarse-grained pruning operation on the weights of the neural network and training the neural network according to the pruned weights until no weight satisfies the preset condition under the premise that precision does not suffer a loss of a preset amount.

Further, the neural network includes a fully connected layer, a convolution layer, and/or a LSTM (long short-term memory) layer. Weights of the fully connected layer are a two-dimensional matrix (Nin, Nout), where Nin denotes a count of input neurons, Nout denotes a count of output neurons, and the fully connected layer has Nin*Nout weights. Weights of the convolution layer are a four-dimensional matrix (Nfin, Nfout, Kx, Ky), where Nfin denotes a count of input feature maps, Nfout denotes a count of output feature maps, (Kx, Ky) is a size of a convolution kernel, and the convolution layer has Nfin*Nfout*Kx*Ky weights. Weights of the LSTM layer is composed of the weights of m fully connected layers, where m is an integer greater than 0. Weights of an $i^{th}$ fully connected layer are (Nin Nout_i), where i is an integer greater than 0 and less than or equal to m. Nin_i denotes a count of input neurons of the weights of the $i^{th}$ fully connected layer, and Nout_i denotes a count of output neurons of the weights of the $i^{th}$ fully connected layer.

When a coarse-grained pruning operation is performed on the weights of the fully connected layer, a size of the sliding window is Bin*Bout, where Bin is an integer greater than 0 and less than or equal to Nin, and Bout is an integer greater than 0 and less than or equal to Nout.

In the case above, the coarse-grained pruning unit is configured to enable the sliding window to slide along a direction of Bin with a stride being Sin, or slide along a direction of Bout with a stride being Sout, where Sin is a positive integer greater than 0 and less than or equal to Bin, and Sout is a positive integer greater than 0 and less than or equal to Bout.

The coarse-grained pruning unit is configured to select M values from the Nin*Nout weights through the sliding window, and when the M weights satisfy the preset condition, set all or part of the M weights to zero, where M=Bin*Bout.

When a coarse-grained pruning operation is performed on the weights of the convolution layer, the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky.

In the case above, the coarse-grained pruning unit is configured to enable the sliding window to slide along a direction of Bfin with a stride being Sfin, or slide along a direction of Bfout with a stride being Sfout, or slide along a direction of Bx with a stride being S, or slide along a direction of By with a stride being Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By.

The coarse-grained pruning unit is configured to select M weights from the Nfin*Nfout*Kx*Ky weights via the sliding window, and when the M weights satisfy the preset condition, set all or part of the M weights to zero, where M=Bfin*Bfout*Bx*By.

When a coarse-grained pruning operation is performed on the weights of the LSTM layer, a size of the sliding window is Bin_i*Bout_i, where Bin_i is an integer greater than 0 and less than or equal to Nin_i, and Bout_i is an integer greater than 0 and less than or equal to Nout_i.

The coarse-grained pruning unit is configured to enable the sliding window to slide along a direction of Bin_i with a stride being Sin_i, or slide along a direction of Bout_i with a stride being Sout_i, where Sin_i is a positive integer greater than 0 and less than or equal to Bin_i, and Sout_i is a positive integer greater than 0 and less or equal to Bout_i.

The coarse-grained pruning unit is configured to select M values from the Bin_i*Bout_i weights through the sliding window, and when the M weights satisfy the preset condition, set all or part of the M weights to zero, where M=Bin_i*Bout_i.

Further, the processing device includes an instruction control unit configured to receive the instruction, decode the instruction to obtain a control instruction, and control the operation unit according to the control instruction.

Further, the storage unit is configured to store a weight as a target weight and position information of the target weight.

Further, the processing device includes a pre-processing unit configured to pre-process input neurons and weights, and store the pre-processed data in the storage unit.

Further, the pre-processing includes data segmentation, Gauss filtering, binarization, regularization, and/or normalization.

Further, the processing device includes an instruction caching unit configured to cache the instruction.

Further, the processing device includes a target weight caching unit configured to cache target weight data.

Further, the processing device includes a target weight location caching unit configured to cache the position information of the target weight.

Further, the processing device includes an input neuron caching unit configured to cache input neurons.

Further, the processing device includes an output neuron caching unit configured to cache output neurons.

Further, the instruction caching unit, the target weight caching unit, the target weight location caching unit, the input neuron caching unit or the output neuron caching unit is an on-chip cache.

Further, the target weight location caching unit is configured to cache the position information of the target weight.

The target weight location caching unit is configured to make each connection weight in the input data correspond to a corresponding input neuron.

Further, the processing device includes a direct memory access unit (DMA unit) which is in the storage unit and is configured to read/write data or instructions from/in the instruction caching unit, the target weight caching unit, the target weight location caching unit, the input neuron caching unit, or the output neuron caching unit.

Further, the operation unit includes at least one of the following:

a multiplier configured to multiply first input data by second input data to obtain data after multiplication;

one or more adders configured to add third input data; and an activation function operation unit configured to perform an activation function operation on fifth data to obtain output data, where the activation function is a sigmoid, tan h, relu, or softmax function.

Further, the operation unit includes a plurality of adders. The plurality of adders form an adder tree which is configured to add the third input data stage by stage in the adder tree.

Further, the operation unit further includes a pooling unit which is configured to perform a pooling operation on input data to obtain data after pooling operation, where the pooling operation includes: average pooling, max pooling, or median pooling.

Further, the operation unit is further configured to repeatedly train a pruned neural network until no weight is to be set to zero under the premise that precision does not suffer a loss of a preset amount.

The present disclosure provides a data quantization method including:

grouping weights of a neural network;

using a clustering algorithm to cluster each group of weights, dividing a group of weights into m clusters, computing a central weight for each cluster, and replacing weights in each cluster with the central weight, where m is a positive integer; and encoding the central weights to obtain a codebook and a weight dictionary.

Further, the method above further includes:

retraining the neural network, where only the codebook is trained during the retraining, and the content of the weight dictionary remains unchanged.

Further, a back propagation algorithm is used during the retraining.

Further, a way of the grouping includes dividing into a group, grouping according to a layer type, inter-layer grouping, and/or intra-layer grouping.

Further, the clustering algorithm includes K-means, K-medoids, Clara and/or Clarans.

Further, a way of the grouping is dividing into a group, including:

dividing all the weights of the neural network into one group.

Further, the neural network includes i convolution layers, j fully connected layers, and m LSTM (long and short-term memory) layers. The neural network has t different types of layers in total, where i, j, m are all integers greater than or equal to 0, i+j+m≥1, and t is an integer greater than or equal to 1 and t=i+j+m. A way of the grouping is grouping according to a layer type, including:

dividing the weights of the neural network into t groups.

Further, a way of the grouping is the inter-layer grouping, including:

dividing the weights of one or more convolution layers, the weights of one or more fully connected layers, and the weights of one or more LSTM layers in the neural network into respective groups.

Further, a way of the grouping is the intra-layer grouping, including:

in a case where a convolution layer of the neural network is a four-dimensional matrix (Nfin, Nfout, Kx, Ky), where Nfin, Nfout, Kx, Ky are positive integers, Nfin denotes a count of input feature maps, Nfout denotes a count of output feature maps, (Kx, Ky) denotes a size of a convolution kernel, grouping the weights of the convolution layer into Nfin*Nfout*Kx*Ky/(Bfin*Bfout*Bx*By) groups according to a group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky; or in a case where a fully connected layer of the neural network is a two-dimensional matrix (Nin, Nout), where Nin and Nout are positive integers, Nin denotes a count of input neurons, Nout denotes a count of output neurons, and there are Nin*Nout weights, dividing the weights of the fully connected layer into (Nin*Nout)/(Bin*Bout) groups according to a group size of (Bin, Bout), where Bin is a positive integer less than or equal to Nin, and Bout is a positive integer less than or equal to Nout; or using the weights of a LSTM layer of the neural network as a combination of the weights of a plurality of fully connected layers, and the weights of the LSTM layer are composed of the weights of n fully connected layers, where n is a positive integer, and each LSTM layer may be grouped according to the way of grouping of the fully connected layers.

Further, a way of the grouping is dividing into a group, intra-layer grouping, and inter-layer grouping, which includes:

dividing the convolution layers as a group, performing intra-layer grouping on the fully connected layers, and performing inter-layer grouping on the LSTM layers.

Further, a method of selecting the central weight of a cluster is: minimizing a cost function $J(w, w_0)$.

Further, the cost function is:

$$J(w, w_0) = \sum_{i=1}^{n} (w_i - w_0)^2$$

w denotes a weight of a cluster, w0 denotes a central weight of the cluster, n denotes a count of weights in the cluster and is a positive integer, wi denotes an $i^{th}$ weight of the cluster, i is a positive integer, and $1 \leq i \leq n$.

In a twelfth aspect, the present disclosure provides a data quantization device including:

a memory configured to store an operation instruction; and a processor configured to execute the operation instruction in the memory, and operate according to all or part of the quantization method described in the eleventh aspect when executing the operation instruction.

Further, the operation instruction is a binary number which includes an opcode and an address code. The opcode indicates an upcoming operation of the processor, and the address code instructs the processor to read data participating in the operation from an address in the memory.

In a thirteenth aspect, the present disclosure provides a processing device including:

a control unit configured to receive and decode an instruction to generate lookup control information and operation control information;

a lookup table unit configured to receive the lookup control information, a weight dictionary, and a codebook, and perform a table lookup operation on the weight dictionary and the codebook according to the lookup control information to obtain a quantized weight; and an operation unit configured to receive the operation control information and an input neuron, perform an operation on the quantized weight and the input neuron according to the operation control information to obtain an output neuron, and output the output neuron.

Further, the processing device further includes:

a pre-processing unit configured to pre-process input information input from the external to obtain the input neuron, the weight dictionary, the codebook, and the instruction;

a storage unit configured to store the input neuron, the weight dictionary, the codebook, and the instruction, and receive the output neuron;

a caching unit configured to cache the instruction, the input neuron, the output neuron, the weight dictionary, and the codebook; and a direct memory access unit configured to read/write data or instruction in/from the storage unit and the caching unit.

Further, the pre-processing unit may use the following ways to pre-process the input information input by the external: segmentation, Gauss filtering, binarization, regularization, and/or normalization.

Further, the caching unit includes:

an instruction caching unit configured to cache the instruction;

an input neuron caching unit configured to cache the input neuron; and an output neuron caching unit configured to cache the output neuron.

Further, the caching unit further includes:

a weight dictionary caching unit configured to cache the weight dictionary; and a codebook caching unit configured to cache the codebook.

Further, the instruction is a neural network dedicated instruction.

Further, the neural network dedicated instruction includes:

a control instruction configured to control the execution process of a neural network;

a data transfer instruction configured to transfer data between different storage media, of which a data format includes a matrix, a vector, and a scalar;

an operation instruction configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM neural network operation instruction, a LRN neural network operation instruction, a LCN neural network operation instruction, a LSTM neural network operation instruction, a RNN neural network operation instruction, a RELU neural network operation instruction, a PRELU neural network operation instruction, a SIGMOID neural network operation instruction, a TAN H neural network operation instruction, and a MAXOUT neural network operation instruction; and a logic instruction configured to complete a logic operation of the neural network, including a vector logic operation instruction and a scalar logic operation instruction.

Further, the neural network dedicated instruction includes at least one type of Cambricon instruction. The Cambricon instruction includes an opcode and an operand, including:

a Cambricon control instruction configured to control an execution process, including a jump instruction and a conditional branch instruction;

a Cambricon data transfer instruction configured to complete data transfer between different storage media, including a load instruction, a storage instruction, a moving instruction, where the load instruction is configured to load data from a main memory to a cache, the storage instruction is configured to store data from a cache to the main storage, and the moving instruction is configured to move data between caches, or between a cache and a register, or between registers;

a Cambricon operation instruction configured to complete a neural network arithmetic operation, including a Cambricon matrix operation instruction, a Cambricon vector operation instruction, and a Cambricon scalar operation instruction, where the Cambricon matrix operation instruction is configured to complete a matrix operation in the neural network, including a matrix-multiply-vector operation, a vector-multiply-matrix operation, a matrix-multiply-scalar operation, an outer product operation, a matrix-add-matrix operation, and a matrix-subtract-matrix operation; the Cambricon vector operation instruction is configured to complete a vector operation in the neural network, including an elementary arithmetic operation of vectors, a vector transcendental function operation, an inner product operation, a random vector generation operation, and an operation of finding a maximum/minimum value of a vector; and the Cambricon scalar operation instruction is configured to complete a scalar operation in the neural network, including an elementary arithmetic operation of scalars, and a scalar transcendental function operation; and the Cambricon logic instruction is configured to complete a logic operation of the neural network, including a Cambricon vector logic operation instruction and a Cambricon scalar logic operation instruction, where the Cambricon vector logic operation instruction is configured to complete a vector comparison operation, a vector logic operation, and a vector greater-than-merging operation; the vector logic operation includes AND, OR, and NOT operations; and the Cambricon scalar logic operation instruction is configured to complete a scalar comparison operation and a scalar logic operation.

Further, the Cambricon data transfer instruction supports one or more of the following methods of data organization: matrix, vector, and scalar.

The elementary arithmetic operation of vectors includes addition, subtraction, multiplication, and division of vectors.

The vector transcendental function refers to a function of a polynomial equation that cannot take a polynomial as a coefficient, including an exponential function, a logarithmic function, a trigonometric function, and an inverse trigonometric function.

The elementary arithmetic operation of scalars includes addition, subtraction, multiplication, and division of scalars. The scalar transcendental function refers to a function of a polynomial equation that cannot take a polynomial as a coefficient, including an exponential function, a logarithmic function, a trigonometric function, and an inverse trigonometric function.

The vector comparison includes but is not limited to greater than, less than, equal to, greater than or equal to (≥), less than or equal to (≤), and not equal to.

The vector logic operation includes AND, OR, and NOT.

The scalar comparison includes but is not limited to greater than, less than, equal to, greater than or equal to (less than or equal to (and not equal to.

The scalar logic operation includes AND, OR, and NOT.

Further, the storage unit is also configured to store an unquantized weight. The unquantized weight is directly output to the operation unit.

Further, the operation unit includes:

a first operating part configured to multiply the weight by an input neuron; and/or a second operating part which includes one or more adders, where the weight and the input neuron are added through the one or more adders; and/or a third operating part configured to perform a non-linear function operation on the weight and the input neuron, where the non-linear function includes an activation function, and the activation function includes sigmoid, tan h, relu, and/or softmax; and/or a fourth operating part configured to perform a pooling operation on the weight and the input neuron, where the pooling operation includes average pooling, maximum pooling, and/or median pooling, and the weight includes an unquantized weight and/or a quantized weight.

Further, the second operation unit includes a plurality of adders. The plurality of adders form an adder tree which is configured to add the weight and the input neuron stage by stage.

The present disclosure provides a processing method including:

receiving an input neuron, a weight dictionary, a codebook, and an instruction;

decoding the instruction to obtain lookup control information and operation control information; and looking up the weight dictionary and the codebook according to the lookup control information to obtain a quantized weight, performing an operation on the quantized weight and the input neuron according to the operation control information to obtain an output neuron, and outputting the output neuron.

Further, before receiving the input neuron, the weight dictionary, the codebook, and the instruction, the method further includes:

pre-processing input information input from the external to obtain the input neuron, the weight dictionary, the codebook, and the instruction.

After receiving the input neuron, the weight dictionary, the codebook, and the instruction, the method further includes:

storing the input neuron, the weight dictionary, the codebook, the instruction, and the output neuron; and caching the instruction, the input neuron, and the output neuron.

Further, after receiving the input neuron, the weight dictionary, the codebook, and the instruction, the method further includes: caching the weight dictionary and the codebook.

Further, the pre-processing includes segmentation, Gauss filtering, binarization, regularization, and/or normalization.

Further, the instruction is a neural network dedicated instruction.

Further, the neural network dedicated instruction includes:

a control instruction configured to control the execution process of a neural network;

a data transfer instruction configured to transfer data between different storage media, of which a data format includes a matrix, a vector, and a scalar;

an operation instruction configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM neural network operation instruction, a LRN neural network operation instruction, a LCN neural network operation instruction, a LSTM neural network operation instruction, a RNN neural network operation instruction, a RELU neural network operation instruction, a PRELU neural network operation instruction, a SIGMOID neural network operation instruction, a TAN H neural network operation instruction, and a MAXOUT neural network operation instruction; and a logic instruction configured to complete a logic operation of the neural network, including a vector logic operation instruction and a scalar logic operation instruction.

Further, the neural network dedicated instruction includes at least one type of Cambricon instruction. The Cambricon instruction includes an opcode and an operand, including:

a Cambricon control instruction configured to control an execution process, including a jump instruction and a conditional branch instruction;

a Cambricon data transfer instruction configured to complete data transfer between different storage media, including a load instruction, a storage instruction, a moving instruction, where the load instruction is configured to load data from a main memory to a cache, the storage instruction is configured to store data from a cache to the main storage, and the moving instruction is configured to move data between caches, or between a cache and a register, or between registers;

a Cambricon operation instruction configured to complete a neural network arithmetic operation, including a Cambricon matrix operation instruction, a Cambricon vector operation instruction, and a Cambricon scalar operation instruction, where the Cambricon matrix operation instruction is configured to complete a matrix operation in the neural network, including a matrix-multiply-vector operation, a vector-multiply-matrix operation, a matrix-multiply-scalar operation, an outer product operation, a matrix-add-matrix operation, and a matrix-subtract-matrix operation; the Cambricon vector operation instruction is configured to complete a vector operation in the neural network, including an elementary arithmetic operation of vectors, a vector transcendental function operation, an inner product operation, a random vector generation operation, and an operation of finding a maximum/minimum value of a vector; and the Cambricon scalar operation instruction is configured to complete a scalar operation in the neural network, including an elementary arithmetic operation of scalars, and a scalar transcendental function operation; and the Cambricon logic instruction is configured to complete a logic operation of the neural network, including a Cambricon vector logic operation instruction and a Cambricon scalar logic operation instruction, where the Cambricon vector logic operation instruction is configured to complete a vector comparison operation, a vector logic operation, and a vector greater-than-merging operation; the vector logic operation includes AND, OR, and NOT operations; and the Cambricon scalar logic operation instruction is configured to complete a scalar comparison operation and a scalar logic operation.

Further, the Cambricon data transfer instruction supports one or more of the following methods of data organization: matrix, vector, and scalar. The elementary arithmetic operation of vectors includes addition, subtraction, multiplication, and division of vectors. The vector transcendental function refers to a function of a polynomial equation that cannot take a polynomial as a coefficient, including an exponential function, a logarithmic function, a trigonometric function, and an inverse trigonometric function. The elementary arithmetic operation of scalars includes addition, subtraction, multiplication, and division of scalars. The scalar transcendental function refers to a function of a polynomial equation that cannot take a polynomial as a coefficient, including an exponential function, a logarithmic function, a trigonometric function, and an inverse trigonometric function. The vector comparison includes but is not limited to greater than, less than, equal to, greater than or equal to (≥), less than or equal to (≤), and not equal to. The vector logic operation includes AND, OR, and NOT. The scalar comparison includes but is not limited to greater than, less than, equal to, greater than or equal to (≥), less than or equal to (≤), and not equal to. The scalar logic operation includes AND, OR, and NOT.

Further, the method includes: receiving the unquantized weight, performing an operation on the unquantized weight and the input neuron according to the operation control information to obtain an output neuron, and outputting the output neuron.

Further, the operation includes:

adding a weight and an input neuron; and/or multiplying the weight by the input neuron; and/or performing a non-linear function operation on the weight and the input neuron, where the non-linear function includes an activation function and the activation function includes sigmoid, tan h, relu, and/or softmax; and/or performing a pooling operation on the weight and the input neuron, where the pooling operation includes average pooling, maximum pooling, and/or median pooling, and the weight includes a quantized weight and/or an unquantized weight.

Further, the adding the weight and the input neuron is realized by one or more adders.

Further, the plurality of adders form an adder tree which is configured to add the weight and the input neuron stage by stage.

The present disclosure provides a processing device including:

a control unit configured to receive and decode an instruction to generate lookup control information and operation control information;

a lookup table unit configured to receive the lookup control information, a weight dictionary, and a codebook, and perform a table lookup operation on the weight dictionary and the codebook according to the lookup control information to obtain a quantized weight; and an operation unit configured to receive the operation control information, an input neuron, and the quantized weight, perform an operation on the quantized weight and the input neuron according to the operation control information to obtain an output neuron, and output the output neuron.

Further, the processing device further includes:

a pre-processing unit configured to pre-process input information input from the external to obtain the input neuron, the weight dictionary, the codebook, and the instruction;

a storage unit configured to store the input neuron, the weight dictionary, the codebook, and the instruction, and receive the output neuron;

a caching unit configured to cache the instruction, the input neuron, the output neuron, the weight dictionary, and the codebook; and a direct memory access unit configured to read/write data or instruction in/from the storage unit and the caching unit.

Further, the pre-processing unit may use the following ways to pre-process the input information input by the external: segmentation, Gauss filtering, binarization, regularization, and/or normalization.

Further, the caching unit includes:

an instruction caching unit configured to cache the instruction;

an input neuron caching unit configured to cache the input neuron; and an output neuron caching unit configured to cache the output neuron.

Further, the caching unit further includes:

a weight dictionary caching unit configured to cache the weight dictionary; and a codebook caching unit configured to cache the codebook.

Further, the instruction is a neural network dedicated instruction.

Further, the neural network dedicated instruction includes:

a control instruction configured to control the execution process of a neural network;

a data transfer instruction configured to transfer data between different storage media, of which a data format includes a matrix, a vector, and a scalar;

an operation instruction configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM (Restricted Boltzmann Machine) neural network operation instruction, a LRN (Local Response Normalization) neural network operation instruction, a LCN (Local Contrast Normalization) neural network operation instruction, a LSTM (Long Short-Term Memory) neural network operation instruction, a RNN (Recurrent Neural Network) operation instruction, a RELU (Rectified Linear Unit) neural network operation instruction, a PRELU (Parametric Rectified Linear Unit) neural network operation instruction, a SIGMOID (S-shaped growth curve) neural network operation instruction, a TAN H (hyperbolic function) neural network operation instruction, and a MAXOUT (maximum output) neural network operation instruction; and a logic instruction configured to complete a logic operation of the neural network, including a vector logic operation instruction and a scalar logic operation instruction.

Further, the neural network dedicated instruction includes at least one type of Cambricon instruction. The Cambricon instruction includes an opcode and an operand, including:

a Cambricon control instruction configured to control an execution process, including a jump instruction and a conditional branch instruction;

a Cambricon data transfer instruction configured to complete data transfer between different storage media, including a load instruction, a storage instruction, a moving instruction, where the load instruction is configured to load data from a main memory to a cache, the storage instruction is configured to store data from a cache to the main storage, and the moving instruction is configured to move data between caches, or between a cache and a register, or between registers;

a Cambricon operation instruction configured to complete a neural network arithmetic operation, including a Cambricon matrix operation instruction, a Cambricon vector operation instruction, and a Cambricon scalar operation instruction, where the Cambricon matrix operation instruction is configured to complete a matrix operation in the neural network, including a matrix-multiply-vector operation, a vector-multiply-matrix operation, a matrix-multiply-scalar operation, an outer product operation, a matrix-add-matrix operation, and a matrix-subtract-matrix operation; the Cambricon vector operation instruction is configured to complete a vector operation in the neural network, including an elementary arithmetic operation of vectors, a vector transcendental function operation, an inner product operation, a random vector generation operation, and an operation of finding a maximum/minimum value of a vector; and the Cambricon scalar operation instruction is configured to complete a scalar operation in the neural network, including an elementary arithmetic operation of scalars, and a scalar transcendental function operation; and the Cambricon logic instruction is configured to complete a logic operation of the neural network, including a Cambricon vector logic operation instruction and a Cambricon scalar logic operation instruction, where the Cambricon vector logic operation instruction is configured to complete a vector comparison operation, a vector logic operation, and a vector greater-than-merging operation; the vector logic operation includes AND, OR, and NOT operations; and the Cambricon scalar logic operation instruction is configured to complete a scalar comparison operation and a scalar logic operation.

Further, the Cambricon data transfer instruction supports one or more of the following methods of data organization: matrix, vector, and scalar. The elementary arithmetic operation of vectors includes addition, subtraction, multiplication, and division of vectors. The vector transcendental function refers to a function of a polynomial equation that cannot take a polynomial as a coefficient, including an exponential function, a logarithmic function, a trigonometric function, and an inverse trigonometric function. The elementary arithmetic operation of scalars includes addition, subtraction, multiplication, and division of scalars. The scalar transcendental function refers to a function of a polynomial equation that cannot take a polynomial as a coefficient, including an exponential function, a logarithmic function, a trigonometric function, and an inverse trigonometric function. The vector comparison includes greater than, less than, equal to, greater than or equal to, less than or equal to, and not equal to. The vector logic operation includes AND, OR, and NOT. The scalar comparison includes greater than, less than, equal to, greater than or equal to, less than or equal to, and not equal to. The scalar logic operation includes AND, OR, and NOT.

Further, the storage unit is also configured to store an unquantized weight. The unquantized weight is directly output to the operation unit.

Further, the operation unit includes:

a first operating part configured to multiply the weight by the input neuron; and/or a second operating part which includes one or more adders, where the weight and the input neuron are added through the one or more adders; and/or a third operating part configured to perform a non-linear function operation on the weight and the input neuron, where the non-linear function includes an activation function, and the activation function includes sigmoid, tan h, relu, and/or softmax; and/or a fourth operating part configured to perform a pooling operation on the weight and the input neuron, where the pooling operation includes average pooling, maximum pooling, and/or median pooling, and the weight includes a quantized weight and/or an unquantized weight.

Further, the second operation unit includes a plurality of adders. The plurality of adders form an adder tree which is configured to add the weight and the input neuron stage by stage.

The present disclosure provides a processing method including:

receiving an input neuron, a weight dictionary, a codebook, and an instruction;

decoding the instruction to obtain lookup control information and operation control information; and looking up the weight dictionary and the codebook according to the lookup control information to obtain a quantized weight, performing an operation on the quantized weight and the input neuron according to the operation control information to obtain an output neuron, and outputting the output neuron.

Further, before receiving the input neuron, the weight dictionary, the codebook, and the instruction, the method further includes:

pre-processing input information input from the external to obtain the input neuron, the weight dictionary, the codebook, and the instruction.

After receiving the input neuron, the weight dictionary, the codebook, and the instruction, the method further includes:

storing the input neuron, the weight dictionary, the codebook, the instruction, and the output neuron; and caching the instruction, the input neuron, and the output neuron.

Further, after receiving the input neuron, the weight dictionary, the codebook, and the instruction, the method further includes:

caching the weight dictionary and the codebook.

Further, the pre-processing includes segmentation, Gauss filtering, binarization, regularization, and/or normalization.

Further, the instruction is a neural network dedicated instruction.

Further, the neural network dedicated instruction includes:

a control instruction configured to control the execution process of a neural network;

a data transfer instruction configured to transfer data between different storage media, of which a data format includes a matrix, a vector, and a scalar;

an operation instruction configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM (Restricted Boltzmann Machine) neural network operation instruction, a LRN (Local Response Normalization) neural network operation instruction, a LCN (Local Contrast Normalization) neural network operation instruction, a LSTM (Long Short-Term Memory) neural network operation instruction, a RNN (Recurrent Neural Network) operation instruction, a RELU (Rectified Linear Unit) neural network operation instruction, a PRELU (Parametric Rectified Linear Unit) neural network operation instruction, a SIGMOID (S-shaped growth curve) neural network operation instruction, a TAN H (hyperbolic function) neural network operation instruction, and a MAXOUT (maximum output) neural network operation instruction; and a logic instruction configured to complete a logic operation of the neural network, including a vector logic operation instruction and a scalar logic operation instruction.

Further, the neural network dedicated instruction includes at least one type of Cambricon instruction. The Cambricon instruction includes an opcode and an operand, including:

a Cambricon control instruction configured to control an execution process, including a jump instruction and a conditional branch instruction;

a Cambricon data transfer instruction configured to complete data transfer between different storage media, including a load instruction, a storage instruction, a moving instruction, where the load instruction is configured to load data from a main memory to a cache, the storage instruction is configured to store data from a cache to the main storage, and the moving instruction is configured to move data between caches, or between a cache and a register, or between registers;

a Cambricon operation instruction configured to complete a neural network arithmetic operation, including a Cambricon matrix operation instruction, a Cambricon vector operation instruction, and a Cambricon scalar operation instruction, where the Cambricon matrix operation instruction is configured to complete a matrix operation in the neural network, including a matrix-multiply-vector operation, a vector-multiply-matrix operation, a matrix-multiply-scalar operation, an outer product operation, a matrix-add-matrix operation, and a matrix-subtract-matrix operation; the Cambricon vector operation instruction is configured to complete a vector operation in the neural network, including an elementary arithmetic operation of vectors, a vector transcendental function operation, an inner product operation, a random vector generation operation, and an operation of finding a maximum/minimum value of a vector; and the Cambricon scalar operation instruction is configured to complete a scalar operation in the neural network, including an elementary arithmetic operation of scalars, and a scalar transcendental function operation; and the Cambricon logic instruction is configured to complete a logic operation of the neural network, including a Cambricon vector logic operation instruction and a Cambricon scalar logic operation instruction, where the Cambricon vector logic operation instruction is configured to complete a vector comparison operation, a vector logic operation, and a vector greater-than-merging operation; the vector logic operation includes AND, OR, and NOT operations; and the Cambricon scalar logic operation instruction is configured to complete a scalar comparison operation and a scalar logic operation.

Further, the Cambricon data transfer instruction supports one or more of the following methods of data organization: matrix, vector, and scalar. The elementary arithmetic operation of vectors includes addition, subtraction, multiplication, and division of vectors. The vector transcendental function refers to a function of a polynomial equation that fails to take a polynomial as a coefficient, including an exponential function, a logarithmic function, a trigonometric function, and an inverse trigonometric function. The elementary arithmetic operation of scalars includes addition, subtraction, multiplication, and division of scalars. The scalar transcendental function refers to a function of a polynomial equation that fails to take a polynomial as a coefficient, including an exponential function, a logarithmic function, a trigonometric function, and an inverse trigonometric function. The vector comparison includes greater than, less than, equal to, greater than or equal to, less than or equal to, and not equal to. The vector logic operation includes AND, OR, and NOT. The scalar comparison includes greater than, less than, equal to, greater than or equal to, less than or equal to, and not equal to. The scalar logic operation includes AND, OR, and NOT.

Further, the method above further includes:

receiving an unquantized weight, performing an operation on the unquantized weight and an input neuron according to the operation control information to obtain an output neuron, and outputting the output neuron.

Further, the operation includes:

adding a weight and an input neuron; and/or multiplying the weight by the input neuron; and/or performing a non-linear function operation on the weight and the input neuron, where the non-linear function includes an activation function and the activation function includes sigmoid, tan h, relu, and/or softmax; and/or performing a pooling operation on the weight and the input neuron, where the pooling operation includes average pooling, maximum pooling, and/or median pooling, and the weight includes a quantized weight and/or an unquantized weight.

Further, the adding the weight and the input neuron is realized by one or more adders.

Further, the plurality of adders form an adder tree which is configured to add the weight and the input neuron stage by stage.

The present disclosure provides a data quantization method including:

grouping weights of a neural network;

using a clustering algorithm to cluster each group of weights, dividing a group of weights into m clusters, computing a central weight for each cluster, and replacing weights in each cluster with the central weight, where m is a positive integer; and encoding the central weights to obtain a codebook and a weight dictionary.

Further, the method above further includes:

retraining the neural network, where only the codebook is trained during the retraining, and the content of the weight dictionary remains unchanged.

Further, a back propagation algorithm is used during the retraining.

Further, a way of the grouping includes dividing into a group, grouping according to a layer type, inter-layer grouping, and/or intra-layer grouping.

Further, the clustering algorithm includes K-means, K-medoids, Clara and/or Clarans.

Further, a way of the grouping is dividing into a group, including:

dividing all the weights of the neural network into one group.

Further, the neural network includes i convolution layers, j fully connected layers, and m LSTM (long and short-term memory) layers. In other words, the neural network has t different types of layers in total, where i, j, m are all integers greater than or equal to 0, i+j+m≥1, and t is a positive integer greater than or equal to 1 and t=i+j+m. A way of the grouping is grouping according to a layer type, including:

dividing the weights of the neural network into t groups.

Further, a way of the grouping is the inter-layer grouping, including:

dividing the weights of one or more convolution layers, the weights of one or more fully connected layers, and the weights of one or more LSTM layers in the neural network into respective groups.

Further, a way of the grouping is the intra-layer grouping, including:

in a case where the convolution layer of the neural network is a four-dimensional matrix (Nfin, Nfout, Kx, Ky), where Nfin, Nfout, Kx, Ky are positive integers, Nfin denotes a count of input feature maps, Nfout denotes a count of output feature maps, (Kx, Ky) denotes a size of a convolution kernel, dividing the weights of the convolution layer into Nfin*Nfout*Kx*Ky/(Bfin*Bfout*Bx*By) groups according to a group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky; or in a case where the fully connected layer of the neural network is a two-dimensional matrix (Nin, Nout), where Nin and Nout are positive integers, Nin denotes a count of input neurons, Nout denotes a count of output neurons, and there are Nin*Nout weights, grouping the weights of the fully connected layer into (Nin*Nout)/(Bin*Bout) groups according to a group size of (Bin, Bout), where Bin is a positive integer less than or equal to Nin, and Bout is a positive integer less than or equal to Nout; or using the weights of the LSTM layer of the neural network as a combination of the weights of a plurality of fully connected layers, and the weights of the LSTM layer are composed of the weights of n fully connected layers, where n is a positive integer, and each LSTM layer may be grouped according to the way of grouping of the fully connected layer.

Further, a way of the grouping is dividing into a group, intra-layer grouping, and inter-layer grouping, which includes:

dividing the convolution layers as a group, performing intra-layer grouping on the fully connected layers, and performing inter-layer grouping on the LSTM layers.

Further, a method of selecting the central weight of a cluster is: minimizing a cost function $J(w, w_0)$.

Further, the cost function is:

$$J(w, w_0) = \sum_{i=1}^{n} (w_i - w_0)^2$$

w denotes a weight of a cluster, w0 denotes a central weight of the cluster, n denotes a count of weights in the cluster and is a positive integer, wi denotes an $i^{th}$ weight in the cluster, i is a positive integer, and 1≤i≤n.

The present disclosure provides a data quantization method including:

a memory configured to store an operation instruction; and a processor configured to execute the operation instruction in the memory, and operate according to the above-mentioned quantization method when executing the operation instruction.

Further, the operation instruction is a binary number which includes an opcode and an address code. The opcode indicates an upcoming operation of the processor, and the address code instructs the processor to read data participating in the operation from an address in the memory.

The present disclosure provides a processing device including:

a control unit configured to receive and decode an instruction to generate lookup control information and operation control information;

a lookup table unit configured to receive the lookup control information, a weight dictionary, and a codebook, and perform a table lookup operation on the weight dictionary and the codebook according to the lookup control information to obtain a quantized weight; and an operation unit configured to receive the operation control information, the quantized weight, and an input neuron, perform an operation on the quantized weight and the input neuron according to the operation control information to obtain an output neuron, and output the output neuron.

Further, the processing device further includes:

a pre-processing unit configured to pre-process input information input from the external to obtain the input neuron, the weight dictionary, the codebook, and the instruction;

a storage unit configured to store the input neuron, the weight dictionary, the codebook, and the instruction, and receive the output neuron;

a caching unit configured to cache the instruction, the input neuron, the output neuron, the weight dictionary, and the codebook; and, a direct memory access unit configured to read/write data or instruction in/from the storage unit and the caching unit.

Further, the pre-processing unit may use the following ways to pre-process the input information input by the external: segmentation, Gauss filtering, binarization, regularization, and/or normalization.

Further, the caching unit includes:

an instruction caching unit configured to cache the instruction;

an input neuron caching unit configured to cache the input neuron; and, an output neuron caching unit configured to cache the output neuron.

Further, the caching unit further includes: a weight dictionary cache configured to cache the weight dictionary, and a codebook cache configured cache the codebook.

Further, the instruction is a neural network dedicated instruction.

Further, the neural network dedicated instruction includes:

a control instruction configured to control the execution process of a neural network;

a data transfer instruction configured to transfer data between different storage media, of which a data format includes a matrix, a vector, and a scalar;

an operation instruction configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM neural network operation instruction, a LRN neural network operation instruction, a LCN neural network operation instruction, a LSTM neural network operation instruction, a RNN neural network operation instruction, a RELU neural network operation instruction, a PRELU neural network operation instruction, a SIGMOID neural network operation instruction, a TAN H neural network operation instruction, and a MAXOUT neural network operation instruction; and a logic instruction configured to complete a logic operation of the neural network, including a vector logic operation instruction and a scalar logic operation instruction.

Further, the neural network dedicated instruction includes at least one type of Cambricon instruction. The Cambricon instruction includes an opcode and an operand, including: a Cambricon control instruction configured to control an execution process, including a jump instruction and a conditional branch instruction; a Cambricon data transfer instruction configured to complete data transfer between different storage media, including a load instruction, a storage instruction, a moving instruction, where the load instruction is configured to load data from a main memory to a cache, the storage instruction is configured to store data from a cache to the main storage, and the moving instruction is configured to move data between caches, or between a cache and a register, or between registers; a Cambricon operation instruction configured to complete a neural network arithmetic operation, including a Cambricon matrix operation instruction, a Cambricon vector operation instruction, and a Cambricon scalar operation instruction, where the Cambricon matrix operation instruction is configured to complete a matrix operation in the neural network, including a matrix-multiply-vector operation, a vector-multiply-matrix operation, a matrix-multiply-scalar operation, an outer product operation, a matrix-add-matrix operation, and a matrix-subtract-matrix operation; the Cambricon vector operation instruction is configured to complete a vector operation in the neural network, including an elementary arithmetic operation of vectors, a vector transcendental function operation, an inner product operation, a random vector generation operation, and an operation of finding a maximum/minimum value of a vector; and the Cambricon scalar operation instruction is configured to complete a scalar operation in the neural network, including an elementary arithmetic operation of scalars, and a scalar transcendental function operation; and the Cambricon logic instruction is configured to complete a logic operation of the neural network, including a Cambricon vector logic operation instruction and a Cambricon scalar logic operation instruction, where the Cambricon vector logic operation instruction is configured to complete a vector comparison operation, a vector logic operation, and a vector greater-than-merging operation; the vector logic operation includes AND, OR, and NOT operations; and the Cambricon scalar logic operation instruction is configured to complete a scalar comparison operation and a scalar logic operation.

Further, the Cambricon data transfer instruction supports one or more of the following methods of data organization: matrix, vector, and scalar. The elementary arithmetic operation of vectors includes addition, subtraction, multiplication, and division of vectors. The vector transcendental function refers to a function of a polynomial equation that cannot take a polynomial as a coefficient, including an exponential function, a logarithmic function, a trigonometric function, and an inverse trigonometric function. The elementary arithmetic operation of scalars includes addition, subtraction, multiplication, and division of scalars. The scalar transcendental function refers to a function of a polynomial equation that cannot take a polynomial as a coefficient, including an exponential function, a logarithmic function, a trigonometric function, and an inverse trigonometric function. The vector comparison includes greater than, less than, equal to, greater than or equal to (≥), less than or equal to (≤), and not equal to. The vector logic operation includes AND, OR, and NOT. The scalar comparison includes greater than, less than, equal to, greater than or equal to (≥), less than or equal to (≤), and not equal to. The scalar logic operation includes AND, OR, and NOT.

Further, the storage unit is also configured to store an unquantized weight. The unquantized weight is directly output to the operation unit.

Further, the operation unit includes: a first operating part configured to multiply the weight by the input neuron; and/or a second operating part which includes one or more adders and is configured to add the weight and the input neuron; and/or the third operating part configured to perform a non-linear function operation on the weight and the input neuron, where the non-linear function includes an activation function, and the activation function includes sigmoid, tan h, relu, and/or softmax; and/or a fourth operating part configured to perform a pooling operation on the weight and the input neuron, where the pooling operation includes average pooling, and maximum pooling, and/or median pooling, where the weight is an unquantized weight and/or a quantized weight.

Further, the second operation unit includes a plurality of adders. The plurality of adders form an adder tree which is configured to add the weight and the input neuron stage by stage.

The present disclosure provides a processing method including:

receiving an input neuron, a weight dictionary, a codebook, and an instruction;

decoding the instruction to obtain lookup control information and operation control information; and looking up the weight dictionary and the codebook according to the lookup control information to obtain a quantized weight, performing an operation on the quantized weight and the input neuron according to the operation control information to obtain an output neuron, and outputting the output neuron.

Further, before receiving the input neuron, the weight dictionary, the codebook, and the instruction, the method further includes:

pre-processing input information input from the external to obtain the input neuron, the weight dictionary, the codebook, and the instruction.

After receiving the input neuron, the weight dictionary, the codebook, and the instruction, the method further includes:

storing the input neuron, the weight dictionary, the codebook, the instruction, and the output neuron; and caching the instruction, the input neuron, and the output neuron.

Further, after receiving the input neuron, the weight dictionary, the codebook, and the instruction, the method further includes: caching the weight dictionary and the codebook.

Further, the pre-processing includes segmentation, Gauss filtering, binarization, regularization, and/or normalization.

Further, the instruction is a neural network dedicated instruction.

Further, the neural network dedicated instruction includes: a control instruction configured to control the execution process of a neural network; a data transfer instruction configured to transfer data between different storage media, of which a data format includes a matrix, a vector, and a scalar; an operation instruction configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM neural network operation instruction, a LRN neural network operation instruction, a LCN neural network operation instruction, a LSTM neural network operation instruction, a RNN neural network operation instruction, a RELU neural network operation instruction, a PRELU neural network operation instruction, a SIGMOID neural network operation instruction, a TAN H neural network operation instruction, and a MAXOUT neural network operation instruction; and a logic instruction configured to complete a logic operation of the neural network, including a vector logic operation instruction and a scalar logic operation instruction.

Further, the neural network dedicated instruction includes at least one type of Cambricon instruction. The Cambricon instruction includes an opcode and an operand, including: a Cambricon control instruction configured to control an execution process, including a jump instruction and a conditional branch instruction; a Cambricon data transfer instruction configured to complete data transfer between different storage media, including a load instruction, a storage instruction, a moving instruction, where the load instruction is configured to load data from a main memory to a cache, the storage instruction is configured to store data from a cache to the main storage, and the moving instruction is configured to move data between caches, or between a cache and a register, or between registers; a Cambricon operation instruction configured to complete a neural network arithmetic operation, including a Cambricon matrix operation instruction, a Cambricon vector operation instruction, and a Cambricon scalar operation instruction, where the Cambricon matrix operation instruction is configured to complete a matrix operation in the neural network, including a matrix-multiply-vector operation, a vector-multiply-matrix operation, a matrix-multiply-scalar operation, an outer product operation, a matrix-add-matrix operation, and a matrix-subtract-matrix operation; the Cambricon vector operation instruction is configured to complete a vector operation in the neural network, including an elementary arithmetic operation of vectors, a vector transcendental function operation, an inner product operation, a random vector generation operation, and an operation of finding a maximum/minimum value of a vector; and the Cambricon scalar operation instruction is configured to complete a scalar operation in the neural network, including an elementary arithmetic operation of scalars, and a scalar transcendental function operation; and the Cambricon logic instruction is configured to complete a logic operation of the neural network, including a Cambricon vector logic operation instruction and a Cambricon scalar logic operation instruction, where the Cambricon vector logic operation instruction is configured to complete a vector comparison operation, a vector logic operation, and a vector greater-than-merging operation; the vector logic operation includes AND, OR, and NOT operations; and the Cambricon scalar logic operation instruction is configured to complete a scalar comparison operation and a scalar logic operation.

Further, the Cambricon data transfer instruction supports one or more of the following methods of data organization: matrix, vector, and scalar. The elementary arithmetic operation of vectors includes addition, subtraction, multiplication, and division of vectors. The vector transcendental function refers to a function of a polynomial equation that cannot take a polynomial as a coefficient, including an exponential function, a logarithmic function, a trigonometric function, and an inverse trigonometric function. The elementary arithmetic operation of scalars includes addition, subtraction, multiplication, and division of scalars. The scalar transcendental function refers to a function of a polynomial equation that cannot take a polynomial as a coefficient, including an exponential function, a logarithmic function, a trigonometric function, and an inverse trigonometric function. The vector comparison includes greater than, less than, equal to, greater than or equal to (≥), less than or equal to (≤), and not equal to. The vector logic operation includes AND, OR, and NOT. The scalar comparison includes greater than, less than, equal to, greater than or equal to (≥), less than or equal to (≤), and not equal to. The scalar logic operation includes AND, OR, and NOT.

Further, the method above further includes:

receiving an unquantized weight, performing an operation on the unquantized weight and the input neuron according to the operation control information to obtain an output neuron, and outputting the output neuron.

Further, the operation includes: adding the weight and the input neuron; performing a non-linear function operation on the weight and the input neuron, where the non-linear function includes an activation function and the activation function includes sigmoid, tan h, relu, and/or softmax; and/or performing a pooling operation on the weight and the input neuron, where the pooling operation includes average pooling, maximum pooling, and/or median pooling, where the weight includes a quantized weight and/or an unquantized weight.

Further, the adding the weight and the input neuron is realized by one or more adders.

Further, the plurality of adders form an adder tree which is configured to add the weight and the input neuron stage by stage.

The present disclosure provides a data compression method including:

performing a coarse-grained pruning operation on weights of a neural network, which includes: selecting M weights from the neural network according to a sliding window, and when the M weights satisfy a preset condition, setting all or part of the M weights to zero, where M is an integer greater than 0; and performing a first retraining on the neural network, the weights that have been set to zero remain at zero during the training process; and quantizing the weights of the neural network, which includes: grouping the weights of the neural network, using a clustering algorithm to cluster each group of weights, computing a central weight for each cluster, and replacing weights in each cluster with the central weight.

Further, after quantizing the weights of the neural network, the method further includes:

encoding the central weights to obtain a codebook and a weight dictionary.

Further, after encoding the central weights, the method above further includes:

performing a second retraining on the neural network.

Further, only the codebook is trained during the second retraining of the neural network. The content of the weight dictionary remains unchanged.

Further, the preset condition is:

the amount of information of the M weights being less than a first preset threshold.

Further, the amount of information of the M weights is an arithmetic mean of absolute values of the M weights, a geometric mean of the absolute values of the M weights, or a maximum value of the M weights. The first preset threshold is a first threshold, a second threshold, or a third threshold. The amount of information of the M weights being less than the first preset threshold includes:

the arithmetic mean of the absolute values of the M weights being less than the first threshold, or the geometric mean of the absolute values of the M weights being less than the second threshold, or the maximum value of the M weights being less than the third threshold.

Further, the method above further includes:

repeatedly selecting M weights from the neural network by using the sliding window, and when the M weights satisfy the preset condition, setting all or part of the M weights to zero; and performing the first retraining on the neural network until no weight can be set to zero under the premise that precision does not suffer a loss of a preset amount.

Further, the preset amount is x %, where x is between 0 and 5.

Further, the neural network includes a fully connected layer, a convolution layer, and/or a LSTM (long short-term memory) layer. Weights of the fully connected layer are a two-dimensional matrix (Nin, Nout), where Nin denotes a count of input neurons, Nout denotes a count of output neurons, and the fully connected layer has Nin*Nout weights. Weights of the convolution layer are a four-dimensional matrix (Nfin, Nfout, Kx, Ky), where Nfin denotes a count of input feature maps, Nfout denotes a count of output feature maps, (Kx, Ky) is a size of a convolution kernel, and the convolution layer has Nfin*Nfout*Kx*Ky weights. Weights of the LSTM layer is composed of the weights of m fully connected layers, where m is an integer greater than 0. Weights of an $i^{th}$ fully connected layer are (Nin Nout_i), where i is an integer greater than 0 and less than or equal to m. Nin_i denotes a count of input neurons of the weights of the $i^{th}$ fully connected layer, and Nout_i denotes a count of output neurons of the weights of the $i^{th}$ fully connected layer. The coarse-grained pruning unit is configured to perform the following steps:

when a coarse-grained pruning operation is performed on the weights of the fully connected layer, a size of the sliding window is Bin*Bout, where Bin is an integer greater than 0 and less than or equal to Nin, and Bout is an integer greater than 0 and less than or equal to Nout, enabling the sliding window to slide along a direction of Bin with a stride being Sin, or slide along a direction of Bout with a stride being Sout, where Sin is a positive integer greater than 0 and less than or equal to Bin, and Sout is a positive integer greater than 0 and less than or equal to Bout; and The coarse-grained pruning unit is configured to select M values from the Nin*Nout weights through the sliding window, and when the M weights satisfy the preset condition, set all or part of the M weights to zero, where M=Bin*Bout.

The coarse-grained pruning unit is configured to perform the following steps: when a coarse-grained pruning operation is performed on the weights of the convolution layer, the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky, enabling the sliding window to slide along a direction of Bfin with a stride being Sfin, or slide along a direction of Bfout with a stride being Sfout, or slide along a direction of Bx with a stride being S, or slide along a direction of By with a stride being Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By; and The coarse-grained pruning unit is configured to select M weights from the Nfin*Nfout*Kx*Ky weights through the sliding window, and when the M weights satisfy the preset condition, set all or part of the M weights to zero, where M=Bfin*Bfout*Bx*By.

The coarse-grained pruning unit is configured to perform the following steps: when a coarse-grained pruning operation is performed on the weights of the LSTM layer, a size of the sliding window is Bin_i*Bout_i, where Bin_i is an integer greater than 0 and less than or equal to Nin_i, and Bout_i is an integer greater than 0 and less than or equal to Nout_i;

enabling the sliding window to slide along a direction of Bin_i with a stride being Sin_i, or slide along a direction of Bout_i with a stride being Sout_i, where Sin_i is a positive integer greater than 0 and less than or equal to Bin_i, and Sout_i is a positive integer greater than 0 and less or equal to Bout_i; and selecting M weights from the Bin_i*Bout_i weights via the sliding window, and when the M weights satisfy the preset condition, setting all or part of the M weights to zero, where M=Bin_i*Bout_i.

Further, a back propagation algorithm is used for the first retraining, and the weights that have been set to zero remain at zero during the training process.

Further, a method of grouping the weights of the neural network includes:

dividing the weights of the neural network into a group; and/or grouping the weights of the neural network according to a type of a layer; and/or grouping the weights of the neural network according to an inter-layer grouping method and/or an intra-layer grouping method.

Further, grouping the weights of the neural network according to a type of a layer includes:

dividing the weights of all convolution layers, the weights of all fully connected layers, and the weights of all LSTM layers of the neural network into respective groups.

Further, grouping the weights of the neural network according to the inter-layer grouping method includes:

dividing the weights of one or more convolution layers, the weights of one or more fully connected layers, and the weights of one or more LSTM layers of the neural network into respective groups.

Further, grouping the weights of the neural network according to the intra-layer grouping method includes:

segmenting the weights of a layer of the neural network, where each segment is regarded as a group.

Further, the clustering algorithm includes K-means, K-medoids, Clara and/or Clarans.

Further, a method of selecting the central weight is: minimizing a cost function $J(w, w_0)$. Further, the cost function satisfies the following condition:

$$J(w, w_0) = \sum_{i=1}^{n} (w_i - w_0)^2$$

w denotes all weights of a cluster, w0 denotes a central weight, n denotes a count of weights in the cluster, wi is an $i^{th}$ weight of the cluster, i denotes an integer greater than 0 and less than or equal to n.

Further, performing the second retraining on the clustered and encoded neural network includes:

using the back propagation algorithm to retrain the clustered and encoded neural network, the weights that have been set to 0 remain at 0 during the training process, and only the weight codebook is trained while the weight dictionary is not trained.

The present disclosure provides a data compression device including:

a memory configured to store an operation instruction; and a processor configured to execute the operation instruction in the memory, and operate according to all or part of the data compression method described in the twenty-second aspect when executing the operation instruction.

The present disclosure provides a data compression method including:

performing a coarse-grained pruning operation on weights of a neural network, which includes: selecting M weights from the neural network according to a sliding window, and when the M weights satisfy a preset condition, setting all or part of the M weights to zero, where M is an integer greater than 0; and performing a first retraining on the neural network, the weights that have been set to zero remain at zero during the training process; and quantizing the weights of the neural network, which includes: grouping the weights of the neural network, using a clustering algorithm to cluster each group of weights, computing a central weight for each cluster, and replacing weights in each cluster with the corresponding central weight of the cluster.

Further, after quantizing the weights of the neural network, the method further includes:

encoding the central weights to obtain a codebook and a weight dictionary.

Further, after encoding the central weights, the method above further includes:

performing a second retraining on the neural network.

Further, only the codebook is trained during the second retraining of the neural network. The content of the weight dictionary remains unchanged.

Further, the preset condition is:

the amount of information of the M weights being less than a first preset threshold.

Further, the amount of information of the M weights is an arithmetic mean of absolute values of the M weights, a geometric mean of the absolute values of the M weights, or a maximum value of the M weights. The first preset threshold is a first threshold, a second threshold, or a third threshold. The amount of information of the M weights being less than the first preset threshold includes:

the arithmetic mean of the absolute values of the M weights being less than the first threshold, or the geometric mean of the absolute values of the M weights being less than the second threshold, or the maximum value of the M weights being less than the third threshold.

Further, the method further includes: repeatedly selecting M weights from the neural network by using the sliding window, and when the M weights satisfy the preset condition, setting all or part of the M weights to zero; and performing the first retraining on the neural network until no weight can be set to zero under the premise that precision does not suffer a loss of a preset amount.

Further, the preset amount is x %, where x is between 0 and 5.

Further, performing a coarse-grained pruning operation on the weights of the neural network includes:

pruning weights of a fully connected layer of the neural network, or pruning weights of a convolution layer of the neural network, or pruning weights of a LSTM layer of the neural network.

Further, when the weights of the fully connected layer of the neural network are a two-dimensional matrix (Nin, Nout), where Nin denotes a count of input neurons, Nout denotes a count of output neurons, the fully connected layer has Nin*Nout weights. A size of the sliding window is Bin*Bout, where Bin is an integer greater than 0 and less than or equal to Nin, and Bout is an integer greater than 0 and less than or equal to Nout. Pruning the weights of the fully connected layer of the neural network includes:

sliding, by the sliding window, along a direction of Bin with a stride being Sin, or sliding along a direction of Bout with a stride being Sout, where Sin is an integer greater than 0 and less than or equal to Bin, and Sout is an integer greater than 0 and less or equal to Bout; and selecting M weights from the Nin*Nout weights through the sliding window, and when the M weights satisfy the preset condition, setting all or part of the M weights to zero, where M=Bin*Bout.

When the weights of the convolution layer of the neural network are a four-dimensional matrix (Nfin, Nfout, Kx, Ky), where Nfin denotes a count of input feature maps, Nfout denotes a count of output feature maps, (Kx, Ky) denotes a size of a convolution kernel, the convolution layer has Nfin*Nfout*Kx*Ky weights. The sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky. Pruning the weights of the convolution layer includes:

sliding, by the sliding window, along a direction of Bfin with a stride being Sfin, or sliding along a direction of Bfout with a stride being Sfout, or sliding along a direction of Bx with a stride being Sx, or sliding along a direction of By with a stride being Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By; and selecting M weights from the Nfin*Nfout*Kx*Ky weights through the sliding window, and when the M weights satisfy the preset condition, setting all or part of the M weights to zero, where M=Bfin*Bfout*Bx*By.

Further, the weights of the LSTM layer of the neural network are composed of weights of m fully connected layers, where m is a positive integer greater than 0. The weights of an $i^{th}$ fully connected layer are a two-dimensional matrix (Nin_i, Nout_i), where i is an integer greater than 0 and less than or equal to m, Nin_i denotes a count of input neurons of the $i^{th}$ fully connected layer, Nout_i denotes a count of output neurons of the $i^{th}$ fully connected layer. A size of the sliding window is Bin_i*Bout_i, where Bin_i is an integer greater than 0 and less than or equal to Nin_i, Bout_i is an integer greater than 0 and less than or equal to Nout_i. Pruning the LSTM layer of the neural network includes:

sliding, by the sliding window, along a direction of Bin_i with a stride being Sin_i, or sliding along a direction of Bout_i with a stride being Sout_i, where Sin_i is an integer greater than 0 and less than or equal to Bin_i, and Sout_i is an integer greater than 0 and less or equal to Bout_i; and selecting M weights from the Nin_i*Nout_i weights through the sliding window, and when the M weights satisfy the preset condition, setting all or part of the M weights to zero, where M=Bin_i*Bout_i.

Further, a back propagation algorithm is used for the first retraining, and the weights that have been set to zero remain at zero during the training process.

Further, a method of grouping the weights of the neural network includes:

dividing the weights of the neural network into a group; and/or grouping the weights of the neural network according to a type of a layer; and/or grouping the weights of the neural network according to an inter-layer grouping method and/or an intra-layer grouping method.

Further, grouping the weights of the neural network according to a type of a layer includes:

dividing the weights of all convolution layers, the weights of all fully connected layers, and the weights of all LSTM layers of the neural network into respective groups.

Further, grouping the weights of the neural network according to the inter-layer grouping method includes:

dividing the weights of one or more convolution layers, the weights of one or more fully connected layers, and the weights of one or more LSTM layers of the neural network into respective groups.

Further, grouping the weights of the neural network according to the intra-layer grouping method includes:

segmenting the weights of a layer of the neural network, where each segment is regarded as a group.

Further, the clustering algorithm includes K-means, K-medoids, Clara and/or Clarans.

Further, a method of selecting the central weight is: minimizing a cost function $J(w, w_0)$.

Further, the cost function satisfies:

$$J(w, w_0) = \sum_{i=1}^{n} (w_i - w_0)^2,$$

where w denotes all weights of a cluster, w0 denotes a central weight, n denotes a count of weights in the cluster, wi is an $i^{th}$ weight of the cluster, i denotes an integer greater than 0 and less than or equal to n.

Performing the second retraining on the clustered and encoded neural network includes: using the back propagation algorithm to retrain the clustered and encoded neural network, the weights that have been set to 0 remain at 0 during the training process, and only the weight codebook is trained while the weight dictionary is not trained.

The present disclosure provides a compression device for neural network data. The device includes:

a memory configured to store an operation instruction; and a processor configured to execute the operation instruction in the memory, and operate according to any of the above-mentioned data compression methods when executing the operation instruction.

The present disclosure provides a processing device including:

a coarse-grained selection unit configured to input a neuron and position information of a target weight, and select a neuron to be computed, where the target weight is a weight whose absolute value is greater than a second preset threshold;

a lookup table unit configured to receive a quantized target weight dictionary and a quantized target weight codebook, perform a table lookup operation to obtain a target weight of a neural network, and output the target weight; and an operation unit configured to receive the selected neuron and the target weight, perform an operation on the neural network to obtain an neuron, and output the neuron.

Further, the lookup table unit is also configured to directly transfer an unquantized target weight to the operation unit through a bypass.

Further, the device includes an instruction control unit configured to receive an instruction, decode the instruction to obtain control information, and control the operation unit according to the control information.

Further, the device includes a storage unit configured to store a neuron, a weight, and an instruction of the neural network.

Further, the storage unit is configured to store a target weight and position information of the target weight, and store the quantized target weight codebook and the quantized target weight dictionary.

Further, the operation unit includes at least one of the following:

a multiplier configured to multiply first input data by second input data to obtain data after multiplication;

an adder tree configured to add third input data stage by stage, or add the third input data and fourth input data to obtain data after addition; and an activation function operation unit configured to perform an activation function operation on fifth data to obtain output data, where the activation function is a sigmoid, tan h, relu, or softmax function.

Further, the operation unit further includes a pooling unit which is configured to perform a pooling operation on input data to obtain output data after pooling operation, where the pooling operation includes: average pooling, max pooling, or median pooling.

Further, the processing device includes:

an instruction control unit configured to receive an instruction stored in the storage unit, decode the instruction to obtain control information, so as to control the coarse-grained selection unit to perform data selection, control the lookup table unit to perform a table lookup operation, and control the operation unit to perform an operation in accordance with the control information.

Further, the instruction is a neural network dedicated instruction, including a control instruction, a data transfer instruction, an operation instruction, and a logic instruction.

Further, the neural network dedicated instruction is a Cambricon instruction set. Each instruction in the Cambricon instruction set is 64 bits in length, and is composed of an opcode and an operand.

Further, the control instruction is configured to control the execution process of a neural network, and includes a jump instruction and a conditional branch instruction.

Further, the Cambricon data transfer instruction is configured to complete data transfer between different storage media, including a load instruction, a storage instruction, a moving instruction.

Further, the operation instruction is configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM neural network operation instruction, a LRN neural network operation instruction, a LCN neural network operation instruction, a LSTM neural network operation instruction, a RNN neural network operation instruction, a RELU neural network operation instruction, a PRELU neural network operation instruction, a SIGMOID neural network operation instruction, a TAN H neural network operation instruction, and a MAXOUT neural network operation instruction.

Further, the logic instruction is configured to complete a logic operation of the neural network, including a vector logic operation instruction and a scalar logic operation instruction.

Further, the vector logic operation instruction includes a vector comparison instruction, a vector logic operation instruction, and a vector greater-than-merging operation instruction. Optionally, the vector comparison includes but is not limited to greater than, less than, equal to, greater than or equal to (≥) less than or equal to (≤), and not equal to. Optionally, the vector logic operation includes AND, OR, and NOT.

Further, the scalar logic operation includes scalar comparison and a scalar logic operation. Optionally, the scalar comparison includes but is not limited to greater than, less than, equal to, greater than or equal to (≥) less than or equal to (≤), and not equal to. Optionally, the scalar logic operation includes AND, OR, and NOT.

Further, the processing device includes an instruction caching unit configured to cache the instruction. The instruction caching unit is an on-chip cache.

Further, the processing device includes a target weight codebook caching unit configured to cache the target weight codebook. The target weight codebook caching unit is an on-chip cache.

Further, the processing device includes a target weight dictionary caching unit configured to cache the target weight dictionary. The target weight dictionary caching unit is an on-chip cache.

Further, the processing device includes a target weight location caching unit configured to cache the position information of the target weight. The target weight location caching unit is also configured to make each connection weight in input data correspond to a corresponding input neuron. The target weight location caching unit is an on-chip cache.

Further, the one-to-one correspondence realized by the target weight location caching unit making each connection weight in the input data correspond to a corresponding input neuron is as follows: using 1 to represent connection between a weight and an input neuron, 0 to represent connectionless, and a character string of 0 and 1 formed with the connection state between each group of outputs and all inputs to represent connection relations of the outputs.

Further, the one-to-one correspondence realized by the target weight location caching unit making each connection weight in the input data correspond to a corresponding input neuron is as follows: using a distance from the location of an input neuron where first connection of a group of outputs is to a first input neuron, a distance from a second group of input neurons of the outputs to a previous input neuron, a distance from a third group of input neurons of the outputs to a previous input neuron . . . in a similar fashion, until all inputs of the outputs are exhausted, so as to represent connection relations of the outputs.

Further, the processing device includes an input neuron caching unit configured to cache an input neuron that is input to the coarse-grained selection unit. The input neuron caching unit is an on-chip cache.

Further, the processing device includes an output neuron caching unit configured to cache an output neuron. The output neuron caching unit is an on-chip cache.

Further, the processing device includes a direct memory access unit (DMA unit) which is configured to read/write data or instructions from/in the storage unit, the instruction caching unit, the target weight codebook caching unit, the target weight dictionary caching unit, the target weight location caching unit, the input neuron caching unit, and the output neuron caching unit.

Further, the processing device includes a pre-processing unit configured to pre-process original data, and store the pre-processed data in the storage unit.

The present disclosure provides a processing method including:

inputting a neuron and position information of a target weight, and selecting a neuron to be computed;

receiving a quantized target weight dictionary and a quantized target weight codebook, performing a table lookup operation to obtain a target weight of a neural network, and outputting the target weight; and receiving the selected neuron and the target weight, performing an operation on the neural network to obtain an neuron, and outputting the neuron.

Further, the processing method includes: receiving an unquantized target weight for performing a neural network operation.

Further, the processing method includes: receiving an instruction, decoding the instruction to obtain control information, and controlling the neural network operation.

Further, the operation includes at least one of the following: a multiplication operation for multiplying first input data by second input data to obtain data after multiplication; an addition operation for adding third input data stage by stage in an adder tree, or adding the third input data and fourth input data to obtain data after addition; and an activation function operating for performing an activation function operation on fifth data to obtain output data, where the activation function is a sigmoid, tan h, relu, or softmax function.

Further, the operation further includes a pooling operation for performing a pooling operation on sixth input data to obtain output data after the pooling operation, where the pooling operation includes: average pooling, max pooling, or median pooling.

Further, the instruction is a neural network dedicated instruction, including a control instruction, a data transfer instruction, an operation instruction, and a logic instruction.

Further, the control instruction is configured to control the execution process of a neural network, and includes a jump instruction and a conditional branch instruction.

Further, the Cambricon data transfer instruction is configured to complete data transfer between different storage media, including a load instruction, a storage instruction, a moving instruction.

Further, the operation instruction is configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM neural network operation instruction, a LRN neural network operation instruction, a LCN neural network operation instruction, a LSTM neural network operation instruction, a RNN neural network operation instruction, a RELU neural network operation instruction, a PRELU neural network operation instruction, a SIGMOID neural network operation instruction, a TAN H neural network operation instruction, and a MAXOUT neural network operation instruction.

Further, the neural network dedicated instruction is a Cambricon instruction set. Each instruction in the Cambricon instruction set is composed of an opcode and an operand.

Each instruction in the Cambricon instruction set has a fixed length. For instance, each instruction in the Cambricon instruction set is 64 bits in length.

Further, the logic instruction is configured to complete a logic operation of the neural network, including a vector logic operation instruction and a scalar logic operation instruction.

Further, the Cambricon logic operation instruction includes a vector comparison instruction, a vector logic operation instruction, and a vector greater-than-merging operation instruction. Optionally, the vector comparison includes but is not limited to greater than, less than, equal to, greater than or equal to (≥), less than or equal to (≤), and not equal to. Optionally, the vector logic operation includes AND, OR, and NOT.

Further, the scalar logic operation includes scalar comparison and a scalar logic operation. Optionally, the scalar comparison includes but is not limited to greater than, less than, equal to, greater than or equal to (≥), less than or equal to (≤), and not equal to. Optionally, the scalar logic operation includes AND, OR, and NOT.

Further, the method includes: pre-processing the input neuron and the target weight position information, where the pre-processing includes segmentation, Gauss filtering, binarization, regularization, and/or normalization.

Further, after receiving the selected neuron and the target weight, the processing method includes: storing the input neuron, the weight dictionary, the codebook, the instruction, and the output neuron; and caching the instruction, the input neuron, and the output neuron.

The present disclosure provides an electronic device that includes any of the above-mentioned data processing devices. The electronic device includes a data processing device, a robot, a computer, a printer, a scanner, a tablet, a smart terminal, a mobile phone, a traffic recorder, a navigator, a sensor, a webcam, a cloud server, a camera, a video camera, a projector, a watch, a headphone, a mobile storage, a wearable device, a vehicle, a household appliance, and/or a medical equipment.

The vehicle includes an airplane, a ship, and/or a car. The household electrical appliance may include a television, an air conditioner, a microwave oven, a refrigerator, an electric rice cooker, a humidifier, a washing machine, an electric lamp, a gas cooker, and/or a range hood. The medical equipment includes a nuclear magnetic resonance spectrometer, a B-ultrasonic scanner, and/or an electrocardiograph.

The present disclosure provides a processing device including:

a coarse-grained selection unit configured to input a neuron and position information of a target weight, and select a neuron to be computed, where the target weight is a weight whose absolute value is greater than a preset threshold;

a lookup table unit configured to receive a quantized target weight dictionary and a quantized target weight codebook, perform a table lookup operation to obtain a target weight of a neural network, and output the target weight; and an operation unit configured to receive the selected neuron and the target weight, perform an operation on the neural network to obtain an neuron, and output the neuron.

Further, the lookup table unit is also configured to directly transfer an unquantized target weight to the operation unit through a bypass.

Further, the processing device includes:

an instruction control unit configured to receive an instruction, decode the instruction to obtain control information, and control the operation unit according to the control information.

Further, the processing device includes:

a storage unit configured to store a neuron, a weight, and an instruction of a neural network.

Further, the storage unit is configured to store the target weight and position information of the target weight, and store a quantized target weight codebook and a quantized target weight dictionary.

Further, the operation unit includes at least one of the following:

a multiplier configured to multiply first input data by second input data to obtain data after multiplication;

an adder tree configured to add third input data stage by stage, or add the third input data and fourth input data to obtain data after addition; and an activation function operation unit configured to perform an activation function operation on fifth data to obtain output data, where the activation function is a sigmoid, tan h, relu, or softmax function.

Further, the operation unit further includes a pooling unit which is configured to perform a pooling operation on input data to obtain output data after pooling operation, where the pooling operation includes: average pooling, max pooling, or median pooling.

Further, the processing device includes:

an instruction control unit configured to receive an instruction stored in the storage unit, decode the instruction to obtain control information, so as to control the coarse-grained selection unit to perform data selection, control the lookup table unit to perform a table lookup operation, and control the operation unit to perform an operation in accordance with the control information.

Further, the instruction is a neural network dedicated instruction, including a control instruction, a data transfer instruction, an operation instruction, and a logic instruction.

Further, the neural network dedicated instruction is a Cambricon instruction set.

Further, the processing device includes:

an instruction caching unit configured to cache the instruction. The instruction caching unit is an on-chip cache.

Further, the processing device includes:

a target weight codebook caching unit configured to cache the target weight codebook. The target weight codebook caching unit is an on-chip cache.

Further, the processing device includes:

a target weight dictionary caching unit configured to cache the target weight dictionary. The target weight dictionary caching unit is an on-chip cache.

Further, the processing device includes:

a target weight location caching unit configured to cache the position information of the target weight. The target weight location caching unit is also configured to make each connection weight in the input data correspond to a corresponding input neuron. The target weight location caching unit is an on-chip cache.

Further, the one-to-one correspondence realized by the target weight location caching unit making each connection weight in the input data correspond to a corresponding input neuron is as follows:

using 1 to represent connection between a weight and an input neuron, 0 to represent connectionless, and a character string of 0 and 1 formed with the connection state between each group of outputs and all inputs to represent connection relations of the outputs.

Further, the one-to-one correspondence realized by the target weight location caching unit making each connection weight in the input data correspond to a corresponding input neuron is as follows:

using a distance from the location of an input neuron where first connection of a group of outputs is to a first input neuron, a distance from a second group of input neurons of the outputs to a previous input neuron, a distance from a third group of input neurons of the outputs to a previous input neuron . . . in a similar fashion, until all inputs of the outputs are exhausted, so as to represent connection relations of the outputs.

Further, the processing device includes:

an input neuron caching unit configured to cache an input neuron that is input to the coarse-grained selection unit. The input neuron caching unit is an on-chip cache.

Further, the processing device includes:

an output neuron caching unit configured to cache the output neuron. The output neuron caching unit is an on-chip cache.

Further, the processing device includes:

a direct memory access unit (DMA unit) which is configured to read/write data or instructions from/in the storage unit, the instruction caching unit, the target weight codebook caching unit, the target weight dictionary caching unit, the target weight location caching unit, the input neuron caching unit, and the output neuron caching unit.

Further, the processing device includes:

a pre-processing unit configured to pre-process original data, and store the pre-processed data in the storage unit.

The present disclosure provides a processing method including:

inputting a neuron and position information of a target weight, and selecting a neuron to be computed, where the target weight is a weight whose absolute value is greater than a preset threshold;

receiving a quantized target weight dictionary and a quantized target weight codebook, performing a table lookup operation to obtain a target weight of a neural network, and outputting the target weight; and receiving the selected neuron and the target weight, performing an operation on the neural network to obtain an neuron, and outputting the neuron.

Further, the method above further includes:

receiving an unquantized target weight for performing a neural network operation.

Further, the method above further includes:

receiving an instruction, decoding the instruction to obtain control information, and controlling the neural network operation according to the control information.

Further, the operation includes at least one of the following:

a multiplication operation for multiplying first input data by second input data to obtain data after multiplication;

an addition operation for adding third input data stage by stage, or add the third input data and fourth input data to obtain data after addition; and an activation function operation for performing an activation function operation on fifth data to obtain output data, where the activation function is a sigmoid, tan h, relu, or softmax function.

Further, the operation includes:

a pooling operation for performing a pooling operation on sixth input data to obtain output data after the pooling operation, where the pooling operation includes: average pooling, max pooling, or median pooling.

Further, the instruction is a neural network dedicated instruction, including a control instruction, a data transfer instruction, an operation instruction, and a logic instruction.

Further, the neural network dedicated instruction is a Cambricon instruction set. Each instruction in the Cambricon instruction set is 64 bits in length, and is composed of an opcode and an operand.

Further, the method above further includes:

pre-processing the input neuron and the target weight position information, where the pre-processing includes segmentation, Gauss filtering, binarization, regularization, and/or normalization.

Further, after receiving the selected neuron and the target weight, the method further includes:

storing the input neuron, the weight dictionary, the codebook, the instruction, and the output neuron; and caching the instruction, the input neuron, and the output neuron.

The present disclosure provides a data compression method including:

performing a coarse-grained pruning operation on weights of a neural network, which includes: selecting M weights from the neural network according to a sliding window, and when the M weights satisfy a preset condition, setting all or part of the M weights to zero; and performing a first retraining on the neural network, the weights that have been set to zero remain at zero during the training process; and quantizing the weights of the neural network, which includes: grouping the weights of the neural network, using a clustering algorithm to cluster each group of weights, computing a central weight for each cluster, and replacing weights in each cluster with the corresponding central weight of the cluster; encoding the central weights to obtain a codebook and a weight dictionary; and performing a second retraining on the neural network, where only the codebook is trained during the retraining, and the content of the weight dictionary remains unchanged.

Further, the preset condition is:

the amount of information of the M weights being less than a first preset threshold.

Further, the amount of information of the M weights is an arithmetic mean of absolute values of the M weights, a geometric mean of the absolute values of the M weights, or a maximum value of the M weights. The first preset threshold is a first threshold, a second threshold, or a third threshold. The amount of information of the M weights being less than the first preset threshold includes:

the arithmetic mean of the absolute values of the M weights being less than the first threshold, or the geometric mean of the absolute values of the M weights being less than the second threshold, or the maximum value of the M weights being less than the third threshold.

Further, the processing method further includes: repeatedly selecting M weights from the neural network by using the sliding window, and when the M weights satisfy the preset condition, setting all or part of the M weights to zero; and performing the first retraining on the neural network until no weight can be set to zero under the premise that precision does not suffer a loss of a preset amount. Further, the preset amount is x %, where x is between 0 and 5.

Further, the neural network includes a fully connected layer, a convolution layer, and a LSTM layer. Selecting M weights from the neural network according to the sliding window includes:

when the weights of the fully connected layer of the neural network are a two-dimensional matrix (Nin,Nout), where Nin denotes a count of input neurons, Nout denotes a count of output neurons, the fully connected layer has Nin*Nout weights; a size of the sliding window is Bin*Bout, where Bin is an integer greater than 0 and less than or equal to Nin, and Bout is an integer greater than 0 and less than or equal to Nout. Performing a coarse-grained pruning operation on the weights of the fully connected layer of the neural network by the processing device includes:

sliding, by the sliding window, along a direction of Bin with a stride being Sin, or sliding along a direction of Bout with a stride being Sout, where Sin is a positive integer greater than 0 and less than or equal to Bin, and Sout is a positive integer greater than 0 and less or equal to Bout; and selecting M values from the Nin*Nout weights through the sliding window, where M=Bin*Bout.

Selecting M weights from the convolution layer of the neural network by the processing device includes:

when the weights of the convolution layer of the neural network are a four-dimensional matrix (Nfin, Nfout, Kx, Ky), where Nfin denotes a count of input feature maps, Nfout denotes a count of output feature maps, (Kx, Ky) denotes a size of a convolution kernel, the convolution layer has Nfin*Nfout*Kx*Ky weights; the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky.

Selecting M weights from the convolution layer of the neural network by the processing device further includes: sliding, by the sliding window, along a direction of Bfin with a stride being Sfin, or sliding along a direction of Bfout with a stride being Sfout, or sliding along a direction of Bx with a stride being S, or sliding along a direction of By with a stride being Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By; and selecting M weights from the Nfin*Nfout*Kx*Ky weights through the sliding window, where M=Bfin*Bfout*Bx*By.

Selecting M weights from the LSTM layer of the neural network by the processing device includes:

when the weights of the LSTM layer of the neural network are composed of weights of m fully connected layers, where m is an integer greater than 0, the weights of an $i^{th}$ fully connected layer are (Nin_i, Nout_i), where i is an integer greater than 0 and less than or equal to m, Nin_i denotes a count of input neurons of the $i^{th}$ fully connected layer, Nout_i denotes a count of output neurons of the $i^{th}$ fully connected layer, and a size of the sliding window is Bin_i*Bout_i, where Bin_i is an integer greater than 0 and less than or equal to Nin_i, Bout_i is an integer greater than 0 and less than or equal to Nout_i.

Selecting M weights from the LSTM layer of the neural network by the processing device further includes: sliding, by the sliding window, along a direction of Bin_i with a stride being Sin_i, or sliding along a direction of Bout_i with a stride being Sout_i, where Sin_i is a positive integer greater than 0 and less than or equal to Bin_i, and Sout_i is a positive integer greater than 0 and less or equal to Bout_i; and selecting M weights from the Bin_i*Bout_i weights through the sliding window, where M=Bin_i*Bout_i.

Further, a back propagation algorithm is used for the first retraining, and the weights that have been set to zero remain at zero during the training process.

Further, a method of grouping the weights of the neural network includes:

dividing the weights of the neural network into a group; and/or grouping the weights of the neural network according to a type of a layer; and/or grouping the weights of the neural network according to an inter-layer grouping method and/or an intra-layer grouping method.

Further, grouping the weights of the neural network according to a type of a layer includes:

dividing the weights of all convolution layers, the weights of all fully connected layers, and the weights of all LSTM layers of the neural network into respective groups.

Further, grouping the weights of the neural network according to the inter-layer grouping method includes:

dividing the weights of one or more convolution layers, the weights of one or more fully connected layers, and the weights of one or more LSTM layers of the neural network into respective groups.

Further, grouping the weights of the neural network according to the intra-layer grouping method includes:

segmenting the weights of a layer of the neural network, where each segment is regarded as a group.

Further, the clustering algorithm includes K-means, K-medoids, Clara and/or Clarans.

Further, a method of selecting the central weight is: minimizing a cost function $J(w, w_0)$ $$J(w, w_0) = \sum_{i=1}^{n} (w_i - w_0)^2,$$

where w denotes all weights of a cluster, w0 denotes a central weight, n denotes a count of weights in the cluster, wi is an $i^{th}$ weight of the cluster, i denotes an integer greater than 0 and less than or equal to n.

Performing the second retraining on the clustered and encoded neural network includes: using the back propagation algorithm to retrain the clustered and encoded neural network, the weights that have been set to 0 remain at 0 during the training process, and only the weight codebook is trained while the weight dictionary is not trained.

The present disclosure provides a compression device for neural network data. The device includes:

a memory configured to store an operation instruction; and a processor configured to execute the operation instruction in the memory, and operate according to any of the above-mentioned compression methods when executing the operation instruction.

The present disclosure provides a processing device including:

a coarse-grained selection unit configured to input a neuron and position information of a target weight, and select a neuron to be computed, where the target weight is a weight whose absolute value is greater than a second preset threshold;

a lookup table unit configured to receive a quantized target weight dictionary and a quantized target weight codebook, perform a table lookup operation to obtain a target weight of a neural network, and output the target weight; and an operation unit configured to receive the selected neuron and the target weight, perform an operation on the neural network to obtain an neuron, and output the neuron.

Further, the lookup table unit is also configured to directly transfer an unquantized target weight to the operation unit through a bypass.

Further, the processing device includes an instruction control unit configured to receive an instruction, decode the instruction to obtain control information, and control the operation unit according to the control information.

Further, the device includes a storage unit configured to store a neuron, a weight, and an instruction of the neural network.

Further, the storage unit is configured to store a target weight and position information of the target weight, and store the quantized target weight codebook and the quantized target weight dictionary.

Further, the operation unit includes at least one of the following:

a multiplier configured to multiply first input data by second input data to obtain data after multiplication;

an adder tree configured to add third input data stage by stage, or add the third input data and fourth input data to obtain data after addition; and an activation function operation unit configured to perform an activation function operation on fifth data to obtain output data, where the activation function is a sigmoid, tan h, relu, or softmax function.

Further, the operation unit further includes a pooling unit which is configured to perform a pooling operation on input data to obtain output data after pooling operation, where the pooling operation includes: average pooling, max pooling, or median pooling.

Further, the processing device includes: an instruction control unit configured to receive an instruction stored in the storage unit, decode the instruction to obtain control information, so as to control the coarse-grained selection unit to perform data selection, control the lookup table unit to perform a table lookup operation, and control the operation unit to perform an operation in accordance with the control information.

Further, the instruction is a neural network dedicated instruction, including a control instruction, a data transfer instruction, an operation instruction, and a logic instruction.

Further, the neural network dedicated instruction is a Cambricon instruction set. Each instruction in the Cambricon instruction set is 64 bits in length, and is composed of an opcode and an operand.

Further, the control instruction is configured to control the execution process of a neural network, and includes a jump instruction and a conditional branch instruction.

Further, the Cambricon data transfer instruction is configured to complete data transfer between different storage media, including a load instruction, a storage instruction, a moving instruction.

Further, the operation instruction is configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM neural network operation instruction, a LRN neural network operation instruction, a LCN neural network operation instruction, a LSTM neural network operation instruction, a RNN neural network operation instruction, a RELU neural network operation instruction, a PRELU neural network operation instruction, a SIGMOID neural network operation instruction, a TAN H neural network operation instruction, and a MAXOUT neural network operation instruction.

Further, the logic instruction is configured to complete a logic operation of the neural network, including a vector logic operation instruction and a scalar logic operation instruction.

Further, the logic operation instruction includes a vector comparison instruction, a vector logic operation instruction, and a vector greater-than-merging operation instruction. Optionally, the vector comparison includes but is not limited to greater than, less than, equal to, greater than or equal to (≥), less than or equal to (≤), and not equal to. Optionally, the vector logic operation includes AND, OR, and NOT.

Further, the scalar logic operation includes scalar comparison and a scalar logic operation. Optionally, the scalar comparison includes but is not limited to greater than, less than, equal to, greater than or equal to (≥), less than or equal to (≤), and not equal to. Optionally, the scalar logic operation includes AND, OR, and NOT.

Further, the processing device includes an instruction caching unit configured to cache the instruction. The instruction caching unit is an on-chip cache.

Further, the processing device includes a target weight codebook caching unit configured to cache the target weight codebook. The target weight codebook caching unit is an on-chip cache.

Further, the processing device includes a target weight dictionary caching unit configured to cache the target weight dictionary. The target weight dictionary caching unit is an on-chip cache.

Further, the processing device includes a target weight location caching unit configured to cache the position information of the target weight. The target weight location caching unit is also configured to make each connection weight in input data correspond to a corresponding input neuron. The target weight location caching unit is an on-chip cache.

Further, the one-to-one correspondence realized by the target weight location caching unit making each connection weight in the input data correspond to a corresponding input neuron is as follows: using 1 to represent connection between a weight and an input neuron, 0 to represent connectionless, and a character string of 0 and 1 formed with the connection state between each group of outputs and all inputs to represent connection relations of the outputs.

Further, the one-to-one correspondence realized by the target weight location caching unit making each connection weight in the input data correspond to a corresponding input neuron is as follows: using a distance from the location of an input neuron where first connection of a group of outputs is to a first input neuron, a distance from a second group of input neurons of the outputs to a previous input neuron, a distance from a third group of input neurons of the outputs to a previous input neuron . . . in a similar fashion, until all inputs of the outputs are exhausted, so as to represent connection relations of the outputs.

Further, the processing device includes an input neuron caching unit configured to cache an input neuron that is input to the coarse-grained selection unit. The input neuron caching unit is an on-chip cache.

Further, the processing device includes an output neuron caching unit configured to cache an output neuron. The output neuron caching unit is an on-chip cache.

Further, the processing device includes a direct memory access unit (DMA unit) which is configured to read/write data or instructions from/in the storage unit, the instruction caching unit, the target weight codebook caching unit, the target weight dictionary caching unit, the target weight location caching unit, the input neuron caching unit, and the output neuron caching unit.

Further, the processing device includes a pre-processing unit configured to pre-process original data, and store the pre-processed data in the storage unit.

The present disclosure provides a processing method including:

inputting a neuron and position information of a target weight, and selecting a neuron to be computed, where the target weight is a weight whose absolute value is greater than a preset threshold;

receiving a quantized target weight dictionary and a quantized target weight codebook, performing a table lookup operation to obtain a target weight of a neural network, and outputting the target weight; and receiving the selected neuron and the target weight, performing an operation on the neural network to obtain an neuron, and outputting the neuron.

Further, the processing method includes: receiving an unquantized target weight for performing a neural network operation.

Further, the processing method includes: receiving an instruction, decoding the instruction to obtain control information, and controlling the neural network operation according to the control information.

Further, the operation includes at least one of the following: a multiplication operation for multiplying first input data by second input data to obtain data after multiplication; an addition operation for adding third input data stage by stage in an adder tree, or adding the third input data and fourth input data to obtain data after addition; and an activation function operating for performing an activation function operation on fifth data to obtain output data, where the activation function is a sigmoid, tan h, relu, or softmax function.

Further, the operation further includes a pooling operation for performing a pooling operation on sixth input data to obtain output data after the pooling operation, where the pooling operation includes: average pooling, max pooling, or median pooling.

Further, the instruction is a neural network dedicated instruction, including a control instruction, a data transfer instruction, an operation instruction, and a logic instruction.

Further, the control instruction is configured to control the execution process of a neural network, and includes a jump instruction and a conditional branch instruction.

Further, the data transfer instruction is configured to complete data transfer between different storage media, including a load instruction, a storage instruction, a moving instruction.

Further, the operation instruction is configured to complete an arithmetic operation of the neural network, including a matrix operation instruction, a vector operation instruction, a scalar operation instruction, a convolution neural network operation instruction, a fully connected neural network operation instruction, a pooling neural network operation instruction, a RBM neural network operation instruction, a LRN neural network operation instruction, a LCN neural network operation instruction, a LSTM neural network operation instruction, a RNN neural network operation instruction, a RELU neural network operation instruction, a PRELU neural network operation instruction, a SIGMOID neural network operation instruction, a TAN H neural network operation instruction, and a MAXOUT neural network operation instruction.

Further, the neural network dedicated instruction is a Cambricon instruction set. Each instruction in the Cambricon instruction set is 64 bits in length, and is composed of an opcode and an operand.

Further, the logic instruction is configured to complete a logic operation of the neural network, including a vector logic operation instruction and a scalar logic operation instruction.

Further, the Cambricon logic operation instruction includes a vector comparison instruction, a vector logic operation instruction, and a vector greater-than-merging operation instruction. Optionally, the vector comparison includes but is not limited to greater than, less than, equal to, greater than or equal to (≥) less than or equal to (≤), and not equal to. Optionally, the vector logic operation includes AND, OR, and NOT.

Further, the scalar logic operation includes scalar comparison and a scalar logic operation. Optionally, the scalar comparison includes but is not limited to greater than, less than, equal to, greater than or equal to (≥) less than or equal to (≤), and not equal to. Optionally, the scalar logic operation includes AND, OR, and NOT.

Further, the method includes: pre-processing the input neuron and the target weight position information, where the pre-processing includes segmentation, Gauss filtering, binarization, regularization, and/or normalization.

Further, after receiving the selected neuron and the target weight, the processing method includes: storing the input neuron, the weight dictionary, the codebook, the instruction, and the output neuron; and caching the instruction, the input neuron, and the output neuron.

According to a thirty-forth aspect, the present disclosure provides an electronic device that includes any of the above-mentioned data processing devices. The electronic device includes a data processing device, a robot, a computer, a printer, a scanner, a tablet, a smart terminal, a mobile phone, a traffic recorder, a navigator, a sensor, a webcam, a cloud server, a camera, a video camera, a projector, a watch, a headphone, a mobile storage, a wearable device, a vehicle, a household appliance, and/or a medical equipment.

The vehicle includes an airplane, a ship, and/or a car. The household electrical appliance may include a television, an air conditioner, a microwave oven, a refrigerator, an electric rice cooker, a humidifier, a washing machine, an electric lamp, a gas cooker, and/or a range hood. The medical equipment includes a nuclear magnetic resonance spectrometer, a B-ultrasonic scanner, and/or an electrocardiograph.

The present disclosure provides an operation device including:

a filtering unit (400) configured to select a feature map and its corresponding weight by filtering according to a connection state array of feature maps composed of output neurons and input neurons, and output the feature value and its corresponding weight to an operation unit (600); and/or the filtering unit (400) is configured to select a row of feature maps and its corresponding row of weights by filtering according to a connection state array of each row of the feature maps composed of the output neurons and the input neurons, and output the row of feature maps and its corresponding row of weights to the operation unit (600); and/or the filtering unit (400) is configured to select a column of feature maps and its corresponding column of weights by filtering according to a connection state array of each column of the feature maps composed of the output neurons and the input neurons, and output the column of feature maps and its corresponding column of weights to the operation unit (600).

The operation device further includes the operation unit (600) which is configured to perform an artificial neural network operation that supports structure clipping on the data output by the filtering unit (400) according to an instruction to obtain an output neuron.

Further, a filtering process of the filtering unit (400) includes:

if the weights are not filtered offline, selecting a feature map and its corresponding weight by filtering according to the connection state array of the feature maps composed of the output neurons and the input neurons, and then outputting the feature map and its corresponding weight obtained by filtering to the operation unit; and/or, selecting a row/column of feature maps and its corresponding row/column of weights by filtering according to a connection state array of each row/column of the feature maps composed of the output neurons and the input neurons, and outputting the row/column of feature maps and its corresponding row/column of weights to the operation unit.

If the weights have been filtered offline, the filtering process of the filtering unit (400) includes: selecting a feature map by filtering according to the connection state array of the feature maps composed of the output neurons and the input neurons, then outputting the feature map obtained by filtering to the operation unit, at the same time, directly transferring a weight obtained by filtering to the operation unit without passing through the filtering unit; and/or, selecting a row/column of feature maps and its corresponding row/column of weights by filtering according to a connection state array of each row/column of the feature maps composed of the output neurons and the input neurons, and outputting the row/column of feature maps and its corresponding row/column of weights to the operation unit.

Further, the connection state array may represent a connection state between an output neuron and an input neuron in two ways.

A first way: using numbers "1" and "0" to represent a connection state where "1" represents connection and "0" represents connectionless, or "0" represents connection and "1" represents connectionless. In this way, the connection state array of the feature maps composed of the output neurons and the input neurons is an array of "0" and "1" formed with the connection states of the feature maps composed of each output neuron and all the input neuron, and the connection state array of each row/column of the feature maps composed of the output neurons and the input neurons is an array of "0" and "1" formed with the connection states of each row/column of the feature maps composed of each output neuron and all the input neuron.

A second way: using a distance to represent a connection status. In this way, the connection state array of the feature maps composed of the output neurons and the input neurons is an array representing the connection state of the output neurons which is formed by using a distance from the location of an input neuron where a first connection of each output neuron is to a first input neuron, a distance from an input neuron where a second connection is to an input neuron where a previous connection is, a distance from an input neuron where a third connection is to an input neuron where a previous connection is . . . in a similar fashion, until all the input neurons of the output neuron are exhausted.

Further, elements of the array in the second way are non-negative integers.

Further, when the device selects a feature map and a corresponding weight for computing, or selects a row/column of feature maps and its corresponding row/column of weights by filtering according to the connection state array of the feature maps composed of the output neurons and the input neurons, or according to the connection state array of each row/column of the feature maps composed of the output neurons and the input neurons, a condition to be satisfied by the device includes:

a first way of representation: selecting a feature map and a corresponding weight for computing an output neuron, where all element values of a corresponding connection state array are numbers indicating connection; and/or selecting a row/column of the feature maps and a corresponding row/column of weights for computing output neurons, where all element values of a corresponding connection state array are numbers indicating connection;

a second way of representation: for a connection state array Index A which corresponds to each output neuron $O_j$, the value of each bit is a non-negative integer, all input neurons are denoted as $I_1, I_2, \ldots, I_N$, let input neurons connected to the output neuron be $I_{k_1}, I_{k_2}, \ldots, I_{k_n}$, $n \leq N$, $k_1, k_2, \ldots k_n \in \{1, 2, \ldots, N\}$, and their values are unknown, then Index A has n bits, a value of a first bit $A_1$ indicates a distance from an input neuron where a first connection is to $I_1$, and a value of a p-th bit $A_p$, where $p=2, 3, \ldots, n$, indicates a distance from an input neuron where a current connection is to an input neuron where a previous connection is. In this way, input neurons that are selected for computing the output neuron $O_j$ are $I_{k_1}, I_{k_2}, \ldots, I_{k_n}$, and corresponding weights are $W_{k_1 j}, W_{k_2 j}, \ldots, W_{k_n j}$, where $k_1=A_1+1$, $k_p=A_p+k_{p-1}$ Further, the operation device includes a storage unit (100) configured to store data and an instruction.

The data stored in the storage unit (100) includes:

feature maps composed of input neurons, weights, a connection state array of feature maps composed of output neurons and input neurons, a connection state array of each row of feature maps composed of output neurons and input neurons, a connection state array of each column of feature maps composed of output neurons and input neurons, feature maps composed of output neurons, and other data and parameters required for the operation of the artificial neural network.

Further, the operation unit (600) includes:

a first part: a multiplier configured to multiply first input data by second input data to obtain output data;

a second part: one or more adders configured to add the multiplication result stage-by-stage in the adder tree to obtain a weighted sum, then perform a bias operation on the weighted sum or perform no operation on the weighted sum; and a third part: an activation function unit configured to perform an activation function operation on the weighted sum to obtain an output neuron.

Further, the one or more adders form an adder tree.

Further, the operation unit (600) includes: a pooling unit configured to perform a pooling operation on input data.

Further, the operation device includes a caching unit (300) configured to cache the data and the instruction.

The present disclosure provides a device for performing a forward operation of an artificial neural network. The device includes a floating-point data statistics module, a floating-point data conversion unit, and a floating-point data operation module.

The floating-point data statistics module is configured to carry out a statistical analysis on data of various types required for a forward operation of the artificial neural network to obtain an exponent bit offset and a length of the exponent bit (EL).

The floating-point data conversion unit is configured to convert a long-bit floating-point data type to a short-bit floating-point data type according to the exponent bit offset and the length of the exponent bit (EL) obtained by the floating-point data statistics module.

After all inputs, weights, and/or biased data required for the forward operation of the artificial neural network are expressed in the short-bit floating-point data type by the floating-point data conversion unit, the floating-point data operation module is configured to perform the forward operation of the artificial neural network on the short-bit floating-point data.

The floating-point data statistics module includes a data extraction unit, a statistics unit, and an analysis unit. The data extraction unit is configured to extract different types of data in the forward operation based on long-bit floating-point data. The statistics unit is configured to perform a statistical analysis on a data range of data of the same type and data distribution of each data segment. The analysis unit is configured to obtain the length of the exponent bit (EL) and the exponent bit offset expressed in the short-bit floating-point data type that should be set for each data type according to a statistical result obtained by the statistics unit.

The device for performing a forward operation of an artificial neural networks further includes a rounding unit. The rounding unit is configured to perform a rounding operation on data that exceeds a precision range of the short-bit floating-point data type after an operation finishes.

The rounding unit may be one of the following: a random rounding unit, a rounding to the nearest integer unit, a rounding up unit, a rounding down unit, and a rounding off unit.

The random rounding unit is configured to perform the following operation:

$$y = \begin{cases} \lfloor x \rfloor & w.p.\ 1 - \dfrac{x - \lfloor x \rfloor}{\varepsilon} \\ \lfloor x \rfloor + \varepsilon & w.p.\ \dfrac{x - \lfloor x \rfloor}{\varepsilon} \end{cases},$$

where y denotes short-bit floating-point data after random rounding, x denotes long-bit floating-point data before random rounding, ε denotes a smallest positive integer representable by the representation format of the current short-bit floating-point data, in other words, $2^{offset-(X-1-EL)}$, $\lfloor x \rfloor$ denotes short-bit floating-point data obtained by directly truncating the original data x, w.p. denotes a probability, which means that the probability of the data y obtained by random rounding being $\lfloor x \rfloor$ is $\lfloor x \rfloor+\varepsilon$, and the probability of $$1 - \frac{x - \lfloor x \rfloor}{\varepsilon}$$

is $$\frac{x - \lfloor x \rfloor}{\varepsilon}.$$

The rounding to the nearest integer unit is configured to perform the following operation:

$$y = \begin{cases} \lfloor x \rfloor & \text{if } \lfloor x \rfloor \le x \le \lfloor x \rfloor + \frac{\varepsilon}{2} \\ \lfloor x \rfloor + \varepsilon & \text{if } \lfloor x \rfloor + \frac{\varepsilon}{2} \le x \le \lfloor x \rfloor + \varepsilon \end{cases},$$

where y denotes short-bit floating-point data after rounding to the nearest integer, x denotes long-bit floating-point data before rounding to the nearest integer, ε denotes a smallest positive integer representable by the representation format of the current short-bit floating-point data, in other words, $2^{offset-(X-1-EL)}$, and $\lfloor x \rfloor$ denotes an integral multiple of ε, a value of which is a maximum less than or equal to x.

The rounding up unit is configured to perform the following operation:

$$y = \lceil x \rceil,$$

where y denotes short-bit floating-point data after rounding up, x denotes long-bit floating-point data before rounding up, $\lceil x \rceil$ denotes an integral multiple of ε, a value of which is a minimum greater than or equal to x, and ε denotes a smallest positive integer representable by the representation format of the current short-bit floating-point data, in other words, $2^{offset-(X-1-EL)}$.

The rounding down unit is configured to perform the following operation:

$$y = \lfloor x \rfloor$$

where y denotes short-bit floating-point data after rounding down, x denotes long-bit floating-point data before rounding down, $\lfloor x \rfloor$ denotes an integral multiple of ε, a value of which is a maximum smaller than or equal to x, and ε denotes a smallest positive integer representable by the representation format of the current short-bit floating-point data, in other words, $2^{offset-(X-1-EL)}$.

The rounding off unit is configured to perform the following operation:

$$y = [x],$$

where y denotes short-bit floating-point data after rounding off, x denotes long-bit floating-point data before rounding off, [x] denotes short-bit floating-point data obtained by directly truncating the original data x.

The floating-point data conversion unit is configured to perform a rounding operation on data to be processed through the rounding unit, then convert the long-bit floating-point data type to the short-bit floating-point data type according to the exponent bit offset and the length of the exponent bit (EL) obtained by the floating-point data statistics module.

The device for performing a forward operation of an artificial neural network further includes an operation caching unit. The operation caching unit is configured to store an intermediate operation result of addition and multiplication during a forward operation as the long-bit floating-point data type.

The present disclosure provides a method of performing a forward operation of an artificial neural networks. The method includes:

obtaining long-bit floating-point data of each layer of an artificial neural network, including weights, biases, and/or input and output values of each layer;

analyzing the obtained long-bit floating-point data to obtain an exponent bit offset and a length of the exponent bit (EL) required for storing the long-bit floating-point data;

according to the exponent bit offset and the length of the exponent bit (EL), representing all the long-bit floating-point data in the short-bit floating-point data type; and performing a forward operation of the artificial neural network on the short-bit floating-point data.

In the step of analyzing the obtained long-bit floating-point data, different layers and different types of data of the artificial neural network are analyzed respectively to obtain the exponent bit offset and the length of the exponent bit (EL) corresponding to different types of data of the artificial neural network.

In the step of performing a forward operation of the artificial neural network on the short-bit floating-point data, an intermediate operation result of addition and multiplication during the forward operation is stored as the long-bit floating-point data type.

After the forward operation of the artificial neural network is performed, the long-bit floating-point data copies of weights and biased data which also participate in a backward operation are retained. Other data participating in the backward operation is converted from short-bit floating-point data to long-bit floating-point data, then the backward operation is performed according to the long-bit floating-point data copies of the weights and biased data and the other data which is converted to long-bit floating-point data.

The present disclosure provides a device for performing a forward operation of an artificial neural network. The device includes a floating-point data statistics module, a data conversion unit, and a fixed-point data operation module.

The floating-point data statistics module is configured to carry out a statistical analysis on data of various types required for a forward operation of the artificial neural network to obtain a location of a decimal point (point location).

The data conversion unit is configured to convert a long-bit floating-point data type to a short-bit floating-point data type according to the location of the decimal point (point location) obtained by the floating-point data statistics module.

After all inputs, weights, and/or biased data required for the forward operation of the artificial neural network are represented in the short-bit floating-point data type by the data conversion unit, the fixed-point data operation module is configured to perform the forward operation of the artificial neural network on the short-bit floating-point data.

The floating-point data statistics module includes a data extraction unit, a statistics unit, and an analysis unit. The data extraction unit is configured to extract different types of data in the forward operation based on long-bit floating-point data. The statistics unit is configured to perform a statistical analysis on a data range of data of the same type and data distribution of each data segment. The analysis unit is configured to obtain the location of the decimal point (point location) represented in the short-bit fixed-point data type that should be set for each data type according to a statistical result obtained by the statistics unit.

The device for performing a forward operation of an artificial neural network further includes a rounding unit. The rounding unit is configured to perform a rounding operation on data that exceeds a precision range of the short-bit fixed-point data type after an operation is finished.

The rounding unit may be one of the following: a random rounding unit, a rounding to the nearest integer unit, a rounding up unit, a rounding down unit, and a rounding off unit.

The random rounding unit is configured to perform the following operation:

$$y=\begin{cases}\lfloor x\rfloor & w.p.\ 1-\frac{x-\lfloor x\rfloor}{\varepsilon}\\ \lfloor x\rfloor+\varepsilon & w.p.\ \frac{x-\lfloor x\rfloor}{\varepsilon}\end{cases},$$

where y denotes short-bit fixed-point data after random rounding, x denotes long-bit floating-point data before random rounding, ε is a smallest positive integer representable by the representation format of the current short-bit fixed-point data, in other words, $2^{-Point\_location}$, $\lfloor x\rfloor$ is short-bit fixed-point data obtained by directly truncating the original data x, w.p. denotes a probability, which means that the probability of the data y obtained by random rounding being $\lfloor x\rfloor$ is $\lfloor x\rfloor+\varepsilon$, and the probability of $\lfloor x\rfloor+\varepsilon$ is $$\frac{x-\lfloor x\rfloor}{\varepsilon}.$$

The rounding to the nearest integer unit is configured to perform the following operation:

$$y=\begin{cases}\lfloor x\rfloor & \text{if } \lfloor x\rfloor\le x\le\lfloor x\rfloor+\frac{\varepsilon}{2}\\ \lfloor x\rfloor+\varepsilon & \text{if } \lfloor x\rfloor+\frac{\varepsilon}{2}\le x\le\lfloor x\rfloor+\varepsilon\end{cases},$$

where y denotes short-bit fixed-point data after rounding to the nearest integer, x denotes long-bit floating-point data before rounding to the nearest integer, ε is a smallest positive integer representable by the representation format of the current short-bit fixed-point data, in other words, $2^{-Point\_location}$, and $\lfloor x\rfloor$ is an integral multiple of ε, a value of which is a maximum less than or equal to x.

The rounding up unit is configured to perform the following operation:

$$y=\lceil x\rceil,$$

where y denotes short-bit fixed-point data after rounding up, x denotes long-bit floating-point data before rounding up, $\lceil x\rceil$ is an integral multiple of ε, a value of which is a minimum greater than or equal to x, and ε is a smallest positive integer representable by the representation format of the current short-bit fixed-point data, in other words, $2^{-Point\_location}$.

The rounding down unit is configured to perform the following operation:

$$y=\lfloor x\rfloor,$$

where y denotes short-bit fixed-point data after rounding down, x denotes long-bit floating-point data before rounding down, $\lfloor x\rfloor$ is an integral multiple of ε, a value of which is a maximum less than or equal to x, and ε is a smallest positive integer representable by the representation format of the current short-bit fixed-point data, in other words, $2^{-Point\_location}$.

The rounding off unit is configured to perform the following operation:

$$y=[x],$$

where y denotes short-bit fixed-point data after rounding off, x denotes long-bit floating-point data before rounding off, [x] denotes short-bit fixed-point data obtained by directly truncating the original data x.

The data conversion unit is configured to perform a rounding operation on data to be processed through the rounding unit, and then convert the long-bit floating-point data type to the short-bit floating-point data type according to the location of the decimal point (point location) obtained by the floating-point data statistics module.

The device for performing a forward operation of an artificial neural network further includes an operation caching unit. The operation caching unit is configured to store an intermediate operation result of addition and multiplication during a forward operation as the long-bit floating-point data type.

The present disclosure provides a method of performing a forward operation of an artificial neural network. The method includes:

- a step 1, obtaining long-bit floating-point data of each layer of an artificial neural network, including weights, biases, and/or input and output values of each layer;
- a step 2: for the obtained long-bit floating-point data, performing a statistical analysis to obtain a proportion of data falling in a decreasing interval: $[-2^{X-1-i}, 2^{X-1-i}-2^{-i}]$ i=0, 1, . . . , N, where X is a total count of bits of a short-bit fixed-point data type; and denoting the corresponding proportion obtained as: $p_0$, $p_1$, . . . , $p_N$, where N is a preset positive integer;
- a step 3: for the long-bit floating-point data, presetting an overflow rate EPL, and taking the location of the decimal point (point location) as: $\max\{i|p_i\ge 1-EPL, i\in\{0, 1, \ldots, N\}\}$, which means taking a largest i in 0, 1, . . . , N so that $p_i\ge 1-EPL$;
- a step 4: according to the point location, representing all the long-bit floating-point data as short-bit fixed-point data; and
- a step 5: performing a forward operation of the artificial neural network on the short-bit fixed-point data.

In the method of performing a forward operation of an artificial neural network, different layers and different types of data of an artificial neural network are analyzed respectively to obtain the location of the decimal point (point location) corresponding to different types of data of the artificial neural network, and are computed respectively.

In the step of performing a forward operation of the artificial neural network on the short-bit fixed-point data, an intermediate operation result of addition and multiplication during the forward operation is stored as the long-bit floating-point data type.

The present disclosure provides an on-chip data partitioning read-write method. The method includes:

a data partitioning step: storing on-chip data in different areas according to a data partitioning strategy, where the on-chip data is stored in an on-chip storage medium and an off-chip storage medium respectively;

a pre-processing step: before data splicing, pre-processing an on-chip address index of the on-chip stored data; and a data splicing step: splicing the on-chip stored data and off-chip input data according to the data partitioning strategy to obtain an original data representation.

The Method Also Includes:

a data storage step: storing and moving the on-chip stored data in the on-chip storage medium and the off-chip input data from the off-chip storage medium.

In the storage step, the reading and writing ports are separated, so that the reading and writing of data are independent of each other.

The Pre-Processing Step Also Includes:

operating the on-chip stored data; and operating data input from the external.

The data input from the external includes the off-chip input data and data that is directly read in by the reading and writing ports.

The Data Storage Step Also Includes:

indexing the on-chip stored data according to the on-chip address index;

outputting data that has been indexed; and writing data to be stored to a corresponding storage position according to a writing address.

The Data Partitioning Step Also Includes:

partitioning address space into off-chip data space and on-chip data space; and replacing data between the on-chip storage medium and the off-chip storage medium according to a data replacement strategy. The data replacement strategy includes replacing in order, replacing in reverse order, and replacing randomly.

The data partitioning strategy includes fixed-point data partitioning and floating-point data partitioning.

The Data Splicing Step Also Includes:

a way of transferring the on-chip and off-chip data: converting the original data representation to all or part of data indices, and splicing results of the all or part of the on-chip data indices to obtain the original data representation.

The data splicing step is performed based on an on-chip/off-chip data path or an on-chip data path. The on-chip/off-chip data path includes PCI, PCIE, and the HT interconnection technology. The on-chip data path includes FAT-TREE, the H-TREE interconnection technology. A connection method of on-chip and off-chip data include a multi-chip interconnection structure.

Data in the on-chip storage medium or the off-chip storage medium can be read/written one or more times, and can be read to one or more on-chip operation units. The on-chip storage medium or the off-chip storage medium can be read/written one or more times from the external, and can be read/written one or more times from the internal.

The present disclosure provides an on-chip data partitioning read-write system. The system includes:

a data partitioning module configured to partition on-chip data into different areas according to a data partitioning strategy, and store the data in an on-chip storage medium and an off-chip storage medium respectively;

a pre-processing module configured to pre-process an on-chip address index of the on-chip stored data before data splicing; and a data splicing module configured to splice the on-chip stored data and off-chip input data according to the data partitioning strategy to obtain an original data representation.

The method also includes:

a storage module configured to store and move the on-chip stored data in the on-chip storage medium and the off-chip input data from the off-chip storage medium.

The storage module has separate reading and writing ports, so that the reading and writing of data are independent of each other.

The pre-processing module also includes:

an on-chip processing sub-module configured to operate the on-chip stored data; and an off-chip processing sub-module configured to operate data input from the external.

The data input from the external includes the off-chip input data and data that is directly read in by the reading and writing ports.

The storage module also includes:

an address indexing interface configured to index the on-chip stored data according to the on-chip address index;

an address reading-out interface configured to output the on-chip stored data that has been indexed; and an address writing-in interface configured to write data to be stored to a corresponding storage position according to a writing address.

The data partitioning module also includes:

an address partitioning sub-module configured to partition address space into off-chip data space and on-chip data space; and an data replacing sub-module configured to replace data between the on-chip storage medium and the off-chip storage medium according to a data replacement strategy, where the data replacement strategy includes replacing in order, replacing in reverse order, and replacing randomly.

The data partitioning strategy includes fixed-point data partitioning and floating-point data partitioning. The data partitioning module is realized based on one or more on-chip computation units in a chip. The on-chip computation units initiate a reading/writing request and process the original data obtained by splicing.

The data splicing module also includes:

an index splicing sub-module configured to convert the original data representation to all or part of data indices for transferring the on-chip and off-chip data, and splice results of the all or part of the on-chip data indices to obtain the original data representation.

The data splicing module works based on an on-chip/off-chip data path or an on-chip data path. The on-chip/off-chip data path includes PCI, PCIE, and the HT interconnection technology. The on-chip data path includes FAT-TREE, the H-TREE interconnection technology. A connection method of on-chip and off-chip data include a multi-chip interconnection structure.

Data in the on-chip storage medium or the off-chip storage medium can be read/written one or more times, and can be read to one or more on-chip operation units. The on-chip storage medium or the off-chip storage medium can be read/written one or more times from the external. The on-chip storage medium can be read/written one or more times from the internal.

The present disclosure provides an on-chip read-write device which includes the above-mentioned on-chip data partitioning read-write system.

The on-chip read-write device includes a static random access memory, a dynamic random access memory, an enhanced dynamic random access memory, a register, a non-volatile memory, or a 3D memory.

The present disclosure provides a device for performing a forward operation of an artificial neural network. The device includes an instruction caching unit, a controller unit, a direct memory access unit, an H-tree module, a primary operation module, and a plurality of secondary operation modules. The instruction caching unit is configured to read an instruction through the direct memory access unit and cache the instruction.

The controller unit is configured to read the instruction from the instruction caching unit and decode the instruction into a micro-instruction for controlling the H-tree module, the primary operation module, and the secondary operation modules.

The direct memory access unit is configured to write data from external address space to the corresponding data caching units of the primary operation module and each secondary operation module, or read data from the data caching unit to the external address space.

When back training of each neural network layer begins, the primary operation module transfers an input neuron vector of a current layer to all the secondary operation modules through the H-tree module. After the secondary operation modules finish computing, the H-tree module is configured to splice output neuron values of the respective secondary operation modules into an intermediate result vector.

The primary operation module is configured to complete subsequent computations by using the intermediate result vector.

The plurality of secondary operation modules is configured to use the same input neuron vector and their own weight vectors to compute their own output neuron values in parallel.

The primary operation module is configured to perform any of the following operations on the intermediate result vector:

an operation of adding a bias, in other words, to add a bias to the intermediate result vector;

an operation of activating the intermediate result vector, where an activation function active is any of the following: sigmoid, tan h, relu, and softmax;

a sampling operation, in other words, to compare the intermediate result vector with a random number, if the intermediate result vector is greater than the random number, output 1; and if the intermediate result vector is less than the random number, output 0; or a pooling operation, including maximum pooling or average pooling (AVGPOOLING).

Each of the secondary operation module includes an input neuron caching unit which is configured to cache input neuron data.

The H-tree module forms a data path between the primary operation module and the plurality of secondary operation modules, and has an H-tree structure. An H-tree is a binary tree path composed of multiple nodes. Each node can send data received from an upstream node to two downstream nodes, and merge data returned by the two downstream nodes and then return to an upstream node.

The primary operation module includes an operation unit, a data dependency determination unit, and a neuron caching unit.

The neuron caching unit is configured to cache input data and output data used by the primary operation module during computations.

The operation unit is configured to perform various operational functions of the primary operation module.

The data dependency determination unit is a port for the operation unit to read/write the neuron caching unit, so as to ensure that there is no consistency conflict in reading data from and writing data to the neuron caching unit. The data dependency determination unit is further configured to read an input neuron vector from the neuron caching unit, and send the vector to the secondary operation modules through the H-tree module.

The data dependency determination unit is further configured to send an intermediate result vector from the H-tree module to the operation unit.

Each secondary operation module includes an operation unit, a data dependency determination unit, a neuron caching unit, and a weight caching unit.

The operation unit is configured to receive a micro-instruction sent by the controller unit and perform an arithmetic logic operation.

The data dependency determination unit is configured to read/write the neuron caching unit and the weight caching unit during computations, and to ensure that there is no consistency conflict in reading and writing the neuron caching unit and the weight caching unit.

The neuron caching unit is configured to cache data of an input neuron vector and cache an output neuron value obtained by the secondary operation module.

The weight caching unit is configured to cache a weight vector required by the secondary operation module in the computation process.

The following method is used for ensuring that there is no consistency conflict in data reading and writing: determining whether there is dependency between a micro-instruction that has not been executed and data of a micro-instruction that is being executed. If there is no dependency, the micro-instruction is allowed to be issued immediately; otherwise, the micro-instruction is not allowed to be issued until all micro-instructions on which the micro-instruction is dependent have been executed.

The present disclosure provides a method of performing a forward operation of a single-layer artificial neural network by using a device for performing a forward operation of an artificial neural network. The method includes:

reading, by a direct memory access unit, all artificial neural network operation instructions related to a forward operation of a current layer of the artificial neural network from external address space, and caching the instructions in an instruction caching unit;

reading, by the direct memory access unit, all data related to the forward operation of the current layer of the artificial neural network required by a primary operation module from the external address space to a neuron caching unit of the primary operation module;

reading, by the direct memory access unit, weight matrix data required by a secondary operation module from the external address space;

configuring various constants required by the forward operation of the current layer of the neural network;

sending, by the primary operation module, an input neuron vector to each secondary operation module via an H-tree module, and saving the input neuron vector to a neuron caching unit of the secondary operation module;

reading, by an operation unit of the secondary operation module, a weight vector from a weight caching unit, and reading an input neuron vector from a neuron caching unit;

computing a dot product of the weight vector and the input neuron vector, and returning an obtained neuron through the H-tree module;

in the H-tree module, splicing neuron values returned by each secondary operation module stage by stage to obtain a complete intermediate result vector;

reading, by the primary operation module, a bias vector from the neuron caching unit, adding the bias vector to the intermediate result vector returned by the H-tree module, activating the addition result to obtain an output neuron vector, and writing the output neuron vector to the neuron caching unit; and storing, by the direct memory access unit, the output neuron vector in the neuron caching unit to a specified address in the external address space.

The present disclosure provides a method of performing a forward operation of a multi-layer artificial neural network. The method includes:

for each layer, performing the method of performing a forward operation of a single-layer artificial neural network by using a device for performing a forward operation of an artificial neural network, where after the execution of a previous layer of the artificial neural network, using an output neuron address of the previous layer stored in a primary operation module as an input neuron address of a current layer, and performing the method of performing a forward operation of a single-layer artificial neural network by using a device for performing a forward operation of an artificial neural network on the current layer.

The present disclosure provides a non-linear function operation device including:

a domain conversion part configured to convert an input independent variable into a corresponding value within a range of a lookup table; and a table looking-up part configured to find a slope and an intercept of a corresponding piecewise linear fitting according to the input independent variable or the independent variable processed by the domain conversion part.

The table looking-up part of the non-linear function operation device includes:

a slope array storage unit configured to store slope data in the table looking-up part;

an intercept array storage unit configured to store intercept data in the table looking-up part;

an index generation unit configured to compute indices of the corresponding slope and intercept according to the value of the input independent variable; and an indexing unit configured to read a corresponding value in the slope array storage unit and the intercept array storage unit according to the indices generated by the index generation unit, and output the value.

The non-linear function operation device further includes a linear fitting part which is configured to obtain a final result by linear fitting according to the slope and intercept obtained by the table looking-up part.

The domain conversion part of the non-linear function operation device includes:

a first multiplier configured to scale the input independent variable; and a first adder configured to offset the scaled independent variable.

The table looking-up part of the non-linear function operation device includes:

a slope array storage unit configured to store slope data in the table looking-up part;

an intercept array storage unit configured to store intercept data in the table looking-up part;

an index generation unit configured to compute indices of the corresponding slope and intercept according to the value of the input independent variable; and an indexing unit configured to read a corresponding value in the slope array storage unit and the intercept array storage unit according to the indices generated by the index generation unit, and output the value.

The linear fitting part of the non-linear function operation device includes:

a second multiplier configured to perform a multiplication operation according to the slope and the input independent variable or the independent variable processed by the domain conversion unit to obtain an operation result; and a second adder configured to perform an addition operation according to the operation result and the intercept to obtain a final result.

The non-linear function operation device further includes:

a first independent variable selector configured to select an independent variable used by the table looking-up unit for processing.

The non-linear function operation device further includes:

a second independent variable selector configured to select an independent variable used by the second multiplier for multiplication.

In order to achieve the purposes above, the present disclosure further provides a method for performing a non-linear function, including:

a step 1: converting an input independent variable into a corresponding value within a range of a look-up table;

a step 2, finding a slope and an intercept of a corresponding piecewise linear fitting according to the input independent variable or the independent variable processed by the domain conversion part; and a step 3: obtaining a final result by linear fitting according to the slope and intercept obtained by the table looking-up part.

The step 1 of the method for performing a non-linear function includes:

scaling the input independent variable; and offsetting the scaled independent variable.

The step 2 of the method for performing a non-linear function includes:

configuring the first independent variable selector to select an independent variable used by the table looking-up unit for processing.

The step 3 of the method for performing a non-linear function includes:

performing a multiplication operation according to the slope and the input independent variable or the independent variable processed by the domain conversion unit to obtain an operation result; and performing an addition operation according to the operation result and the intercept to obtain a final result.

The step 3 of the method for performing a non-linear function includes:

configuring the second independent variable selector to select an independent variable for multiplication.

In the examples of the present disclosure, the terminal device is configured to obtain first information which is to be processed by the terminal device. A computation device is included in the terminal device and is configured to compute the first information to obtain second information and output the second information. In this way, information processing efficiency may be improved.

BRIEF DESCRIPTION OF THE DRAWINGS

In order to illustrate the technical solutions in the examples of the present disclosure more clearly, the drawings to be used in the description of the examples are briefly explained below. Obviously, the drawings in the description below are some examples of the present disclosure. Other drawings can be obtained according to the disclosed drawings without any creative effort by those skilled in the art.

FIG. 49F is a detailed structural diagram of an operation device according to an example of the present disclosure.

FIG. 49G is a flowchart of an operation method according to another example of the present disclosure.

FIG. 50A is a diagram of an overall structure of a data filtering device according to an example of the present disclosure.

FIG. 50B is a schematic diagram showing a function of a data filtering unit according to an example of the present disclosure.

FIG. 50C is a detailed structural diagram of a data filtering device according to an example of the present disclosure.

FIG. 50D is another detailed structural diagram of a data filtering device according to an example of the present disclosure.

FIG. 50E is a flowchart of a data filtering method according to an example of the present disclosure.

Figure 50A:
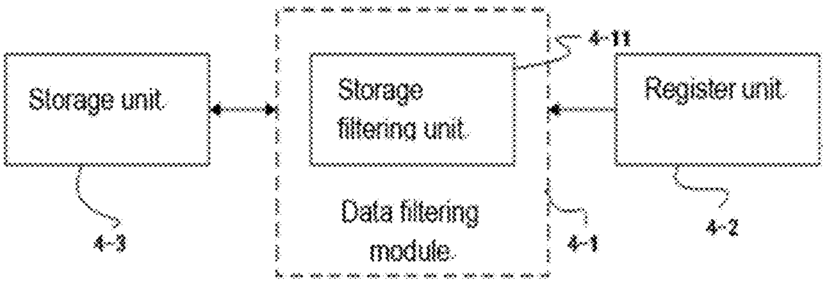
Figure 50B:
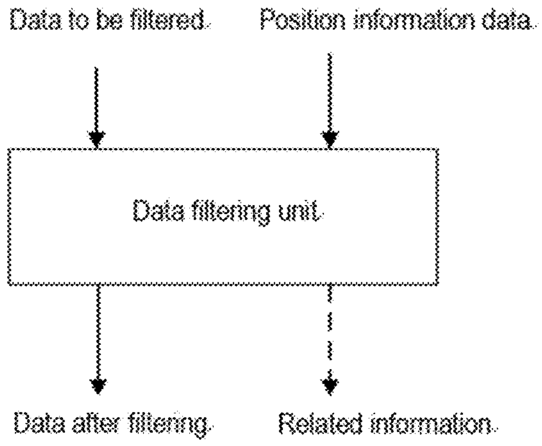
Figure 50C:
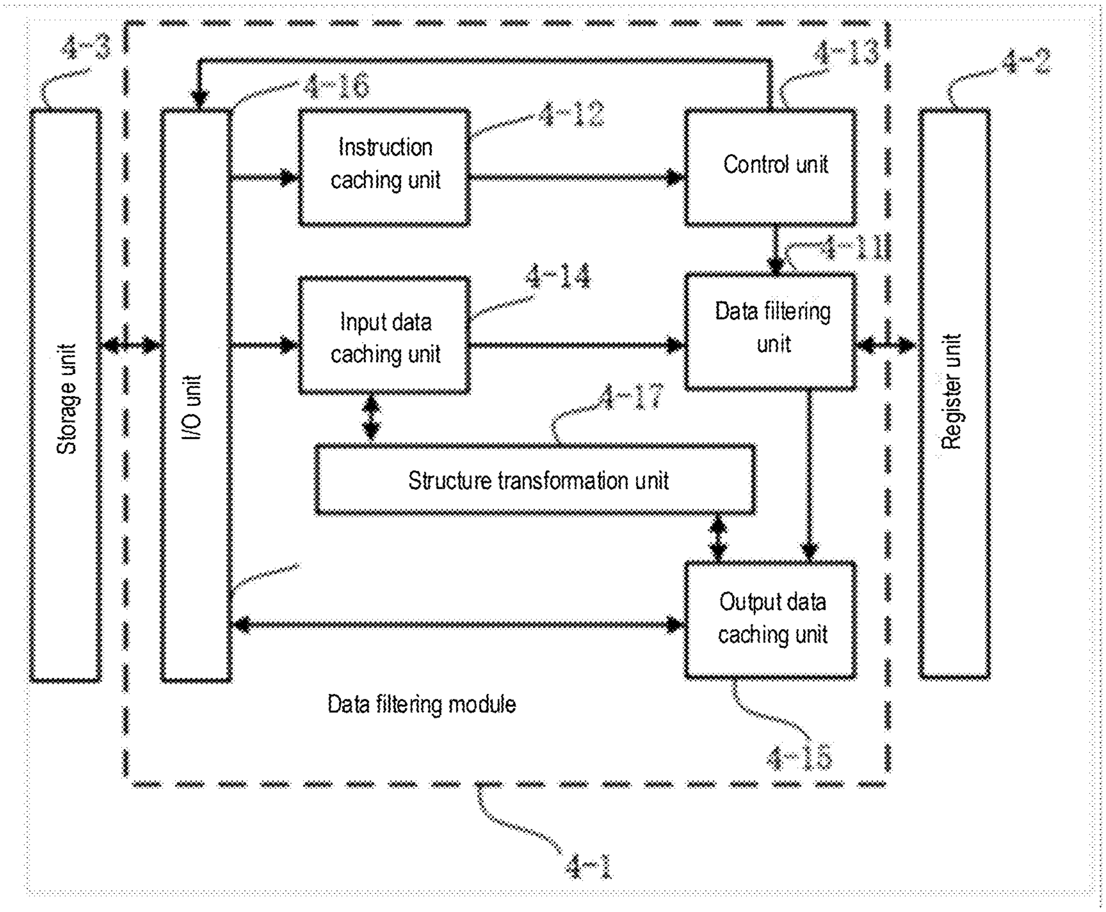
Figure 50D:
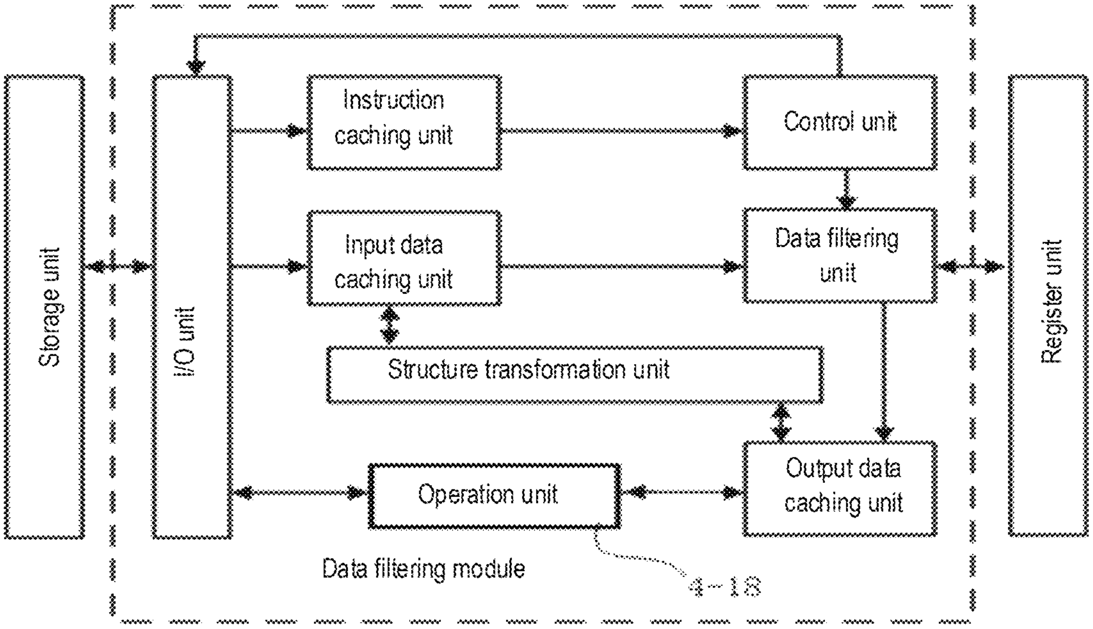
Figure 50E:
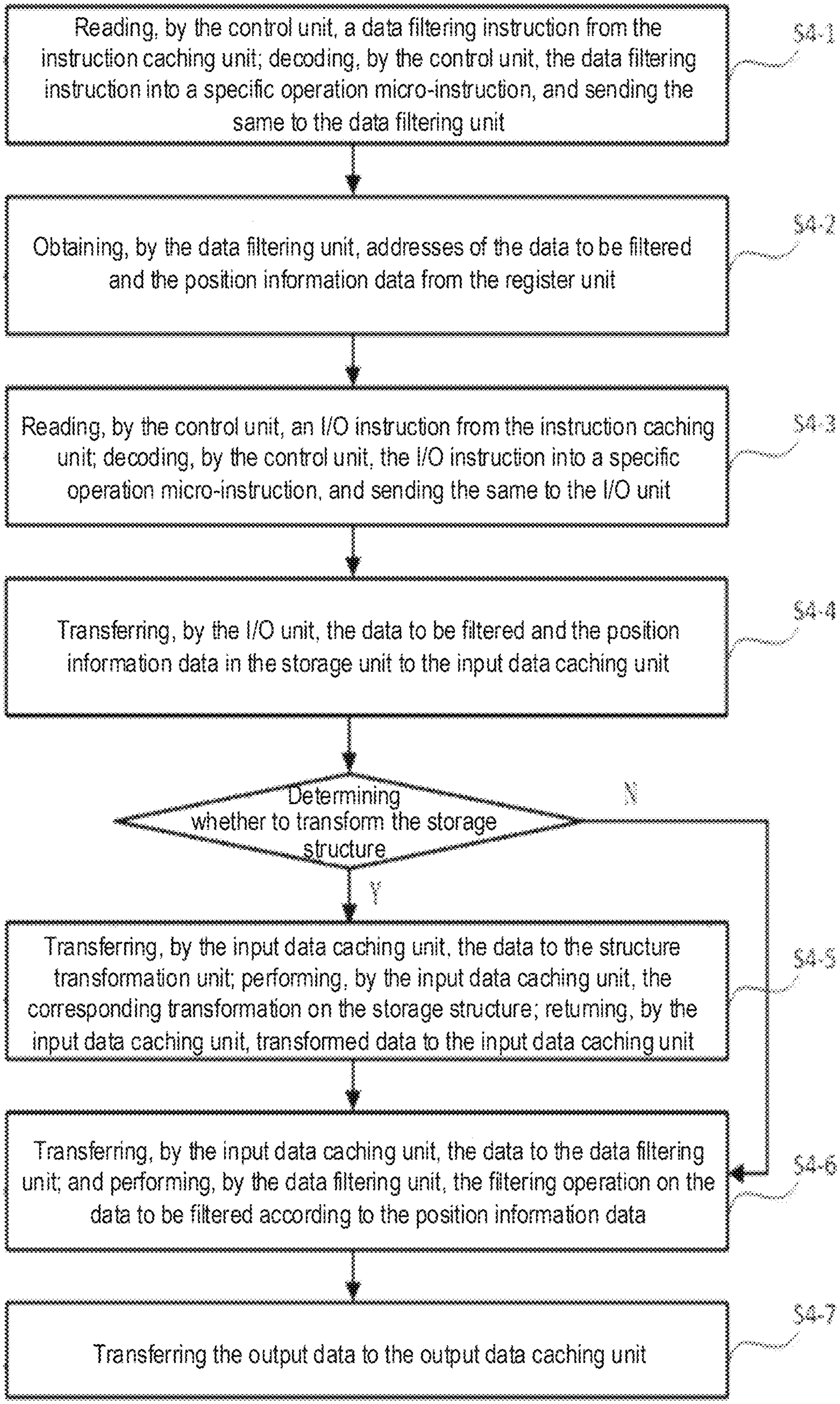
Figure 50F:
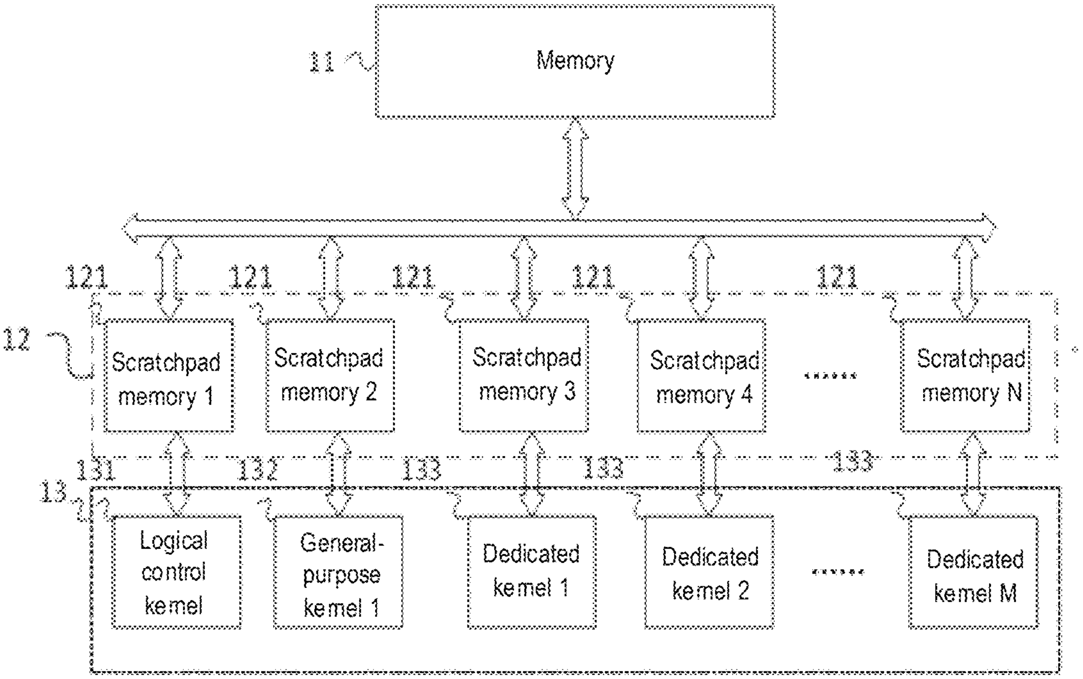

FIG. 50F schematically shows a heterogeneous multi-core neural network processor according to an example of the present disclosure.

Figure 50G:
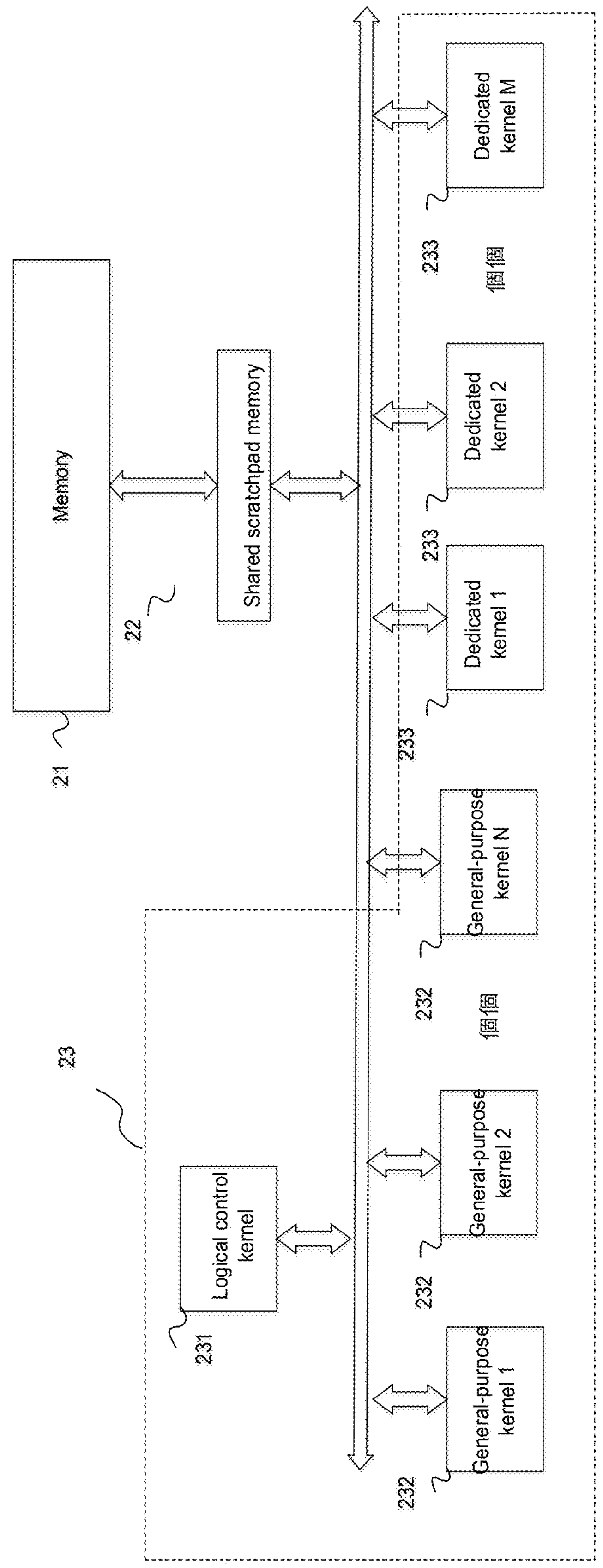

FIG. 50G schematically shows a heterogeneous multi-core neural network processor according to another example of the present disclosure.

Figure 50H:
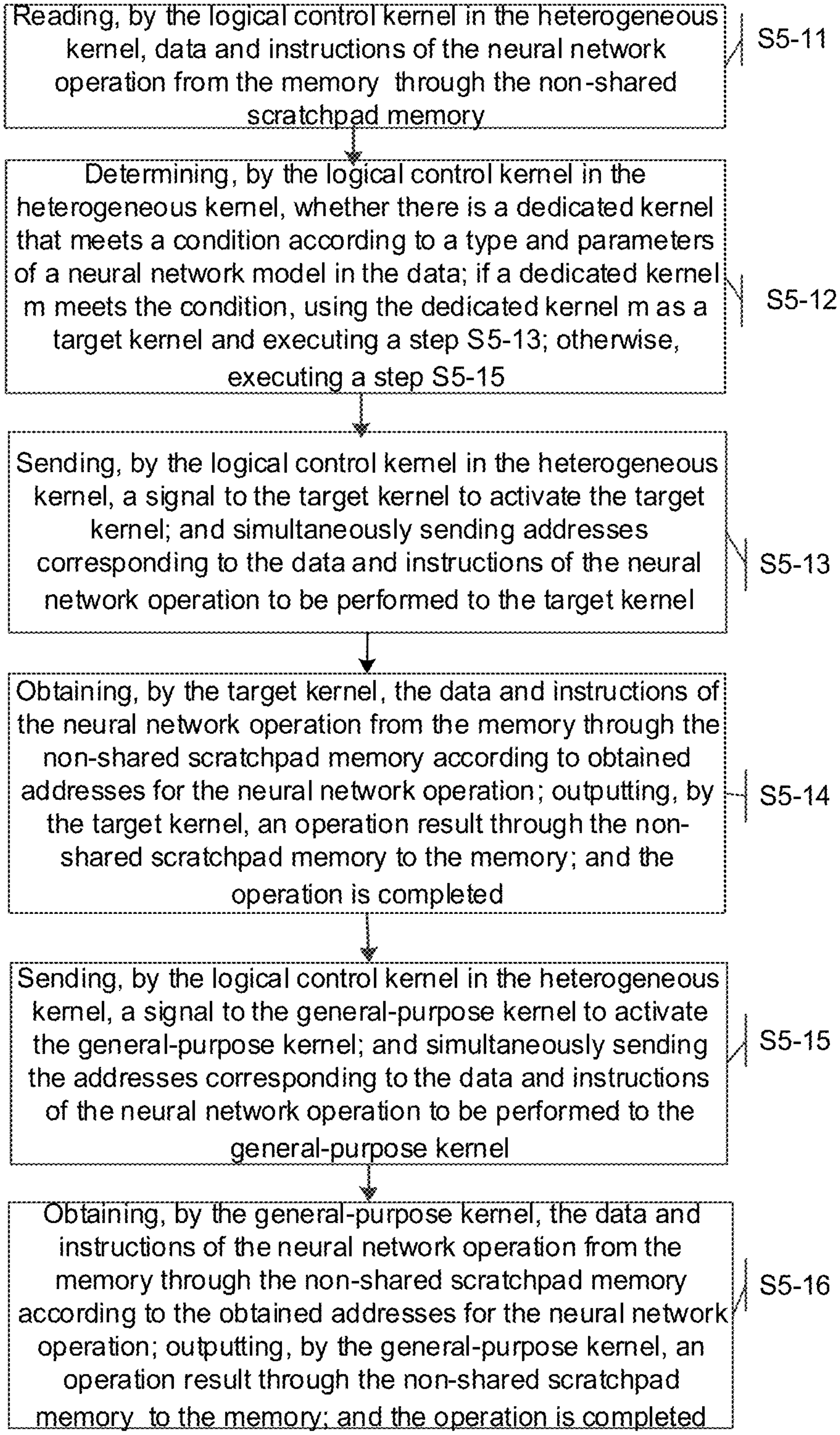

FIG. 50H is a flowchart of a neural network operation method according to another example of the present disclosure.

Figure 50I:
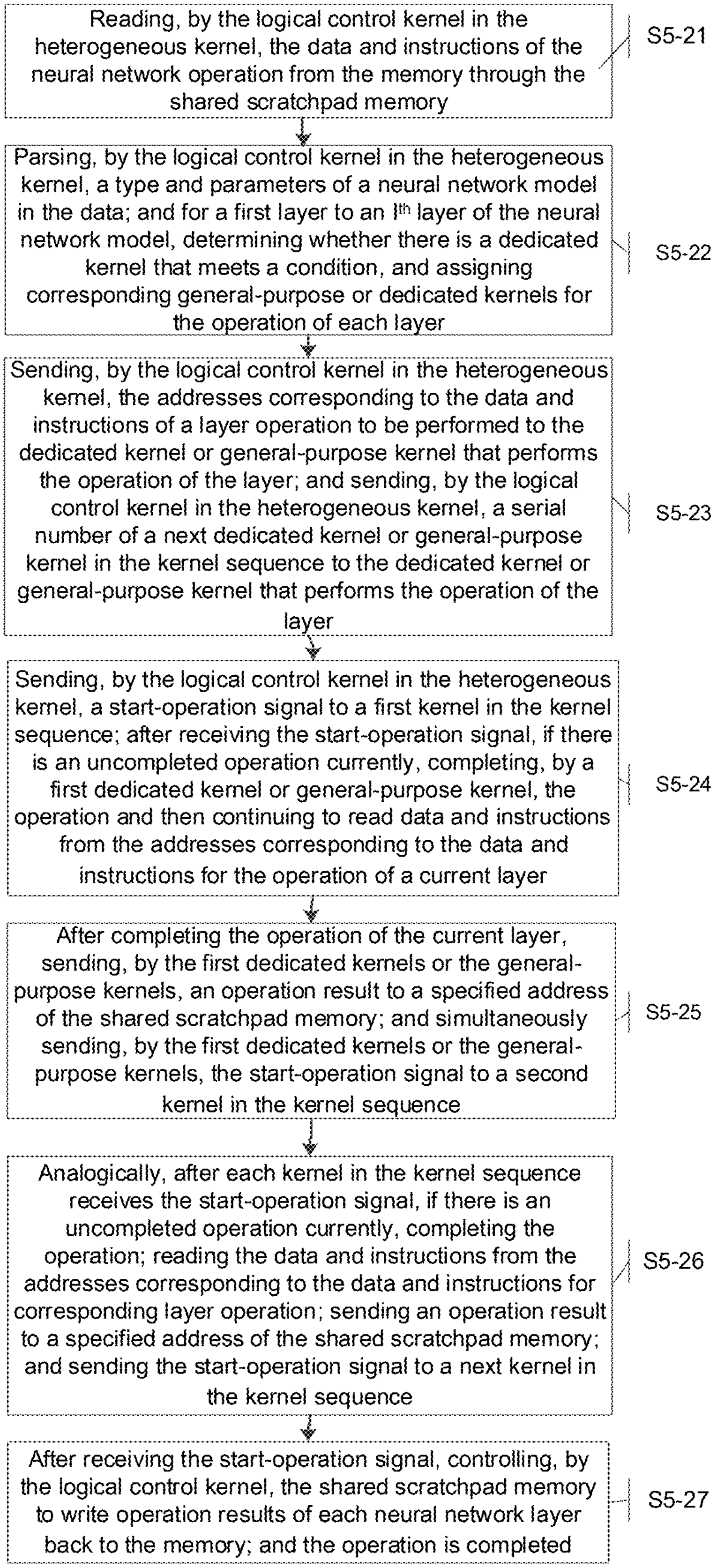

FIG. 50I is a flowchart of a neural network operation method according to another example of the present disclosure.

Figure 50J:
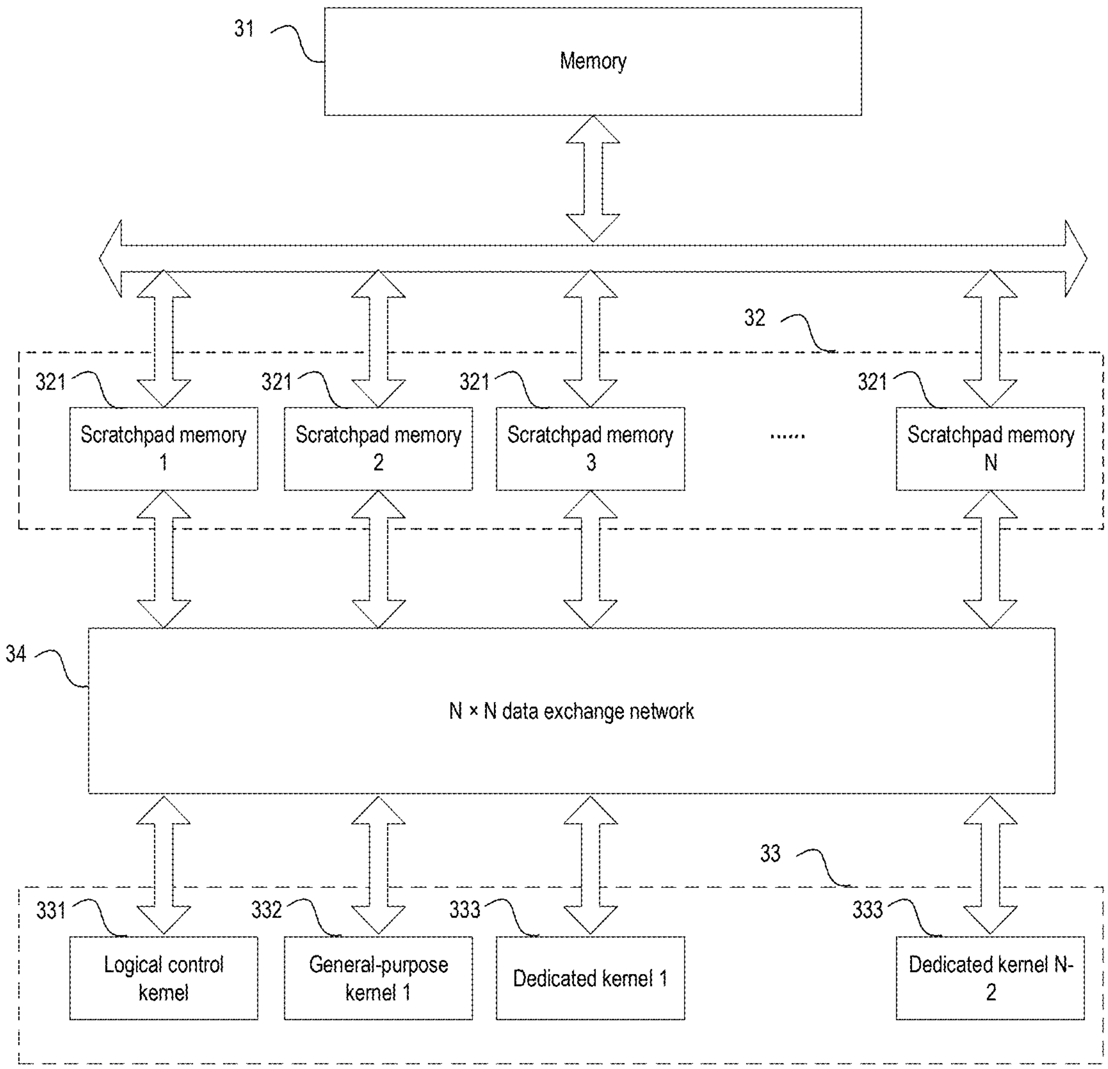

FIG. 50J schematically shows a heterogeneous multi-core neural network processor according to another example of the present disclosure.

Figure 50K:
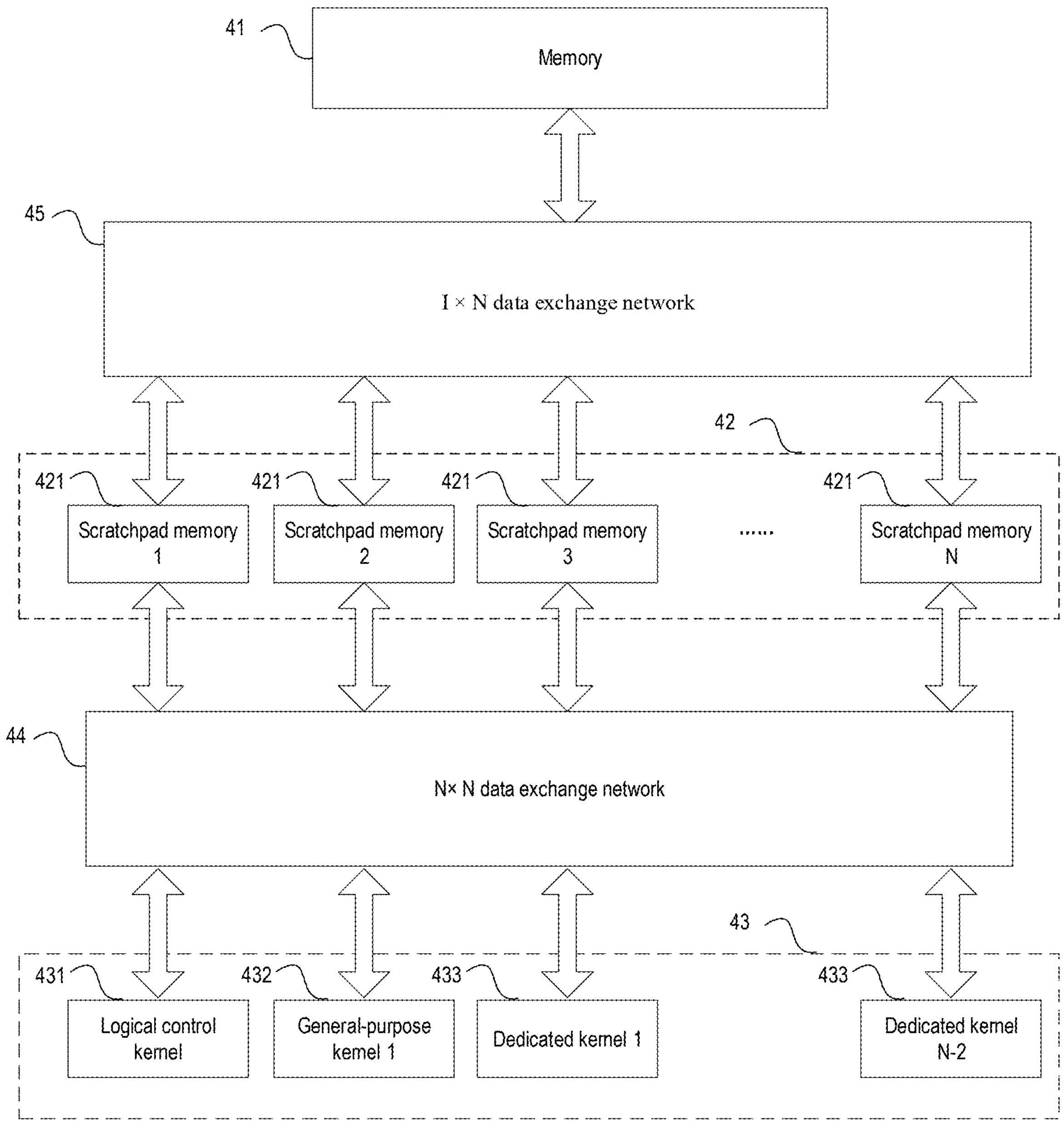

FIG. 50K schematically shows a heterogeneous multi-core neural network processor according to another example of the present disclosure.

Figure 51:
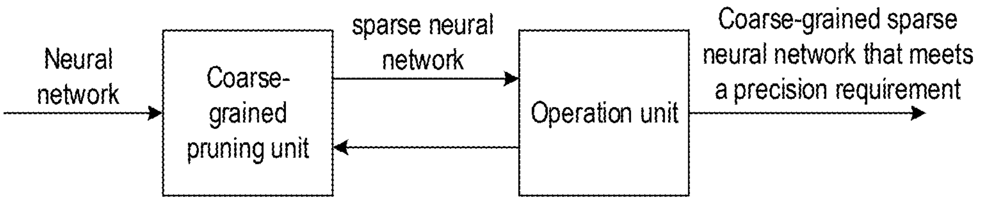

FIG. 51 is a structural diagram of a processing device for performing coarse-grained pruning (sparsification) on a neural network according to an example of the present disclosure.

Figure 51A:
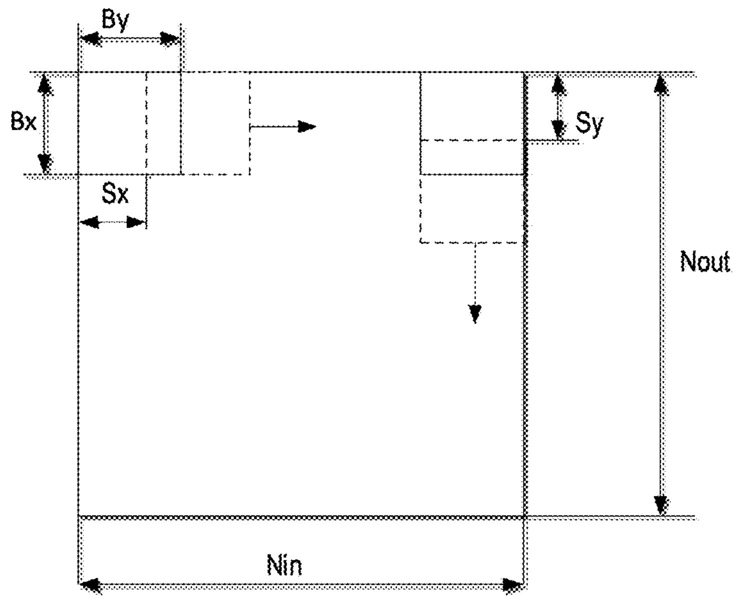

FIG. 51A is a schematic diagram shows a coarse-grained pruning operation on a fully connected layer of a neural network according to an example of the present disclosure.

Figure 51B:
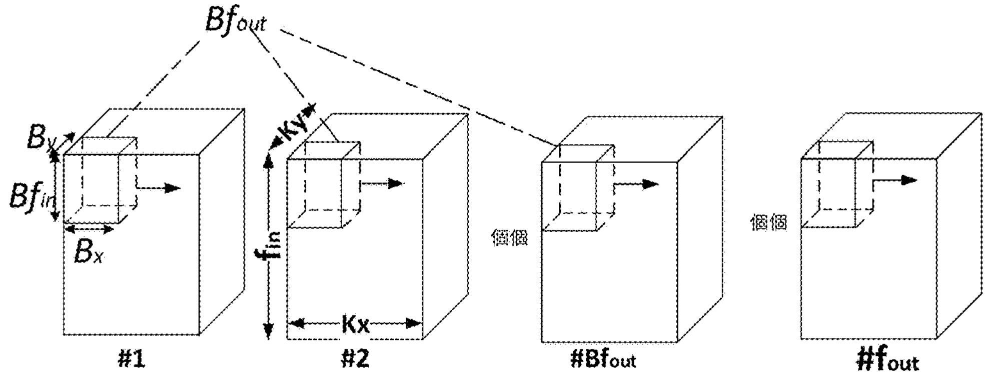

FIG. 51B is a schematic diagram shows a coarse-grained pruning operation on a convolution layer of a neural network according to an example of the present disclosure.

Figure 51C:
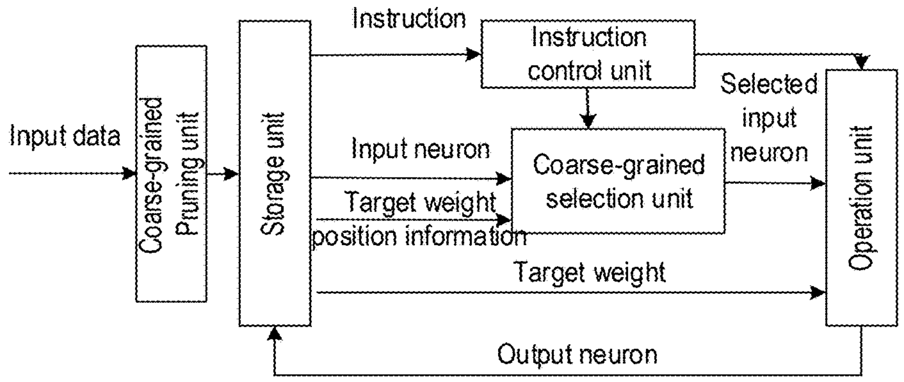

FIG. 51C is a structural diagram of an acceleration device according to an example of the present disclosure.

Figure 51D:
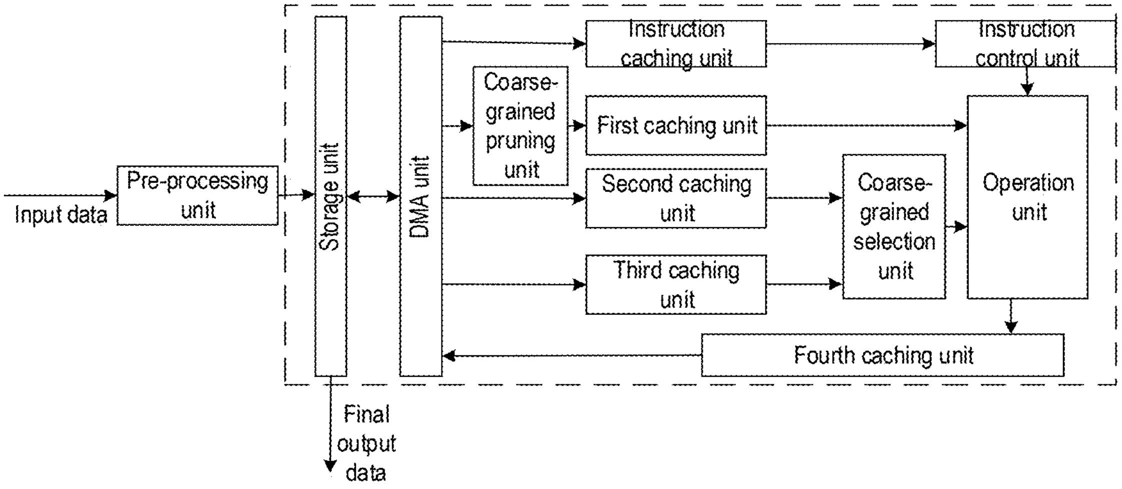

FIG. 51D is a structural diagram of another acceleration device according to an example of the present disclosure.

Figure 51E:
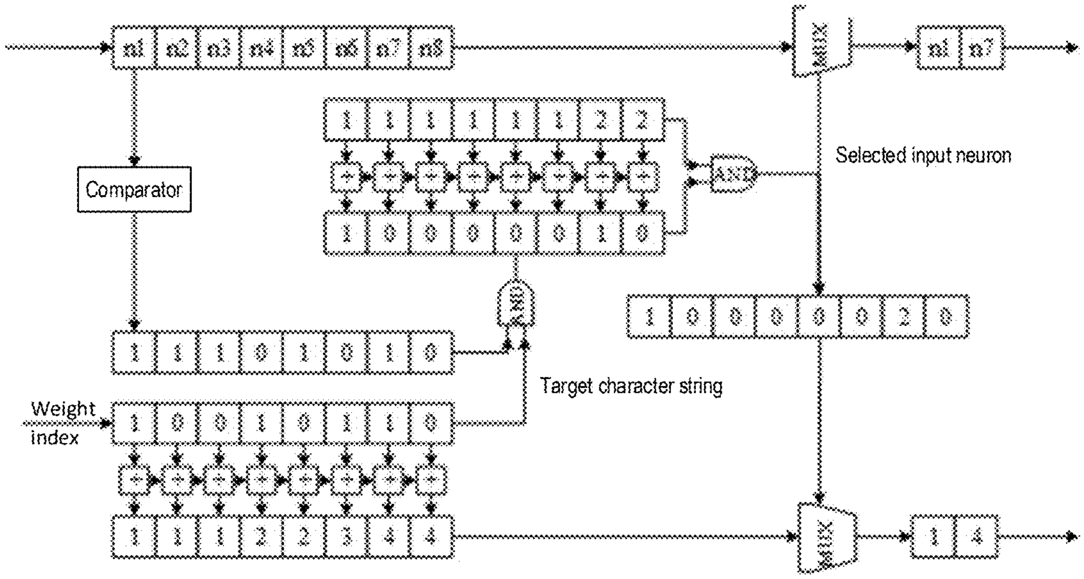

FIG. 51E is a diagram showing a working process of a coarse-grained selection unit.

Figure 51F:
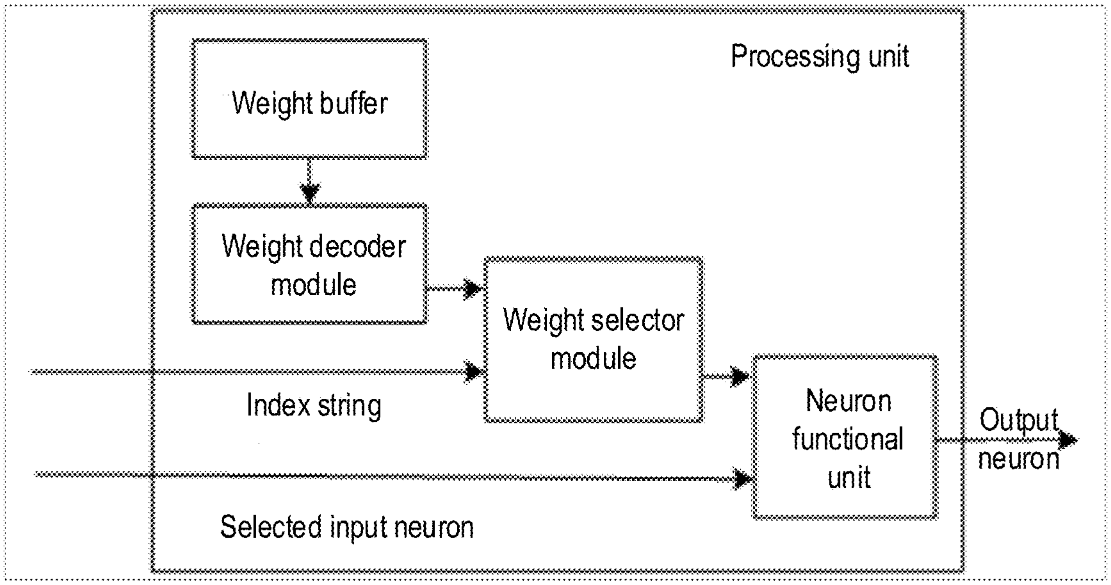

FIG. 51F is a structural diagram of a processing unit according to an example of the present disclosure.

Figure 52A:
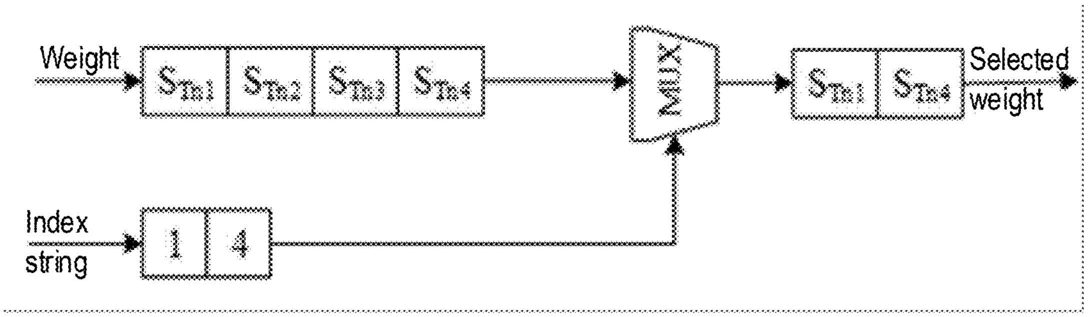

FIG. 52A is a schematic diagram of coarse-grained selection according to an example of the present disclosure.

Figure 52B:
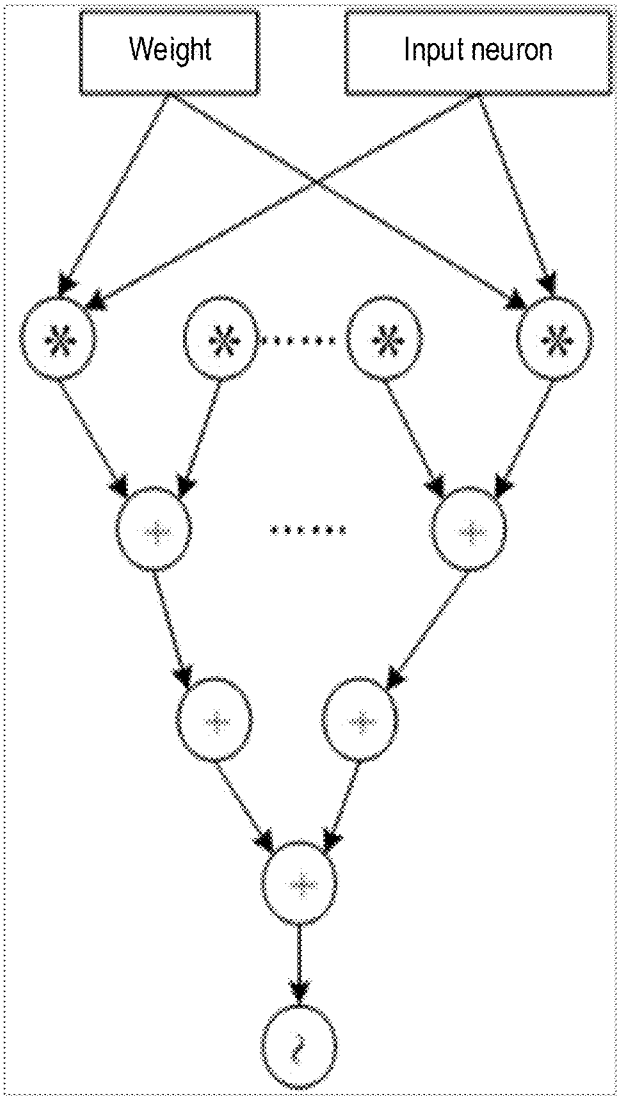

FIG. 52B is a schematic diagram of coarse-grained selection according to an example of the present disclosure.

Figure 52C:
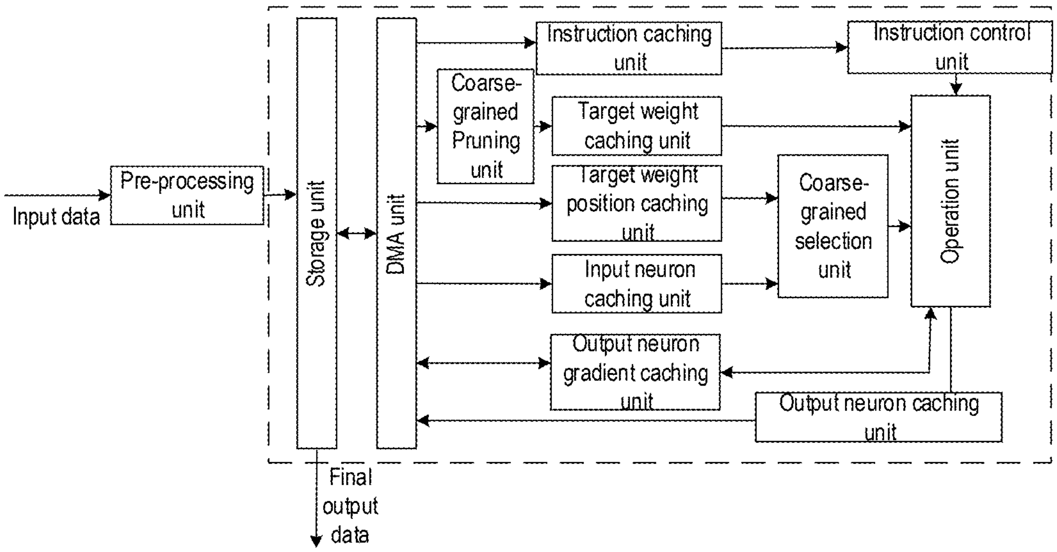

FIG. 52C is a structural diagram of another acceleration device according to an example of the present disclosure.

Figure 52D:
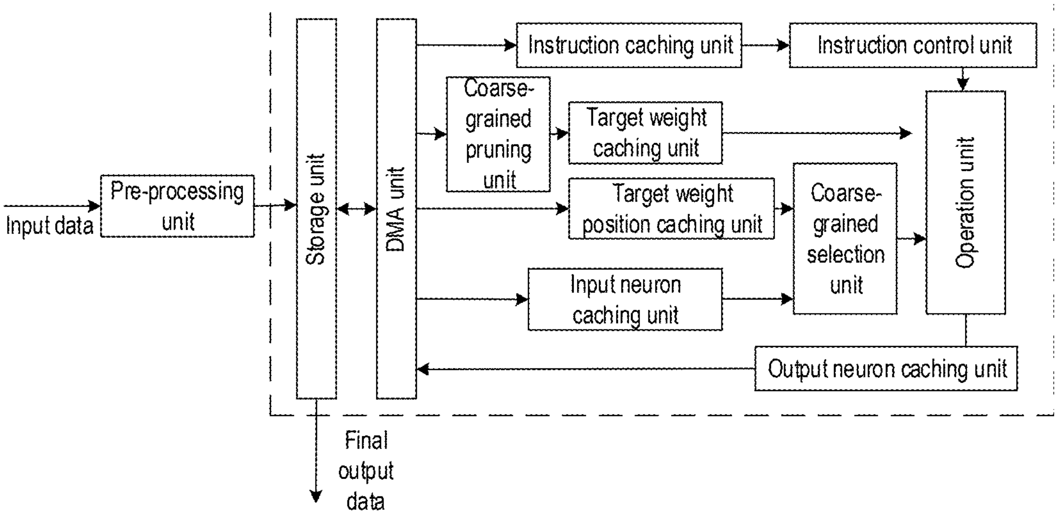

FIG. 52D is a structural diagram of another acceleration device according to an example of the present disclosure.

Figure 52E:
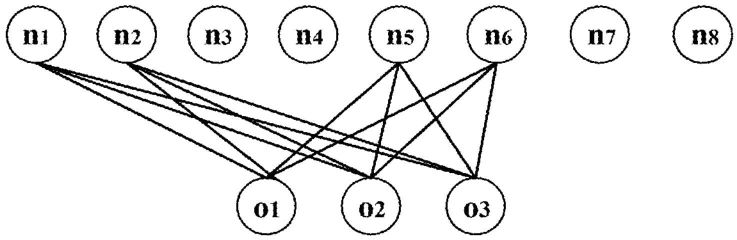

FIG. 52E is a processing method according to an example of the present disclosure.

Figure 53A:
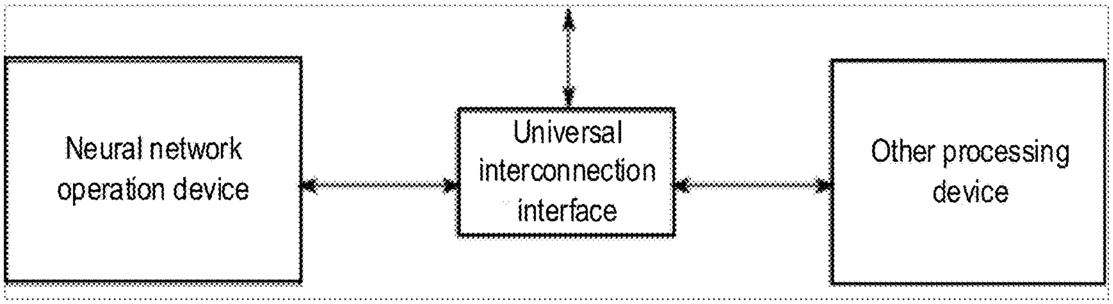

FIG. 53A is a structural diagram of a combined processing device according to an example of the present disclosure.

Figure 53B:
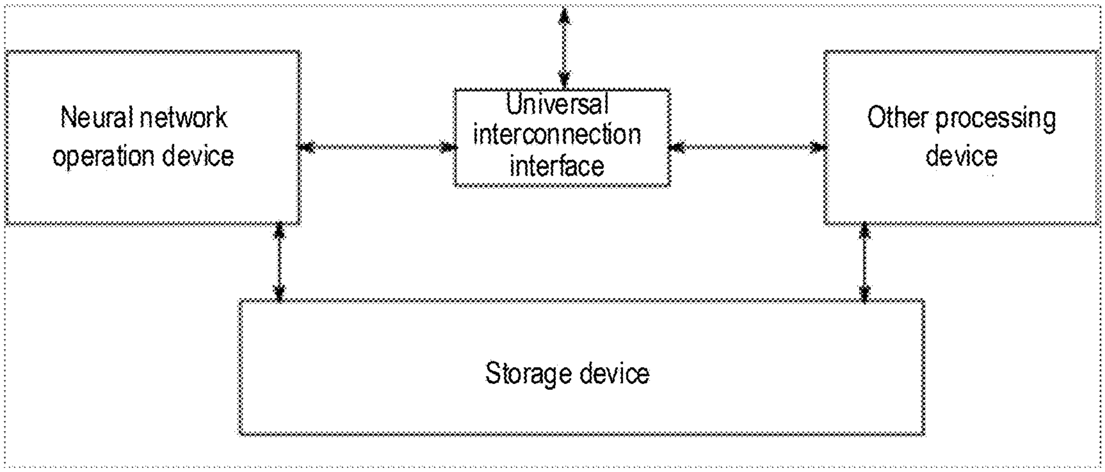

FIG. 53B is a structural diagram of another combined processing device according to an example of the present disclosure.

Figure 53C:
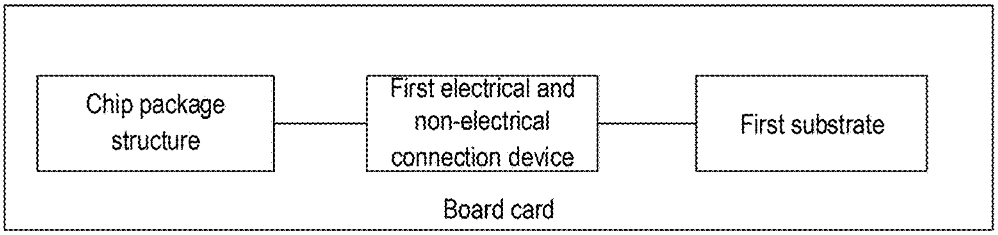

FIG. 53C is a structural diagram of a neural network processor board card according to an example of the present disclosure.

Figure 53D:
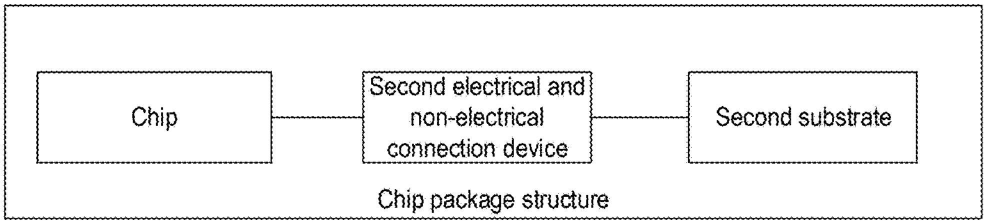

FIG. 53D is a schematic diagram of a chip package structure according to an example of the present disclosure.

Figure 53E:
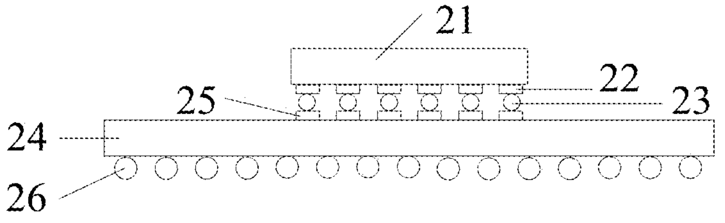

FIG. 53E is a schematic diagram of another chip package structure according to an example of the present disclosure.

Figure 53F:
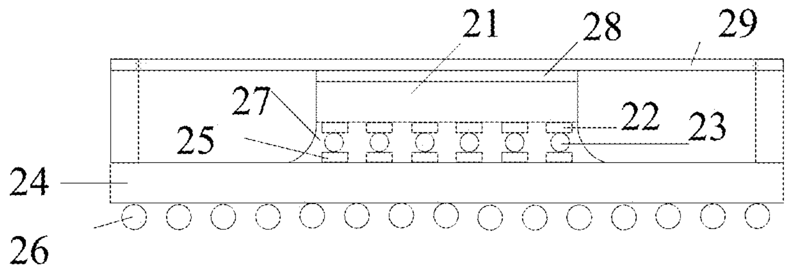

FIG. 53F is a schematic diagram of another chip package structure according to an example of the present disclosure.

Figure 54:
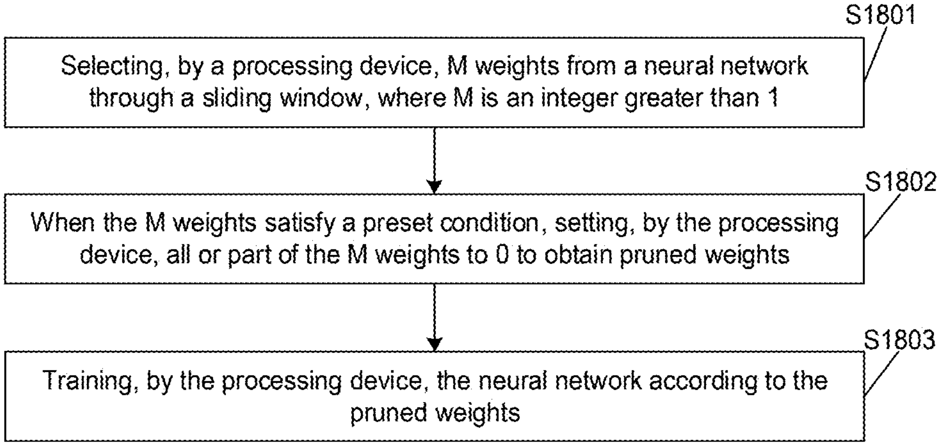

FIG. 54 is a flowchart of a processing method according to an example of the present disclosure.

Figure 54A:
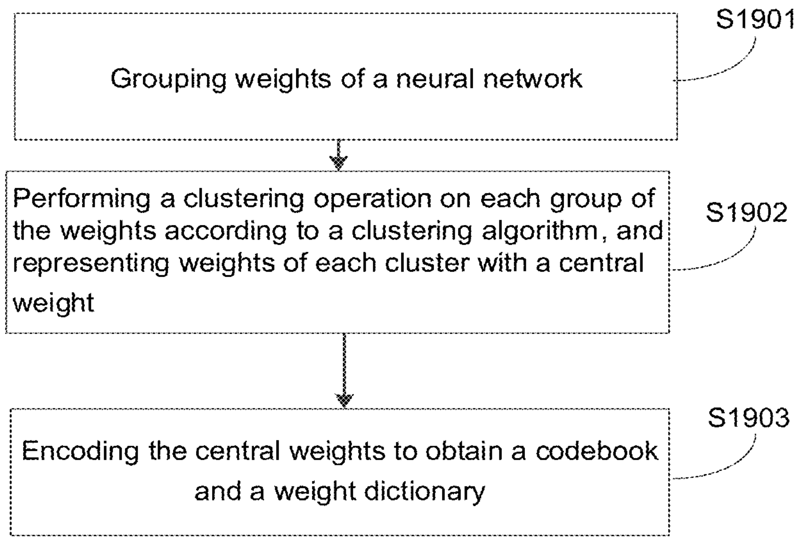

FIG. 54A is a schematic diagram showing steps of a data quantization method according to an example of the present disclosure.

Figure 54B:
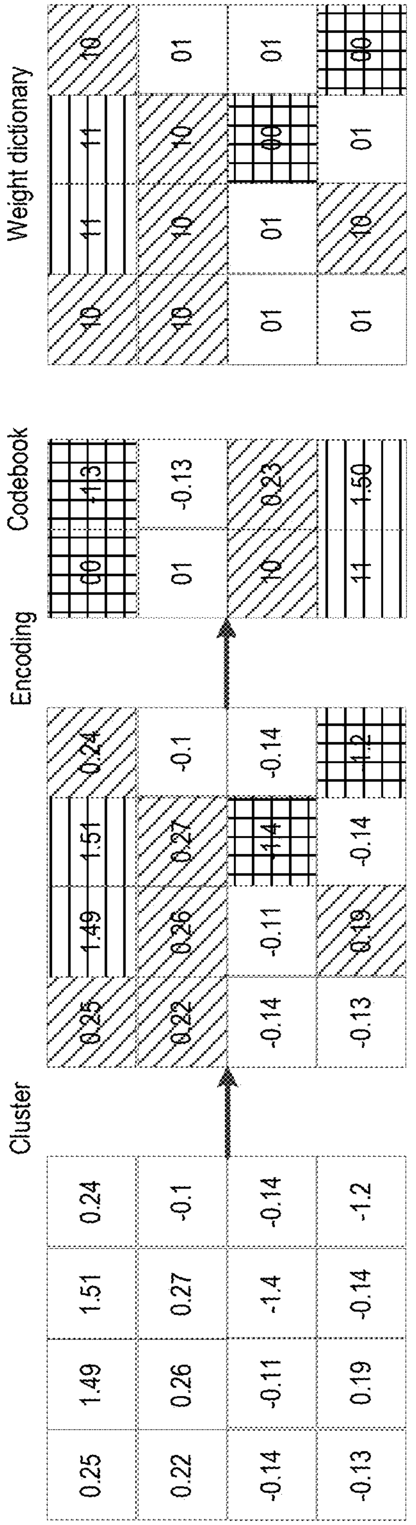

FIG. 54B is a schematic diagram of a process of data quantization according to an example of the present disclosure.

Figure 54C:
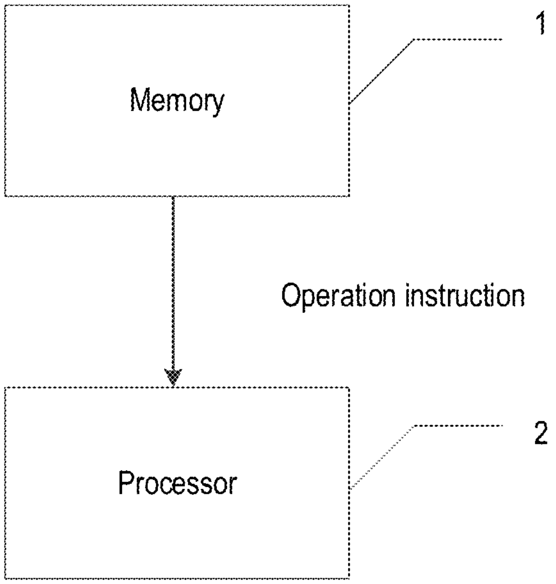

FIG. 54C is a structural diagram of a data quantization device according to an example of the present disclosure.

Figure 54D:
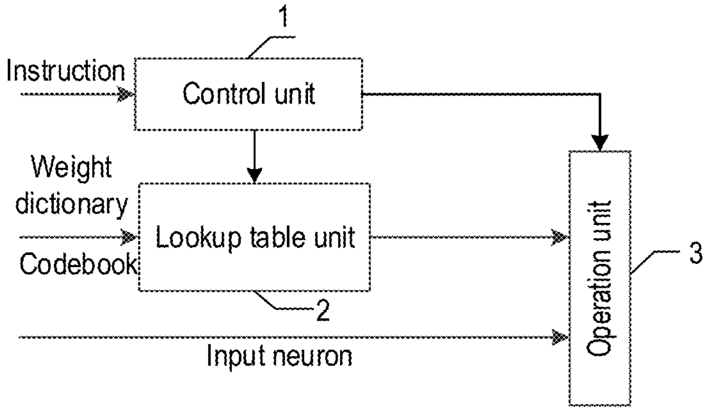

FIG. 54D is a structural diagram of a processing device according to an example of the present disclosure.

Figure 54E:
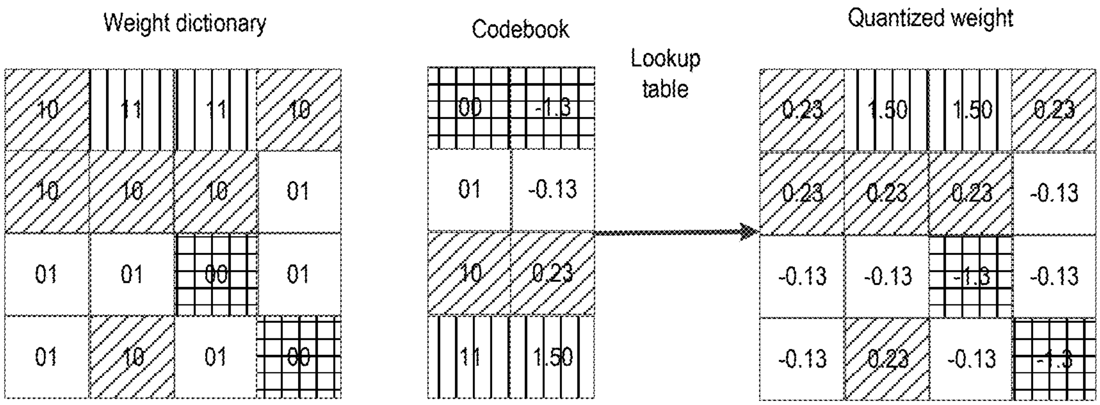

FIG. 54E is a schematic diagram of a table looking-up process according to an example of the present disclosure.

Figure 54F:
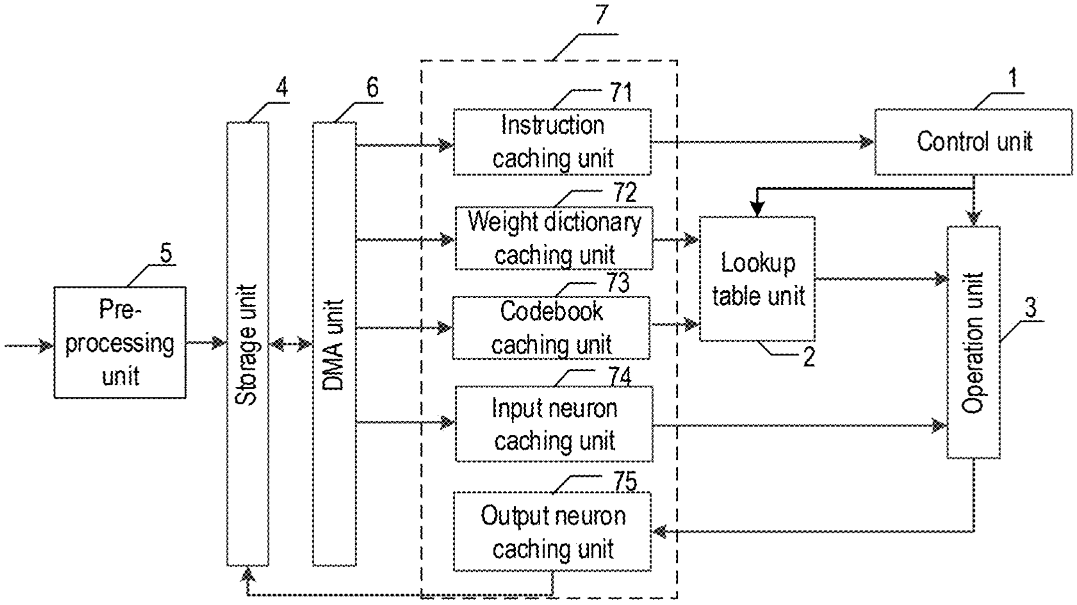

FIG. 54F is a structural diagram of a processing device according to an example of the present disclosure.

Figure 54G:
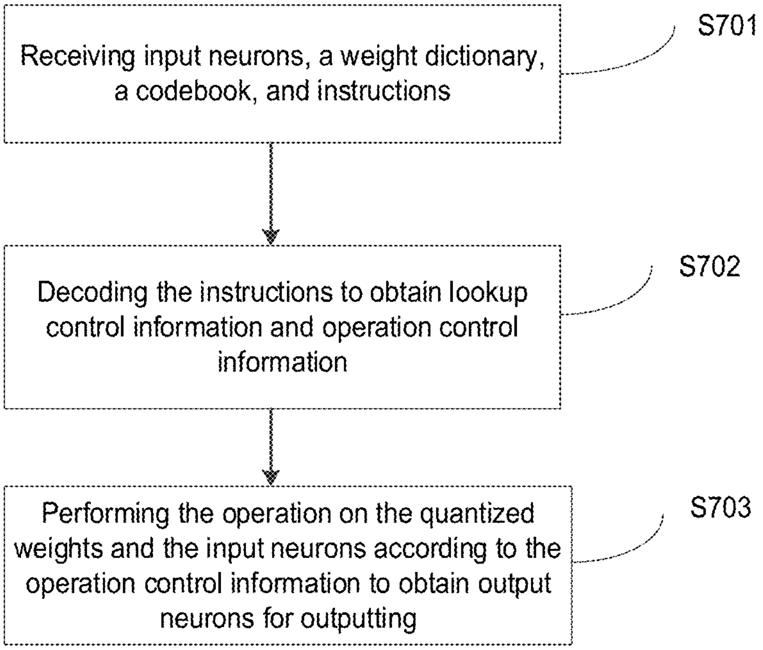

FIG. 54G is a schematic diagram of steps of a processing method according to an example of the present disclosure.

Figure 54H:
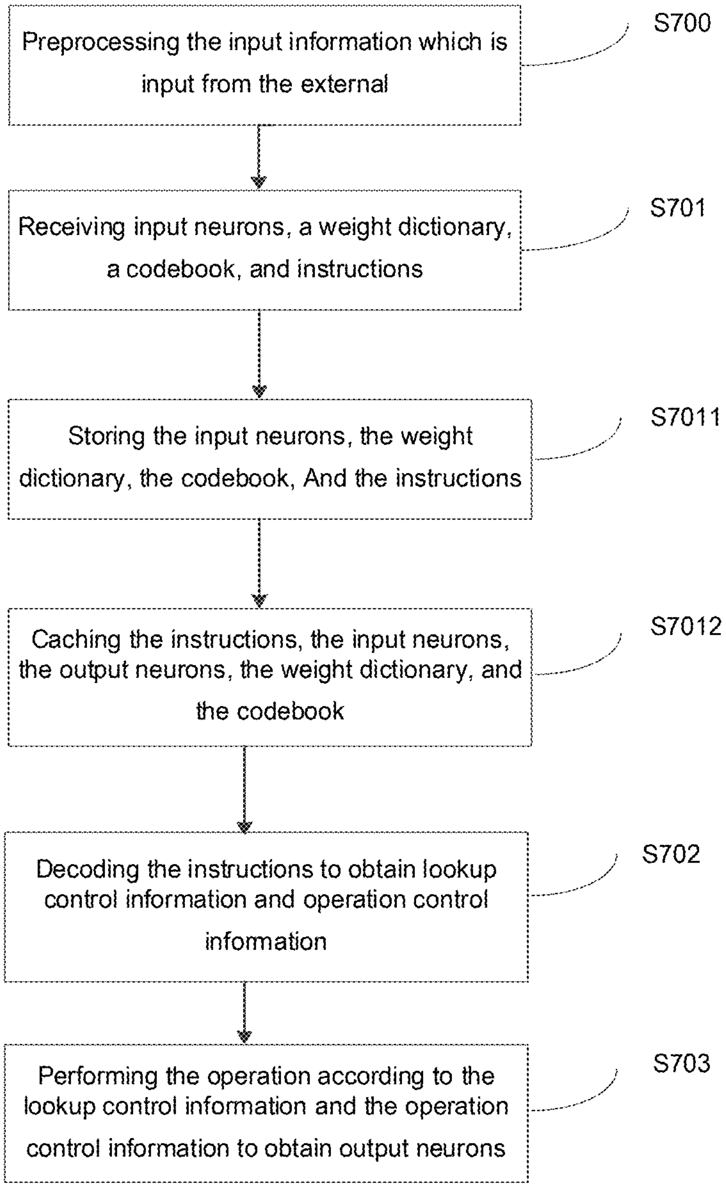

FIG. 54H is a schematic diagram of steps of a processing method according to an example of the present disclosure.

Figure 54I:
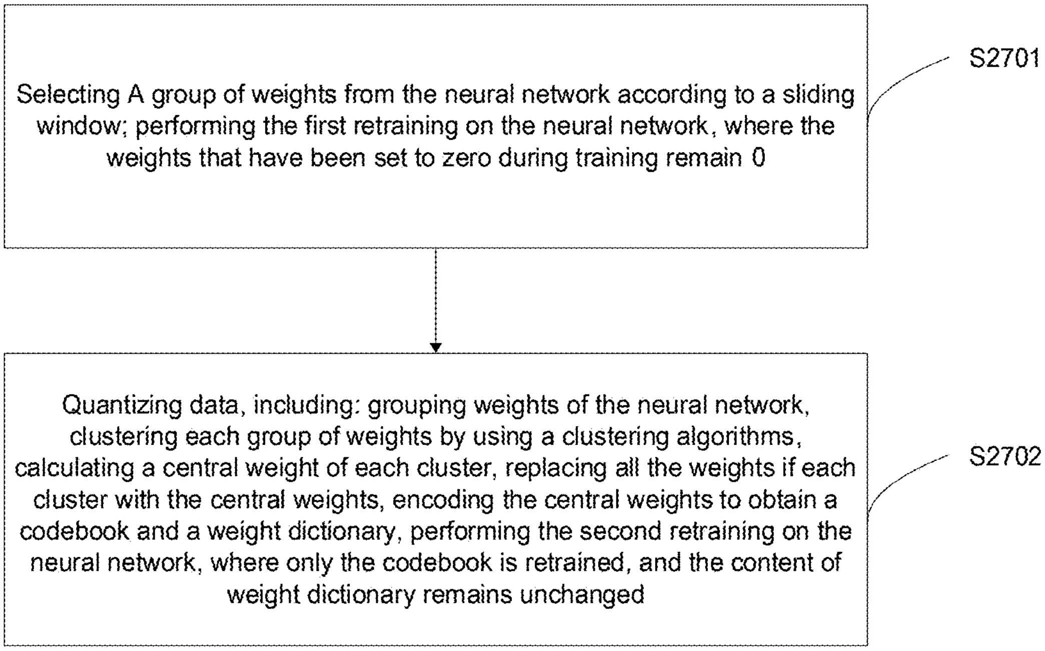

FIG. 54I is a flowchart of a data compression method according to an example of the present disclosure.

Figure 55A:
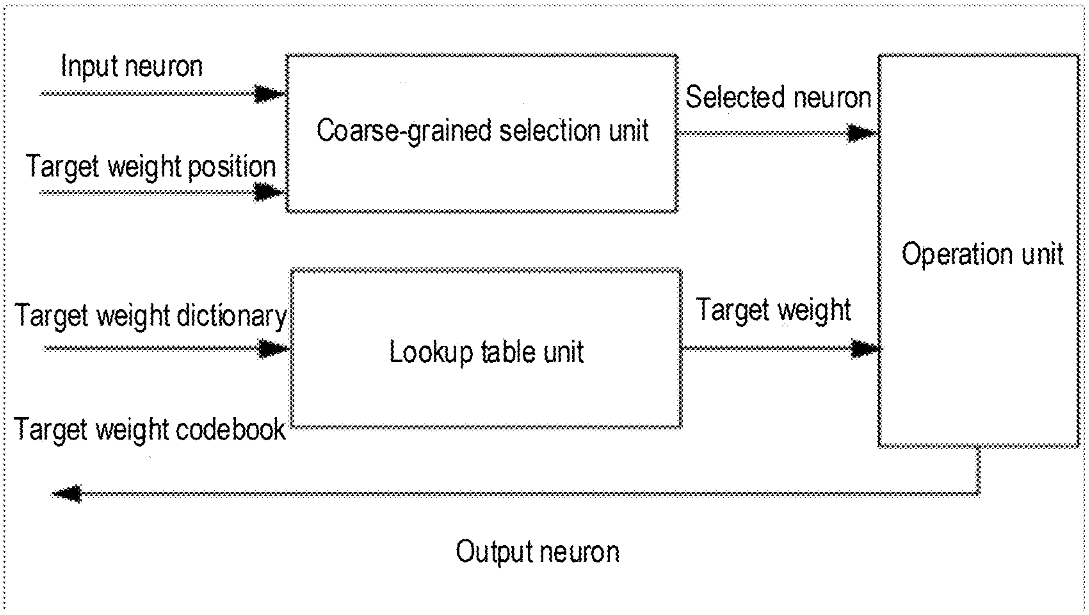

FIG. 55A is a structural diagram of another processing device according to an example of the present disclosure.

Figure 55B:
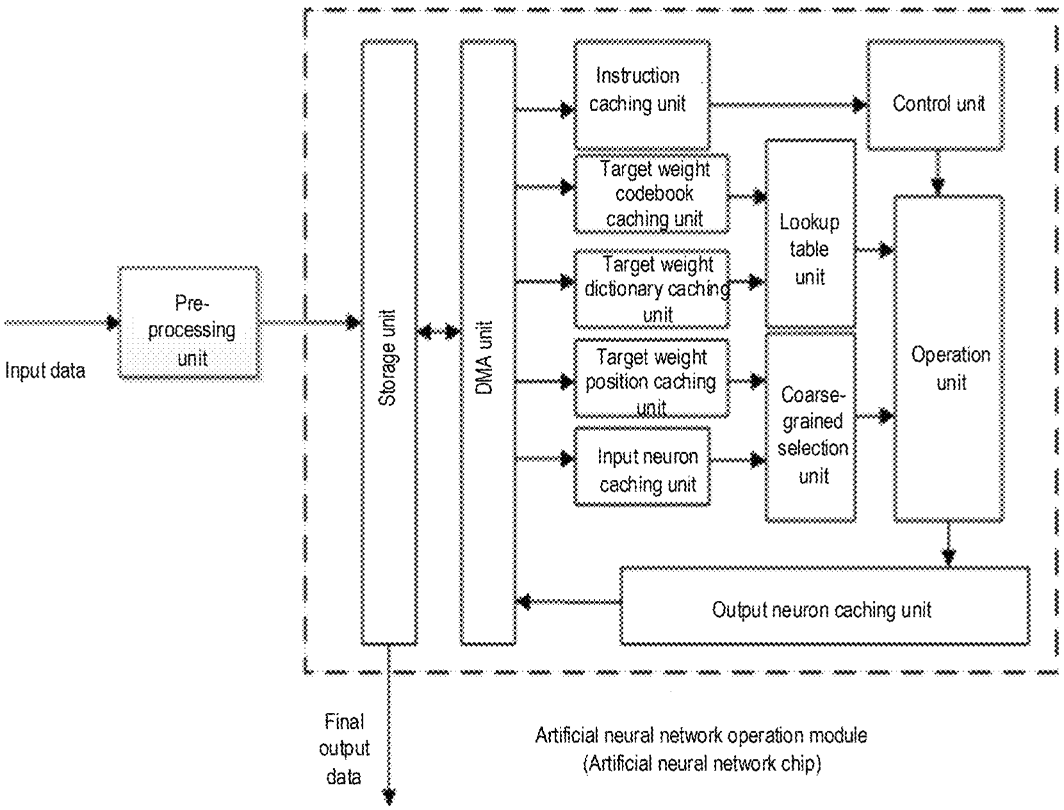

FIG. 55B is a structural diagram of a neural network processor according to an example of the present disclosure.

Figure 56:
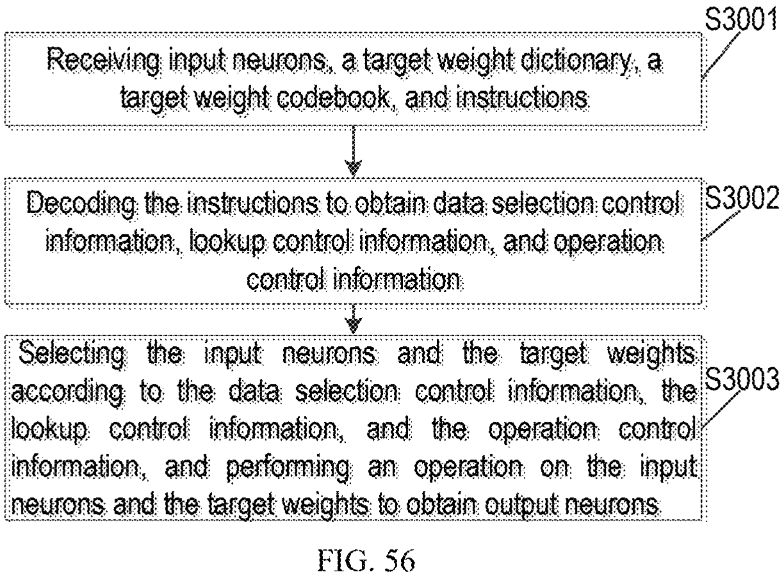

FIG. 56 is a processing method for neural network data according to an example of the present disclosure.

Figure 56A:
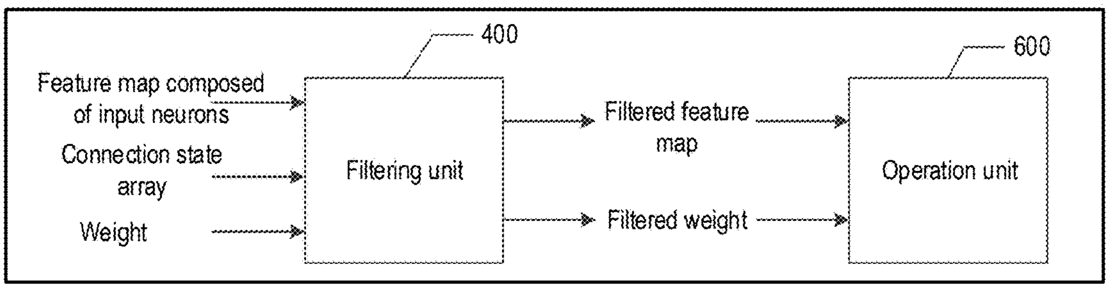

FIG. 56A is a schematic diagram showing a function of a filtering unit of an operation device according to an example of the present disclosure.

Figure 56B:
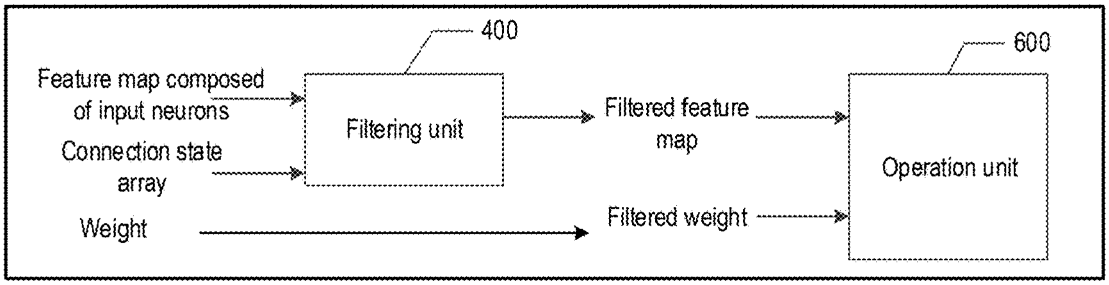

FIG. 56B is a schematic diagram showing a function of a filtering unit of an operation device according to another example of the present disclosure.

Figure 56C:
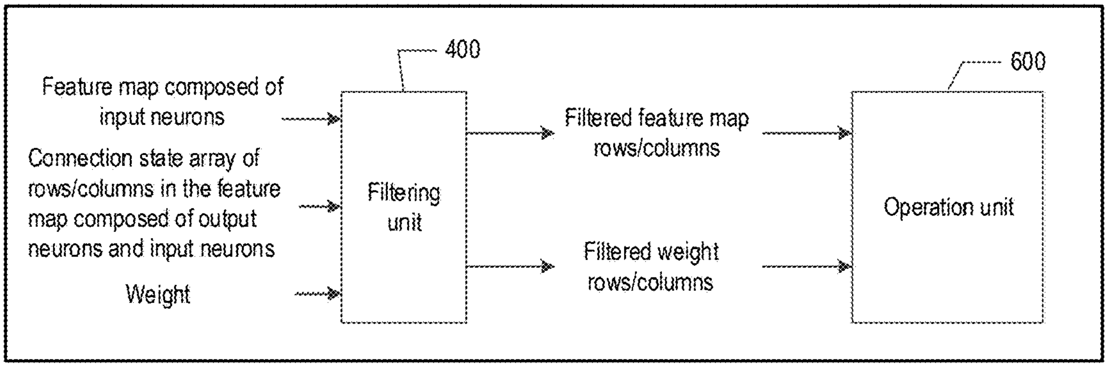

FIG. 56C is a schematic diagram showing a function of a filtering unit of an operation device according to another example of the present disclosure.

Figure 56D:
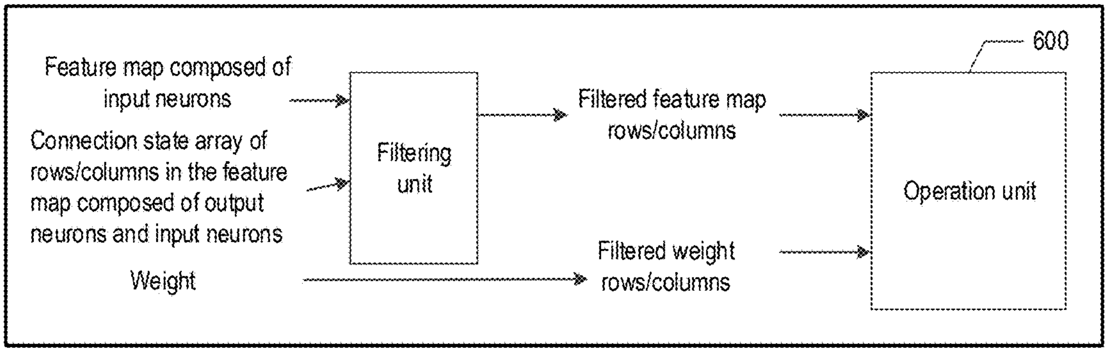

FIG. 56D is a schematic diagram showing a function of a filtering unit of an operation device according to another example of the present disclosure.

Figure 56E:
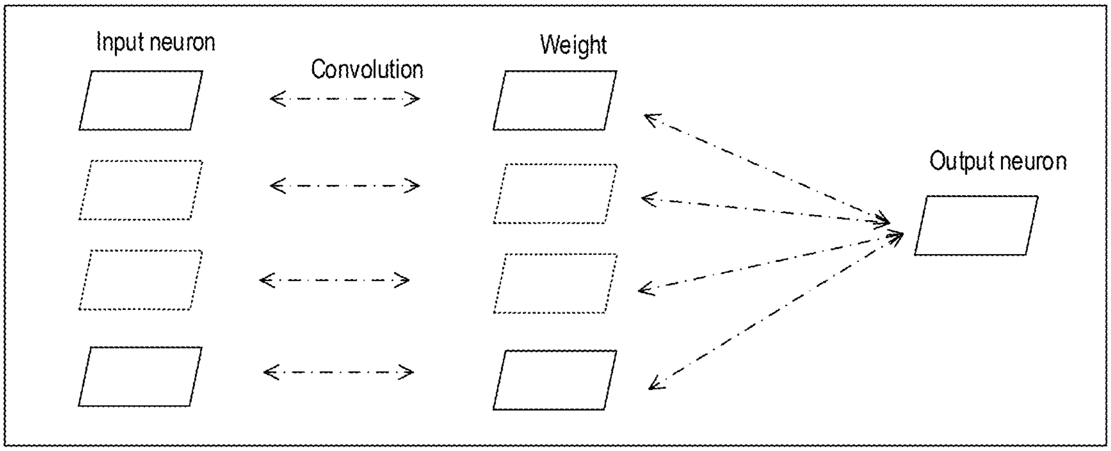

FIG. 56E is a comparison diagram of an operation of a convolution layer of an artificial neural network before structure clipping according to an example of the present disclosure.

Figure 56F:
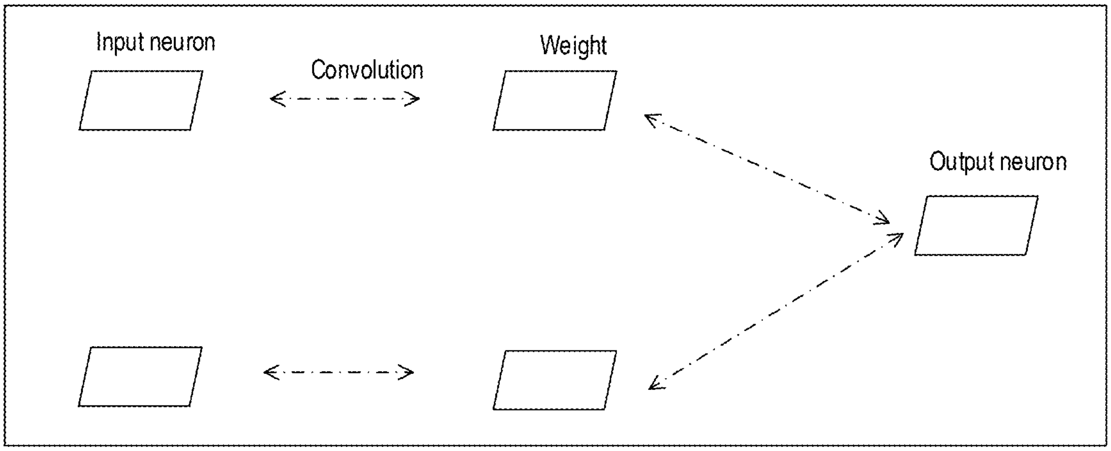

FIG. 56F is a comparison diagram of an operation of a convolution layer of an artificial neural network after structure clipping according to an example of the present disclosure.

Figure 57:
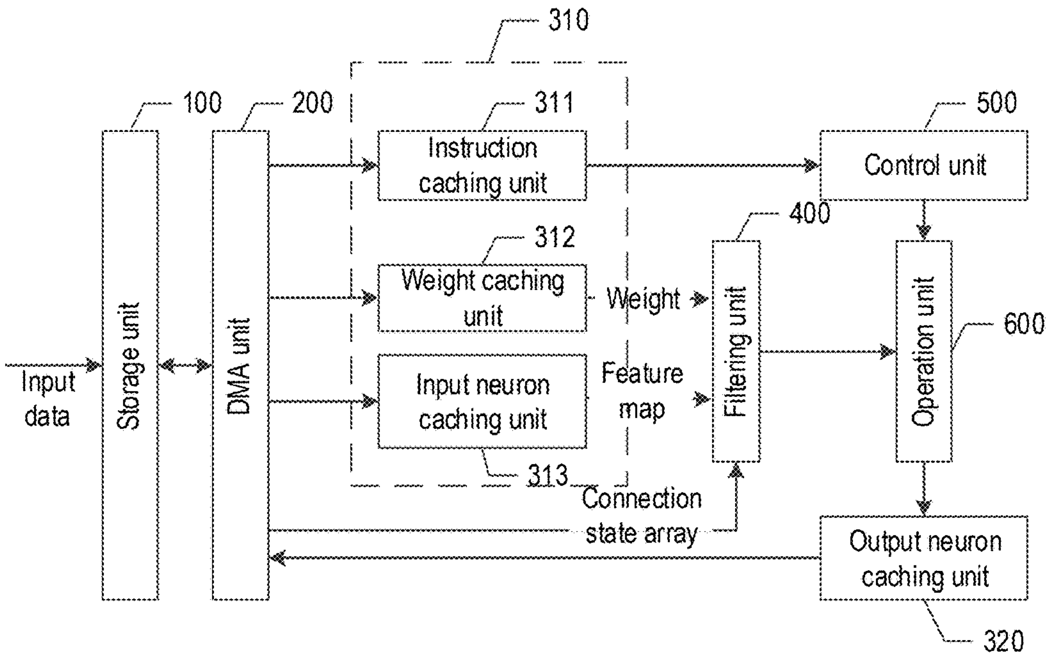

FIG. 57 is a structural diagram of an operation device according to an example of the present disclosure.

Figure 57A:
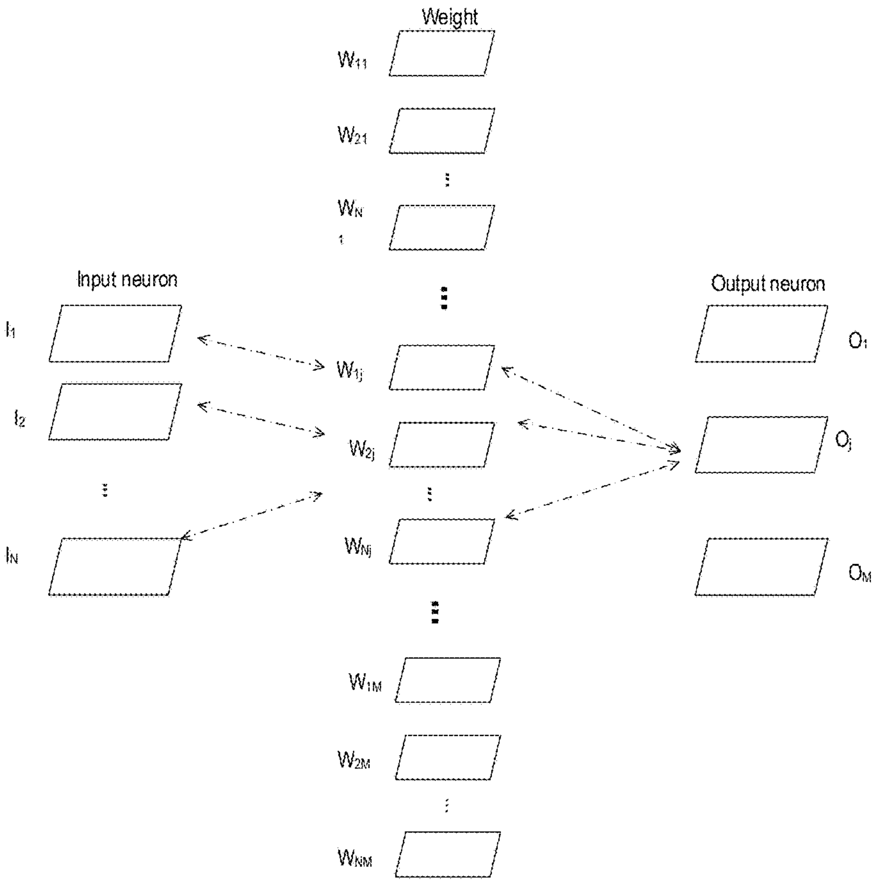

FIG. 57A is a structural diagram of a convolution layer of an artificial neural network according to an example of the present disclosure.

Figure 57B:
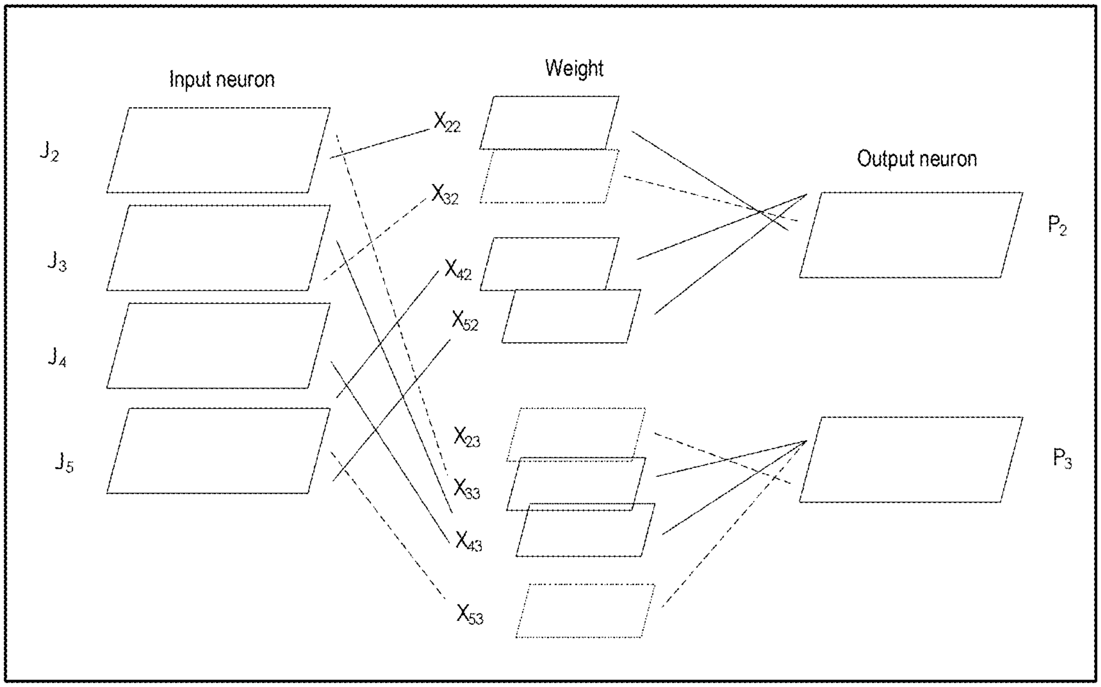

FIG. 57B is a schematic diagram showing clipping a structure of an artificial neural network by a filtering unit according to an example of the present disclosure.

Figure 57C:
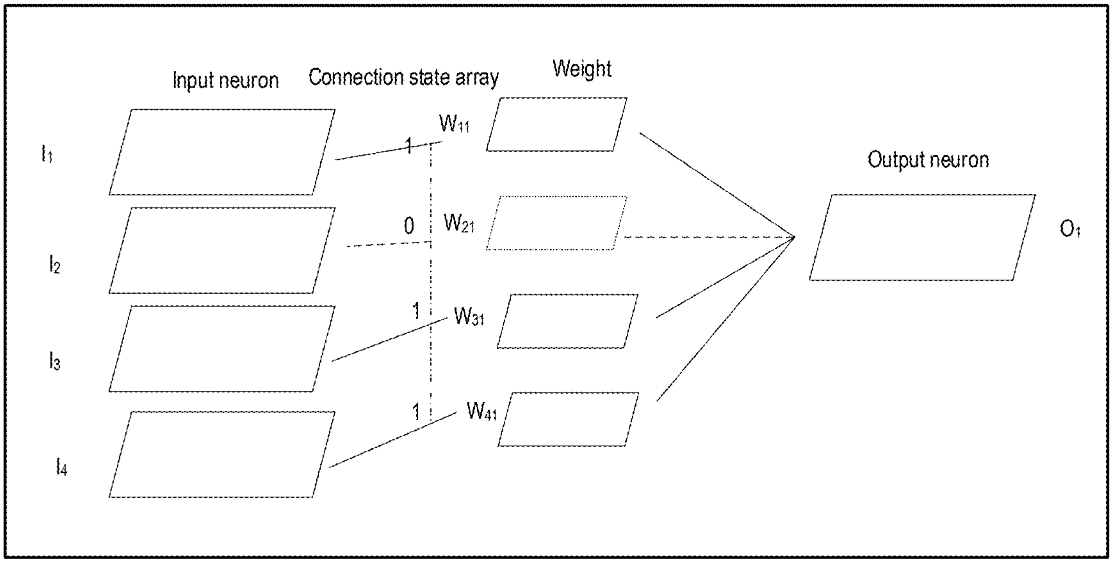

FIG. 57C is a schematic diagram illustrating an implementation of the structure clipping of FIG. 57B by using a connection state array according to an example of the present disclosure.

Figure 57D:
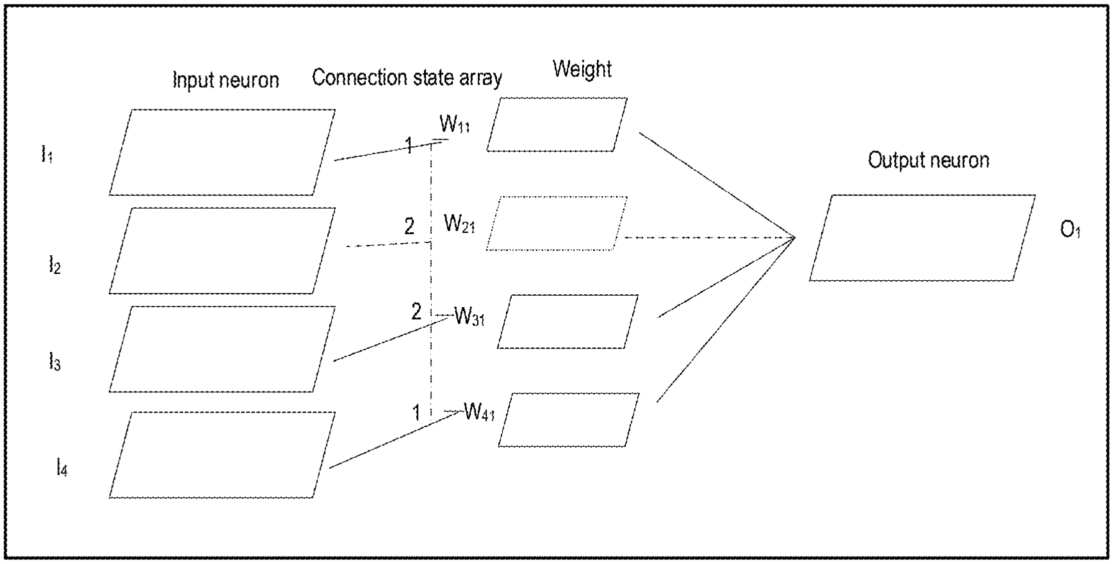

FIG. 57D is a schematic diagram illustrating another implementation of the structure clipping of FIG. 57B by using a connection state array according to an example of the present disclosure.

Figure 57E:
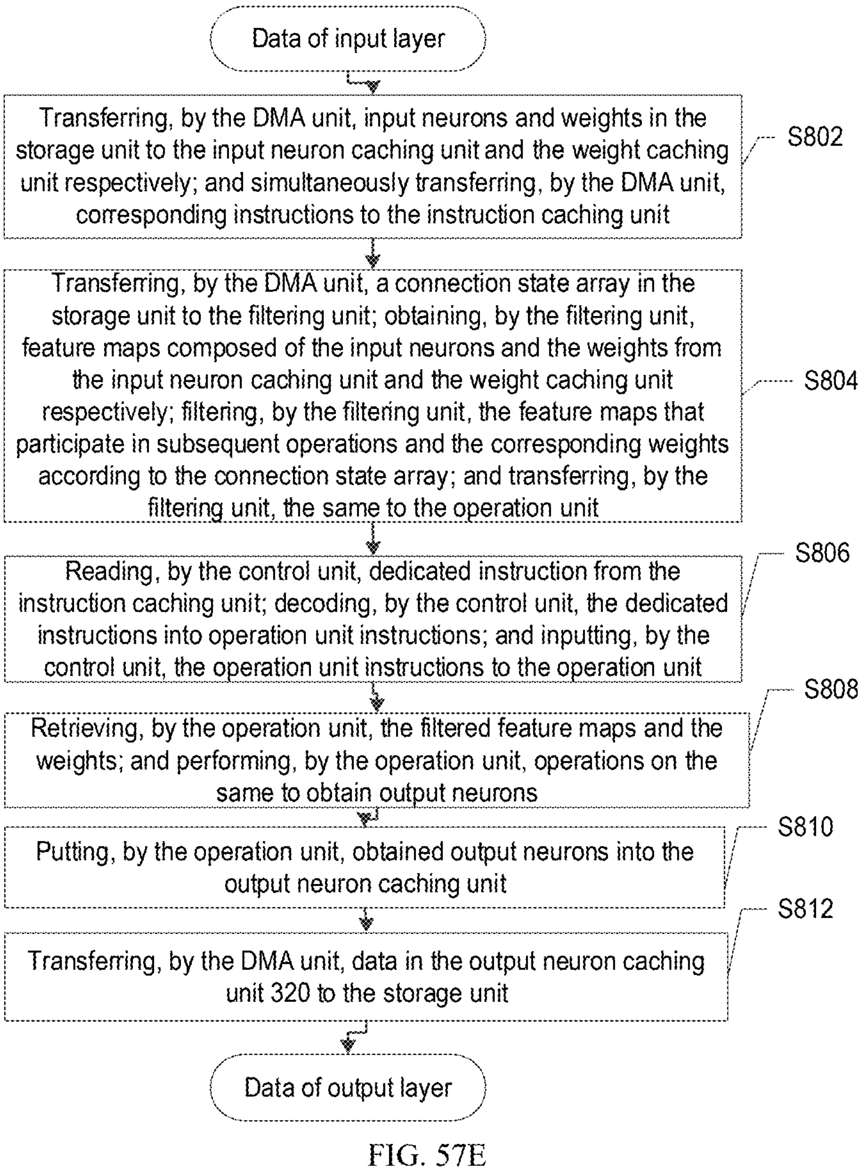

FIG. 57E is a flowchart of a method of computing by an operation device according to an example of the present disclosure.

Figure 57F:
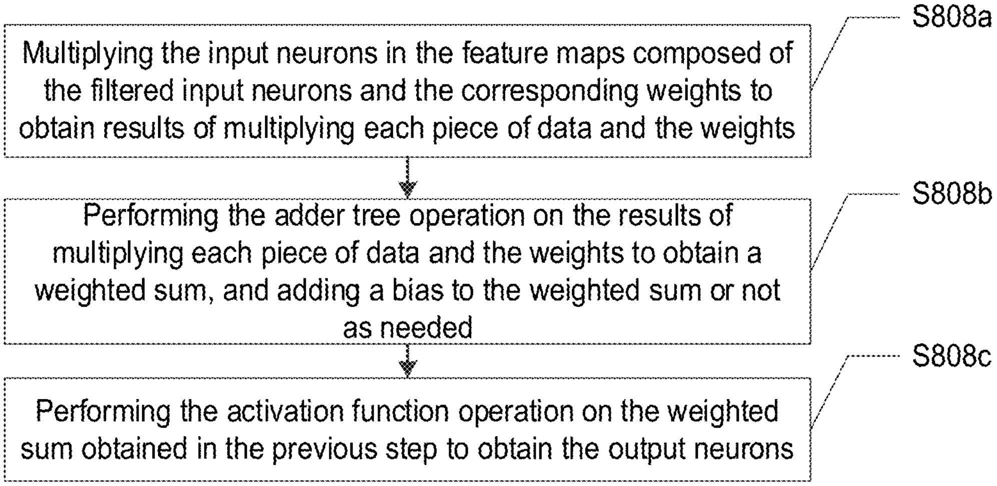

FIG. 57F is a flowchart of sub-steps of a step S808 shown in FIG. 57E according to an example of the present disclosure.

Figure 58A:
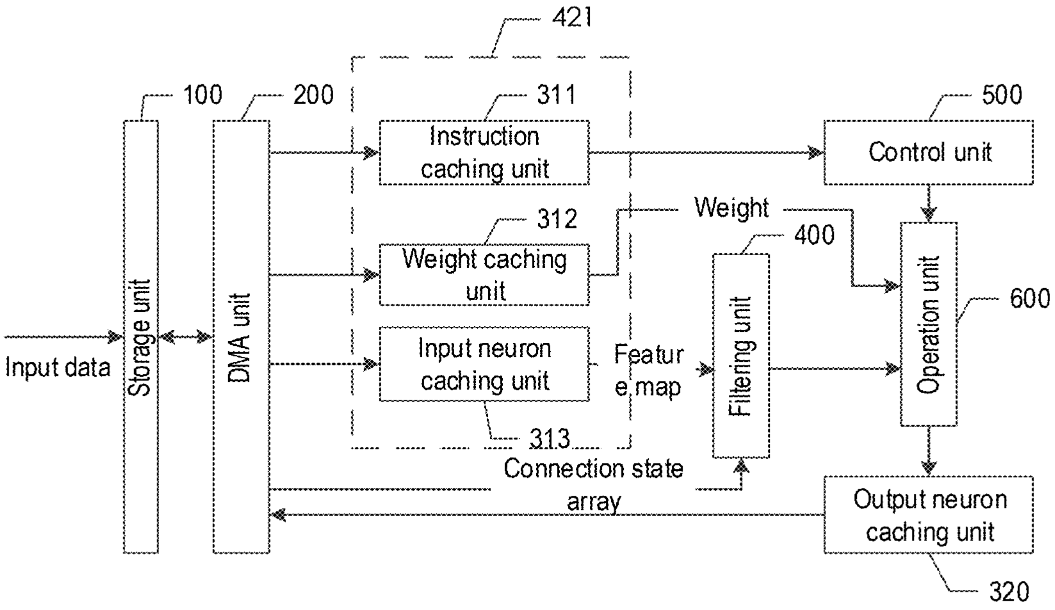

FIG. 58A is a structural diagram of another operation device according to an example of the present disclosure.

Figure 58B:
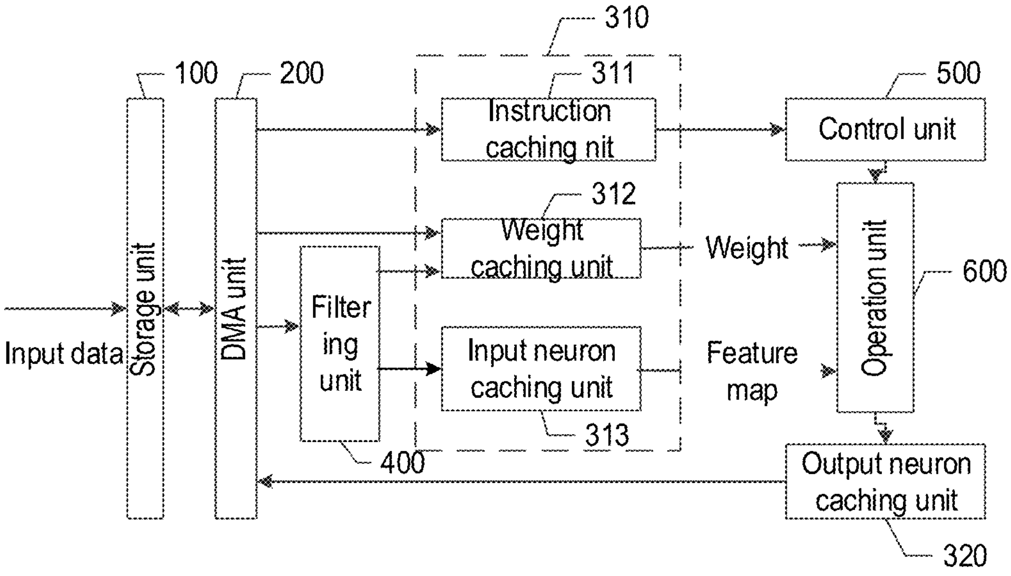

FIG. 58B is a structural diagram of another operation device according to an example of the present disclosure.

Figure 59:
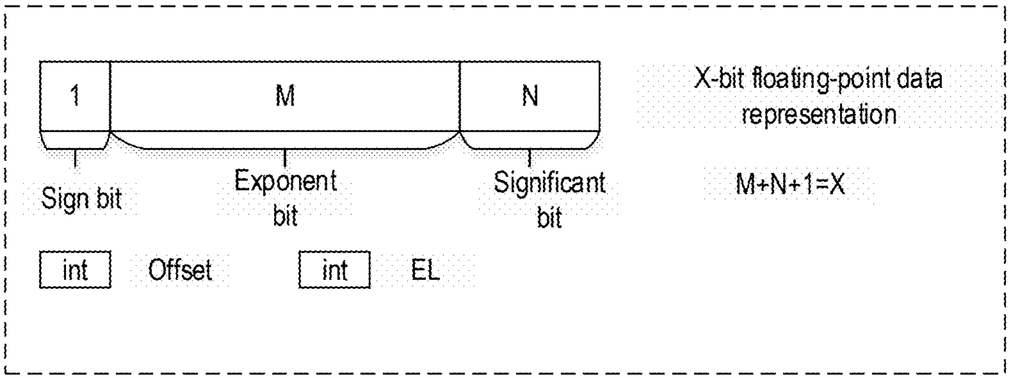

FIG. 59 shows an implementation of a short-bit floating-point data structure for data storage according to an example of the present disclosure.

Figure 60:
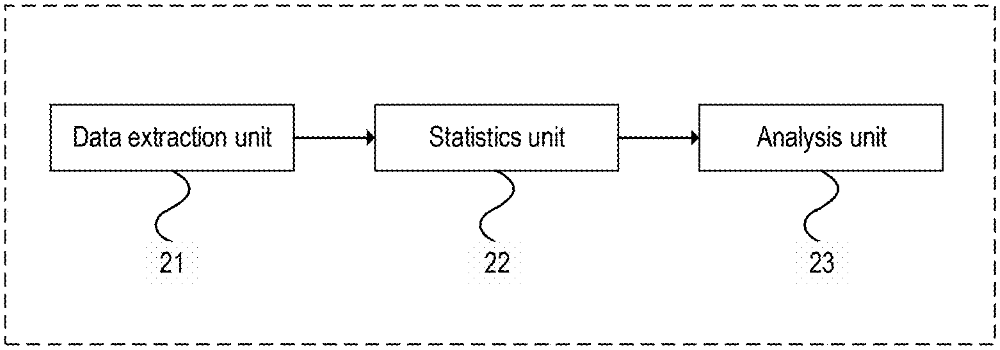

FIG. 60 is a schematic diagram of a floating-point data statistics module in a device for performing a forward operation of an artificial neural network according to an example of the present disclosure.

Figure 60A:
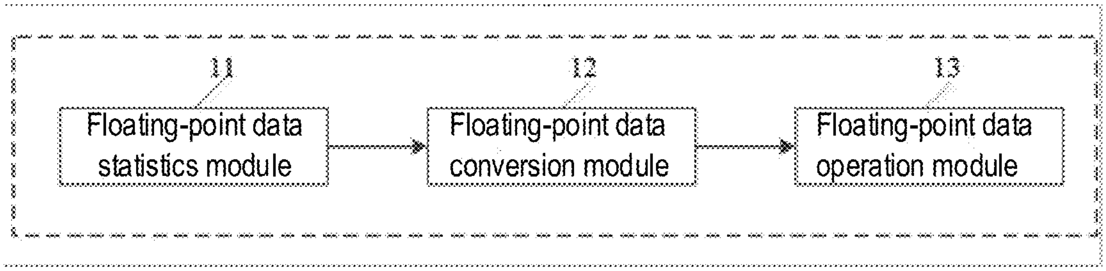

FIG. 60A is a schematic diagram of a device for performing a forward operation of an artificial neural network according to an example of the present disclosure.

Figure 61:
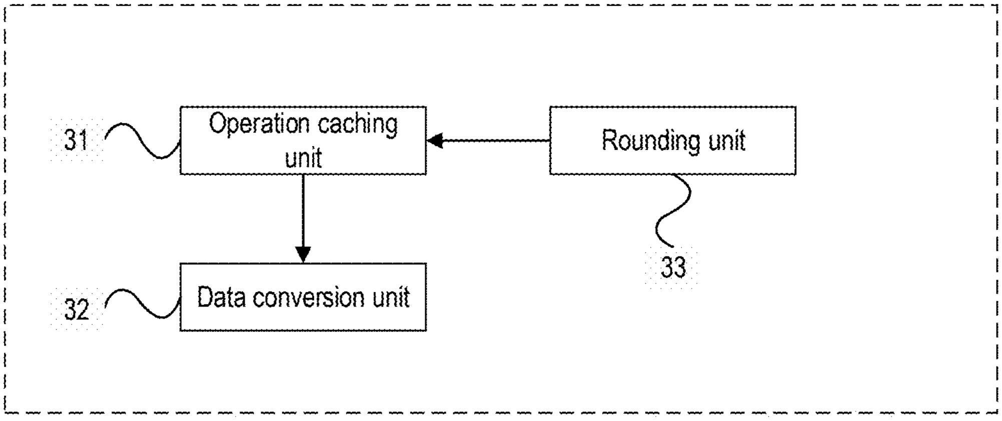

FIG. 61 is a block diagram of a short-bit floating-point computing part of a forward operation module in a device for performing a forward operation of an artificial neural network according to an example of the present disclosure.

Figure 62:
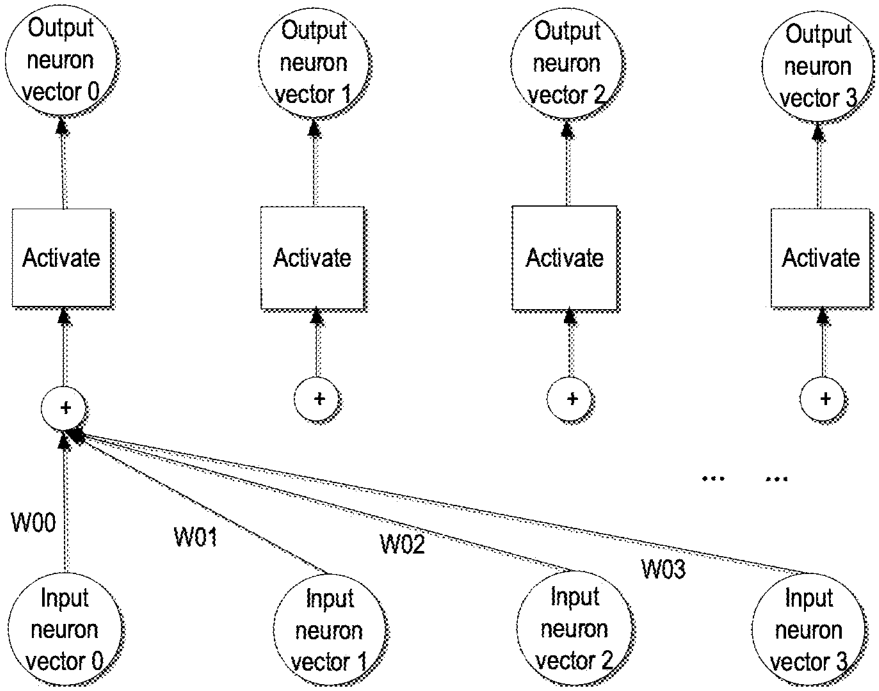

FIG. 62 is a block diagram of a process of a neural network forward operation according to an example of the present disclosure.

Figure 63:
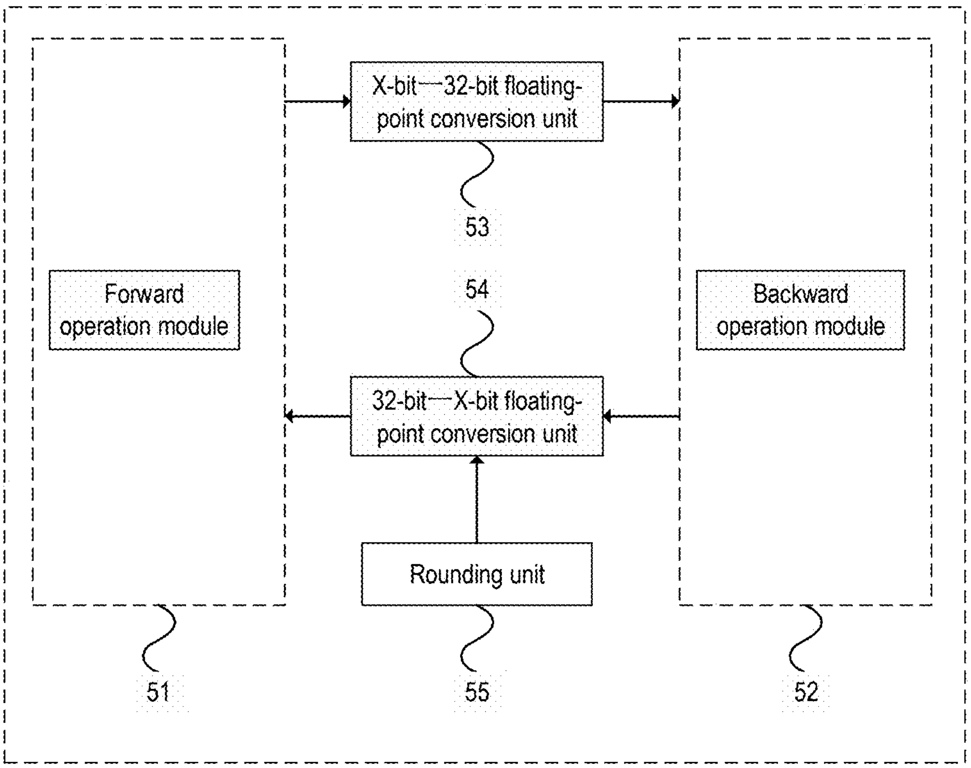

FIG. 63 is a block diagram showing an operation process of a device for performing a forward operation of an artificial neural network according to an example of the present disclosure.

Figure 64:
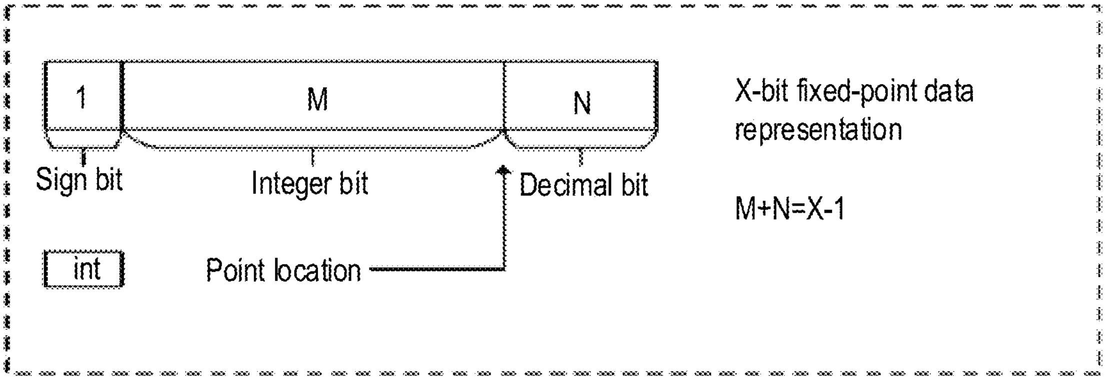

FIG. 64 shows an implementation of a fixed-point data structure for data storage according to an example of the present disclosure.

Figure 65:
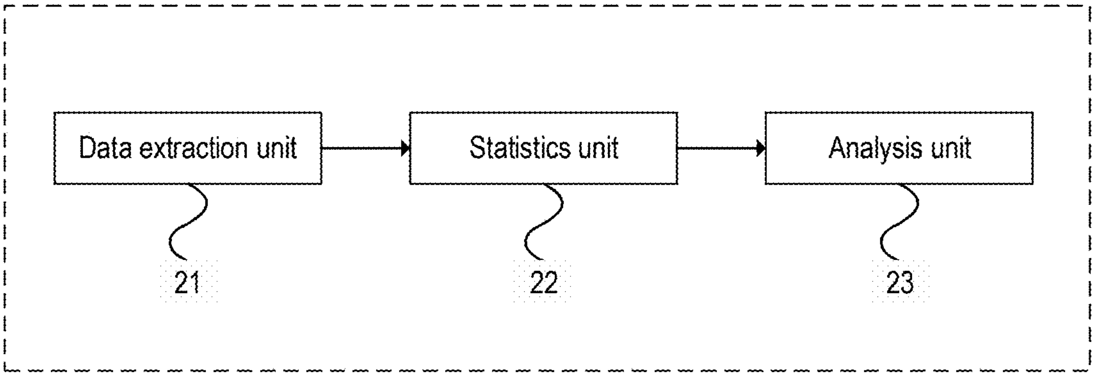

FIG. 65 is a schematic diagram of a floating-point data statistics module in a device for performing a forward operation of an artificial neural network according to an example of the present disclosure.

Figure 65A:
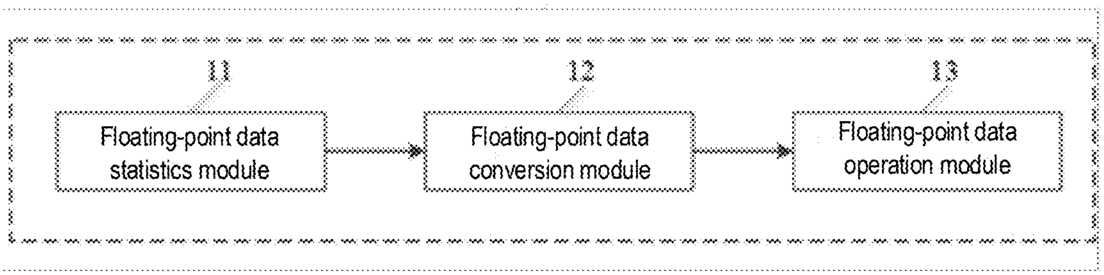

FIG. 65A is a schematic diagram of a device for performing a forward operation of an artificial neural network according to an example of the present disclosure.

Figure 66:
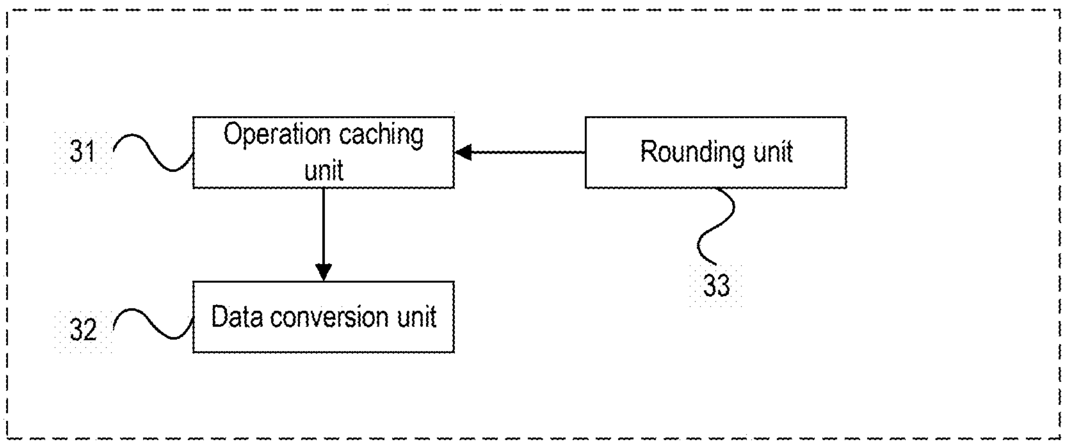

FIG. 66 is a schematic diagram of a short-bit fixed computing part of a forward operation module in a device for performing a forward operation of an artificial neural network according to an example of the present disclosure.

Figure 67:
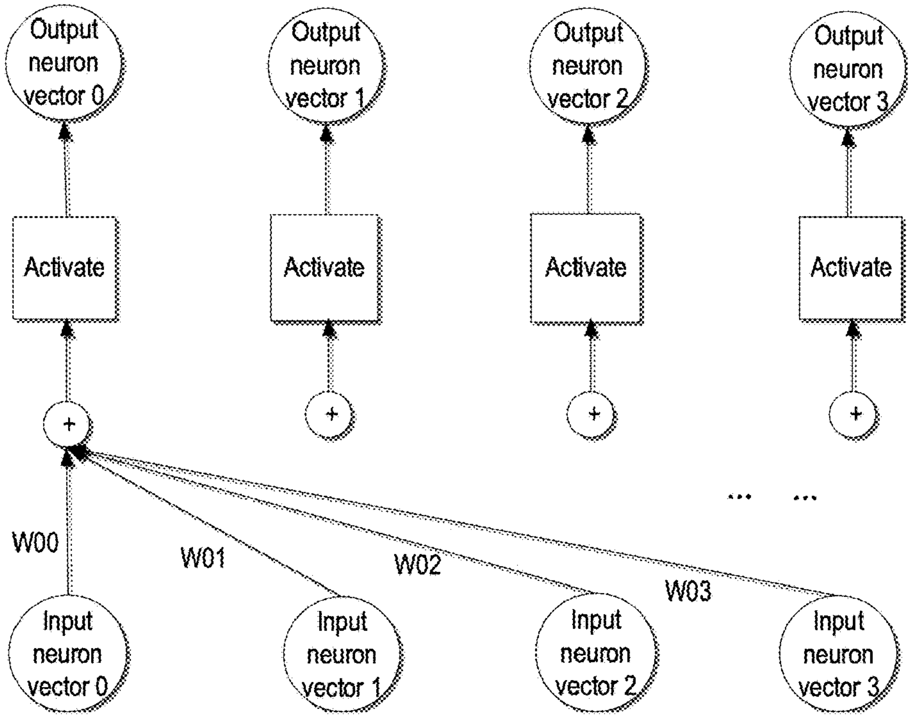

FIG. 67 is a schematic diagram of a process of a neural network forward operation according to an example of the present disclosure.

Figure 68:
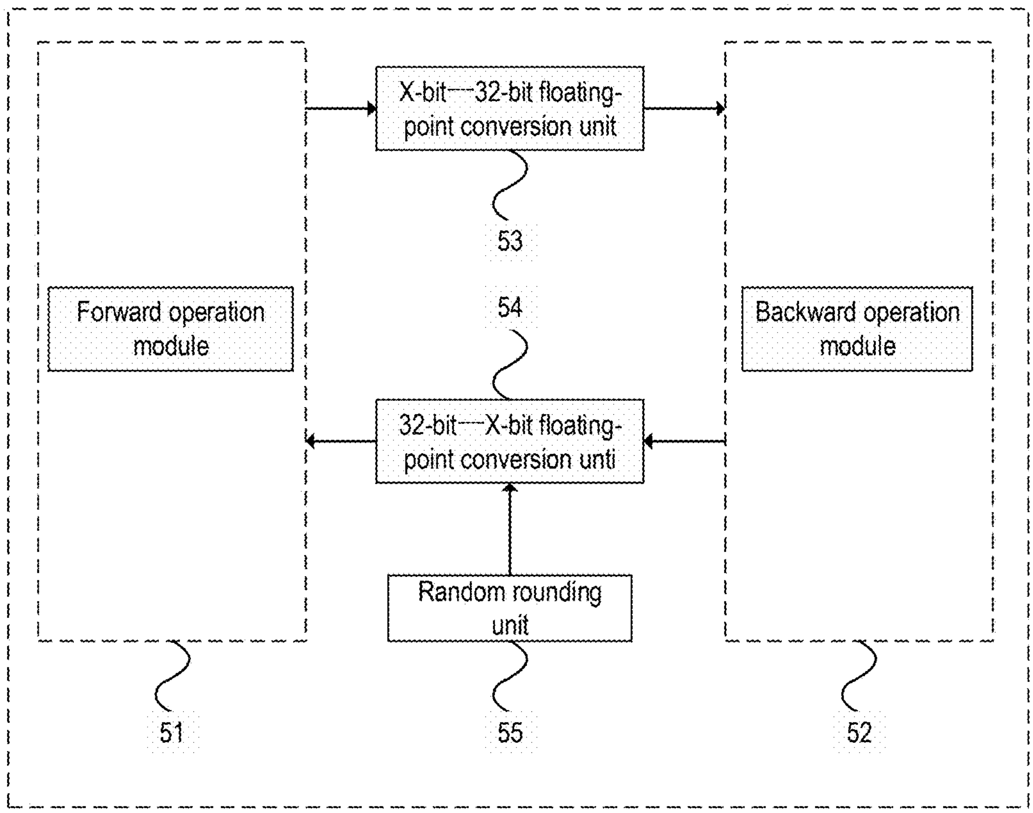

FIG. 68 is a block diagram showing an operation process of a device for performing a forward operation of an artificial neural network according to an example of the present disclosure.

Figure 69:
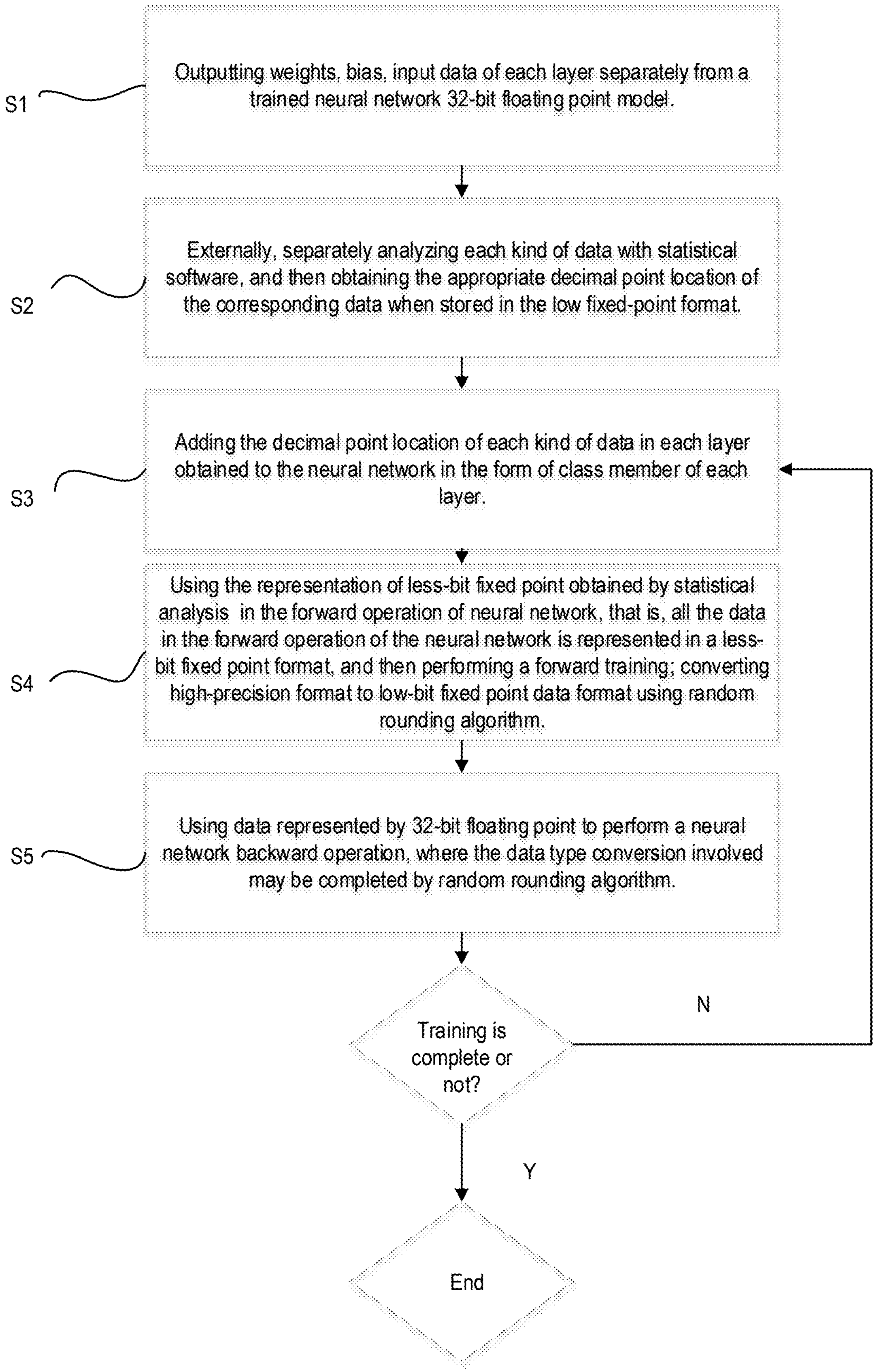

FIG. 69 is an overall flowchart of implementing an algorithm according to an example of the present disclosure.

Figure 70:
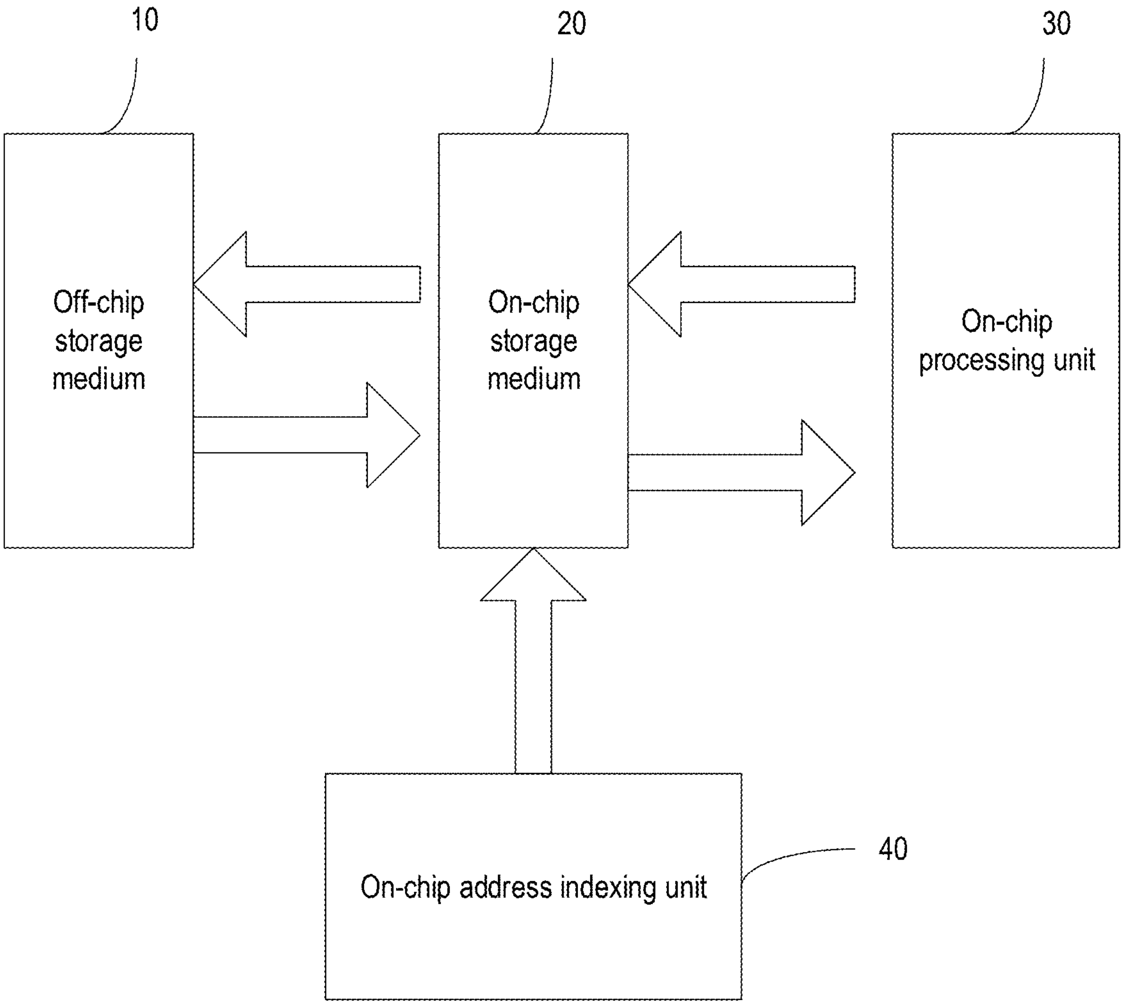

FIG. 70 is a block diagram of an overall structure of a preferred example of an on-chip repetitive addressing device according to the present disclosure.

Figure 71:
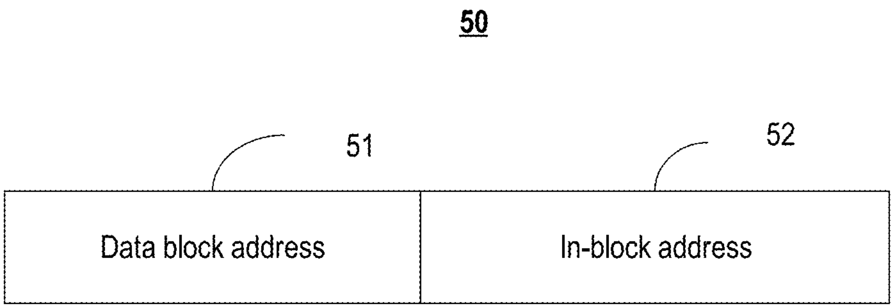

FIG. 71 is a diagram of data address partition of a preferred example of an on-chip repetitive addressing method according to the present disclosure.

Figure 72:
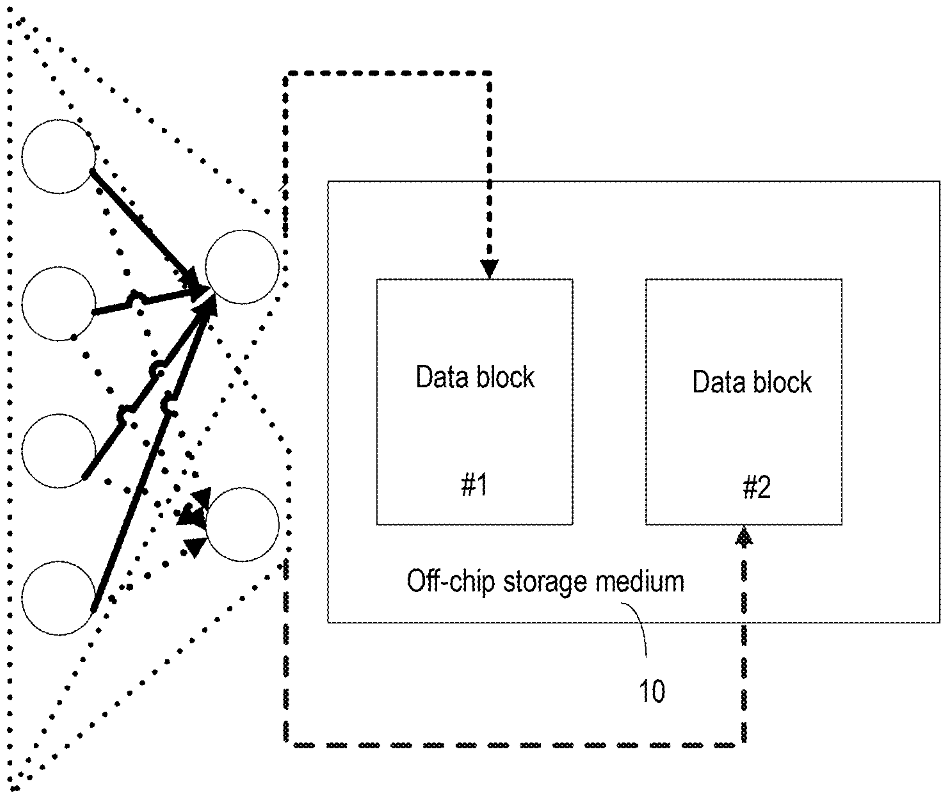

FIG. 72 is a first diagram of data partition of a preferred example of an on-chip repetitive addressing method according to the present disclosure.

Figure 73:
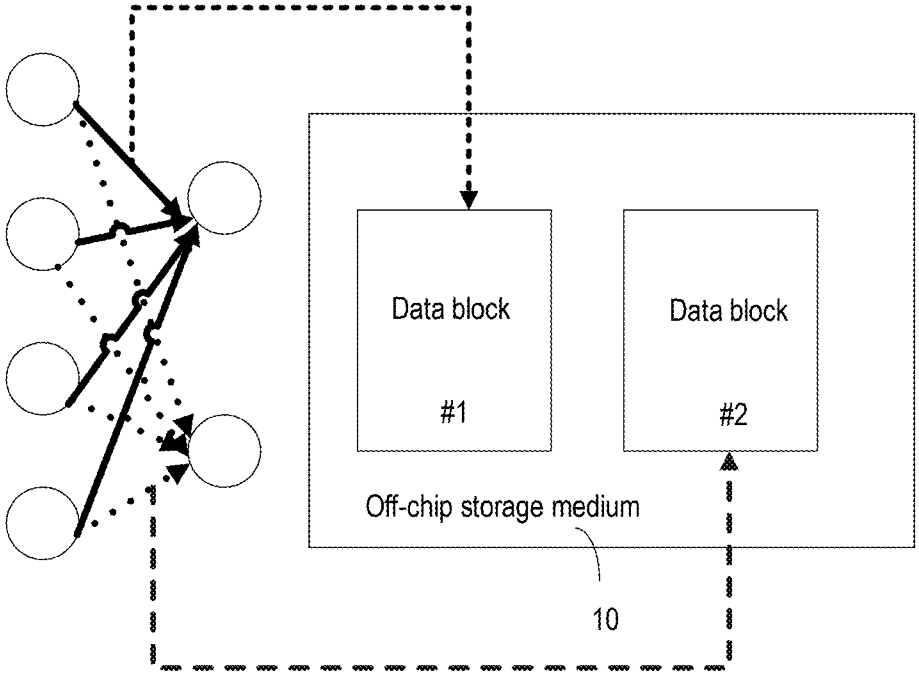

FIG. 73 is a second diagram of data partition of a preferred example of an on-chip repetitive addressing method according to the present disclosure.

Figure 74:
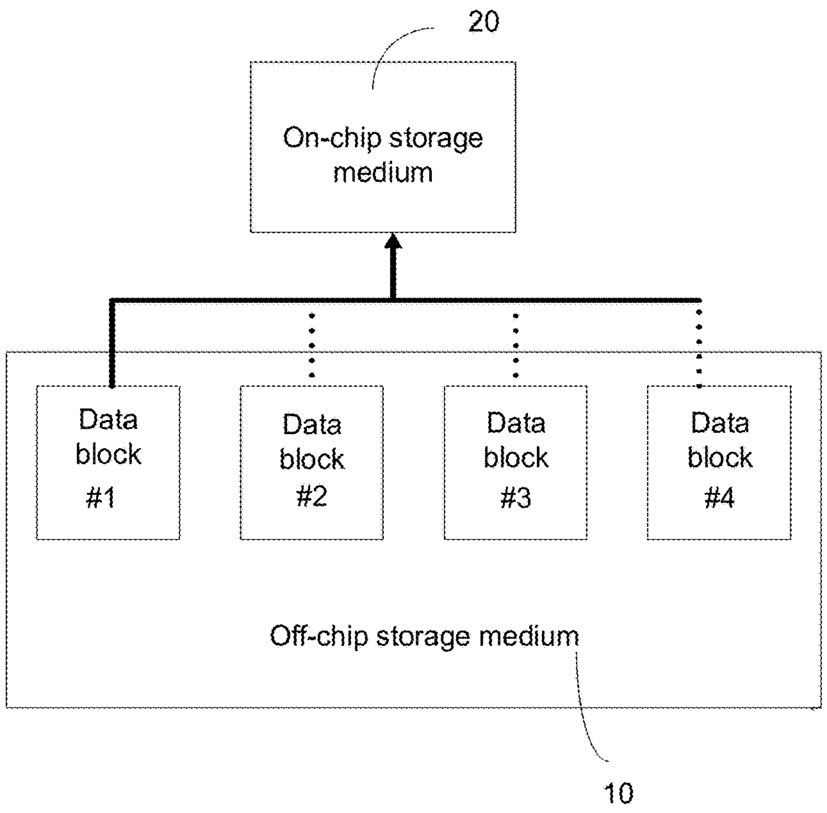

FIG. 74 is a schematic diagram of a replacement strategy of a preferred example of an on-chip repetitive addressing method according to the present disclosure.

Figure 75:
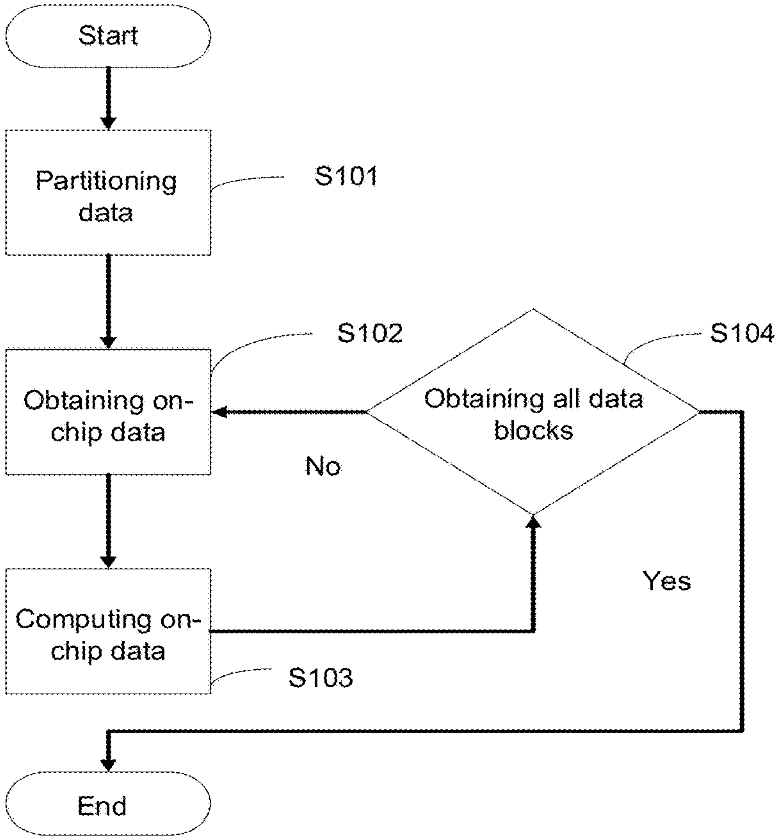

FIG. 75 is a flowchart of an example of an on-chip repetitive addressing method according to the present disclosure.

Figure 76:
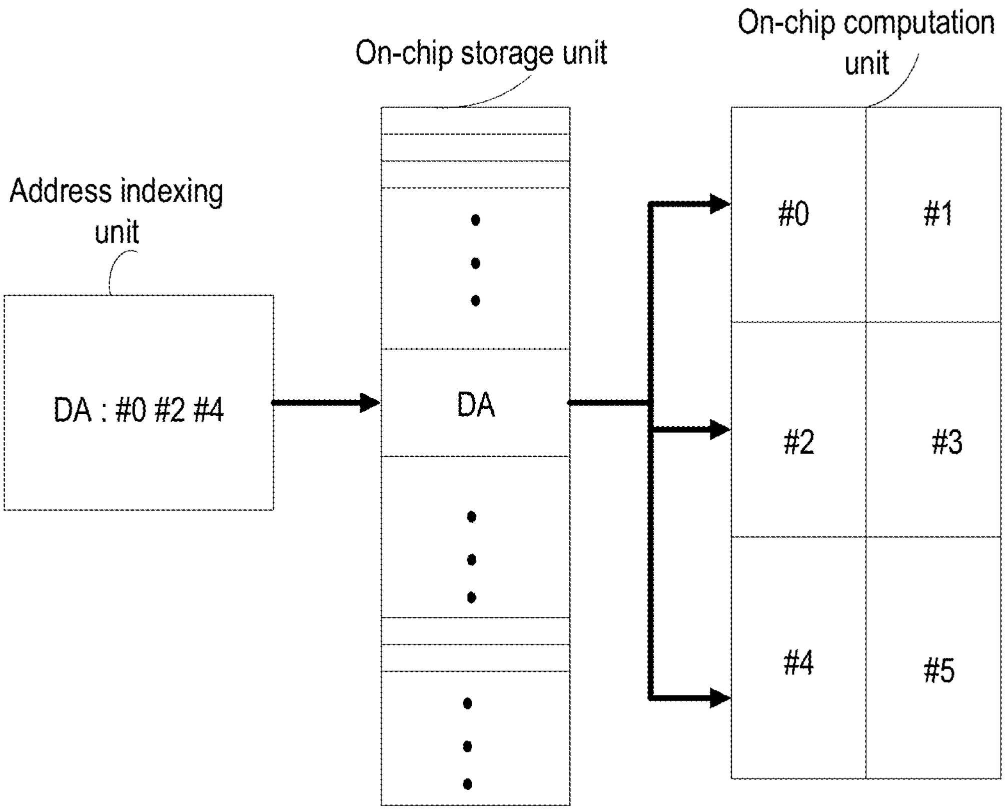

FIG. 76 is a schematic diagram of a preferred example of on-chip repeated indexing of an on-chip repetitive addressing method according to the present disclosure.

Figure 77:
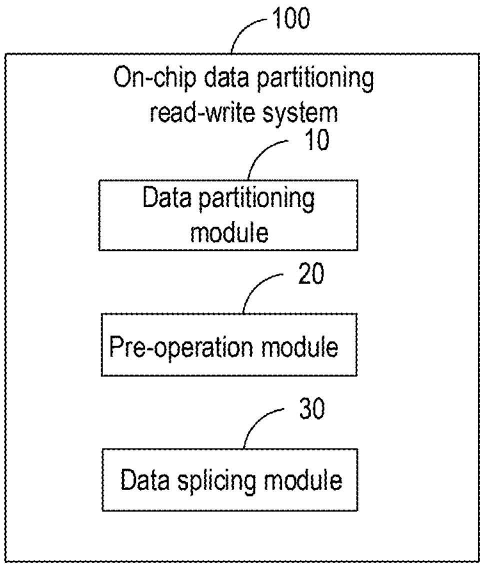

FIG. 77 is a structural diagram of an on-chip data partitioning read-write system according to the present disclosure.

Figure 78:
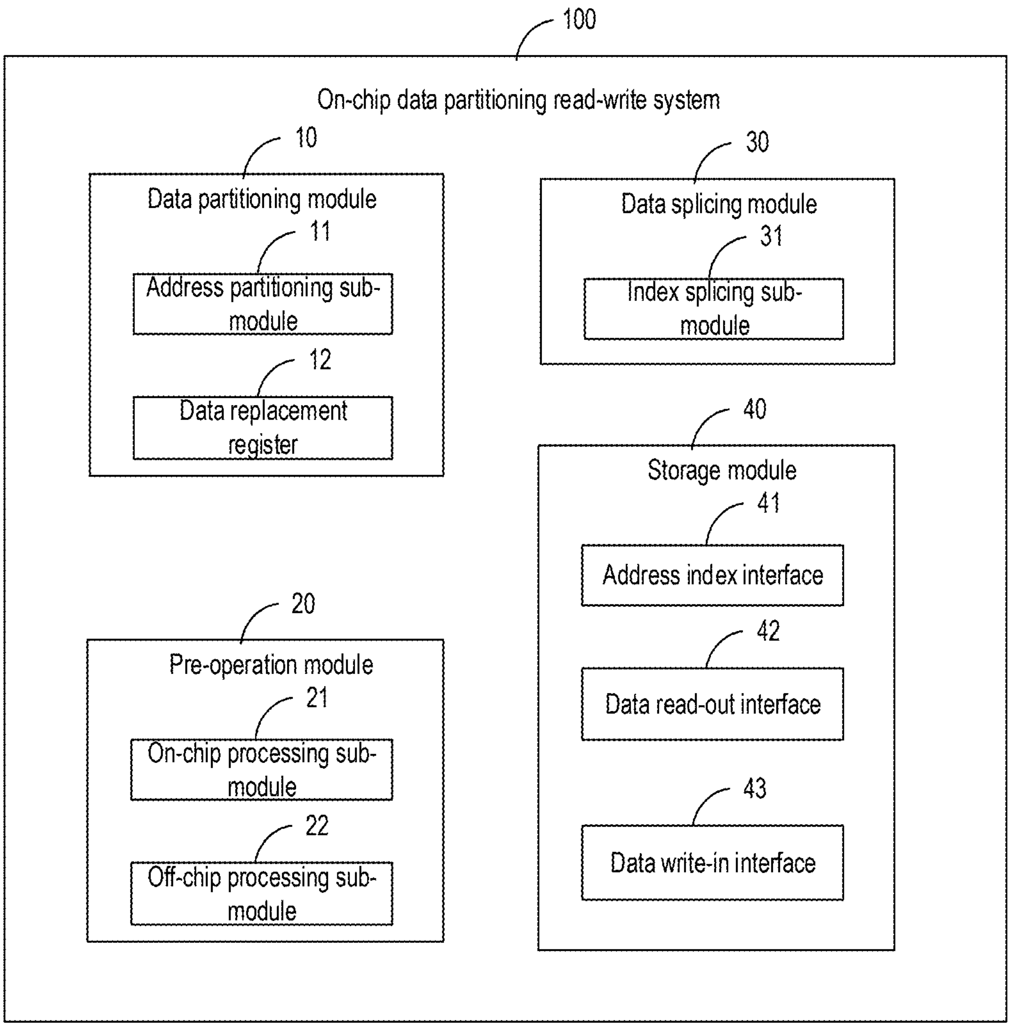

FIG. 78 is a structural diagram of the on-chip data partitioning read-write system according a preferred example of the present disclosure.

Figure 79A:
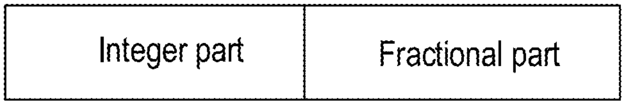

FIG. 79A is a first diagram of an implementation of the on-chip data partition strategy of the present disclosure.

Figure 79B:
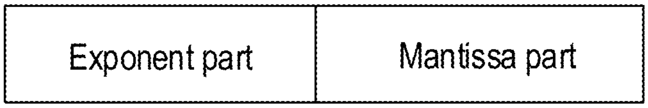

FIG. 79B is a second diagram of an implementation of the on-chip data partition strategy of the present disclosure.

Figure 80:
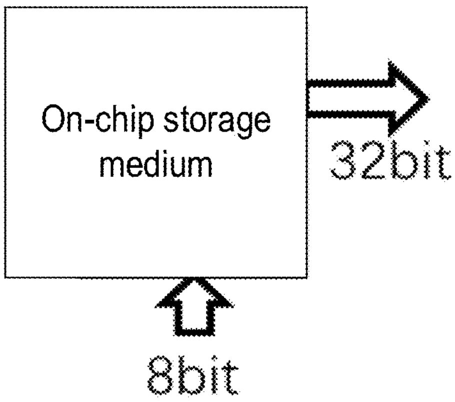

FIG. 80 is a schematic diagram of on-chip data indexing of the on-chip data partitioning read-write system according an example of the present disclosure.

Figure 81:
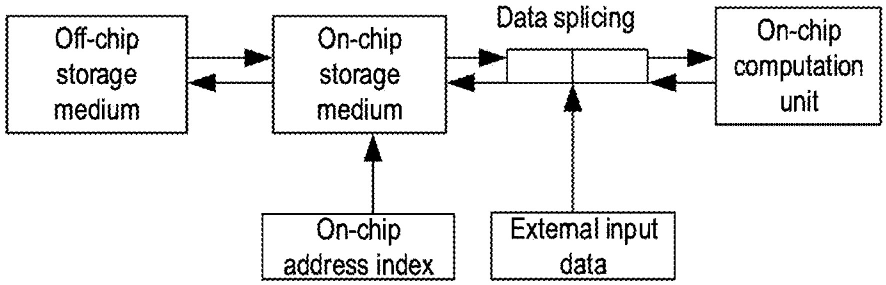

FIG. 81 is a diagram of a physical structure of an on-chip data partitioning read-write method according an example of the present disclosure.

Figure 82:
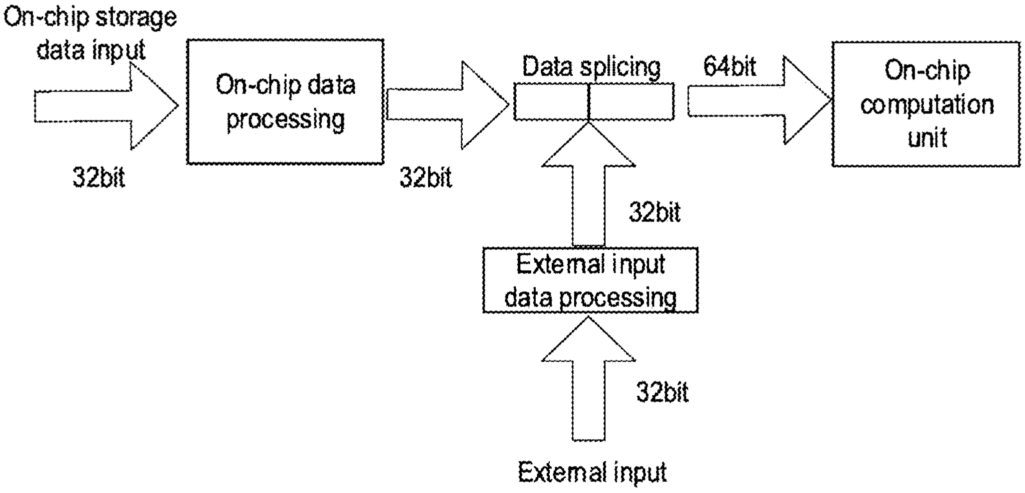

FIG. 82 is a diagram showing a physical design of a data splicing operation in an example of the on-chip data partitioning read-write method according an example of the present disclosure.

Figure 83:
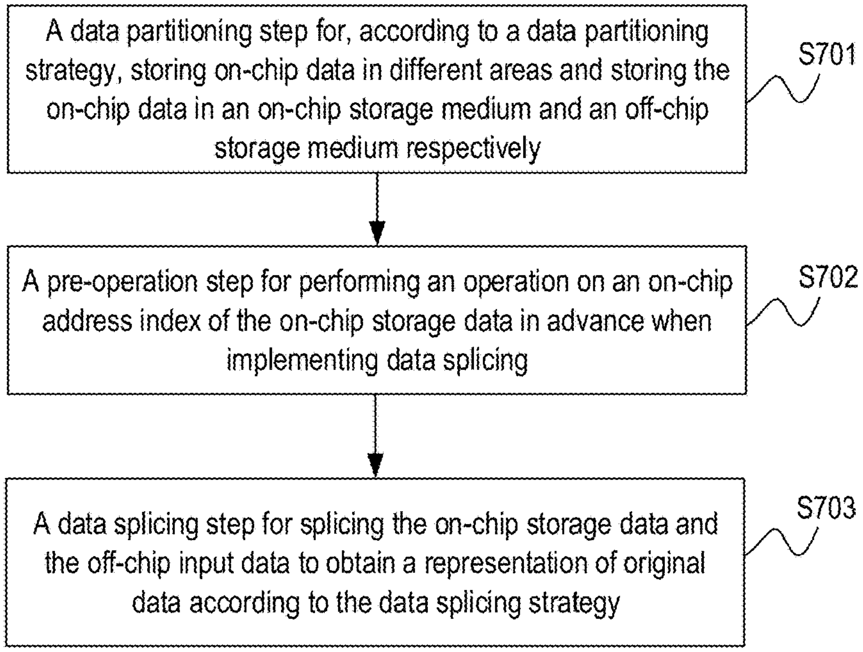

FIG. 83 is a flowchart of the on-chip data partitioning read-write method according an example of the present disclosure.

Figure 84:
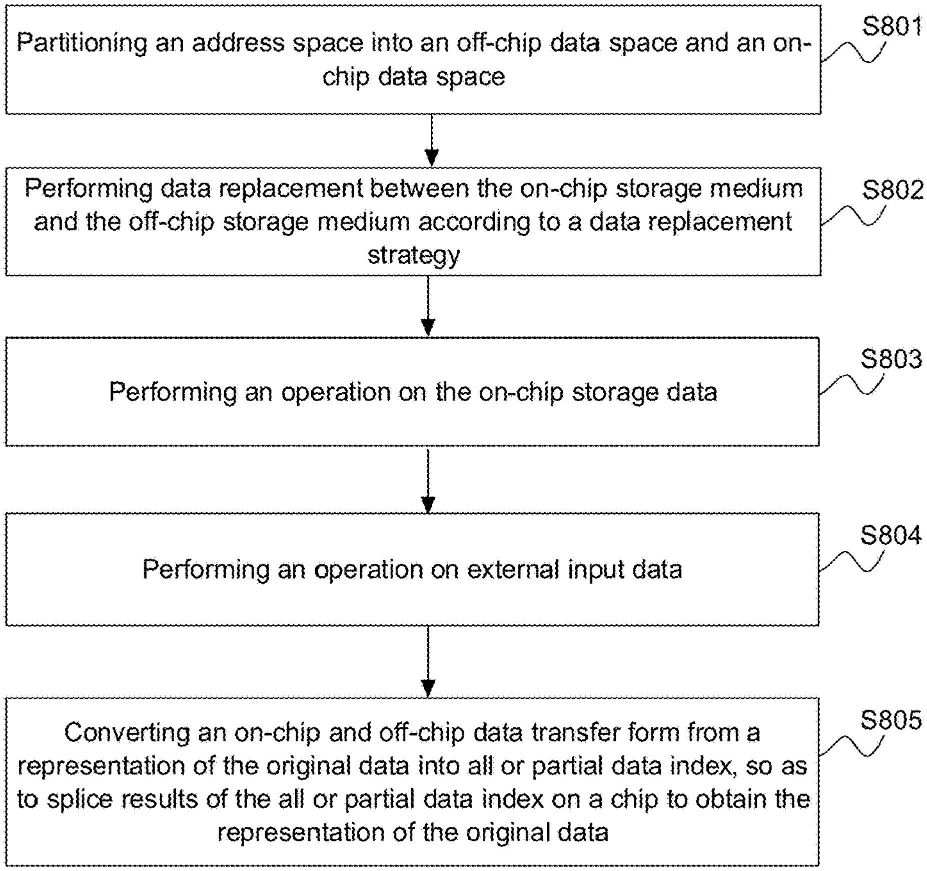

FIG. 84 is a flowchart of an implementation of the on-chip data partitioning read-write method according an example of the present disclosure.

Figure 85:
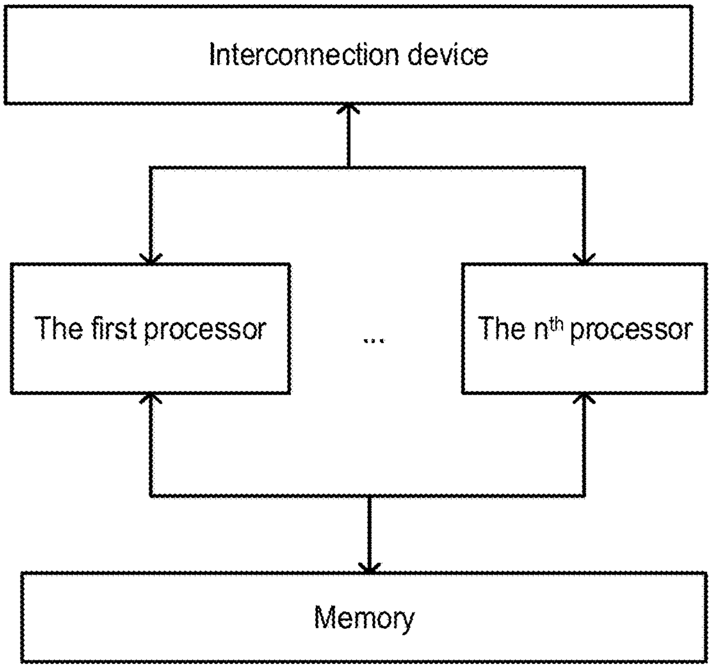

FIG. 85 is structural diagram of a neural network computing system according to an example of the present disclosure.

Figure 86A:
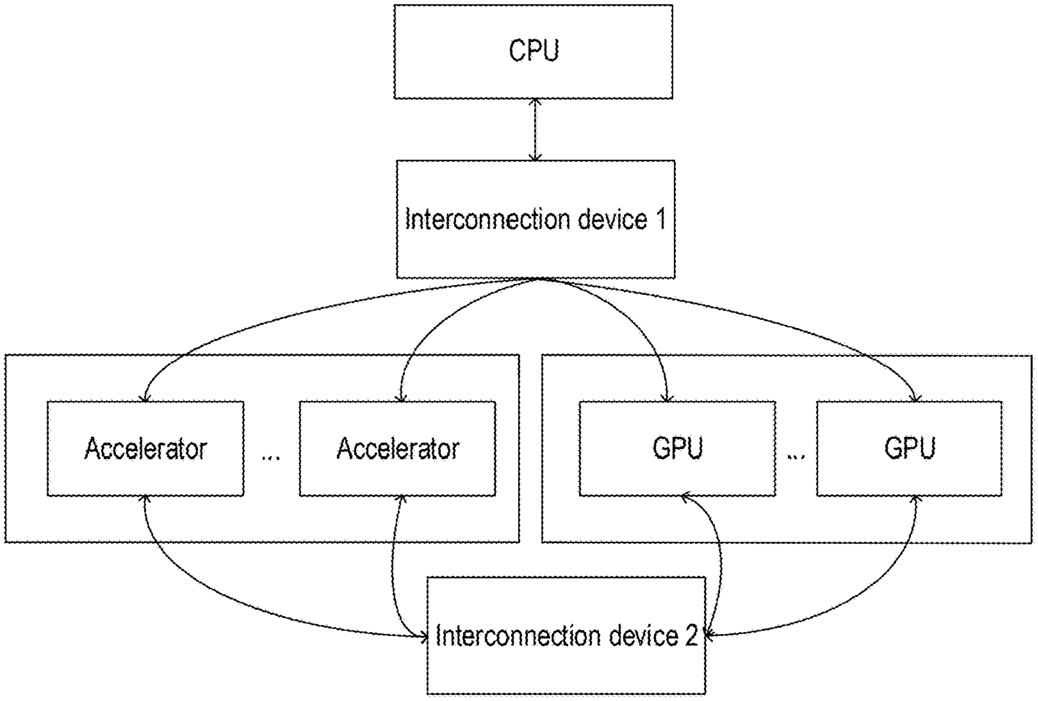

FIG. 86A is a schematic diagram of multiple processors according to an example of the present disclosure.

Figure 86B:
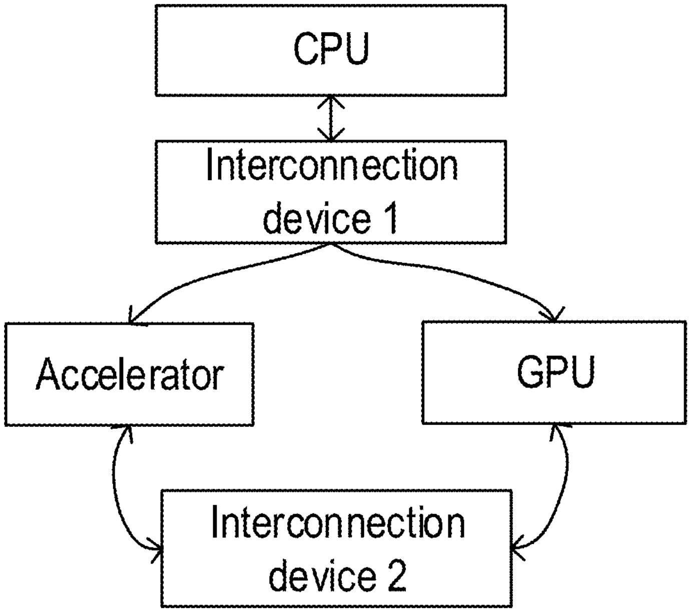

FIG. 86B is a schematic diagram of multiple processors according to another example of the present disclosure.

Figure 87:
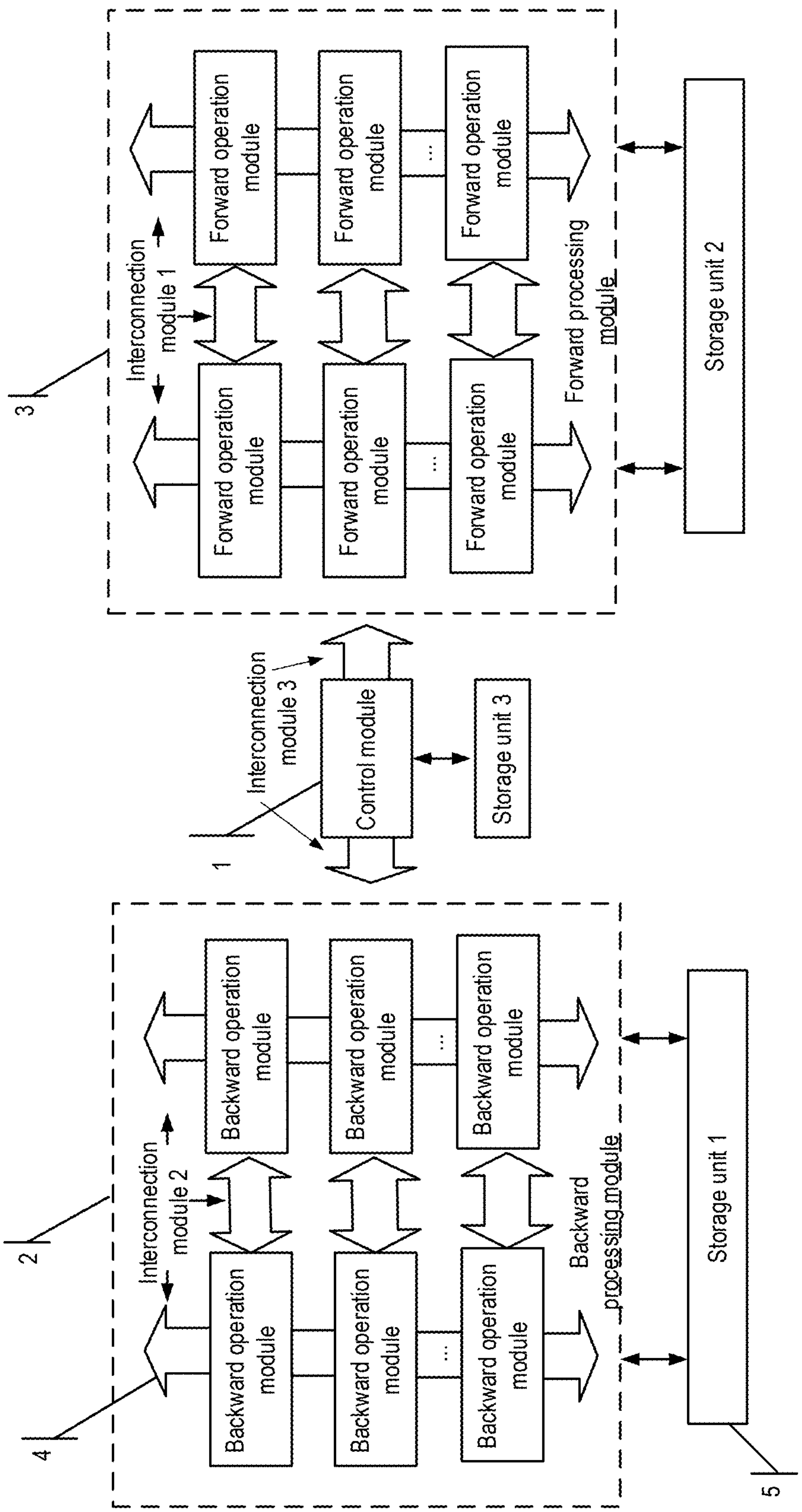

FIG. 87 is a structural diagram of a neural network computing system for training and inference according to an example of the present disclosure.

Figure 88:
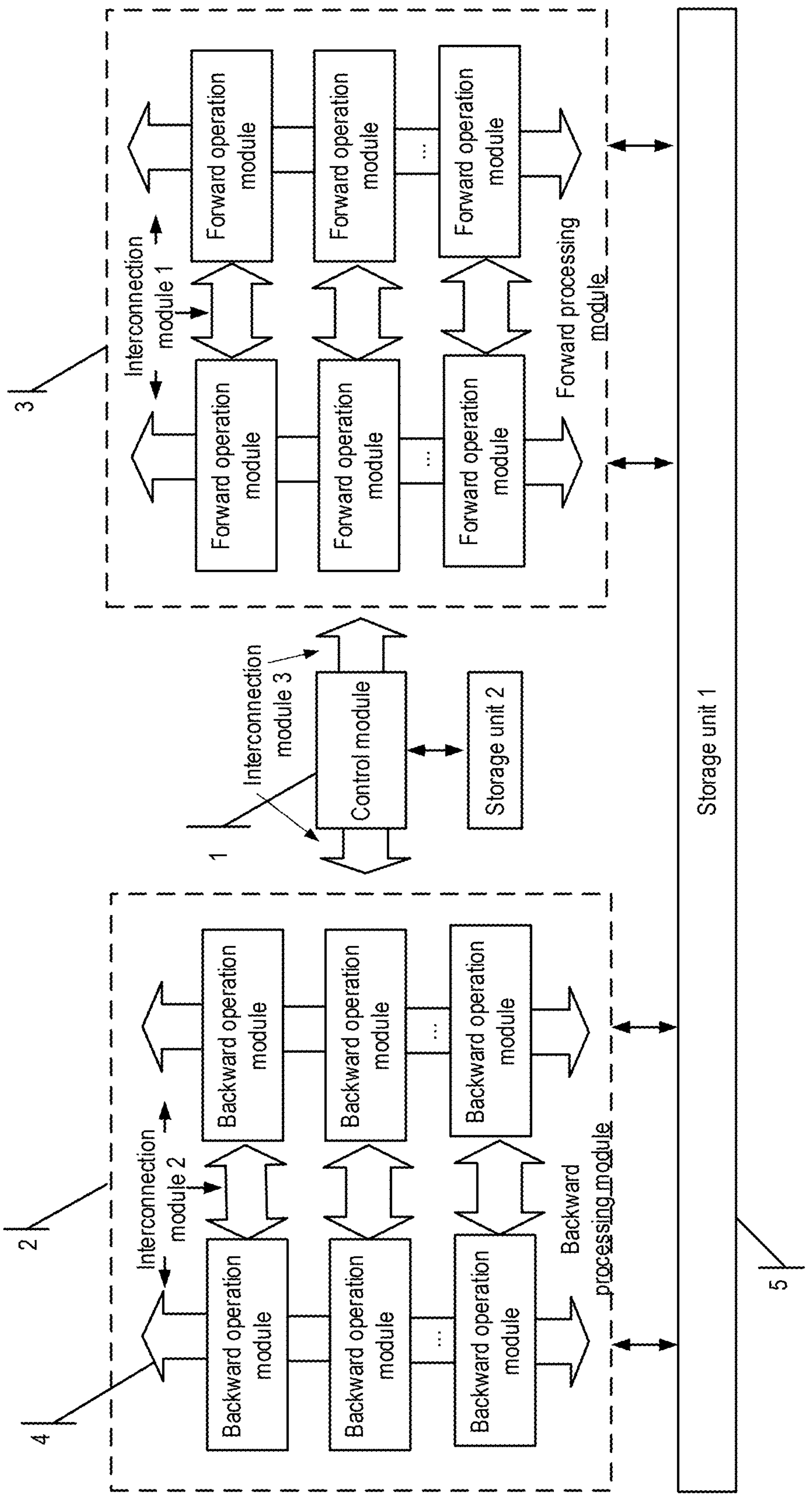

FIG. 88 is a structural diagram of a computing system in which computing processors shares a storage unit according to an example of the present disclosure.

Figure 89:
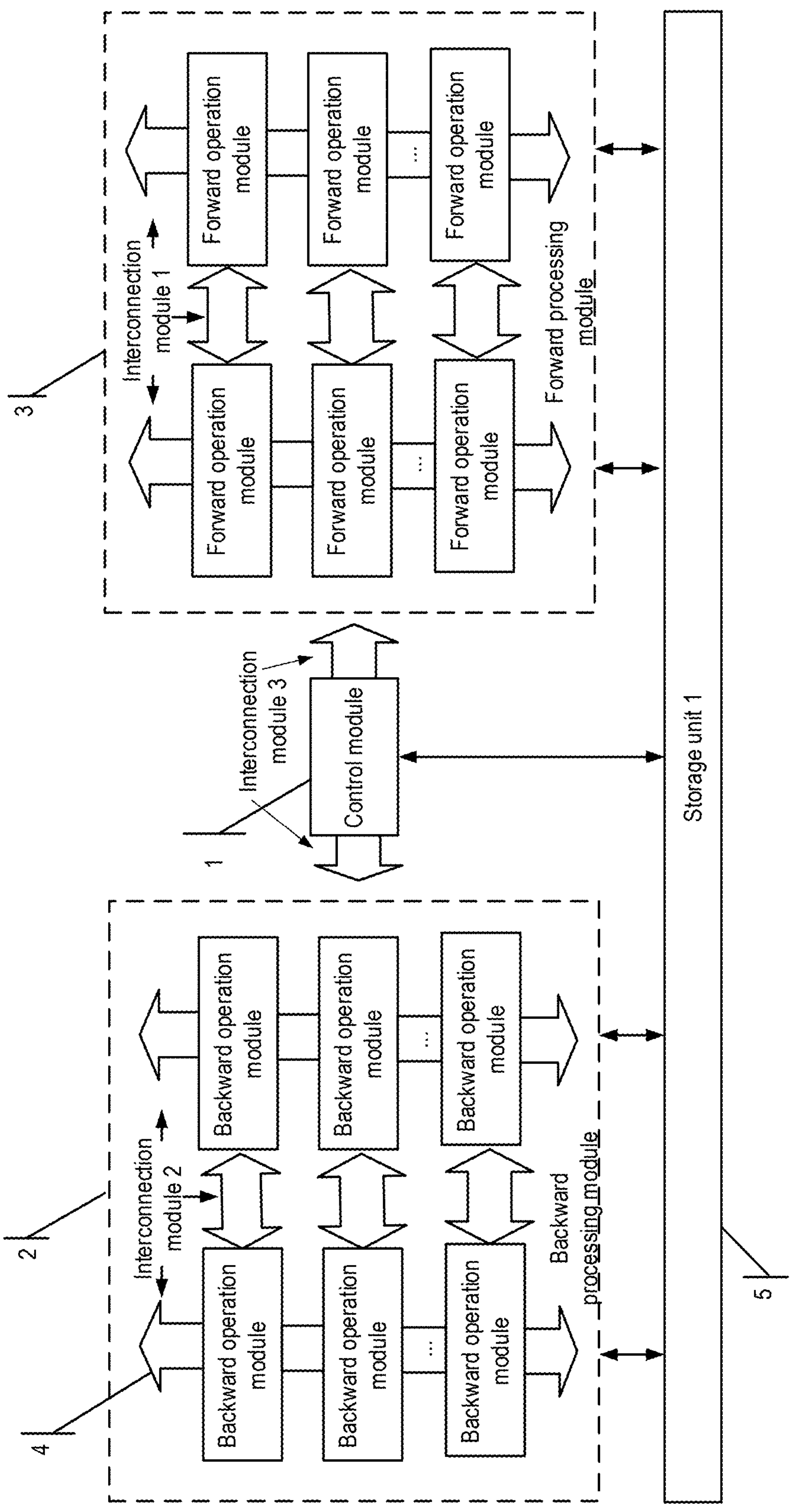

FIG. 89 is a structural diagram of a neural network computing system in which controlling processors share a storage unit according to a computing processor of an example of the present disclosure.

Figure 90:
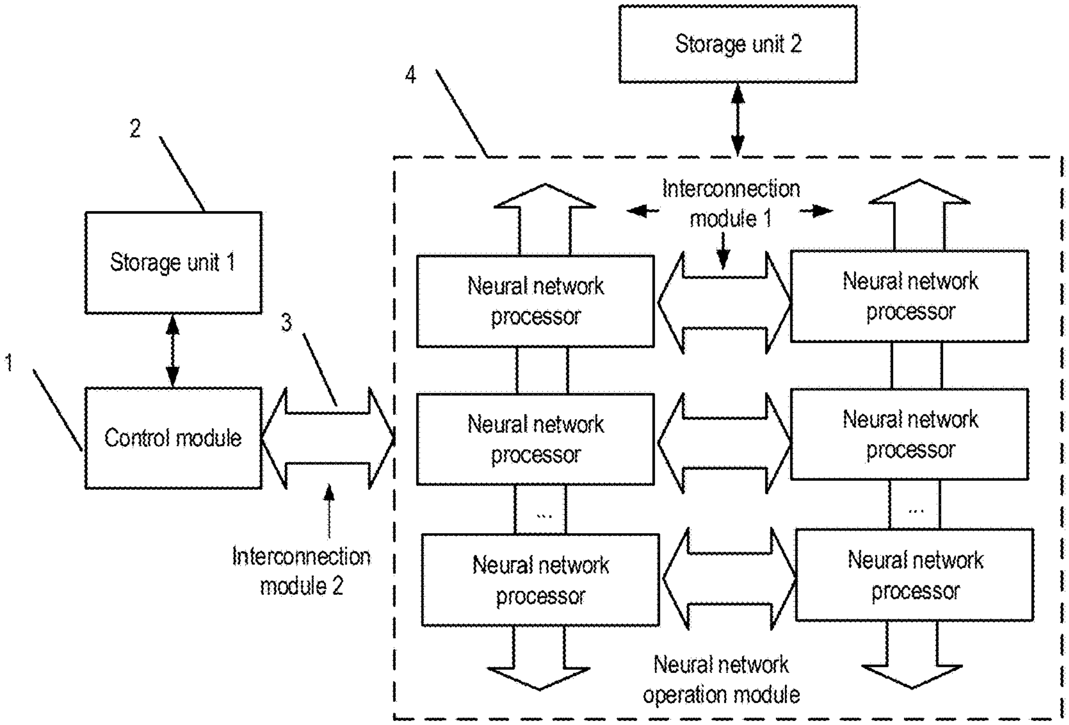

FIG. 90 is a block diagram of a system for complex neural network tasks according to an example of the present disclosure.

Figure 91:
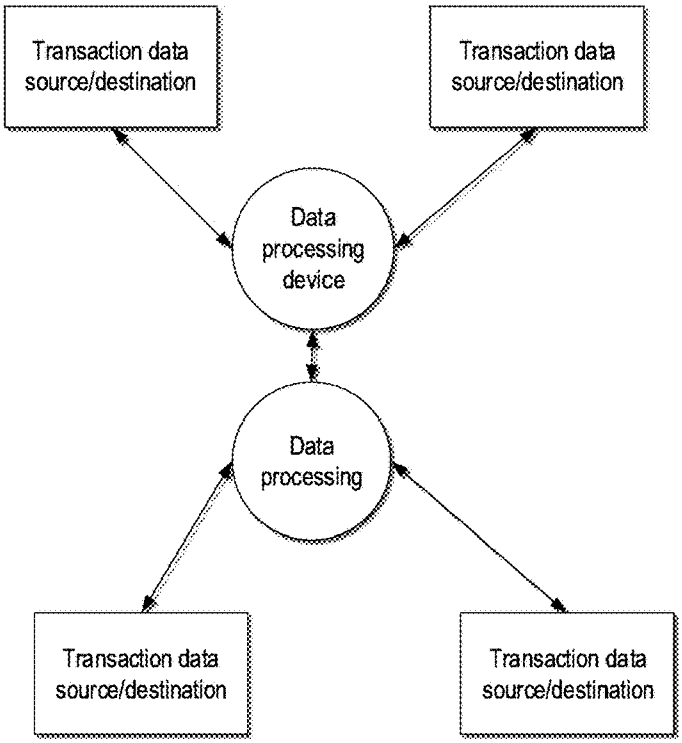

FIG. 91 shows an interconnection circuit which includes a data processing device.

Figure 10:
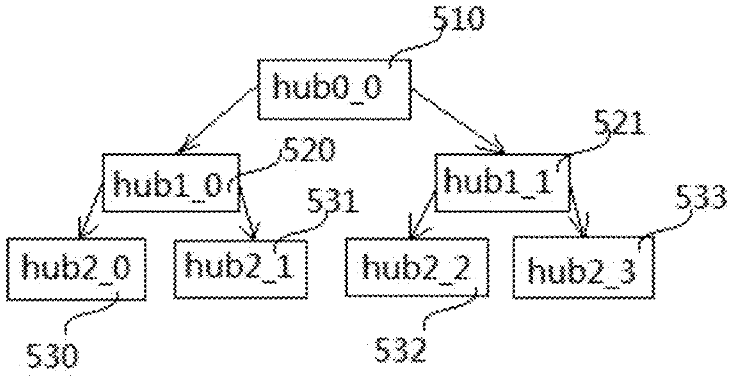
FIG. 10 is a diagram showing data being transferred in a hub according to another example of the present disclosure.
Figure 92:
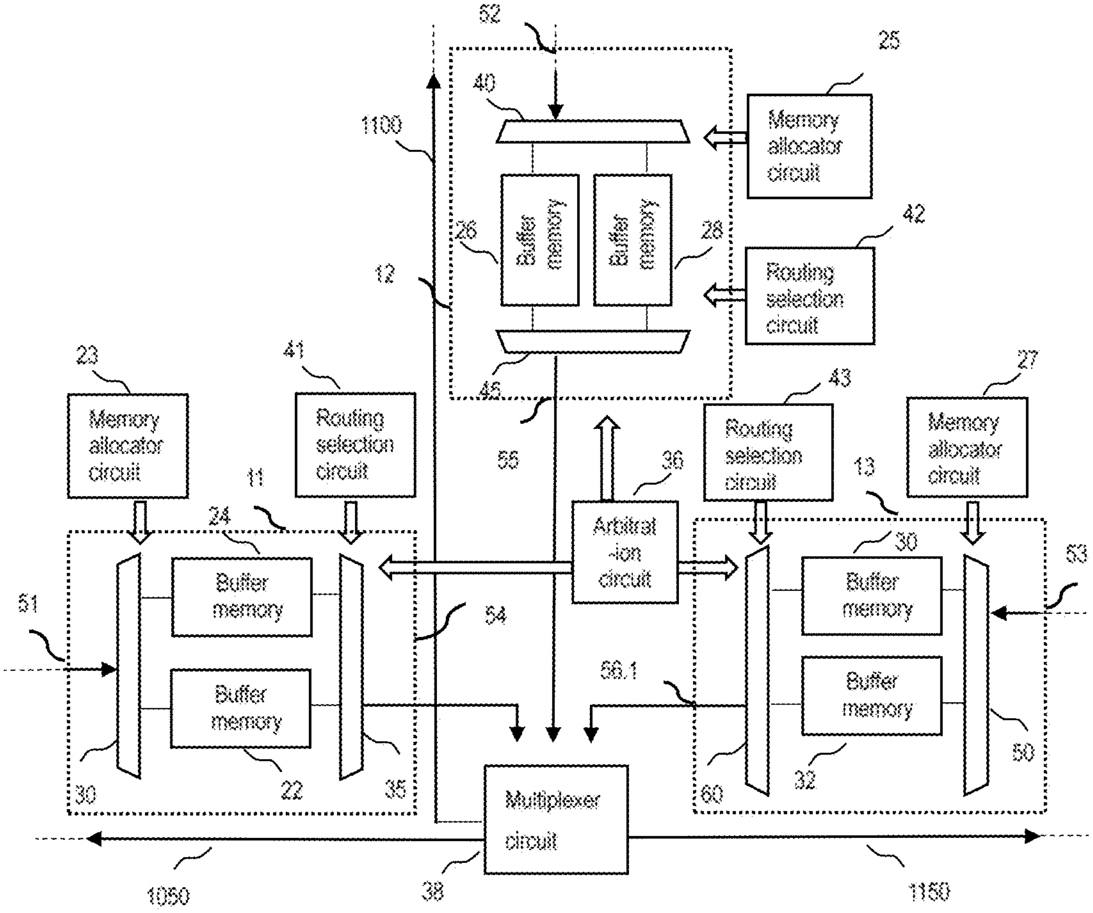

FIG. 92 is a block diagram of a data processing device according to an example of the present disclosure, showing the data processing device of FIG. 10 in more detail.

Figure 93:
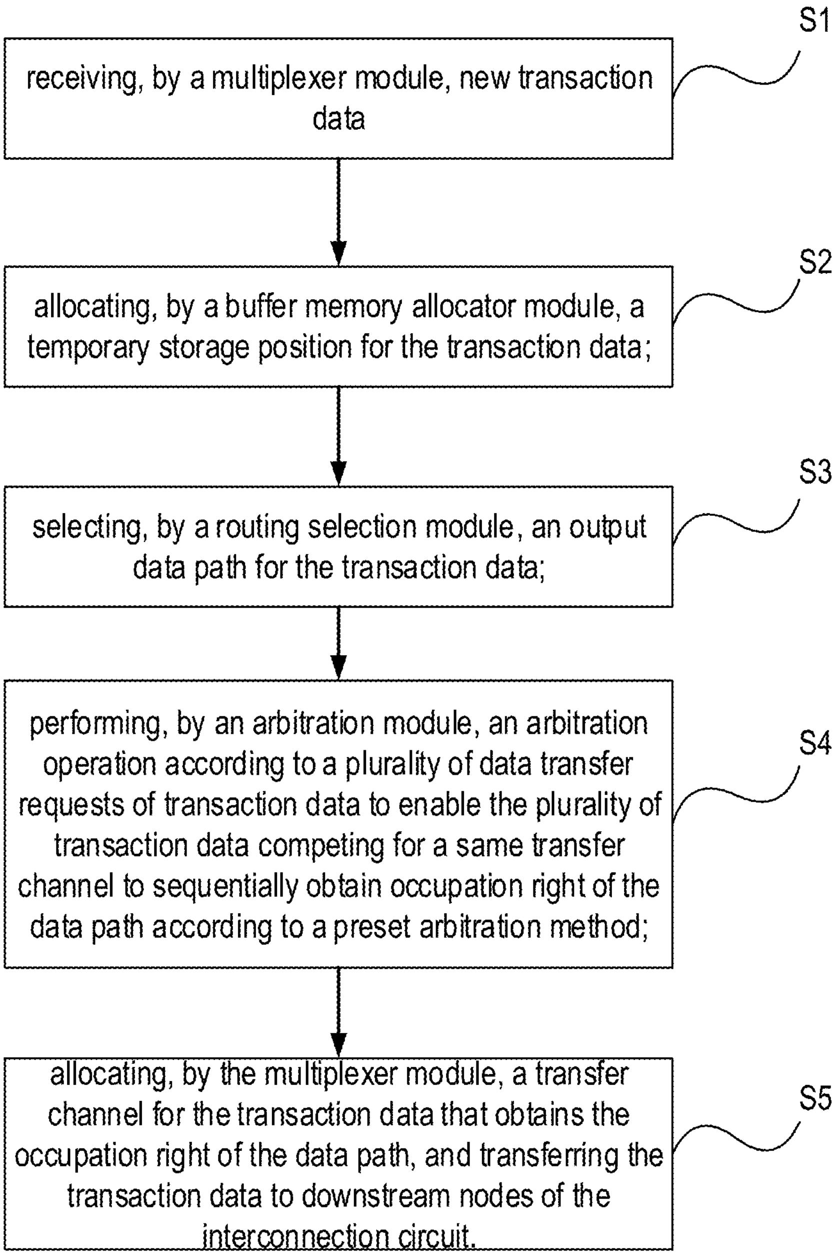

FIG. 93 is a flowchart of data processing of an interconnection circuit of the present disclosure.

Figure 94:
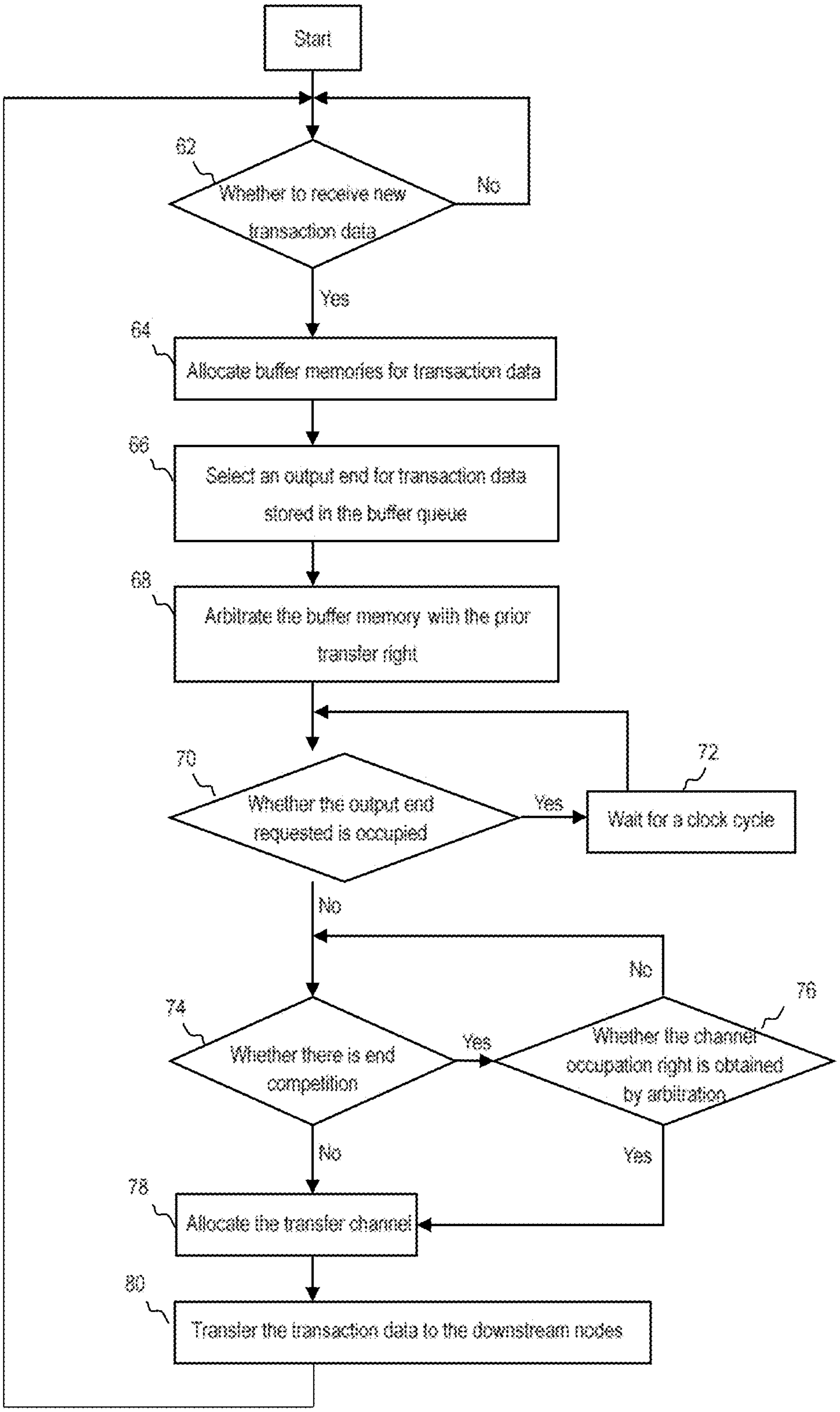

FIG. 94 is a flowchart illustrating a process of transaction data arriving at a data processing device, obtaining the occupation right to a transfer channel, and being output to a downstream node according to an example of the present disclosure.

Figure 95:
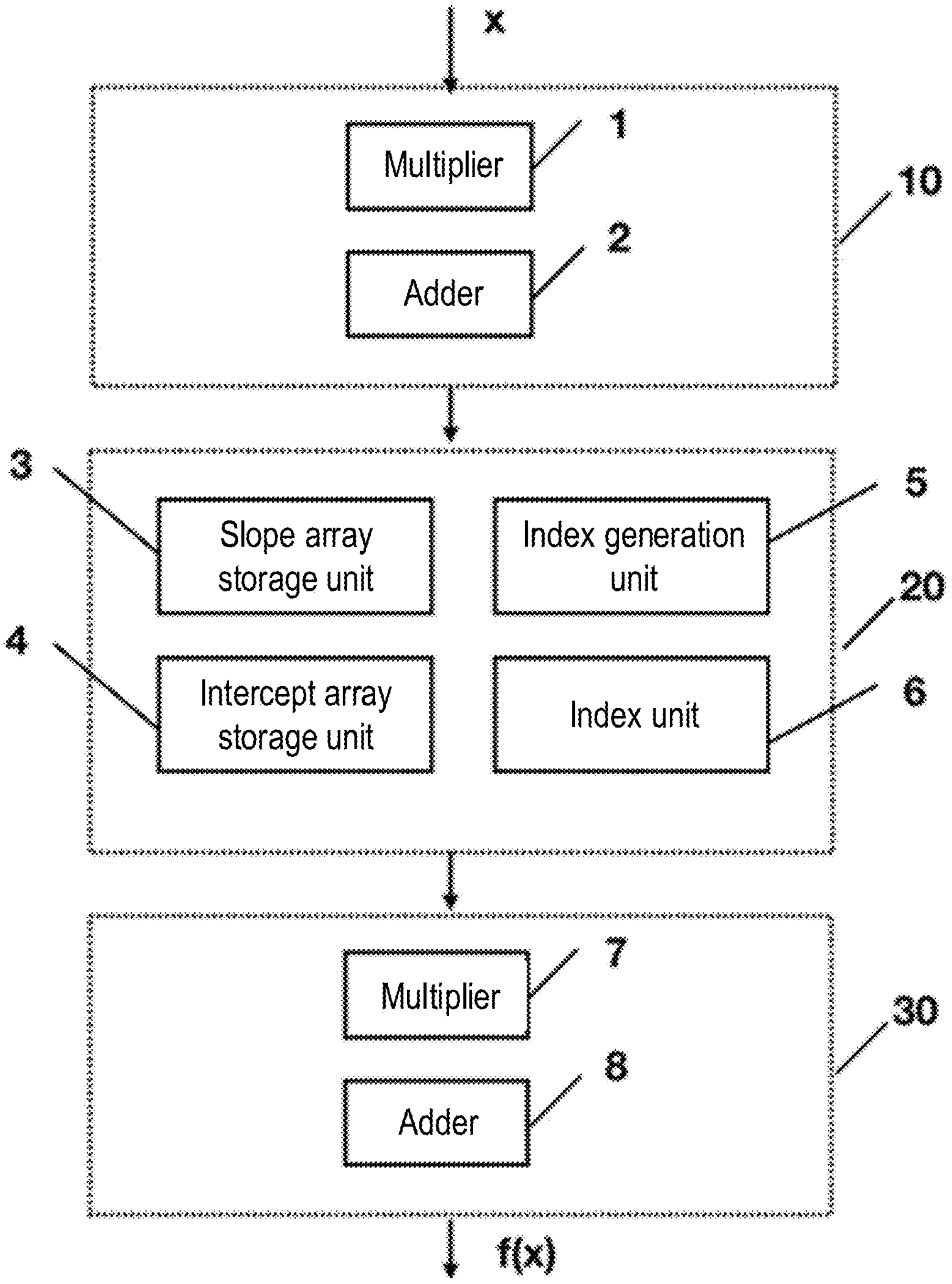

FIG. 95 is a structural diagram of an operation device of an activation function of the present disclosure.

Figure 96:
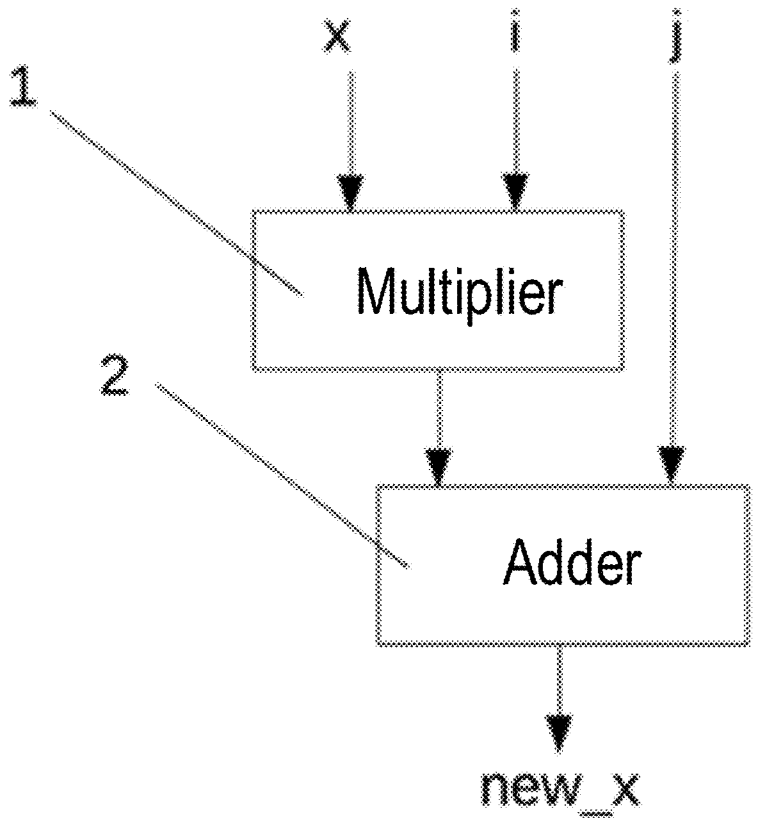

FIG. 96 is a diagram showing an internal structure of a domain conversion component of the present disclosure.

Figure 97:
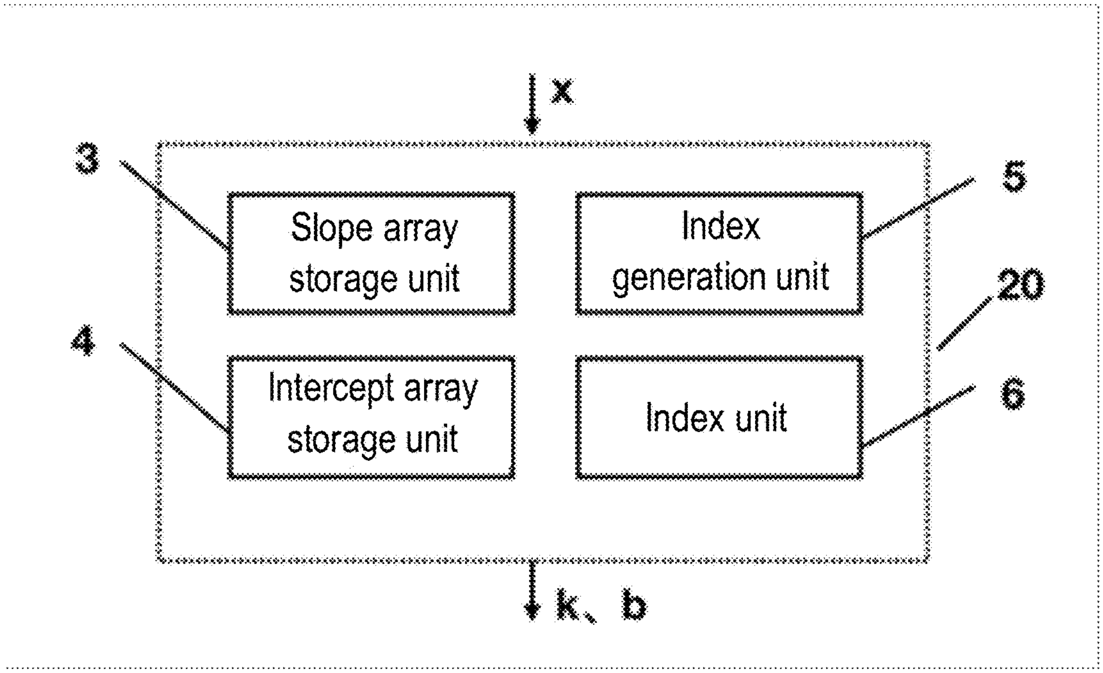

FIG. 97 is a diagram showing an internal structure of a table looking-up component of the present disclosure.

Figure 98:
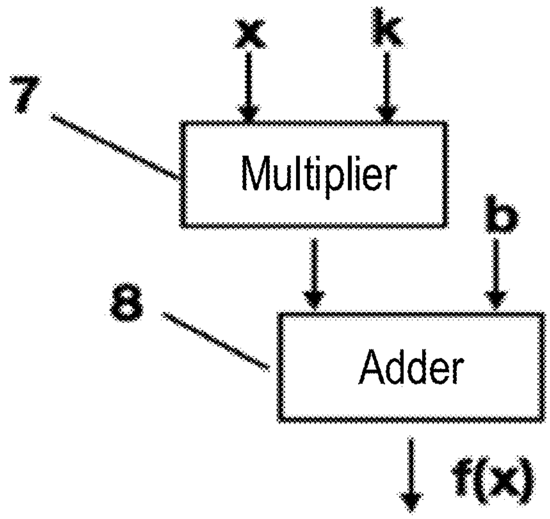

FIG. 98 is a diagram showing an internal structure of a linear fitting component of the present disclosure.

Figure 99:
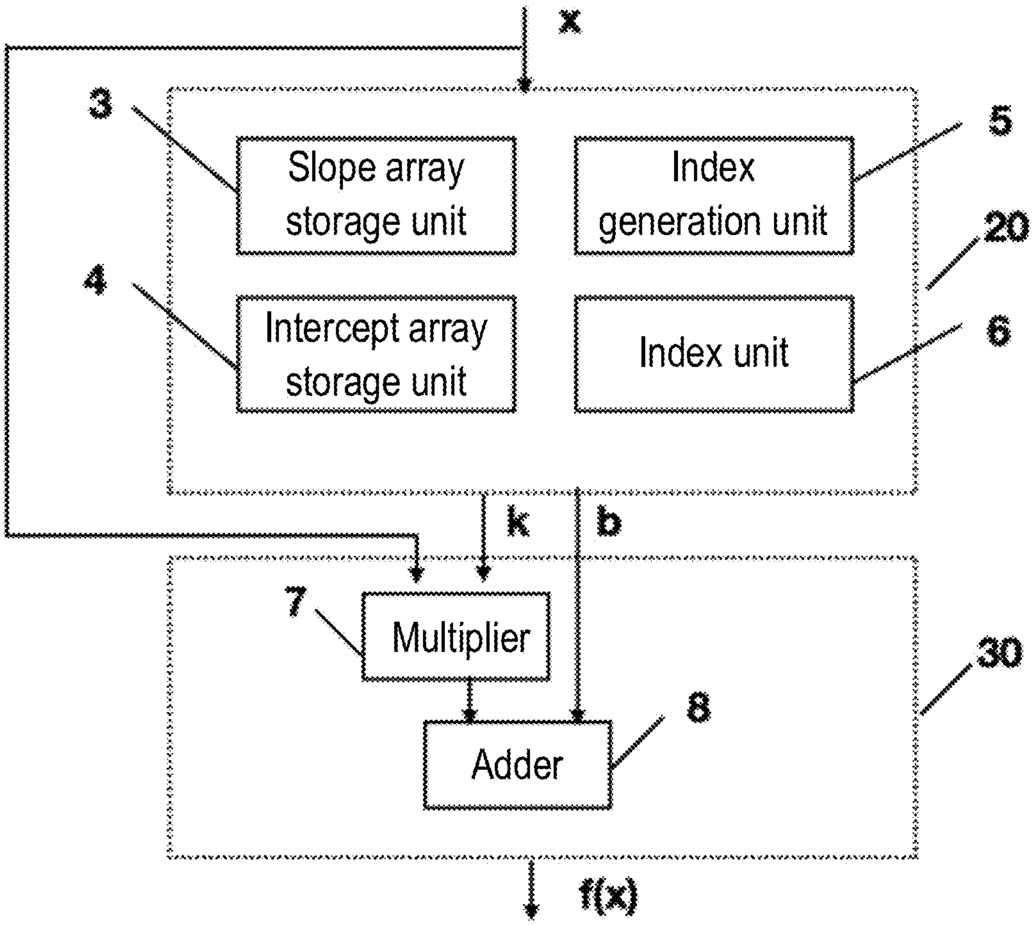

FIG. 99 is a first example of an operation of an activation function of the present disclosure.

Figure 100:
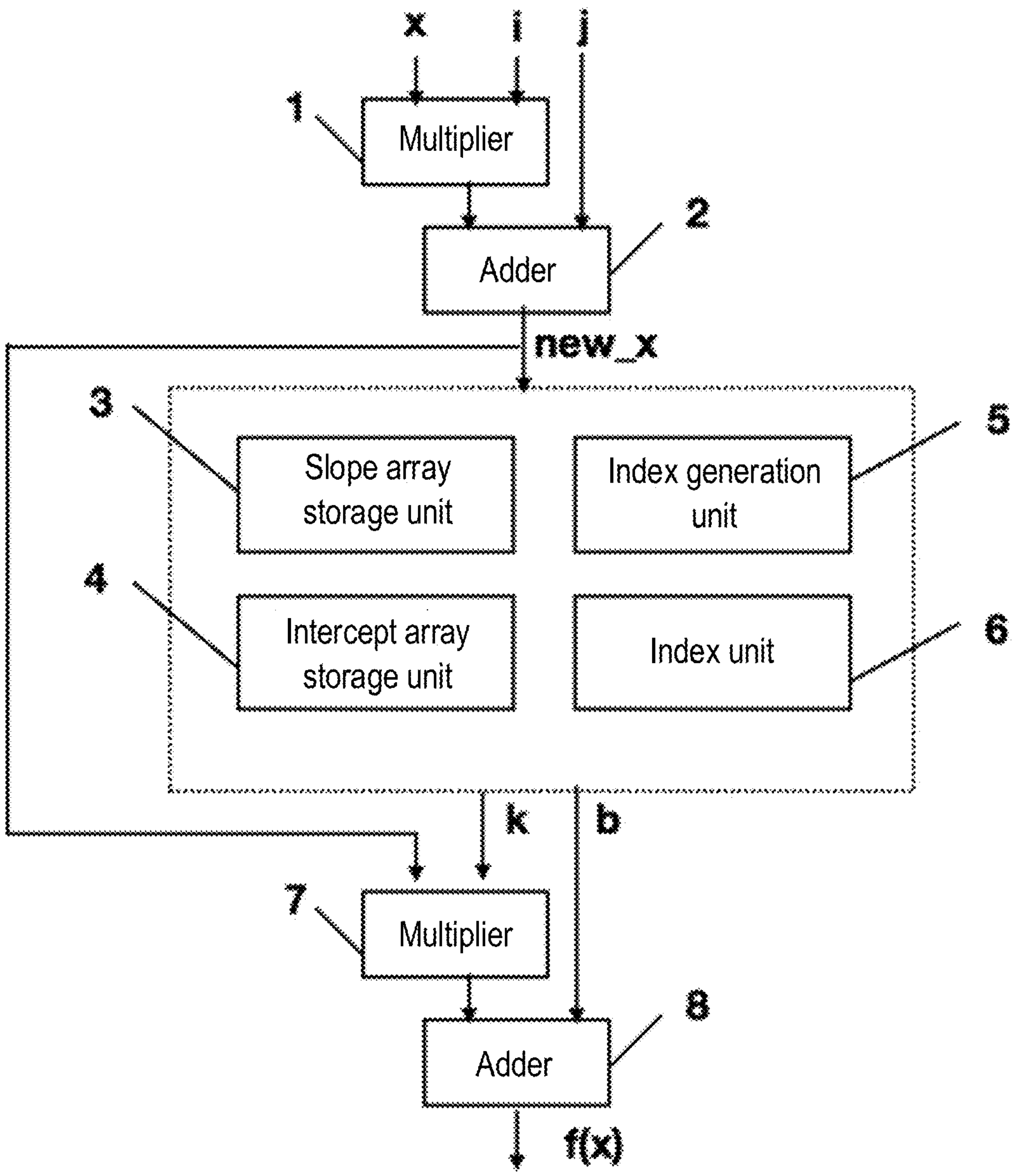

FIG. 100 is a second example of an operation of an activation function of the present disclosure.

Figure 101:
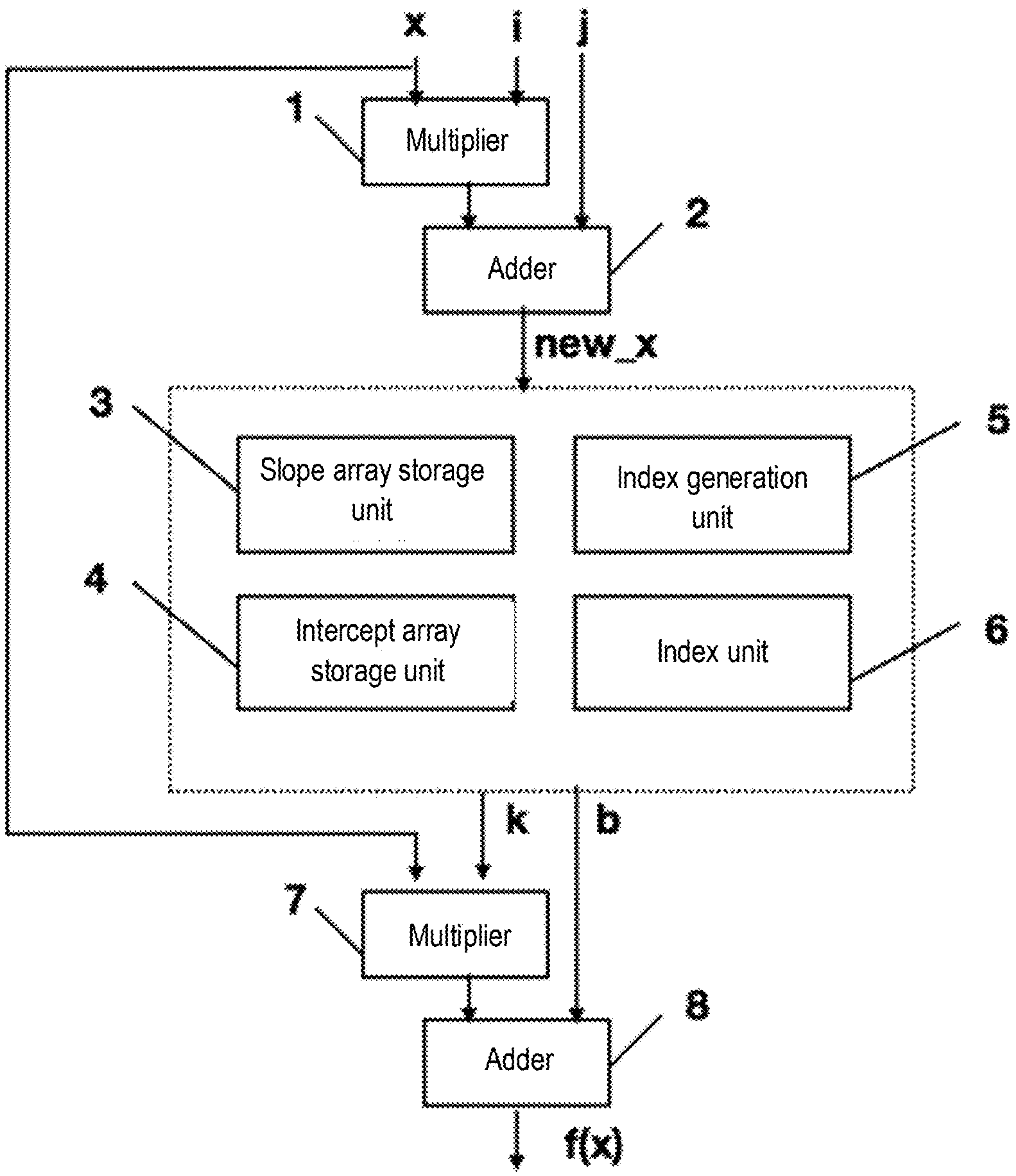

FIG. 101 is a third example of an operation of an activation function of the present disclosure.

Figure 102:
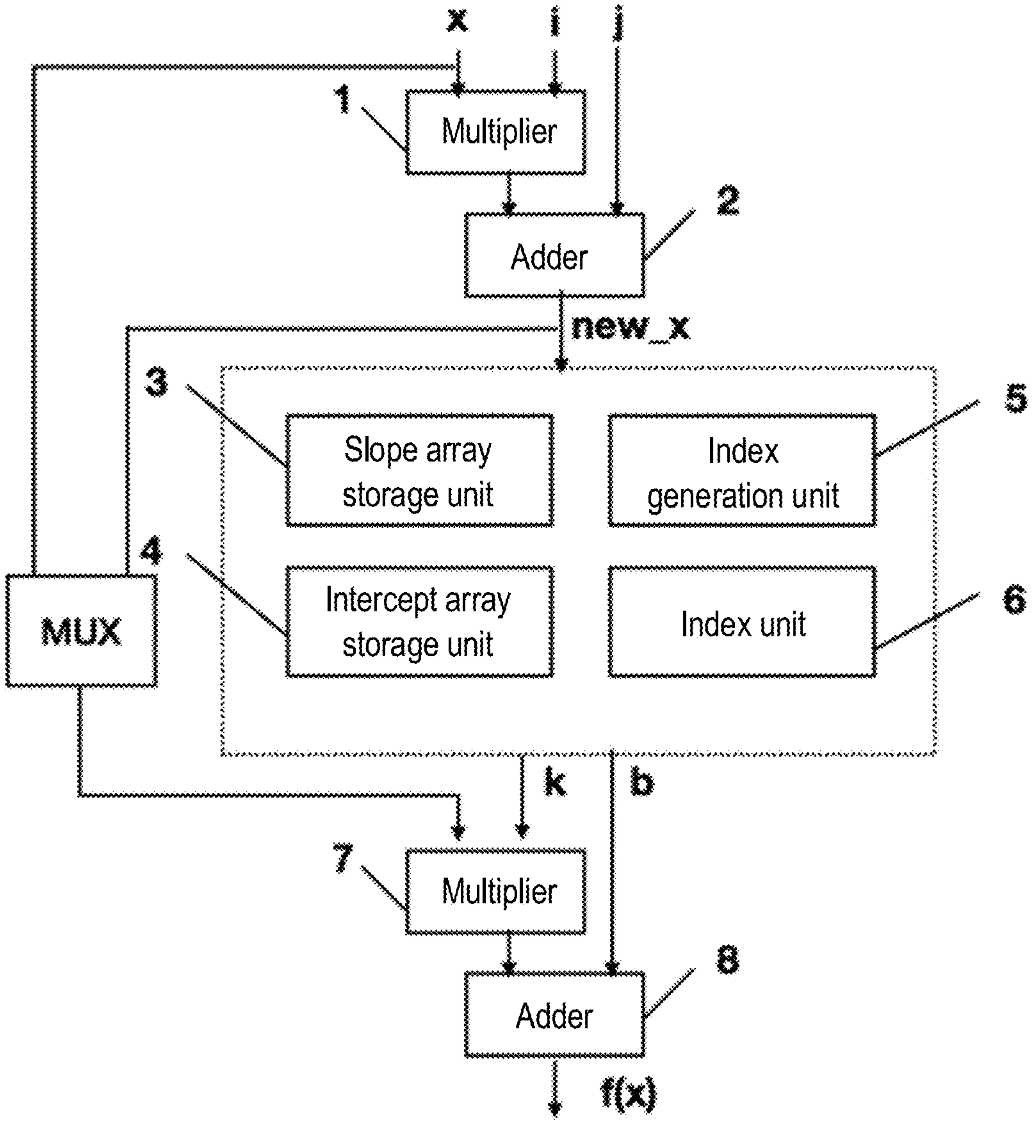

FIG. 102 is a fourth example of an operation of an activation function of the present disclosure.

Figure 103:
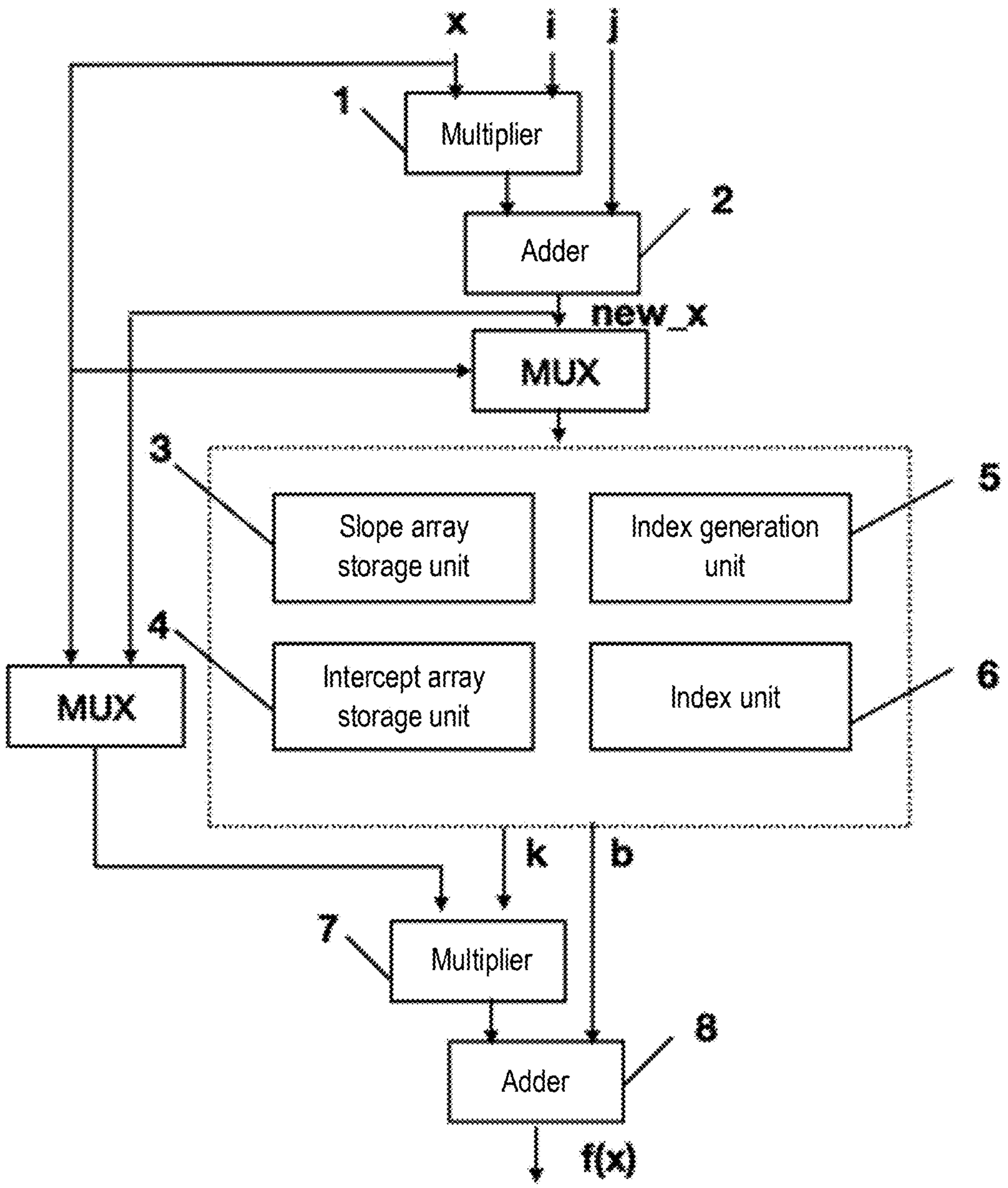

FIG. 103 is a fifth example of an operation of an activation function of the present disclosure.

Figure 103A:
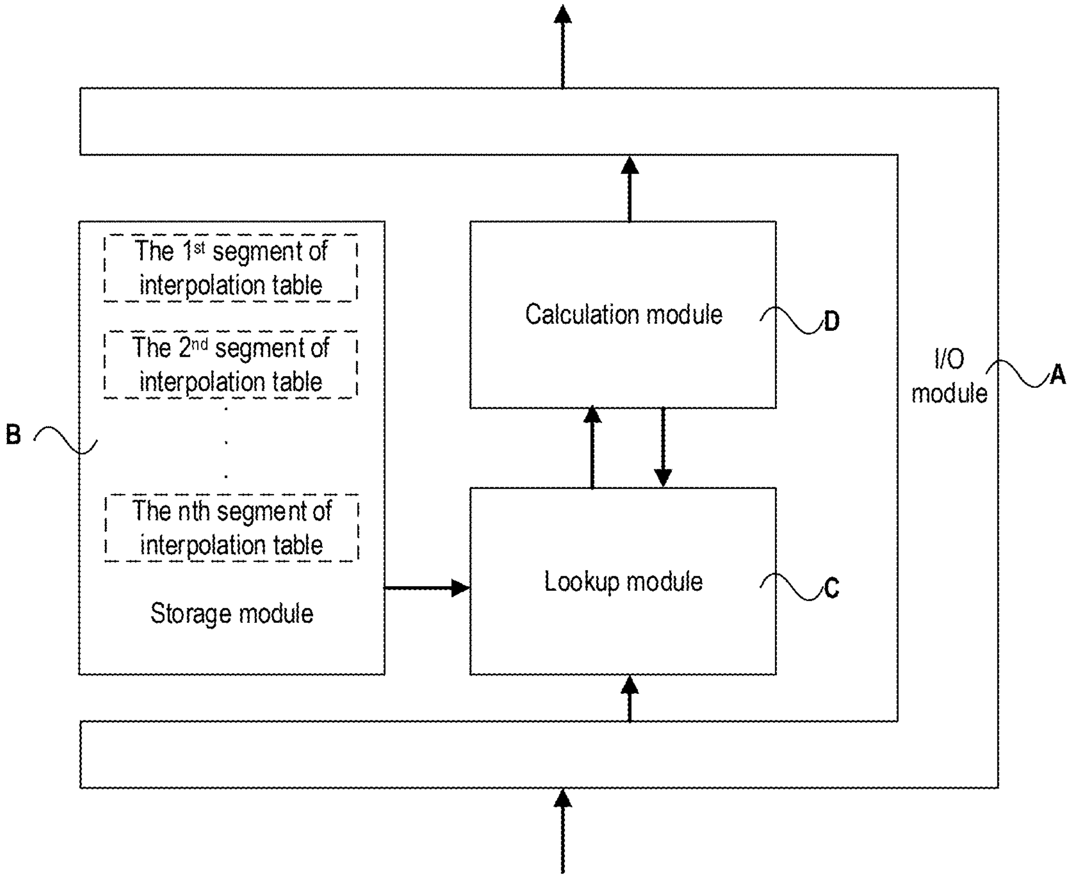

FIG. 103A is a block diagram showing an overall structure of a device for piecewise interpolation according to an example of the present disclosure.

Figure 103B:
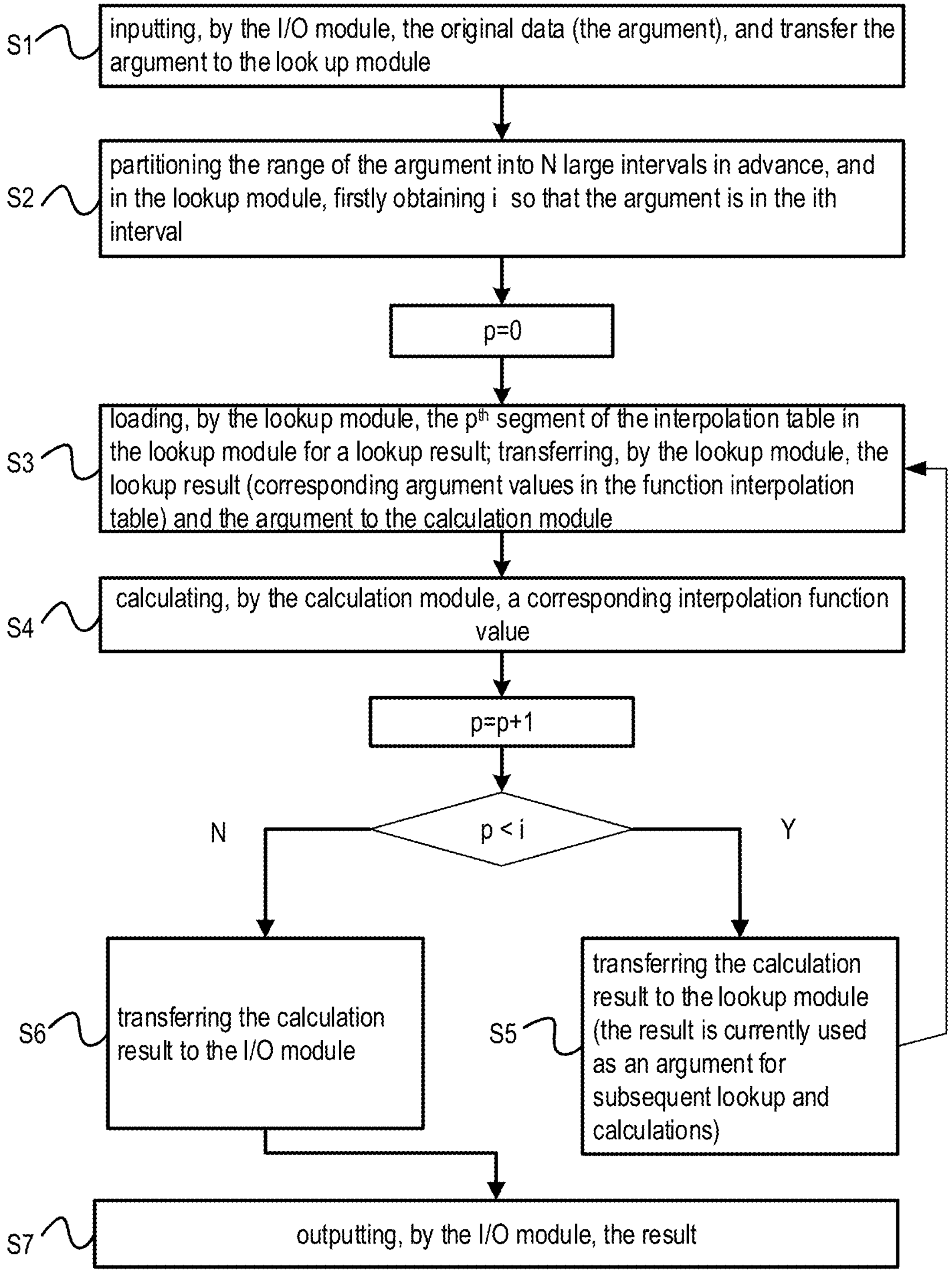

FIG. 103B is a flowchart of a method of piecewise interpolation according to an example of the present disclosure.

Figure 103C:
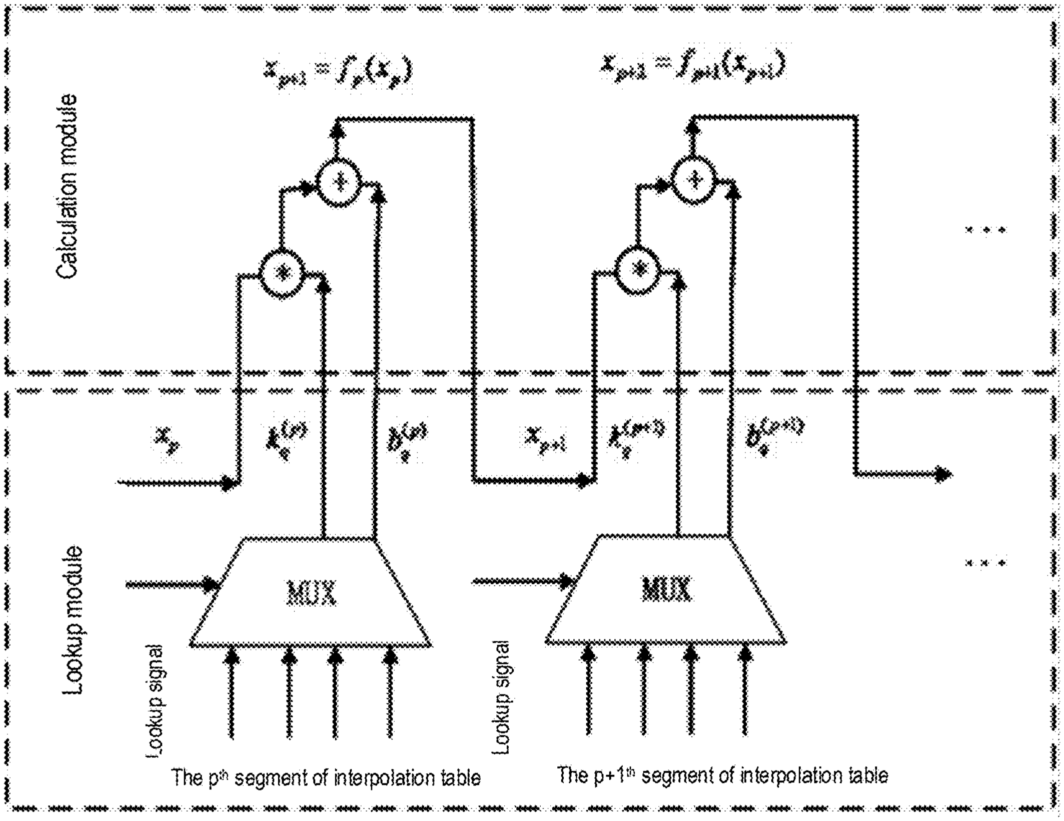

FIG. 103C is a schematic diagram of a hardware basic circuit for piecewise interpolation and data transfer thereof according to an example of the present disclosure.

Figure 103D:
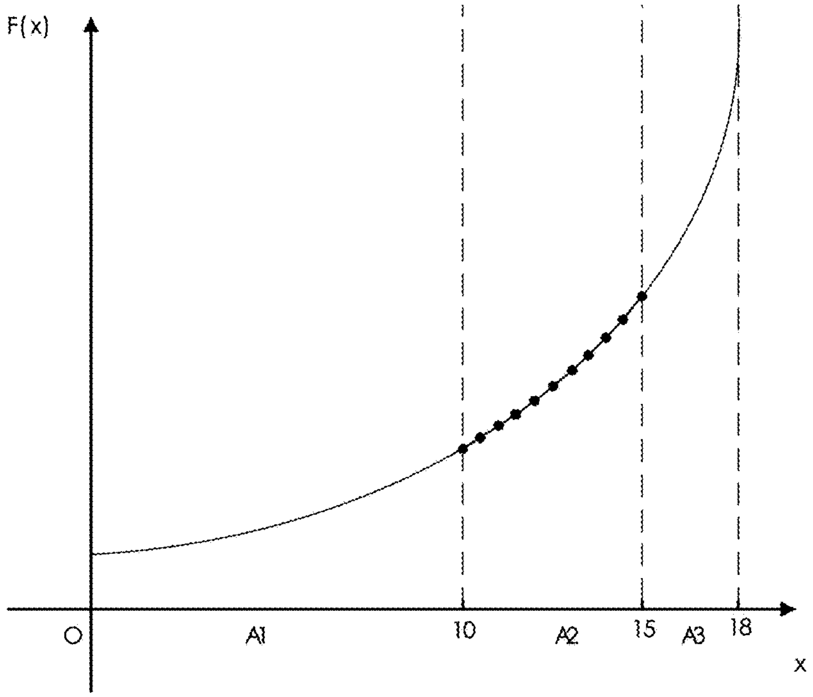

FIG. 103D shows an effect of piecewise interpolation performed by an exponent function exp(x) in a fixed interval according to an example of the present disclosure.

Figure 104A:
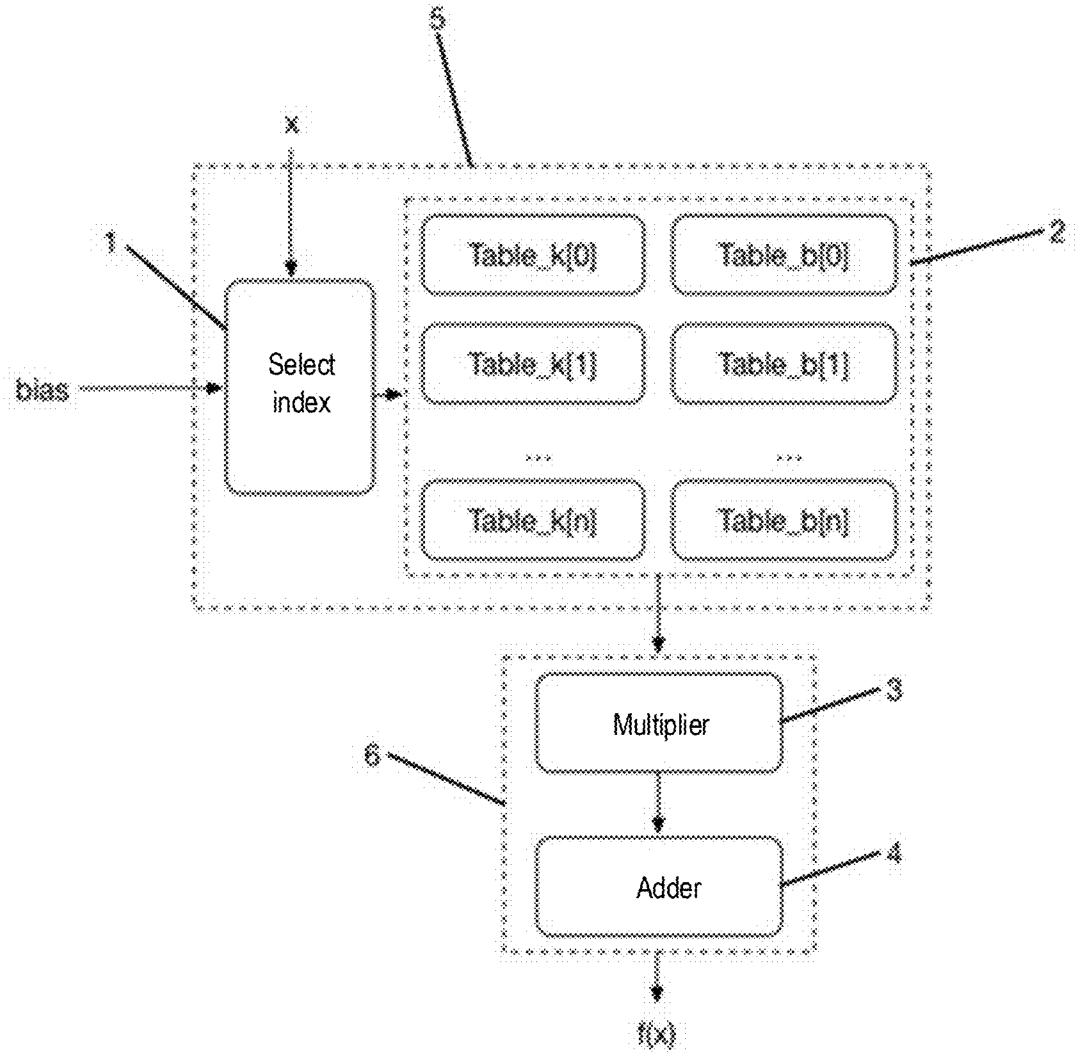

FIG. 104A is a structural diagram of a non-linear function operation device according to an example of the present disclosure.

Figure 104B:
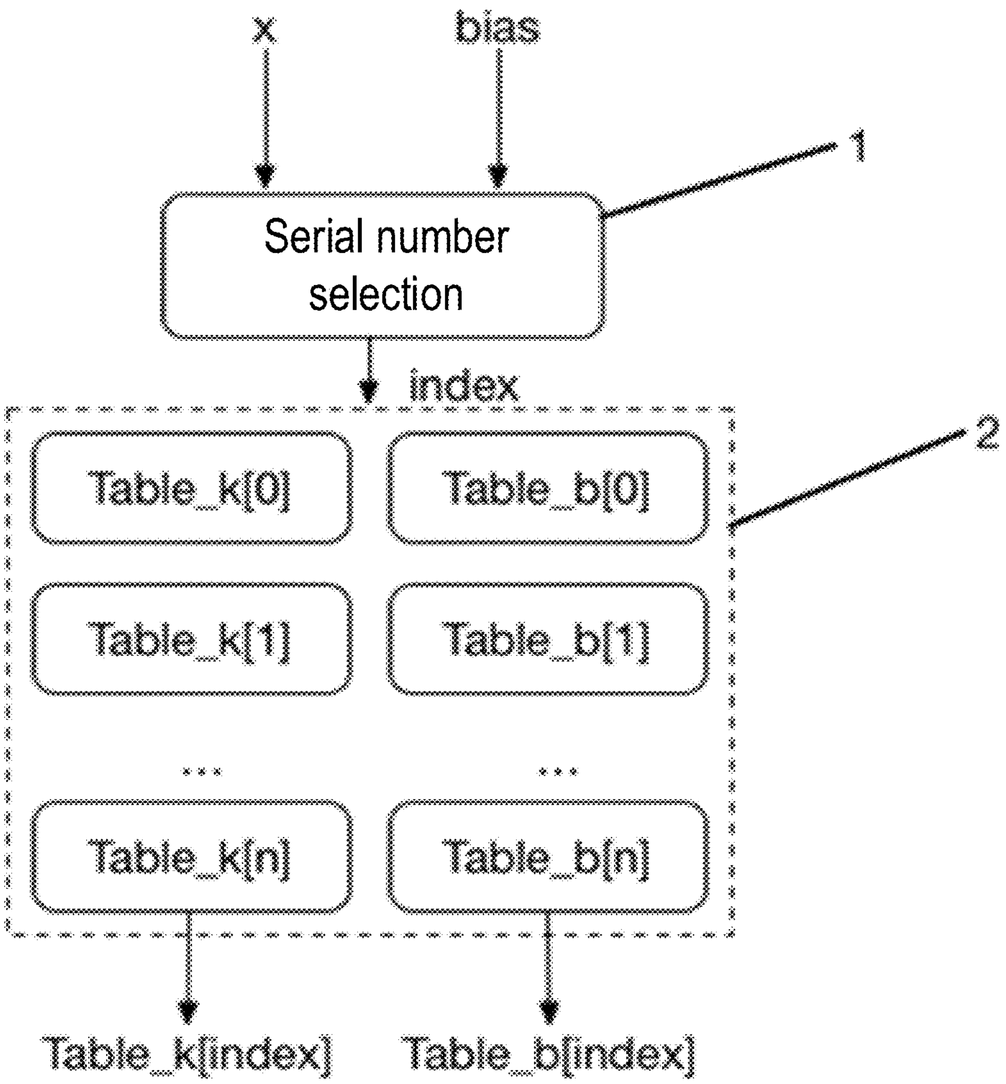

FIG. 104B is a diagram showing an internal structure of a non-linear function operation device according to an example of the present disclosure.

Figure 104C:
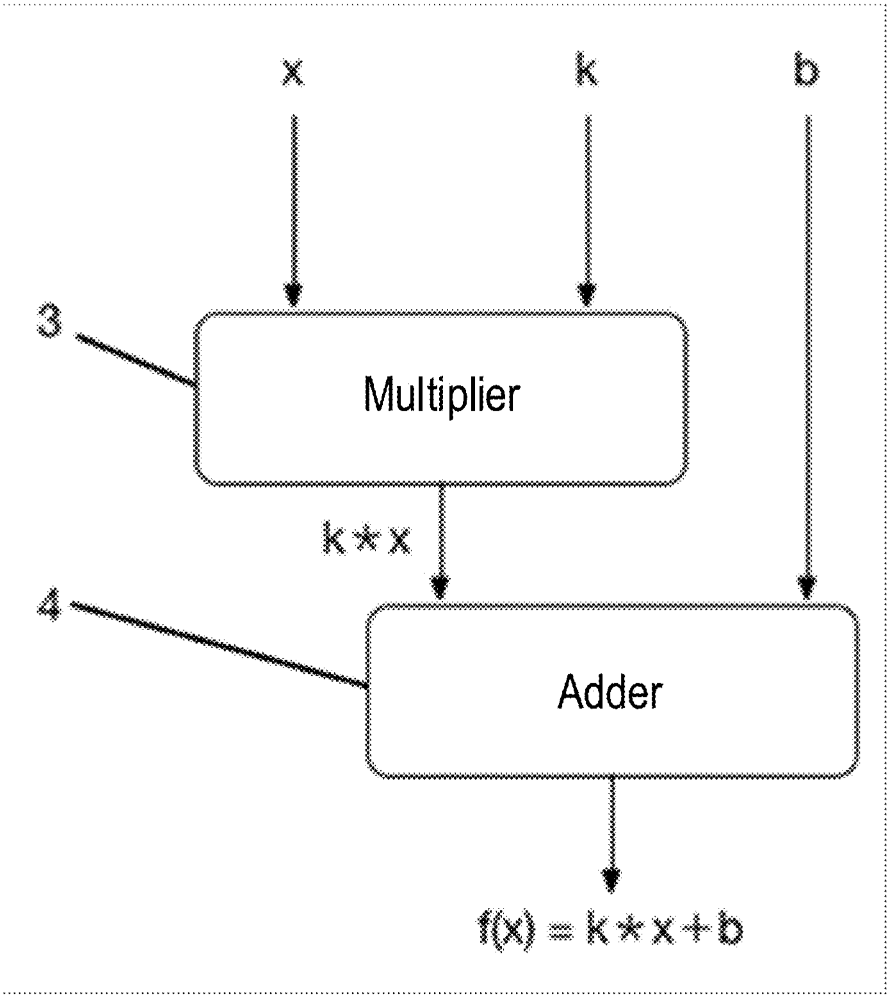

FIG. 104C is a diagram showing an internal structure of a linear fitting component according to an example of the present disclosure.

Figure 104D:
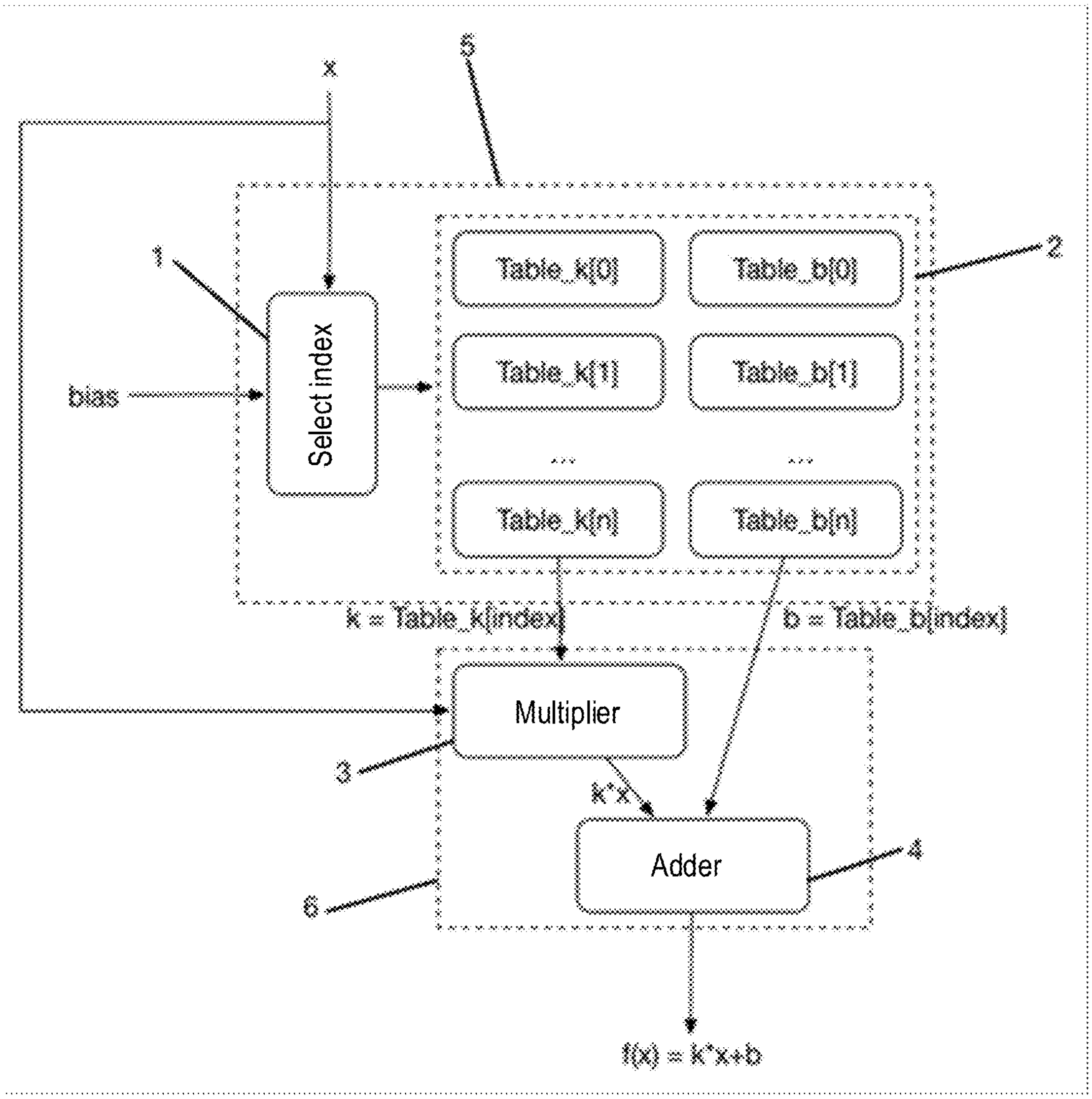

FIG. 104D is a schematic diagram of a non-linear function operation according to an example of the present disclosure.

Figure 104E:
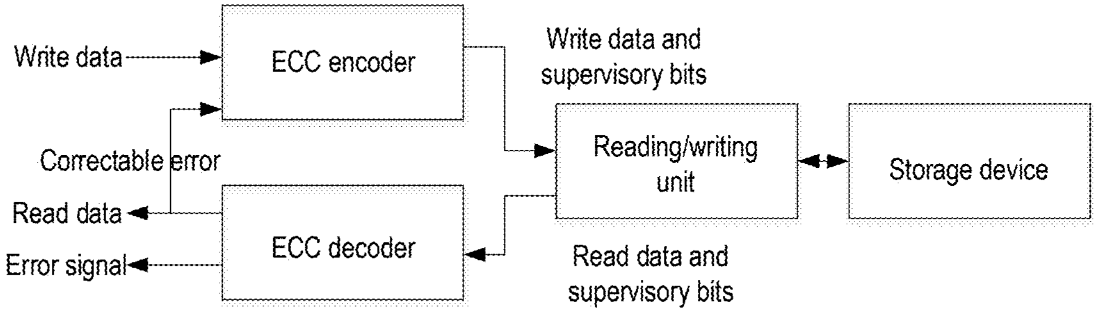

FIG. 104E is a schematic diagram of the present disclosure.

Figure 105:
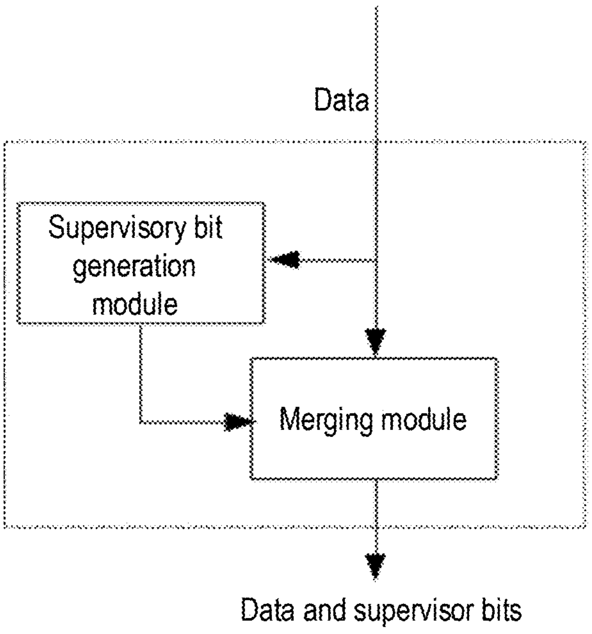

FIG. 105 is a schematic diagram of an encoder module of the present disclosure.

Figure 105A:
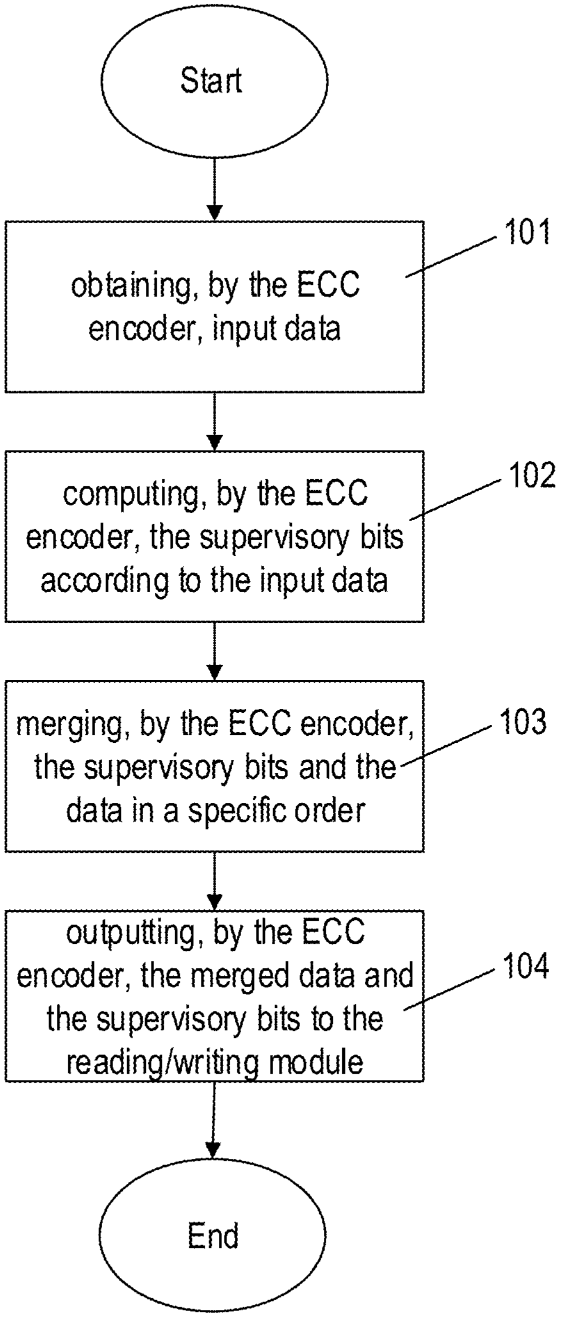

FIG. 105A is a flowchart of an encoding process of the present disclosure.

Figure 106:
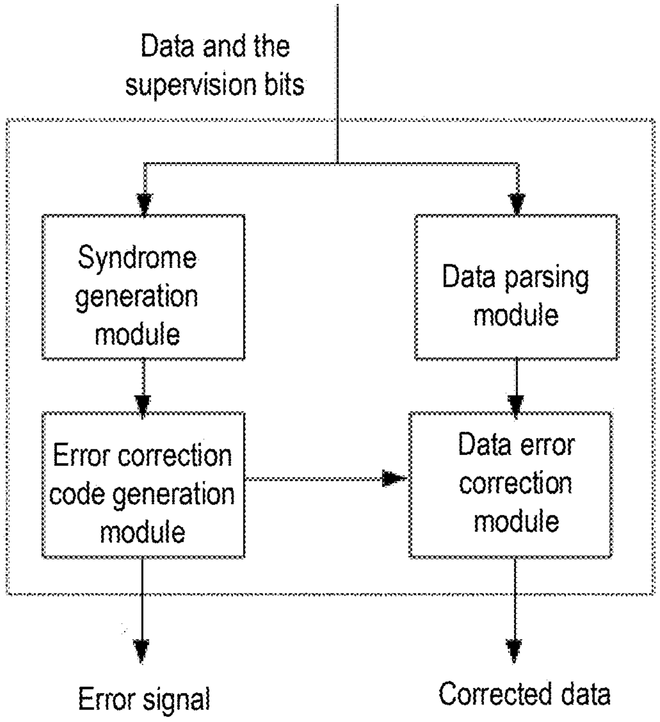

FIG. 106 is a schematic diagram of a decoder module of the present disclosure.

Figure 107:
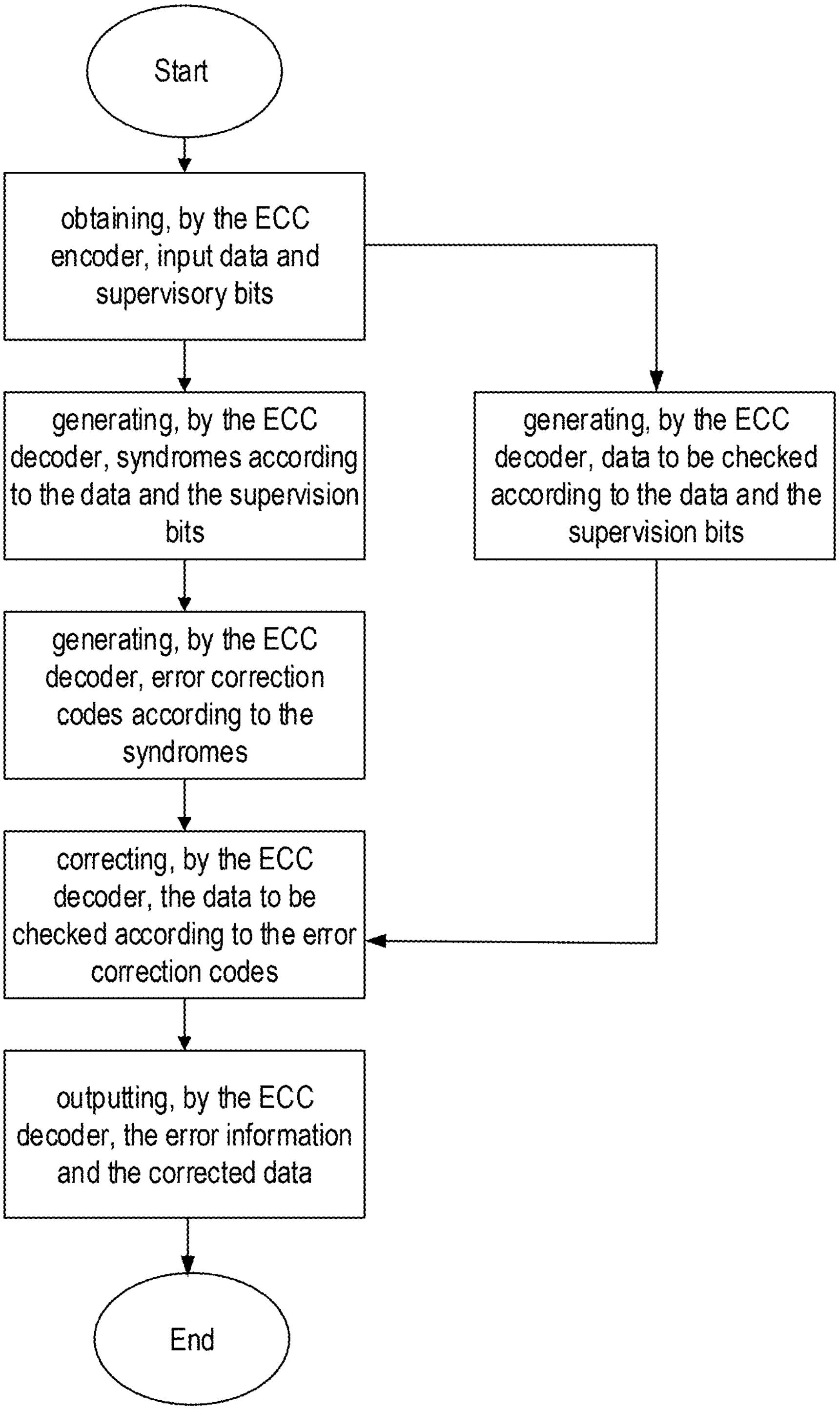

FIG. 107 is a flowchart of a decoding process according to the present disclosure.

Figure 108:
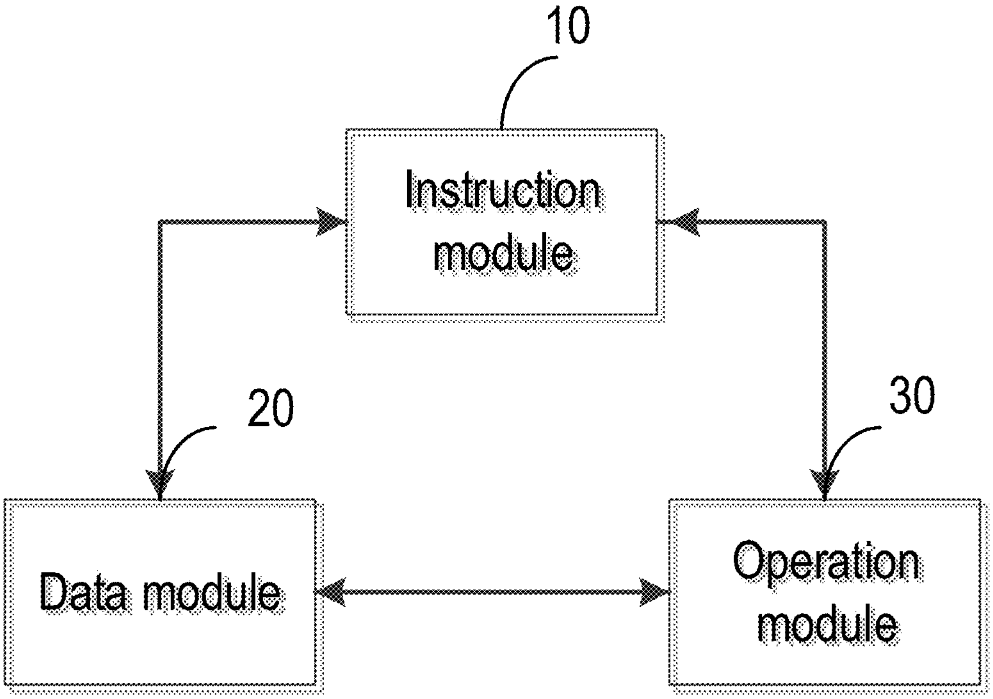

FIG. 108 is a structural diagram of an operation device according to the present disclosure.

Figure 109:
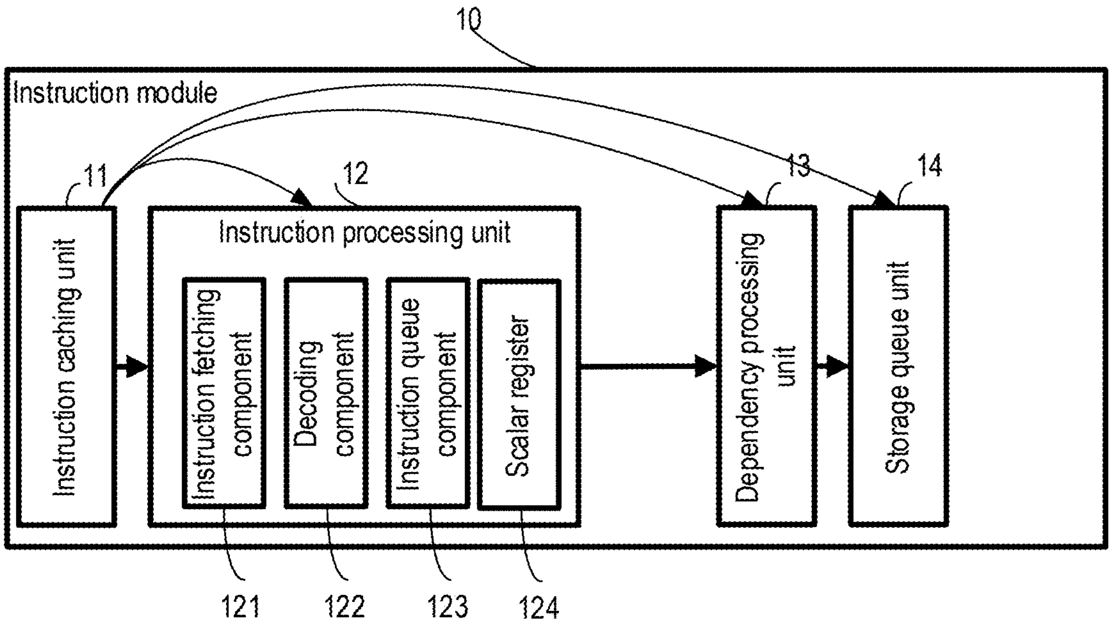

FIG. 109 is a structural diagram of an instruction module according to the present disclosure.

Figure 110:
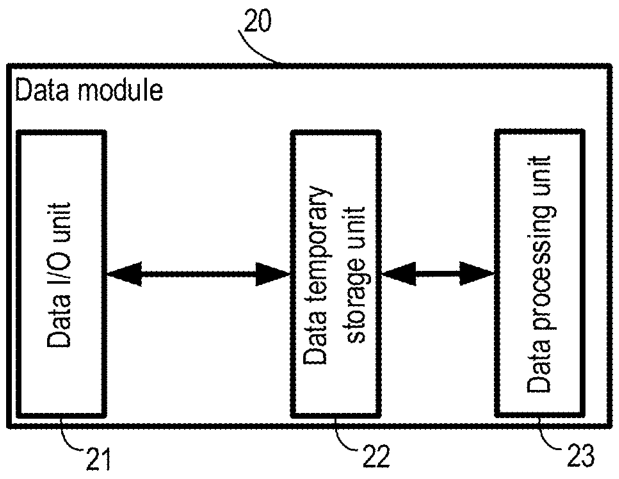

FIG. 110 is a structural diagram of a data module according to the present disclosure.

Figure 111:
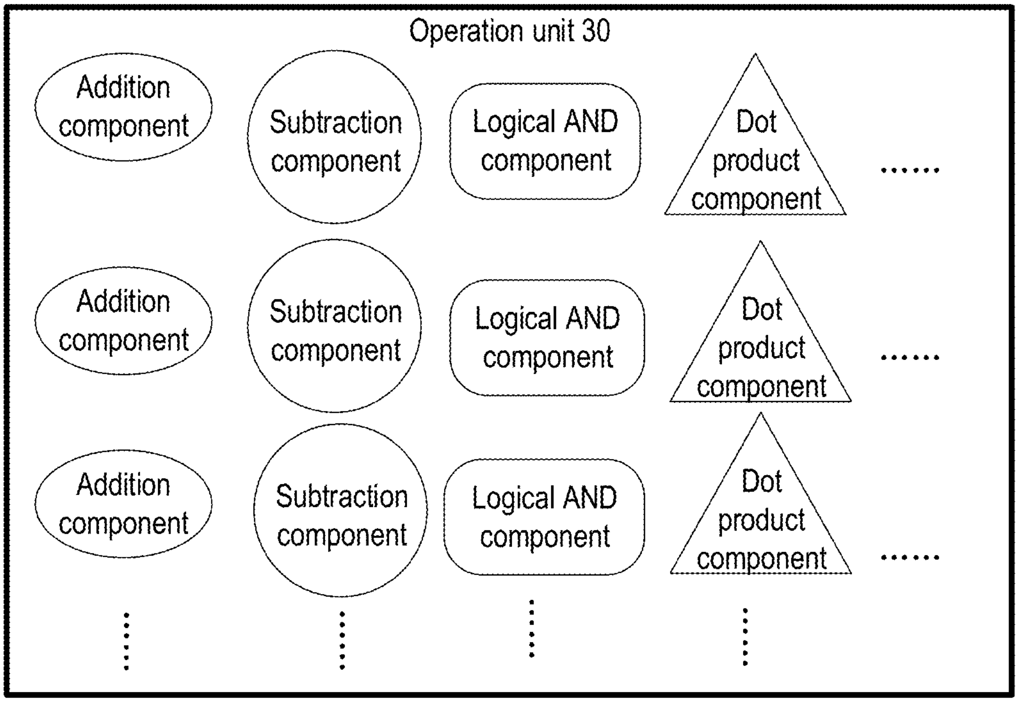

FIG. 111 is a structural diagram of an operation module according to the present disclosure.

Figure 112:
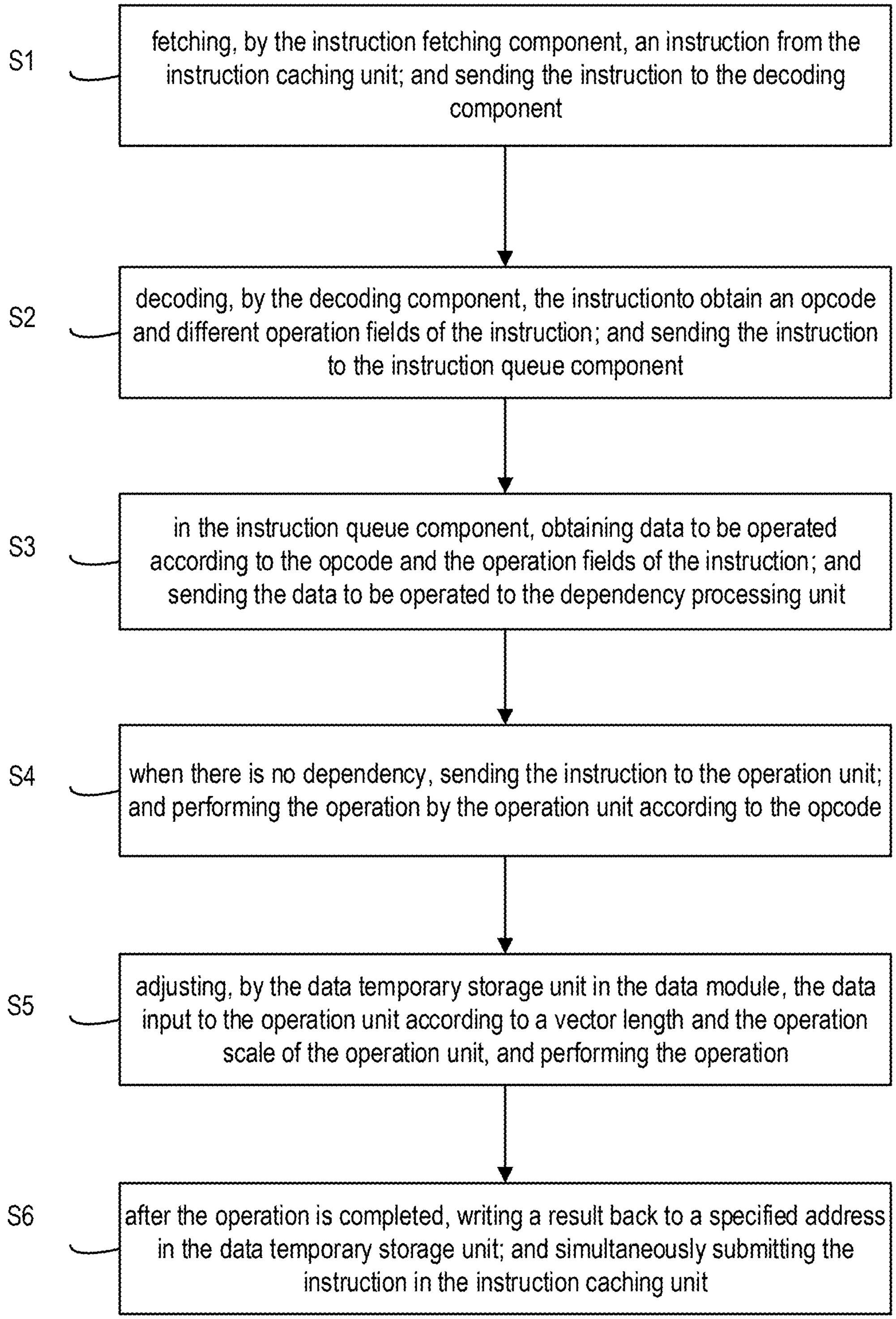

FIG. 112 is a flowchart of a method which supports instructions of operation data of different lengths according to the present disclosure.

Figure 113:
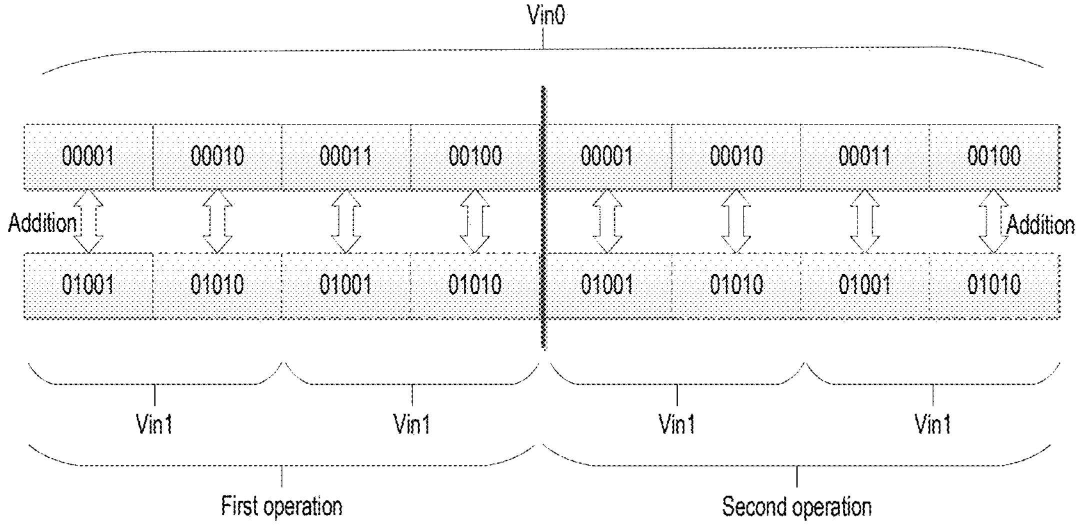

FIG. 113 is a diagram showing an operation relationship in a case where shorter vectors are cyclically read for operations when operation vectors of different lengths are operated according to an example of the present disclosure.

Figure 113A:
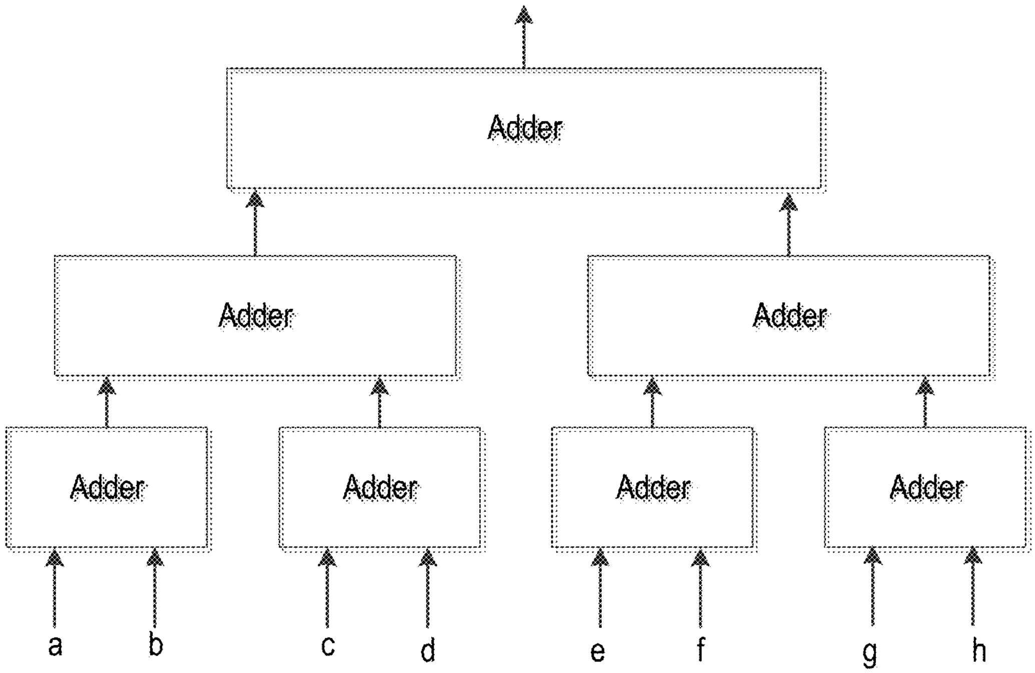

FIG. 113A is a structural diagram of a serial addition tree operation in the prior art.

Figure 114:
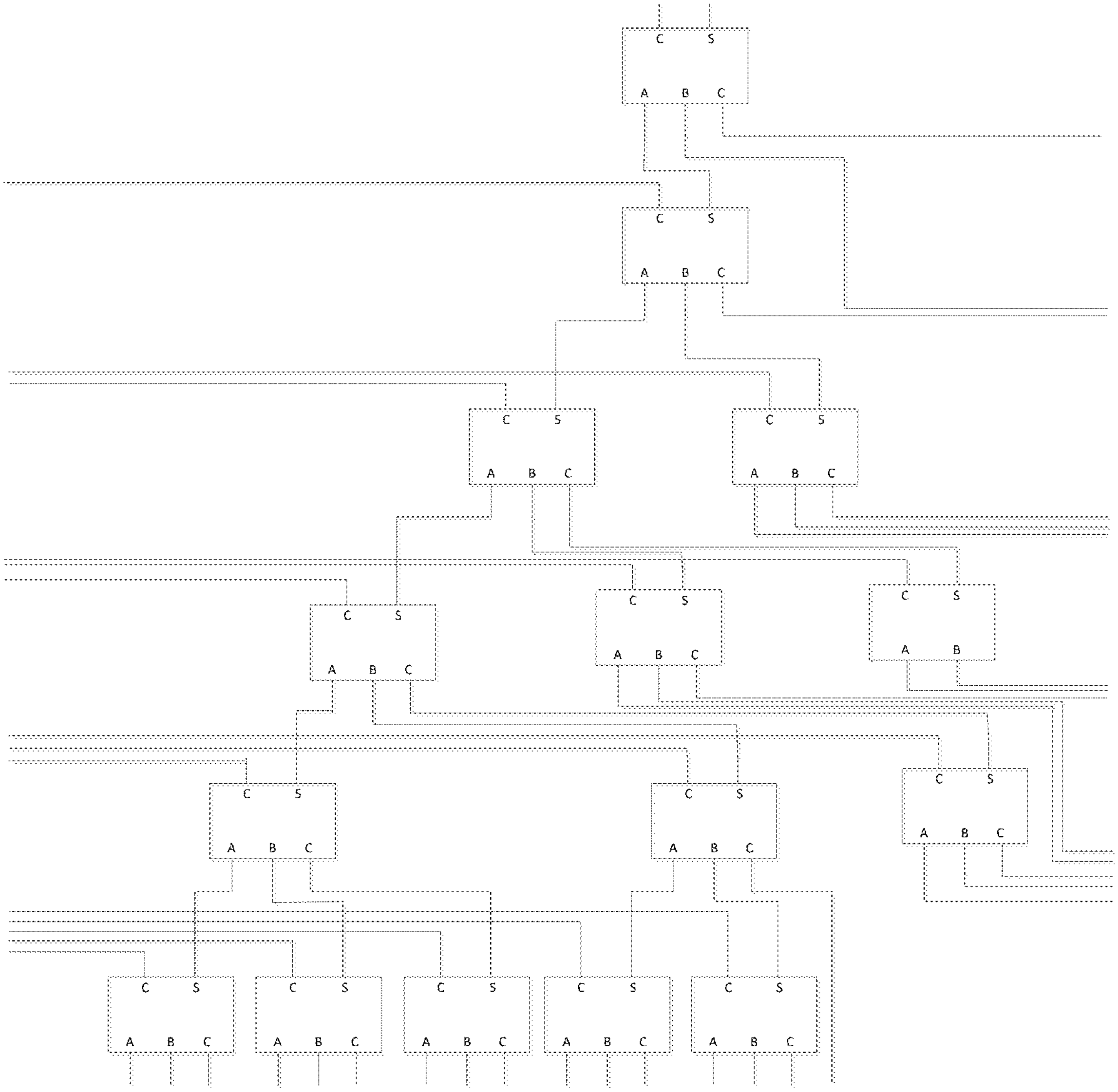

FIG. 114 is a structural diagram of a Wallace tree in the prior art.

Figure 115:
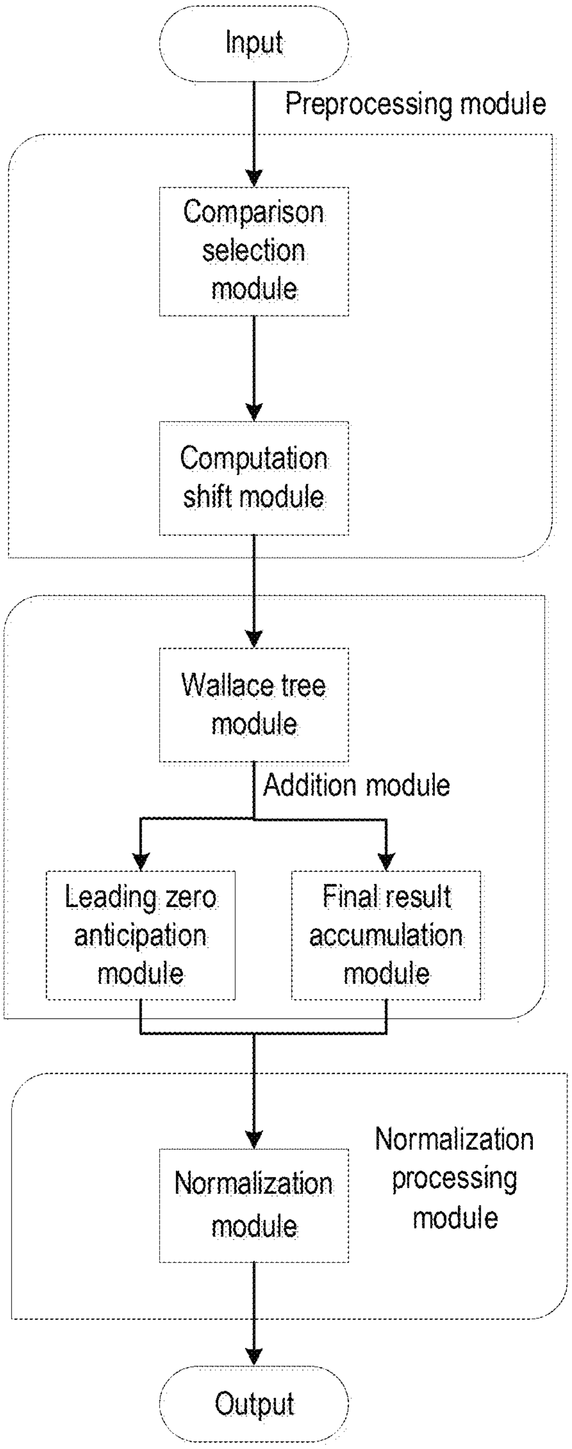

FIG. 115 is a schematic diagram of a device for performing addition of multiple floating-point numbers according to the present disclosure.

Figure 116:
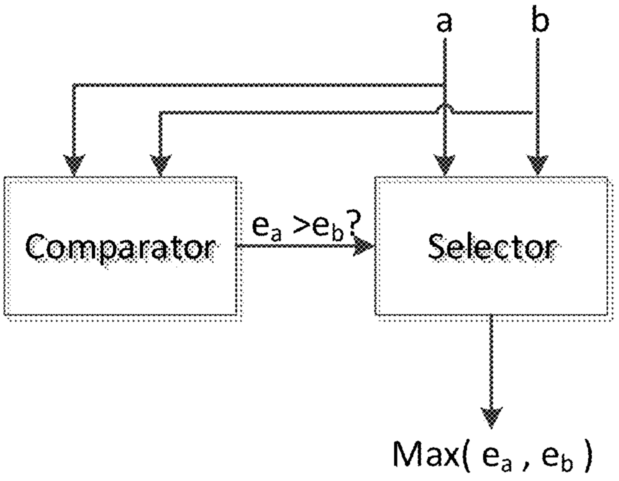

FIG. 116 is a schematic diagram showing pairwise comparison of exponent bits according to the present disclosure.

Figure 117:
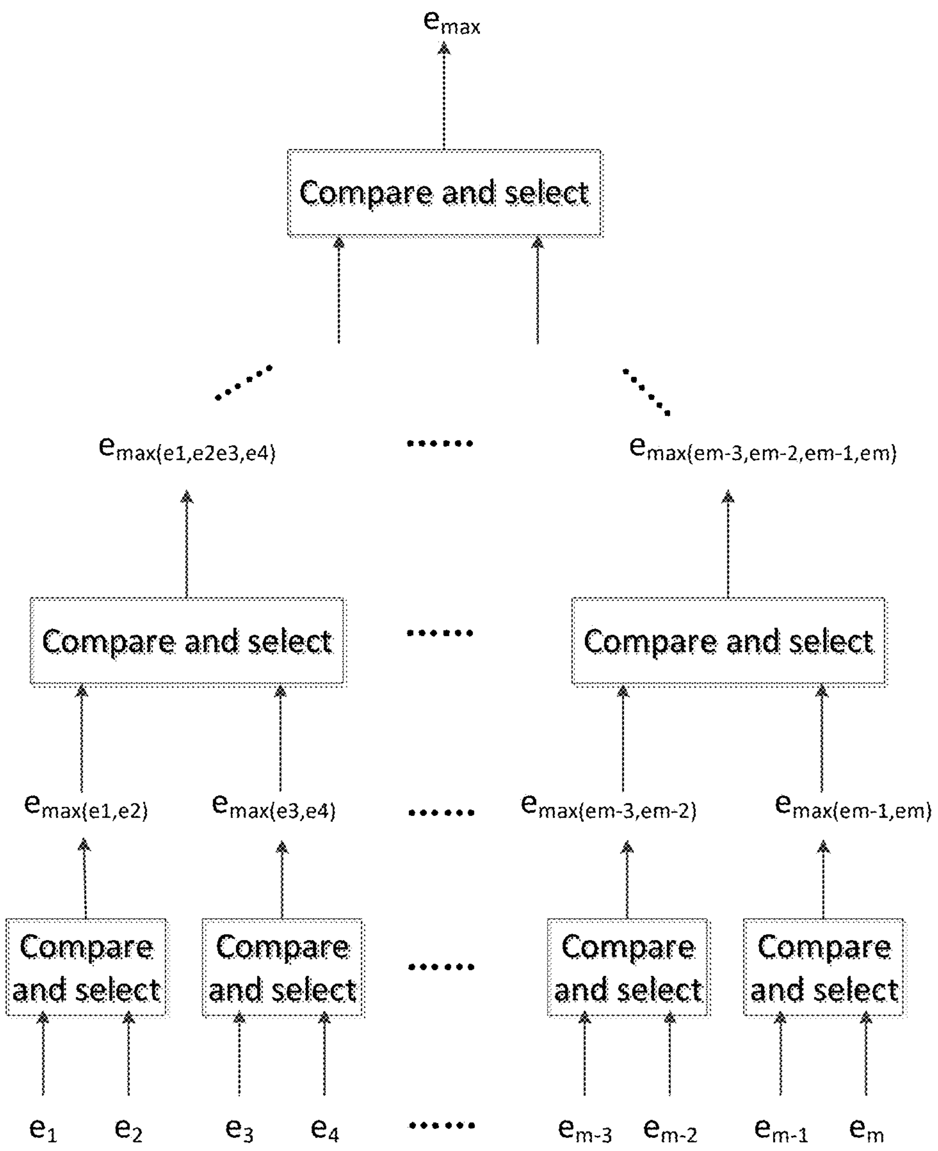

FIG. 117 is a schematic diagram of selecting a largest exponent bit according to the present disclosure.

Figure 118:
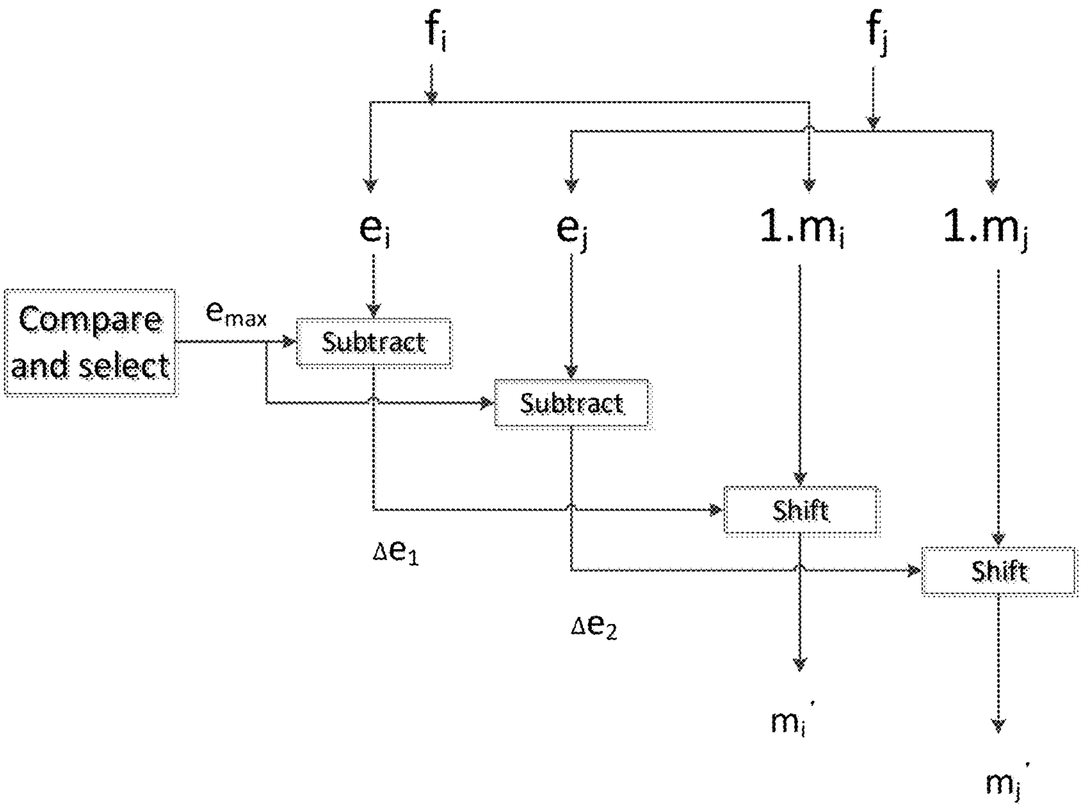

FIG. 118 is a schematic diagram of an operation shifting module according to the present disclosure.

Figure 119:
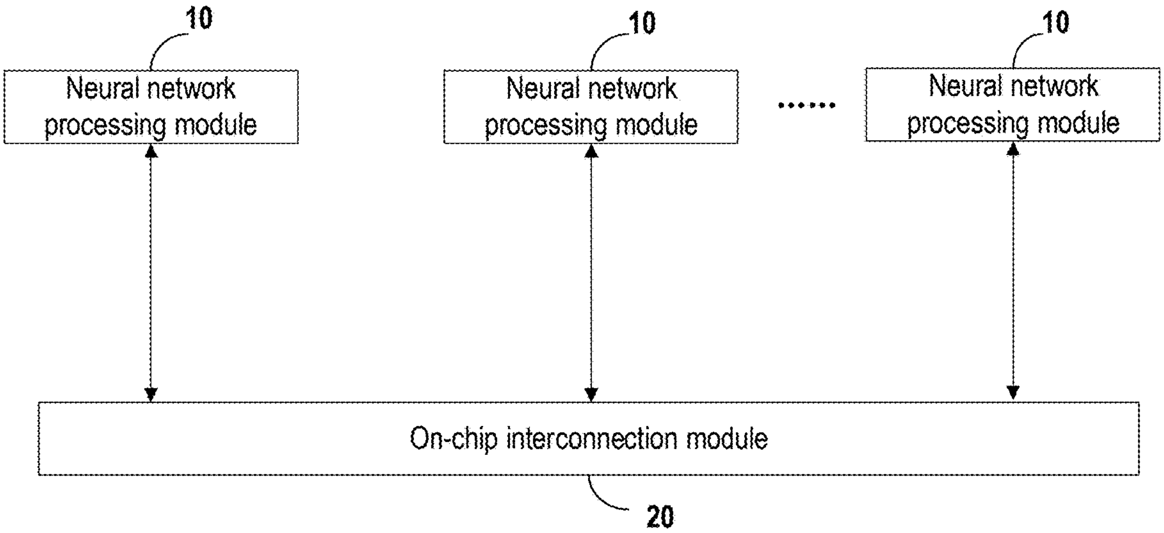

FIG. 119 is a structural diagram of a device for performing neural network operations according to the present disclosure.

Figure 120:
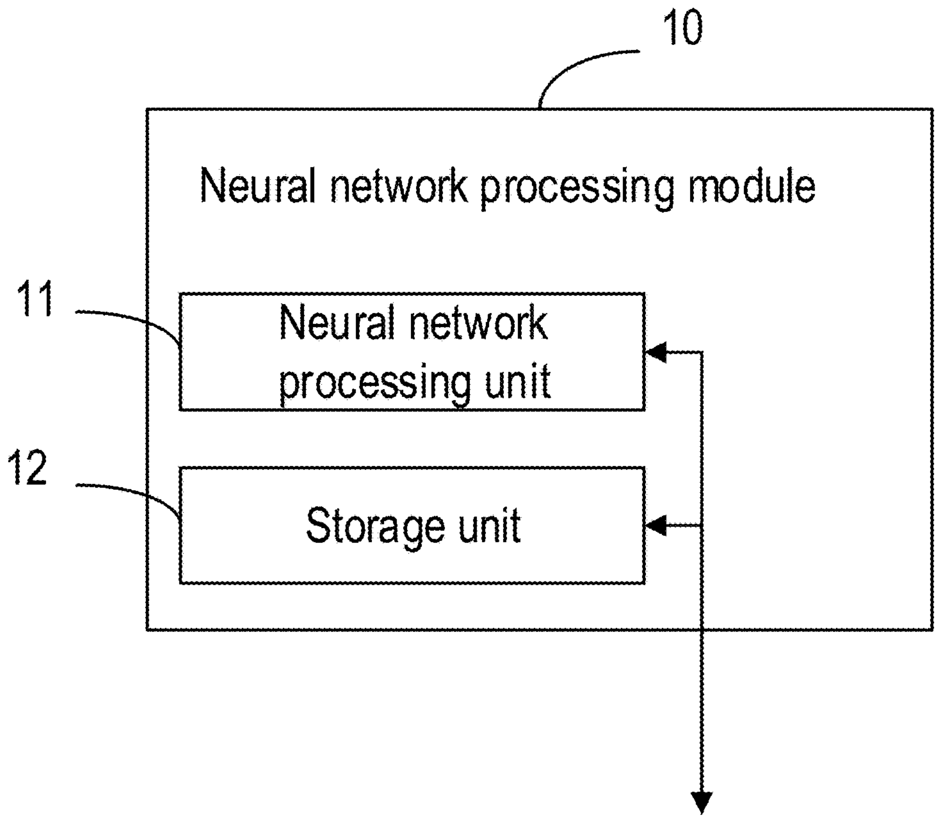

FIG. 120 is a structural diagram of a neural network processing module according to the present disclosure.

Figure 121:
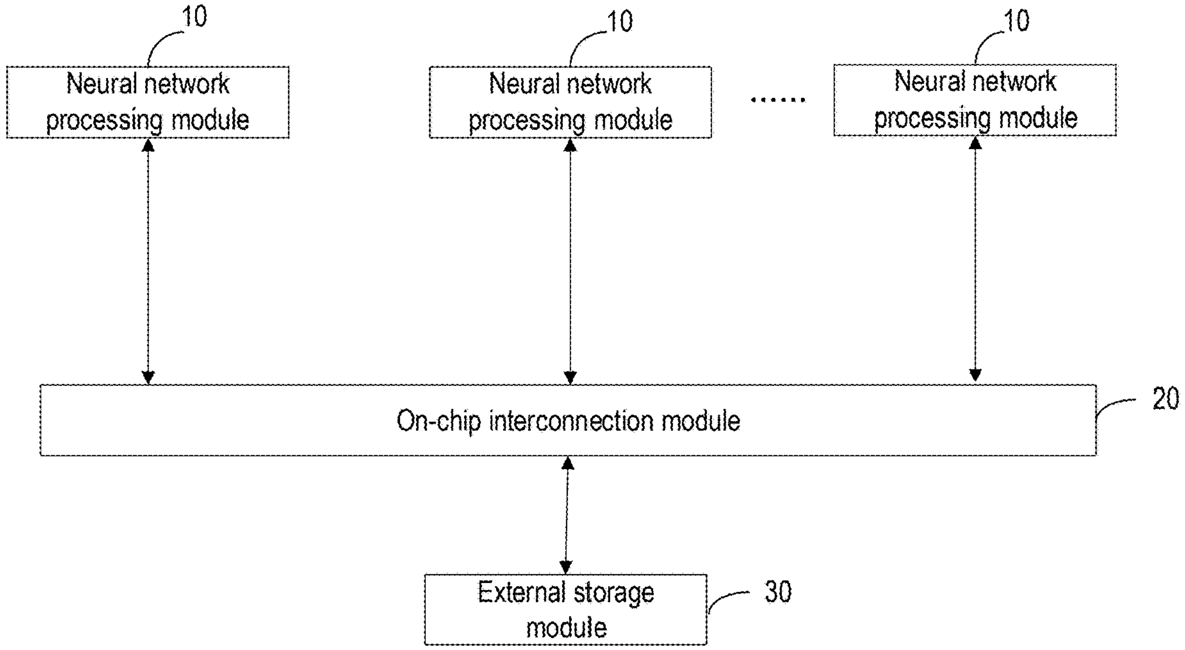

FIG. 121 is a structural diagram of an external storage module according to the present disclosure.

Figure 122:
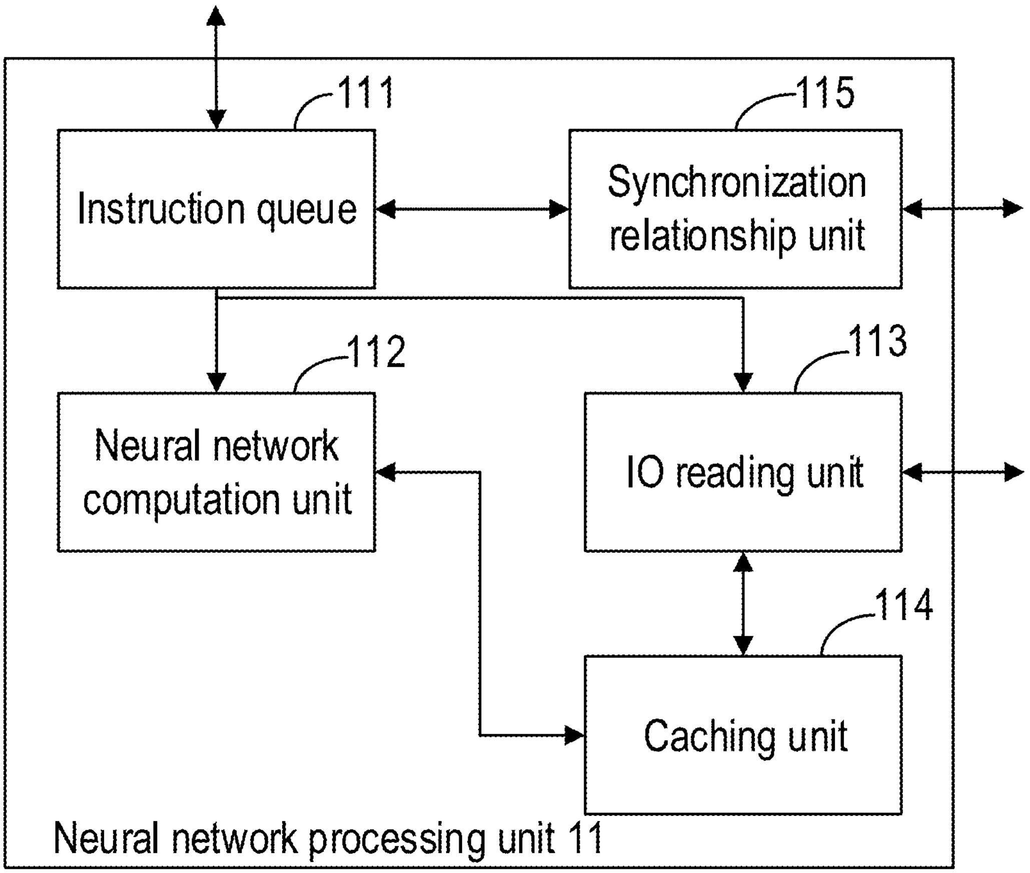

FIG. 122 is a structural diagram of a neural network processing unit according to the present disclosure.

Figure 123:
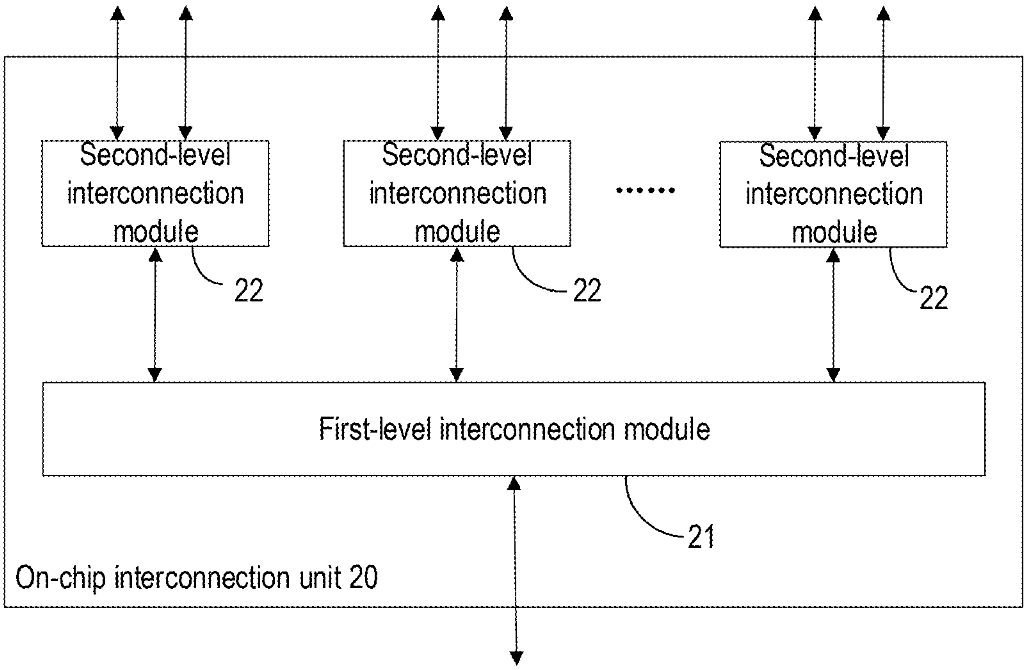

FIG. 123 is a structural diagram of an on-chip interconnection unit according to the present disclosure.

Figure 124:
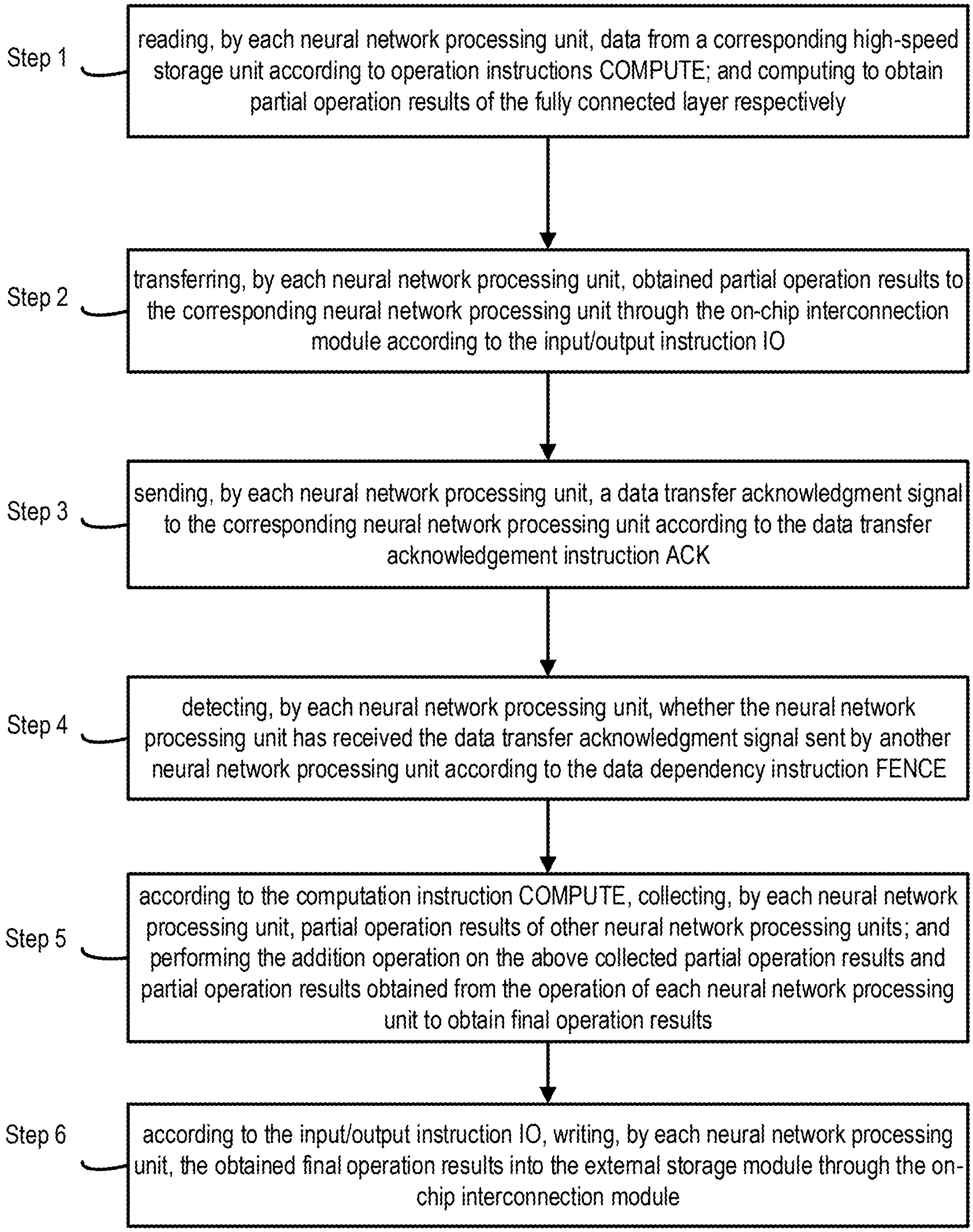

FIG. 124 is a flowchart of an implementation of an operation of a fully connected layer according to the present disclosure.

Figure 125:
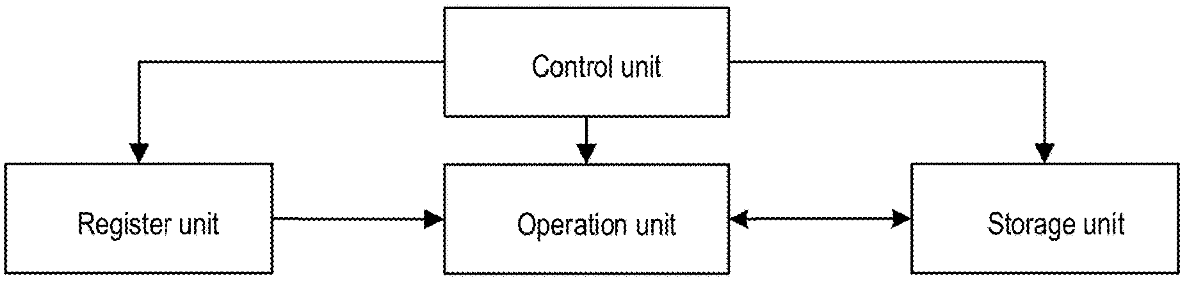

FIG. 125 is a structural diagram of an operation device according to the present disclosure.

Figure 126:
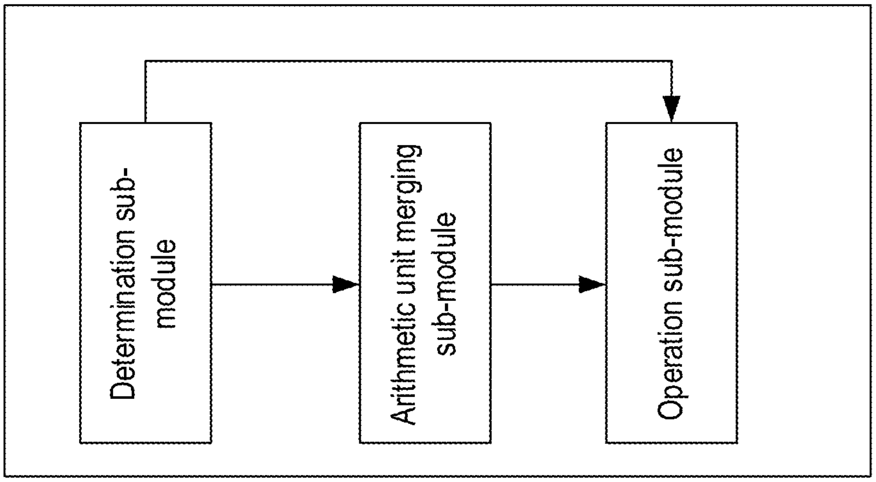

FIG. 126 is a structural diagram of an operation unit according to the present disclosure.

Figure 127:
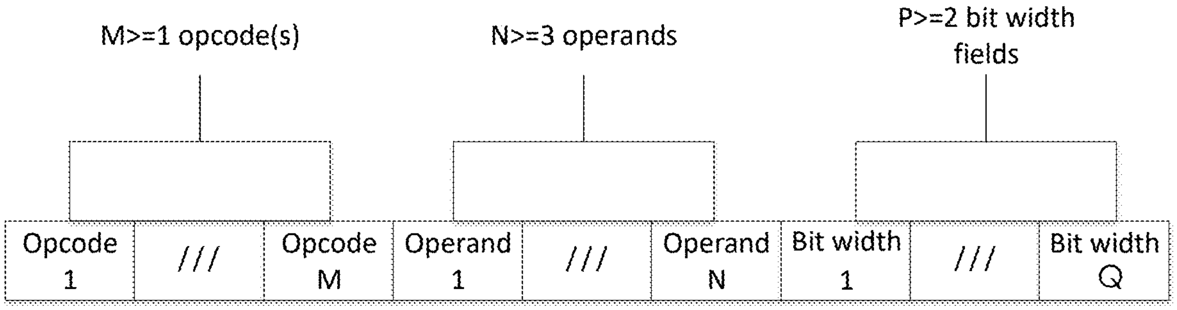

FIG. 127 is a diagram showing an instruction format in a case where one instruction is used to perform an operation according to the present disclosure.

Figure 128:
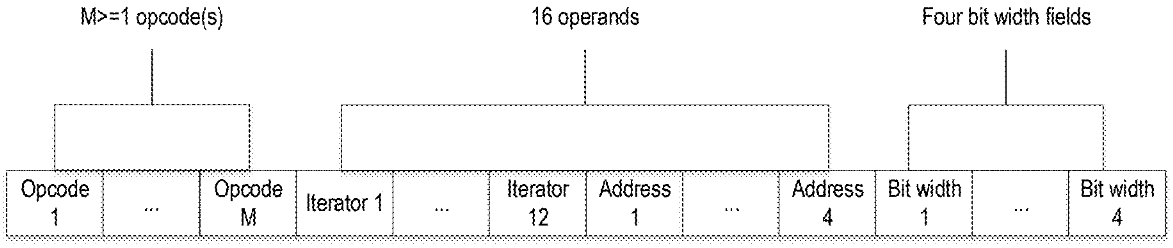

FIG. 128 is a diagram showing a format of a neural network operation instruction according to the present disclosure.

Figure 129:
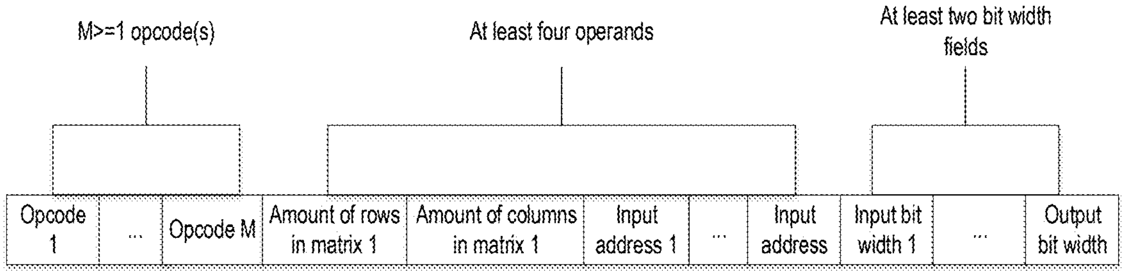

FIG. 129 is a diagram showing a format of a matrix-matrix operation instruction according to the present disclosure.

Figure 130:
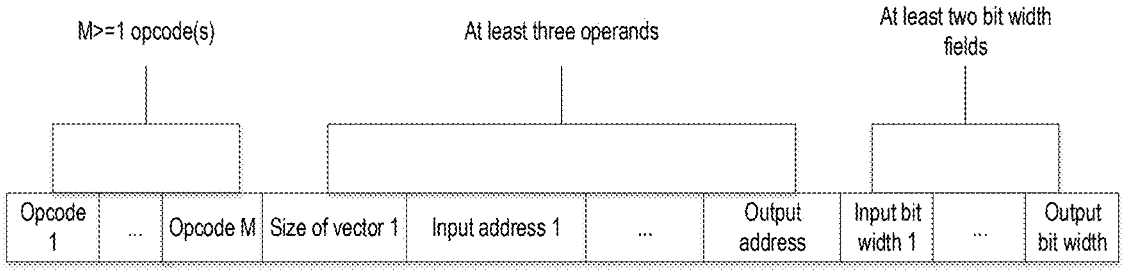

FIG. 130 is a diagram showing a format of a vector-vector operation instruction according to the present disclosure.

Figure 131:
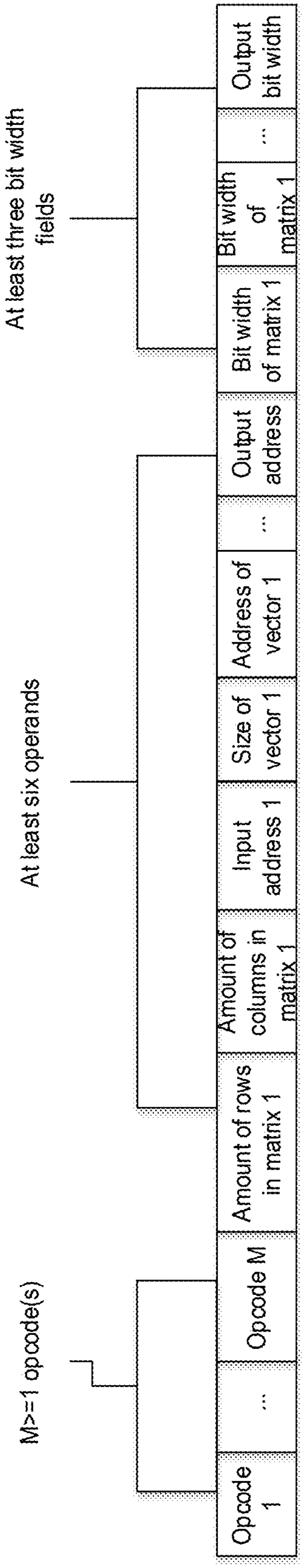

FIG. 131 a diagram showing a format of a matrix-vector operation instruction according to the present disclosure.

Figure 132:
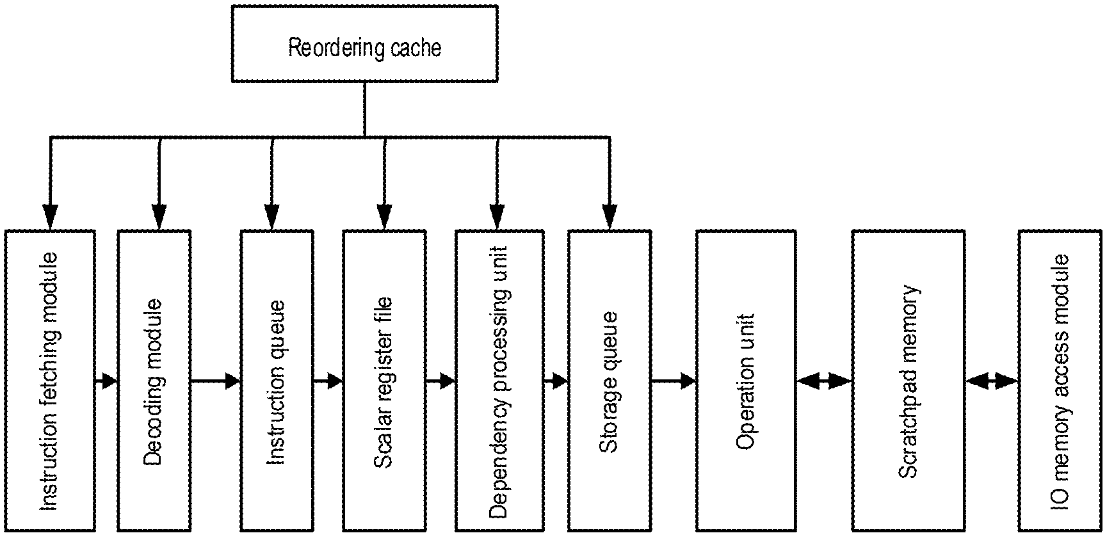

FIG. 132 is a structural diagram of an operation device according to an example of the present disclosure.

Figure 133:
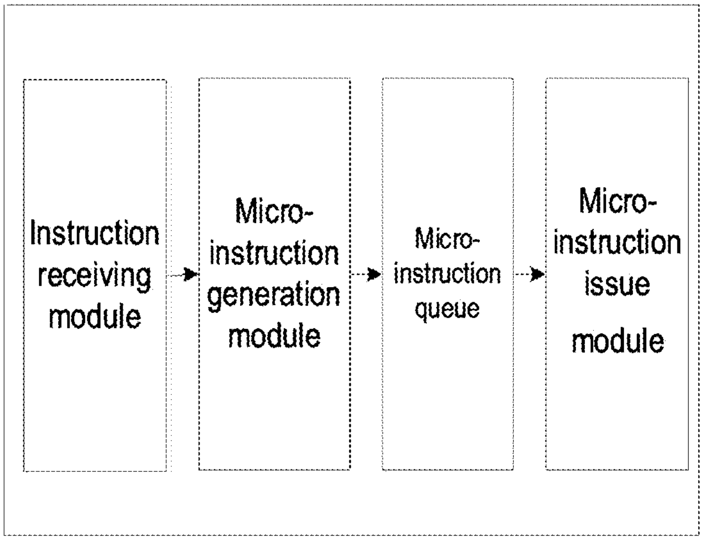

FIG. 133 is a structural diagram of a decoding module according to an example of the present disclosure.

Figure 134:
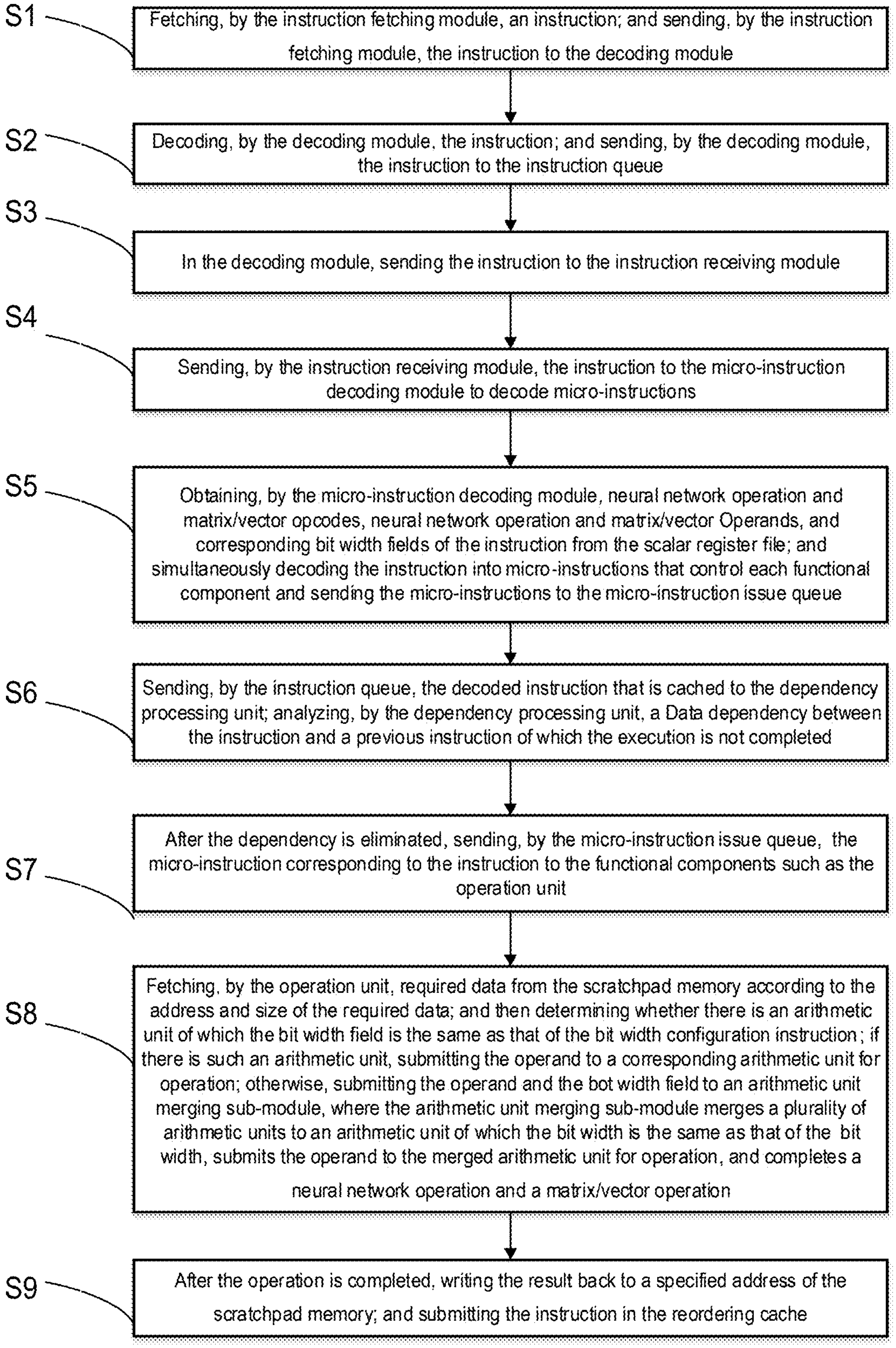

FIG. 134 is a flowchart showing a case where an operation device uses one instruction to perform an operation according to the present disclosure.

Figure 135:
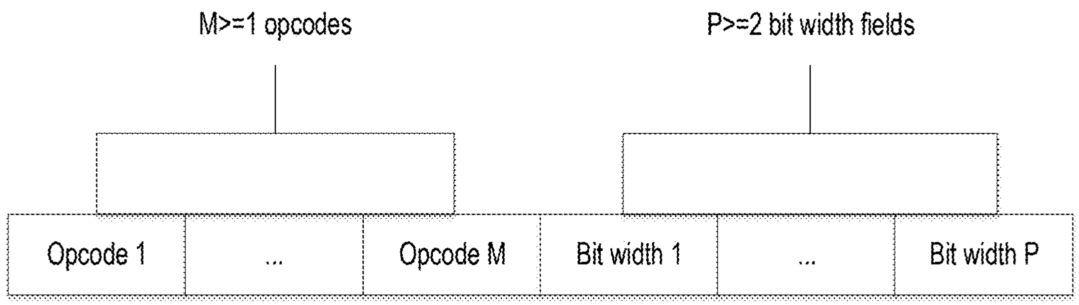

FIG. 135 is a diagram showing a format of a bit width configuration instruction in a case where two instructions are used during an operation according to the present disclosure.

Figure 136:
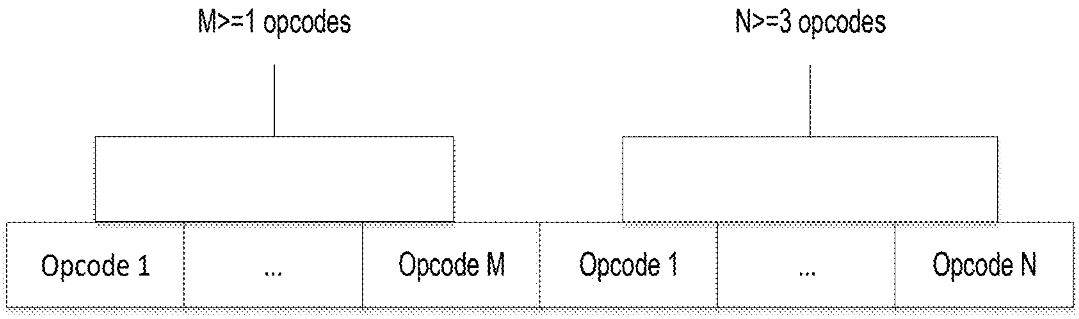

FIG. 136 is a diagram showing a format of an operation instruction in a case where two instructions are used during an operation according to the present disclosure.

Figure 137:
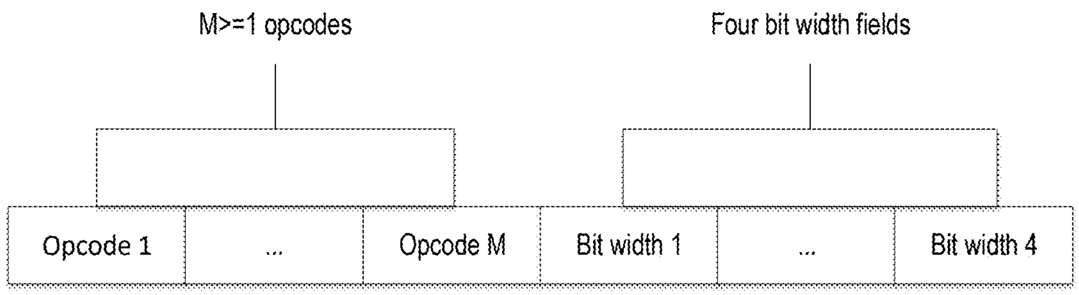

FIG. 137 is a diagram showing a format of a bit width configuration instruction of a neural network according to the present disclosure.

Figure 138:
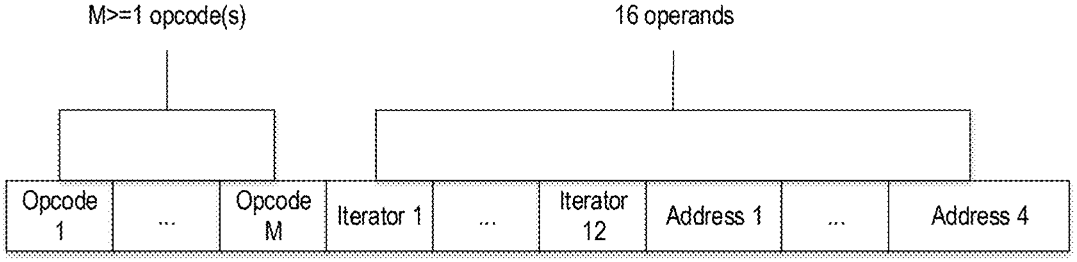

FIG. 138 is a diagram showing a format of an operation instruction of a neural network according to the present disclosure.

Figure 139:
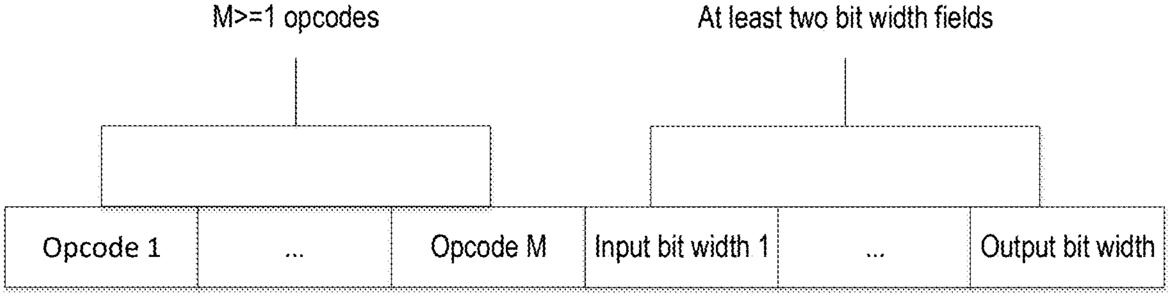

FIG. 139 is a diagram showing a format of a matrix-matrix bit width configuration instruction according to the present disclosure.

Figure 140:
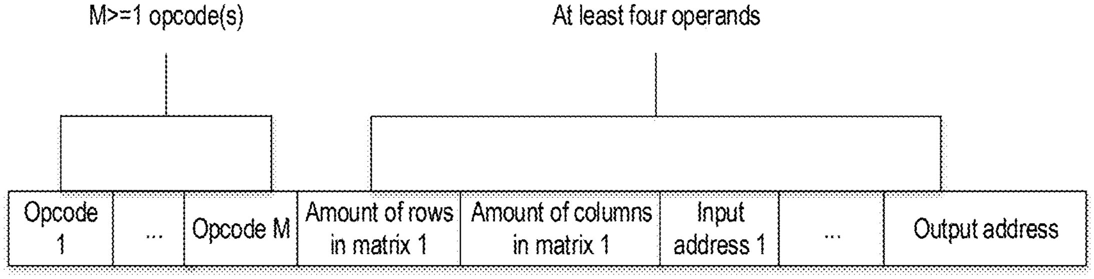

FIG. 140 is a diagram showing a format of a matrix-matrix operation instruction according to the present disclosure.

Figure 141:
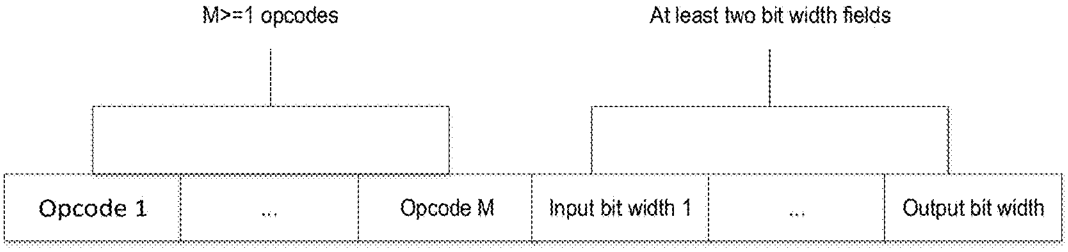

FIG. 141 is a diagram showing a format of a vector-vector bit width configuration instruction according to the present disclosure.

Figure 142:
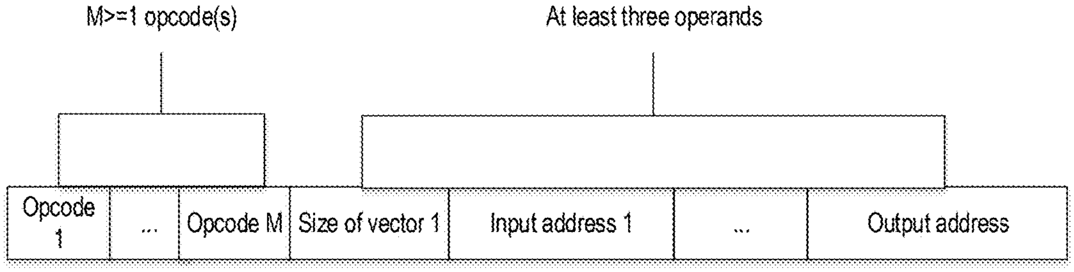

FIG. 142 is a diagram showing a format of a vector-vector operation instruction according to the present disclosure.

Figure 143:
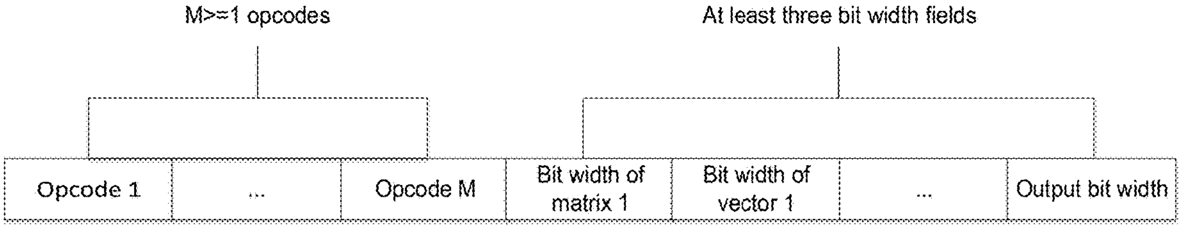

FIG. 143 is a diagram showing a format of a matrix-vector bit width configuration instruction according to the present disclosure.

Figure 144:
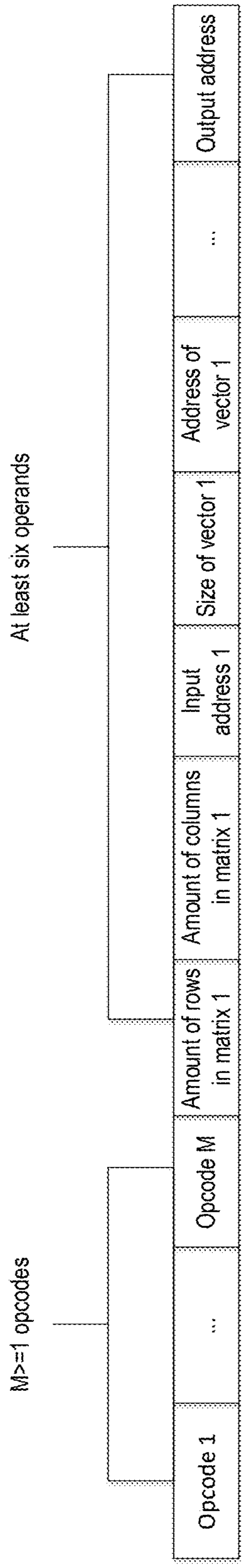

FIG. 144 is a diagram showing a format of a matrix-vector operation instruction according to the present disclosure.

Figure 145:
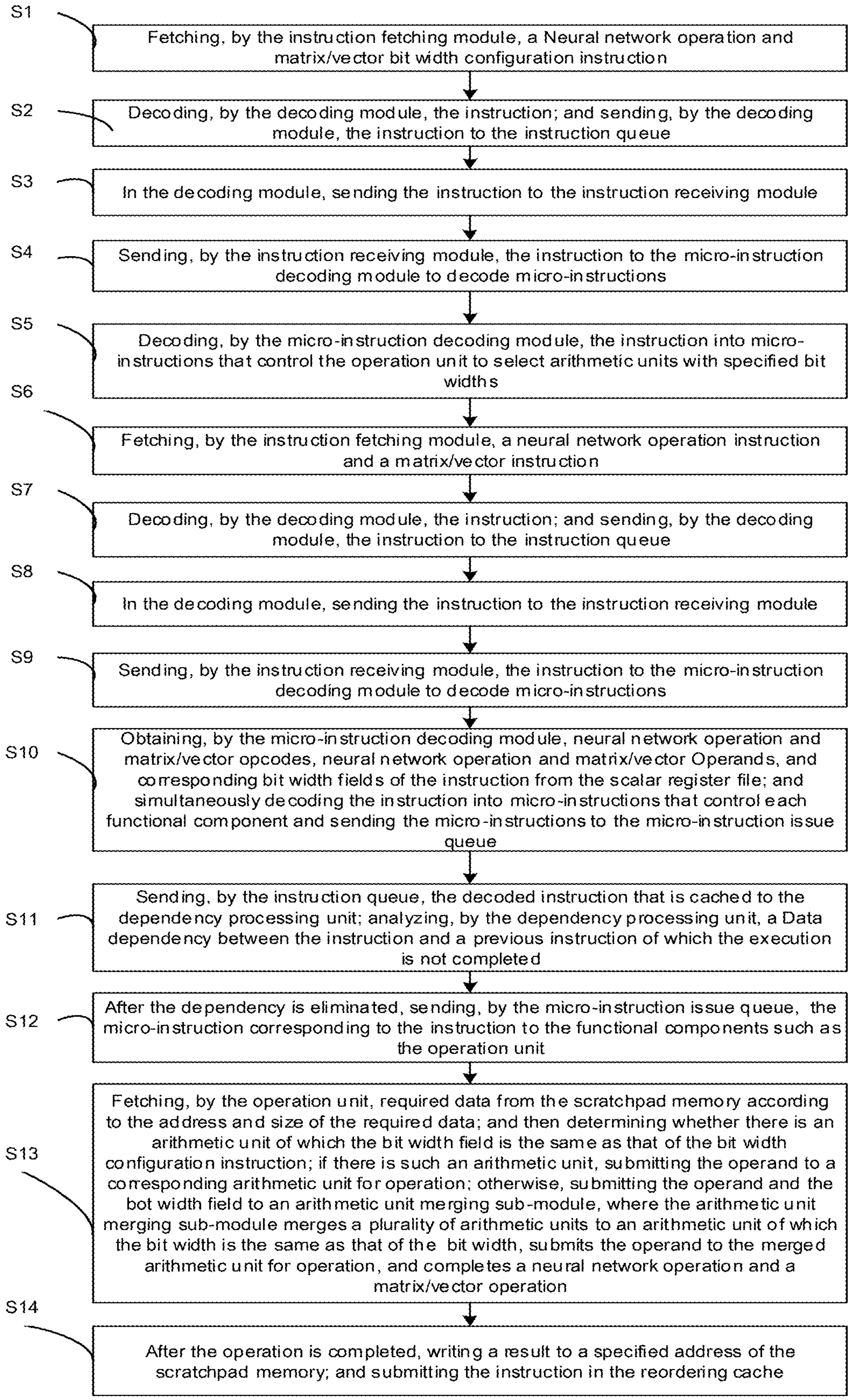

FIG. 145 is a flowchart showing an operation device using two instructions to perform an operation according to the present disclosure.

Figure 146:
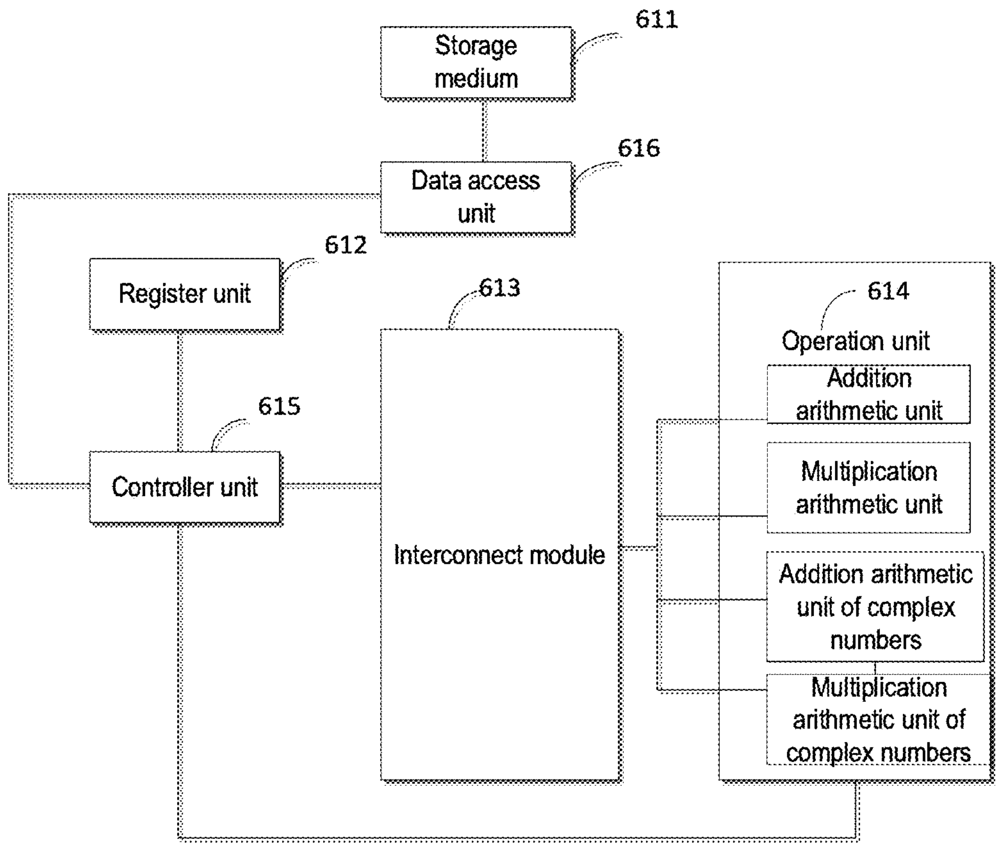

FIG. 146 is a schematic diagram of a computation device according to an example of the present disclosure.

Figure 147:
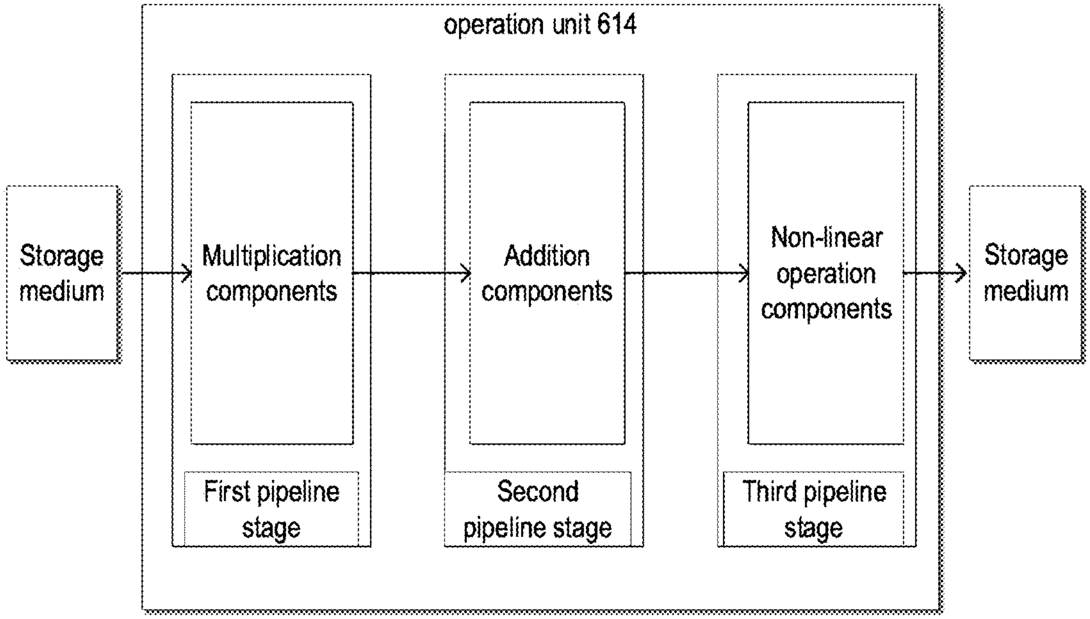

FIG. 147 is a structural diagram of an operation unit according to an example of the present disclosure.

Figure 148:
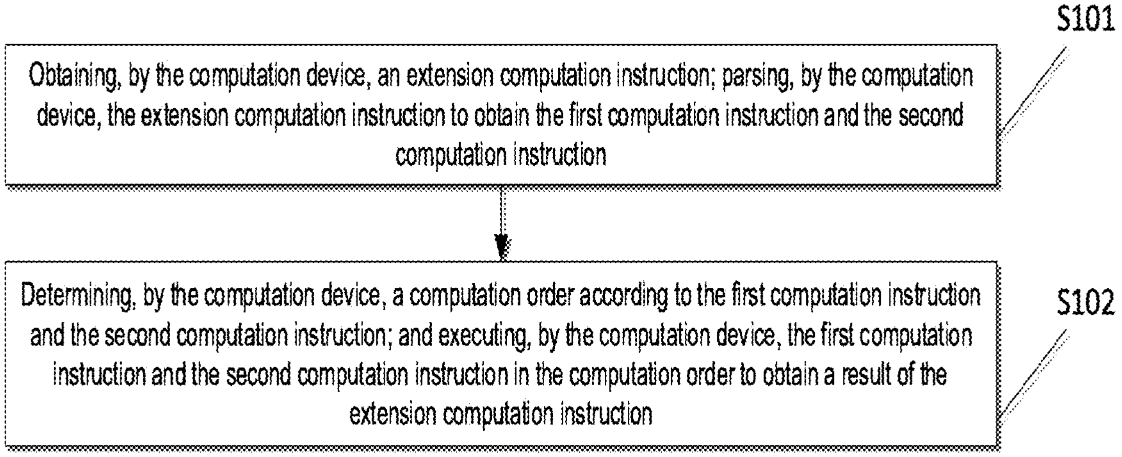

FIG. 148 is an implementation of an extended computation instruction according to an example of the present disclosure.

Figure 149:
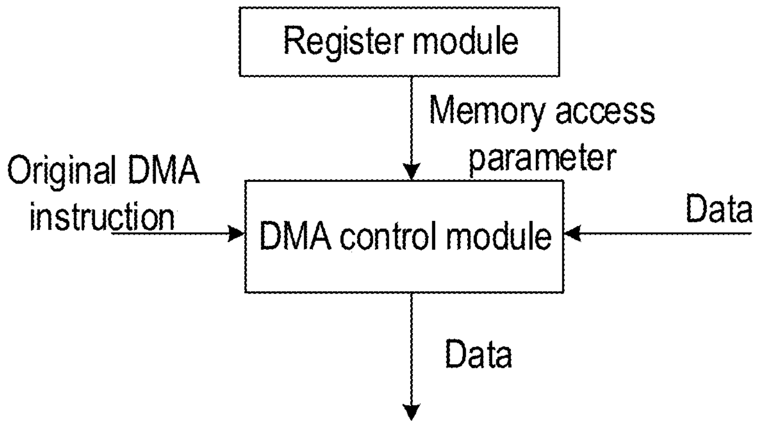

FIG. 149 is a schematic diagram of a device according to an example of the present disclosure.

Figure 150:
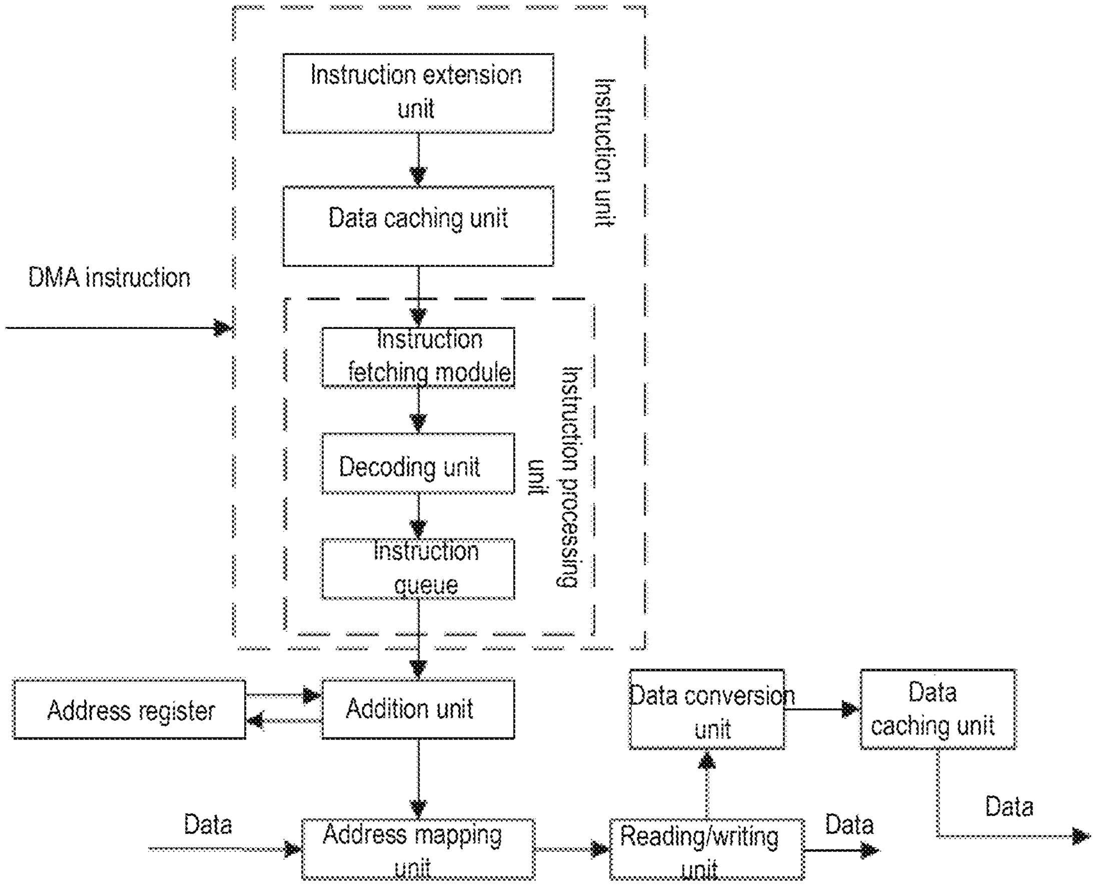

FIG. 150 is a diagram showing a detailed structure of a preferred example of the present disclosure.

Figures 151, 152:
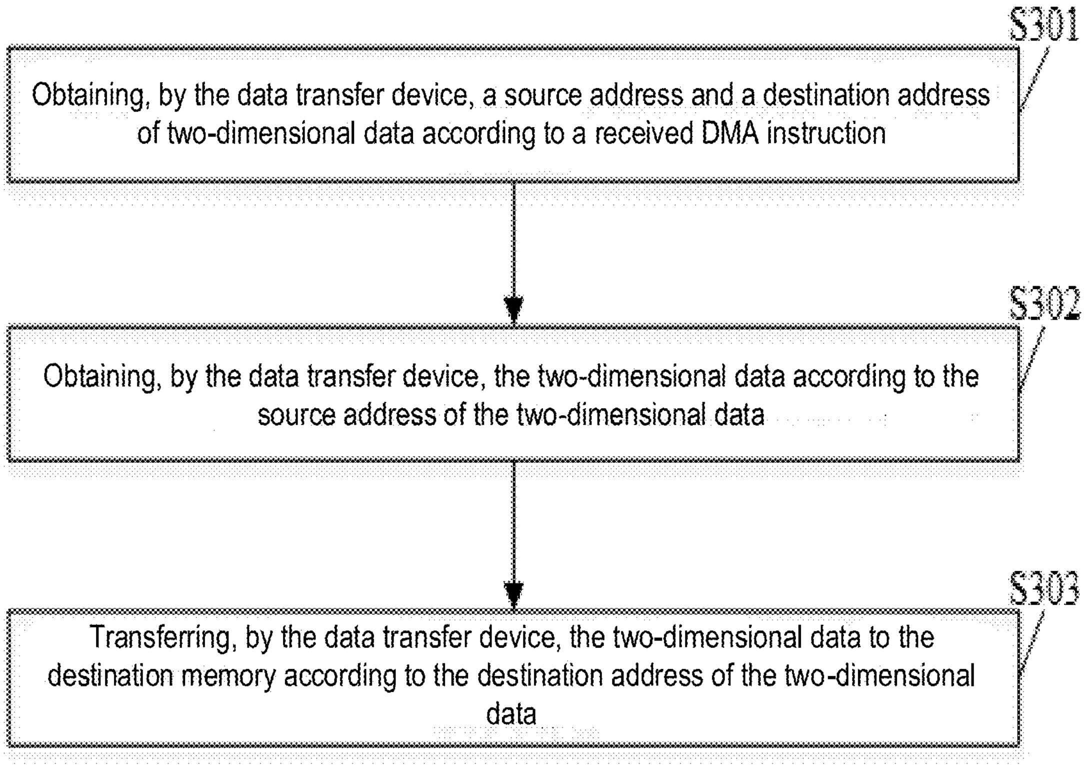

FIG. 151 is a flowchart of steps of an example of the present disclosure.

FIG. 152 is a schematic diagram of a format of an instruction set according to an example of the present disclosure.

FIG. 153 is a pipeline space-time diagram showing a DMA controlling module executing a 2D DMA instruction according to an example of the present disclosure.

Figure 154:
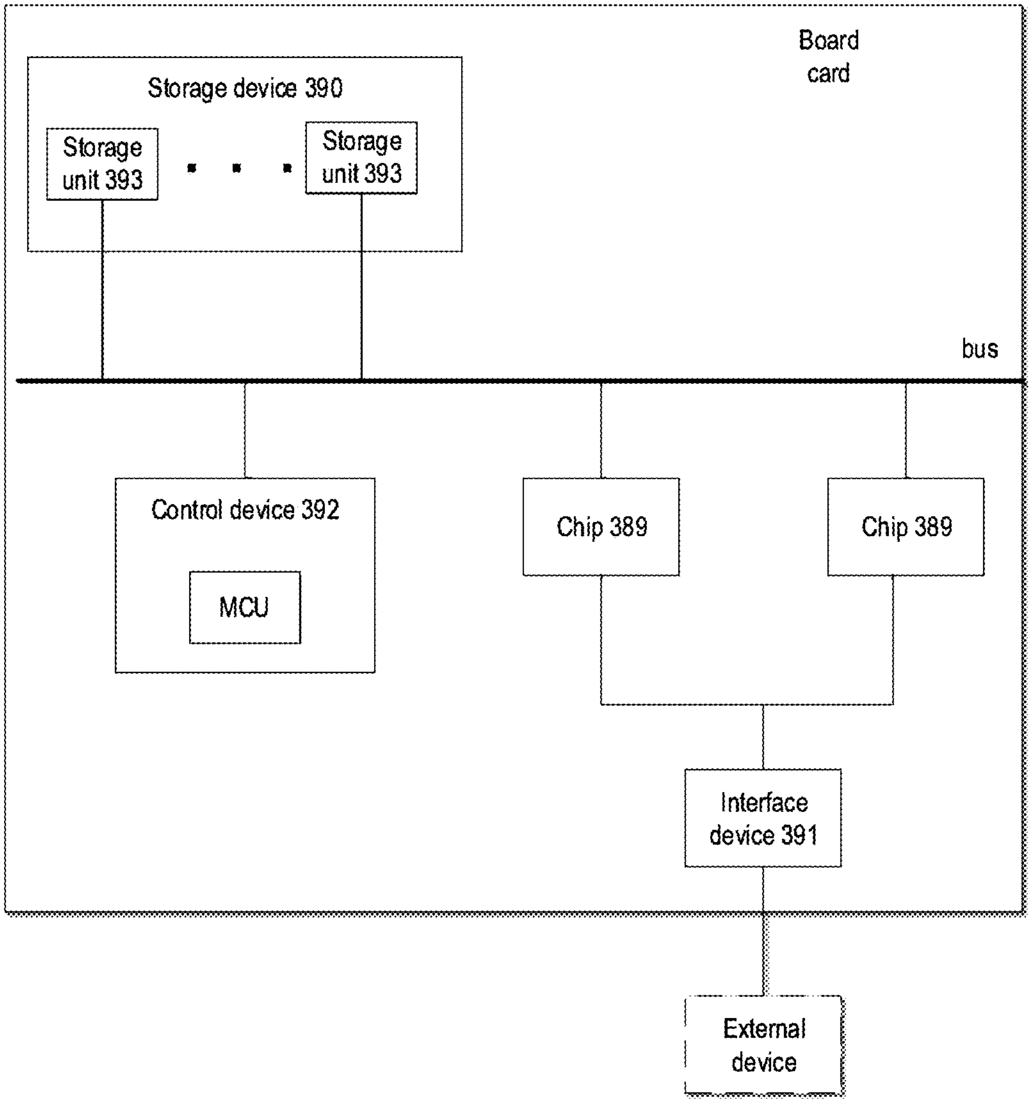

FIG. 154 is a schematic diagram of a structure of a board card according to an example of the present disclosure.

LEGENDS IN FIG. 10-FIG. 13

11, 12, 13 input port
1050, 1100, 1150 output port
51, 52, 53 input end of input port
54, 55, 56 output end of output port
23, 25, 27 buffer allocation circuit
41, 42, 43 routing selection circuit
22, 24, 26, 28, 30, 32 buffer
30, 35, 40, 45, 50, 60 multiplexer
36 arbitration circuit
38 multiplexer circuit

DETAILED DESCRIPTION

Technical solutions in examples of the present disclosure will be described clearly and completely hereinafter with reference to the accompanied drawings in the examples of the present disclosure. Obviously, the examples to be described are merely some rather than all examples of the present disclosure. All other examples obtained by those of ordinary skill in the art based on the examples of the present disclosure without creative efforts shall fall within the protection scope of the present disclosure.

It should be understood that the terms “including” and “comprising” used in this specification and the appended claims indicate the presence of a feature, an entity, a step, an operation, an element, and/or a component, but do not exclude the existence or adding of one or more other features, entities, steps, operations, elements, components, and/or collections thereof.

It should also be understood that the terms used in the specification of the present disclosure are for the purpose of describing particular examples only and are not intended to limit the disclosure. As being used in the specification and the appended claims of the disclosure, unless the context clearly indicates otherwise, the singular forms “a”, “an”, and “the” are intended to include the plural forms.

It should also be understood that the term “and/or” used in the specification and the appended claims refers to any and all possible combinations of one or more of relevant listed items and includes these combinations.

As being used in this specification and the appended claims, the term “if” can be interpreted as “when”, or “once”, or “in response to a determination” or “in response to a case where something being detected" depending on the context. Similarly, depending on the context, the phrase "if it is determined that" or "if [a described condition or event] is detected" can be interpreted as "once it is determined that", or "in response to a determination", or "once [a described condition or event] is detected", or "in response to a case where [a described condition or event] is detected".

In the present disclosure, a computation device is included in a terminal device. The computation device can provide operating instructions for executing various computation methods (which are referred to as algorithms). The computation methods include but are not limited to a neural network algorithm, a speech recognition algorithm, a scene recognition algorithm, etc., which will be described in detail below. Some examples involved in a computation device of the present disclosure are described below.

Figure 1:
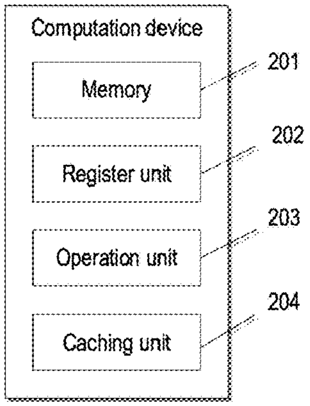
FIG. 1 is a structural diagram of a computation device according to an example of the present disclosure.

An example of the present disclosure provides a matrix computation method. The method is performed by a computation device of FIG. 1. As shown in FIG. 1, the computation device includes:

a memory 201 configured to store a matrix. Preferably, the memory may be a scratchpad memory, which can support matrix data of different lengths. In this disclosure, necessary computation data is temporarily stored in the scratchpad memory so that the computation device can be more flexible and effective in supporting data of different lengths during a matrix operation. The above-mentioned memory may also be an off-chip database, a database, or another storage media.

The computation device includes a register unit 202, which is configured to store scalar data, where the scalar data includes but is not limited to an address of the matrix data in the memory 201 and a scalar used during an operation of the matrix and the scalar. In an example, the register unit may be a scalar register, which serves as a scalar register required in an operation process. The scalar register not only stores the matrix address, but also stores scalar data. When an operation between a matrix and a scalar is performed, an operation unit is configured to obtain not only a matrix address from the register unit, but also a corresponding scalar from the register unit.

Figure 1A:
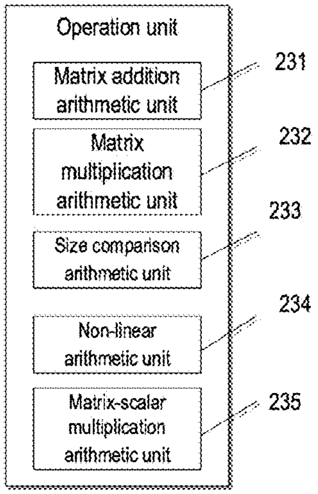
FIG. 1A is a structural diagram of a matrix computation unit according to an example of the present disclosure.

The computation device includes an operation unit 203 which is configured to obtain and execute a first operation instruction. As shown in FIG. 1A, the operation unit includes a plurality of arithmetic units. The arithmetic units include but are not limited to: a matrix addition arithmetic unit 231, a matrix multiplication arithmetic unit 232, a size comparison arithmetic unit 233, a non-linear arithmetic unit 234, and a matrix-scalar multiplication arithmetic unit 235.

Figure 1B:
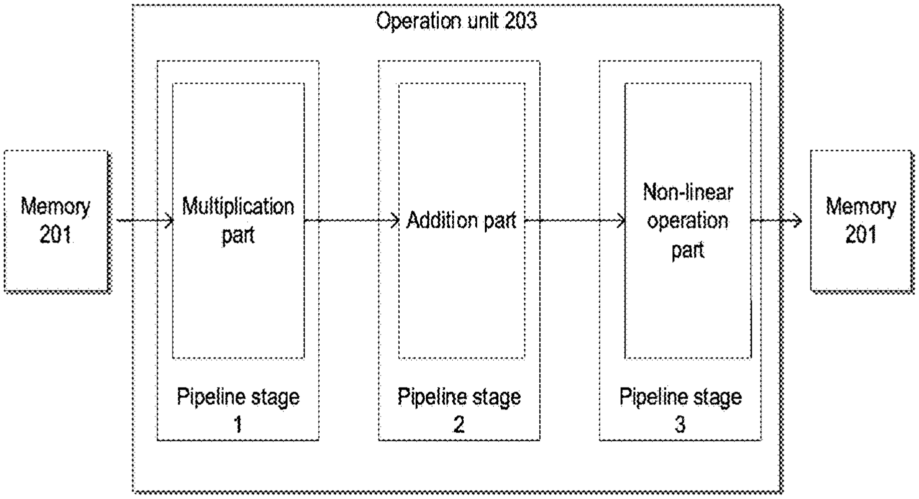
FIG. 1B is a structural diagram of a pipeline stage according to an example of the present disclosure.
Figure 1C:
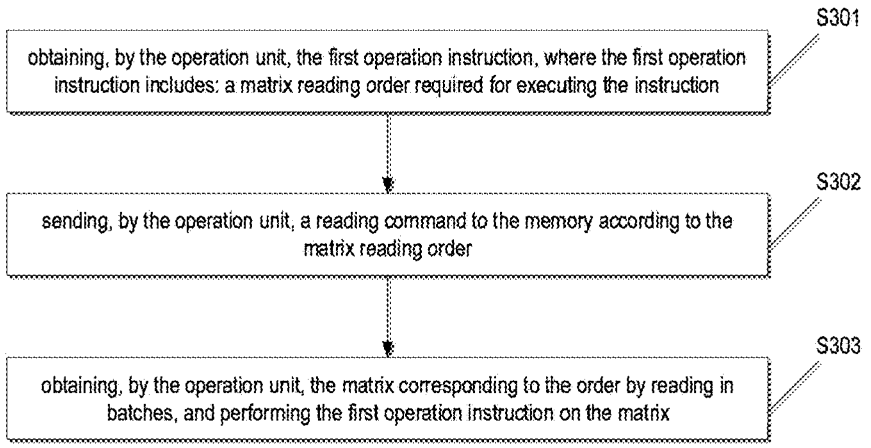
FIG. 1C is a flowchart of a matrix computation method according to an example of the present disclosure.

The matrix computation method is shown in FIG. 1C and includes the following steps:

a step S301, obtaining, by the operation unit 203, the first operation instruction, where the first operation instruction includes: a matrix reading order required for executing the instruction.

In the step S301, the matrix reading order required for executing the instruction may be a plurality of types. For instance, in an optional technical solution of the present disclosure, the matrix reading order required for executing the instruction may be an order for a storage address of a required matrix. As another example, in another optional technical solution of the present disclosure, the above-mentioned matrix reading order required for executing the instruction may be an order for an identifier of the required matrix. The identifier may be represented in a plurality of forms, which for example, including a name of the matrix, an identification number of the matrix, and a register number or address of the matrix in the register unit.

An example is used to explain the matrix reading order which is included in the first operation instruction and is required for executing the instruction. It is assumed that a matrix operation formula is $f(x)=A+B$, where A and B are both matrices. In addition to the matrix operation formula, the first operation instruction may also carry a storage address of the matrix required by the matrix operation formula. For instance, the storage address of A is 0000-0FFF, and the storage address of B is 1000-1FFF. As another example, the first operation instruction may carry the identifiers of A and B. For instance, the identifier of A is 0101, and the identifier of B is 1010.

The matrix computation method includes a step S302, sending, by the operation unit 203, a reading command to the memory 201 according to the matrix reading order.

A method for realizing the step S302 may be:

if the matrix reading order is an order for the storage address of the required matrix, the operation unit 203 sends the reading order for reading the storage address to the memory 201 and obtains the corresponding matrix by using a batch reading method.

As another instance, if the matrix reading order is an order for the identifier of the required matrix, the operation unit 203 obtains the storage address corresponding to the identifier from the register unit by reading in units according to the identifier, and then the operation unit 203 sends a reading command for reading the storage address to the memory 201 and obtains the corresponding matrix by reading in batches.

A method of the above-mentioned reading in units may be reading a unit of data each time, which is 1-bit data. A reason for using the method of reading in units, which is reading data of 1 bit, is that since scalar data occupies small capacity, if data is read in batches, an amount of data that is read may be larger than the required data capacity, which may lead to a waste of bandwidth. In this case, scalar data is read in units to reduce the waste of bandwidth.

The matrix computation method includes a step S303, obtaining, by the operation unit 203, the matrix corresponding to the order by reading in batches, and performing the first operation instruction on the matrix.

A method of the above-mentioned reading in batches in the step S303 may be reading a plurality of bits of data each time. For instance, 16-bit, 32-bit, or 64-bit data is read each time, which means that regardless of the amount of data required, data with fixed bits is read each time. The method of reading in batches is very suitable for reading large data. Since a matrix occupies large capacity, if the method of reading in units is used, the reading speed may be very slow. In this case, the method of reading in batches is used to obtain multi-bit data so that matrix data can be read quickly. A problem of the speed of matrix computation being affected by the slow reading of matrix data may also be avoided.

The computation device of the technical solution of the present disclosure includes the register unit and the memory for storing scalar data and matrix data respectively. The present disclosure adopts the method of reading in units and the method of reading in batches for the two types of memories. By assigning a data reading method that matches the features of matrix data, bandwidth may be fully utilized to avoid an impact of a bandwidth bottleneck on the speed of matrix computation. In addition, since a scalar data storage unit is configured to store scalar data and adopts a scalar data reading method, a utilization rate of bandwidth may be improved. Therefore, the technical solution provided by the present disclosure may make good use of bandwidth, and avoid the influence of bandwidth on the computation speed, thus having technical effects of fast computation speed and high efficiency.

Optionally, performing the first operation instruction on the matrix may be:

performing an n-stage pipeline computation on the matrix, which specifically includes that, performing a computation of a first pipeline stage on the matrix to obtain a first result, inputting the first result into a second pipeline stage, performing a computation of the second pipeline stage to obtain a second result, and inputting the second result into a third pipeline stage, performing a computation of the third pipeline stage to obtain a third result; after performing computations of pipeline stages in a stage by stage manner, inputting an $n-1^{th}$ result to an $n^{th}$ pipeline stage, performing a computation of the $n^{th}$ pipeline stage to obtain an $n^{th}$ result, and inputting the $n^{th}$ result to the memory. n may be an integer greater than or equal to 2. In an instance where n=3, a flowchart of the operation of the above-mentioned pipeline stages are shown in FIG. 1B.

The above-mentioned first pipeline stage includes but is not limited to: a matrix multiplication arithmetic unit, and the like.

The above-mentioned second pipeline stage includes but is not limited to: a matrix addition arithmetic unit, a size comparison arithmetic unit, and the like.

The above-mentioned third pipeline stage includes but is not limited to: a non-linear arithmetic unit, a matrix-scalar multiplier, and the like.

The above-mentioned three pipeline stages can be adjusted according to different operation instructions. For instance, when only a vector operation or a matrix operation is performed, since there is no comparison operation or non-linear operation, only the operation of the first pipeline stage needs to be executed. In certain cases, only the first pipeline stage and the second pipeline stage may be retained. The description of the three pipeline stages of the present disclosure does not indicate that all operation instructions are required. Manufacturers or users may make adjustments according to certain operational demands. The division of a matrix operation into operations of three pipeline stages is mainly for increasing the operation speed. When an existing general-purpose processor is used to perform a matrix computation, steps of the computation may include: computing the matrix by the processor to obtain a first result, then storing the first result in the memory; reading, by the processor, the first result from the memory and performing a second computation to obtain a second result, then storing the second result in the memory; and reading, by the processor, the second result from the memory and performing a third computation to obtain a third result, then storing the third result in the memory. It can be seen from these computation steps that when the general-purpose processor performs a matrix computation, the computation is not divided into pipeline stages, so computed data needs to be saved each time after computing and then be read again for a next computation. In this case, data is repeatedly stored and read for a plurality of times. However, in the technical solution provided by the present disclosure, the first result of the computation of the first pipeline stage is transferred to the second pipeline stage for computation directly, and the second result of the computation of the second pipeline stage is transferred to the third pipeline stage for computation directly. The first result and the second result of the first pipeline stage and the second pipeline stage do not need to be stored. Technical effects of the technical solution includes: firstly, the memory usage may be reduced, and secondly, the repeated saving and reading of results may be avoided, which help to increase the utilization rate of bandwidth and further improve the computational efficiency.

In another example of the present disclosure, the pipeline components may be freely combined, or the first pipeline stage may be used. For instance, the second pipeline stage and the third pipeline stage may be combined, or the first, the second, and the third pipelines are combined, or each pipeline stage is responsible for a different operation and the stages can be permuted or combined. For instance, the first pipeline stage is responsible for comparison operations and some multiplication operations, and the second pipeline stage is responsible for a combination of non-linear operations and matrix-scalar multiplication operations or another combination.

Optionally, the above-mentioned computation device may further include: a caching unit 204 configured to cache the first operation instruction. The instruction is also cached in the caching unit during execution. After an instruction is executed, if the instruction is also an earliest instruction among unsubmitted instructions in the instruction caching unit, the instruction is to be submitted. Once the instruction is submitted, the change in the state of the device caused by the operation of the instruction cannot be revoked. In an example, the instruction caching unit may be a reordering cache.

Optionally, prior to the step S301, the matrix computation method may further include:

determining whether the first operation instruction and a second operation instruction preceding the first operation instruction are associated, if the first operation instruction and the second operation instruction are associated, after the second operation instruction is executed, fetching the first operation instruction from the caching unit and transferring the first operation instruction to the operation unit 203; if the first operation instruction and the operation instruction preceding the first operation instruction are not associated, transferring the first operation instruction to the operation unit.

A method of determining whether the first operation instruction and the second operation instruction preceding the first operation instruction are associated may be:

fetching a first storage address range of a required matrix of the first operation instruction according to the first operation instruction, and fetching a second storage address range of a required matrix of the second operation instruction according to the second operation instruction; if there is an overlap between the first storage address range and the second storage address range, determining that the first operation instruction and the second operation instruction are associated; if there is no overlap between the first storage address range and the second storage address range, determining that the first operation instruction and the second operation instruction are not associated.

The overlap between the storage address ranges indicates that the first operation instruction and the second operation instruction access the same matrix. Since the storage space of a matrix is relatively large, if the presence of the same storage address range serves as a condition for determining there is an association between instructions, a situation that the storage area accessed by the second operation instruction includes the storage area accessed by the first operation instruction may occur. For instance, the second operation instruction accesses the storage area of matrix A, the storage area of matrix B, and the storage area of matrix C. If the storage areas of matrix A and matrix B are adjacent, or the storage areas of matrix A and matrix C are adjacent, then the storage area accessed by the second operation instruction is the storage areas of matrix A and matrix B and the storage area of matrix C, or is the storage areas of matrix A and matrix C and the storage area of matrix B. In this case, if first operation instruction accesses the storage areas of matrix A and matrix D, the storage area of the matrix accessed by the first operation instruction cannot be the same as the storage area of the matrix of the second operation instruction. If the same storage area serves as a condition, then it is determined that the first operation instruction and the second operation instruction are not associated. However, practices show that the first operation instruction and the second operation instruction are associated at this time, therefore, the present disclosure determines whether instructions are associated according to the presence of an overlapping area, which may avoid the misjudgment in the situation above.

Below is an example that explains a situation where instructions are associated and a situation where instructions are not associated. It is assumed that the matrices required by the first operation instruction are matrix A and matrix D, where the storage area of matrix A is [0001, 0FFF], and the storage area of matrix D is [A000, AFFF]. The matrices required by the second operation instruction are matrix A, matrix B and matrix C whose corresponding storage areas are [0001, 0FFF], [1000, 1FFF], [B000, BFFF]. The corresponding storage area of the first operation instruction is [0001, 0FFF], [A000, AFFF]. The corresponding storage area of the second operation instruction is: [0001, 1FFF], [B000, BFFF]. Since the second operation instruction and the first operation instruction have an overlapping area [0001, 0FFF], the first operation instruction and the second operation instruction are associated.

It is assumed that the matrices required by the first operation instruction are matrix E and matrix D, where the storage area of matrix A is [C000, CFFF], and the storage area of matrix D is [A000, AFFF]. The matrices required by the second operation instruction are matrix A, matrix B and matrix C whose corresponding storage areas are [0001, 0FFF], [1000, 1FFF], [B000, BFFF]. The corresponding storage area of the first operation instruction is [C000, CFFF], [A000, AFFF]. The corresponding storage area of the second operation instruction is: [0001, 1FFF], [B000, BFFF]. Since the second operation instruction and the first operation instruction do not have any overlapping area, the first operation instruction and the second operation instruction are not associated.

Figure 1D:
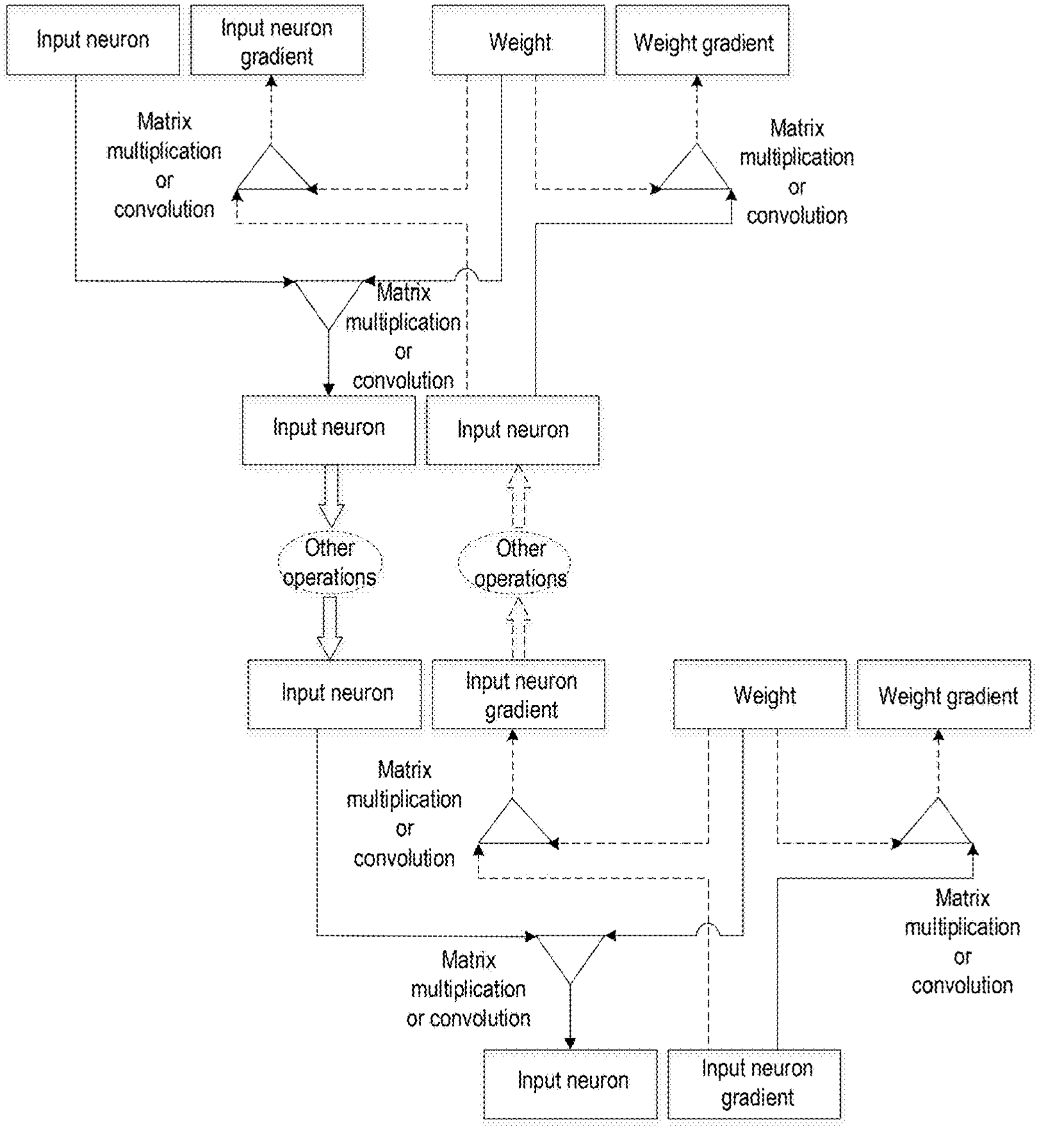
FIG. 1D is a diagram of forward and backward operations according to an example of the present disclosure.
Figures 1E, 1F:
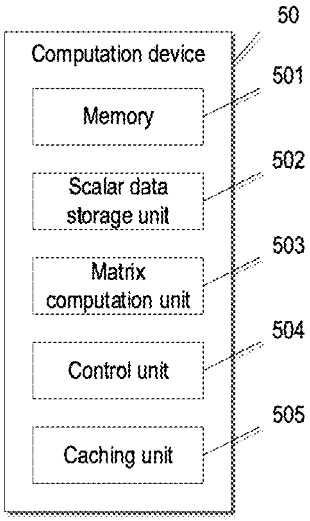
FIG. 1E is a diagram of a format of an instruction set according to an example of the present disclosure.
FIG. 1F is a structural diagram of another computation device according to an example of the present disclosure.
Figure 1G:
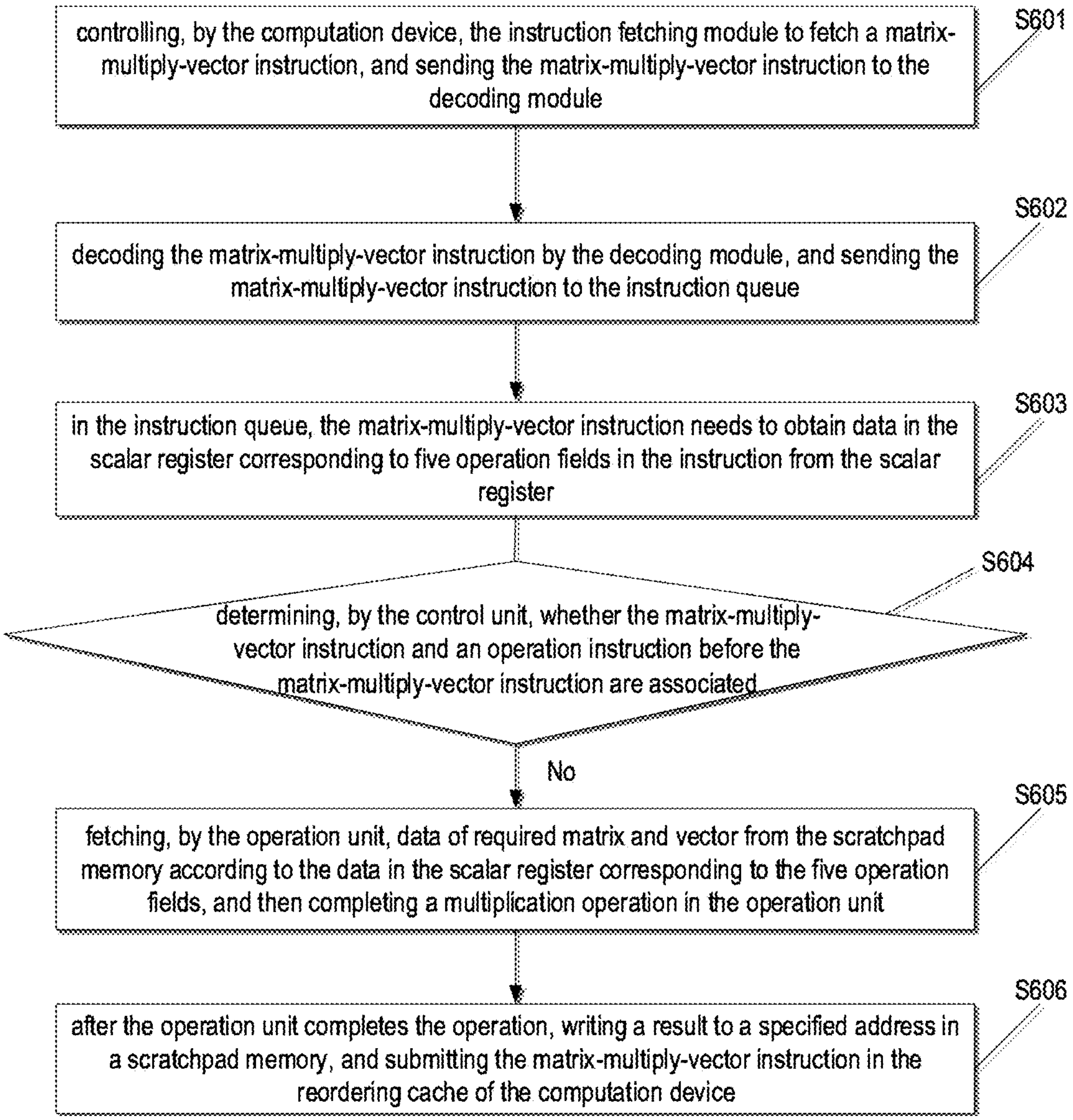
FIG. 1G is a flowchart showing a process of executing a matrix-multiply-vector instruction by a computation device according to an example of the present disclosure.
Figure 2A:
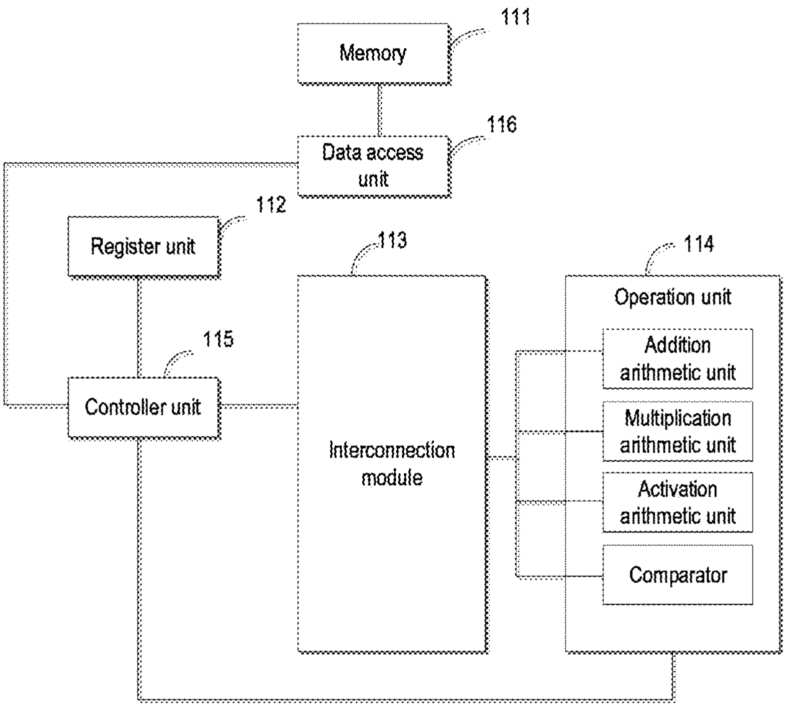
FIG. 2A is a schematic diagram of a computation device according to an example of the present disclosure.

The present disclosure provides a method of performing neural network training by an artificial neural network operation device (which is any one of the computation device of FIG. 1, a computation device of FIG. 1F, and a computation device of FIG. 2A). Specifically, the method includes the following contents.

Steps of training a neural network: performing a forward operation on each layer of a (multi-layer) neural network in sequence, then performing a backward operation in reverse order of the layers, and lastly using a gradient of a weight obtained from computation to update the weight. The steps above are a sequential iteration of neural network training, and are repeatedly performed for multiple times during an entire training process.

A backward operation of a layer: two parts of operation are required during the backward operation of each layer, where a first part is using a gradient of an output neuron and an input neuron to compute a gradient of a weight (which is to be used for updating the weight of a present layer in a step of "weight update"), and a second part is using the gradient of the output neuron and the weight to compute a gradient of the input neuron (which is to be used as a gradient of an output neuron of a next layer in the backward operation for performing the operation).

Weight update: after performing the backward operation of the neural network, the gradients of the weights of the respective layers are obtained. In this step, a first input cache and a second input cache of the device are configured to store a weight and a gradient of the weight of a present layer respectively, and then the gradient of the weight is used to update the weight in the operation unit.

When the artificial neural network operation device is a sparse neural network operation device, which means that the device includes one more mapping unit and a neural network processed by the device is a sparse neural network, a method of performing neural network training by the sparse neural network operation device includes the following three aspects.

Steps of training a neural network: performing a forward operation on each layer of a (multi-layer) neural network in sequence, then performing a backward operation in reverse order of the layers, and lastly using a gradient of a weight obtained from computation to update the weight. The steps above are a sequential iteration of neural network training, and are repeatedly performed for multiple times during an entire training process.

A backward operation of a layer: two parts of operation are required during the backward operation of each layer, where a first part is using a gradient of an output neuron which may be a sparse representation and an input neuron which may be a sparse representation to compute a gradient of a weight (which is to be used for updating the weight of a present layer in a step of "weight update"), and a second part is using the gradient the output neuron which may be a sparse representation and the weight which may be a sparse representation to compute a gradient of the input neuron (which is to be used as a gradient of an output neuron of a next layer in the backward operation for performing the operation).

Weight update: after performing the backward operation of the neural network, the gradients of the weights of the respective layers are obtained. In this step, a first input cache and a second input cache of the device are configured to store a weight and a gradient of the weight of a present layer respectively, and then the gradient of the weight is used to update the weight in the operation unit. Input neurons and output neurons mentioned in the present disclosure do not refer to neurons in an input layer and an output layer of the entire neural network. Instead, for any two adjacent layers in the network, neurons in a lower layer of the network forward operation are the input neurons, and neurons in an upper layer of the network forward operation are the output neurons. A convolution neural network is taken as an instance here. It is supposed that the convolution neural network has L layers, where K=1, 2, . . . , L−1, for a K-th layer and a K+1-th layer, the K-th layer is regarded as an input layer and neurons of the layer are the input neurons, the K+1-th layer is regarded as an output layer and neurons of the layer are the output neurons. In other words, except a top layer, each layer may be an input layer, and a lower layer of that layer is a corresponding output layer.

The above-mentioned operations all refer to operations of a neural network layer. For a multi-layer neural network, an implementation of the operations may be that, in a forward operation, after the operation of a previous layer of the artificial neural network is completed, an operation instruction of a next layer is performed by using an output neuron obtained by an operation unit as an input neuron of the next layer for operating (or some operations are performed on the output neuron before the output neuron serves as the input neuron of the next layer). At the same time, a weight is replaced with a weight of the next layer. In a backward operation, after the back operation of a previous layer of the artificial neural network is completed, an operation instruction of a next layer is performed by using an input neuron gradient obtained by an operation unit as an output neuron gradient of the next layer to for operating (or some operations are performed on the input neuron gradient before the input neuron gradient serves as the output neuron gradient of the next layer). At the same time, a weight is replaced with a weight of the next layer. As shown in FIG. 1D, dashed line arrows indicate a backward operation, and continuous line arrows indicate a forward operation.

FIG. 1E shows a format of an instruction set of a matrix operation instruction provided by the present disclosure. As shown in the figure, the operation instruction includes an opcode and at least one operation field. The opcode is for indicating a function of the operation instruction. An operation unit can perform different matrix operations by identifying the opcode. The operation field is for indicating data information of the operation instruction. The data information may be an immediate or a register number. For instance, in order to obtain a matrix, the starting address of the matrix and the length of the matrix can be obtained in the corresponding register according to the register number, then the matrix stored in the corresponding address can be obtained from the storage medium according to the starting address and the length of the matrix.

The instruction set includes operation instructions with different functions, which are the follows.

A Matrix Mult Vector (MMV) instruction: according to the instruction, the device fetches matrix data and vector data of a set length from a specified address in the memory (preferably a scratchpad memory or a scalar register), performs a matrix-multiply-vector operation in the operation unit, and writes a result back. Preferably, the computation result is written back to a specified address in the memory (preferably a scratchpad memory or a scalar register). It is worth noting that the vector can be stored in the memory (preferably a scratchpad memory or a scalar register) as a matrix of a special form (a matrix with only one row of elements).

A Vector Mult Matrix (VMM) instruction: according to the instruction, the device fetches vector data and matrix data of a set length from a specified address in the memory (preferably a scratchpad memory or a scalar register), performs a vector-multiply-matrix operation in the operation unit, and writes a result back. Preferably, the computation result is written back to a specified address in the memory (preferably a scratchpad memory or a scalar register). It is worth noting that the vector can be stored in the memory (preferably a scratchpad memory or a scalar register) as a matrix of a special form (a matrix with only one row of elements).

A Matrix Mult Scalar (VMS) instruction: according to the instruction, the device fetches matrix data of a set length from a specified address in the memory (preferably a scratchpad memory or a scalar register), fetches matrix data of a specified size from a specified address of a scalar register, and performs a scalar-multiply-matrix operation in the operation unit, and writes a result back. Preferably, the result is written back to a specified address in the memory (preferably a scratchpad memory or a scalar register). It is worth noting that the scalar register stores not only an address of the matrix but also scalar data.

A Tensor Operation (TENS) instruction: according to the instruction, the device fetches two pieces of matrix data with a specified length from two specified addresses in the memory (preferably a scratchpad memory or a scalar register), performs a tensor operation on the two pieces of matrix data in the operation unit, and writes a result back. Preferably, the result is written back to a specified address of the memory (preferably a scratchpad memory or a scalar register).

A Matrix Add Matrix (MA) instruction: according to the instruction, the device fetches two pieces of matrix data of a set length from two specified addresses in the memory (preferably a scratchpad memory or a scalar register), adds the two pieces of matrix data in the operation unit, and writes a result back. Preferably, the result is written back to a specified address in the memory (preferably a scratchpad memory or a scalar register).

A Matrix Sub Matrix (MS) instruction: according to the instruction, the device fetches two pieces of matrix data with a specified length from two specified addresses in the memory (preferably a scratchpad memory or a scalar register), performs a subtraction operation on the two pieces of matrix data in the operation unit, and writes a result back. Preferably, the result is written back to a specified address in the memory (preferably a scratchpad memory or a scalar register).

A Matrix Retrieval (MR) instruction: according to the instruction, the device fetches vector data with a specified length from a specified address in the memory (preferably a scratchpad memory or a scalar register), fetches matrix data of a specified size from a specified address in the memory; in the operation unit, the vector is an index vector, and an $i^{th}$ element of an output vector is a number obtained from an $i^{th}$ column of the matrix by using an $i^{th}$ element of the index vector as an index; and the output vector is written back to a specified address in the memory (preferably cache or scalar register file);

A Matrix Load (ML) instruction: according to the instruction, the device fetches data of a set length from an external source address to the memory (preferably a scratchpad memory or a scalar register).

A Matrix Store (MS) instruction: according to the instruction, the device stores matrix data of a set length from a specified address in the memory (preferably a scratchpad memory or a scalar register) to an external target address.

A Matrix Move (MMOVE) instruction: according to the instruction, the device moves matrix data of a set length from a specified address of the memory (preferably a scratchpad memory or a scalar register) to another specified address of the memory (preferably a scratchpad memory or a scalar register).

The set length in the instructions above can be set by users. In an optional example, users can set the length to a value. Of course, in certain cases, users may also set the length to a plurality of values. Examples of the present disclosure do not restrict the specific value and count of the length. In order to describe the purposes, technical schemes, and technical effects of the present disclosure clearer, the present disclosure will be described hereinafter with reference to examples and drawings.

FIG. 1F shows another computation device 50 according to an example of the present disclosure. As shown in FIG. 1F, the computation device 50 includes: a memory 501, a scalar data storage unit 502 (preferably a scalar register unit), a matrix computation unit 503, and a control unit 504.

The memory 501 is configured to store a matrix.

The scalar data storage unit 502 is configured to store scalar data, where the scalar data includes at least a storage address of the matrix in the memory.

The control unit 504 is configured to control the matrix computation unit to obtain a first operation instruction, where the first operation instruction includes a matrix reading order required for executing the instruction.

The operation unit 503 is configured to send a reading command to the memory according to the matrix reading order, obtain the matrix corresponding to the matrix reading order by reading in batches, and perform the first operation instruction on the matrix.

Optionally, the matrix reading order includes: a storage address of the matrix or an identifier of the matrix required by the instruction.

Optionally, when the matrix reading order is for the identifier of the matrix required by the instruction, the control unit 504 is configured to control the operation unit to read a storage address corresponding to the identifier from a register unit according to the identifier by means of reading in units, and control the operation unit to send a reading command for reading the storage address to the memory and obtain the matrix by means of reading in batches.

Optionally, the operation unit 503 is configured to perform a computation of a first pipeline stage on the matrix to obtain a first result, input the first result into a second pipeline stage, perform a computation of the second pipeline stage to obtain a second result, and input the second result into a third pipeline stage, perform a computation of the third pipeline stage to obtain a third result. After performing computations of pipeline stages in a stage by stage manner, the operation unit 502 is configured to input an n−1$^{th}$ result to an n$^{th}$ pipeline stage, perform a computation of the n$^{th}$ pipeline stage to obtain an n$^{th}$ result, and input the n$^{th}$ result to the memory. n may be an integer greater than or equal to 2.

Optionally, the computation device further includes:

a caching unit 505 configured to store an operation instruction to be executed.

The control unit 504 is configured to cache the operation instruction to be executed in the caching unit 505.

Optionally, the control unit 504 is configured to determine whether a first operation instruction and a second operation instruction preceding the first operation instruction are associated. If the first operation instruction and the second operation instruction are associated, the control unit 504 is configured to cache the first operation instruction. After the second operation instruction is completed, the first operation instruction is then fetched from the caching unit and transferred to the operation unit.

A method of determining whether the first operation instruction and the second operation instruction preceding the first operation instruction are associated may be:

fetching a first storage address range of a required matrix of the first operation instruction according to the first operation instruction, and fetching a second storage address range of a required matrix of the second operation instruction according to the second operation instruction; if there is an overlap between the first storage address range and the second storage address range, then determining that the first operation instruction and the second operation instruction are associated; if there is no overlap between the first storage address range and the second storage address range, then determining that the first operation instruction and the second operation instruction are not associated.

Optionally, the control unit 503 may be configured to obtain the operation instruction from the instruction caching unit, process the operation instruction, and provide the operation instruction to the operation unit. The control unit 503 may be divided into three modules: an instruction fetching module 5031, a decoding module 5032, and an instruction queue module 5033.

The instruction fetching module 5031 is configured to obtain the operation instruction from the instruction caching unit.

The decoding module 5032 is configured to decode the obtained operation instruction.

The instruction queue module 5033 is configured to sequentially store decoded operation instructions. Considering that different instructions may have dependencies on the included register, the instruction queue module 5033 is configured to cache the decoded instructions and issue the instructions when the dependencies are satisfied.

FIG. 1D is a flowchart of a matrix-multiply-vector instruction executed by a computation device according to an example of the present disclosure. A hardware structure of the computation device is illustrated in FIG. 1C. In the present example, the memory shown in FIG. 1C is a scratchpad memory. In this case, a process of executing a matrix-multiply-vector instruction shown in FIG. 1D includes:

a step S601, controlling, by the computation device, the instruction fetching module to fetch a matrix-multiply-vector instruction, and sending the matrix-multiply-vector instruction to the decoding module;

a step S602, decoding the matrix-multiply-vector instruction by the decoding module, and sending the matrix-multiply-vector instruction to the instruction queue;

a step S603, in the instruction queue, the matrix-multiply-vector instruction needs to obtain data in the scalar register corresponding to five operation fields in the instruction from the scalar register, where the data includes an input vector address, an input vector length, an input matrix address, an output vector address, and an output vector length;

a step S604, determining, by the control unit, whether the matrix-multiply-vector instruction and an operation instruction before the matrix-multiply-vector instruction are associated, if they are associated, storing the matrix-multiply-vector instruction in the caching unit, if they are not associated, transferring the matrix-multiply-vector instruction to the operation unit;

a step S605, fetching, by the operation unit, data of required matrix and vector from the scratchpad memory according to the data in the scalar register corresponding to the five operation fields, and then completing a multiplication operation in the operation unit; and a step S606, after the operation unit completes the operation, writing a result to a specified address in the memory (preferably a scratchpad memory or a scalar register), and submitting the matrix-multiply-vector instruction in the reordering cache.

In an example, the matrix operation instruction shown in FIG. 1C is a matrix-multiply-vector instruction. In a certain application, the matrix-multiply-vector instruction in the example shown in FIG. 1C may be replaced by: a vector-multiply-matrix instruction, a matrix-multiply-scalar instruction, a tensor operation instruction, a matrix addition instruction, a matrix subtraction instruction, a matrix retrieving instruction, a matrix loading instruction, a matrix saving instruction, or a matrix moving instruction, which is not explained in detail here.

FIG. 2A provides yet another computation device. The device includes a memory 111 (optional), a register unit 112, an interconnection module 113, an operation unit 114, a controller unit 115, and a data access unit 116.

The operation unit 114 may include at least two of the following: an addition arithmetic unit, a multiplication arithmetic unit, a comparator, and an activation arithmetic unit.

The interconnection module 113 is configured to control a connection relationship of the arithmetic units in the operation unit 114 so that the at least two arithmetic units form a different computation topology.

The register unit 112 is configured to store an operation instruction, an address of a data block in the storage medium, and a computation topology corresponding to the operation instruction.

The operation instruction may include an operation field and an opcode. Taking a convolution operation instruction as an example, as shown in a Table 1, register 0, register 1, register 2, register 3, and register 4 may be operation fields.

In an optional example, the above-mentioned first computation topology may be: the multiplication arithmetic unit–the addition arithmetic unit–the addition arithmetic unit–the activation arithmetic unit.

The operation instruction may be stored in the storage medium, and the above-mentioned execution operation instruction may be executed by the operation unit.

A computation method of the computation device shown in FIG. 2A is explained below based on different operation instructions.

As an instance, the operation instruction may be a convolution operation instruction. The convolution operation instruction can be applied to a neural network, so the convolution operation instruction may also be called a convolution neural network. For the convolution operation instruction,

| Opcode | Register 0 | Register 1 | Register 2 | Register 3 | Register 4 |
|---|---|---|---|---|---|
| COMPUTE | starting address of input data | length of input address | starting address of convolution kernel | length of convolution kernel | address of an activation function interpolation table |
| IO | address of an external memory of data | data length | address of an internal memory of data | | |
| NOP | | | | | |
| JUMP | target address | | | | |
| MOVE | input address | data size | output address | | |

a formula to be performed may be $s=s(\Sigma wx_i+b)$, in other words, to multiply a convolution kernel w (may include plurality pieces of data) by Xi, find a sum, optionally add a bias b, optionally perform an activation operation s(h), and at last obtain a final output result S. According to the formula, the computation topology may be obtained, in other words, the multiplication arithmetic unit–the addition arithmetic unit–the activation arithmetic unit.

The memory 111 may be an off-chip memory. In a certain application, the memory may also be an on-chip memory. The on-chip memory may be a cache. The cache may be a scratchpad for storing a data block. The data block may be n-dimensional data, where n is an integer greater than or equal to 1. For instance, when n=1, the data block is one-dimensional data, in other words, a vector; when n=2, the data is two-dimensional data, in other words, a matrix; and when n=3 or a number greater than 3, the data block is multi-dimensional data.

The controller unit 115 is configured to fetch the operation instruction, an operation field corresponding to the operation instruction, and a first computing topology corresponding to the operation instruction from the register unit 112, and decode the operation instruction into an execution instruction. The execution instruction is for controlling the operation unit to perform an operation and transferring the operation field to the data access unit 116.

The data access unit 116 is configured to fetch the data block corresponding to the operation field from the memory 111 and transfer the data block to the operation unit 114.

The interconnection module 113 is configured to receive the data block and send the data block to the operation unit 114.

The operation unit 114 is configured to call an arithmetic unit of the operation unit 114 according to the execution instruction to perform an operation on the data block to obtain an operation result, then transfer the operation result to the data access unit and store the result in the memory. In an example, the operation unit 114 is configured to call the arithmetic unit according to the first computation topology and the execution instruction to perform an operation on the data block to obtain an operation result, transfer the operation result to the data access unit, and store the result in the memory.

The above-mentioned convolution operation instruction may include an instruction set. The instruction set includes: a convolution neural network instruction, a conv COMPUTE instruction and a CONFIG instruction of a convolution neural network with different functions, an IO instruction, an NOP instruction, a JUMP instruction and a MOVE instruction. In an example, the conv COMPUTE instruction includes the followings.

A convolution neural network instruction: according to the instruction, the device takes input data and a convolution kernel of a specified size from a specified address in the memory (preferably a scratchpad memory or a scalar register file), and performs a convolution operation in a convolution operating component to obtain an output result directly. In this case, the instruction does not perform a subsequent operation, but directly performs a convolution operation to obtain an output result.

A convolution neural network conv sigmoid instruction: according to the instruction, the device takes input data and a convolution kernel of a specified size from a specified address in a scratchpad memory (preferred), performs a convolution operation in a convolution operating component, and then performs sigmoid activation on an output result. The above-mentioned specified size may be set by the manufacturers or users.

A convolution neural network conv Tan H instruction: according to the instruction, the device takes input data and a convolution kernel of a specified size from a specified address in a scratchpad memory respectively, performs a convolution operation in the convolution operating component, and then performs Tan H activation on an output result.

A convolution neural network conv ReLU instruction: according to the instruction, the device takes out input data and a convolution kernel of a specified size from a specified address in the scratchpad memory, and performs a convolution operation in a convolution operating component, and then performs ReLU activation on an output result.

A convolution neural network conv group instruction: according to the instruction, the device takes input data and a convolution kernel of a specified size from a specified address in a scratchpad memory, divides the input data and the convolution kernel into groups, performs a convolution operation in a convolution operating component, and then performs activation on an output result.

A convolution operation instruction: according to the instruction, the device takes input data and a convolution kernel of a specified size from a specified address in the memory (preferably a scratchpad memory), and performs a convolution operation in a convolution operating component. The above-mentioned specified size may be set by the users or manufacturers. For instance, in a computation device of a first manufacturer, the specified size may be set to data of A bit, and in a computation device of a second manufacturer, the specified size may be set to data of B bit. The data of A bit and the data of B bit have different sizes.

The COMPUTE instruction may also include other operation instructions for performing non-linear activation and linear activation operations. In one example, a convolution activation CONV_ACTIVATE instruction includes:

a convolution activation instruction. According to the instruction, the device takes out input data and a convolution kernel of a specified size from a specified address in the scratchpad memory (preferred), performs a convolution operation in a convolution operating component, and then perform an activation function operation on an output result. The above-mentioned specified size may be set by the manufacturers or users. The activation function active is any one of the following non-linear functions: sigmoid, tan h, relu, softmax, or a linear function.

Figure 2B:
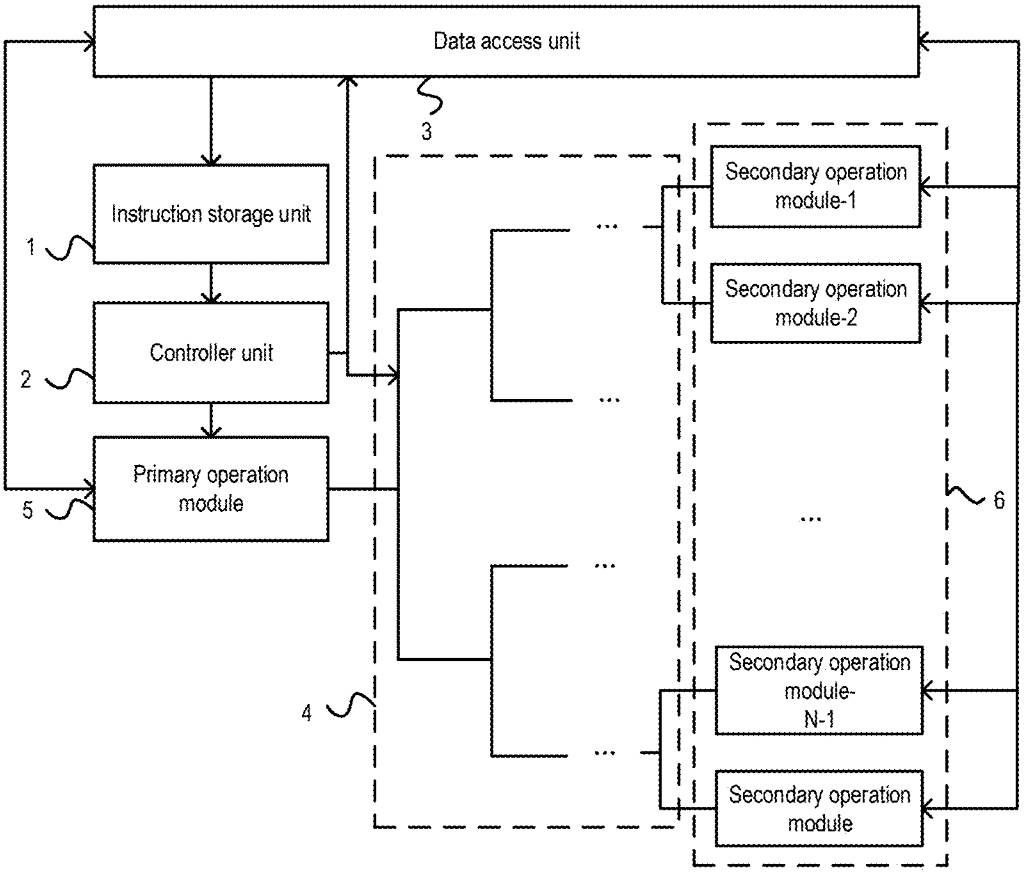
FIG. 2B is a schematic diagram of an interconnection module according to an example of the present disclosure.
Figure 2C:
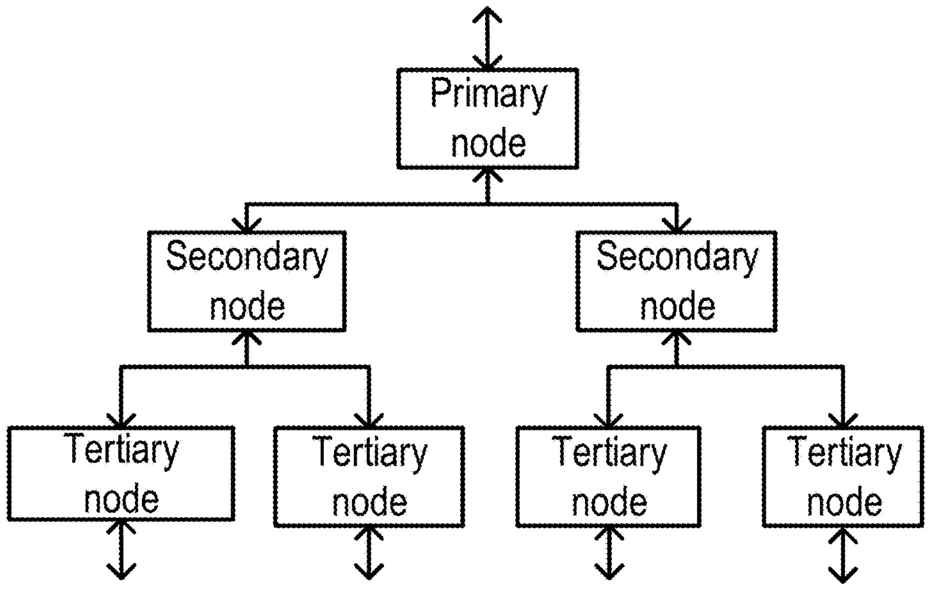
FIG. 2C is a schematic diagram of a primary operation module in a device for performing a forward operation of a convolution neural network according to an example of the present disclosure.

FIG. 2B schematically shows an example of the interconnection module 113, which is a tree module. The tree module 4 acts as a data path between a primary operation module 5 and a plurality of secondary operation modules 6, and has a tree structure. Optionally, the tree module may have an n-ary tree structure, such as a binary tree path shown in FIG. 39. Each node can send data received from an upstream node to two downstream nodes, and merge data returned by the two downstream nodes and return to an upstream node. For instance, at the beginning of a computational phase of each layer of an artificial neural network, neuron data in the primary operation module 5 may be in a discrete representation or a non-discrete representation. The neuron data is sent to each secondary operation module 6 through the tree module 4. When secondary operation modules 6 finish computing, neuron values of the respective secondary operation modules are spliced stage-by-stage into a complete vector of neurons, which is an intermediate result vector, in the tree module For an operation of a discrete data representation, please refer to FIG. 44, an operation module dedicated to discrete data operations are included in the primary-secondary operation module. A fully connected layer of a neural network is used for explanation here. It is assumed that there are N secondary operation modules in the device, the intermediate result vector is segmented by N, where each segment includes N elements. An $i^{th}$ secondary operation module computes an $i^{th}$ element of each segment. The N elements are spliced into a vector with a length of N through the tree module and returned to the primary operation module. Therefore, if the network has only N output neurons, each secondary operation unit only needs to output a single neuron value. If the network has m*N output neurons, each secondary operation unit needs to output m neuron values. The tree module supports a discrete data representation in the process of data storing and transferring.

Figure 2D:
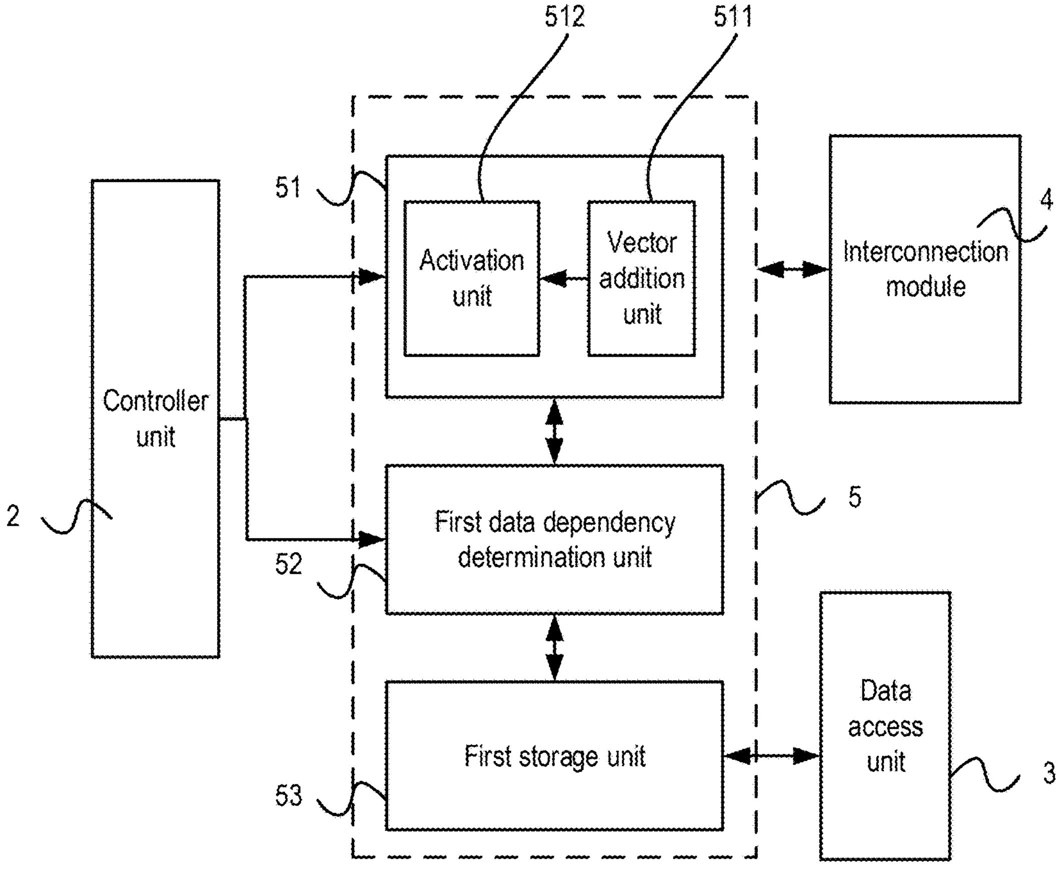
FIG. 2D is a schematic diagram of a secondary operation module in a device for performing a forward operation of a convolution neural network according to an example of the present disclosure.

FIG. 2D is a block diagram of a structure of the primary operation module 5 in the device for performing a forward operation of a convolution neural network according to an example of the present disclosure. As shown in FIG. 2D, the primary operation module 5 includes a first operation unit 51, a first data dependency determination unit 52, and a first storage unit 53.

The first operation unit 51 includes a vector addition unit 511 and an activation unit 512. The first operation unit 51 is configured to receive a control signal from the controller unit and complete various operational functions of the primary operation module 5. The vector addition unit 511 is configured to perform an operation of adding a bias in the forward computation of the convolution neural network. The first operation unit 51 performs element-wise addition on biased data and the intermediate results to obtain a bias result. The activation operation unit 512 performs an activation function operation on the bias result. The biased data may be read in from external address space, or may be stored locally.

The data dependency determination unit 52 is a port for the first operation unit 51 to read/write the first storage unit 53, so as to ensure consistency in reading data from and writing data to the first storage unit 53. At the same time, the first data dependency determination unit 52 is also configured to send data read from the first storage unit 53 to the secondary operation modules through the interconnection module 4. Output data of the secondary operation modules 6 is directly sent to the first operation unit 51 through the interconnection module 4. An instruction output by the controller unit 2 is sent to the operation unit 51 and the first data dependency determination unit 52 to control their behavior.

The storage unit 53 is configured to cache input data and output data used by the primary operation module 5 during a computation process.

FIG. 2D is a block diagram of a structure of a secondary operation module 6 in the device for performing a forward operation of a convolution neural network according to an example of the present disclosure. As shown in FIG. 2B, each secondary operation module 6 includes a second operation unit 61, a data dependency determination unit 62, a second storage unit 63, and a third storage unit 64.

The second operation unit 61 is configured to receive a control signal from the controller unit 2 and perform a convolution operation. The second operation unit includes a vector multiplication unit 611 and an accumulation unit 612, which are respectively responsible for a vector multiplication operation and an accumulation operation in a convolution operation.

The second data dependency determination unit 62 is responsible for reading and writing the second storage unit 63 during a computation process. Before performing read and write operations, the second data dependency determination unit 62 first ensures that there is no consistency conflict between the reading and writing of data used by instructions. For instance, all control signals sent to the data dependency unit 62 are stored in the instruction queue inside the data dependency unit 62. In this queue, if a range of data to be read by a reading instruction conflicts with a range of data to be written by a writing instruction that is located at the front of the queue, the instruction can only be executed until a writing instruction depended by the instruction has been executed.

The second storage unit 63 is configured to cache input data and output scalar data of the secondary operation modules 6.

The third storage unit 64 is configured to cache convolution kernel data required by the secondary operation modules 6 in a computation process.

An example of the present disclosure provides a stream execution method, which can be applied to aspects of neural networks such as speech recognition, image processing, data analysis, advertising recommendation systems, and automatic driving. By simplifying an instruction descriptor stream in a neural network operation, redundant operations may be reduced, which may improve the operation speed of a neural network processor.

The stream execution method provided by the example of the present disclosure may be executed by the computation device shown in FIG. 2A. The computation device shown in FIG. 2A may execute the stream execution method of a convolution operation instruction. Of course, the above-mentioned stream execution method may also be executed by the computation device shown in FIG. 1F. The computation shown in FIG. 1F can execute a stream execution method of a data block and a scalar. In certain application, the stream execution method can also be executed by the computation device shown in FIG. 1. The computation device shown in FIG. 1 can execute a stream execution method of a matrix operation instruction or a vector operation. In an operation device that needs to generate a plurality of instructions according to a neural network structure, the stream execution method provided by the example of the present disclosure needs to generate a complete instruction stream for the neural network structure so as to call a neural network processor for operation. The process of generating an instruction stream according to the neural network structure can be optimized by using the method of stream execution. In this way, an instruction stream that is more suitable for the network structure and faster in operation speed may be obtained. The stream execution method may be a method of performing a plurality of operation instructions by a computation device capable of processing a plurality of instructions. The plurality of operation instructions include but are not limited to: neural network operation instructions, matrix operation instructions, vector operation instructions, and the like. The computation device capable of processing a plurality of instructions includes, but is not limited to: a forward operation device, a backward operation device, a device including a plurality of pipeline stage computation units, and the like. Of course, the above stream execution method may also be realized in a technical solution of a multi-core processing device or a technical solution of multi-processor cooperation. For instance, a data distribution device including one or more central nodes and one or more leaf nodes. Of course, the description above is only for illustration. The stream execution method provided by the example of the present disclosure does not limit the combination of the above-mentioned device, structure, and method.

Figure 4:
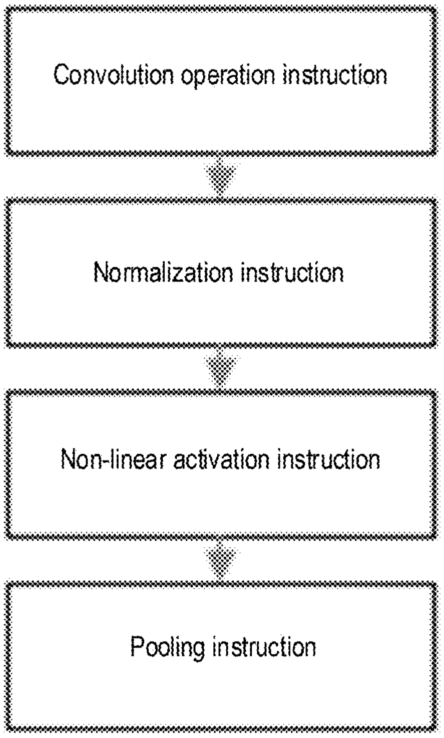
FIG. 4 is a schematic diagram of operation instruction acquisition according to an example of the present disclosure.
Figure 4A:
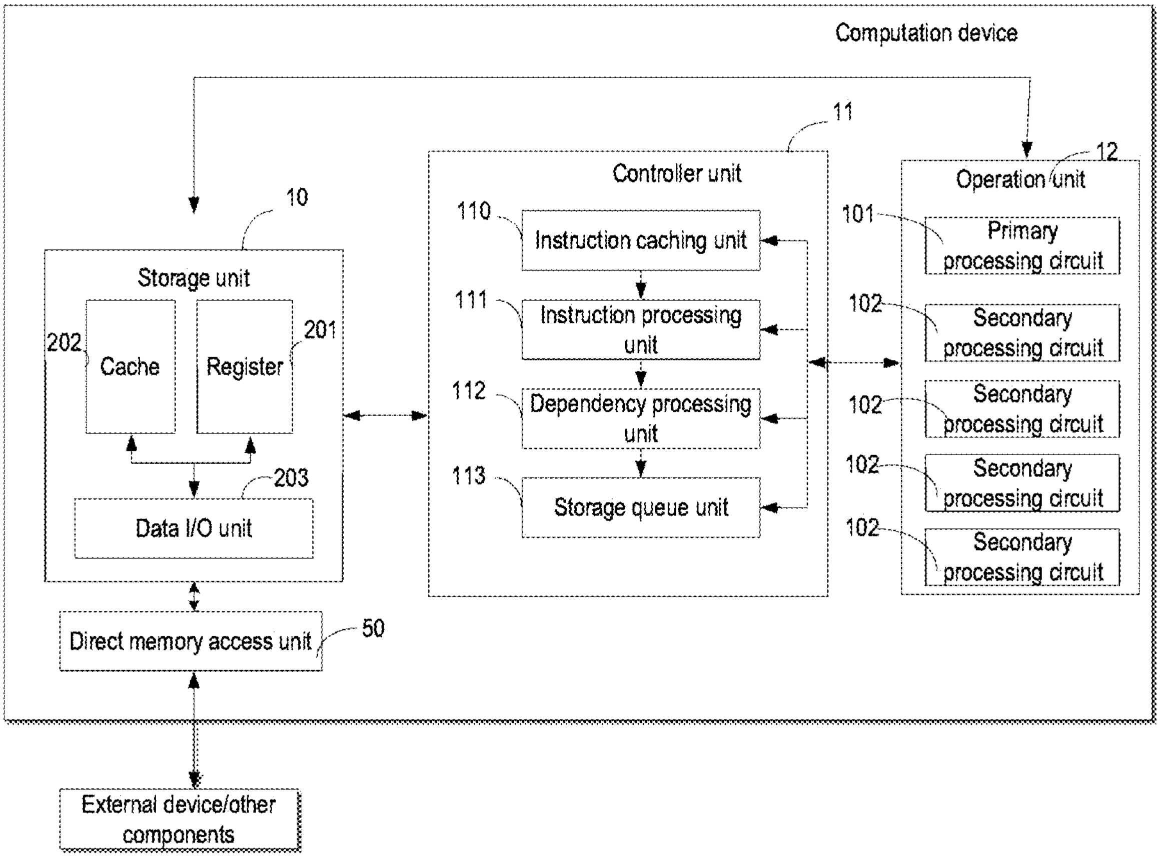
FIG. 4A is a structural diagram of a computation device according to an example of the present disclosure.

FIG. 4A provides a computation device for performing machine learning computations. The computation device includes: a controller unit 11 and an operation unit 12. The controller unit 11 is connected to the operation unit 12. The operation unit 12 includes: a primary processing circuit and a plurality of secondary processing circuits.

The controller unit 11 is configured to obtain input data and a computation instruction. In an optional solution, the input data and the computation instruction may be obtained through a data input/output unit. The data input/output unit may be one or a plurality of data I/O interfaces or I/O leads.

The computation instruction includes but is not limited to: a forward operation instruction or a backward training instruction, or another neural network operation instruction such as a convolution operation instruction. Examples of the present disclosure do not restrict a specific form of the computation instruction.

The controller unit 11 is further configured to parse the computation instruction to obtain a plurality of operation instructions, and send the plurality of operation instructions and the input data to the primary processing circuit.

The primary processing circuit 101 is configured to preprocess the input data, and transfer data and operation instructions to the plurality of secondary processing circuits.

The plurality of secondary processing circuits 102 are configured to perform intermediate operations in parallel according to the data and the operation instructions transferred by the primary processing circuit to obtain a plurality of intermediate results, and transfer the plurality of intermediate results to the primary processing circuit.

The primary processing circuit 101 is further configured to post-process the plurality of intermediate results to obtain a computation result of the computation instruction.

In the technical solution provided by the present disclosure, the operation units are arranged according to a structure of one primary unit and a plurality of secondary units. For a computation instruction of a forward operation, data may be partitioned according to the computation instruction of the forward operation, so that a part of the data requiring a large amount of computation may be computed in parallel by the plurality of secondary processing circuits. In this way, the operation speed may be improved, and the operation time be saved, which may further reduce the power consumption.

Optionally, the machine learning computations may include: artificial neural network operations. The input data may include: input neuron data and weight data. The computation result may be: a result of the artificial neural network operation, which is output neuron data.

The neural network operations may be an operation of a neural network layer. For a multi-layer neural network, an implementation of the operations may be that, in a forward operation, after the operation of a previous layer of the artificial neural network is completed, an operation instruction of a next layer is performed by using an output neuron obtained by an operation unit as an input neuron of the next layer for operating (or some operations are performed on the output neuron before the output neuron serves as the input neuron of the next layer). At the same time, a weight is replaced with a weight of the next layer. In a backward operation, after the back operation of a previous layer of the artificial neural network is completed, an operation instruction of a next layer is performed by using an input neuron gradient obtained by an operation unit as an output neuron gradient of the next layer to for operating (or some operations are performed on the input neuron gradient before the input neuron gradient serves as the output neuron gradient of the next layer). At the same time, a weight is replaced with a weight of the next layer.

The machine learning computations may also include support vector machine operations, k-nearest neighbor (k-nn) operations, k-means operations, principal component analysis operations, and so on. For the convenience of description, an artificial neural network operation is taken as an instance to illustrate a machine learning computation scheme.

If the artificial neural network operation is a multi-layer operation, input neurons and output neurons of the multi-layer operation do not refer to neurons in an input layer and in an output layer of the entire neural network. For any two adjacent layers in the network, neurons in a lower layer of the network forward operation are the input neurons, and neurons in an upper layer of the network forward operation are the output neurons. A convolution neural network is taken as an instance here. It is supposed that the convolution neural network has L layers, where K=1, 2, . . . , L−1, for a K-th layer and a K+1-th layer, the K-th layer is regarded as an input layer and neurons of the layer are the input neurons, the K+1-th layer is regarded as an output layer and neurons of the layer are the output neurons. In other words, except a top layer, each layer may be an input layer, and a lower layer of that layer is a corresponding output layer.

Optionally, the computation device may further include: a storage unit 10 and a direct memory access unit 50. The storage unit 10 may include one or more of a register and a cache. Specifically, the cache is configured to store the computation instruction. The register is configured to store the input data and a scalar. The cache is a scratchpad memory. The direct memory access unit 50 is configured to read data from or store data in the storage unit 10.

Optionally, the controller unit includes an instruction storage unit 110, an instruction processing unit 111, and a storage queue unit 113, where the instruction storage unit 110 is configured to store a computation instruction associated with the artificial neural network operations;

the instruction processing unit 111 is configured to parse the computation instruction to obtain a plurality of operation instructions; and the storage queue unit 113 is configured to store an instruction queue that includes a plurality of operation instructions or computation instructions that are to be performed and are sorted in sequential order.

For instance, in an optional technical solution, a primary operation processing circuit may include a controller unit, where the controller unit may include a primary instruction processing unit configured to decode an instruction to a micro-instruction. In another optional technical solution, a secondary operation processing circuit may include another controller unit, where the another controller unit includes a secondary instruction processing unit configured to receive and process the micro-instruction. The micro-instruction may be an instruction in a next level of the instruction. The micro-instruction may be obtained by partitioning or decoding the instruction, and may be further decoded into control signals for each component, each unit, or each processing circuit.

As an optional example, the table below shows a structure of the computation instruction.

| opcode | register or immediate | register/immediate | . . . |
|---|---|---|---|

The ellipses in the table above indicate that a plurality of registers or immediates may be included.

In another optional example, the computation instruction may include one or a plurality of operation fields and one opcode. The computation instruction may include a neural network operation instruction. Taking a neural network operation instruction as an instance, as shown in the table 1, register number 0, register number 1, register number 2, register number 3, and register number 4 may be operation fields. Register number 0, register number 1, register number 2, register number 3, and register number 4 may be the numbers of one or a plurality of registers.

| opcode | register number 0 | register number 1 | register number 2 | register number 3 | register number 4 |
|---|---|---|---|---|---|
| COMPUTE | starting address of input address | length of input address | starting address of weight | length of weight | address of an activation function interpolation table |
| IO | address of an external memory of data | data length | address of an internal memory of data | | |
| NOP | | | | | |
| JUMP | target address | | | | |
| MOVE | input address | data size | output address | | |

The register may be an off-chip memory. In a real application, the register may also be an on-chip memory for storing data. The data may be n-dimensional data, where n is an integer greater than or equal to 1. For instance, when n=1, the data is one-dimensional data, in other words, a vector, when n=2, the data is two-dimensional data, in other words, a matrix, and when n=3 or above 3, the data is multi-dimensional tensor.

Optionally, the controller unit may further include:

a dependency processing unit 108 configured to, when a plurality of operation instructions exist, determine whether a first operation instruction and a zero-th operation instruction preceding the first operation instruction are associated. If the first operation instruction and the zero-th operation instruction are associated, the dependency processing unit 108 is further configured to cache the first operation instruction in the instruction storage unit, and after the zero-th operation instruction is completed, fetch the first operation instruction from the instruction storage unit and transfer the first operation instruction to the operation unit.

A method of determining whether the first operation instruction and the zero-th operation instruction preceding the first operation instruction are associated may include:

fetching a first storage address range of required data (such as a matrix) of the first operation instruction according to the first operation instruction, and fetching a zero-th storage address range of a required matrix of the zero-th operation instruction according to the zero-th operation instruction; if there is an overlap between the first storage address range and the zero-th storage address range, then determining that the first operation instruction and the zero-th operation instruction are associated; if there is no overlap between the first storage address range and the zero-th storage address range, then determining that the first operation instruction and the second operation instruction are not associated.

Figure 4B:
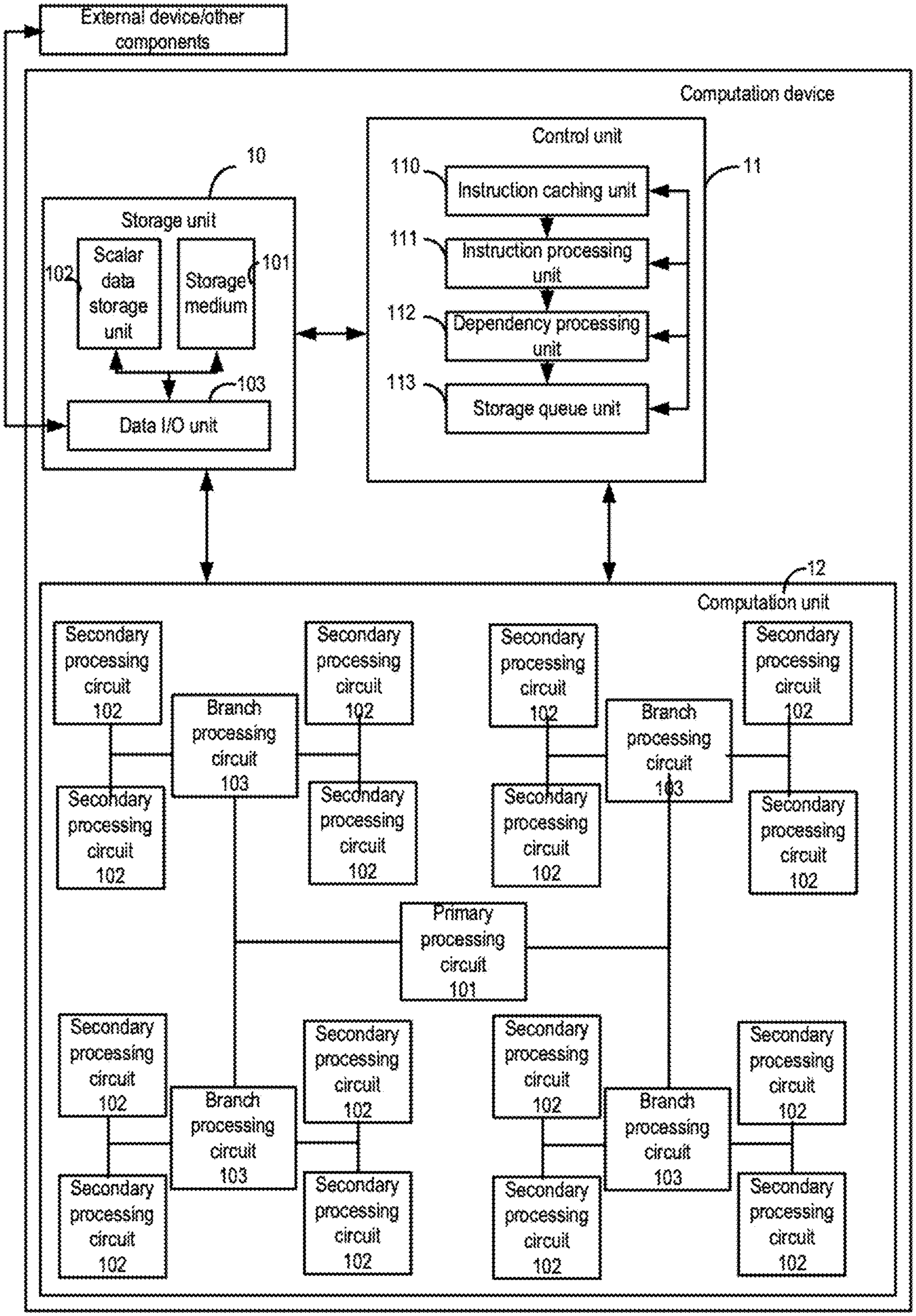
FIG. 4B is a structural diagram of a computation device according to an example of the present disclosure.
Figure 4C:
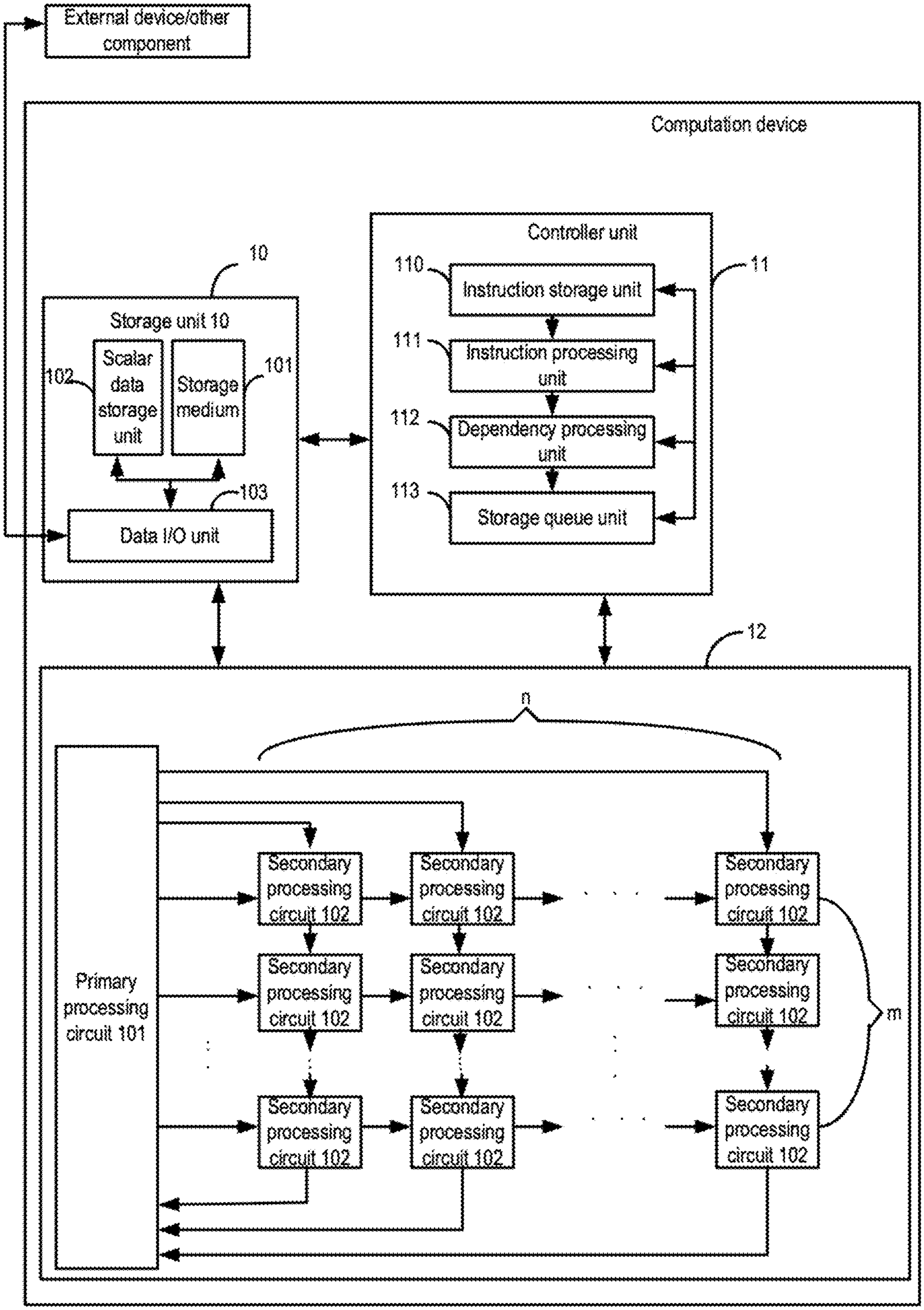
FIG. 4C is a structural diagram of a computation device according to another example of the present disclosure.

In another optional example, as shown in FIG. 4C, the operation unit 12 may include one primary processing circuit 101 and a plurality of secondary processing circuits 102. In an example, as shown in FIG. 4C, the plurality of secondary processing circuits are arranged in the form of an array. Each secondary processing circuit is connected to another adjacent secondary processing circuit, and the primary processing circuit is connected to k secondary processing circuits of the plurality of secondary processing circuits, where the k secondary processing circuits are: n secondary processing circuits in a first row, n secondary processing circuits in an $m^{th}$ row, and m secondary processing circuits in a first column. It should be explained that, as shown in FIG. 4C, the k secondary processing circuits only include n secondary processing circuits in the first row, n secondary processing circuits in the $m^{th}$ row, and m secondary processing circuits in the first column. In other words, the k secondary processing circuits are secondary processing circuits that are connected to the primary processing circuit directly in the plurality of secondary processing circuits.

The k secondary processing circuits are configured to forward data and instructions between the primary processing circuit and the plurality of secondary processing circuits.

Figure 4D:
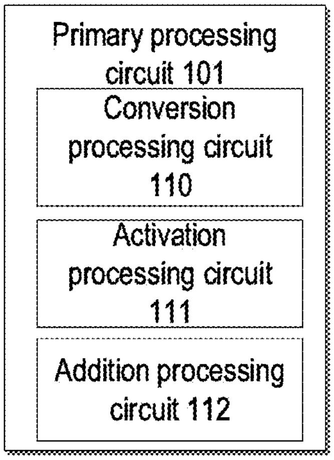
FIG. 4D is a structural diagram of a primary processing circuit according to an example of the present disclosure.

Optionally, as shown in FIG. 4D, the primary processing circuit further includes: one or more of a conversion processing circuit 110, an activation processing circuit 111, and an addition processing circuit 112.

The conversion processing circuit is configured to perform an interconversion between a first data structure and a second data structure (e.g., an interconversion between continuous data and discrete data) on a data block or an intermediate result received by the primary processing circuit, or the conversion processing circuit is configured to perform an interconversion between a first data type and a second data type (e.g., an interconversion between a fixed-point type and a floating-point type) on a data block or an intermediate result received by the primary processing circuit.

The activation processing circuit 111 is configured to perform an activation operation on data in the primary processing circuit.

The addition processing circuit 112 is configured to perform an addition operation or accumulation operation.

The primary processing circuit is configured to determine the input neuron as data for broadcasting, the weight data as data for distribution, divide the data for distribution into a plurality of data blocks, and send at least one of the data blocks and at least one operation instruction of a plurality of operation instructions to the secondary processing circuits.

The plurality of secondary processing circuits are configured to perform operations on received data blocks according to the operation instruction to obtain intermediate results, and transfer the operation results to the primary processing circuit.

The primary processing circuit is configured to process intermediate results sent from the plurality of processing circuits to obtain a result of the computation instruction, and send the result of the computation instruction to the controller unit.

The secondary processing circuit includes a multiplication processing circuit.

The multiplication processing circuit is configured to perform a product operation on the received data block to obtain a product result.

A forwarding processing circuit (optional) is configured to forward the received data block or the product result.

An accumulation processing circuit is configured to accumulate the product results to obtain the intermediate results.

In another example, the operation instruction may be a computation instruction such as a matrix-multiply-matrix instruction, an accumulation instruction, an activation instruction, and the like.

A computation method of the computation device shown in FIG. 4A will be explained based on a neural network operation instruction. A formula to be perform by the neural network operation instruction may be: $s=s(\Sigma wx_i+b)$, in other words, to multiply a weight w by input data $x_i$, find the sum, add a bias b, perform an activation operation s(h), and obtain a final output result S.

Figure 4E:
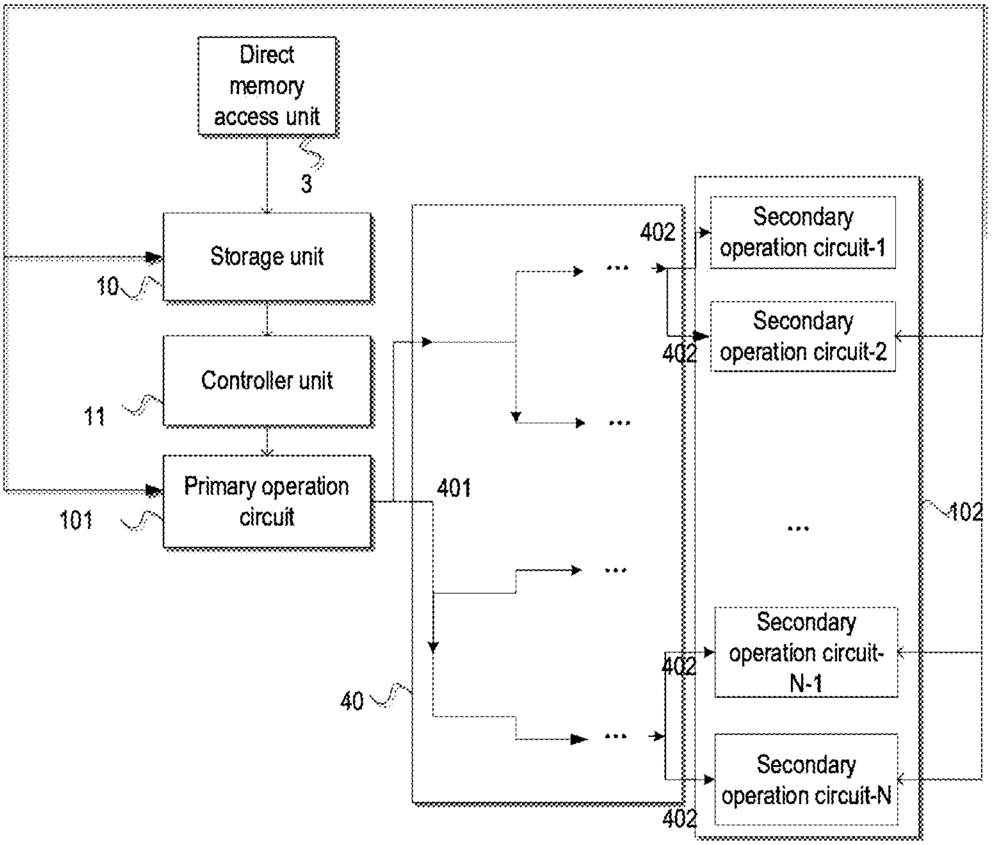
FIG. 4E is a structural diagram of another computation device according to an example of the present disclosure.

As an optional example, as shown in FIG. 4E, the operation unit further includes: a tree module 40. The tree module includes: a root port 401 and a plurality of branch ports 404. The root port of the tree module is connected to the primary processing circuit, and each of the plurality of branch ports of the tree module is connected to one secondary processing circuit of the plurality of secondary processing circuits.

The tree module has receiving and transferring functions. For instance, the tree module shown in FIG. 4E has a transferring function. The tree module shown in FIG. 41 has a receiving function.

The tree module is configured to forward a data block, a weight, and an operation instruction between the primary processing circuit and the plurality of secondary processing circuits.

Optionally, the tree module is an optional structure of the computation device. The tree module may include at least one layer of nodes, where the nodes are line-structured with a forwarding function, and the nodes may not have a computation function. If the tree module has zero layer of nodes, the tree module may be unnecessary.

Figure 4F:
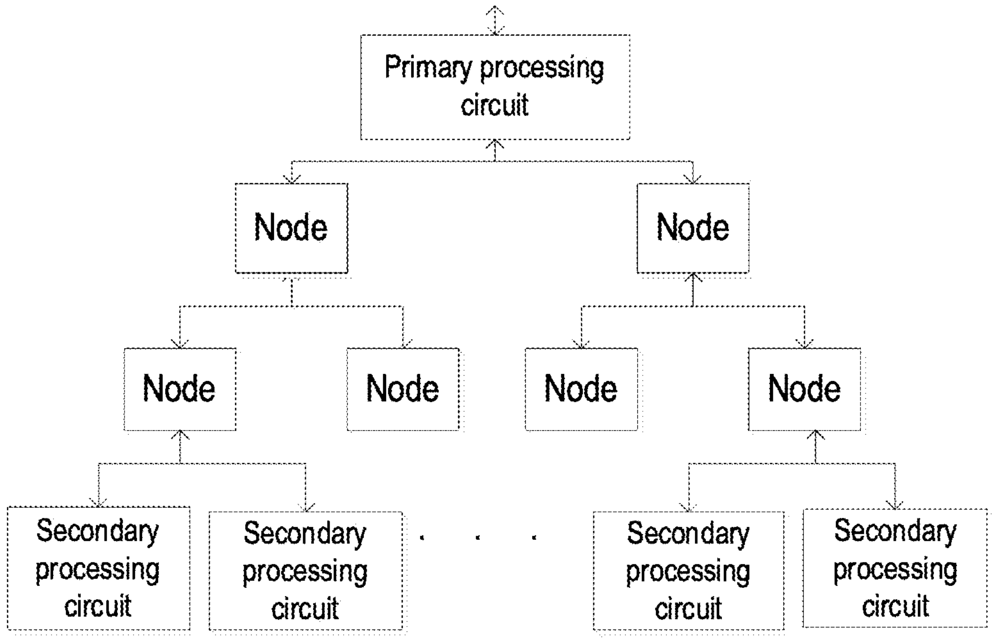
FIG. 4F is a structural diagram of a tree module according to an example of the present disclosure.

Optionally, the tree module may has an n-ary tree structure, for instance, a binary tree structure shown in FIG. 4F. The tree module may also be a ternary tree structure, where n may be an integer greater than or equal to 2. Examples of the present disclosure do not restrict a specific value of n. The count of layers may be 2, and the secondary processing circuits may be connected to nodes of layers except a second-to-last layer. For instance, the secondary processing circuits may be connected to nodes of a last layer shown in FIG. 4F.

Figure 4G:
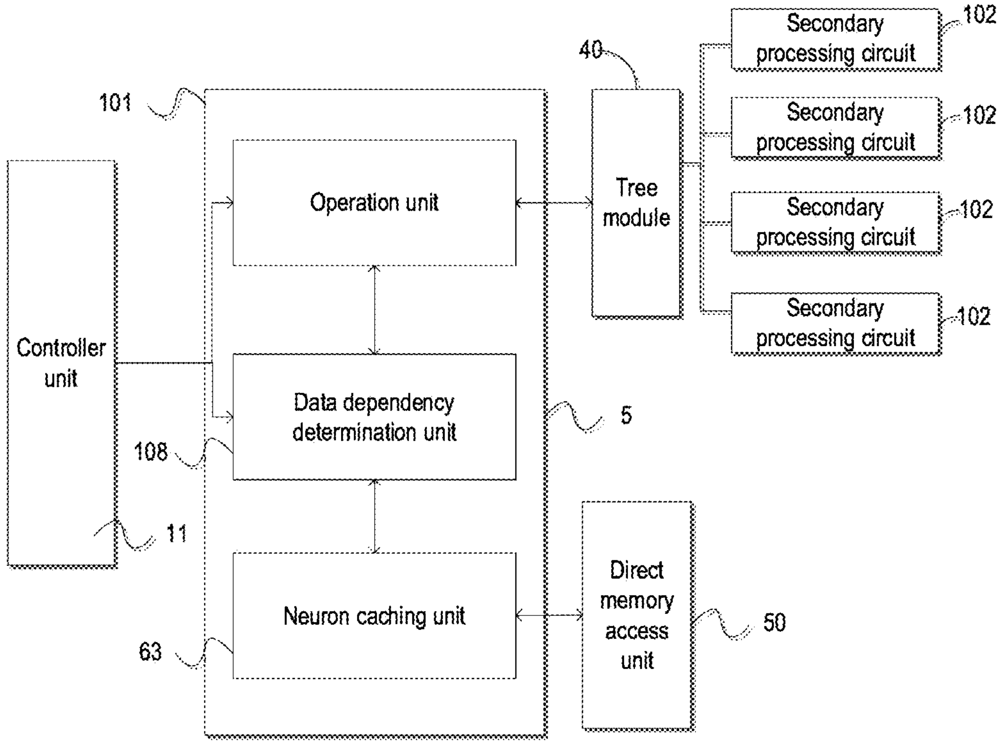
FIG. 4G is a structural diagram of yet another computation device according to an example of the present disclosure.

Optionally, the operation unit may have an independent cache. As shown in FIG. 4G, the operation unit may include: a neuron caching unit. The neuron caching unit 63 is configured to cache input neuron vector data and output neuron value data of the secondary processing circuits.

Figure 4H:
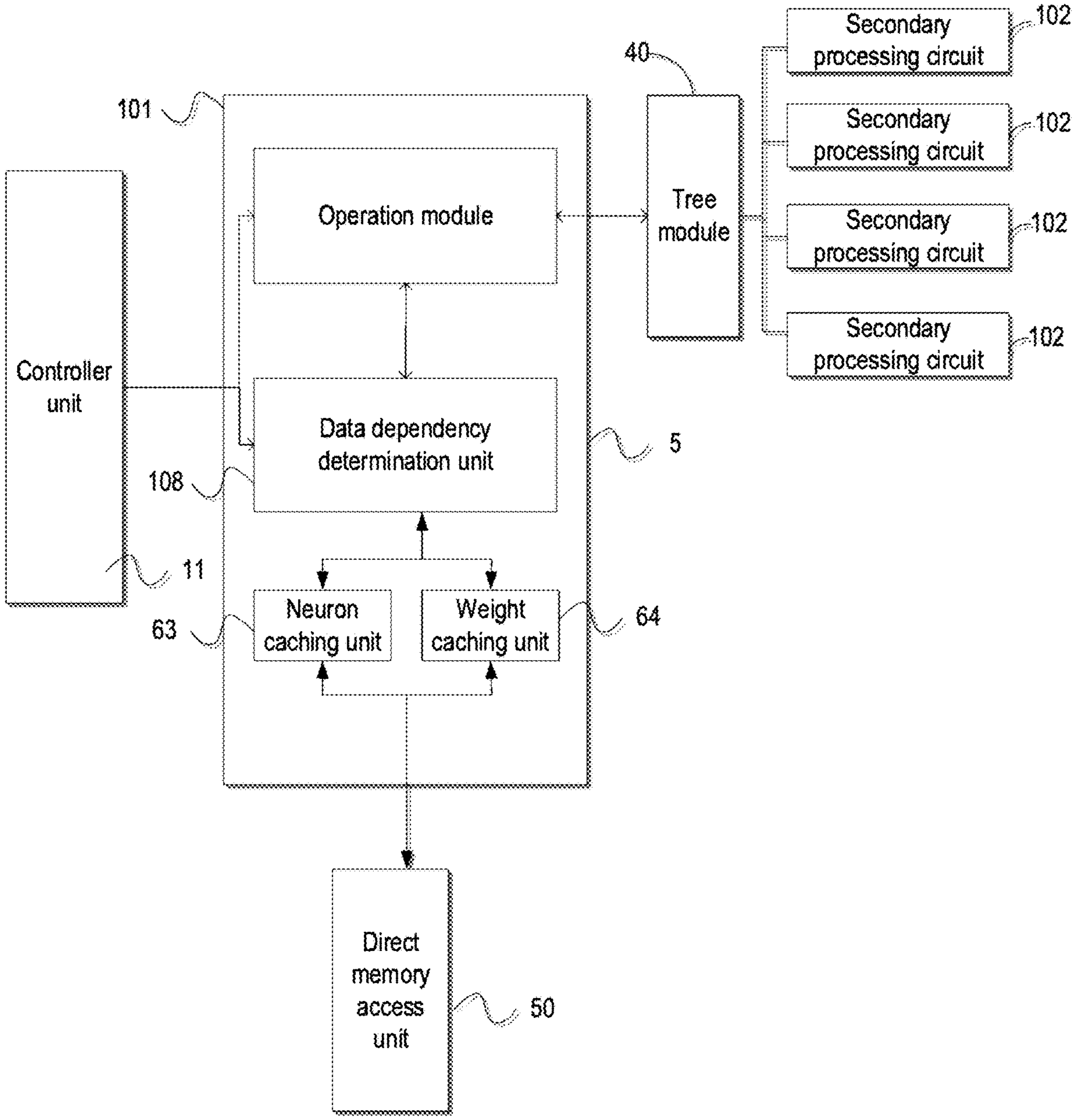
FIG. 4H is a structural diagram of still another computation device according to an example of the present disclosure.
Figure 4I:
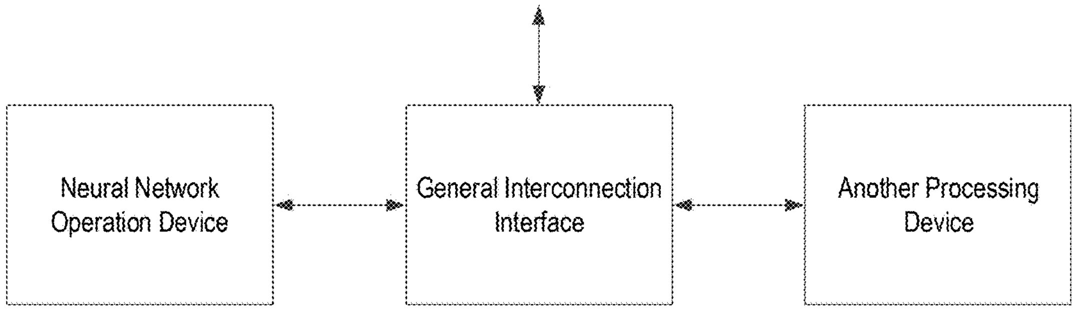
FIG. 4I is a structural diagram of a combined processing device according to an example of the present disclosure.

As shown in FIG. 4H, the operation unit may further include a weight caching unit 64 configured to cache weight data required by the secondary processing circuits during computations.

In an optional example, as shown in FIG. 4B, the operation unit 12 may include a branch processing circuit 103. A specific connection structure of the circuits is shown in FIG.

4B, where the primary processing circuit 101 is connected to one or a plurality of branch processing circuits 103. Each branch processing circuit 103 is connected to one or the plurality of secondary processing circuits 102.

The branch processing circuit 103 is configured to forward data or an instruction between the primary processing circuit 101 and the secondary processing circuits 102.

In an optional example, for a fully connected operation of neural network operations, a process may be: y=f(wx+b), where x is an input neuron matrix, w is a weight matrix, b is a bias scalar, f is an activation function which may be any of sigmoid, tan h, relu, and softmax. It is assumed that there is a binary tree structure with 8 secondary processing circuits, then an implementation method may be:

obtaining, by the controller unit, the input neuron matrix x, the weight matrix w, and a fully connected operation instruction from the storage unit, and transferring the input neuron matrix x, the weight matrix w, and the fully connected operation instruction to the primary processing circuit;

determining, by the primary processing circuit, the input neuron matrix x as data for broadcasting, determining the weight matrix w as data for distribution, partitioning the weight matrix w into 8 sub-matrices, transferring the 8 sub-matrices to the 8 secondary processing circuits through the tree module, and broadcasting the input neuron matrix x to the 8 secondary processing circuits;

multiplying and accumulating, by the secondary processing circuits, the 8 sub-matrices and the input neuron matrix x to obtain 8 intermediate results, and transferring the 8 intermediate results to the primary processing circuit; and sorting, by the primary processing circuit, the 8 intermediate results to obtain an operation result of wx, performing a bias b operation and then performing an activation operation on the operation result to obtain a final result y, sending the final result y to the controller unit; and outputting, by the controller unit, the final result y, or storing the final result y in the storage unit.

A method of performing a neural network forward operation instruction by the computation device shown in FIG. 4A may include:

extracting, by the controller unit, a neural network forward operation instruction, an operation field and at least one opcode corresponding to the neural network operation instruction from the instruction storage unit; transferring, by the controller unit, the operation field to a data access unit, and transferring the at least one opcode to the operation unit;

extracting, by the controller unit, a weight w and a bias b corresponding to the operation field from the storage unit (if b is 0, there is no need to extract the bias b), transferring the weight w and the bias b to the primary processing circuit of the operation unit; extracting, by the controller unit, input data Xi from the storage unit, and transferring the input data Xi to the primary processing circuit;

determining, by the primary processing circuit, an operation as multiplication according to the at least one opcode, determining the input data Xi as data for broadcasting, determining the weight data as data for distribution, and partitioning the weight w into n data blocks;

determining, by the instruction processing unit of the controller unit, a multiplication instruction, a bias instruction, and an accumulation instruction according to the at least one opcode, sending the multiplication instruction, the bias instruction, and the accumulation instruction to the primary processing circuit; broadcasting, by the primary processing circuit, the multiplication instruction and the input data Xi to the plurality of secondary processing circuits, and distributing the n data blocks to the plurality of secondary processing circuits (for instance, if there are n secondary processing circuits, each secondary processing circuit receives one data block); performing, by the plurality of secondary processing circuits, multiplication on the input data Xi and the received data blocks according to the multiplication instruction to obtain intermediate results, sending the intermediate result to the primary processing circuit; accumulating, by the primary processing circuit, the intermediate results sent from the plurality of secondary processing circuits according to the accumulation instruction to obtain an accumulation result, adding the bias b to the accumulation result according to the bias instruction to obtain a final result, and sending the final result to the controller unit.

In addition, the order of addition and multiplication can be reversed.

The technical solution provided by the present disclosure can realize multiplication operations and bias operations of neural networks according to one instruction, in other words, a neural network operation instruction. There is no need to store or extract intermediate results of neural network operations. The technical solution may reduce the storing and extracting operations of intermediate data, and may reduce corresponding operation steps and improve computational outcomes of neural networks.

The present disclosure further provides a machine learning operation device which may include one or a plurality of the computation devices mentioned in the present disclosure. The neural network device is configured to obtain data to be operated and control information from other processing devices, perform designated machine learning operations, and transfer operation results to a peripheral apparatus via an I/O interface. The peripheral apparatus includes a camera, a monitor, a mouse, a keyboard, a network card, a WIFI interface, and a server. When more than one computation devices are included, the computation devices may be connected to each other and transfer data to each other through a specific structure, for instance, the computation devices may be interconnected and transfer data through a PCIE bus, so as to support large scale machine learning operations. In this case, the computation devices may share the same control system, or have their own independent control systems. The computation devices may share a memory, or have their own memories. In addition, an interconnection manner of the computation devices may be any interconnection topology.

The machine learning operation device may have good compatibility and may be connected to various types of servers through a PCIE interface.

Figure 4J:
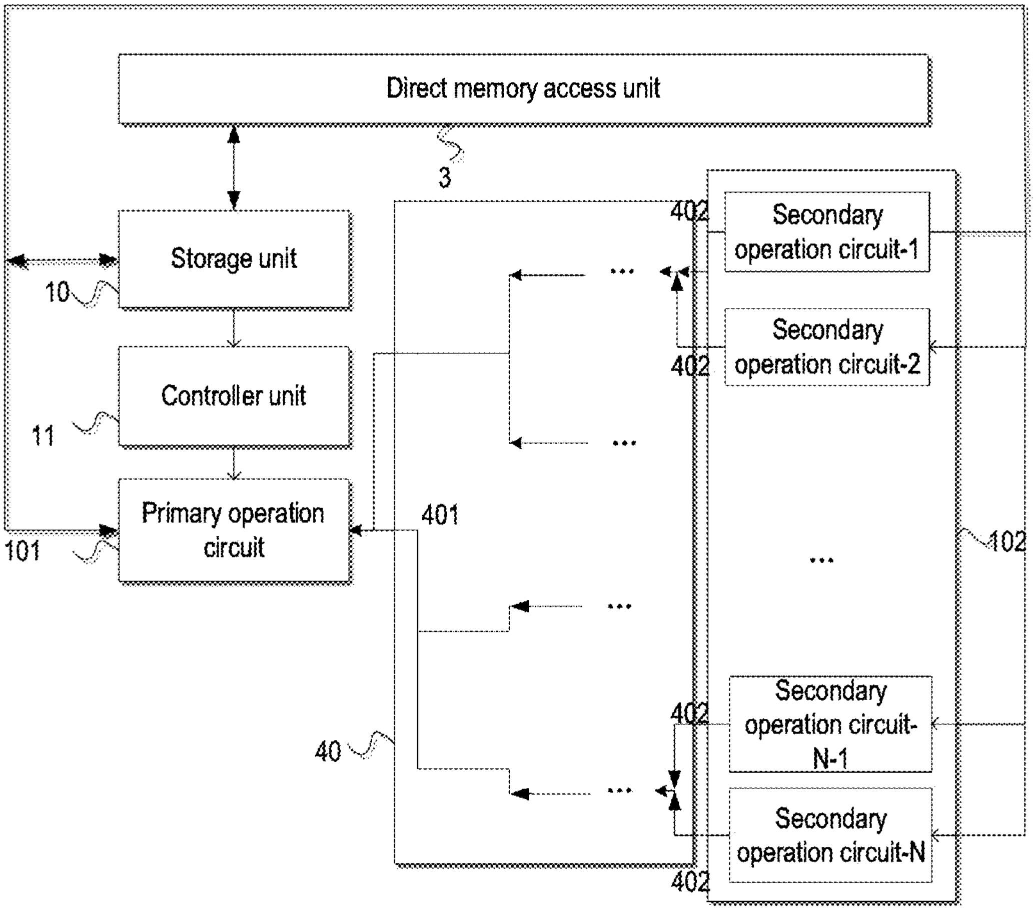
FIG. 4J is a structural diagram of a computation device according to an example of the present disclosure.

The present disclosure also provides a combined processing device which includes the above-mentioned neural network computation device, a general interconnection interface, and another processing device. The machine learning operation device interacts with another processing device to perform operations specified by the users. FIG. 4J is a schematic diagram of the combined processing device.

The another processing device may include one or more of a general-purpose/special-purpose processors such as a central processing unit (CPU), a graphics processing unit (GPU), a neural network processor, and the like. The present disclosure does not restrict a count of processors included in the another processing device. The another processing device may serve as an interface that connects the machine learning operation device to external data and control, including data moving, and may perform the basic control such as starting and stopping the machine learning operation device. The another processing device may also cooperate with the machine learning operation device to complete computation tasks.

The general interconnection interface is configured to transfer data and a control instruction between the neural network computation device and the another processing device. The machine learning operation device is configured to obtain required input data from the another processing device and write the data in an on-chip storage device of the machine learning operation device. The machine learning operation device may obtain a control instruction from the another processing device, and write the control instruction in an on-chip control cache of the machine learning operation device. The machine learning operation device may further read data stored in a storage module of the machine learning operation device and transfer the data to the another processing device.

Figure 4K:
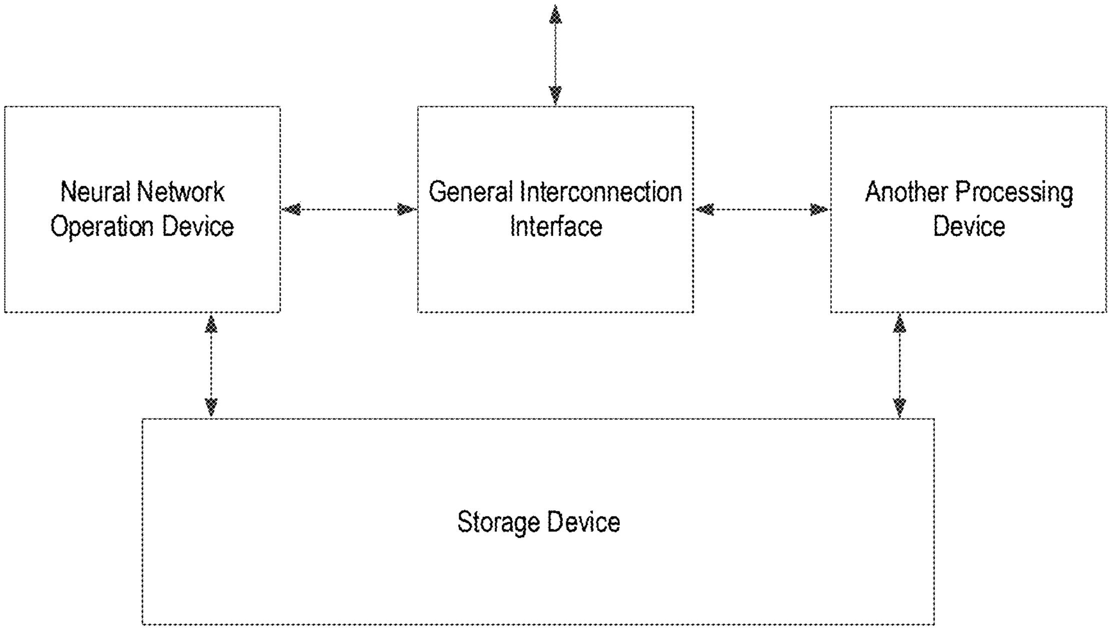
FIG. 4K is a structural diagram of another combined processing device according to an example of the present disclosure.

Optionally, as shown in FIG. 4K, the structure may also include a storage device. The storage device is connected to the machine learning operation device and the another processing device respectively. The storage device is configured to store data of the machine learning operation device and the another processing device. The storage device may be particularly suitable for a case where data to be computed cannot be entirely stored in an internal memory of the machine learning operation device or the another processing device.

The combined processing device can be used as an SOC (System On Chip) of a device including a mobile phone, a robot, a drone, a video surveillance device, and the like, which may effectively reduce the core area of a control component, increase the processing speed, and reduce the overall power consumption. In this case, a universal interconnection interface of the combined processing device may be connected to some components of the device. The some components include webcams, monitors, mice, keyboards, network cards, and WIFI interfaces.

In some examples, the present disclosure provides a chip including the machine learning operation device or the combined processing device.

In some examples, the present disclosure provides a chip package structure including the chip.

Figure 4L:
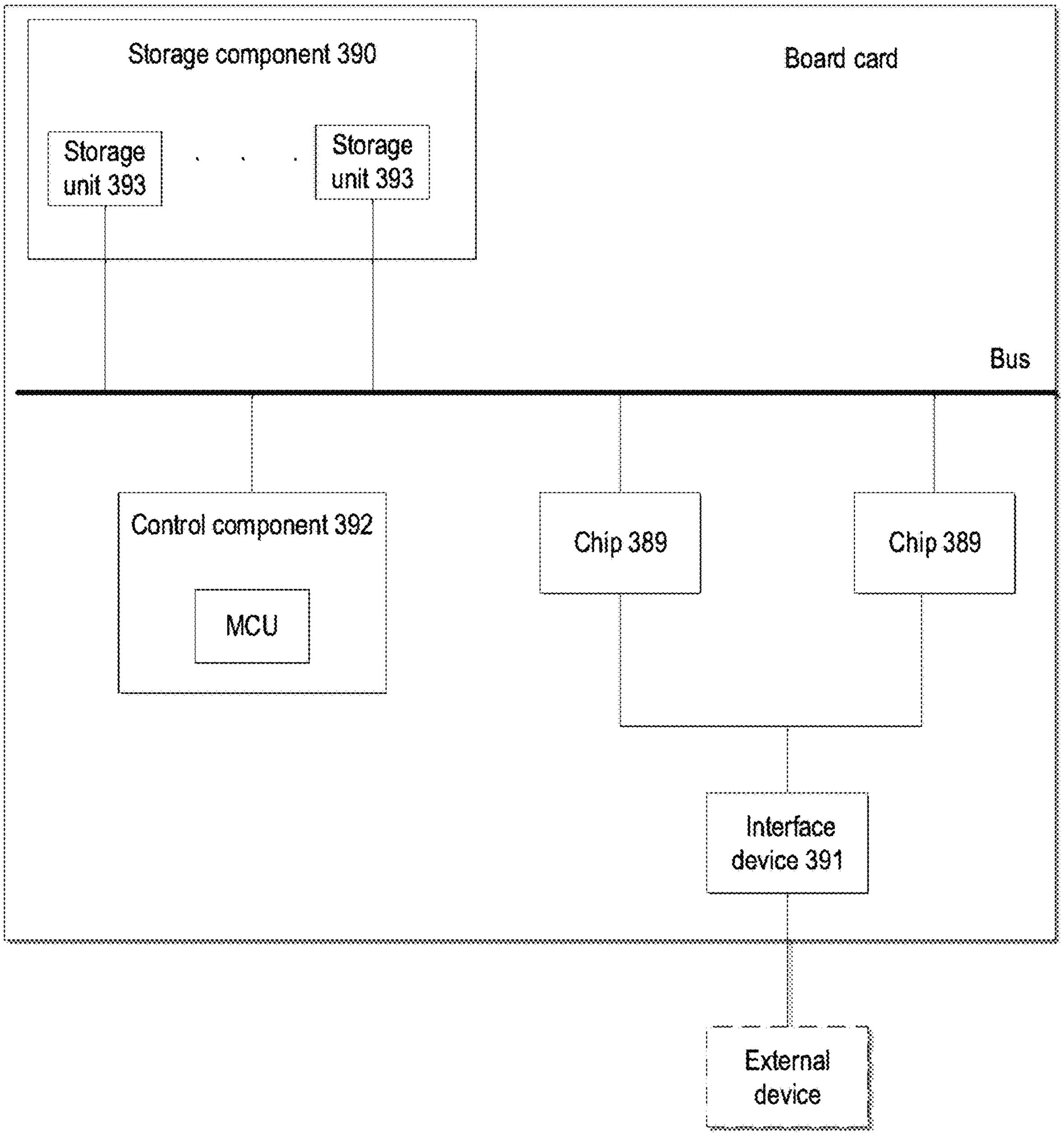
FIG. 4L is a structural diagram of a board card according to an example of the present disclosure.

In some examples, the present disclosure provides a board card including the chip package structure. FIG. 4L provides a board card, in addition to the above-mentioned chip 389, the board card may further include other matching components. The matching components may include but are not limited to: a storage component 390, an interface device 391, and a control component 392.

The storage component 390 is connected to the chip inside the chip package structure through a bus, and is configured to store data. The storage component may include a plurality groups of storage units 393. Each group of storage units is connected to the chip through the bus. It can be understood that each group of the storage units may be DDR SDRAM (Double Data Rate SDRAM).

DDR can double the speed of SDRAM without increasing the clock frequency. DDR allows data to be read on the rising and falling edges of the clock pulse. The speed of DDR is twice the speed of standard SDRAM. In an example, the memory device may include 4 groups of storage units. Each group of storage units may include a plurality of DDR4 particles (chips). In an example, four 72-bit DDR4 controllers may be arranged inside the chip, where 64 bits of each 72-bit DDR4 controller are for data transfer and 8 bits are for ECC parity. It can be understood that when each group of the storage units adopts DDR4-3200 particles, the theoretical bandwidth of data transfer may reach 25600 MB/s.

In one example, each group of the storage units may include a plurality of DDR SDRAMs (Double Data Rate Synchronous Dynamic Random Access Memory) arranged in parallel. DDR can transfer data for two times per clock cycle. A DDR controller may be arranged inside the chip. The DDR controller is configured to control the data transfer and the data storage of each storage unit.

The interface device may be electrically connected to the chip inside the chip package structure. The interface device is configured to realize data transfer between the chip and an external device (such as a server or a computer). In one example, the interface device may be a standard PCIE interface. For instance, data to be processed may be transferred by a server through the standard PCIE interface to the chip, thereby realizing data transfer. Optionally, when a PCIE 3.0 X 16 interface is adopted for transferring, the theoretical bandwidth may reach 16000 MB/s. In another example, the interface device may also be another interface. The present disclosure does not restrict a specific form of the another interface as long as the interface unit can realize the transferring function. In addition, a computation result of the chip may still be transferred by the interface device to an external device (such as a server).

The control component is electrically connected to the chip. The control component is configured to monitor a state of the chip. Specifically, the chip and the control component can be electrically connected through a SPI interface. The control component may include MCU (Micro Controller Unit). If the chip includes a plurality of processing chips, a plurality of processing cores, or a plurality of processing circuits, the chip is capable of driving a plurality of loads. In this case, the chip can be in different working state such as multi-load state and light-load state. The working state of the plurality of processing chips, the plurality of processing cores, or a plurality of processing circuits can be regulated and controlled by the control device.

Some examples provide an electronic device which includes the board card.

The electronic device may include a data processing device, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or medical equipment.

The vehicle may include an airplane, a ship, and/or a car; the household electrical appliance may include a television, an air conditioner, a microwave oven, a refrigerator, an electric rice cooker, a humidifier, a washing machine, an electric lamp, a gas cooker, and a range hood; and the medical equipment may include a nuclear magnetic resonance spectrometer, a B-ultrasonic scanner, and/or an electrocardiograph.

Figure 2E:
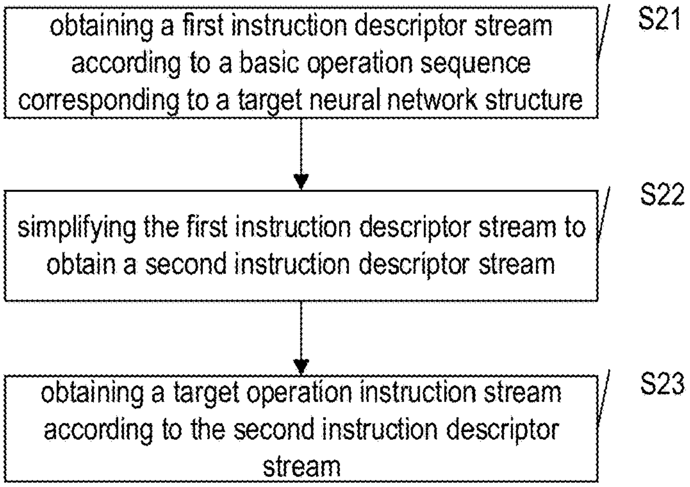
FIG. 2E is a flowchart of a stream execution method according to an example of the present disclosure.

FIG. 2E is a flowchart of a stream execution method according to an example of the present disclosure. As shown in FIG. 2E, the stream execution method includes:

S21: obtaining a first instruction descriptor stream according to a basic operation sequence corresponding to a target neural network structure.

In the present disclosure, the target neural network structure may be determined according to first information to be processed by a terminal device.

The first information is information to be processed. The terminal device is capable of processing different types of information in different application scenarios. The information (specifically refers to the first information) includes but is not limited to text information, voice information, image information (in other words, picture or video information), picture information, video information, floating windows, etc. For instance, in a scenario of voice recognition, the first information is voice information. In a scenario of car license plate recognition, the first information is information of a license plate.

The first information is information with a preset format. Examples of the present disclosure do not restrict the preset format. When the first information is information with a preset format, the target neural network structure may be determined according to an information type of original information. The original information is information to be processed that is received by the terminal device. A corresponding target neural network structure may be determined according to the information type of the original information, so that the target neural network structure may be determined more accurately.

Each neural network structure corresponds to a basic operation sequence. A data structure that describes an operation of a neural network structure may be obtained by analyzing the neural network structure. For instance, a basic input size of a neural network structure A is 260*260, then an image size of original input of the neural network structure A is 260*260. When the basic input size of the neural network structure A and that of a neural network structure B are the same, but they have different counts of layers or a type of a certain layer is different, then corresponding basic operation sequences of the two structures are different. Therefore, after the target neural network structure is determined, a corresponding basic operation sequence may then be determined.

The first instruction descriptor stream is an instruction descriptor sequence for generating an instruction, and includes at least one instruction descriptor. The present disclosure does not restrict a method of obtaining the first instruction descriptor stream. A method may include: obtaining a basic operation sequence of the target neural network structure, and obtaining the first instruction descriptor stream according to the basic operation sequence.

The basic operation sequence of the neural network structure is stored in external storage space and expressed in a form of a network structure protocol. The terminal device may obtain the basic operation sequence of the target neural network structure from the external storage space, and then obtain the first instruction descriptor stream according to the basic operation sequence, and store the first instruction descriptor stream in internal storage space.

The present disclosure does not restrict an analyzing rule of the basic operation sequence and the instruction descriptor. The first instruction descriptor stream corresponding to the neural network structure may be obtained according to the analyzing rule of the basic operation sequence and the instruction descriptor.

The present disclosure does not restrict the preset format of each instruction descriptor stream in the first instruction descriptor stream. An instruction corresponding to the first instruction descriptor stream may be generated according to the network structure of the preset format.

The instruction mentioned in present example of the disclosure includes at least one of: a matrix-multiply-vector instruction, a vector-multiply-matrix instruction, a matrix-multiply-scalar instruction, a tensor operation instruction, a matrix addition instruction, a matrix subtraction instruction, a matrix retrieving instruction, a matrix loading instruction, a matrix saving instruction, and a matrix moving instruction. The instruction may also include at least one of all instructions of the Cambricon instruction set, such as a matrix operation instruction, a convolution operation instruction, a forward operation instruction of a fully connected layer, a pooling operation instruction, a normalization instruction, a vector operation instruction, and a scalar operation instruction.

The stream execution method includes: S22, simplifying the first instruction descriptor stream to obtain a second instruction descriptor stream.

Examples of the present disclosure do not restrict a method of simplifying the first instruction descriptor stream. An instruction descriptor corresponding to a redundant operation may be eliminated, and/or a layer corresponding to the instruction descriptor may be merged. In this way, a length of a target operation instruction stream corresponding to the instruction descriptor stream may thus be shortened, and the operation efficiency may be improved.

Optionally, simplifying the first instruction descriptor stream to obtain a second instruction descriptor stream includes: traversing instruction descriptors in the first instruction descriptor stream to obtain a plurality of instruction descriptors; searching for a redundant operation in the plurality of instruction descriptors; and deleting an instruction descriptor corresponding to the redundant operation to obtain the second instruction descriptor stream.

For a single instruction descriptor, each operation is necessary. However, when instruction descriptors are integrated into an instruction descriptor stream, a redundant operation may occur, in other words, an operation corresponding to a previous instruction descriptor is a reverse operation of that of a next or next N instruction descriptors. When a redundant operation is eliminated, a count of instruction descriptors is reduced, a count of instructions is reduced, thereby increasing the operation speed of the computation unit.

For instance, it is assumed that there are a convolution layer C and a convolution layer D, where instruction descriptors included in the convolution layer C are: a descriptor of a first reading instruction, a descriptor of a first splitting instruction, a descriptor of a first convolution instruction, and a descriptor of a first merging instruction descriptor; the instruction descriptors included in the convolution layer D are: a descriptor of a second reading instruction, a descriptor of a second splitting instruction, a descriptor of a second convolution instruction, and a descriptor of a second merging instruction; and grouping parameters (group) corresponding to the descriptors of the splitting instructions in the convolution layer C and the convolution layer D are 2. When output of the convolution layer C is input of the convolution layer D, it is determined that the descriptor of the first merging instruction in the convolution layer C and the descriptor of the second splitting instruction in the convolution layer D are redundant operations. In other words, after being simplified, the instruction descriptors of the convolution layer C and the convolution layer D are: the descriptor of the first reading instruction, the descriptor of the first splitting instruction, the descriptor of the first convolution instruction, the descriptor of the second reading instruction, the descriptor of the second convolution instruction, and the descriptor of the second merging instruction. In this way, the first instruction descriptor stream may be simplified, and the length of the instruction stream corresponding to the second instruction descriptor stream may be shorten, which may help to improve the operation efficiency.

Optionally, traversing the instruction descriptors in the first instruction descriptor stream to obtain a plurality of instruction descriptors includes: reordering instruction descriptor streams in the first instruction descriptor stream according to a preset optimization rule to obtain the plurality of instruction descriptors.

The preset optimization rule is used for reordering the instruction descriptors in the first instruction descriptor stream. In other words, the step of analyzing the instruction descriptors may be processed in parallel by reordering, thereby reducing the time of instruction generation and improving the operation efficiency.

Optionally, simplifying the first instruction descriptor stream to obtain a second instruction descriptor stream includes: traversing the instruction descriptors in the first instruction descriptor stream to obtain a plurality of layers corresponding to the plurality of instruction descriptors; searching for a fusion layer among the plurality of layers; and fusing instruction descriptors corresponding to fusion layers to obtain the second instruction descriptor stream.

For a single layer, each layer includes at least one instruction descriptor, and each instruction descriptor is necessary. An instruction descriptor stream corresponds to a different layer in a neural network structure, in other words, layers with continuous operations may have a fusion layer. In other words, an operation corresponding to an instruction descriptor in a previous layer is the same or similar operation as an operation corresponding to an instruction descriptor in a next layer or next N layers. When instruction descriptors in fusion layers are fused, a count of instruction descriptors is reduced, a count of instructions is reduced, and data throughput is increased, thereby increasing the operation speed of the computation unit.

For instance, it is assumed that there are a convolution layer, a normalization layer, and an activation layer. When output of the convolution layer is input of the normalization layer, and output of the normalization layer is input of the activation layer, it is determined that the three layers can be fused. Then the instruction descriptor sequence is processed, and the relevant instruction descriptors are fused. In other words, one instruction descriptor is used to represent the three-layer network structure, which may improve the operation speed of the computation unit.

The stream execution method includes: S23, obtaining a target operation instruction stream according to the second instruction descriptor stream.

In the example of the present disclosure, the target operation instruction stream is an operation instruction sequence for responding to the first information. The target operation instruction stream includes at least one of the following: a matrix-multiply-vector instruction, a vector-multiply-matrix instruction, a matrix-multiply-scalar instruction, a tensor operation instruction, a matrix addition instruction, a matrix subtraction instruction, a matrix retrieving instruction, a matrix loading instruction, a matrix saving instruction, and a matrix moving instruction. The instruction may also include at least one of all instructions of the Cambricon instruction set, such as a matrix operation instruction, a convolution operation instruction, a forward operation instruction of a fully connected layer, a pooling operation instruction, a normalization instruction, a vector operation instruction, and a scalar operation instruction.

The present disclosure does not restrict the preset format of each instruction descriptor stream in the second instruction descriptor stream. An instruction corresponding to the second instruction descriptor stream can be generated according to the network structure of the preset format.

It can be understood that the method of obtaining the first instruction descriptor stream by the terminal device according to the basic operation sequence corresponding to the target neural network structure and simplifying the first instruction descriptor stream may help to overcome the problem of redundant input, output or other operations generated during an operation of a complete neural network formed by fine-grained atomic operations including convolution, pooling, and activation. In this way, a redundant instruction descriptor in the first instruction descriptor stream may be eliminated, thereby shortening the length of the target operation instruction stream corresponding to the instruction descriptor stream and improving the efficiency of information processing.

Figure 2F:
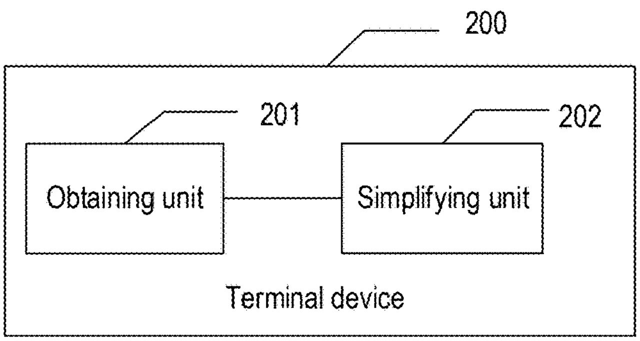
FIG. 2F is a schematic diagram of a terminal device according to an example of the present disclosure.

Similar to the example shown in FIG. 2E, another example of the present disclosure provides a terminal device. As shown in FIG. 2F, a terminal device 200 includes:

an obtaining unit 201 configured to obtain a first instruction descriptor stream according to a basic operation sequence corresponding to a target neural network structure; and a simplifying unit 202 configured to simplify the first instruction descriptor stream to obtain a second instruction descriptor stream.

The obtaining unit 201 is further configured to obtain a target operation instruction stream according to the second instruction descriptor stream.

It can be understood that the obtaining unit 201 obtains the first instruction descriptor stream according to the basic operation sequence corresponding to the target neural network structure, and the simplifying unit 202 simplifies the first instruction descriptor stream to obtain the second instruction descriptor stream, and the obtaining unit 201 obtains the target operation instruction stream according to the second instruction descriptor stream. The operation of simplifying the first instruction descriptor stream may help to overcome the problem of redundant input, output or other operations generated during an operation of a complete neural network formed by fine-grained atomic operations including convolution, pooling, and activation. In this way, a redundant instruction descriptor in the first instruction descriptor stream may be eliminated, thereby shortening the length of the target operation instruction stream corresponding to the instruction descriptor stream and improving the efficiency of information processing.

Optionally, regarding the operation of simplifying the first instruction descriptor stream to obtain the second instruction descriptor stream, the simplifying unit 202 is configured to traverse instruction descriptors in the first instruction descriptor stream to obtain a plurality of instruction descriptors, search for a redundant operation in the plurality of instruction descriptors, and delete an instruction descriptor corresponding to the redundant operation to obtain the second instruction descriptor stream.

Optionally, regarding the operation of traversing the instruction descriptors in the first instruction descriptor stream to obtain a plurality of instruction descriptors, the simplifying unit 202 is configured to reorder the instruction descriptors in the first instruction descriptor stream according to a preset optimization rule to obtain the plurality of instruction descriptors.

Optionally, regarding the operation of simplifying the first instruction descriptor stream to obtain the second instruction descriptor stream, the simplifying unit 202 is configured to traverse the instruction descriptors in the first instruction descriptor stream to obtain a plurality of layers corresponding to the plurality of instruction descriptors, search for a fusion layer among the plurality of layers, and fuse an instruction descriptor corresponding to the fusion layer to obtain the second instruction descriptor stream.

Optionally, regarding the operation of simplifying the first instruction descriptor stream to obtain the second instruction descriptor stream, the simplifying unit 202 is configured to traverse the instruction descriptors in the first instruction descriptor stream to obtain a plurality of layers corresponding to the plurality of instruction descriptors, search for a fusion layer among the plurality of layers, and fuse an instruction descriptor corresponding to the fusion layer to obtain the second instruction descriptor stream.

Optionally, regarding the operation of obtaining the first instruction descriptor stream according to the basic operation sequence corresponding to the target neural network structure, the obtaining unit 201 is configured to obtain the basic operation sequence of the target neural network structure, where the basic operation sequence is expressed in a form of a network structure protocol, and obtain the first instruction descriptor stream according to the basic operation sequence.

Optionally, the target operation instruction stream includes at least one of: a matrix-multiply-vector instruction, a vector-multiply-matrix instruction, a matrix-multiply-scalar instruction, a tensor operation instruction, a matrix addition instruction, a matrix subtraction instruction, a matrix retrieving instruction, a matrix loading instruction, a matrix saving instruction, and a matrix moving instruction, and at least one of all instructions of the Cambricon instruction set.

Figure 2G:
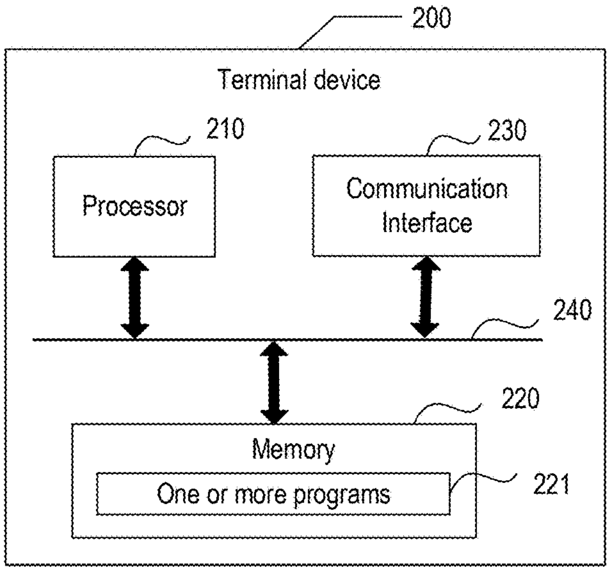
FIG. 2G a structural diagram of another terminal device according to an example of the present disclosure.
Figure 2H:
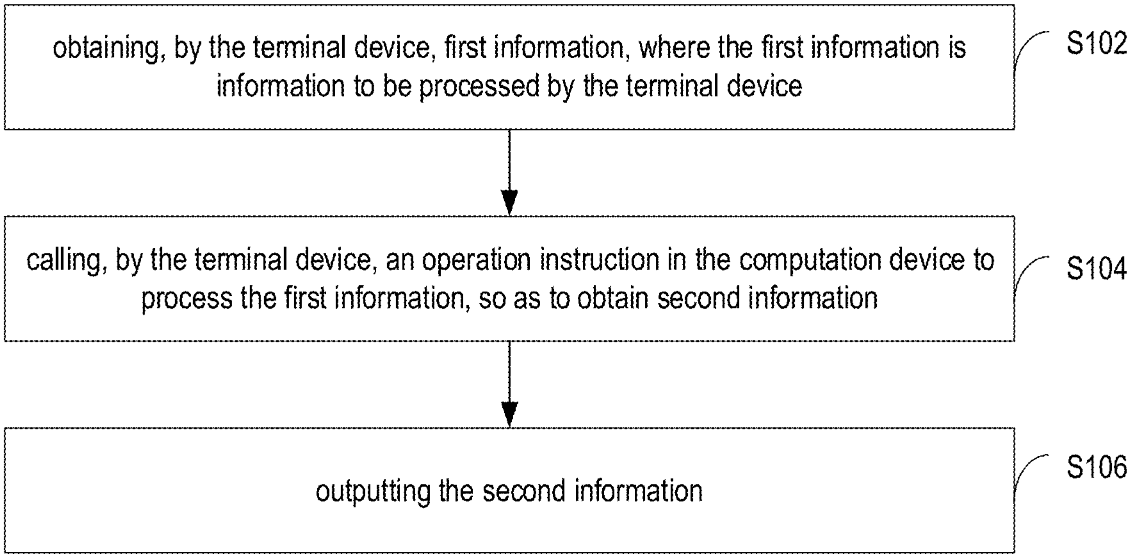
FIG. 2H is a flowchart of an information processing method according to an example of the present disclosure.

Similar to the example shown in FIG. 2E, FIG. 2G is a structural diagram of a terminal device according to an example of the present disclosure. As shown in FIG. 2G, a terminal device 200 in the example may include: a processor 210, a communication interface 230, and a memory 220. The processor 210, the communication interface 230, and the memory 220 are connected by a bus 240. One or more programs 221 are stored in the memory 220 and configured to be executed by the processor 210. A program 221 includes an instruction for performing the following steps:

obtaining a first instruction descriptor stream according to a basic operation sequence corresponding to a target neural network structure;

simplifying the first instruction descriptor stream to obtain a second instruction descriptor stream; and obtaining a target operation instruction stream according to the second instruction descriptor stream.

In a certain application, the processor 210, the communication interface 230, and the memory 220 provided in one of the examples of the present disclosure can execute an implementation of the stream execution method provided in one of the examples of the present disclosure, and can also be applied to an implementation of the stream execution device provided by one of the examples of the present disclosure, which are not described in detail here.

In a certain application, the processor 301, the input equipment 302, and the output equipment 303 provided in one of the examples of the present disclosure can execute an implementation of the stream execution method provided in one of the examples of the present disclosure, and can also be applied to an implementation of the stream execution device provided by one of the examples of the present disclosure, which are not described in detail here.

A method of performing a convolution operation instruction by the computation device shown in FIG. 2A may include:

fetching, by the controller unit 115, the convolution operation instruction and a operation field corresponding to the convolution operation instruction from the register unit 112, and transferring, by the controller unit, the operation field to the data access unit;

fetching, by the data access unit, a convolution kernel w and a bias b corresponding to the operation field from the memory, and transferring the convolution kernel w and the bias b to the operation unit;

the interconnection module connecting the multiplication arithmetic unit to the addition arithmetic unit, and connecting the addition arithmetic unit to the activation arithmetic unit;

and multiplying, by the multiplication arithmetic unit of the computation unit, the convolution kernel w and input data Xi to obtain a first result (which may include results of a plurality of multiplication operations), and inputting the first result to the addition arithmetic unit to perform addition to obtain a second result, adding the second result and the bias b to obtain a third result, inputting the third result to the activation arithmetic unit to perform an activation operation to obtain an output result S, transferring the output result S to the data access unit, and storing, by the data access unit, the output result S in the memory.

The technical solution provided by the present disclosure can realize convolution operations according to one instruction, in other words, a convolution operation instruction. There is no need to store or obtain intermediate data (such as a first result, a second result, and a third result) of convolution operations. The technical solution may reduce the storing and obtaining operations of intermediate data, and may have technical effects of reducing a corresponding operation step and improving outcomes of convolution operations.

In an optional example, the computation device includes but is not limited to a processor, a controller, a physical chip, and another device, such as a neural network chip.

Based on the structure of the above-mentioned terminal device, FIG. 2G is a flowchart of an information processing method according to an example of the present disclosure. The method of FIG. 2G may include:

S102, obtaining, by the terminal device, first information, where the first information is information to be processed by the terminal device.

The terminal device is capable of processing different types of information in different application scenarios. The information (specifically refers to the first information) includes but is not limited to text information, voice information, image information (in other words, picture or video information), picture information, video information, floating windows, etc. For example, in a scenario of voice recognition, the first information is voice information.

The method of FIG. 2G may further include: S104, calling, by the terminal device, an operation instruction in the computation device to process the first information, so as to obtain second information; and S106, outputting the second information by the terminal device.

The terminal device may use a computation device to process information. Specifically, the computation device may call a relevant operation instruction (the operation instruction may include any instruction or any combination of the instructions provided in the present disclosure) to process the first information to obtain and output the second information. The processing of the first information will be described in detail below. The type of the second information and the first information may be the same or different.

For instance, the first information and the second information may both be image information, or the first information may be voice information and the second information may be text information, which is not restricted in the present disclosure.

Below are some examples of the steps S102 and S104 of the present disclosure.

A First Example

In the step S102, the terminal device may obtain the first information. The present disclosure does not restrict a method of obtaining the first information. For instance, the first information may be sent from another terminal device or a server. Accordingly, the present disclosure does not restrict a format of the first information. In other words, the first information may be in any format.

Correspondingly, in the step S104, after obtaining the first information, the terminal device may call the computation device to process the first information. Specifically, the computation device may first pre-process the first information, and convert the first information into first information of a preset format. Then, the computation device calls an operation instruction to compute the first information of the preset format, thereby obtaining the second information. In different application scenarios, the computation device may call different operation instructions to perform different operations on the first information, which is will described below.

A Second Example

In the step S102, the terminal device obtains original information. A method of obtaining the original information is not restricted in the present disclosure. Then, the terminal device may pre-process the original information, thereby obtaining the first information. The first information refers to information of the preset format, and the pre-processing includes but is not limited to any one or more of the following: data format conversion (such as normalization, integer data conversion, etc.), data deduplication, data exception, filling missing data, and the like.

Correspondingly, in the step S104, after obtaining the first information, the terminal device may enable the computation device, and call a relevant operation instruction through the computation device to process the first letter to obtain and output the second information. Regarding the step of processing the first information, in different application scenarios, the operation instruction called by the computation device may be different, and a processing method may be different, which will be described in detail below.

The pre-processing includes but is not limited to data format conversion, such as the conversion between continuous data and discrete data as described in the present disclosure, power conversion which is to convert non-power weight data in input data of a neural network to power weight data, statistics of floating-point data which is to count the bits of exponent bias and exponent bits required for storing different types of data during a forward operation of the artificial neural network, and floating-point data conversion for a short-bit floating-point data type and a long-bit floating-point data type, which is not restricted in the present disclosure.

In an optional example, the preset format includes but is not limited to a floating-point number, a power number, a discrete number, an integer, a decimal data type, a hexadecimal data type, a secondary data type, which is not restricted in the present disclosure.

In an optional example, the operation instruction includes any one or more of: a matrix-multiply-vector instruction, a vector-multiply-matrix instruction, a matrix-multiply-scalar instruction, a tensor operation instruction, a matrix addition instruction, a matrix subtraction instruction, a matrix retrieving instruction, a matrix loading instruction, a matrix saving instruction, and a matrix moving instruction.

In other words, in an example of the present disclosure, the computation device shown in FIG. 2A is capable of performing the operation instruction. Specifically, the operation unit of the computation device shown in FIG. 2A is capable of performing one or more of the following operations: a matrix-multiply-vector instruction, a vector-multiply-matrix instruction, a matrix-multiply-scalar instruction, a tensor operation instruction, a matrix addition instruction, a matrix subtraction instruction, a matrix retrieving instruction, a matrix loading instruction, a matrix saving instruction, and a matrix moving instruction.

The disclosure will be further explained based on different application scenarios.

First, a scenario of scene recognition is taken as an instance. The terminal device may obtain image information of the environment (which is the first information). The image information of the environment may be photo information or other photo information to be processed/recognized of the current environment of the user. Optionally, the terminal device may perform format conversion on the image information of the environment within the computation device or outside the computation device. The image information is converted into environment image information of a set format. The environment image information may be represented in RGB, CMYK, HSB, or another color mode. Taking RGB, a color standard of the industry as an instance, the environment image information of a set format may be represented as an RGB three-dimensional matrix. The RGB three-dimensional matrix is only an instance and does not constitute any limitation on the present disclosure. The environment image information may be converted into a matrix of a different format, which may specifically be an m*n matrix, a 1*n matrix, or an m*1 matrix, where m and n are integers greater than or equal to 2. When the matrix is a 1*n matrix or an m*1 matrix, it may also be called a vector. The following matrix may be any of the above three types of matrices, which will not be explained in detail.

Correspondingly, the terminal device uses a computation device (such as a neural network chip or the computation device as shown in FIG. 2A) to call a scene recognition algorithm to recognize the environmental image information (specifically an m*n matrix, where m and n cannot be 1 at the same time), thereby obtaining the corresponding second information. The second information may be a target scene category to which the environment image information belongs, or a quantified value of the environmental image information in a preset scene category. The quantified value is for indicating the similarity between the environment image information and the preset scene category. The second information is used to indicate the target scene category to which the environment image information belongs, and the target scene category belongs to the preset scene category. The preset scene category may be set by the users or the terminal device, and includes but is not limited to indoor environment, outdoor environment, beach, ocean, and the like.

The scene recognition algorithm is composed of at least one operation instruction. The scene recognition algorithm is used to fetch a feature of the environment image information and identify a type of the scene corresponding to the environment image information. The operation instruction includes but is not limited to: a normalization instruction, a non-linear activation instruction, a pooling instruction, and a fully connected layer instruction. A way of realizing the operation instruction will be described in detail below.

Specifically, the controller unit of the computation device shown in FIG. 2A may call one or more of a normalization instruction, a non-linear activation instruction, a pooling instruction, and a fully connected layer instruction from the register unit to send to the computation unit to realize the scene recognition algorithm and obtain the second information. It should be noted that if a plurality of operation instructions are to be executed for the scene recognition algorithm, the corresponding computation topology may also be retrieved from the register unit by the controller unit to the interconnection module. The interconnection module controls the arithmetic unit in the operation unit to realize the computing topology.

Second, object recognition is taken as an instance. Similar to the foregoing first instance, the terminal device obtains image information (which is the first information). The image information may be image information of a preset format. The image information includes one or more objects, such as image information including a carton of milk and a glass. Similarly, the terminal device can represent the image information in the form of a multi-dimensional matrix. The terminal device may use the controlling unit included in the computation device to call an object recognition algorithm (which includes some operation instructions) stored in the memory unit, send the algorithm to the operation unit, and compute the image information to obtain the second information. The second information is for representing information of objects included in the image information. The information may be position information, category information (such as an object name, an object type), and the like. The second information may be a multi-dimensional matrix, which represents information such as a coordinate position of each object in the image information, the type or name of each object, and the like.

Third, voice recognition is taken as an instance. The terminal device obtains voice information (ie, the first information) input by the users. The voice information may be processed into information of a preset format in the computation device or outside the computation device. Similarly, the voice information may be processed by the terminal device into a multi-dimensional matrix. The terminal device may use the computation device to perform voice recognition processing on the voice information. Specifically, the controller unit of the computation device may call a voice recognition algorithm (which includes some operation instructions) stored in the register unit, send the algorithm to the operation unit, and perform voice recognition on the voice information to obtain the second information. The second information may be character/text information. The speech recognition algorithm is composed of one or more operation instructions. The operation instructions include but are not limited to one or more of: a scalar operation instruction, a matrix vector operation instruction, a sorting instruction, a convolution layer instruction, a fully connected layer instruction, a pooling layer instruction, a batch standardization instruction.

Fourth, video style changing is taken as an instance. The terminal device obtains image information of which the style is to be changed (may be picture information or video information, in other words, the first information). Further, the terminal device uses the computation device to change the style of the image information. Similarly, in a specific processing process, the terminal device may present the image information as a multi-dimensional matrix, and use the controller unit of the computation device to call an image style changing algorithm stored in the register unit, and send the algorithm to the operation unit. The operation unit changes the style of the image information to a target style, and outputs the image information of the target style (which is the second information). The image style changing algorithm may be composed of one or more operation instructions. The operation instructions may be any operation instruction or any combination of operation instructions provided by the present disclosure, which will not explained in detail.

Fifth, contour detection is taken as an instance. The terminal device obtains image information (which is the first information). The image information may be information processed into information with a preset format within or outside the computation device. Similarly, the image information may be processed by the terminal device as a multi-dimensional matrix. The terminal device may use the computation device to detect the contour of the image information. Specifically, the controller unit of the computation device may call a contour detection algorithm (which includes some operation instructions) stored in the register unit, send the algorithm to the operation unit, and detect and recognize the contour of the image information to obtain the second information. The second information is for showing pixel points of each object in the image information. In other words, the contour detection refers to distinguishing the contour (pixel points) of each object in the image information. The second information is a result of contour distinguishing which is the contour of each object (in other words, a plurality of pixels). The contour detection algorithm may be composed of one or more operation instructions. The operation instructions may be any operation instruction or any combination of operation instructions provided by the present disclosure, which will not explained in detail.

It should be noted that the above-mentioned scene recognition algorithm, object recognition algorithm, voice recognition algorithm, image style changing algorithm, and contour detection algorithm are algorithms for performing different functions. The operation instructions constituting each algorithm may be the same or different, which is not restricted in the present disclosure.

The description above only lists five application scenarios to explain the examples of the present disclosure, however, the present disclosure includes but is not limited to the processing of the five application scenarios by the computation device. For instance, the present disclosure may also include the processing of other application scenarios by the computation device, such as: super-resolution image reconstruction (changing low-resolution images to high-resolution images), image retouching (changing image style, color, etc.), language translation (translation between voices of different languages, such as translating from Chinese to English), product/advertisement recommendation (such as product information recommendation on the website), object detection (detecting the location of an object), a chatbot (conversations), which are not restricted in the example of the present disclosure.

It should be noted that, regarding the computation device shown in FIG. 2A, the operation instructions constituting various algorithms may be different or the same. When an algorithm is constituted by a plurality of operation instructions, the interconnection module of the computation device can be used to identify and learn information including which arithmetic units in the operation unit are to be called by the algorithm, a count of arithmetic units to be called, and an order of calling the arithmetic units. In other words, the interconnection module of the computation device is configured to call the operation unit to complete a corresponding computation function of the algorithm according to a computation topology corresponding to each algorithm, which is not restricted in the present disclosure.

In an optional example, the terminal device may include a user equipment (UE), a server, a smart phone (such as an Android phone, an IOS phone, etc.), a personal computer, a handheld computer, a mobile internet device (MID), a wearable smart device, or another internet device, which is not restricted by the example of the present disclosure.

The examples of the present disclosure may improve the efficiency of information processing by using the computation device to process various information.

On the basis of the foregoing instances, examples of an information processing method based on the computation device in different application scenarios are described below.

Figure 3:
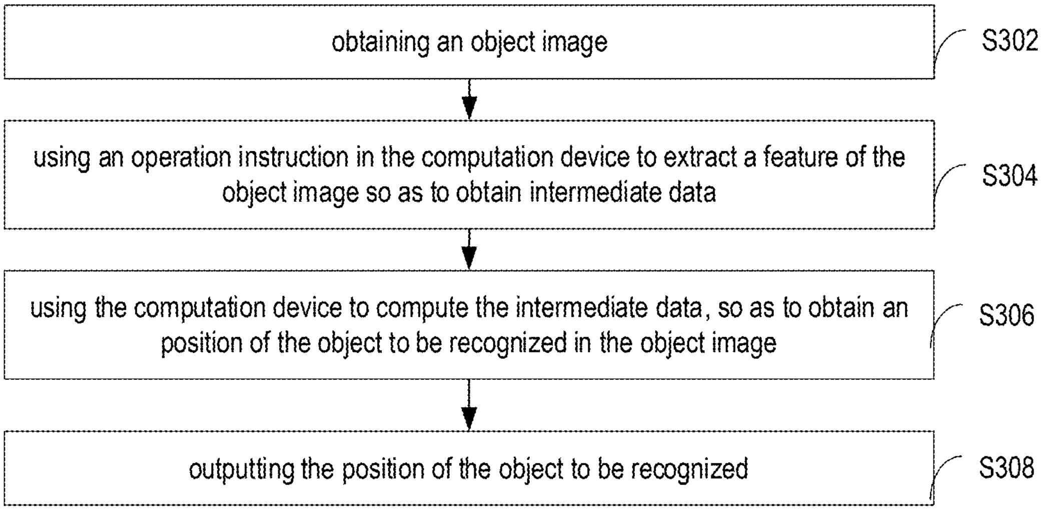
FIG. 3 is a flowchart of an information processing method based on the computation device provided by an example of the present disclosure.

Taking an application scenario of object detection as an instance, FIG. 3 is an information processing method based on the computation device provided by an example of the present disclosure. The method shown in FIG. 3 includes:

a step S302, obtaining an object image, where the object image includes at least one object to be recognized.

In the present disclosure, the object image includes, but is not limited to, a picture or a video of one or more key features. The key features are features of an object to be recognized, such as a name of the object, a shape of the object, and the like.

In certain applications, the object image may support or have different data formats, such as a decimal data type, an octal data type, and the like. The object image may also be a multi-dimensional matrix that is obtained by converting pixels constituting the object image, which is not restricted in the present disclosure.

In an optional example, the object image may be pre-processed, or may be original data that is input to the device without being processed. When the object image is original data, the terminal device may further pre-process the object image, such as normalizing, converting a data format, etc. The aforementioned computation device shown in FIG. 2A may be used for pre-processing the object image so as to obtain an object image in a corresponding input format. For instance, the object image may be processed into a multi-dimensional matrix, so that in a step S304, the processed object image can be subject to feature extraction.

In an optional example, the pre-processing of the object image may be performed inside or outside the computation device of the terminal device, which is not restricted in this disclosure.

The method shown in FIG. 3 further includes: the step S304, using an operation instruction in the computation device to extract a feature of the object image so as to obtain intermediate data; and a step S306, using the computation device to compute the intermediate data, so as to obtain an position of the object to be recognized in the object image. Optionally, the method may include obtaining a category of the object to be recognized.

The method shown in FIG. 3 further includes: a step S308, outputting the position of the object to be recognized.

Some examples involved in the steps S304 to S308 are described below.

Specifically, in the step S304, after receiving the object image (which may be multi-dimensional matrix data), the computation device may call a corresponding first operation instruction to extract the feature of the object image so as to obtain intermediate data. The first operation instruction is an operation instruction related to a network computation topology corresponding to an object detection algorithm. Correspondingly, the intermediate data may also be multi-dimensional matrix data.

There are several examples of the step S304. Three examples are briefly introduced below.

In a first example, the terminal device may call a relevant operation instruction in the example to extract the feature of the object image so to obtain the intermediate data. The operation instruction includes but is not limited to a neural network operation instruction, a matrix/vector operation instruction, and the like. The operation instruction may also be any operation instruction or any combination of the operation instructions provided in the present disclosure.

In a second example, the computation device may call one or a plurality of operation instructions to extract the feature of the object image so as to obtain the intermediate data. The plurality of operation instructions include but are not limited to: convolution instructions, normalization instructions, non-linear activation instructions, pooling instructions, and the like. Ways of calling and performing the operation instructions may be arbitrary, which is not restricted in the present disclosure. Below is an example of a method of calling operation instructions to fetch a feature of an object image, which is as shown in FIG. 4.

As shown in FIG. 4, the computation device may sequentially call a convolution operation instruction, a normalization instruction, a non-linear activation instruction, and a pooling instruction to sequentially process the obtained object image, so as to extract the feature of the object image and obtain the intermediate data.

Specifically, the controller unit may extract a convolution operation instruction from the register unit and send the instruction to the operation unit to process the obtained object image. Afterwards, the controller unit may fetch a normalization instruction from the register unit and send the instruction to the operation unit to process the obtained object image. Next, the controller unit may obtain a non-linear activation instruction from the register unit and send the instruction to the operation unit to process the obtained object image. Then, the controller unit may obtain a pooling instruction from the register unit and send the instruction to the operation unit to process the obtained object image.

In a third example, as shown in FIG. 4, the instructions in the second example are performed sequentially and operated in one thread (pipeline), which, however, is not restricted in the present disclosure. In the present disclosure, feature extraction may be realized by dividing into threads (which is splitting) and merging. An implementation of thread splitting includes, but is not limited to, data copying, data grouping, and the like. An implementation of thread merging includes, but is not limited to, data addition and subtraction, data multiplication, and data combination and arrangement. Similarly, operation steps and a sequence of the steps may be combined randomly. On the basis of the example of FIG. 4, FIG. 5 schematically shows the calling of operation instructions.

Figure 5:
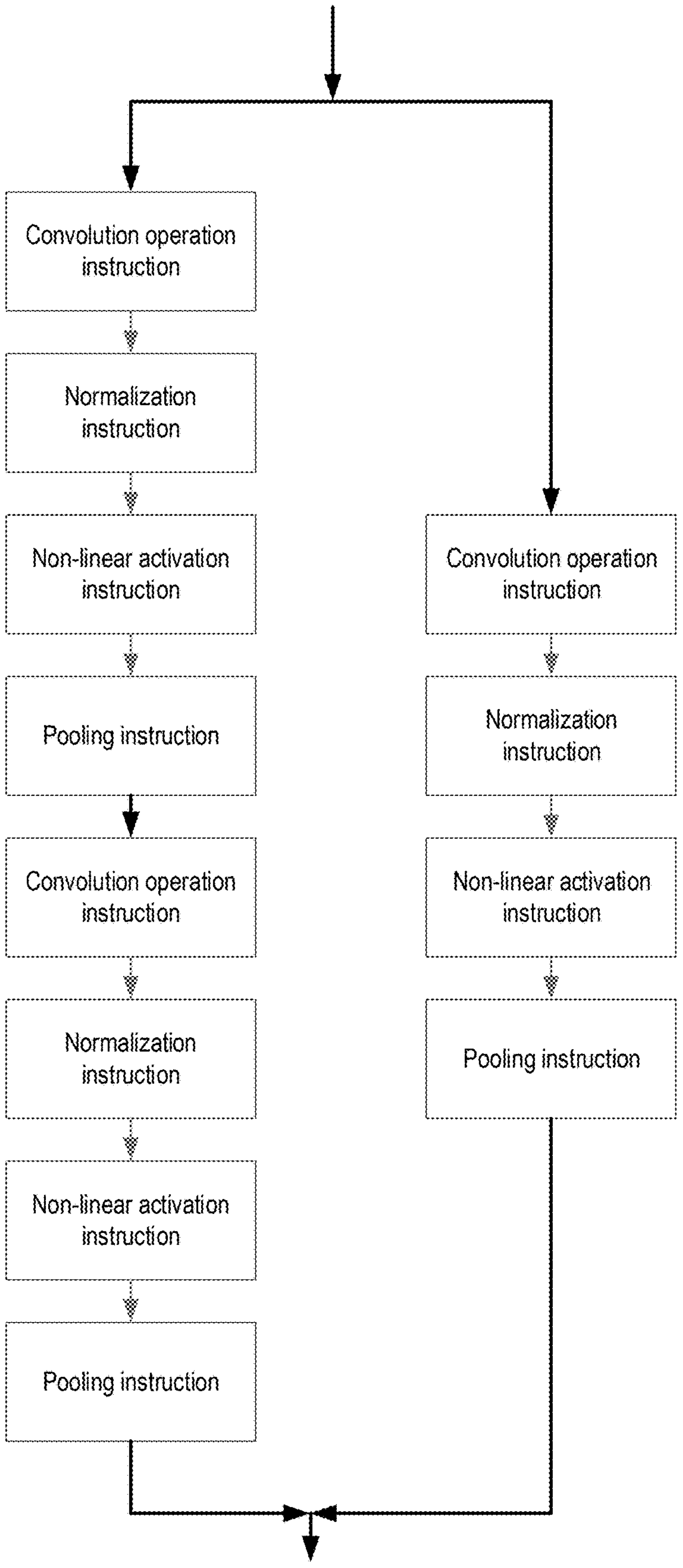
FIG. 5 is a schematic diagram of another operation instruction acquisition according to an example of the present disclosure.

As can be seen from FIG. 5, a computation device can perform data operations of two threads at the same time, and operation instructions to be used in each thread may be the same or different, and an order and a count of calls of the operation instructions are not restricted. As shown in FIG. 5, one of the threads is configured to execute the operation instructions of FIG. 4 twice at the mean time. The other thread is configured to execute the operation instructions of FIG. 4 once.

It should be noted that when the present disclosure involves multi-threaded data operations, intermediate data after feature extraction may be obtained by aggregating result data processed by each thread. In other words, the intermediate data may include but is not limited to a plurality of pieces of matrix data of the same dimension, or a plurality of pieces of matrix data of different dimensions, which is not restricted in the present disclosure.

Optionally, though only three examples of the step S304 are described above, there may be other examples. For instance, algorithms such as HOG (Histogram of Oriented Gradients) and SIFT (Scale-invariant Feature Transform) feature extraction algorithms may be used to extract a feature of an image, which will not be described in detail here.

Correspondingly, in the step S306, the computation device may analyze the intermediate data and obtain the position and category of each object to be recognized in the object image.

Specifically, the computation device may call the second operation instruction to process the intermediate data, which is similar to the process of the step S304, and finally obtain position information and classification (category) information of each object to be recognized in the object image, an evaluation score of the possibility of the existence of an object at each position in the object image, and the like, which is not restricted in the present disclosure.

The position or position information may be represented by a position of a minimum bounding matrix. For example, the position or position information may be represented by a top left pixel coordinate, width, and height of the minimum bounding matrix, or be represented by a center coordinate, width, and height of the minimum bounding matrix, or be represented by a top left pixel coordinate and a bottom right pixel coordinate of the minimum bounding matrix, or the like. For instance, if the object image includes an image of a carton of milk, the minimum bounding matrix is a matrix formed by a smallest frame that includes the image of milk. The matrix can be described as being represented by the center coordinate, height and width of the image of milk representation.

In an optional example, the computation device processes the intermediate data to obtain result data. The result data includes position information and classification (category) information of the above-mentioned object, an evaluation score of the possibility of the existence of an object at each position in the object image, and the like. With reference to the related description in the foregoing example, it can be known that the result data may include, but is not limited to, one or more pieces of multi-dimensional matrix data. The one or more pieces of multi-dimensional matrix data may be the same or different, which is not restricted in the present disclosure.

When a plurality of pieces of multi-dimensional matrix data is obtained by computing, the computation device may also call a related operation instruction (such as a fully connected layer operation instruction) to perform a computation, thereby obtaining a piece of multi-dimensional matrix data. The matrix data obtained at this time still includes the position information and classification (category) information of the above-mentioned object, an evaluation score of the possibility of the existence of an object at each position in the object image, and the like.

In an optional example, the computation device may also call a related instruction (such as a vector operation instruction) in the instruction set shown in the example of FIG. 4 to realize non-maximum suppression (NMS), so as to filter a predicted minimum bounding matrix, thereby selecting a minimum bounding matrix that possibly includes an object, which is not restricted in the present disclosure.

The first operation instruction and the second operation instruction may be the same or different. The operation instruction includes but is not limited to a scalar operation instruction, a matrix vector operation instruction, a sorting instruction, a convolution layer instruction, a fully connected layer instruction, a pooling layer instruction, a batch standardization instruction, and the like. The first operation instruction and the second operation instruction may also be other operation instructions or a combination of other operation instructions provided by the present disclosure.

Based on the examples of the present disclosure, an object to be recognized in an object image may be detected accurately, quickly, and comprehensively. Compared with the prior art that uses a general-purpose processor for detection, the present disclosure may have technical effects of lower power consumption and faster speed.

Figure 3A:
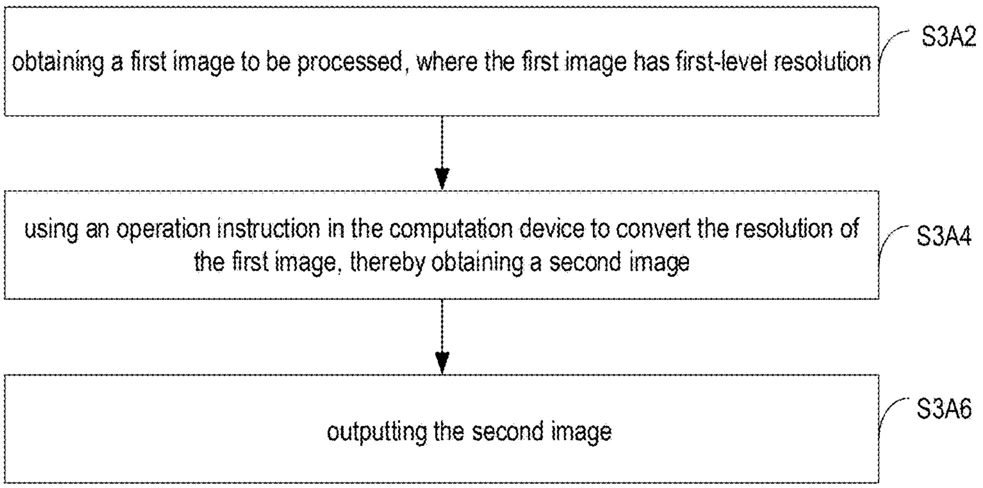
FIG. 3A is a flowchart of another information processing method based on the computation device according to an example of the present disclosure.

Super resolution is taken as an instance. FIG. 3A is an information processing method based on the computation device provided by an example of the present disclosure. The method shown in FIG. 3A includes the following steps:

a step S3A2, obtaining a first image to be processed, where the first image has first-level resolution;

a step S3A4, using an operation instruction in the computation device to convert the resolution of the first image, thereby obtaining a second image, where the second image has second-level resolution, and the first-level resolution is lower than the second-level resolution; and a step S3A6: outputting the second image.

Below are some specific examples and optional examples involved in the present disclosure.

In the step S3A2, the first image may be a picture or a video, and a count of the first image is not restricted. In other words, the input first image may be one or more pictures, one or more videos, which is not restricted in the present disclosure.

In certain applications, the first image may support/have different data formats, such as a decimal data type, an octal data type, and the like. The first image may also be a multi-dimensional matrix that is obtained by converting pixels constituting the first image, which is not restricted in the present disclosure.

In an optional example, the first image may be preprocessed image data, or may be original data that is input to the device without being processed. When the object image is original data, the terminal device may further pre-process the object image, such as normalizing, converting a data format, etc. The aforementioned computation device shown in FIG. 2A may be used for pre-processing the object image so as to obtain an object image in a corresponding input format. For instance, the object image may be processed into a multi-dimensional matrix, so that in the step S3A4, the processed object image can be subject to resolution conversion.

In an optional example, the pre-processing of the first image may be performed inside or outside the computation device of the terminal device, which is not restricted in this disclosure.

In the step S3A4, after receiving the first image (which may be multi-dimensional matrix data), the computation device may call a moving instruction related to a network computation topology corresponding to a super resolution algorithm to convert the resolution of the first image so as to obtain the second image with second priority. A specific way of realizing the example is similar to the related description in the example of FIG. 3, which will not be described in detail.

In an optional example, the processing of resolution conversion may be separately performed by a plurality of processing modules. Processing results (which are output multi-dimensional matrices) of the respective processing modules may or may not be combined. A form of the plurality of processing results is not restricted. For instance, the processing results may be a plurality of multi-dimensional matrices of different dimensions, or may be a plurality of multi-dimensional matrices of the same dimension but different sizes, which is not restricted in the present disclosure.

In the step S3A6, the terminal device may directly output the processing results after the resolution processing; or, the terminal device may also perform transformation processing on the processing results after the resolution processing. The transformation processing includes translation, scaling, non-linear operation, and the like. In this way, the processing results processed by the computation device (an artificial neural network chip) are correspondingly mapped to pixels in the image, thereby obtaining the second image.

Based on the examples of the present disclosure, the resolution of an image may be improved/optimized. Compared with the prior art that uses a general-purpose processor and software for resolution improvement/optimization, the present disclosure may have technical effects of lower power consumption and faster speed.

Figure 3B:
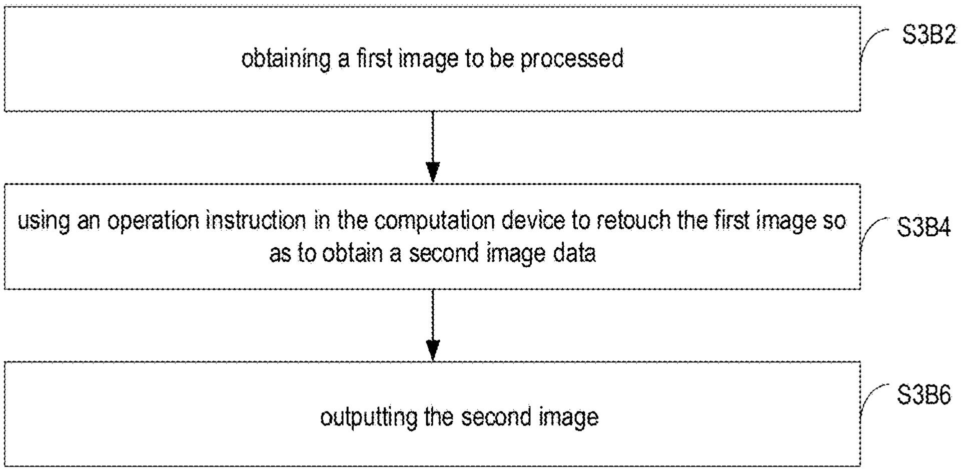
FIG. 3B is a flowchart of another information processing method based on the computation device according to an example of the present disclosure.

Image retouching is taken as an instance. FIG. 3B is an information processing method based on the computation device provided by an example of the present disclosure. The method shown in FIG. 3B includes the following steps:

a step S3B2, obtaining a first image to be processed. A description of the first image is similar to the related description in the example of FIG. 3A, which will not be explained in detail.

The method shown in FIG. 3B further includes: a step S3B4, using an operation instruction in the computation device to retouch the first image so as to obtain a second image data; and a step S3B6: outputting the second image.

Below are some specific examples and optional examples involved in the present disclosure.

In the step S3B2, the first image may include a retouching option. The retouching option may be input by the users or the device. For example, the option may be input from an application or the like. The retouching option includes but is not limited to: skin tone adjusting, acne removal, face thinning, body slimming, brightness adjusting, contrast adjusting, and other options for image processing or effect enhancement.

A specific way of realizing the steps S3B2-S3B6 is similar to the related description in the examples of FIG. 3 and FIG. 3A, which will not be described in detail.

In an optional example, when using the computation device (specifically, an artificial neural network) to retouch the first image, one or more sets of network models may be used. When a set of network models is used, input data of the network model (which is the first image) needs to include parameters for identifying the retouch option or a type of the retouch option. When a plurality of sets of network models are used, corresponding network models may be provided for retouching effects of different images to be retouched, and the network models may be used to realize the image retouching.

The examples of the present disclosure may realize image retouching. Compared with the prior art that uses a general-purpose processor and software for image retouching, the present disclosure may have technical effects of lower power consumption and faster speed.

Figure 3C:
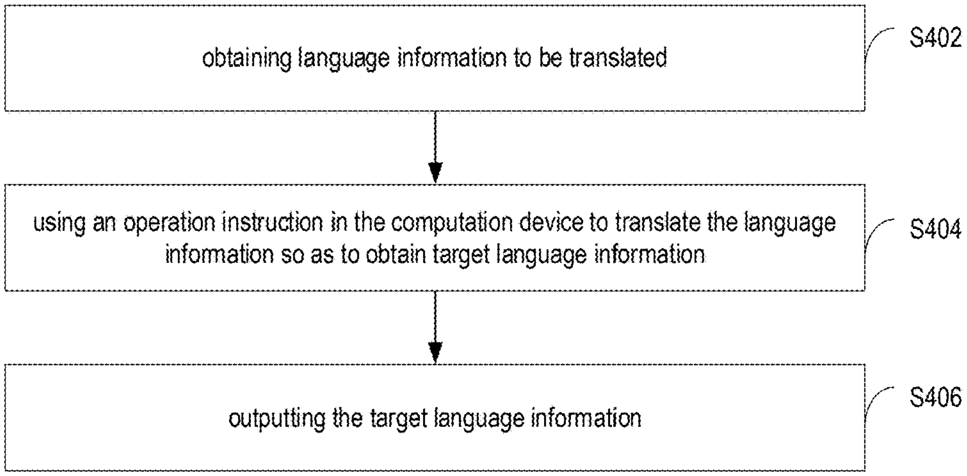
FIG. 3C is a flowchart of an information processing method based on the computation device according to an example of the present disclosure.

An application scenario of language translation is taken as an instance. FIG. 3C is an information processing method based on the computation device provided by an example of the present disclosure. The method shown in FIG. 3C includes:

a step S402, obtaining language information to be translated.

In the present disclosure, the language information to be translated may be a natural language to be translated. The present disclosure does not restrict a form of the natural language. The natural language may be presented in the form of SMS, voice, subtitles, pictures, etc.

The method shown in FIG. 3C further includes: a step S404, using an operation instruction in the computation device to translate the language information so as to obtain target language information; and a step S406: outputting the target language information.

Some examples involved in the step S404 are described below. It should be understood that the step S404 is an intermediate processing procedure performed by the terminal device on the language information to be translated.

Specifically, the computation device may use an encoder to encode the language information in S402 to obtain a fixed-length vector. Then, the encoded vector of fixed-length is input to a decoder. The decoder decodes the language information to generate a probability of each word in a target translation language lexicon. Finally, the decoded information is input to a language model for analysis, so that the translated target language information may be obtained and output. The target language information may also be expressed as text. Below is a detailed explanation.

First, the computation device may first convert the language information to be translated into a vector of fixed-length through the encoder. The encoder may be a neural network model composed of a convolution layer, a fully connected layer, a pooling layer, a batch norm layer, and the like. The neural network model includes but is not limited to one or more of the following: a deep neural network (DNN), a convolution neural network (CNN), a recurrent neural network (RNN), a recursive neural network (LSTM), etc. In a certain application, the terminal device may use a computation device shown in FIG. 2A to perform a convolution layer instruction, a fully connected layer instruction, a pooling layer instruction, or a batch norm layer instruction to complete a corresponding neural network algorithm. The computation device may be a computation unit in an artificial neural network chip.

Then, the vector of fixed-length generated by the encoder is input to the decoder. The decoder decodes the vector to generate a probability of each word in the target translation language lexicon. The encoder may be a neural network model composed of a convolution layer, a fully connected layer, a pooling layer, a batch norm layer, and the like. The neural network model will not be described in detail here.

In an optional example, an attention mechanism (or an attention model) may be added to the neural network model for separately encoding rarely-used words. In this way, the accuracy of language translation may be improved. Below is a detailed explanation. The attention model can support the building of correspondence between some rarely-used words and translation. Specifically, the above may be realized by a fully connected layer neural network, a regression softmax layer neural network, matrix multiplication, and matrix addition.

In an example, the vector of fixed-length obtained after encoding by the encoder and a position information matrix obtained in advance are subjected to a first specified operation, such as matrix multiplication and the like. Then, the vector and the matrix are subject to a second specified operation with the neural network through a trained fully connected layer neural network and a softmax layer neural network. For instance, the second specified operation may be matrix addition. A result matrix (which is a probability matrix composed of the probability of a plurality of words after translation) is obtained from the second specified operation.

In yet another example, the series of operations in the example above is defined as an attention model. Accordingly, a new attention model may be obtained by permuting or combining a plurality of the attention models according to any one or more of the following methods: mutual series connection, parallel connection, and jumping series connection.

In yet another example, on the basis of the first example described above, a new attention model may be obtained by changing the order of each operation. More specifically, the computation unit in the artificial neural network chip (computation device) may be used to realize the attention model by performing a corresponding convolution layer instruction, pooling layer instruction, fully connected layer instruction, batch norm instruction, matrix multiplication instruction, matrix addition instruction, and the like.

Finally, the probability of each word obtained after decoding by the decoder is input to the language model for data processing (such as iteration processing), thereby generating the translated target language information. A sorting algorithm such as A* algorithm may be pre-stored in the language model, so that the algorithm and the model may be combined to generate a translation result (which is the target language information). Specifically, scores for all words to be selected may be generated by iterating based on the language model. During each iteration, new scores for all the words to be selected may be generated. In this way, a search space for all the words in a time sequence may be generated after the iterations are completed. A decoder algorithm is applied in the space to obtain a final and unique output result of language recognition. The decoder algorithm may be a neural network model consisting of a convolution layer, a fully connected layer, a pooling layer, a batch norm layer, and the like. The neural network model includes but is not limited to one or more of the following: a deep neural network (DNN), a convolution neural network (CNN), a recurrent neural network (RNN), a recursive neural network (LSTM), etc. In a certain application, the terminal device may use a computation device to perform a convolution layer instruction, a fully connected layer instruction, a pooling layer instruction, or a batch norm layer instruction to complete a corresponding neural network algorithm. The computation device may be a computation unit in an artificial neural network chip. The decoder is configured to associate a fixed-length vector with the number of the probability of each word.

In a certain application, the language model includes but is not limited to an algorithm model such as WFST or n-gram which is for performing a statistical analysis on the probability of each word to output a corresponding translation result. In a specific application, the present disclosure may use a computation device, such as a computation unit in an artificial neural network chip, to execute any one or more of functional instructions such as a vector multiplication instruction, a vector addition instruction, and a scalar digital logic instruction, so as to facilitate the realization of the function of algorithms such as WFST, N-gram, beam search, and the like.

In an optional example, the language information to be translated obtained in the step S402 may be stored in a storage medium. In the process of performing the step S404, the computation device may call a relevant operation instruction in the storage medium to perform a corresponding operation on the language information.

Below are some examples of the language translation of the present disclosure.

An example includes: a step 1: transferring input data to a storage unit via a pre-processing module, or transferring the input data to a storage unit directly;

a step 2: transferring, by DMA, the data to a corresponding on-chip cache (which may be an instruction cache, an input neuron cache, or a weight cache) in batches;

a step 3: reading, by a control unit, an instruction from the instruction cache, decoding the instruction, and then transferring the instruction to an operation unit; and a step 4, according to the instruction, performing, by the operation unit, a corresponding operation. In each layer of a neural network, the operation in the step 4 is mainly performed in two steps: a step 4.1, using a matrix multiplication module or a vector multiplication module of an artificial neural network chip to complete an operation of a convolution layer (a3) and a fully connected layer (a4) according to an artificial neural network chip instruction; and a step 4.2, performing an activation function operation on a result obtained in the step 4.1 to obtain an output neuron, and transferring the output neuron to the output neuron cache. In a non-neural network method, the operation in the step 4 is performed in one step: a step 4.3, using a scalar operation instruction, a matrix vector operation instruction, a sorting instruction, etc. in the artificial neural network chip to complete a non-neural network algorithm such as beam search.

The example further includes a step 5, repeating the step 2 to step 4 until all data has been computed, and obtaining a final result of the functional demand. The final result is obtained by an output neuron of a last layer of the neural network. The final result is output from the operation unit to the output neuron cache, and then returned to the storage unit via DMA.

In a practical application, the realization of a chatbot is similar to language translation. Both of them are applications of deep learning in natural language processing, and are similar in the process of algorithms and execution. Below is an example of the realization of a chatbot.

A chatbot is taken as an instance. Data input to the robot is natural language to be answered. The natural language may be in the form of text or voice.

Preferably, the example also includes a process of intermediate processing, which is as follows.

Preferably, the intermediate processing includes an encoder, a decoder, a language model, or an attention model. Preferably, these models may be implemented by a neural network method such as DNN, CNN, LSTM, or RNN, or may be implemented by a non-traditional method such as WFST or N-gram.

Preferably, the input language text to be answered is first converted into a fixed-length vector by an encoder. Preferably, the encoder may be DNN, CNN, LSTM, or RNN composed of a convolution layer, a fully connected layer, a pooling layer, a batch norm layer, and the like. More specifically, the device uses the computation unit of the artificial neural network chip to execute a corresponding convolution layer instruction, fully connected layer instruction, pooling layer instruction, batch norm layer instruction, so as to complete a corresponding neural network algorithm.

Preferably, the fixed-length vector generated by the encoder is transferred to a decoder. The decoder generates a probability of each word in a target language answer lexicon. Preferably, the encoder may be DNN, CNN, LSTM, or RNN composed of a convolution layer, a fully connected layer, a pooling layer, a batch norm layer, and the like. More specifically, the device uses the computation unit of the artificial neural network chip to execute a corresponding convolution layer instruction, fully connected layer instruction, pooling layer instruction, batch norm layer instruction, so as to complete a corresponding neural network algorithm.

Preferably, the attention model is for encoding sentences that are less common in a chat separately. The attention model can support the building of the correspondence of the sentences that are less common in a chat. Specifically, the above may be realized by a fully connected layer neural network, a softmax layer neural network, matrix multiplication, and matrix addition. A first example includes: performing matrix multiplication on the fixed-length vector encoded by the encoder and a position information matrix obtained in advance, and then passing through a trained fully connected layer neural network, and after passing through a softmax layer neural network, performing matrix addition on the result of the neural network computation. In a second example, the series of operations above is defined as an attention model. A new attention model may be obtained by permuting or combining a plurality of the attention models according to the following methods: mutual series connection, parallel connection, and jumping series connection. In a third example, on the basis of the first example, a new attention model may be obtained by changing the order of each operation. More specifically, the device uses the computation unit in the artificial neural network chip to execute a corresponding convolution layer instruction, pooling layer instruction, fully connected layer instruction, batch norm instruction, matrix multiplication instruction, matrix addition instruction, vector elementary arithmetic operation, and the like, to realize the attention model.

Preferably, the language model may store prior knowledge, beam search, A* algorithm, or another sorting algorithm to generate a target answer result. Scores for all words to be selected may be generated by iterating based on the language model. During each iteration, new scores for all the words to be selected may be generated. In this way, a search space for all the words in a time sequence may be generated after the iterations are completed. A decoder algorithm is applied in the space to obtain a final and unique output result of voice recognition. Specifically, the language model may be realized by the WFST or n-gram algorithm. The present disclosure may use a computation unit in an artificial neural network chip to execute a corresponding vector multiplication instruction, a vector addition instruction, and a scalar digital logic instruction, so as to complete the algorithms of WFST, N-gram, and beam search.

The output is an answer in natural language, which is output as text or another form.

Based on the examples of the present disclosure, language information may be translated more accurately, quickly, and comprehensively. Compared with the prior art that uses a general-purpose processor for detection, the present disclosure may have technical effects of lower power consumption and faster speed.

Figure 3D:
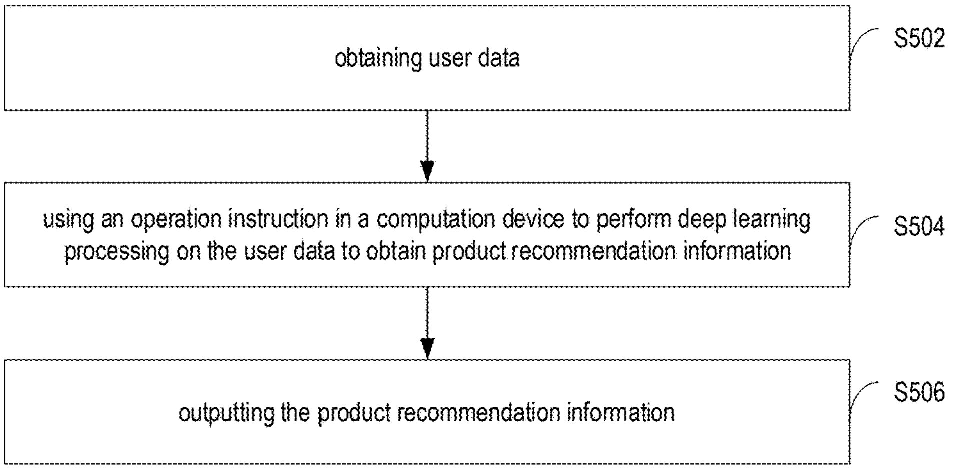
FIG. 3D is a flowchart of an information processing method based on the computation device according to an example of the present disclosure.

Advertisement recommendation is taken as an instance. FIG. 3D is an information processing method based on the computation device provided by an example of the present disclosure. A structure of the computation device is shown in FIG. 2A. An operation instruction shown in FIG. 3D is fetched from the register unit by the controller unit and then sent to the operation unit. The operation unit performs the operation of the operation instruction. If the operation requires a multi-layer operation, the controller unit fetches a computation topology structure corresponding to the operation from the register unit, sends the computation topology structure to the interconnection module. The interconnection module controls the connection of the arithmetic units in the operation unit to realize the operation of the computation topology structure. The method shown in FIG. 5B includes the following steps:

a step S502: obtaining user data, where the user data is for indicating a degree of the user's interest in a product.

In the present disclosure, the user data includes but is not limited to the user history, which includes purchase history, product browsing history, etc. Optionally, the user data may include personal information such as age, region, and education. Optionally, the user data may include information of a group that the user belongs to, such as region and browsing history of the group. Preferably, the user data may include time and the like, which is not restricted in the present disclosure.

Figure 5A:
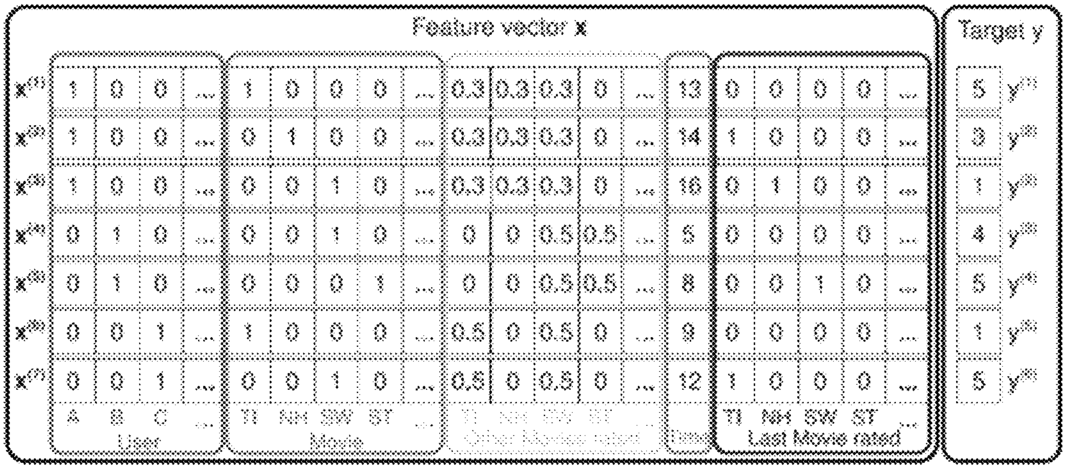
FIG. 5A is a schematic diagram of sparse user data.
Figure 5B:
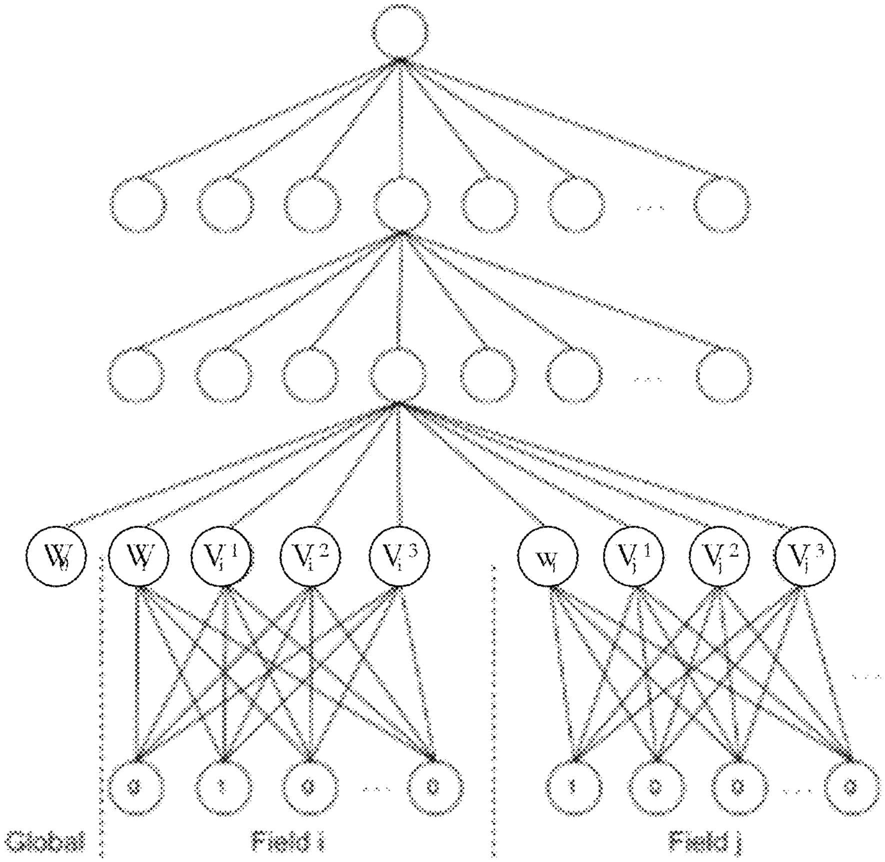
FIG. 5B is a schematic diagram of feature map extraction performed by a neural network.

The method shown in FIG. 5B includes a step S504: using an operation instruction in a computation device to perform deep learning processing on the user data to obtain product recommendation information; and a step S506: outputting the product recommendation information.

The step S504 is an intermediate processing step. In the step, a terminal device performs feature extraction on the user data by using the computation device, so as to obtain information of a product that the user may be interested in, which will be described in detail below.

Specifically, the computation device may use the feature extraction function of a deep neural network to extract a feature of the user data, and score each product based on the feature. The neural network layer may include, but is not limited to, a convolution layer, a fully connected layer, a pooling layer, a non-linear activation layer, a regularization layer, and the like.

A fully connected layer is taken as an instance to introduce an example of data processing in the layer. Specifically, the fully connected layer may receive N vectors (the length of each of the vectors is L) as input data, where N is a count of samples in batch processing. Output data outnum vectors of length L are used as weights for computing. For each of the N samples in batch processing, a computation process is to use each weight vector and an input data vector to perform an inner product computation. In a case where N>1, the same computation is performed on each sample. More specifically, the present disclosure uses a computation device in an artificial neural network chip (a computation device) to execute a fully connected layer instruction to complete a corresponding neural network algorithm.

In an optional example, the user data and commodity data are embedded and connected. This process may use a neural network layer such as a fully connected layer (MLP), a convolution neural network (CONV), and a restricted Boltzmann machine (RBM). The data after embedding and connecting passes through a fully connected layer and an activation layer, and is then subject to a matrix multiplication operation (Cross Product) with the data before embedding and connecting. More specifically, the present disclosure uses a computation unit in a computation device (such as an artificial neural network chip) to execute a fully connected layer instruction, a convolution instruction, and a matrix multiplication instruction to complete a corresponding algorithm.

Optionally, in an example of sparse user data, such as a case where some user information is incomplete, and the user information is high-dimensional since it contains information such as the region, the high-dimensional data needs to be mapped to low-dimensional data. A neural network method may also be used to complete the process of extracting the feature of the sparse user data into low-dimensional data. FIG. 5A shows a schematic diagram of sparse user data.

It can be seen from FIG. 5A that users rate movies differently. The figure shows the scores that user groups A, B, and C give to different movies. However, there are much missing information (which is represented by 0) in the data. For the sparse user information of FIG. 5A, the present disclosure uses a neural network as shown in FIG. 5B for feature extraction. As shown in FIG. 5B, the neural network includes a fully connected layer and an activation layer (CTR). More specifically, the present disclosure uses an operation unit in a computation device (an artificial neural network chip) to perform a corresponding fully connected layer instruction and activation instruction to complete a corresponding neural network algorithm.

Specifically, in an uppermost layer of a recommendation system, after the activation layer and a softmax operation, a score for each product in a product catalog may be generated. The scores are sorted, and n products with highest scores are output to the user. In other words, the obtained product recommendation information is information of the n products. More specifically, the present disclosure uses an operation unit in a computation device (an artificial neural network chip) to perform a corresponding activation instruction, sorting instruction, and scalar comparison instruction, so as to complete these operations.

Based on the examples of the present disclosure, the feature of a user may be extracted more accurately, quickly, and comprehensively for generating product recommendation. Compared with the prior art that uses a general-purpose processor for analysis and recommendation, the present disclosure may have technical effects of lower power consumption and faster speed.

Figure 3E:
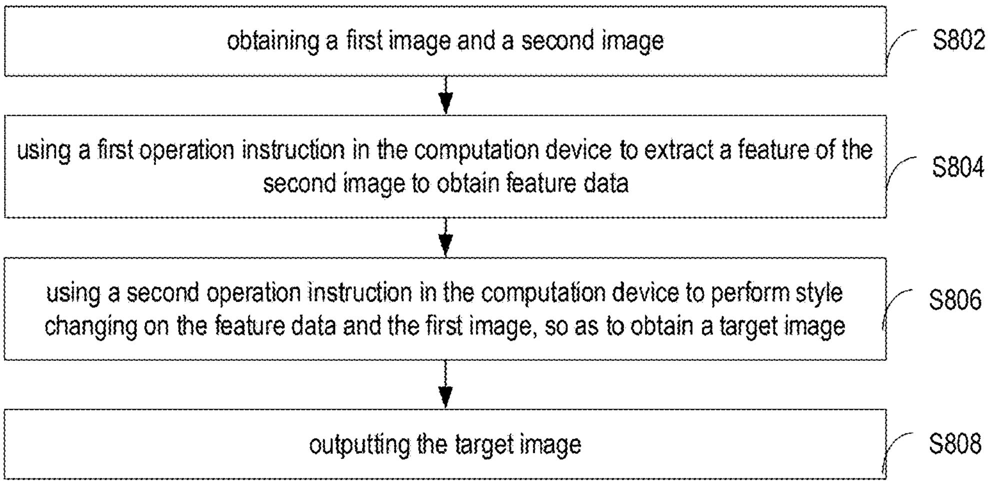
FIG. 3E provides a flowchart of an information processing method based on the computation device.

The changing of painting style of an image (which is characteristic of an image) is taken as an instance. FIG. 3E is an information processing method based on the computation device provided by an example of the present disclosure. The method shown in FIG. 3E includes:

a step S802: obtaining a first image and a second image. The first image is an image whose painting style is to be changed. The second image is a reference image whose painting style serves as a target painting style of the first image.

In the present disclosure, the first image may be an image whose painting style is to be changed, or an image whose characteristic is to be changed. The second image is a reference image for changing the first image to a target style. The second image may be custom-designated/configured by the user or the terminal device. For instance, a reference image of a landscape style or a pastoral style may be designated as the second image. The disclosure does not restricted a format of the first image and the second image. For instance, the first image or the second image may include but is not limited to a video or a group of pictures. The disclosure does not restricted an input format of the terminal device. For instance, the terminal device may support a decimal data type, a hexadecimal data type, and the like.

In an optional example, the terminal device supports the first image or the second image in a matrix format. In other words, for an input picture whose style is to be changed, the picture may be changed into a matrix whose size/dimension is C*H*W. C denotes a count of color channels of the picture. For instance, for a grayscale picture, C=1; and for a color picture, C=3. H denotes the height of the picture, W denotes the width of the picture. The unit of H and W may be the pixel.

It should be understood that when the image whose style is to be changed (which is the first image) is a piece of video, frames of the piece of video may be extracted so as to obtain a picture of each frame. Then a picture of each frame is subject to the subsequent processing of style changing. It is supposed that a frame of a picture or video whose style is to be changed is X, and the reference image of the target style is Y. The reference image of the target style Y may be set independently by the user or the terminal device, which is not restricted in the present disclosure.

The method shown in FIG. 3E further includes: a step S804: using a first operation instruction in the computation device to extract a feature of the second image to obtain feature data;

a step S806: using a second operation instruction in the computation device to perform style changing on the feature data and the first image, so as to obtain a target image after the style changing; and a step S808: outputting the target image.

The steps S804 and S806 are intermediate processing steps of changing the painting style of an image to a target style by the computation device. An example of S802 will be described in detail below.

The computation device may use a plurality of neural network layers to compute the reference image Y (which may be a C*H*W matrix) to obtain a feature of the reference image Y. Then, computation device uses the feature and the image X to be rendered (the first image input in the step S802 or a picture of a frame of the first image) to perform a corresponding matrix operation, so as to obtain a rendered image. Finally, for video stream data, an image processing technique (such as motivation estimation) may be used on the rendered image to predict a new image, then after frame interpolation processing, the target image may be obtained/generated.

In a certain application, the computation device may use a neural network model to extract the feature of the reference image Y. The neural network model includes but is not limited to a neural network models such as Alexnet, VGG, and ResNet. These neural network layers may include a convolution layer, a fully connected Layer, a pooling layer, a non-linear activation layer, and a regularization layer.

In the example below, a convolution layer and a fully connected layer are used for explaining the processing of frame image data.

First, the convolution layer may receive a four-dimensional data block whose dimensions are N*C*H*W. In other words, four-dimensional matrix data is input data N denotes a count of samples for batch processing, outnum three-dimensional convolution kernels whose dimensions are C*Kh*Kw are used as weights for computation. For each of the N samples for batch processing, a computation process is to use each convolution kernel to slide in the H and W dimensions of the input data, and when the convolution kernel slides to each position, an inner product computation is performed on the convolution kernel and corresponding input data of the position. The input data is extracted and rearranged according to C*Kh*Kw pieces of data corresponding to each position where the convolution kernel slides. It is assumed that there are Kernum sliding positions of convolution kernel, the convolution layer computes a sample of batch processing. In a case where N>1, the same computation is performed on each sample. Specifically, the present disclosure uses a computation device, such as a computation unit in an artificial neural network chip to perform a convolution layer instruction, so as to complete a corresponding neural network algorithm.

Second, the fully connected layer may receive N vectors (the length of each of the vectors is L) as input data, where N is a count of samples of batch processing. outnum vectors of length L are used as weights for computing. For each of the N samples of batch processing, a computation process is to use each weight vector and an input data vector to perform an inner product computation. In a case where N>1, the same computation is performed on each sample. The present disclosure uses an operation unit in a computation device (an artificial neural network chip) to perform a corresponding fully connected layer instruction, so as to complete a corresponding neural network algorithm.

In an example of the present disclosure, the above-mentioned neural network layers (including the convolution layer and the fully connected layers) may be used to form a VGG neural network. It is assumed that Z: a target image in a target style, X: an image to be changed, and Y: a target style image are generated, the following formula may be obtained:

$$L_{content}(z, x) = \sum_{l,i,j} a_i\left(F_{ij}^{(1)} - P_{ij}^{(1)}\right)^2$$

The formula reflects the difference between the target image Z in the target style and the original image X to be changed. F and P are intermediate layers when the image X to be changed and Z pass through VGG. A Gram matrix defined by F and P is as follows:

$$G_{ij}^{\,n}=\Sigma_k F_{ik}^{\,(n)} F_{jk}^{\,(n)}$$

i and j are different feature maps of a certain layer. The formula and the Gram matrix may be used to obtain the following texture definition formula:

$$L_{texture}(z, y) = \sum_{l,i,j} \frac{\omega_l}{4M_1^2N_1^2}\left(G_{ij}^{(1)} - A_{ij}^{(1)}\right)^2$$

The formula reflects the difference between the target image Z and the style image Y, and G and A are the Gram matrices of the image Y and the target image Z respectively. An objective function is to minimize a loss function L=aLcontent+bLtexture. In an application, a derivative of the target image Z may be obtained, and a value of Z may be updated, then output result information may be obtained (the target image of the target style). More specifically, the present disclosure uses a computation unit in a computation device (an artificial neural network chip) to execute a matrix multiplication instruction, a matrix addition instruction, and a scalar logic arithmetic operation instruction to complete an operation of the formula above.

Preferably, the present disclosure uses image processing technique to accelerate the realization of an algorithm for changing the style of a video stream. After the video stream generates a frame of a style-changed image in the process above, instead of using a random image as a general target image Z, a motion estimation algorithm is used for motion compensation to generate an initial state of a new target image Z, which may improve the accuracy of the video. Specifically, a moving image is divided into several blocks or macroblocks, and the position of each block or macroblock in an adjacent frame image is searched out, and a relative offset of the spatial position between the two is obtained. The offset is usually referred to as a motion vector. According to a position indicated by the motion vector, a corresponding block or macroblock is found from a neighboring reference frame image, then after adding a prediction error, a position of the block or macroblock in a current frame can be obtained. The motion-compensated frame is used as the above-mentioned initial target image Z and is then used in the algorithm above to compute the target image Z whose style has been changed. More specifically, the present disclosure uses a computation unit in a computation device (an artificial neural network chip) to execute a matrix multiplication instruction, a matrix addition instruction, and a scalar logic arithmetic operation instruction to complete the process.

Based on the examples of the present disclosure, image information may be changed to a target style to obtain a target image in the target style more accurately, quickly, and comprehensively. Compared with the prior art that uses a general-purpose processor for processing, the present disclosure may have technical effects of lower power consumption and faster speed.

Figure 3F:
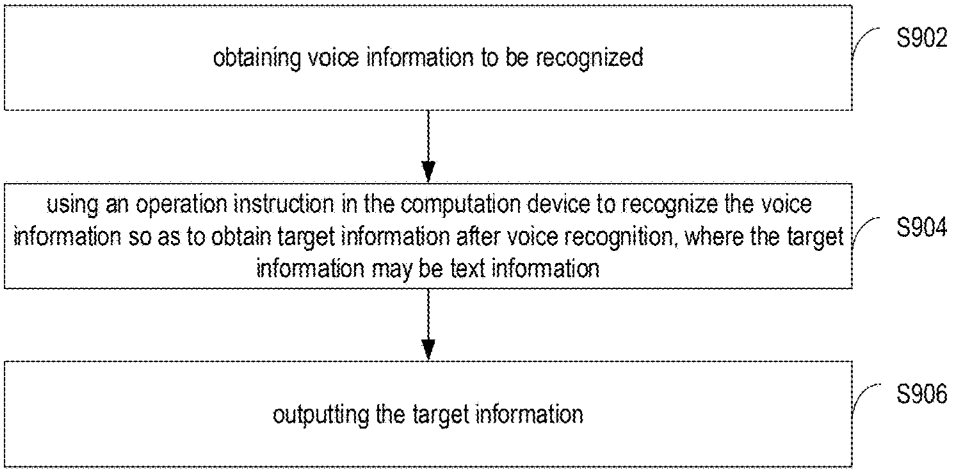
FIG. 3F provides a flowchart of an information processing method based on the computation device.

Voice recognition is taken as an instance. FIG. 3F is an information processing method based on the computation device provided by an example of the present disclosure. A structure of the computation device is shown in FIG. 2A. An operation instruction shown in FIG. 3F is fetched from the register unit by the controller unit and then sent to the operation unit. The operation unit performs the operation of the operation instruction. If the operation requires a multi-layer operation, the controller unit fetches a computation topology structure corresponding to the operation from the register unit, sends the computation topology structure to the interconnection module. The interconnection module controls the connection of the arithmetic units in the operation unit to realize the operation of the computation topology structure. The method shown in FIG. 3F includes the following steps:

a step S902: obtaining voice information to be recognized.

In the present disclosure, the voice information may be a file of voice data to be recognized. The present disclosure does not restrict a format of the voice information. For instance, the format of the voice information includes but is not limited to mp3, way, ogg, wma, cd, and other audio data formats.

The method shown in FIG. 3F further includes: a step S904, using an operation instruction in the computation device to recognize the voice information so as to obtain target information after voice recognition, where the target information may be text information; and a step S906: outputting the target information.

The steps S904 is a process of intermediate processing of performing voice recognition on voice information by the computation device, which will be described in detail below.

The process of intermediate processing includes but is not limited to pre-processing. Preferably, the process may also include any one or more of the following: speech model processing, language model processing, and decoder decoding processing. Below is a detailed description.

First, the pre-processing process in the system: generally, an algorithm that may be involved in the pre-processing process includes any one or more of the following: FFT (Fast Fourier Transform), a rectangular window, a Hamming window, a neural network algorithm, and the like. More specifically, the present disclosure may use a computation unit in a computation device (an artificial neural network chip) to perform functions such as a matrix multiplication instruction, a matrix addition instruction, a scalar multiplication instruction, a scalar addition instruction, etc., to complete the algorithms including FFT, the rectangular window, the Hamming window, and the like. The present disclosure uses a computation device, such as a computation unit in an artificial neural network chip, to execute a neural network convolution layer instruction, a fully connected layer instruction, a pooling layer instruction, and other functional instructions to complete the neural network method.

When a part of an algorithm of each application scenario involves pooling forward computations and pooling backward training, the present disclosure uses a device and an instruction set for performing pooling operations to solve the problem of the lack of CPU and GPU computing performance, and the problem of high front-end decoding overhead. By using a dedicated on-chip cache for pooling operations, the present disclosure may fully utilize the reusability of input neurons and weight data, which may help to avoid repeated reading of the data to a memory, reduce memory access bandwidth, and avoid the problem that memory bandwidth becomes a bottleneck of a pooling forward operation and the performance of backward training.

In each application scenario, as long as an algorithm to be run includes an operation of a pooling layer, the algorithm can be used to achieve the above-mentioned technical effects.

Second, the processing of the language model and the speech models in the system: The speech model may also be referred to as an acoustic model, which includes but is not limited to a Markov model, or a neural network model, or n-gram, etc. A formula of hidden Markov and n-gram is: $P(w)=P(w1)P(w2|w1)P(w3|w1, w2)P(w4|w2, w3) \ldots P(wn|wn-1, wn-2)$. Each of the conditional probabilities can be found according to the Bayes' formula. More specifically, the present disclosure uses a computation device, such as a computation unit in an artificial neural network chip, to perform functions such as a matrix multiplication instruction, a matrix addition instruction, a scalar multiplication instruction, a scalar addition instruction, etc., to complete the algorithms including the n-gram, Hidden Markov chain, and the like. The present disclosure uses a computation unit in a computation device to execute a neural network convolution layer instruction, a fully connected layer instruction, and a pooling layer instruction to complete the neural network method.

Third, the processing of the decoder in the system: A decoder algorithm in the system generally includes, but is not limited to, Viterbi algorithm, beam search algorithm, A* algorithm, WFST and other algorithms. Support for sorting algorithms is the core. More specifically, the present disclosure uses a computation device, such as a computation unit in an artificial neural network chip, to execute a functional instruction such as a vector sorting instruction, a scalar addition instruction, and a scalar subtraction instruction to complete Viterbi algorithm, beam search algorithm, A* algorithm, and WFST.

Specifically, the computation device may use the above-mentioned pre-processing, and optionally other algorithm models to perform speech recognition on the input speech information so as to output target information after obtaining a recognition result. The present disclosure does not restrict an output form of the target information. For instance, the target information may be output as text.

In an optional example, a method of obtaining a recognition result (which is the target information) by the computation device (such as an artificial neural network chip) may be: based on an iteration algorithm, generating scores for all words to be selected by iterating; during each iteration, generating new scores for all the words to be selected; after the iterations are completed, generating a search space for all the words in a time sequence; and applying a decoder algorithm in the space to obtain a final and unique output result of voice recognition, that is, the target information. The iteration algorithm and the target information will not be described in detail in the present disclosure.

Based on the examples of the present disclosure, voice information may be recognized more accurately, quickly, and comprehensively. Compared with the prior art that uses a general-purpose processor for processing, the present disclosure may have technical effects of lower power consumption and faster speed.

It should be noted that though the instances above describes five application scenarios of the information processing method based on the computation device, they are merely for illustration purposes and do not impose any limitation on the present disclosure. The principles above may also be applied to examples of the information processing based on the computation device in different scenarios, such as object recognition, image retouching, image resolution reconstruction, and other application scenarios, which is not restricted in the present disclosure.

It should be noted that, in all the application scenarios shown in FIG. 3A to FIG. 3F, the information to be processed (such as image information to be recognized, voice information, etc.) may be stored in the storage medium of the computation device shown in FIG. 2A, so that the computation device may obtain a relevant operation instruction under the control of the controller unit and perform relevant processing on the information to be processed, then obtain and output result information, which will not be described in detail here.

Figure 6A:
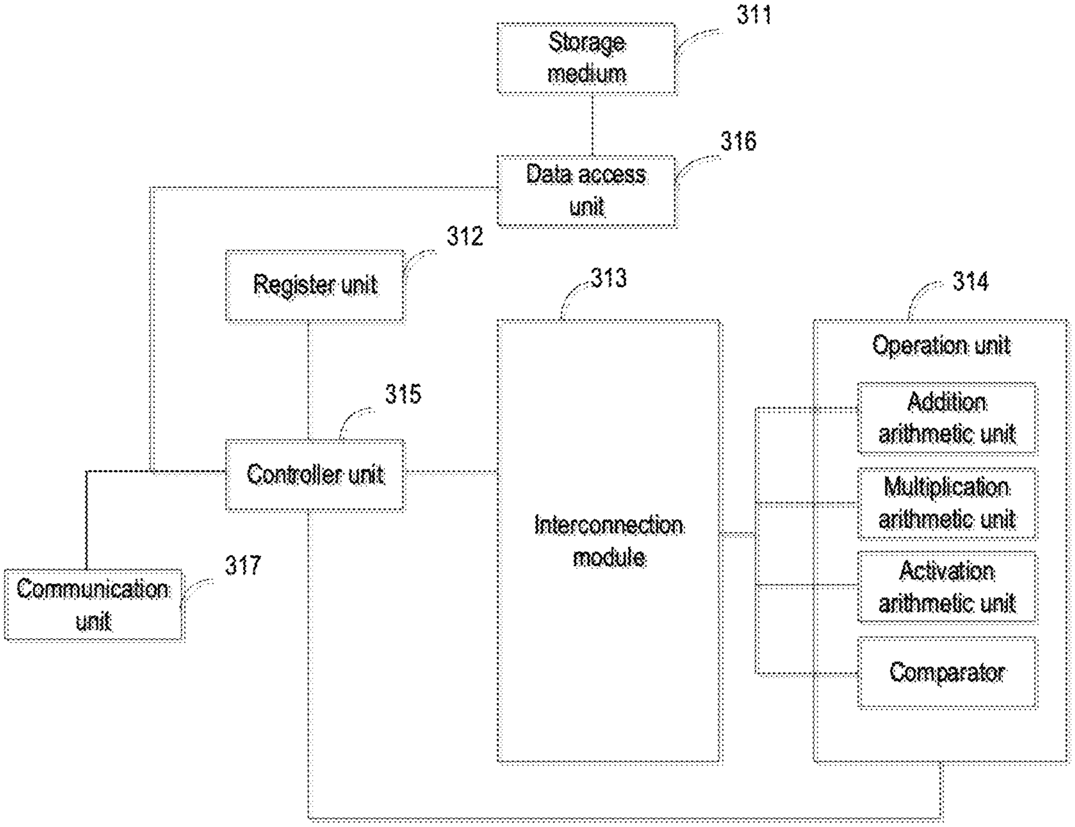
FIG. 6A is a schematic diagram of a terminal device according to an example of the present disclosure.

Based on the foregoing conception provided by the disclosure, FIG. 6A is a schematic diagram of a terminal device according to an example of the present disclosure. As shown in FIG. 6A, the terminal device in the present example may include: a storage medium 311 (optional), a register unit 312, an interconnection module 313, an operation unit 314, a controller unit 315, a data access unit 316, and a communication unit 317. The communication unit 317 is configured to support the communication from the terminal device to another terminal device or a server. For instance, the communication unit 317 is configured to communicate with another terminal device to receive first information sent by another device (which is the step S102).

The controller unit 315 is configured to control and manage an action of the terminal device. For instance, the controller unit 315 is configured to realize a related technical description in the foregoing example. The controller unit 315 provided in the present disclosure may be configured to:

obtain the first information, where the first information is information to be processed by the terminal device, and the terminal device includes a computation device;

call an operation instruction in the computation device to compute the first information to obtain second information; and output the second information.

In some possible examples, when the controller unit 315 obtains the first information, the controller unit 315 pre-processes raw information to obtain the first information. The first information is in a preset format. The pre-processing includes at least one of: data deduplication, data encoding, data conversion, and normalization.

In some possible examples, the operation instruction includes at least one of: a matrix-multiply-vector instruction, a vector-multiply-matrix instruction, a matrix-multiply-scalar instruction, a tensor operation instruction, a matrix addition instruction, a matrix subtraction instruction, a matrix retrieving instruction, a matrix loading instruction, a matrix saving instruction, and a matrix moving instruction.

In some possible examples, when the first information is voice information and the computation device calls the operation instruction to process the first information so as to obtain the second information, a voice recognition algorithm is called in the computation device for performing voice recognition on the voice information to obtain the second information. The second information is text information. The voice recognition algorithm is composed of voice recognition instructions. The voice recognition instructions include operation instructions.

In some possible examples, when the first information is image information and the computation device calls the operation instruction to process the first information so as to obtain the second information, an image style changing algorithm is called in the computation device for changing a style of the image information. A style of the second information is different from that of the first information. The image style changing algorithm is composed of image style changing instructions. The image style changing instructions include operation instructions For the content not shown in the present example of the disclosure, please refer to the descriptions of related examples in the foregoing paragraphs.

The controller unit 315 may be a processor or a controller. For instance, the controller unit 315 may be a central processing unit (CPU), a general-purpose processor, a digital signal processor (DSP), an application-specific integrated circuit (ASIC), a field programmable gate array (FPGA), or other programmable logic devices, transistor logic devices, hardware components, or any combination thereof. The controller unit 315 may implement or realize various exemplary logical blocks, modules, and circuits described in the present disclosure. The processor may also be a combination capable of performing computation functions. For instance, the processor may include one or more micro-processor combinations, a combination of a DSP and a micro-processor, and the like. The communication unit 314 may be a communication interface, a transceiver, a transceiver circuit, etc., where the phrase communication interface is a general term which may include one or more interfaces, such as an interface between a sender client and a sender server. The storage medium 311 may be a storage unit or a memory.

In a certain application, the relevant functional units provided by the examples of the present disclosure is capable of performing the method provided by the examples the present disclosure, and can also realize the terminal device provided by the examples the present disclosure, which are not described in detail here.

The following describes some operation instructions applicable to the examples of method provided by the present disclosure as well as devices for executing the operation instructions. In other words, the following describes which device is used to call and execute an operation instruction so as to complete the method provided by the present disclosure.

Figure 6B:
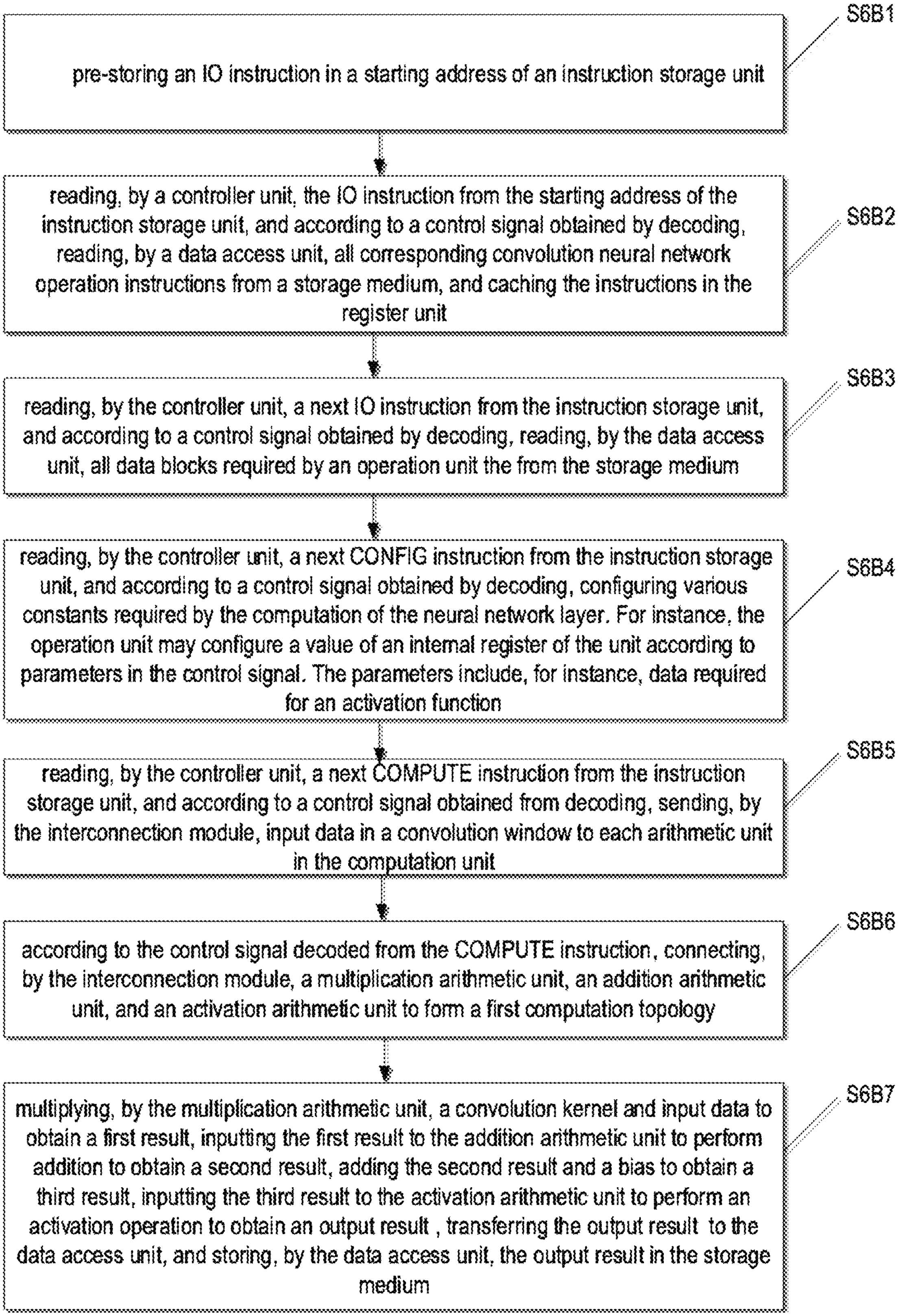
FIG. 6B is a flowchart of a convolution computation instruction according to an example of the present disclosure.

Specifically, in an instance where the operation instruction is a convolution computation instruction, a processing flow of the convolution computation instruction is shown in FIG. 6B. FIG. 6C to FIG. 6F show processing flows of a fully connected layer forward operation instruction, a pooling operation forward operation instruction, a pooling operation backward operation instruction, and a batch normalization forward operation instruction performed by the corresponding devices, which is not restricted in the present disclosure.

FIG. 6B is a flowchart of executing a convolution neural network by a convolution neural network computation device provided by an example of the present disclosure. As shown in FIG. 6B, a process of executing the convolution neural network instruction includes:

a step S6B1, pre-storing an IO instruction in a starting address of an instruction storage unit;

a step S6B2, reading, by a controller unit, the IO instruction from the starting address of the instruction storage unit, and according to a control signal obtained by decoding, reading, by a data access unit, all corresponding convolution neural network operation instructions from a storage medium, and caching the instructions in the instruction storage unit;

a step S6B3, reading, by the controller unit, a next IO instruction from the instruction storage unit, and according to a control signal obtained by decoding, reading, by the data access unit, all data blocks (for instance, input data, an interpolation table for a quick activation function operation, a constant table for configuring parameters of the operation device, biased data, etc.) required by an operation unit the from the storage medium; and a step S6B4, reading, by the controller unit, a next CONFIG instruction from the instruction storage unit, and according to a control signal obtained by decoding, configuring various constants required by the computation of the neural network layer. For instance, the operation unit may configure a value of an internal register of the unit according to parameters in the control signal. The parameters include, for instance, data required for an activation function.

The process of FIG. 6B further includes: a step S6B5, reading, by the controller unit, a next COMPUTE instruction from the instruction storage unit, and according to a control signal obtained from decoding, sending, by the interconnection module, input data in a convolution window to each arithmetic unit in the computation unit;

a step S6B6, according to the control signal decoded from the COMPUTE instruction, connecting, by the interconnection module, a multiplication arithmetic unit, an addition arithmetic unit, and an activation arithmetic unit to form a first computation topology;

a step S6B7, multiplying, by the multiplication arithmetic unit, a convolution kernel w and input data Xi to obtain a first result, inputting the first result to the addition arithmetic unit to perform addition to obtain a second result, adding the second result and a bias b to obtain a third result, inputting the third result to the activation arithmetic unit to perform an activation operation to obtain an output result S, transferring the output result S to the data access unit, and storing, by the data access unit, the output result in the storage medium. The step of adding the second result and the bias b to obtain the third result is optional, which means this step is not required when b is 0.

A computation method of the computation device as shown in FIG. 2A is explained below based on different operation instructions. The following is an instance where an operation instruction is a fully connected layer forward operation instruction which can be applied to a neural network. For the fully connected layer forward operation instruction, an operation formula may be: out=f (w1*in+b), where out denotes an output neuron vector, in denotes an input neuron vector, b denotes a bias vector, w1 denotes a weight, and f denotes an activation function. According to the operation, a computation topology may be obtained, which is: the multiplication arithmetic unit–the addition arithmetic unit–the activation arithmetic unit. In a certain application, the above-mentioned bias b may also be 0. A specific value of the bias b may be determined by the fully connected layer forward operation instruction.

The fully connected layer forward operation instruction of the artificial neural network includes an instruction set. The instruction set includes: a CONFIG instruction, a COMPUTE instruction, an IO instruction, a NOP instruction, a JUMP instruction, or a MOVE instruction, which will be described in detail below.

A method of performing a fully connected layer forward operation instruction by the computation device shown in FIG. 2A may include:

fetching, by the controller unit 615, the fully connected layer forward operation instruction, an operation field corresponding to the fully connected layer forward operation instruction, and a second computation topology (the multiplication arithmetic unit–the addition arithmetic unit–(optional) the activation arithmetic unit) corresponding to the fully connected layer forward operation instruction from the register unit 612; transferring, by the control unit, the operation field to the data access unit, and transferring the second computation topology to the interconnection module;

fetching, by the data access unit, a weight W1 and a bias b corresponding to the operation field from the storage medium, and transferring the weight W1 and the bias b to the computation unit; and multiplying, by the multiplication arithmetic unit of the computation unit, the weight W1 and input data in to obtain a first result, inputting the first result and the bias to the addition arithmetic unit to perform addition to obtain a second result, inputting the second result to the activation arithmetic unit to perform an activation operation to obtain an output result, transferring the output result to the data access unit, and storing, by the data access unit, the output result in the storage medium. After each step, the result may be transferred to the data access and stored in storage medium, without performing a following step. In addition, when the bias b is 0, the step of inputting the first result and the bias to the addition arithmetic unit to perform addition to obtain the second result may not be required.

In addition, the order of addition and multiplication can be reversed.

Figure 6C:
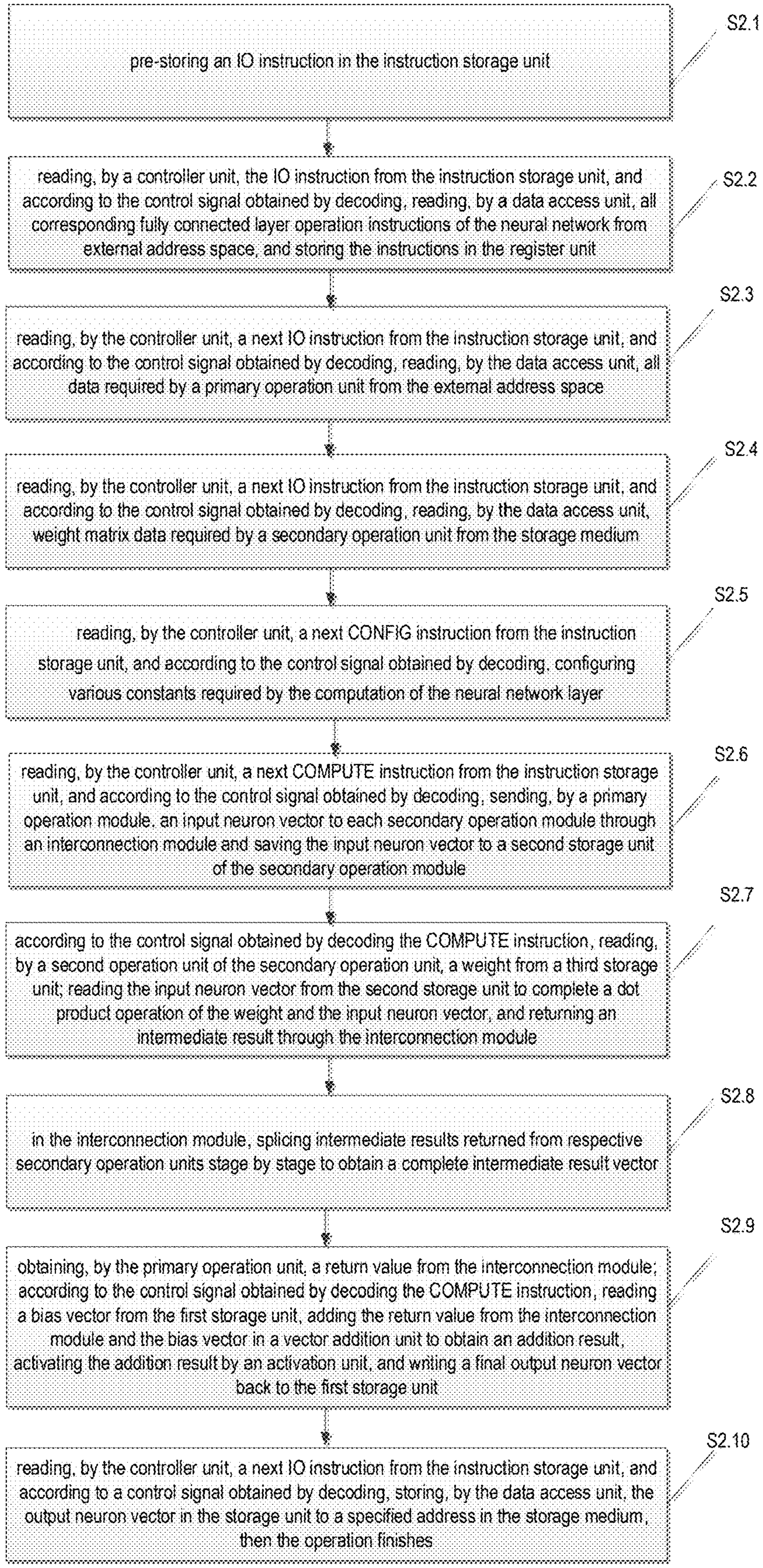
FIG. 6C is a flowchart of a forward operation instruction of a fully connected layer according to an example of the present disclosure.

FIG. 6C shows another detailed method of a fully connected layer forward operation of a single-layer artificial neural network.

The method includes: a step S2.1, pre-storing an IO instruction in the instruction storage unit;

a step S2.2, reading, by the controller unit, the IO instruction from the instruction storage unit, and according to a control signal obtained by decoding, reading, by the data access unit, all corresponding fully connected layer operation instructions of the artificial neural network from the storage medium, and storing the instructions in the instruction storage unit;

a step S2.3, reading, by the controller unit, a next IO instruction from the instruction storage unit, and according to a control signal obtained by decoding, reading, by the data access unit, all data (for instance, an input neuron vector, an interpolation table, a constant table, and a bias) required by a primary operation unit (which is the activation arithmetic unit) from the storage medium, and storing the data in a first storage unit of the primary operation unit;

a step S2.4, reading, by the controller unit, a next IO instruction from the instruction storage unit, and according to a control signal obtained by decoding, reading, by the data access unit, weight matrix data required by a secondary operation unit (which is the addition arithmetic unit or the multiplication arithmetic unit) from the storage medium;

a step S2.5 (optional), reading, by the controller unit, a next CONFIG instruction from the instruction storage unit, and according to a control signal obtained by decoding, configuring various constants required by the computation of the neural network layer;

a step S2.6, reading, by the controller unit, a next fully connected layer forward operation instruction from the instruction storage unit, and according to a control signal obtained by decoding, sending, by the primary operation unit, an input neuron vector to each secondary operation unit through the interconnection module and saving the input neuron vector to a second storage unit of the secondary operation module;

a step S2.7, according to the control signal obtained by decoding the COMPUTE instruction, reading, by a second operation unit of the secondary operation unit, a weight from a third storage unit; reading the input neuron vector from the second storage unit to complete a dot product operation of the weight and the input neuron vector, and returning an intermediate result through the interconnection module;

a step S2.8, in the interconnection module, splicing intermediate results returned from respective secondary operation units stage by stage to obtain a complete intermediate result vector;

a step S2.9, obtaining, by the primary operation unit, a return value from the interconnection module; according to the control signal obtained by decoding the COMPUTE instruction, reading a bias vector from the first storage unit, adding the return value from the interconnection module and the bias vector in a vector addition unit to obtain an addition result, activating the addition result by an activation unit, and writing a final output neuron vector back to the first storage unit; and a step S2.10, reading, by the controller unit, a next IO instruction from the instruction storage unit, and according to a control signal obtained by decoding, storing, by the data access unit, the output neuron vector in the storage unit to a specified address in the storage medium, then the operation finishes.

A computation method of the computation device as shown in FIG. 2A is explained below based on different operation instructions. The following is an instance where an operation instruction is a pooling operation instruction which can be applied to a neural network. A pooling operation refers to a downsampling operation of a local feature in a feature layer of the neural network to reduce a dimension of the feature layer. A pooling operation includes but is not limited to the following three types: maxpooling, which refers to taking a maximum value as a result in a kernel; avgpooling which refers to taking an average value in the kernel; and minpooling, which refers to taking a minimum value as a result in the kernel. The kernel refers to a pooling kernel whose size is specified by a parameter, and can slide on the feature layer according to a stride, and can perform the pooling operation to obtain the result. For a pooling operation instruction, an operation formula may be: out=avg(in)=Σin*1/kernel area, where out denotes an output neuron vector, in denotes all input neuron vectors in each kernel, kernel_area denotes an area of the kernel which is the pooling kernel (a total count of numbers in the kernel). The pooling may be average pooling according to an algorithm requirement. Of course, in certain application, the pooling may also be max pooling, min pooling, or other forms of pooling. According to the operation, a computation topology may be obtained, which is: (optional) the multiplication arithmetic unit–the addition arithmetic unit/comparison arithmetic unit–(optional) the activation arithmetic unit.

The pooling instruction set includes: a CONFIG instruction, a COMPUTE instruction, an IO instruction, an NOP instruction, a JUMP instruction, or a MOVE instruction.

The CONFIG instruction configures various constants required by a computation of a current artificial neural network layer before the computation starts. For instance, 1/kernel_area can be obtained by configuration using the CONFIG instruction.

The COMPUTE instruction includes a pooling operation instruction. The pooling operation instruction includes the following instructions.

A maxpooling forward operation instruction: according to the instruction, the device fetches input data of a specified size from a specified address in a memory (preferably a scratchpad memory or a scalar register), performs a maxpooling forward operation in a pooling operating component, and writes a result back to a specified address in the memory (preferably a scratchpad memory or a scalar register).

A maxpooling backward training instruction: according to the instruction, the device fetches input data of a specified size from a specified address in a memory (preferably a scratchpad memory or a scalar register), performs maxpooling backward training in a pooling operating component, and writes a result back to a specified address in the memory (preferably a scratchpad memory or a scalar register).

An avgpooling forward operation instruction: according to the instruction, the device fetches input data of a specified size from a specified address in a memory (preferably a scratchpad memory or a scalar register), performs an avgpooling forward operation in a pooling operating component, and writes a result back to a specified address in the memory (preferably a scratchpad memory or a scalar register).

An avgpooling backward training instruction: according to the instruction, the device fetches input data of a specified size from a specified address in a memory (preferably a scratchpad memory or a scalar register), performs avgpooling backward training in a pooling operating component, and writes a result back to a specified address in the memory (preferably a scratchpad memory or a scalar register).

A minpooling forward operation instruction: according to the instruction, the device fetches input data of a specified size from a specified address in a memory (preferably a scratchpad memory or a scalar register), performs a minpooling forward operation in a pooling operating component, and writes a result back to a specified address in the memory (preferably a scratchpad memory or a scalar register).

A minpooling backward training instruction: according to the instruction, the device fetches input data of a specified size from a specified address in a memory (preferably a scratchpad memory or a scalar register), performs minpooling backward training in a pooling operating component, and writes a result back to a specified address in the memory (preferably a scratchpad memory or a scalar register).

The IO instruction is for reading-in input data required for a computation from the storage medium, and saving data to the external address space after the computation finishes.

The NOP instruction is for emptying micro-instructions in all micro-instruction cache queues in the current device, and ensuring that all instructions before the NOP instruction are finished. The NOP instruction does not include any computation operation.

The JUMP instruction is for controlling the jumping of a next instruction address to be read from an instruction storage unit, so that the jumping of control flow can be realized.

The MOVE instruction is for moving data of an address in internal address space of the device to another address in the internal address space of the device. This process is independent of an operation unit and does not occupy the resources of the operation unit during execution.

Preferably, the register in the present disclosure may be a register file.

The method of performing a pooling operation of the present disclosure includes the following stages.

For the maxpooling (or minpooling) forward operation instruction, before the operation unit performs a forward operation, the data access unit may fetch in (all numbers in the kernel) from the memory according to the value of kernel_area stored in the instruction storage unit, and then transfer 1/kernel_area and ina to the operation unit for the forward operation. The operation unit may sequentially compare the size of each input vector and take a maximum value (or a minimum value) to obtain an output vector. For the maxpooling (or minpooling) backward training instruction, a corresponding index vector may be saved at the same time. An input vector of a new kernel, which is a pooling kernel, is cyclically read, and the above-mentioned comparison operation is performed to obtain an output vector of the new kernel until the pooling operation of this layer ends. During backward training, the operation unit outputs an input gradient vector to a corresponding storage position through the data access unit according to an index vector saved during the forward operation to obtain an output gradient vector. For the avgpooling forward operation instruction, the data access unit may fetch in (all numbers in the kernel) from the memory according to kernel_area stored in the instruction storage unit, and then transfer 1/kernel_area and in to the operation unit for performing the forward operation, the operation module 4 accumulates each input vector successively; then the operation module 4 multiplies the accumulation result by 1/kernel_area to obtain an output vector; an input vector of a new kernel is cyclically read and subject to the above-mentioned accumulation and multiplication operations to obtain an output vector of the new kernel until the end of the pooling operation of this layer. For the avgpooling backward training instruction, the operation module 4 multiplies an input gradient vector by 1/kernel_area, and outputs the input gradient vector to a corresponding storage position through the data access unit 3 to obtain an output gradient vector.

The control unit 615 fetches a pooling operation instruction and an operation field corresponding to the pooling operation instruction from the register unit 612. The control unit transfers the operation field to the data access unit.

The data access unit fetches in and 1/kernel_area corresponding to the operation field from the memory, and transfers in and 1/kernel_area to the computation unit.

The computation unit receives the data and executes the pooling instruction.

Figure 6D:
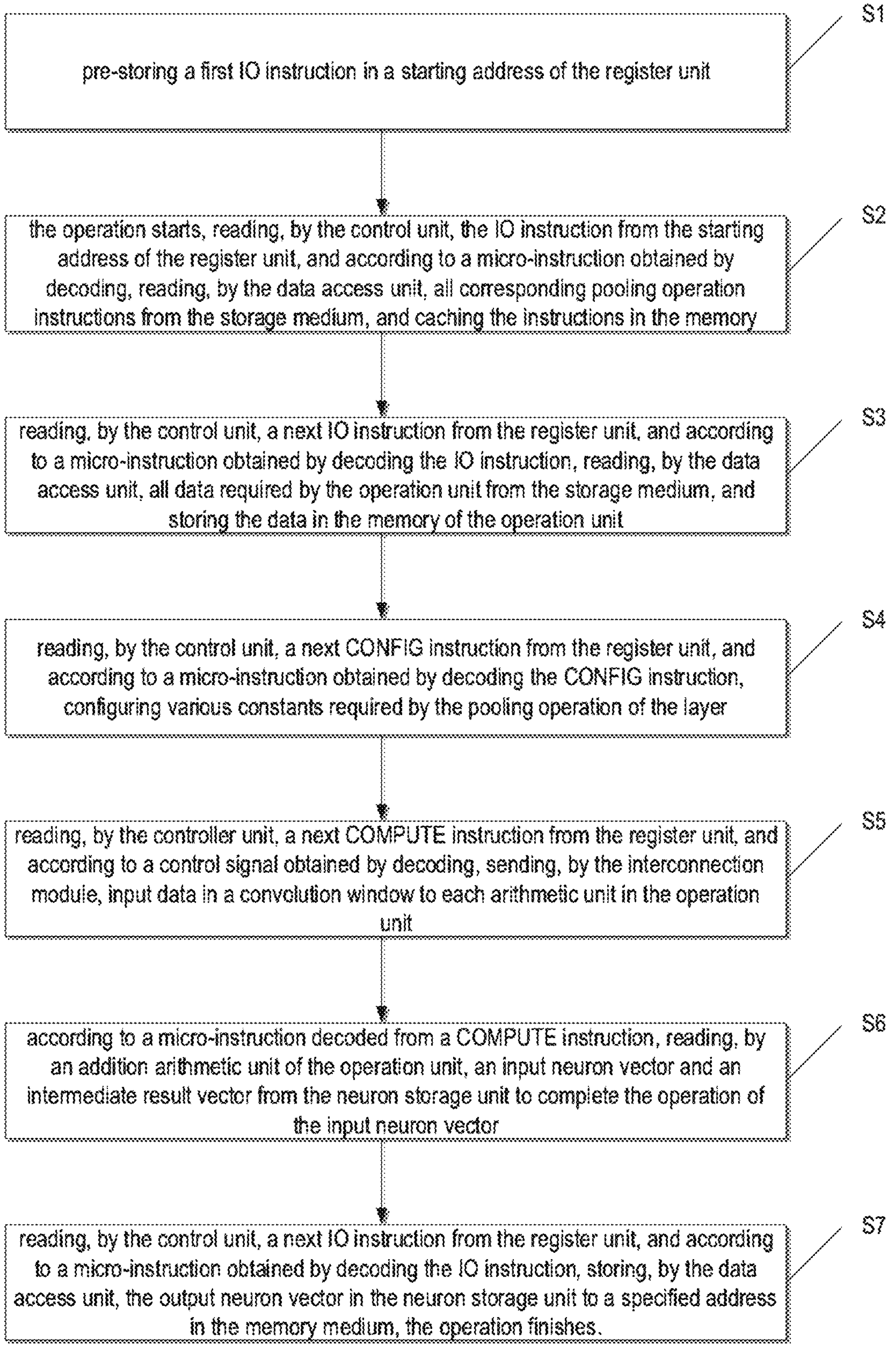
FIG. 6D is a flowchart of a forward operation of a pooling operation according to an example of the present disclosure.

For instance, for the avgpooling forward operation instruction, the multiplication arithmetic unit of the computation unit multiplies the input data in and 1/kernel_area to obtain a first result, and inputs the first result to the addition arithmetic unit to perform an addition operation to obtain a second result, and then (preferably) inputs the second result into the activation arithmetic unit for activating. Other instructions will not be described in detail.

kernel_area FIG. 6D shows a flowchart of a forward operation of a pooling operation according to an example. The flowchart describes a process of performing a pooling forward operation by using the device and the instruction set provided by the present disclosure.

The process includes: a step S1, pre-storing a first IO instruction in a starting address of the instruction storage unit;

a step S2, the operation starts, reading, by the control unit, the IO instruction from the starting address of the instruction storage unit, and according to a micro-instruction obtained by decoding, reading, by the data access unit, all corresponding pooling operation instructions from the memory, and caching the instructions in the memory;

a step S3, reading, by the control unit, a second IO instruction from the instruction storage unit, and according to a micro-instruction obtained by decoding the second IO instruction, reading, by the data access unit, all data (for instance, an input neuron vector, an interpolation table, a constant table, and the like) required by the operation unit from the memory, and storing the data in the memory of the operation unit; and a step S4, reading, by the control unit, a CONFIG instruction from the instruction storage unit, and according to a micro-instruction obtained by decoding the CONFIG instruction, configuring various constants required by the pooling operation of the layer. For instance, the operation unit configures a value of the internal register of the unit according to parameters in the micro-instruction. The parameters include, for instance, precision setting of the computation of the layer and data of an activation function (such as a precision bit of the computation of the layer, and 1/kernel_area, a reciprocal of the size of the pooling kernel during avgpooling).

The process further includes: a step S5, according to the micro-instructions obtained by decoding the COMPUTE instruction, reading, by the addition arithmetic unit of the operation unit, an input neuron vector and an intermediate result vector from the neuron storage unit to complete an operation of the input neuron vector (avgpooling is to accumulate the input nerve The meta vector is then multiplied by 1/kernel_area, maxpooling is comparing the size, and the maximum value is obtained), and writing a final output neuron vector back to the neuron storage unit; and a step S6, reading, by the control unit, a third IO instruction from the instruction storage unit, and according to a micro-instruction obtained by decoding the third IO instruction, storing, by the data access unit, the output neuron vector in the neuron storage unit to a specified address in the memory medium, the operation finishes.

Figure 6E:
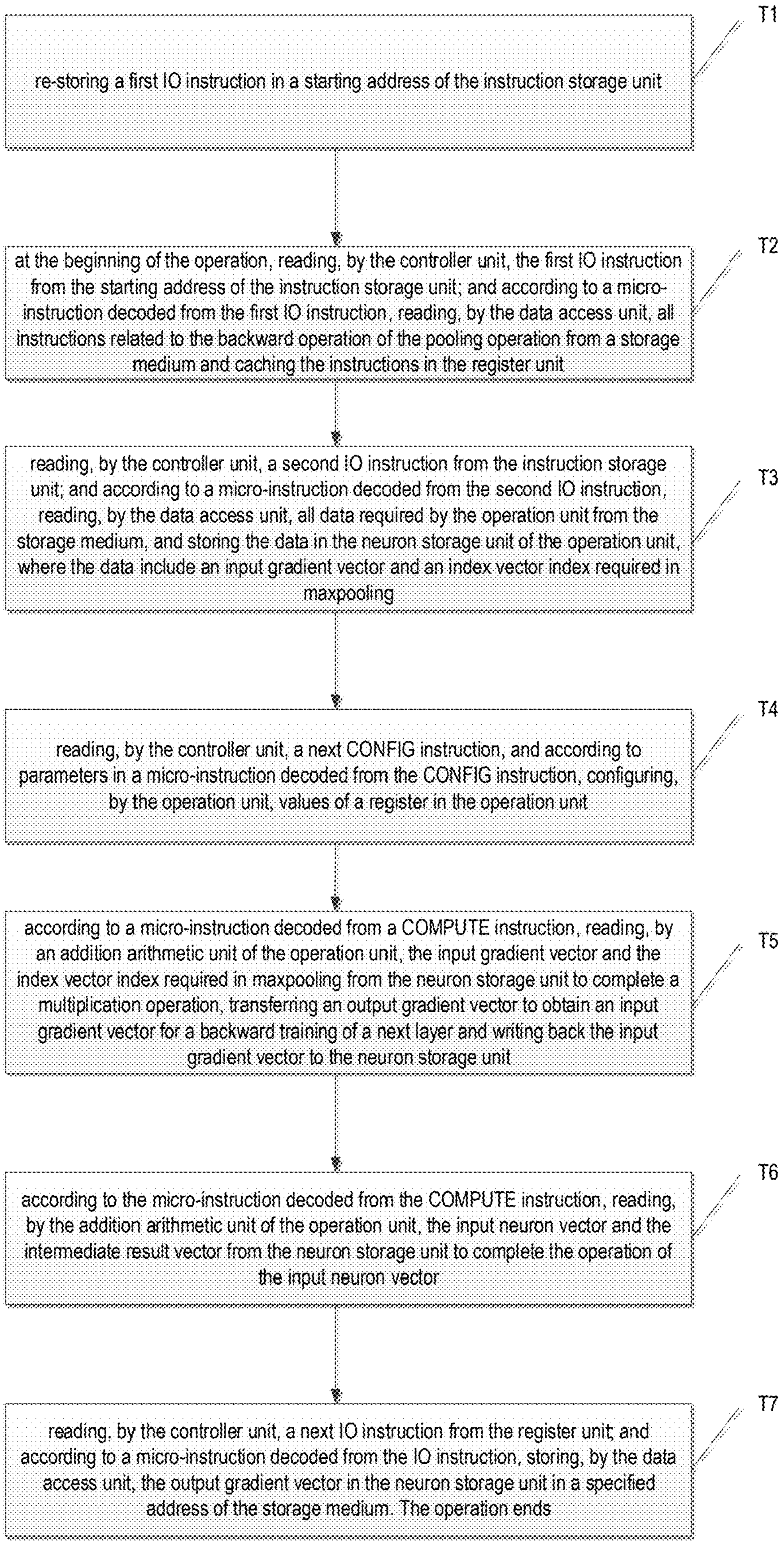
FIG. 6E is a flowchart of a backward operation of a pooling operation according to an example of the present disclosure.

FIG. 6E is a flowchart of a backward operation of a pooling operation according to an example of the present disclosure. This flowchart shows the process of implementing a backward training of the pooling operation using the device and instruction set of the present disclosure. The process includes:

a step T1, pre-storing a first IO instruction in a starting address of the instruction storage unit;

a step T2, at the beginning of the operation, reading, by the controller unit, the first IO instruction from the starting address of the instruction storage unit; and according to a micro-instruction decoded from the first IO instruction, reading, by the data access unit, all instructions related to the backward operation of the pooling operation from a storage medium and caching the instructions in the instruction storage unit;

a step T3, reading, by the controller unit, a second IO instruction from the instruction storage unit; and according to a micro-instruction decoded from the second IO instruction, reading, by the data access unit, all data required by the operation unit from the storage medium, and storing the data in the neuron storage unit of the operation unit, where the data include an input gradient vector and an index vector index required in maxpooling;

a step T4, reading, by the controller unit, a CONFIG instruction, and according to parameters in a micro-instruction decoded from the CONFIG instruction, configuring, by the operation unit, values of a register in the operation unit, which include various constants required in the pooling operation of the layer, a reciprocal 1/kernel_area of a size of a pooling kernel in avgpooling, precision setting of computation of the layer, a learning rate in weight updating, etc.;

a step T5, reading, by an addition arithmetic unit of the operation unit, the input gradient vector and the index vector index required in maxpooling from the neuron storage unit to complete a multiplication operation (1/kernel_area is multiplied in avgpooling, and the index vector index is multiplied in maxpooling), transferring an output gradient vector to obtain an input gradient vector for a backward training of a next layer and writing back the input gradient vector to the neuron storage unit; and a step T6, reading, by the controller unit, a third IO instruction from the instruction storage unit; and according to a micro-instruction decoded from the third IO instruction, storing, by the data access unit, the output gradient vector in the neuron storage unit in a specified address of the storage medium. The operation ends.

Regarding a pooling operation of a multi-layer artificial neural network, its implementation is similar to that of a pooling operation of a single-layer artificial neural network. After a previous-layer artificial neural network is executed, an operation instruction of a next layer performs the computation as mentioned above by using the output neuron vector or output gradient vector computed by the operation unit as an input neuron vector or input gradient vector of a training of the next layer. A weight address and a weight gradient address in the instruction may be changed to corresponding addresses of the previous layer.

Use of the device and the instruction set for performing pooling operations may solve the problems of lack of CPU and GPU operating performance and large front-end decoding overhead. The support for the pooling operation of the multi-layer artificial neural network is effectively improved.

For the algorithm of each application scenario that involves pooling forward operation and pooling backward training, the use of the device and the instruction set for performing pooling operations may solve the problems of lack of CPU and GPU operating performance and large front-end decoding overhead. By using a dedicated on-chip cache for pooling operations, the reusability of input neurons and weight data is fully tapped, which may avoid repeated reading of these data to memory, reduce memory access bandwidth, and avoid memory bandwidth from becoming the bottleneck of the forward operation of pooling operation and backward training performance.

In every application scenario, as long as the running algorithm includes the operation of the pooling layer, it can be used to achieve the above-mentioned beneficial effects.

By using a dedicated on-chip cache for pooling operations, the reusability of input neurons and weight data is fully tapped, which may avoid repeated reading of these data to memory, reduce memory access bandwidth, and avoid memory bandwidth from becoming the bottleneck of the forward operation of pooling operation and backward training performance.

The detailed computation method of the computation device shown in FIG. 2A is explained below through different operation instructions. Regarding the operation instructions here, the batch normalization operation instruction is taken as an example. The batch normalization operation instruction can be applied to a neural network. For the batch normalization operation instruction, the actual operating formula may be out=(in−middle1)/middle2, where out is the output neuron vector, in is the input neuron vector, middle1 and middle2 are the intermediate values in the operation, and the values of middle1 and middle2 may be the same or different. According to the actual operation, the topology of the computation can be obtained: addition arithmetic unit-multiplication arithmetic unit. Or, the actual computing formula can be: out=(in/middle2−middle1/middle2. In this case, the topology of the computation is multiplication arithmetic unit-addition arithmetic unit.

A batch normalization instruction set includes a CONFIG instruction, a batch normalization instruction, an IO instruction, an NOP instruction, a JUMP instruction, and a MOVE instruction, among which:

the CONFIG instruction configures various constants required by the computation of the current layer before the batch normalization computation begins;

the batch normalization instruction completes the computation of batch normalization; and other instructions may be seen in the relevant explanations in the foregoing examples and will not be repeated here.

The detailed method for performing batch normalization by the computation device shown in FIG. 2A may include:

fetching, by the control unit 615, operation fields corresponding to the batch normalization operation instruction and the batch normalization operation instruction from the register unit 612, and transferring, by the control unit, the operation fields to the data access unit;

fetching, by the data access unit, −middle1 and 1/middle2 corresponding to the operation field from the storage medium, and transferring middle to the operation unit;

performing, by the operation unit, the batch normalization operation instruction to obtain an output result, transferring the output result to the data access unit, and storing the output result in the storage medium.

Specifically, performing, by the operation unit, the batch normalization operation instruction to obtain the output result may include: performing, by the addition arithmetic unit of the operation unit, an addition operation on the input data in and −middle1 to obtain a first result, and inputting the first result and 1/middle2 to the multiplication arithmetic unit to perform multiplication operation to obtain an output result.

Figure 6F:
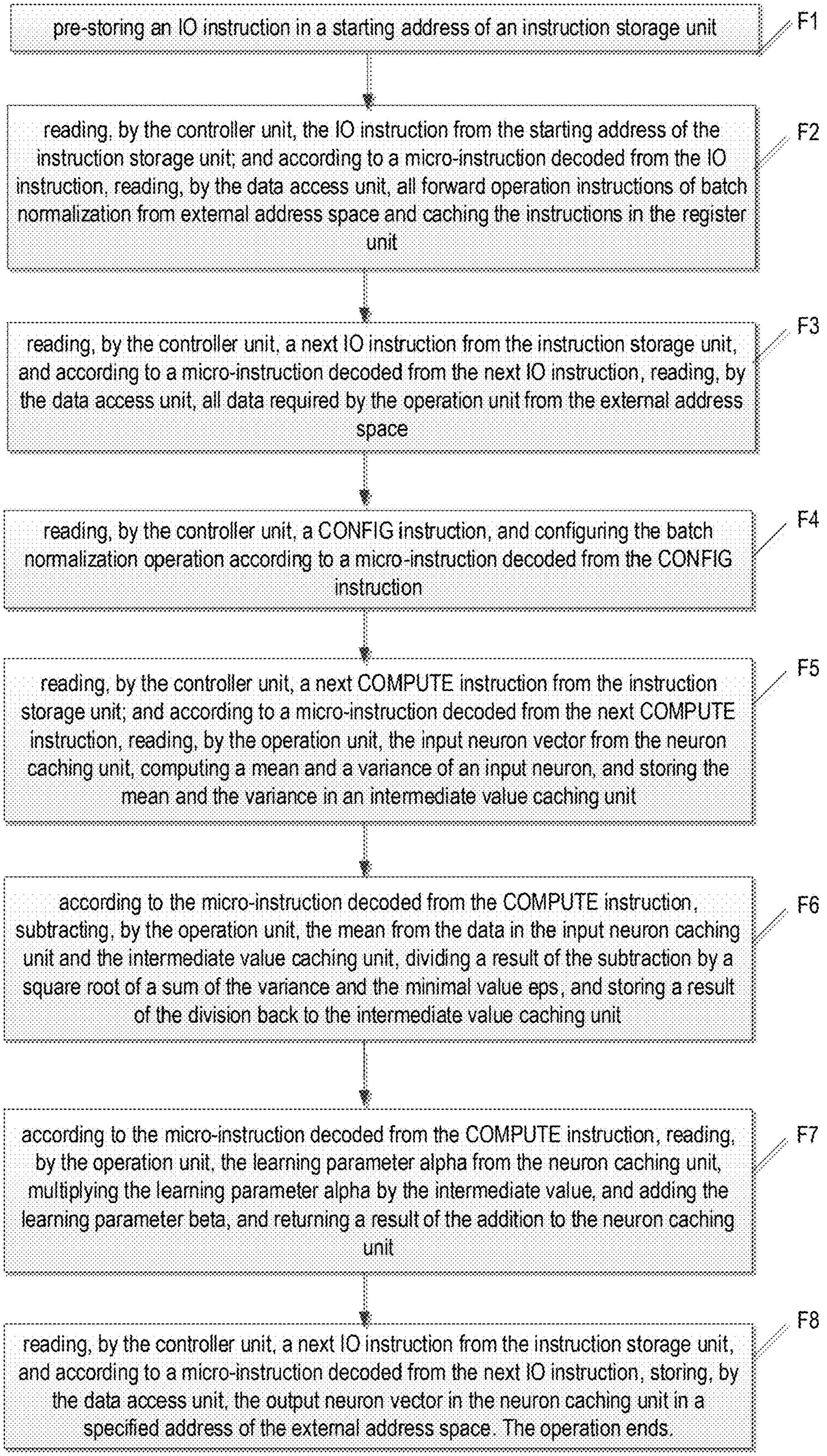
FIG. 6F is a flowchart of a forward operation of batch normalization according to an example of the present disclosure.

FIG. 6F is a flowchart of a forward operation of batch normalization according to an example of the present disclosure. This flowchart shows the process of implementing the forward operation of the batch normalization operation using the device and instruction set as shown in FIG. 2A. The flowchart includes:

a step F1, pre-storing an IO instruction in a starting address of an instruction storage unit.

a step F2, at the beginning of the operation, reading, by the controller unit, the IO instruction from the starting address of the instruction storage unit; and according to a micro-instruction decoded from the IO instruction, reading, by the data access unit, all forward operation instructions of batch normalization from external address space and caching the instructions in the instruction storage unit;

a step F3, reading, by the controller unit, a next IO instruction from the instruction storage unit, and according to a micro-instruction decoded from the next IO instruction, reading, by the data access unit, all data (including, for instance, input neuron vector, size of batch, learning parameter alpha, beta, minimal value eps, mean, and variance) required by the operation unit from the external address space, and storing the data in the neuron storage unit of the operation unit, where the data include an input gradient vector and an index vector index required in maxpooling;

a step F4, reading, by the controller unit, a CONFIG instruction, and configuring the batch normalization operation according to a micro-instruction decoded from the CONFIG instruction, for instance, determining whether the forward operation uses a mean and variance that are already obtained from computation or uses a mean and a variance that are to be obtained from computing input;

a step F5, reading, by the controller unit, a next CONFIG instruction from the instruction storage unit; and according to a micro-instruction decoded from the next CONFIG instruction, reading, by the operation unit, the input neuron vector from the neuron caching unit, computing a mean and a variance of an input neuron, and storing the mean and the variance in an intermediate value caching unit;

a step F6, according to the micro-instruction decoded from the COMPUTE instruction, subtracting, by the operation unit, the mean from the data in the input neuron caching unit and the intermediate value caching unit, dividing a result of the subtraction by a square root of a sum of the variance and the minimal value eps, and storing a result of the division back to the intermediate value caching unit;

a step F7, according to the micro-instruction decoded from the COMPUTE instruction, reading, by the operation unit, the learning parameter alpha from the neuron caching unit, multiplying the learning parameter alpha by the intermediate value, and adding the learning parameter beta, and returning a result of the addition to the neuron caching unit; and a step F8, reading, by the controller unit, a next IO instruction from the instruction storage unit, and according to a micro-instruction decoded from the next IO instruction, storing, by the data access unit, the output neuron vector in the neuron caching unit in a specified address of the external address space. The operation ends.

The difference between the forward process of the batch normalization operation in the process above and the forward process of the batch normalization operation in a training process is that a constant mean and a constant variance are configured in the step F4, so that dynamic computation is not required each time. In other words, the step F5 is removed. Other steps are the same as those of FIG. 2F.

A backward process of the batch normalization operation is similar to the forward process above. The difference between the two is that data for operation is different. It is assumed that a gradient introduced by a pixel is dl/dY, a gradient output by the backward process is dl/dx, an output of the forward process is Y, and other parameters denote the similar things as those of the forward process. A gradient that is output after the batch normalization backward propagation is dl/dx=(alpha/sqrt(var(x)+eps))*(dl/dY−mean(dl/dY)−mean(dl/dY*Y)*Y), where mean denotes an operation of finding a mean. A gradient of the learning parameter alpha is: dl/dalpha=(Σdl/dY)*Y. A gradient of the learning parameter beta is: dl/dbeta=Σdl/dY. The values of the learning parameters can be updated according to the two gradients above. During the back operation of the batch normalization operation, the operation unit may perform normalization operations to obtain gradient data such as a mean and a variance. Then the operation unit performs the remaining operations of the formula in parallel.

Use of the device and the instruction set for performing batch normalization operations may solve the problems of lack of CPU and GPU operating performance and large front-end decoding overhead. The support for batch normalization forward and backward operations is effectively improved.

By using a dedicated on-chip cache for batch normalization operations, input neurons and middle data may be fully reused, which may avoid repeated reading of these data from the memory, reduce the memory access bandwidth, and prevent the memory bandwidth from becoming a performance bottleneck of the forward operation of a multi-layer artificial neural network.

By using a dedicated operation unit for batch normalization operations, a better balance between parallel and serial operations may be achieved. The problems that the CPU architecture is only for serial operations and is slow in speed when processing large data, and the GPU architecture is only for parallel operations and cannot overcome the weakness of normalized operations may be avoided. In the present disclosure, the data storage unit and the operation unit can cooperate with each other to achieve a better balance between parallel and serial operations of normalization.

The batch normalization operation performed in the present disclosure can be applied to neural network algorithms, and can be used in computation devices in the field of neural networks, such as the computation devices shown in FIGS. 1, 1A, 4A, and 6A, artificial neural networks in computation devices, artificial neural network computation devices for sparse connections, and other computation devices, chips, or processors in the field of neural networks. Of course, the batch normalization operation can also be used in practical applications. The batch normalization operation performed in the present disclosure can improve the recognition precision of algorithm or computation device and algorithm robustness.

It should be explained that the computation instruction of the computation device above may be one or plural. In other words, the computation device can execute one or a plurality of the computation instructions. The computation instructions include, but are not limited to, the above-mentioned convolution instruction, a fully connected instruction, a batch normalization instruction, or a pooling instruction. The structure and application method of the instructions above can be found in the description of the examples shown in FIG. 2A, FIG. 6B, FIG. 6C, FIG. 6D, FIG. 6E, and FIG. 6F. Optionally, in addition to the instructions above, the computation device can also execute the following instructions:

a Vector-Inner-Product instruction (VP): according to the instruction, the device fetches vector data with a specified size from a specified address in a memory (preferably a scratchpad memory or a scalar register), computes an inner product (a scalar) between two vectors in a vector computation unit, and writes the result back; preferably, the result is written back to a specified address of the memory (preferably the scratchpad memory or the scalar register);

a vector cross product instruction (TENS): according to the instruction, the device fetches vector data with a specified size from a specified address in a memory (preferably a scratchpad memory or a scalar register), computes a cross product between two vectors in a vector computation unit, and writes the result back; preferably, the result is written back to a specified address of the memory (preferably the scratchpad memory or the scalar register);

a vector elementary arithmetic operation including a Vector-Add-Scalar instruction (VAS): according to the instruction, the device fetches vector data with a specified size from a specified address in a memory (preferably a scratchpad memory or a scalar register), fetches scalar data from a specified address of a scalar register of the memory, adds the scalar to each element of the vector in a scalar computation unit, and writes the result back; preferably, the result is written back to a specified address of the memory (preferably the scratchpad memory or the scalar register);

a Scalar-Sub-Vector instruction (SSV): according to the instruction, the device fetches scalar data from a specified address in the scalar register of a memory (preferably a scratchpad memory or a scalar register), fetches vector data from a specified address of the memory (preferably the scratchpad memory or the scalar register), subtracts corresponding elements of the vector from the scalar in a vector computation unit, and writes the result back; preferably, the result is written back to a specified address of the memory (preferably the scratchpad memory or the scalar register);

a Vector-Dev-Vector instruction (VD): according to the instruction, the device fetches vector data with a specified size from a specified address in a memory (preferably a scratchpad memory or a scalar register), performs an element-wise division of two vectors in a vector computation unit, and writes the result back; preferably, the result is written back to a specified address of the memory (preferably the scratchpad memory or the scalar register); and a Scalar-Dev-Vector instruction (SDV): according to the instruction, the device fetches scalar data from a specified address in the scalar register of a memory (preferably a scratchpad memory or a scalar register), fetches vector data from a specified address of the memory (preferably the scratchpad memory), divides the scalar by corresponding elements in the vector in a vector computation unit, and writes the result back; preferably, the result is written back to a specified address of the memory (preferably the scratchpad memory or the scalar register).

The computation device can also execute a vector logic instruction, including: a Vector-AND-Vector instruction (VAV): according to the instruction, the device fetches vector data of a specified size from a specified address in a memory (preferably a scratchpad memory or a scalar register), performs an element-wise AND operation on two vectors in a vector computation unit, and writes the result back; preferably, the result is written back to a specified address of the memory (preferably the scratchpad memory or the scalar register);

a Vector-AND instruction (VAND): according to the instruction, the device fetches vector data of a specified size from a specified address in a memory (preferably a scratchpad memory or a scalar register), performs an AND operation on each element of the vector in a vector computation unit, and writes the result back; preferably, the result is written back to a specified address of the scalar register of the memory (preferably the scratchpad memory or the scalar register);

a Vector-OR-Vector instruction (VOV): according to the instruction, the device fetches vector data of a specified size from a specified address in a memory (preferably a scratchpad memory), performs an element-wise OR operation on two vectors in a vector computation unit, and writes the result back; preferably, the result is written back to a specified address of the memory (preferably the scratchpad memory or a scalar register);

a Vector-OR instruction (VOR): according to the instruction, the device fetches vector data of a specified size from a specified address in a memory (preferably a scratchpad memory or a scalar register), performs an OR operation on each element of the vector in a vector computation unit, and writes the result back; preferably, the result is written back to a specified address of the scalar register of the memory (preferably the scratchpad memory or the scalar register); and a transcendental function instruction: according to the instruction, the device fetches vector data of a specified size from a specified address in a memory (preferably a scratchpad memory or a scalar register), performs a transcendental function operation on the vector data in an operation unit, and writes the result back. Back and write the results back; preferably, the result is written back to a specified address of a storage unit of the memory (preferably the scratchpad memory or the scalar register); preferably, the result is written back to a specified address of the memory (preferably the scratchpad memory or the scalar register).

The computation device can also execute a vector comparison operation instruction, including:

a Greater-Equal operation instruction (GE): according to the instruction, the device may obtain parameters of the instruction, including a length of a vector, a starting address of two vectors, and a storage address of an output vector, directly from the instruction or by accessing the number of the register of a memory (preferably a scratchpad memory or a scalar register) provided by the instruction, then read the data of the two vectors, and compare the elements at all positions in the vectors in a vector comparison operation unit; at the position of a row, if the value of a previous vector is greater than or equal to the value of a subsequent vector, the value of the comparison result vector at that position is set to 1, otherwise it is set to 0; finally, the comparison result is written back to a specified storage address in the memory (preferably the scratchpad memory or the scalar register);

a Less-Equal operation instruction (LE): according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register) provided by the instruction, then read the data of the two vectors, and compare the elements at all positions in the vectors in a vector comparison operation unit; at the position of a row, if the value of a previous vector is less than or equal to the value of a subsequent vector, the value of the comparison result vector at that position is set to 1, otherwise it is set to 0; finally, the comparison result is written back to a specified storage address in the memory (preferably the scratchpad memory or the scalar register);

a Greater-Than operation instruction (GT): according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register) provided by the instruction, then read the data of the two vectors, and compare the elements at all positions in the vectors in a vector comparison operation unit; at the position of a row, if the value of a previous vector is greater than the value of a subsequent vector, the value of the comparison result vector at that position is set to 1, otherwise it is set to 0; finally, the comparison result is written back to a specified storage address in the memory (preferably the scratchpad memory or the scalar register);

a Less than operation instruction (LT): according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register) provided by the instruction, then read the data of the two vectors, and compare the elements at all positions in the vectors in a vector comparison operation unit; at the position of a row, if the value of a previous vector is less than the value of a subsequent vector, the value of the comparison result vector at that position is set to 1, otherwise it is set to 0; finally, the comparison result is written back to a specified storage address in the memory (preferably the scratchpad memory or the scalar register);

an Equal operation instruction: according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register) provided by the instruction, then read the data of the two vectors, and compare the elements at all positions in the vectors in a vector comparison operation unit; at the position of a row, if the value of a previous vector is equal to the value of a subsequent vector, the value of the comparison result vector at that position is set to 1, otherwise it is set to 0; finally, the comparison result is written back to a specified storage address in the memory (preferably the scratchpad memory or the scalar register);

an Unequal operation instruction (UEQ): according to the instruction, the device may obtain the parameters of the instruction, including the length of a vector, the starting address of the two vectors, and the storage address of the output vector, directly from the instruction or by accessing the number of the register of a memory (preferably a scratchpad memory or a scalar register) provided by the instruction, then read the data of the two vectors, and compare the elements at all positions in the vectors in a vector comparison operation unit; at the position of a row, if the value of a previous vector is not equal to the value of a subsequent vector, the value of the comparison result vector at that position is set to 1, otherwise it is set to 0; finally, the comparison result is written back to a specified storage address in the memory (preferably the scratchpad memory or the scalar register);

a Vector Max instruction (VMAX): according to the instruction, the device fetches vector data of a specified size from a specified address in a scratchpad memory of a memory (preferably a scratchpad memory or a scalar register), selects a largest element from the vector data as a result, and writes the result back; preferably, the result is written back to a specified address of the scalar register of the memory (preferably the scratchpad memory or the scalar register);

a Vector Min instruction (VMIN): according to the instruction, the device fetches vector data of a specified size from a specified address in a scratchpad memory of a memory (preferably a scratchpad memory or a scalar register), selects a minimum element from the vector data as a result, and writes the result back; preferably, the result is written back to a specified address of the scalar register of the memory (preferably the scratchpad memory or the scalar register);

a Cyclic Shift operation instruction: according to the instruction, the device may obtain the parameters of the instruction directly from the instruction or by accessing the serial number of the register of a memory (preferably a scratchpad memory or a scalar register) provided by the instruction, then cyclically shift vectors in a vector shift unit (which may be a separate vector shift unit or a computation unit), and then write the result of the shift back to a specified storage address in the scratchpad memory of the memory (preferably the scratchpad memory or the scalar register), where the format of the cyclic shift operation instruction format, which is shown in FIG. 3, contains four operation fields, a starting address and length of a vector, a shift stride, and a storage address of an output vector; and a Random-Vector generation instruction: according to the instruction, the device reads one or more randomly distributed parameters, and the size and storage address of a random vector to be generated from the instruction or from the register of a memory (preferably a scratchpad memory or a scalar register), generates the random vector that is in line with the random distribution in a random vector generation unit, and then writes the result of the random vector back to the specified storage address in the memory (preferably the scratchpad memory or the scalar register).

The random vector generation instruction may be:

a Uniform distribution instruction (UNIF): according to the instruction, the device reads uniformly distributed upper and lower bound parameters, and the size and storage address of the random vector to be generated from the instruction or from the register of a memory (preferably a scratchpad memory or a scalar register), generates the random vector that is in line with the uniform distribution in a random vector generation unit, and then writes the result of the random vector back to the specified storage address in the memory (preferably the scratchpad memory or the scalar register); and a Gaussian distribution instruction (GAUS): according to the instruction, the device reads Gaussian distributed mean and variance parameters, and the size and storage address of the random vector to be generated from the instruction or from the register of a memory (preferably a scratchpad memory or a scalar register), generates the random vector that is in line with the Gaussian distribution in a random vector generation unit, and then writes the result of the random vector back to the specified storage address in the memory (preferably the scratchpad memory or the scalar register).

Figure 7A:
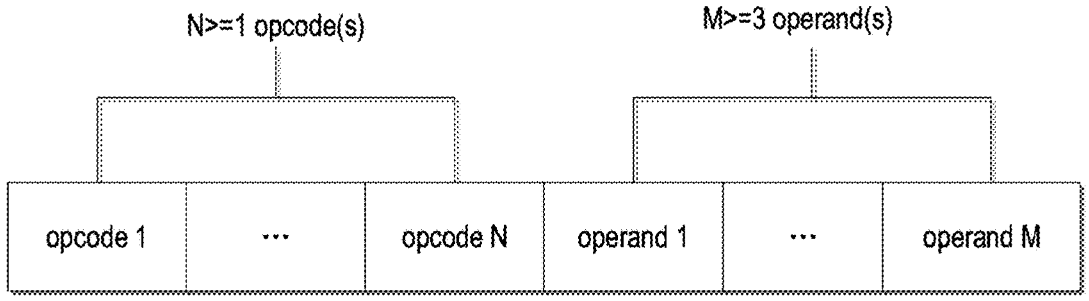
FIG. 7A is a diagram of a format of an instruction set according to the present disclosure.
Figure 7B:
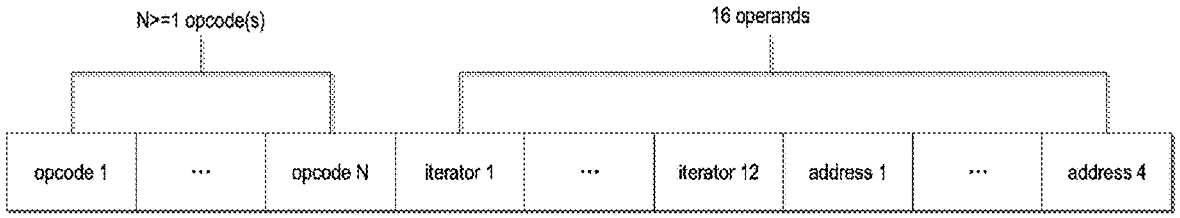
FIG. 7B is a diagram of a format of a neural network operation instruction according to the present disclosure.
Figure 7C:
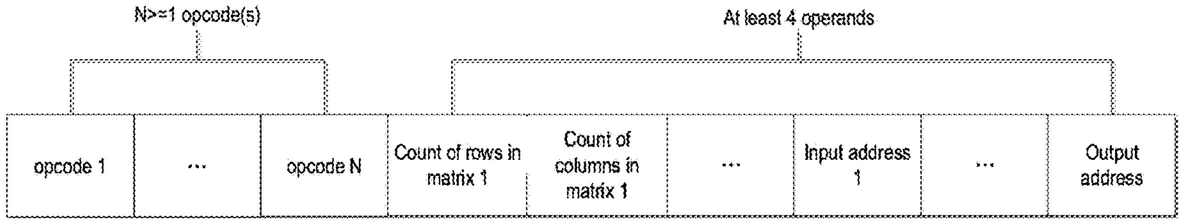
FIG. 7C is a diagram of a format of a matrix operation instruction according to the present disclosure.
Figure 7D:
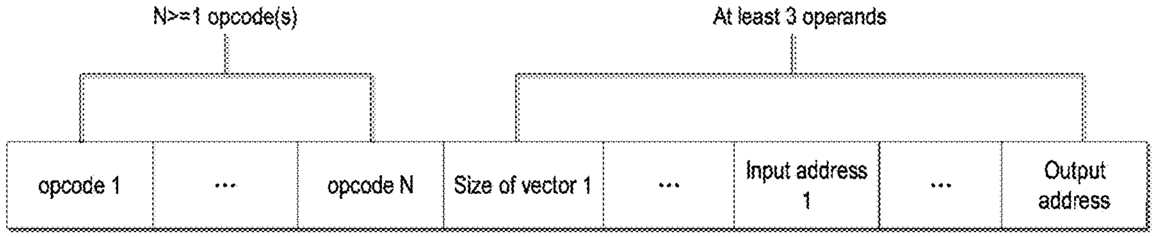
FIG. 7D is a diagram of a format of a vector operation instruction according to the present disclosure.
Figure 7E:
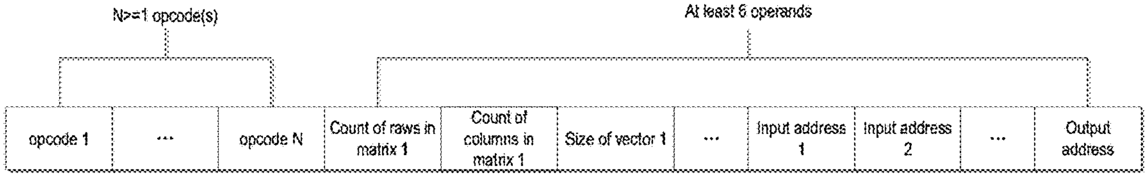
FIG. 7E is a diagram of a format of a matrix-vector operation instruction according to the present disclosure.

The format of the above-mentioned instruction is shown in FIG. 7A. The format of the neural network operation instruction is shown in FIG. 7B. The format of the matrix operation instruction is shown in FIG. 7C. The format of the vector operation instruction is shown in FIG. 7D. The format of the matrix-vector operation instruction is shown in FIG. 7E. It should be noted that the above-mentioned figures of the instruction format are merely possible examples. The format of these instructions in this disclosure is not limited to the possible examples shown in the figures.

An example of the present disclosure further provides a computer storage medium. The computer storage medium stores a computer program for electronic data exchange. The computer program may cause a computer to perform part or all of the steps of any of the matrix computation methods described in the foregoing method examples.

An example of the present disclosure further provides a computer program product. The computer program product includes a non-transitory computer-readable storage medium storing a computer program. The computer program may cause a computer to perform part or all of the steps of any of the matrix computation methods described in the foregoing method examples.

The artificial neural network computation device in the example above may be a general-purpose computation component integrated with a DMA and a control unit. The artificial neural network computation device may further include a general-purpose computation component, such as a general-purpose processor. An example of the storage medium may be a storage device, an on-chip storage medium, a memory, or a storage unit.

An example of the instruction storage unit may be a DMA. An example of the operation unit may be a primary operation module, a secondary operation module, a discrete data operation unit, or a continuous data operation unit. An example of the caching unit may be an instruction cache, an input neuron cache, a weight cache, and an output neuron cache, an instruction caching unit, a neuron caching unit that supports discrete data representations, or a weight caching unit that supports discrete data representations, etc. The examples of the present disclosure does not limit the above-mentioned device, medium, and unit.

The present disclosure provides a data distribution device including:

one or a plurality of central nodes which serve as a communication data center of an on-chip network and are configured to broadcast or multicast communication data to a plurality of leaf nodes;

the plurality of leaf nodes which serve as communication data nodes of the on-chip network and are configured to transfer communication data to the central nodes; and a repeater module configured to connect the central nodes and the plurality of leaf nodes and retransfer communication data.

The plurality of leaf nodes are divided into N groups. The central nodes are communicatively connected to each group of leaf nodes via the repeater module separately.

Optionally, each group includes a same count of leaf nodes. A person having ordinary skill in the art can understand that the count of leaf nodes in each group may also be different.

Optionally, a communication structure formed by each group of leaf nodes have self-similarity. In this case, the data distribution device has a network structure of a fractal tree.

A person having ordinary skill in the art can understand that in addition to a structure with self-similarity, each group of leaf nodes may also form another communication structure.

Optionally, the plurality of leaf nodes and the central node are communicatively connected as a complete n-ary tree through a plurality of levels of the repeater module.

In an example of the present disclosure, the central node or the leaf nodes may include, for instance, the computation device shown in FIG. 2A, the computation device shown in FIG. 1, or the computation device shown in FIG. 6A. Of course, in practical applications, the above central node or leaf nodes may also include other types of computation devices or chips in the field of neural networks, such as processors with different bit widths, or computation chips, sparsely connected artificial neural network computation devices or computation devices that include transmission devices, etc. Of course, in other technical scenarios, the above-mentioned central node or leaf nodes may be referred to as computation units. The above-mentioned central node and leaf nodes may be connected by a data processing device of an interconnection circuit.

Each node includes a local cache configured to store a subset of distribution data of the central node.

Each leaf node has an id as identifier. The serial number of the id increases sequentially from the topology side of the complete n-ary tree.

The data distribution device shares a clock signal.

The repeater module includes a local cache configured to store data.

The present disclosure further provides a data distribution method which uses the data distribution device. The method includes: distributing communication data to the plurality of leaf nodes through the central node. In the step above, after a data sender is ready to send data, the sender sends a data valid signal and places data in a bus; after a data receiver is ready to receive data, the receiver sends a signal indicating being ready to receive data; and after the data valid signal and the signal indicating being ready to receive data are detected by the other side, the data sender acknowledges that the data is already sent and received by the data receiver.

When communication data is broadcast from the central node to the plurality of leaf nodes, first, according to a handshake protocol, the data is transferred from the central node and is temporarily stored in a local cache of the repeater module directly connected to the central node. After each successful handshake, the data is transferred to a local cache of an intermediate repeater module of a subsequent level for temporarily storage. Finally, the data is input to a repeater module directly connected to the leaf nodes, and is distributed to a group of leaf nodes connected to the repeater module by the repeater module respectively.

At a next clock tick, if a data sender successfully shakes hands with a data receiver, data is input by means of pipelining to a local cache of the data receiver for storing. If the data sender fails to shake hands with the data receiver, data is stored in a local cache of a current level, the current level serves as a data receiver of a previous level and stops sending a signal indicating being ready to receive data, and then the data in the local cache of the current level stopped being updated. The data remains in the current level until a handshake succeeds.

When communication data is multicast from the central node to the plurality of leaf nodes, first, according to the handshake protocol, the data is transferred from the central node and is temporarily stored in the local cache of the repeater module directly connected to the central node. After each successful handshake, the data is transferred to the local cache of the intermediate repeater module of the subsequent level for temporarily storage. Finally, the data is input to the repeater module directly connected to the leaf nodes, and is distributed to the group of leaf nodes connected to the repeater module by the repeater module respectively.

When receiving data, the leaf nodes select data of preset bandwidth according to id corresponding to the leaf nodes.

The present disclosure further provides a control device including the data distribution device.

The present disclosure further provides a smart chip including the control device.

The present disclosure is further described in detail below with reference to the drawings, so that those skilled in the art can implement the present disclosure with reference to this specification.

Figure 7F:
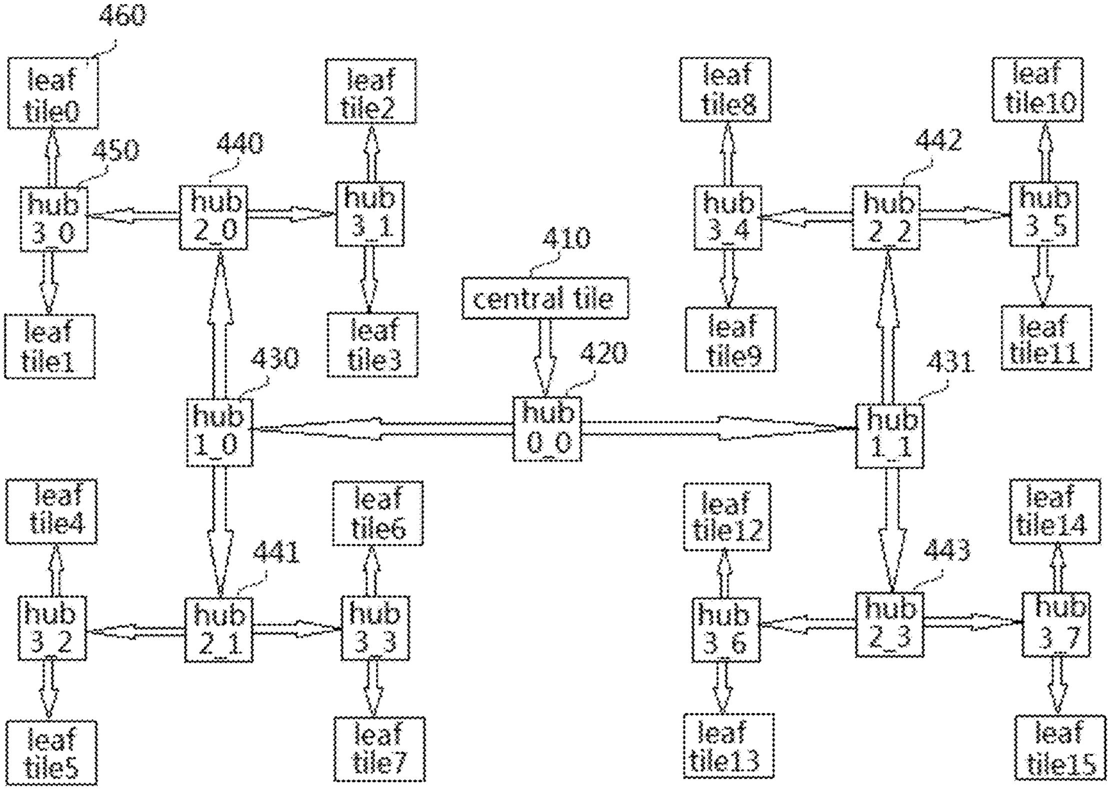
FIG. 7F is a structural diagram of hub_one_to_two according to the present disclosure.

FIG. 7F is a structural diagram showing an on-chip multi-core structure of which 16+1 cores are connected by an h-tree. "16" and "1" are given for the purpose of illustrating rather than limiting the present disclosure. A person having ordinary skill in the art may understand that the structure has 2n+m cores or yn+m cores. A root node of the h tree is a central tile, which serves as a start of data distribution. A leaf node of the h tree is a leaf tile, which serves as a terminus of data distribution. Other intermediate nodes are hubs, which are configured to transfer and distribute data.

The 16 leaf tiles are divided into 8 groups. Each group includes 2 leaf tiles. Each of the hubs is communicatively connected to a group of leaf tiles through the repeater module separately. A communication structure composed by each group of leaf tiles has self-similarity. The plurality of leaf tiles and the central tile are connected as a complete binary tree through a plurality of levels of the repeater module. The device realizes a scenario where data is distributed to processing units from a data center by broadcasting or multicasting.

Figure 8:
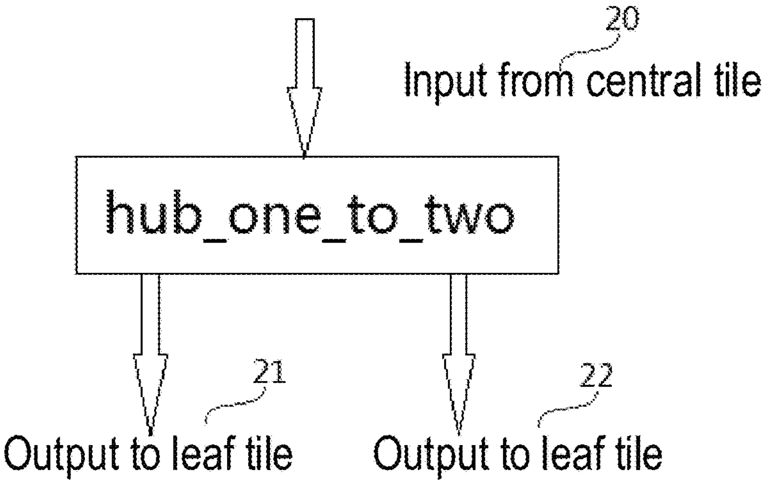
FIG. 8 is a diagram showing a handshaking behavior between hub_one_to_two and a data receiver according to the present disclosure.

FIG. 8 is a structural diagram of a hub. The hub includes a hub_one_to_two module which divides input data 20 that is full bandwidth into two groups of full bandwidth data: data 21 and data 22 for outputting. The hub_one_to_two module is configured to transfer data from the central tile to a leaf tile.

Figure 9:
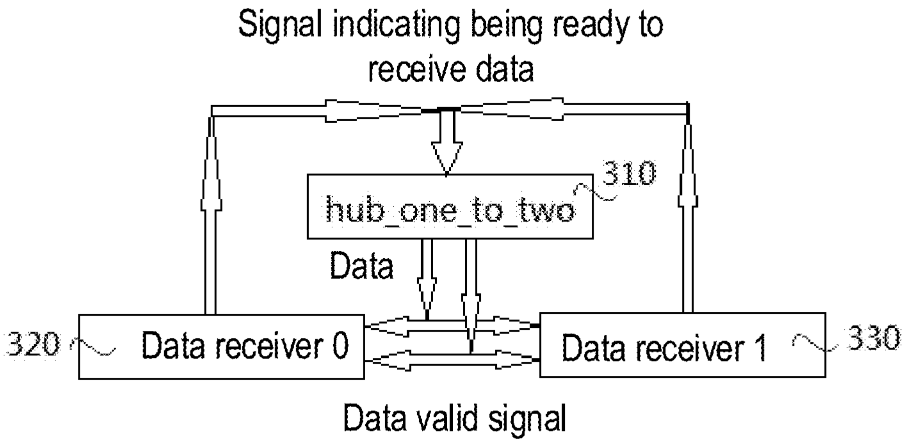
FIG. 9 is a diagram of an on-chip multi-core structure where 16+1 cores are connected by an h-tree according to an example of the present disclosure.

As shown in FIG. 9, when the hub_one_to_two module marked as 310 has sent data and a data valid signal to a bus, and a data receiver 0 marked as 320 and a data receiver 1 marked as 330 have sent signals indicating being ready to receive data to the bus, a handshake succeeds. At this tick, 310 acknowledges that the data receivers 320 and 330 have received data, and the data in the bus at this tick is to be stored in caches of 320 and 330 at a next tick.

As shown in FIG. 7F, broadcasting data of the central tile 410 initializes all the leaf tiles. At this time, local caches of all the hubs and leaf tiles are empty, signals indicating being ready to receive data of the hubs and leaf tiles are high, and the signal indicating being ready to receive data of hub0_0 marked as 420 that is directly connected to 410 is also high. At a first tick, 410 prepares data and sets the data valid signal to high. Since the signal indicating being ready to receive data of the hub0_0 420 at this time is high, 410 and 420 shake hands successfully. At a second tick, 420 fetches the data from the bus and saves the data in its local cache. Since at the second tick, there is data stored in the local cache of 420, 420 transfers the data and the valid signal to the bus in the direction of 430 and 431. At this time, the signals indicating being ready to receive data of hub1_0 430 and hub1_1 431 are high, 420 successfully shakes hands with

430 and 431 of a next level at this tick. At a third tick, 430 and 431 fetch the data from the bus and store the data in their local caches, and execute in order. At each tick, the data is transferred from a previous level to a next level. The hub1_0 430 to the leaf tile 0 460 are described in this example. At a fourth tick, the data is transferred to and temporarily stored in the local cache of the hub2_0 440. At a fifth tick, the data is transferred to and temporarily stored in the local cache of the hub3_0 450. At a sixth tick, after a successful handshake, 450 transfers the data of full bandwidth via the two input ports to the local caches of the group of leaf tiles connected to 450. The data is then stored in the local caches. At this time, the data arrives at the leaf tile 0 460. In this way, in a case of a smooth data path, the pipeline transfer of data level by level is realized.

As shown in FIG. 10, the hub1_0 is described in this example. In the following situation, data remains in the hub. At a first tick, the hub1_0 520 receives data from the hub0_0 510. At this time, 520 places the data and the data valid signal in the bus in the direction of 530 and 531 of a next level. The situation is set as follows: the hub2_0 530 and the hub2_1 531 have not sent data preparation signals, and 530 and 531 remain in this status for the rest of the time. Since 520 fails to shake hands with 530 and 531 of a next level, the data of 520 cannot be transferred to 530 and 531 of the next level and remains in the local cache of 520. At this time, 520 cannot send the signal indicating being ready to receive data. Then, since the local cache of 510 is empty, 510 can receive new data. However, 520 has not sent the signal indicating being ready to receive data, which leads to the handshake failure between 520 and 510. In other words, the data of 510 cannot be transferred to 520, which ensures the security of the data in the local cache of 520, and may thus realize the reliability of data transfer.

As shown in FIG. 10, the hub1_0 is described in this example. In the following situation, the hub can perform pipeline transfer of data. At a first tick, the hub1_0 520 receives data from the hub0_0 510. At this time, 520 places the data and the data valid signal in the bus in the direction of 530 and 531 of a next level. The situation is set as follows: the hub2_0 530 and the hub2_1 531 send data preparation signals, and 530 and 531 remain in this status for the rest of the time. At this time, 520 successfully shakes hands with 530 and 531 of a next level, and 520 is prepared to send the signal indicating being ready to receive data. If the local cache of 510 has already prepared new data and placed the data and the data valid signal in the bus in the direction of 520, at this tick 520 sends the signal indicating being ready to receive data, and 520 successfully shakes hands with 510. At a second tick, 520 stores the data transferred from 510 in the local cache, and places the data and the valid signal in the bus in the direction of 530 and 310 of the next level. In this way, in a case of a smooth data path and a sufficient source of data, the hub can perform pipeline transfer of data.

Figure 11:
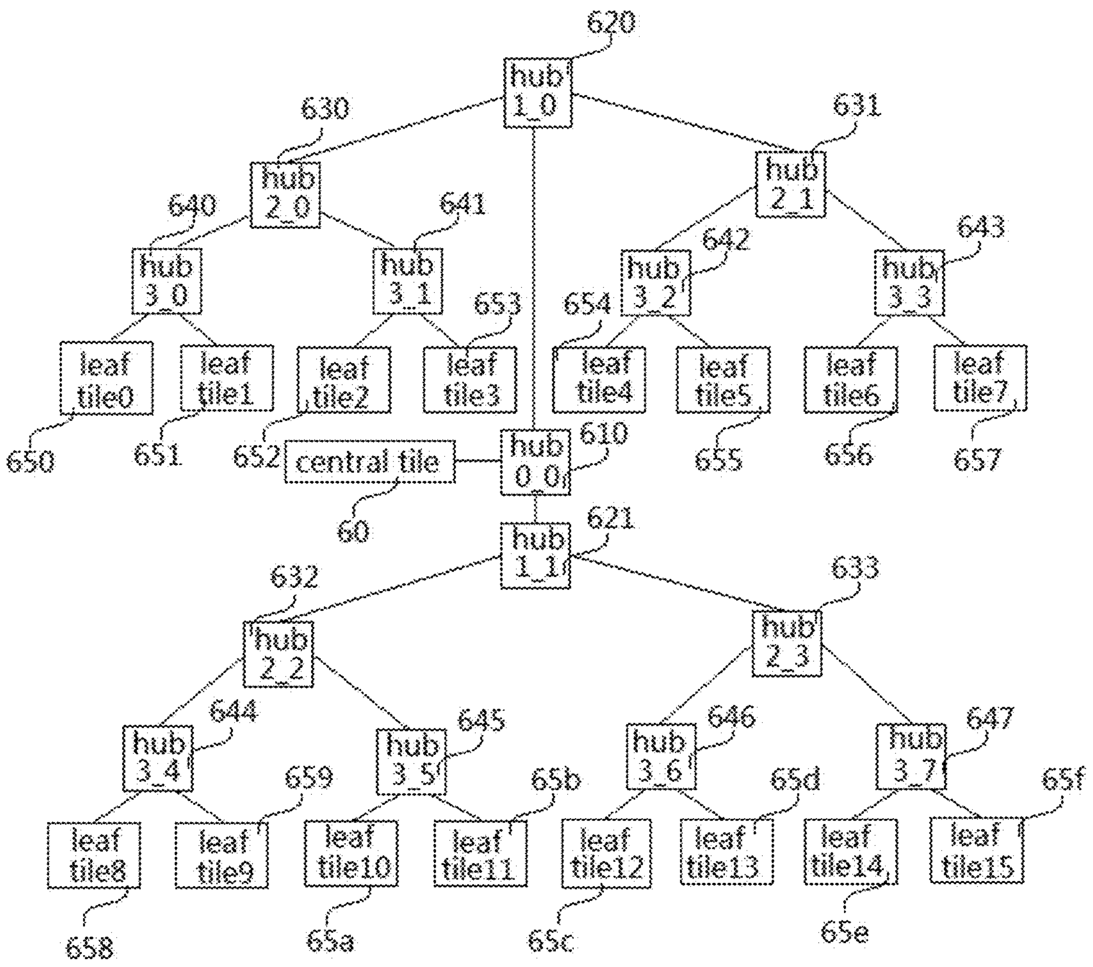
FIG. 11 is a structural diagram showing an h-tree structure expanding into a complete binary tree topology according to the present disclosure.

As shown in FIG. 11, it is assumed that the structure includes 16 leaf tiles. The h tree is expanded as a complete binary tree topology, in which a hub is a non-leaf node and a leaf tile is a leaf node. In the tree, nodes at the same height are sorted from left to right in an ascending order. The hubs are named according to their level and serial number. For instance, hub0_0 is named as 610 as it is a zero-th node at a first level; hub1_0 is named as 620 as it is a zero-th node at a second level; and hub1_1 is named as 621 as it is a first node at the second level.

As shown in FIG. 11, in an example, multicasting data of the central tile 60 initializes all the leaf tiles. At this time, since local caches of all the hubs and leaf tiles are empty, and signals indicating being ready to receive data of the hubs and leaf tiles are high, the data path is smooth. According to the pipeline transfer of data, at a first tick 60 and 610 shake hands successfully. At a second tick, 610 fetches data from the bus and stores the data in its local cache, and 610 successfully shakes hands with 620 and 621 of a next level. At a third tick, 620 and 621 fetch the data from the bus and temperately store the data in their local caches, and 620 successfully shakes hands with 630 and 631 of a next level, 621 successfully shakes hands with 632 and 633 of a next level. At a fourth tick, 630, 631, 632, and 633 fetch the data from the bus and temperately store the data in their local caches, and 630 successfully shakes hands with 640 and 641 of a next level, 631 successfully shakes hands with 642 and 643 of a next level, 632 successfully shakes hands with 644 and 645 of a next level, and 633 successfully shakes hands with 646 and 647 of a next level. At a fifth tick, 640, 641, 642, 643, 644, 645, 646, and 647 fetch the data from the bus and temperately store the data in their local caches, and 640 successfully shakes hands with 650 and 651 of a next level, 641 successfully shakes hands with 652 and 653 of a next level, 642 successfully shakes hands with 654 and 655 of a next level, 643 successfully shakes hands with 656 and 657 of a next level, 644 successfully shakes hands with 658 and 659 of a next level, 645 successfully shakes hands with **65*a* and 65*b* of a next level, 646 successfully shakes hands with 65*c* and 65*d* of a next level, and 647 successfully shakes hands with 65*e* and 65*f* of a next level. At a sixth tick, the data is stored in the local caches of all the leaf tiles (650, 651, 652, 653, 654, 655, 656, 657, 658, 659, 65*a*, 65*b*, 65*c*, 65*e*, 65*f***) at the same time. It can be seen from the above that in a case of a smooth data path, data that is broadcast from a central node can arrive at leaf nodes at the same time, thereby realizing the synchronism of data.

Figure 12:
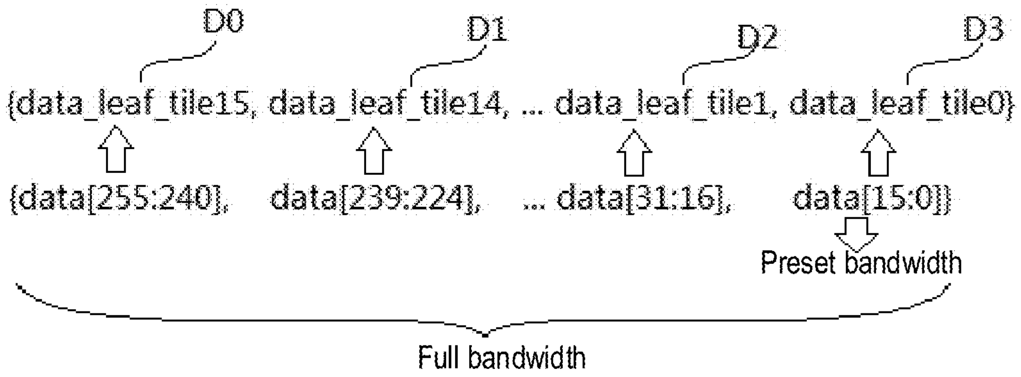
FIG. 12 is a schematic diagram of full-bandwidth data and data segments corresponding to respective leaf tiles in an h-tree according to another example of the present disclosure.

In the example above, when arriving at each leaf tile, the data is of full bandwidth. Assuming that as shown in FIG. 12, the preset bandwidth of each leaf tile is 16-bit data, each leaf tile fetches data that is multicast to the leaf tile from the data of full bandwidth according to a data id. The position of data in full bandwidth is [id*16: id*16+15]. For instance, data D0 with the id 15 is located at data [255: 240], and data D0 with the id 0 is located at data [15: 0].

Figure 13:
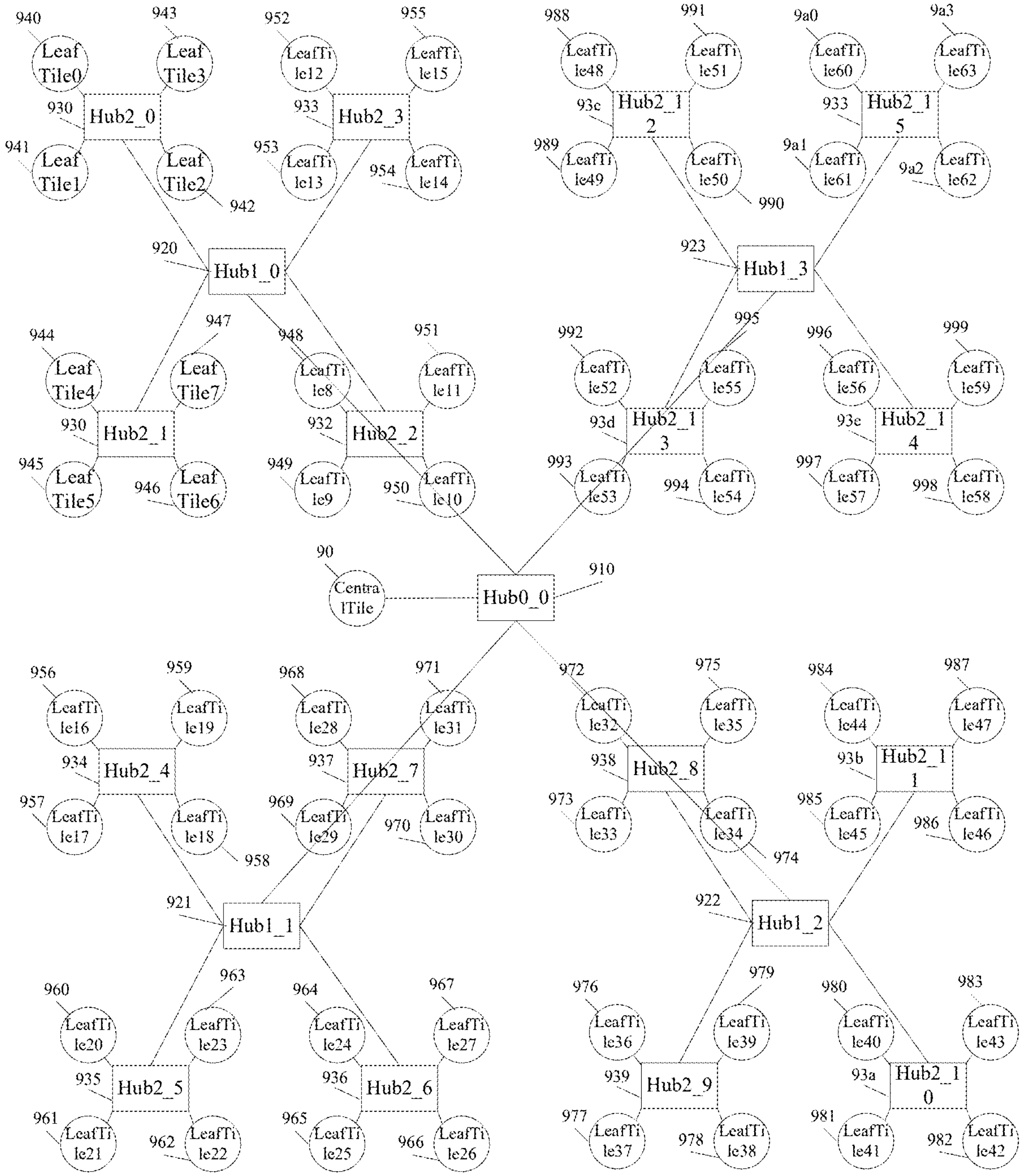
FIG. 13 is a diagram of an on-chip multi-core structure where 64+1 cores are connected by a x-tree according to an example of the present disclosure.

FIG. 13 is a diagram of an on-chip multi-core structure where 64+1 cores are connected through an x-tree according to an example of the present disclosure. A root node of the x-tree is a central tile which serves as the start of data distribution. A leaf node of the x-tree is a leaf tile which serves as the terminal of data distribution. Other intermediate nodes are hubs for transferring and distributing data. 64 leaf tiles in FIG. 13 are divided into 16 groups. Each group has 4 leaf tiles. Each of the hubs is communicatively connected to a group of leaf tiles through the repeater module separately. A communication structure composed of each group of leaf tiles has self-similarity. The plurality of leaf tiles and the central tile are connected as a complete quad-tree through a plurality of levels of the repeater module. The device realizes a scenario where data is distributed to processing units from a data center by broadcasting or multicasting.

Figure 14:
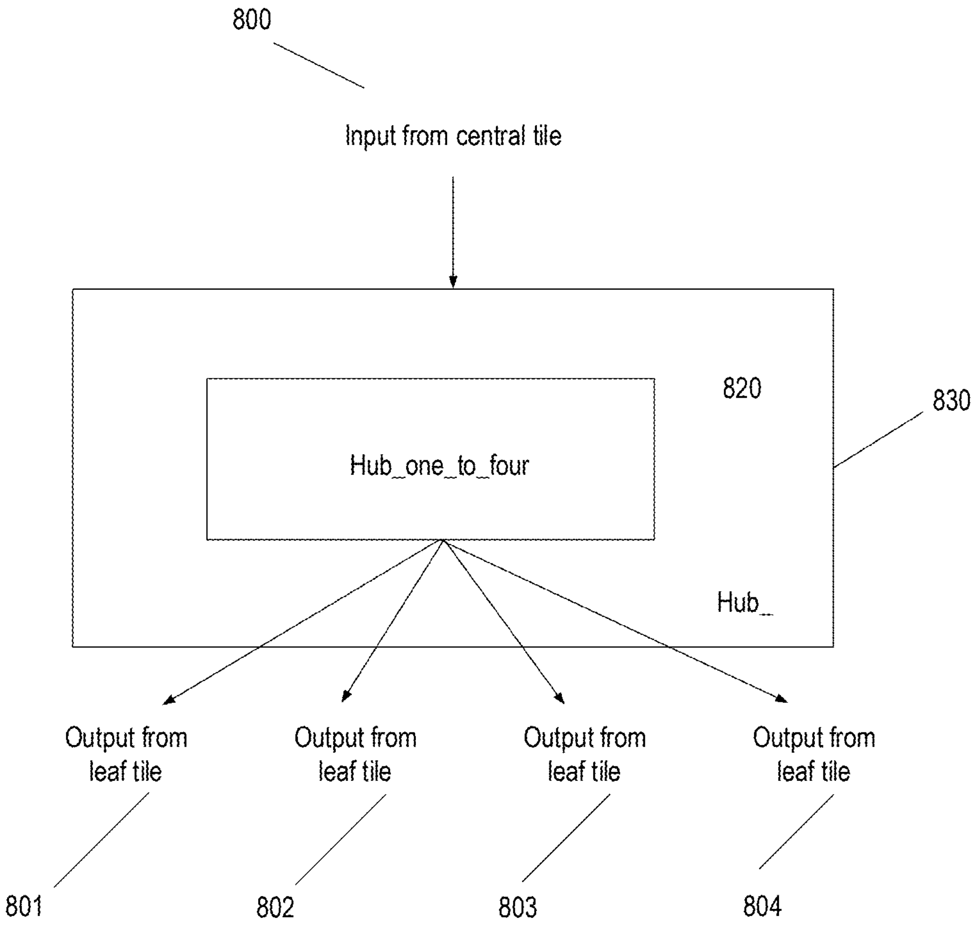
FIG. 14 is a diagram showing data being transferred in a hub according to another example of the present disclosure.

FIG. 14 shows a structural diagram of a hub. A hub includes a hub_one_to_four module. Hub_one_to_four divides a group of input data 800 of full bandwidth, into four groups of full bandwidth data: 801, 802, 803, and 804 for outputting. The four groups of full bandwidth data are to be transferred from the central tile to leaf tiles.

Figure 15:
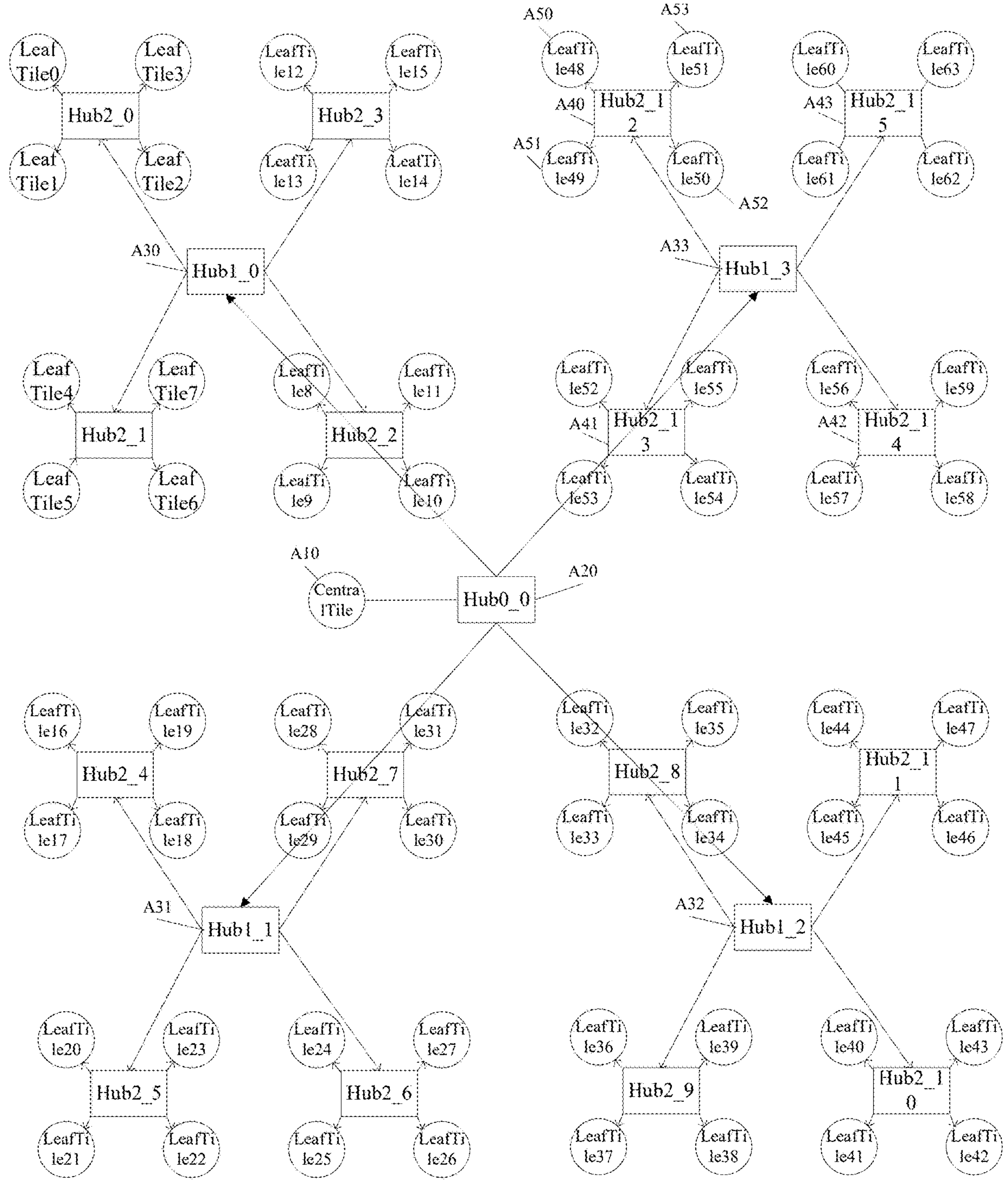
FIG. 15 is a structural diagram showing an x-tree structure expanding into a complete quadtree topology according to the present disclosure.

As shown in FIG. 15, broadcasting data of the central tile A10 is from initializing all the leaf tiles. At this time, local caches of all the hubs and leaf tiles are empty, signals indicating being ready to receive data of the hubs and leaf tiles are high, and the signal indicating being ready to receive data of hub0_0 marked as A20 that is directly connected to A10 is also high. At a first tick, A10 prepares data and sets the data valid signal to high. Since the signal indicating being ready to receive data of the hub0_0 A20 at this time is high, A10 and A20 shake hands successfully. At a second tick, A20 fetches the data from the bus and temperately stores the data in its local cache. Since at the second tick, there is data stored in the local cache of A20, A20 transfers the data and the valid signal of the data to the bus in the direction of A30, A31, A32, and A33. At this time, the signals indicating being ready to receive data of hub1_0 A30, hub1_1 A31, hub1_2 A32, and hub1_3 A33 are high, A20 successfully shakes hands with A30, A31, A32, and A33 of a next level at this tick. At a third tick, A30, A31, A32, and A33 fetch the data from the bus and temperately store the data in their local caches, and execute in order. At each tick, the data is transferred from a previous level to a next level. The hub1_3 A33 to the leaf tile 48 A50 are described in this example. At a fourth tick, the data is transferred to and temporarily stored in the local cache of the hub2_12 A40. At a fifth tick, after a successful handshake, A40 transfers the data of full bandwidth via the four input ports to the local caches of the group of four leaf tiles connected to A40, which includes A50, A51, A52, and A53. At this time, the data arrives at the leaf tile 48 A50. In this way, in a case of a smooth data path, the pipeline transfer of data level by level is realized.

As shown in FIG. 13, it is assumed that the structure includes 64 leaf tiles and 1 central tile. The 64 leaf tiles and 1 central tile are topologically connected by the x-tree as a complete quad-tree. A hub is a non-leaf node and a leaf tile is a leaf node. In the tree, nodes at the same height are sorted anticlockwise in the ascending order. The hubs are named according to their level and serial number. For instance, hub0_0 is named as 910 as it is a zero-th node at a first level; hub1_0 is named as 920 as it is a zero-th node at a second level; and hub1_1 is named as 921 as it is a first node at the second level.

As shown in FIG. 13, in an example, multicasting data of the central tile 90 is initializes all the leaf tiles. At this time, since local caches of all the hubs and leaf tiles are empty, and signals indicating being ready to receive data of the hubs and leaf tiles are high, the data path is smooth. According to the pipeline transfer of data, at a first tick 90 and 910 shake hands successfully. At a second tick, 910 fetches data from the bus and stores the data in its local cache, and 910 successfully shakes hands with 920, 921, 922, and 923 of a next level. At a third tick, 920, 921, 922, and 923 fetch the data from the bus and store the data in their local caches, and 920 successfully shakes hands with 930, 931, 932, and 933 of a next level, 921 successfully shakes hands with 934, 935, 936, and 933 of a next level, 922 successfully shakes hands with 938, 939, 93*a*, and 93*b* of a next level, 923 successfully shakes hands with 93*c*, 93*d*, 93*e*, and 93*f* of a next level. Ata fourth tick, 930, 931, 932, 933, 934, 935, 936, 937, 938, 939, 93*a*, 93*b*, 93*c*, 93*d*, 93*e* and 93*f* fetch the data from the bus and store the data in their local caches, and 930 successfully shakes hands with 940, 941, 942, and 943 of a next level, 931 successfully shakes hands with 944, 945, 946, and 947 of a next level, 932 successfully shakes hands with 948, 949, 950, and 951 of a next level, 933 successfully shakes hands with 952, 953, 954, and 955 of a next level, 934 successfully shakes hands with 956, 957, 958, and 959 of a next level, 935 successfully shakes hands with 960, 961, 962, and 963 of a next level, 936 successfully shakes hands with 964, 965, 966, and 967 of a next level, 937 successfully shakes hands with 968, 969, 970, and 971 of a next level, 938 successfully shakes hands with 972, 973, 974, and 975 of a next level, 939 successfully shakes hands with 976, 977, 978, and 979 of a next level, 93*a* successfully shakes hands with 980, 981, 982, and 983 of a next level, 93*b* successfully shakes hands with 984, 985, 986, and 988 of a next level, 93*c* successfully shakes hands with 988, 989, 990, and 991 of a next level, 93*d* successfully shakes hands with 992, 993, 994, and 995 of a next level, 93*e* successfully shakes hands with 996, 997, 998, and 999 of a next level, and 93*f* successfully shakes hands with 9*a*0, 9*a*1, 9*a*2, and 9*a*3 of a next level. At a fifth tick, the data is stored in the local caches all the leaf tiles (940-9*a*3) at the same time. It can be seen from the above that in a case of a smooth data path, data that is broadcast from a central node can arrive at leaf nodes at the same time, thereby realizing the synchronism of data.

Figure 16:
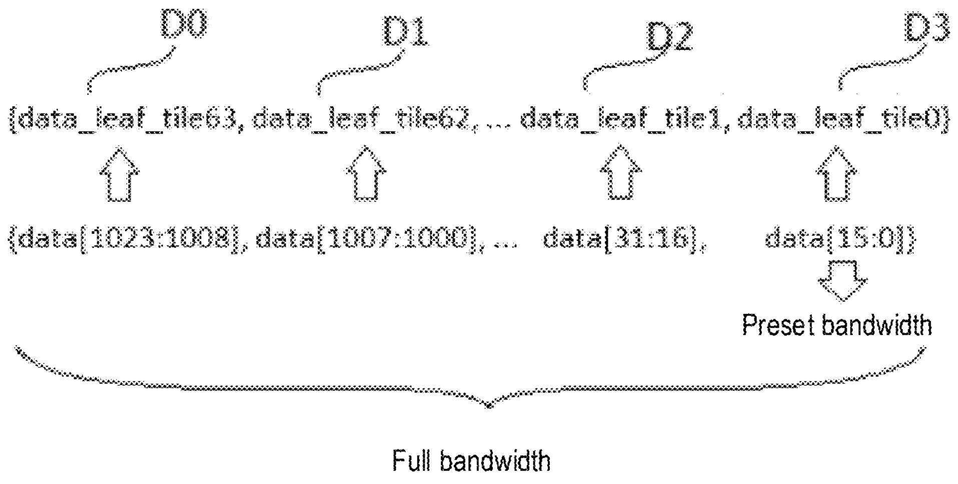
FIG. 16 is a schematic diagram of full-bandwidth data and data segments corresponding to respective leaf tiles in an x-tree according to another example of the present disclosure.

In the example above, when arriving at each leaf tile, the data is of full bandwidth. Assuming that as shown in FIG. 16, the preset bandwidth of each leaf tile is 16-bit data, each leaf tile fetches data that is multicast to the leaf tile from the data of full bandwidth according to a data id. The position of data in full bandwidth is [id*16: id*16+15]. For instance, data D0 with the id 63 is located at data [1023: 1008], and data D0 with the id 0 is located at data [15: 0].

It should be noted that the present disclosure provides examples related to data distribution based on a fractal tree structure, which can be applied to the method example provided above, so as to achieve operations such as on-chip or chip-to-chip data acquisition, distribution, and processing.

The present disclosure proposes that data distribution based on the fractal tree structure can efficiently expand a single-core intelligent chip to a multi-core intelligent chip to meet the processing capacity requirements of a larger amount of computation and a larger-scale neural network. Compared with the prior art, the present disclosure can implement operations such as broadcast and multicast on the on-chip network in a synchronized, pipelined and reliable manner, to improve the efficiency of broadcast communication and multicast communication, and greatly increase the throughput of communication. And under the guarantee of the communication protocols, the data can be safely transferred to each branch node, so that the data is consistent and error-free, so as to obtain a better communication effect than the prior art.

The present disclosure provides a machine learning computation device for sparse connection. Specifically, the machine learning may include an artificial neural network. When there are multiple artificial neural network computation devices for sparse connection, they can be connected through the data processing device of the interconnected circuit. The machine learning computation device includes:

a mapping unit configured to convert input data into input neurons, weights, and connection data, filter the input neurons according to the connection data to obtain computation neurons, and store the computation neurons in a storage device or a cache;

a storage device configured to store computation neurons, weights, and computation instructions; and an operation unit configured to execute a corresponding operation on the computation neurons and weights according to the computation instructions stored in the storage device, where the operation unit mainly performs a three-step operation: step 1, multiplying the computation neurons and the weights to obtain a first result; step 2, executing an adder tree operation to obtain a second result, where specifically, the first result obtained in the step 1 is subject to a stage-by-stage summation in an adder tree to obtain the second result, or a bias is added to the first result to obtain the second result; and step 3, executing an activation function operation on the second result to obtain a final output neuron.

The operation unit may include an addition arithmetic unit, a multiplication arithmetic unit, and an activation arithmetic unit. FIG. 2B shows a connection between those computing elements. Each arithmetic unit corresponds a pipeline stage. This computation method may save computing time and speed up computation. In an example, components of different pipeline stages may be combined freely, or a one-stage pipeline stage may be adopted. For instance, a second pipeline stage and a third pipeline stage may be combined; a first pipeline stage, a second pipeline stage, and a third pipeline stage may all be combined; or each pipeline stage may perform different operations, and may be permuted and combined. For instance, a first pipeline stage is configured to perform comparison operations and some multiplication; and a second pipeline stage is configured to perform a combination of operations such as a combination of nonlinear operations and matrix-scalar multiplication.

The pipeline stage of the above arithmetic units may be different for different computation instructions. For instance, when only vector or matrix operations are performed, the second pipeline stage and the third pipeline stage are not required. Of course, in practical applications, the pipeline stages can be adjusted according to actual computation instructions.

The connection data is expressed as follows.

The first instance:

using 1 to represent connection, 0 to represent connectionless, and a character string of 0 and 1 formed with the connection status between each output neuron and all input neurons to represent connection relations of the output neurons; or using 1 to represent connection, 0 to represent connectionless, and a character string of 0 and 1 formed with the connection status between each input neuron and all output neurons to represent connection relations of the input neurons.

The second instance:

using a distance from a position of a first connection of an output neuron to a first input neuron, a distance from a second input neuron of the output neuron to a previous input neuron, a distance from a third input neuron of the output neuron to a previous input neuron . . . in a similar fashion, until all input neurons of the output neuron are exhausted, so as to represent connection relations of the output neuron.

Optionally, the computation device of the artificial neural network further includes: a DMA (which may be replaced by a transmission device, such as the transmission device of FIG. 149) configured to read/write data or instructions in the storage device and cache.

Optionally, the computation device of the artificial neural network further includes:

an instruction cache configured to store special-purpose instructions; and a control unit configured to read the special-purpose instructions from the instruction cache and decode the special-purpose instructions into various operation unit instructions.

Optionally, the computation device of the artificial neural network further includes:

an input neuron cache configured to cache input neuron data that is input into the operation unit; and a weight cache configured to cache weight data.

Optionally, the computation device of the artificial neural network further includes:

an output neuron cache configured to cache output neurons that is output from the operation unit.

Preferably, the mapping unit is configured to convert the input data into a storage mode in which the input neurons correspond to the weights one-by-one, and output the neurons to the operation unit rather than storing the same in the storage device.

Preferably, the computation device of the artificial neural network further includes an input neuron cache and/or a weight cache. The input neuron cache is configured to cache the input neuron data that is input into the operation unit. The weight cache is configured to cache weight data. The mapping unit is configured to convert the input data into a storage mode in which the input neurons correspond to the weights one-by-one, and output the neurons into the input neuron cache and/or the weight cache.

Preferably, an activation function executed by the operation unit in the step 3 may be a sigmoid function, a tan h function, or a ReLU function.

The present disclosure further discloses a computation method for a sparsely connected artificial neural network. The method may be applied to the device of FIG. 26, FIG. 28, or FIG. 30. The method includes:

a step 1, converting input data into input neurons, weights, and connection data, where the connection data is expressed as:

the first instance:

using 1 to represent connection, 0 to represent connectionless, and a character string of 0 and 1 formed with the connection status between each output neuron and all input neurons to represent connection relations of the output neurons; or using 1 to represent connection, 0 to represent connectionless, and a character string of 0 and 1 formed with the connection status between each input neuron and all output neurons to represent connection relations of the input neurons;

the second instance:

using a distance from a position of a first connection of an output neuron to a first input neuron, a distance from a second input neuron of the output neuron to a previous input neuron, a distance from a third input neuron of the output neuron to a previous input neuron . . . in a similar fashion, until all input neurons of the output neuron are exhausted, so as to represent connection relations of the output neuron.

The method includes: a step 2, filtering the input neurons according to the connection data to obtain computation neurons, and multiplying the computation neurons and the weight data to obtain a first result.

The input data includes: input neurons, weights, and connection data. The input neurons, the weights, and the connection data are included in the input data directly, and can be fetched from the input data directly. The computation neurons can be obtained by filtering the input neurons according to the connection data.

Figure 18:
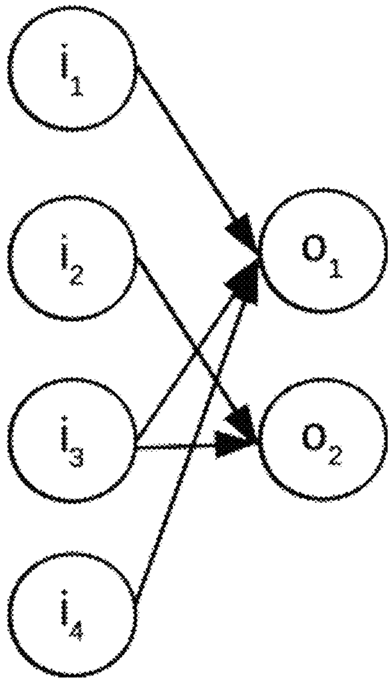
FIG. 18 is a structural diagram of a node of a sparsely connected neural network according to an example of the present disclosure.

A method of filtering input neurons may be: it is assumed that there are 4 input neurons, connection data being 1 denotes connection; as shown in FIG. 18, if connection data is 1011, then input neurons are $i_1$, $i_2$, $i_3$, and $i_4$, the second neuron $i_2$ which does not have connection is deleted to obtain computation neurons $i_1$, $i_3$, and $i_4$. Connection data being 1 may also denote connectionless. In this case, $i_1$, $i_3$, and $i_4$ which do not have connections are deleted to obtain a computation neuron $i_2$.

The method includes: a step 3, performing an adder tree operation on the first result to obtain a second result.

The step 3 can be realized in various ways. For instance, the first result can be added by an adder tree stage-by-stage to obtain the second result; or a bias can be added to the first result to obtain the second result.

The method includes: a step 4, executing an activation function operation on the second result to obtain final output neurons, where the activation function may be a sigmoid function, a tan h function, or a ReLU function.

The technical solution of the present disclosure is further explained below with reference to the drawings and examples.

Figure 17:
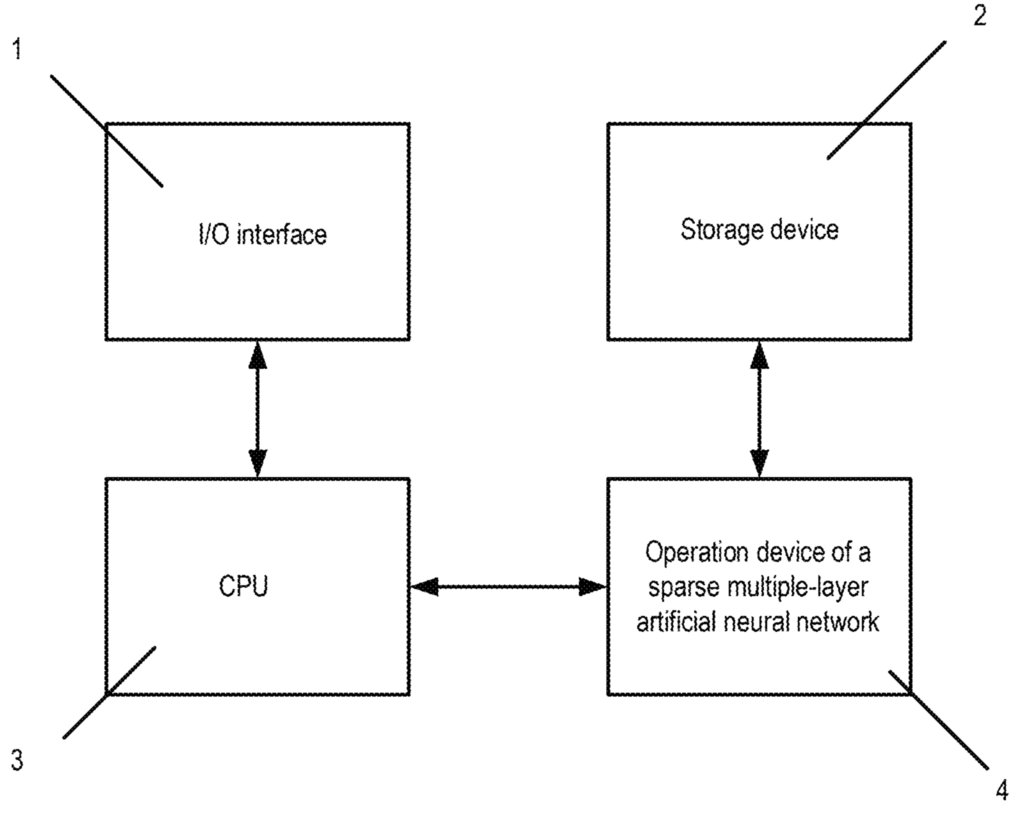
FIG. 17 is a structural diagram of an overall structure of an example of the present disclosure.

FIG. 17 is a block diagram of an overall structure of an example of the present disclosure.

The structure includes an I/O interface 1 which is used when I/O data needs to be sent to a computation device of a sparse multiple-layer artificial neural network through a CPU 3, and then to be written into a storage device 2 by a computation device 4 of the sparse multiple-layer artificial neural network. Programs as needed by the computation device 4 of the sparse multiple-layer artificial neural network are transmitted by the CPU 3 to the device 4.

The structure includes the storage device 2 which is configured to temporarily store models and neuron data of the sparse multiple-layer artificial neural network, especially when not all of the models can be put in the cache of the computation device 4 of the sparse multiple-layer artificial neural network.

The structure includes the CPU 3 which is configured to perform basic controls such as data move and start/stop of the computation device 4 of the sparse multiple-layer artificial neural network. The CPU 3 acts as an interface between the computation device 4 and an external control.

The structure includes the computation device 4 of the sparse artificial neural network which serves as a unit for executing operations of the sparse multiple-layer artificial neural network, receives data and programs from the CPU 3, and executes operation algorithms of the sparse multiple-layer artificial neural network. Execution results of the computation device 4 of the sparse artificial neural network are transmitted back to the CPU 3.

A general-purpose system structure uses the computation device 4 of the sparse artificial neural network as a co-processor of the CPU 3 or a GPU to execute the operation algorithms of the sparse multiple-layer artificial neural network.

A system structure of multiple interconnected computation devices of the sparse artificial neural network may be formed in a way that multiple computation devices 4 of the sparse artificial neural network are interconnected through a PCIE bus. The multiple computation devices 4 are capable of supporting a larger scale of sparse multiple-layer artificial neural network operation, may share the same host CPU or have their own host CPU respectively, may share the memory or have their own memory for each processor. Besides, the interconnection mode of the multiple computation devices 4 can be any interconnection topology.

In respect of a sparsely connected neural network as shown in FIG. 18, there are four input neurons: $i_1$, $i_2$, $i_3$, $i_4$, and two output neurons: $o_1$, $o_2$. $o_1$ is connected to $i_1$, $i_3$, and $i_4$. The weights of the connections are respectively expressed as $w_{11}$, $w_{31}$, $w_{41}$. $o_2$ is connected to $i_2$ and $i_3$. The weights of the connections are respectively expressed as $w_{22}$ and $w_{32}$.

There are two ways to show the connection relations in the sparse neural networks above: one is to use one bit between each input neuron and each output neuron to represent whether or not there is connection therebetween, and the other is to use a distance between connections to represent the position of each connection.

Figure 19:
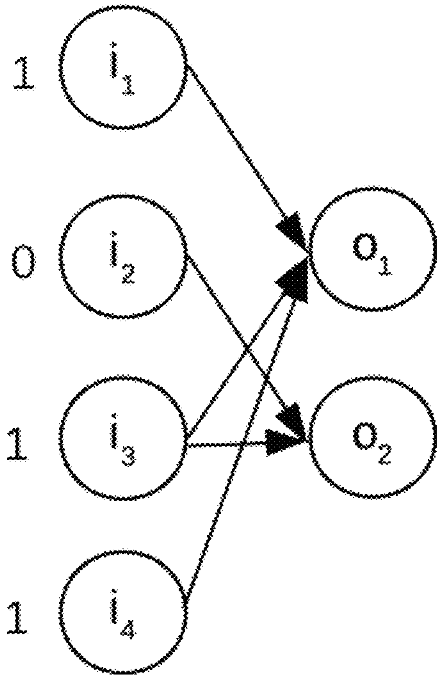
FIG. 19 is a diagram showing a connection relationship of the neural network of FIG. 4.

The first representation of connections:

Regarding the neural network in FIG. 18, as shown in FIG. 19, the connection relation of the output neuron $o_1$ is 1011. Each bit represents whether or not there is connection with the input neuron. 1 represents connection, and 0 represents connectionless. Then the connection relation of the output neuron $o_2$ is 0110. In the process of operation, the input neuron corresponding to a connection relation of 0 will be filtered out and not be computed. Specifically, for the input neuron $o_1$, $i_2$ will be filtered out; and for $o_2$, $i_1$ and $i_4$ will be filtered out. In this way, input neurons that are filtered out will not be computed during operation.

When storing connection relations, the connection relations may be stored in an order of input neurons first or output neurons first. The storage format includes:

Format I: place all input neurons of each output neuron in turn, for instance, the order in the instance above is 10110110.

Format II: place all output neurons of each input neuron in turn, for instance, the order in the instance above is 10011110.

Figure 20:
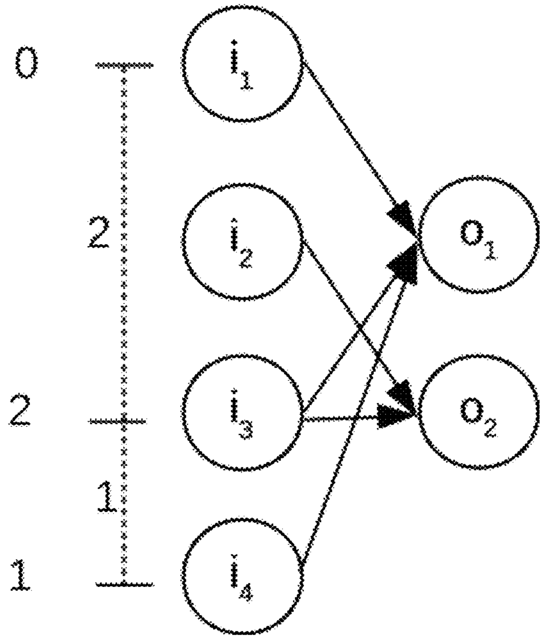
FIG. 20 is a diagram showing a connection relationship of a sparsely connected neural network according to an example of the present disclosure.

The second representation of connections: For instance, regarding the neural network in FIG. 20, the output neuron $o_1$ is connected to the input neurons $i_1$, $i_3$, and $i_4$, and then the connection relations are 0, 2, 1. 0 indicates that the distance between the position of the first connection and the first input neuron is 0, i.e. the first input neuron. 2 indicates that the distance between the second input neuron and the previous input neuron is 2, i.e. representing the third input neuron. 1 indicates that the distance between the third input neuron and the previous input neuron is 1, i.e. representing the fourth input neuron. Likewise, the connection relations of $o_2$ are 1, 1.

The mapping unit of the present disclosure includes, but is not limited to, the connection relations above.

A convolutional neural network is one type of artificial neural networks. A convolution layer includes multiple filters which are convolution kernels. Such convolution kernels repeatedly act on all input images, and extract local features. Different convolution kernels can extract local features of different types. After passing through the convolution layer, one input image becomes some abstract features that can be better understood.

Natural images have their own inherent properties. In other words, the statistical property of a part of an image is the same as the rest part, which means features learned from this part can be applied to another part, so the same learned feature can be applied to all the positions of the image. When a small block, for instance an 8*8 block, is randomly selected as a sample from a large image, and some features are learned from this small block sample, then the features learned in the 8*8 sample can serve as a detector to be applied to any position in the image. Particularly, a convolution operation can be performed on the large image according to the features learned in the 8*8 sample, thereby obtaining an activation value of a different feature from any position of the large image. Features of the 8*8 sample are regarded as convolution kernels. A method of the above-mentioned convolution operation is similar to the method shown in FIG. 6B, and is thus omitted here.

Figure 21:
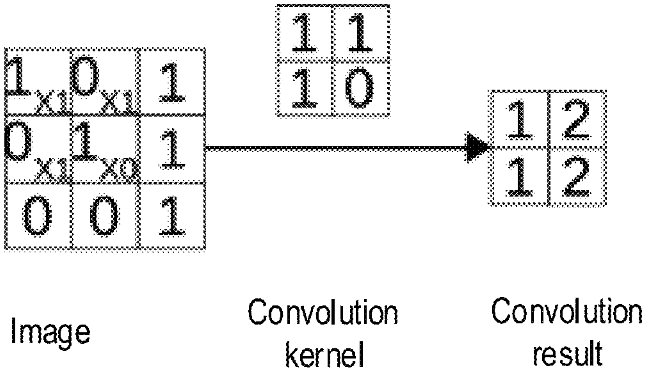
FIG. 21 is a diagram of a convolution operation according to an example of the present disclosure.

FIG. 21 is an instance of a convolution operation. The convolution kernel is a 2*2 matrix and slides on the input image.

Provided that the convolution kernel slides by one pixel each time, then there will be four convolution operations in total. For each convolution operation, multiplication and addition operations are performed on the convolution kernel matrix and the corresponding input image data.

Figure 22:
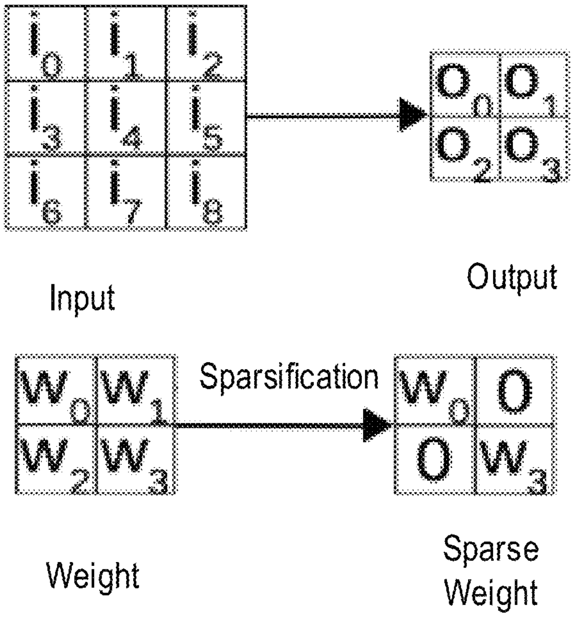
FIG. 22 is a graph showing changes in input, output, and weights when a convolution neural network becomes sparse.

Provided that weights of the convolution kernel become sparse. For instance, the weights change from the previous 2*2 into two parameters only, see FIG. 22. Then, for the output neuron $o_0$, the needed input neurons will be $i_0$, $i_1$, $i_3$, and $i_4$, the input weights will be $w_0$ and $w_3$, and the connection relation will be 1001 or 0, 2.

For the output neuron $o_3$, the needed input neurons will be $i_3$, $i_5$, $i_7$, and $i_8$, the input weights will be $w_0$ and $w_3$, and the connection relation will be 1001 or 0, 2.

Accordingly, for different output neurons in the same output neuron feature map, the needed input neurons are different while their weights and connection relations are the same.

The computation device of the artificial neural network that can execute a sparse connection can handle various sparsely connected artificial neural networks expressed by sparse connections. The computation device includes a unit configured to handle sparse connections which is named as a mapping unit herein. For different sparse connection relations and handling methods, the structures of the computation devices of the sparsely connected artificial neural network are slightly different. Below is an explanation of different structures and methods.

Figure 23:
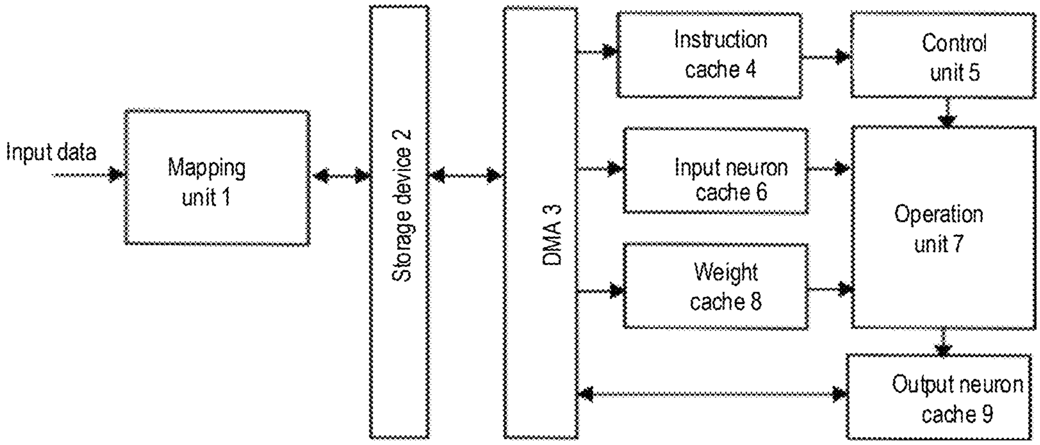
FIG. 23 is a structural diagram of an operation device for a sparsely connected artificial neural network according to an example of the present disclosure.

Structure & Method I:

as shown in FIG. 23, a mapping unit 1 is configured to convert input data into input neurons, weights, and connection data;

a storage device 2 is configured to store data and instructions, especially when a scale of a neural network is large, and an instruction cache 4, an input neuron cache 6, an output neuron cache 9, and a weight cache 8 cannot accommodate so much data, the data has to be temporarily stored in the storage device 2;

a DMA 3 is configured to move data or instructions in the storage device to respective caches;

an instruction cache 4 is configured to store special-purpose instructions;

a control unit 5 is configured to read the special-purpose instructions from the instruction cache 4, and decode the same into various instructions for operation unit;

an input neuron cache 6 is configured to store the input neuron data to be computed; and an operation unit 7 is configured to execute specific operations. The operation unit acts in three stages. A first stage is to execute multiplication operations in which the input neurons are multiplied by the weight data. A second stage is to execute an adder tree operation. The first stage and the second stage form a vector inner-product operation in combination. A third stage is to execute an activation function operation, where an activation function may be a sigmoid function, a tan h function, etc. The output neurons obtained in the third stage are written back into the output neuron cache.

A weight cache 8 is configured to store weight data.

An output neuron cache 9 is configured to store the output neurons of computation.

Figure 24:
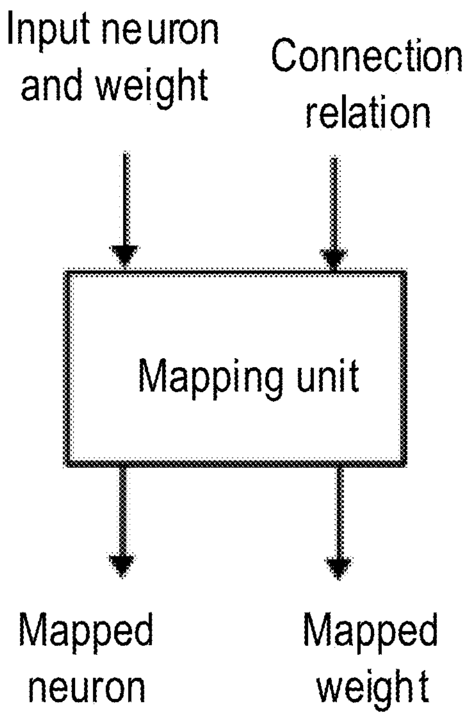
FIG. 24 is a structural diagram of a mapping unit according to an example of the present disclosure.

The structure of the mapping unit is illustrated in FIG. 24.

By taking the above sparsely connected neural network as an instance, the connection relation may be either of the two sparse expressions as stated above. According to the connection relation, the mapping unit will map the input neurons and input weights into mapped neurons and weights, and output the mapped neurons and weights. The mapped neurons and weights may be directly used in the computation without considering the connection relation. A process of mapping the output neuron $o_1$ is as follows:

The input neurons are $i_1$, $i_2$, $i_3$, and $i_4$. The input weights are $w_{11}$, $w_{31}$, and $w_{41}$. The connection relation is 1011 or 0, 2, 1. According to the connection relation, the mapping unit changes the input neurons and weights into a corresponding relation. There are two circumstances of the output: one is to remove connectionless input neurons, then the mapped neurons are $i_1$, $i_3$, and $i_4$, and the mapped weights are $w_{11}$, $w_{31}$, and $w_{41}$; and the other is to complement a weight of 0 in a connectionless position, then the mapped neurons are $i_1$, $i_2$, $i_3$, and $i_4$, and the mapped weights are $w_{11}$, 0, $w_{31}$, and $w_{41}$.

The operation unit may include three parts: a first part is a multiplication arithmetic unit; a second is an adder tree; and a third is an activation function unit. The first part multiplies the input neurons (in) by the weights (w) to obtain weighted output neurons (out), and the process is expressed as out=w*in. The second part adds the weighted output neurons stage-by-stage in the adder tree, or may add a bias (b) to the output neurons (out) to obtain biased output neurons (out), and the process is expressed as out=in+b. The third part applies an activation function (active) to the output neurons (in) to obtain activated output neurons (out), and the process is expressed as out=active(in), where the activation function (active) may be sigmoid, tan h, relu, softmax, etc. In addition to the activation operation, the third part can perform other nonlinear functions. For instance, the third part may apply an operation (f) to the input neurons (in) to obtain output neurons (out), and the process is expressed as out=f(in).

Figure 25:
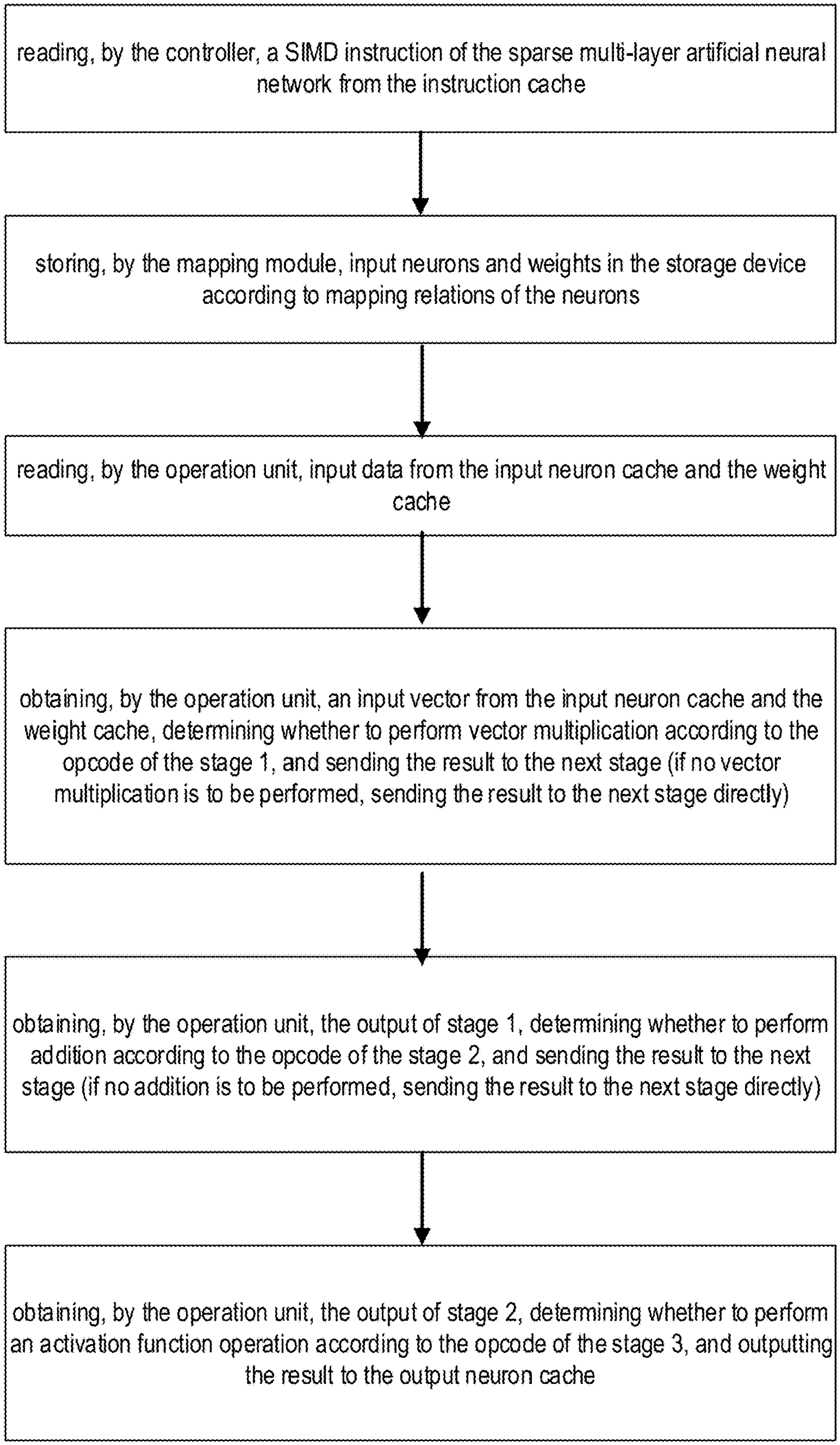
FIG. 25 is a flowchart of an operation process of a sparsely connected artificial neural network according to an example of the present disclosure.

The operation process is shown in FIG. 25.

Structure & Method II

Figure 26:
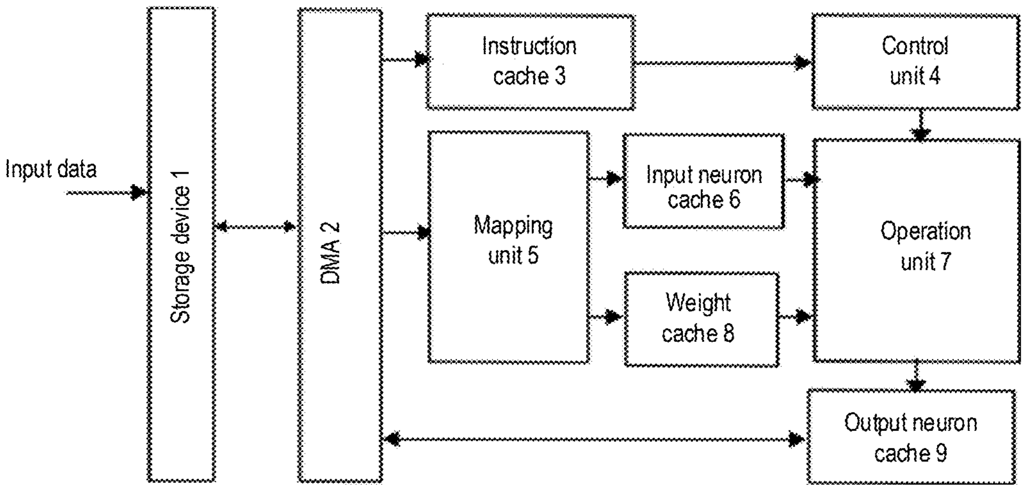
FIG. 26 is a structural diagram of an operation device for a sparsely connected artificial neural network according to another example of the present disclosure.

As show in FIG. 26, a storage device 1 is configured to store data and instructions, especially when the scale of a neural network is large, and an instruction cache 3, an input neuron cache 6, an output neuron cache 9, and a weight cache 8 cannot accommodate so many data, the data has to be temporarily stored in the storage device 1;

a DMA 2 is configured to move data or instructions in the storage device to respective caches;

an instruction cache 3 is configured to store special-purpose instructions;

a control unit 4 is configured to read the special-purpose instructions from the instruction cache 3, and decode the same into various instructions for operation unit;

a mapping unit 5 is configured to convert input data into a storage mode in which input neurons correspond to weights one-by-one;

an input neuron cache 6 is configured to store the input neuron data to be computed; and an operation unit 7 is configured to execute specific operations. The operation unit acts in three stages. A first stage is to execute multiplication operations in which the input neurons are multiplied by the weight data. A second stage is to execute an adder tree operation. The first stage and the second stages form a vector inner-product operation in combination. A third stage is to execute an activation function operation, where an activation function may be a sigmoid function, a tan h function, etc. The output neurons obtained in the third stage are written back into the output neuron cache.

A weight cache 8 is configured to store weight data.

An output neuron cache 9 is configured to store the output neurons of computation.

Figure 27:
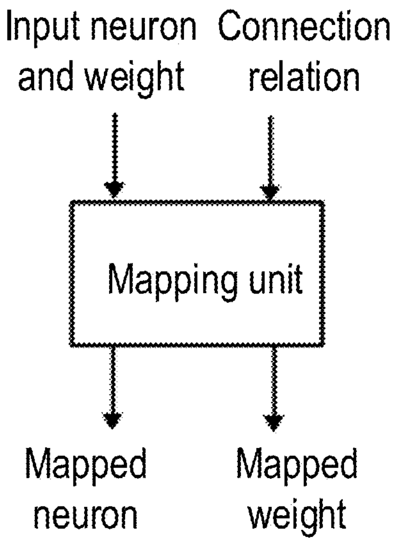
FIG. 27 is a structural diagram of a mapping unit according to another example of the present disclosure.

The structure of the mapping unit is illustrated in FIG. 27.

By taking the above sparsely connected neural network as an instance, the connection relation may be either of the two sparse expressions as stated above. According to the connection relation, the mapping unit will map the input neurons and input weights into mapped neurons and weights, and output the mapped neurons and weights. The mapped neurons and weights may be directly used in the computation, without considering the connection relation. A process of mapping the output neuron $o_1$ is as follows:

The input neurons are $i_1$, $i_2$, $i_3$, and $i_4$. The input weights are $w_{11}$, $w_{31}$, and $w_{41}$. The connection relation is 1011 or 0, 2, 1. According to the connection relation, the mapping unit changes the input neurons and weights into a corresponding relation. There are two circumstances of the output: one is to remove connectionless input neurons, then the mapped neurons are $i_1$, $i_3$, and $i_4$, and the mapped weights are $w_{11}$, $w_{31}$, and $w_{41}$; and the other is to complement a weight of 0 in a connectionless position, then the mapped neurons are $i_1$, $i_2$, $i_3$, and $i_4$, and the mapped weights are $w_{11}$, 0, $w_{31}$, and $w_{41}$.

A main distinction between the mapping units in Structure & Method I and Structure & Method II is that before computation, the mapping unit of the former one maps the input neurons and weights, and then stores them in the storage device; while Structure & Method II performs mapping during computation, and directly sends the mapped data to the operation unit for computation.

Structure & Method III

Figure 28:
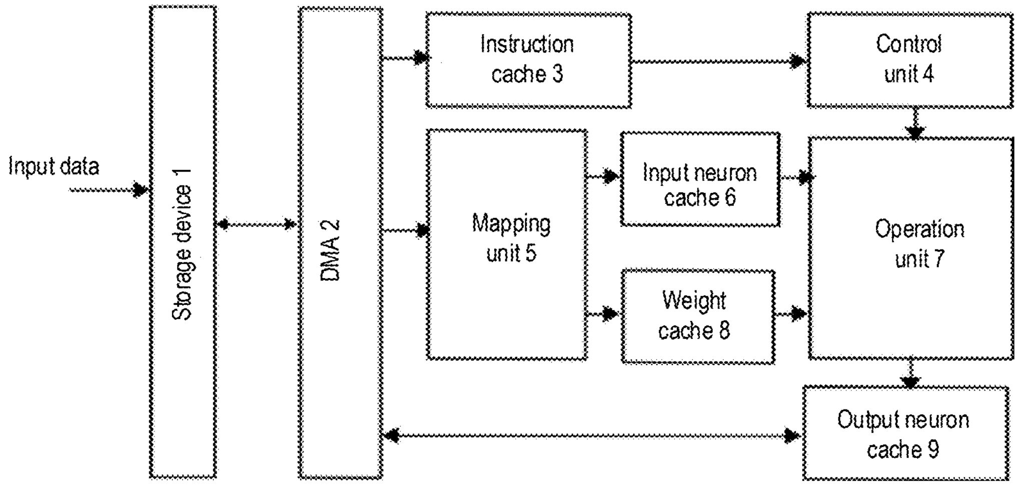
FIG. 28 is a structural diagram of an operation device for a sparsely connected artificial neural network according to yet another example of the present disclosure.

Based on Structure & Method II, a slight modification may be made so as to obtain a structure as shown in FIG. 28, where the mapping unit performs mapping only on the input neurons.

Figure 29:
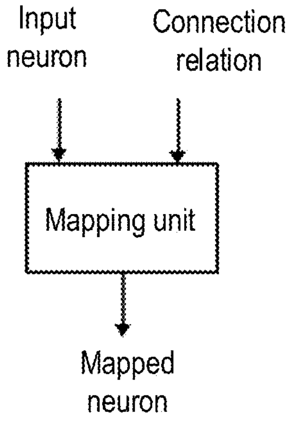
FIG. 29 is a structural diagram of a mapping unit according to yet another example of the present disclosure.

A structure diagram of the mapping unit is shown in FIG. 29.

A process of mapping the output neuron $o_1$ is described as below: The input neurons are $i_1$, $i_2$, $i_3$, and $i_4$, and the connection relation is 1011 or 0, 2, 1. According to the connection relation, the mapping unit changes the input neurons and weights into a corresponding relation, and removes those connectionless input neurons, so that the mapped neurons are $i_1$, $i_3$, and $i_4$.

Structure & Method IV

Figure 30:
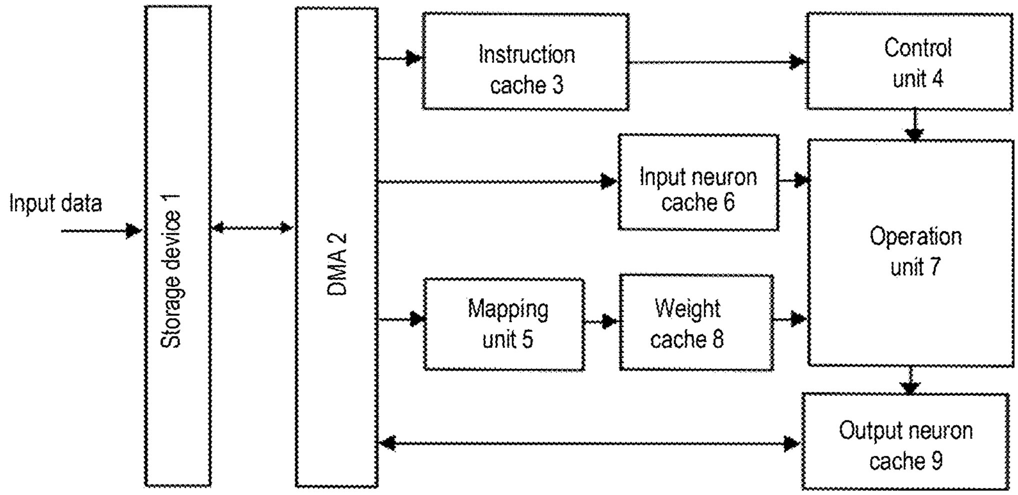
FIG. 30 is a structural diagram of an operation device for a sparsely connected artificial neural network according to yet another example of the present disclosure.

Based on Structure & Method-II, a slight modification may be made so as to obtain a structure as shown in FIG. 30, where the mapping unit performs mapping only on the input weights.

Figure 31:
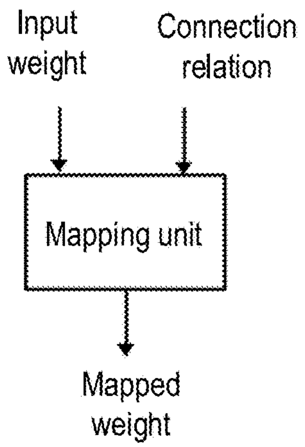
FIG. 31 is a structural diagram of a mapping unit according to an example of the present disclosure.

A structure diagram of the mapping unit is shown in FIG. 31.

A process of mapping the output neuron $o_1$ is described as below: The input weights are $w_{11}$, $w_{31}$, and $w_{41}$; and the connection relation is 1011 or 0, 2, 1. According to the connection relation, the mapping unit changes the input neurons and weights into a corresponding relation, so that the mapped weights are $w_{11}$, 0, w3i, and w41.

It should be noted that the present disclosure proposes that the sparsity-based artificial neural network computing example can be applied to the method examples provided above. Specifically, related arithmetic units (such as addition arithmetic unit, multiplication arithmetic unit, and activation arithmetic unit) in the operation unit may be called to implement the operation of the instruction, each arithmetic unit corresponds to a pipeline stage, and the execution of the instruction can be implemented by a combination of multiple pipeline stages, so as to save computing time and speed up the computing rate.

The present disclosure adopts the dedicated SIMD instruction for a sparse artificial neural network operation and a customized computation unit, so that the problems of insufficient computing performance of CPU and GPU and high cost of front-end decoding are solved, and the support of artificial neural network operation algorithms is effectively improved. By using a dedicated on-chip cache for the artificial neural network operation algorithm, the reusability of input neurons and weight data is fully tapped, which avoids repeated reading of data to the memory, reduces memory access bandwidth, and avoids memory bandwidth from becoming a bottleneck of artificial network operation and the training algorithm performance.

By adopting the dedicated SIMD instruction for a sparse artificial neural network operation and a customized computation unit, the problems of insufficient computing performance of CPU and GPU and high cost of front-end decoding are solved, and the support of artificial neural network operation algorithms is effectively improved. By using the dedicated on-chip cache for the artificial neural network operation algorithm, the reusability of input neurons and weight data is fully tapped, which avoids repeated reading of data to the memory, reduces memory access bandwidth, and avoids memory bandwidth from becoming a bottleneck of artificial network operation and the training algorithm performance.

Figure 32:
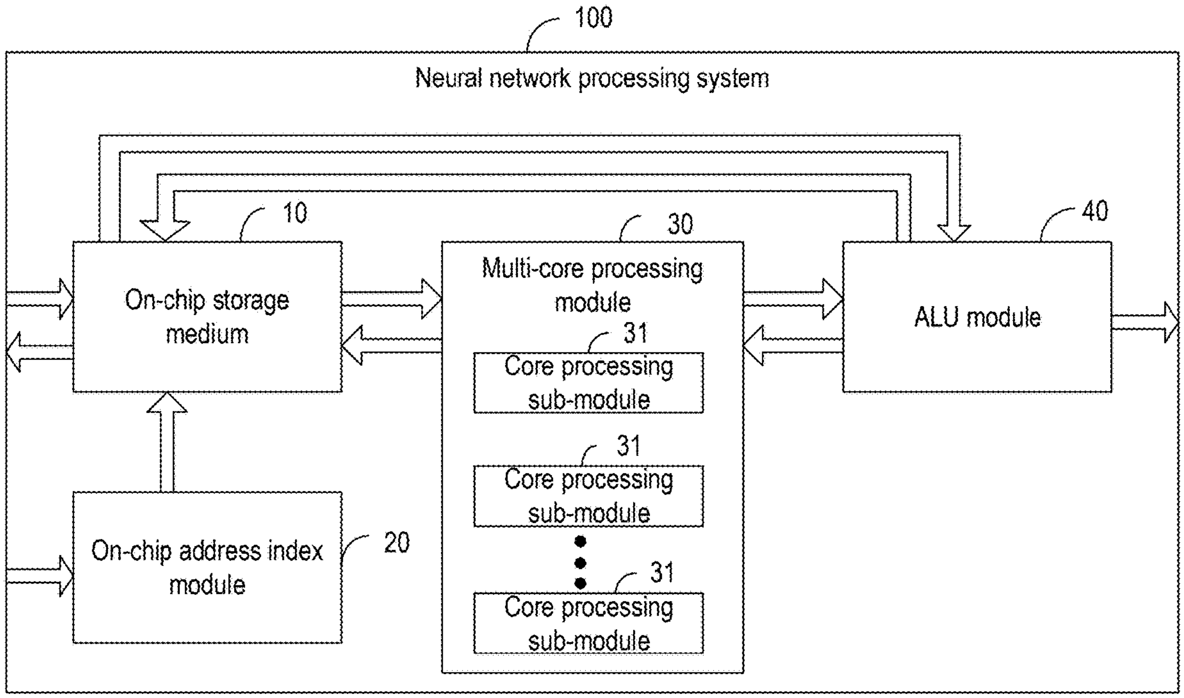
FIG. 32 is a structural diagram of an example of a neural network processing system of the present disclosure.

As shown in FIG. 32, the present disclosure further provides a neural network processing system 100. In an optional example, the neural network processing system 100 may be a computation device as shown in FIG. 2A or a collection of the computation devices; the neural network processing system 100 may also be a computation device as shown in FIG. 1 or FIG. 6A or a collection of the computation devices; and the neural network processing system 100 may also be a collection of sparsely connected artificial neural network computation devices or a collection of forward operation devices. In practical applications, the neural network processing system 100 may also be a collection of computation devices in various neural network fields. The present disclosure does not limit the types or expressions of the computation devices, computing chips, processing devices, and processors contained in the neural network processing system 100. Compared with the computation device as shown in FIG. 2A, one or more arithmetic logic units are added in the neural network processing system 100, where a plurality of arithmetic logic units are used for performing the non-linear operation. In an optional example, the computation device shown in FIG. 2A may also include units or modules in the neural network processing system shown in FIG. 32. In another optional example, the system includes at least one on-chip storage medium 10, at least one on-chip address index module 20, a multi-core processing module 30, and one or more arithmetic logic unit (ALU) modules 40. The multi-core processing module 30 includes a plurality of core processing sub-modules 31. The on-chip address index module 20 is connected to the on-chip storage medium 10, and the on-chip address index module 20, the multi-core processing module 30, and the ALU modules 40 are connected to each other. The multi-core processing module 30 is configured to perform the vector multiply-add operation of the neural network operation, and a plurality of ALU modules 40 are configured to obtain input data from the multi-core processing module 30 or the on-chip storage medium 10 to perform non-linear operations that cannot be completed by the multi-core processing module 30. In the present example, a plurality of core processing sub-modules share the on-chip storage medium 10 and the ALU modules 40.

The on-chip storage medium 10 is configured to store data transferred from the external of the neural network processing system or to store data generated during the processing, where the data generated during the processing includes a result of the processing or an intermediate operation result. These results may come from an on-chip core operation module of the processor or other operation components, for instance, the ALU modules 40 in the present disclosure. The on-chip storage medium 10 may be a static random access memory, a dynamic random access memory, an enhanced dynamic random access memory, a register, and other common storage media, and the on-chip storage medium 10 may also be a new-type storage device, such as a non-volatile memory, or a 3D memory.

The on-chip address index module 20 is configured to map to a correct storage address according to an index of input when performing an operation, so that the correct data can be transferred to the multi-core processing module 30 for processing. In this way, the data and the on-chip storage medium can interact correctly. The mapping process of address includes direct mapping, arithmetic transformation, and the like. The index module can be implemented by hardware circuits (including but not limited to FPGA, CGRA (coarse-grained reconfigurable architecture), application specific integrated circuit (ASIC), analog circuit, memristor, etc.).

The multi-core processing module 30 is composed of a plurality of core processing sub-modules, and is configured to perform a vector multiply-add operation of a neural network operation. Specifically, the multi-core processing module 30 completes most of the operations of the neural network algorithm, which are all linear operations, that is, multiply-add operations. The structure of each core processing sub-module 31 may be various, for instance, one-dimensional processing element (PE) implementation mode, two-dimensional PE or multi-dimensional implementation mode. A single core processing sub-module 31 is not limited to specific implementation principles, while the single core processing sub-module 31 has different implementation methods, such as a systolic scheme, and a matrix vector multiply-add operator. In addition, the plurality of core processing sub-modules 31 of the multi-core processing module 30 may be designed in homogeneous or in heterogeneous. The processing module can be implemented by hardware circuits (including but not limited to FPGA, CGRA, application specific integrated circuit (ASIC), analog circuit, memristor, etc.).

The ALU modules 40 are configured to obtain input data from the multi-core processing module 30 or the on-chip storage medium to perform non-linear operations that cannot be completed by the multi-core processing module. The ALU modules can be implemented by hardware circuits (including but not limited to FPGA, CGRA, application specific integrated circuit (ASIC), analog circuit, memristor, etc.). In the present disclosure, the data paths of the multi-core processing module 30, the ALU modules 40 and the on-chip storage medium 10 include, but are not limited to, H-TREE, or FAT-TREE interconnection technologies.

In the present disclosure, a plurality of core processing sub-modules 31 multiplex part of the input to reduce the requirement of bandwidth. When the neural network processing system 100 performs processing, the same input neuron is sent to the plurality of core processing sub-modules 31 of the multi-core processing module 30 separately, and different input weights are assigned to different core sub-processing modules 31. The plurality of core processing sub-modules 31 respectively perform vector inner product operations (multiply-add) on the input neuron and the input weights to obtain different output neurons. Different output neurons correspond to different weights, that is, for processing different output neurons, the input neurons are the same, while the weights are different. In the present disclosure, in most cases, the weights cannot be multiplexed by multiple kernels. However, in some cases, if multiple kernels work together to process a same feature map, the weights can also be multiplexed.

In the present disclosure, the core processing part of the neural network processing system increases the processing speed of the core operation part in the neural network algorithm by increasing the count of on-chip core processing modules, so that the processor obtains higher performance. The core processing refers to the vector multiply-add operation that takes up most of the processing time in neural network algorithms. In the present disclosure, the operation speed of the neural network processing system can be raised, and the neural network processing system has higher performance and becomes more efficient.

Figure 33:
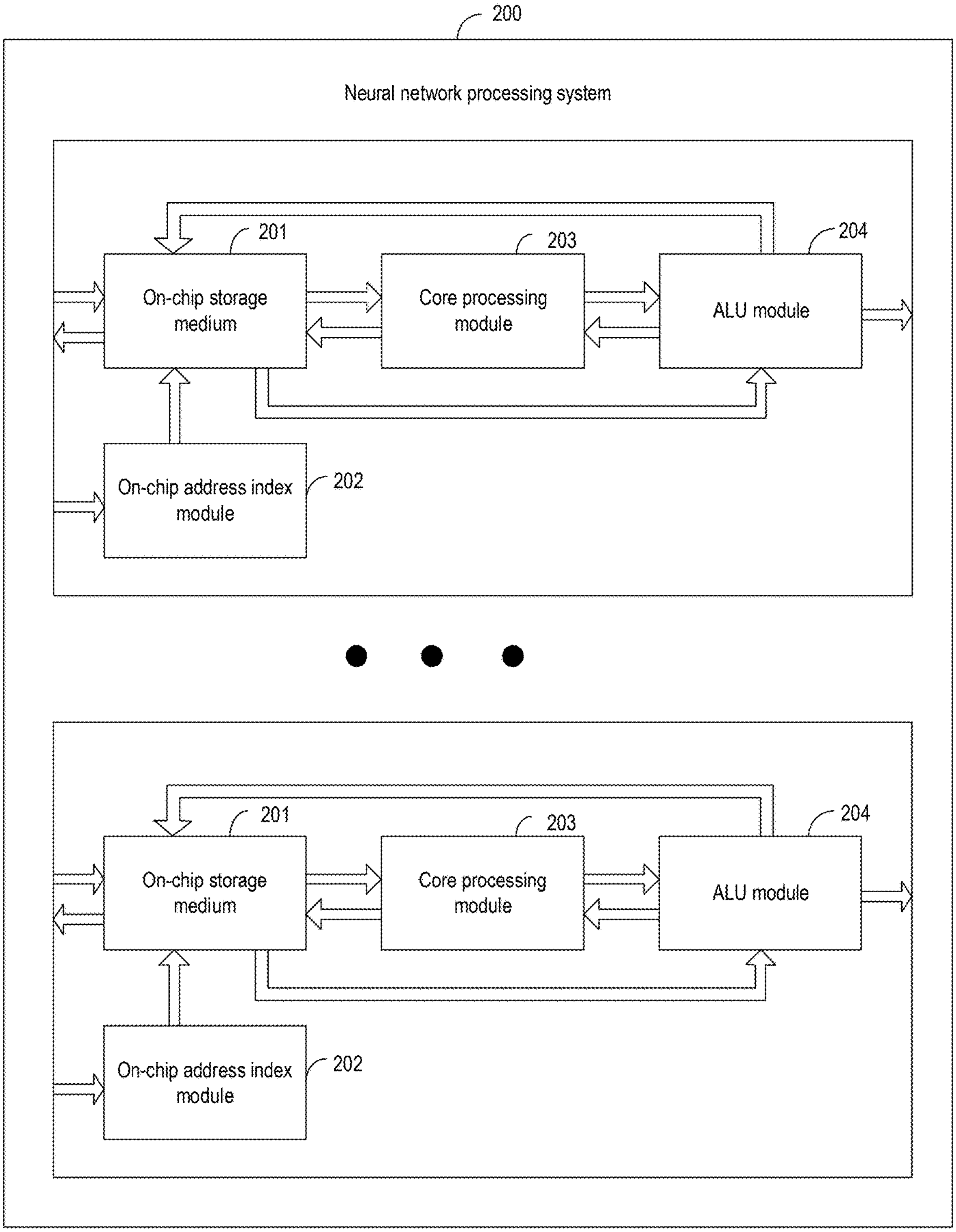
FIG. 33 is a structural diagram of another example of a neural network processing system of the present disclosure.

FIG. 33 is a structural diagram of a neural network processing system according to another example of the present disclosure. The difference between the neural network processing system shown in FIG. 33 and the neural network processing system shown in FIG. 32 is that the neural network processing system shown in FIG. 32 is loosely coupled, while the neural network processing system shown in FIG. 33 is tightly coupled. In FIG. 33, a neural network processing system 200 includes a plurality of on-chip storage medium 201, a plurality of on-chip address index modules 202, a plurality of core processing modules 203, and a plurality of ALU modules 204, where each core processing module 203 has a separate input interface and input structure, and the ALU modules 204 are also divided and exist in each kernel.

In FIG. 32, a plurality of core processing sub-modules 31 only complete specific core operations, and do not have more functions, and the multi-core processing core shares the on-chip storage medium 10 and the ALU modules 40. Compared with FIG. 32, since the neural network processing system shown in FIG. 33 is tightly coupled, each core processing module 203 has own independent on-chip storage medium 201 and ALU modules 204. For the loosely coupled design shown in FIG. 32, multiple kernels can work together to achieve higher performance requirements, while each kernel lacks flexibility. For the tightly coupled design shown in FIG. 33, each kernel has a certain degree of flexibility, while due to the independence of each kernel, the complexity of multi-core coordination is higher, which increases the complexity of control. The loosely coupled design is more suitable for multi-core isomorphism, and the tightly coupled design is more suitable for multi-core heterogeneity.

In the present disclosure, the neural network can be partitioned based on the design of the multi-core processing mode. The partitioning of the neural network includes partitioning based on input neurons, partitioning based on output neurons and partitioning based on weight connections. The partitioning of neural network is the decomposition of neural network processing mode, rather than the partitioning of neural network into independent subnets. That is, the partitioning is a kind of partitioning at the algorithm level, which is an operation completed by the software or the compiler, and the purpose of partitioning is to partition the processing into multiple parts that can be processed in multiple kernels.

Figure 34:
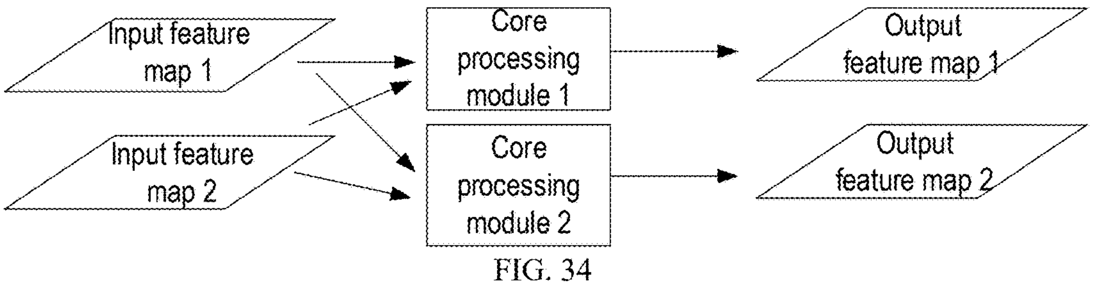
FIG. 34 is a schematic diagram of neural network partition according to an example of the present disclosure.
Figure 35:
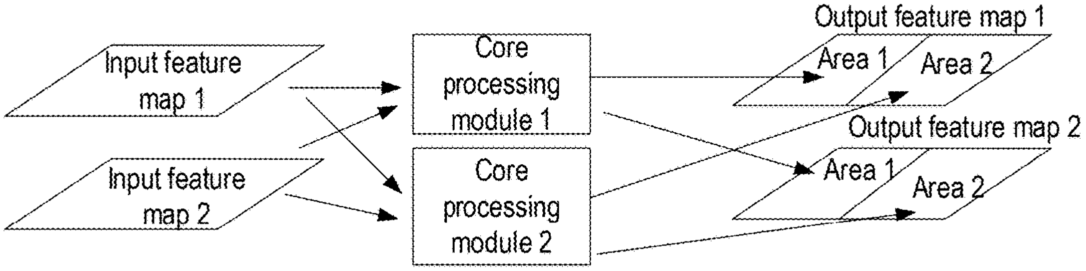
FIG. 35 is a schematic diagram of neural network partition according to another example of the present disclosure.
Figure 36:
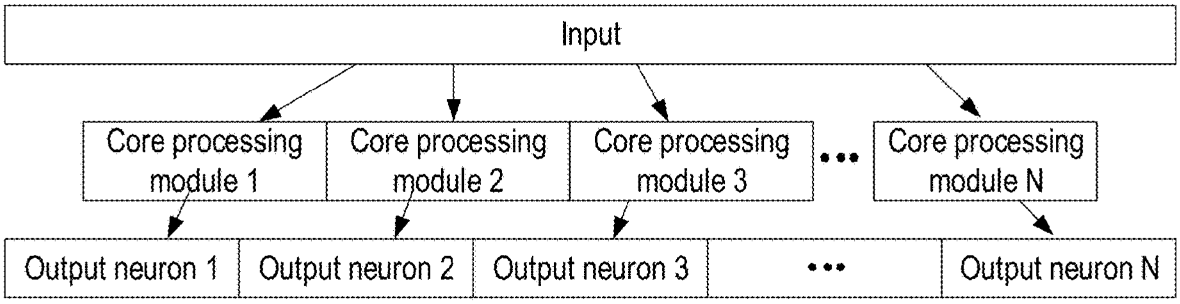
FIG. 36 is a schematic diagram of neural network partition according to yet another example of the present disclosure.

FIG. 34 is a schematic diagram of neural network partitioning according to an example of the present disclosure. FIG. 35 is a schematic diagram of neural network partitioning according to another example of the present disclosure. FIG. 36 is a schematic diagram of neural network partitioning according to yet another example of the present disclosure.

In the processing of neural networks, the convolution layers are organized according to the feature map, that is, the input is multiple maps and the output is multiple maps. In FIG. 34, for a two-dimensional or a multi-dimensional operation, a layer of output feature maps can be processed by each kernel to divide the neural network from the output perspective. FIG. 34 contains an input feature map 1, an input feature map 2, a core processing module 1, a core processing module 2, an output feature map 1, and an input feature map 2, where each feature map is a two-dimensional matrix. During processing, the input feature map 1 and the input feature map 2 are sent to the core processing module 1 and the core processing module 2, respectively, the core processing module 1 processes the output feature map 1, the core processing module 2 processes the output feature map 2, and the core processing module 1 and the core processing module 2 process a layer of output feature maps, respectively. That is, during the two-dimensional or multi-dimensional processing, the input feature maps are respectively sent to multiple core processing modules, and the multiple core processing modules respectively process one layer of output feature maps. After the multiple core processing modules complete the processing of the current output feature maps, the multi-core processing module performs new processing on the output feature maps, that is, only after all kernels have completed the processing of the current output feature maps will a new processing on feature maps be performed.

In actual applications, there may be multiple input feature maps, multiple core processing modules, and multiple output processing modules. The following takes two kernels (kernel #1, kernel #2), four output feature maps (output feature maps #1, #2, #3, #4) and four input feature maps (input feature maps #1, #2, #3, #4) as an instance to illustrate the processing mode of multi-core processing module: after the process starts, the kernel #1 is responsible for processing the output feature map #1, the kernel #2 is responsible for processing the output feature map #2, and the input feature map #1 is sent to the kernel #1 and the kernel #2 (that is, the kernel #1 and the kernel #2 share the input feature map #1), and corresponding weights are also sent to the kernel #1 and the kernel #2 for processing; when the input feature map #1 is processed, the input feature map #2 is read from the on-chip storage medium and sent to the kernel #1 and kernel #2 for processing (the weights are also read); when the kernel #1 and the kernel #2 complete the processing of the output feature map #1 and the output feature map #2, the kernel #1 and the kernel #2 start processing the output feature map #3 and the output feature map #4, that is, the above operation process is repeated.

As shown in FIG. 35, for the two-dimensional or multi-dimensional operation, a layer of output feature maps can be processed by each kernel to partition the neural network from the output perspective. Different kernels are responsible for processing different areas of a same feature map, the corresponding input is sent to each kernel, and the weights are read according to corresponding connections. The weights may be multiplexed, such as the convolution layers in the convolutional neural network. Only after all kernels have completed the processing of the current output feature maps will a new processing on feature maps be performed. In the FIG. 35, the input feature map 1 and the input feature map 2 are sent to the core processing module 1 and the core processing module 2, where the core processing module 1 is responsible for processing an area 1 of the output feature map 1 and an area 1 of the output feature map 2, and the core processing module 2 is responsible for processing an area 2 of the output feature map 1 and an area 2 of the output feature map 2. In this way, when the two-dimensional or multi-dimensional operations are performed, the input feature maps are sent to multiple core processing modules respectively, and the multiple core processing modules respectively process different areas of a same output feature map. After multiple core processing modules complete the processing of the current output feature maps, the multi-core processing module performs a new processing on the output feature maps.

As shown in FIG. 36, for the one-dimensional operation, part of the output can be processed by each core processing module to divide the neural network from the output perspective. Each kernel is responsible for processing different neurons, and the partitioning method in the present disclosure can be various, which is not limited to the partition method shown in FIG. 36. The input is sent to each core processing module, and the weights are read according to the corresponding connections. Only after all kernels have completed the processing of the current output feature maps will a new processing on feature maps be performed. That is, when the neural network processing system performs the one-dimensional operation, the same input is sent to multiple core processing modules, the multiple core processing modules separately process different output neurons. After the multiple core processing modules complete the processing of the current output neurons, a new processing on the input will be performed.

The division of the neural network includes division based on input neurons, division based on output neurons and division based on weight connections. In the present disclosure, the neural network is partitioned based on the output neurons. The output neurons need a plurality of input neurons or even all input neurons to participate in the processing, whereas the output neurons are mostly processed independently of each other. During the process of diving the neural network based on the output neurons, the input neurons can be multiplexed, which reduces the requirement of bandwidth, and then the processor becomes more efficient.

Figure 37:
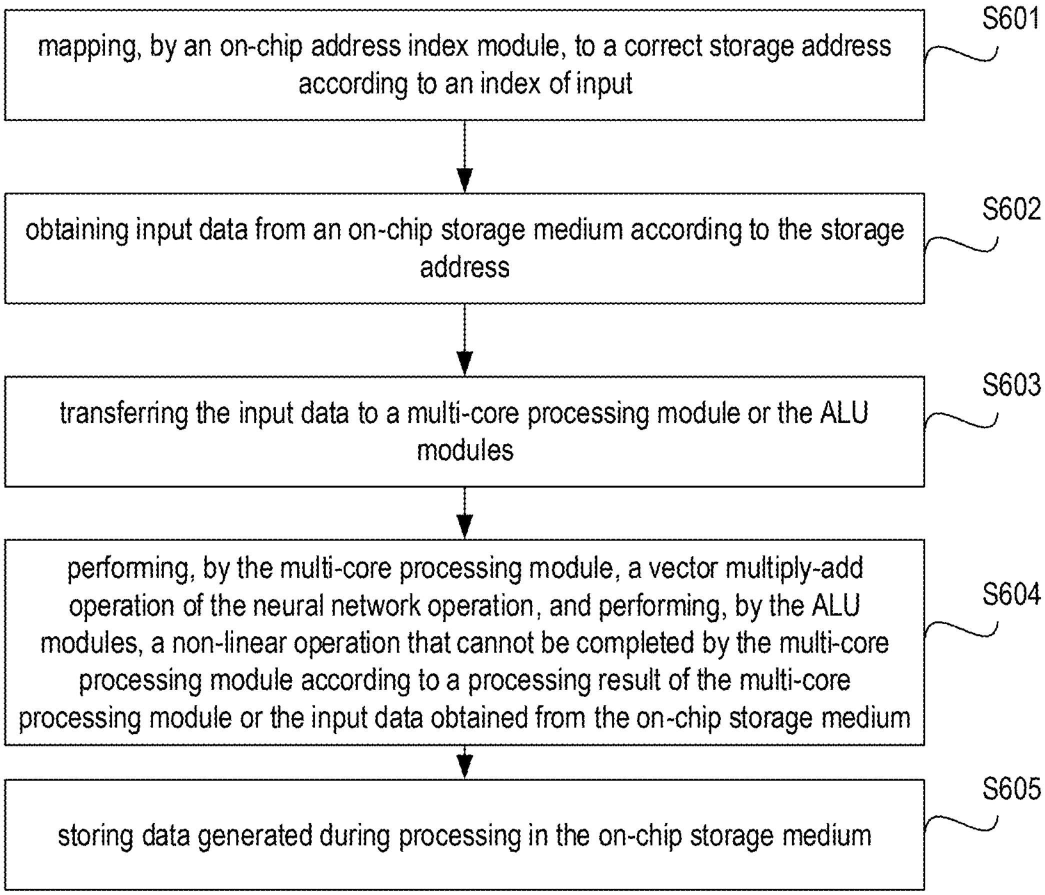
FIG. 37 is a flowchart of a neural network processing method of the present disclosure.

FIG. 37 is a flowchart of a neural network processing method of the present disclosure. The neural network processing method is implemented in the computation device shown in FIG. 4A, FIG. 5 or FIG. 2A, where the computation device contains a plurality of ALUs. The neural network processing method includes:

S601: mapping, by an on-chip address index module, to a correct storage address according to an index of input;

S602: obtaining input data from an on-chip storage medium according to the storage address;

S603: transferring the input data to a multi-core processing module or the ALU modules;

S604: performing, by the multi-core processing module, a vector multiply-add operation of the neural network operation, and performing, by the ALU modules, a non-linear operation that cannot be completed by the multi-core processing module according to a processing result of the multi-core processing module or the input data obtained from the on-chip storage medium; and

S605: storing data generated during processing in the on-chip storage medium.

Preferably, the neural network processing method further includes: transferring the same input neuron to a plurality of core processing modules separately, and assigning different input weights to different core processing modules; performing, by the plurality of core processing modules, vector inner product operations on the input neuron and the input weights to obtain different output neurons.

In the present disclosure, the core processing part of the neural network processing system increases the processing speed of the core operation part in the neural network algorithm by increasing the count of on-chip core processing modules, so that the processor obtains higher performance. The core processing refers to the vector multiply-add operation that takes up most of the processing time in neural network algorithms. In the present disclosure, the operation speed of the neural network processing system can be raised, and the neural network processing system has higher performance and becomes more efficient.

It should be noted that the arithmetic logic unit provided by the present disclosure may be used to perform non-linear operations on data, and applied to the above-mentioned method examples to increase the speed of data operation.

By implementing the examples of the present disclosure, the count of on-chip core processing modules (computation devices) can be increased, thereby increasing the processing speed of the core operation part of the neural network algorithm, so that in various application scenarios, the accelerator can receive data faster and complete corresponding operations and provide feedback information to meet the computing needs of this application scenario. In addition, the present disclosure further provides a plurality of neural network division methods, therefore, different division methods can be selected according to the data of different application scenarios. If multiple division methods can meet requirement, the present disclosure can also support data operations in multiple formats, therefore, the present disclosure is flexible.

An example of the present disclosure provides a forward operation of a multi-layer artificial neural network supporting discrete data representation, where the multi-layer artificial neural network includes a plurality of neurons in two or more layers. For each layer, a dot product operation is performed on input neuron vectors with weight vectors, and the result of the dot product operation is processed based on an activation function to obtain output neurons. The activation function can be sigmoid function, tan h, relu, softmax function, etc., and supports discrete expression or continuous representation of the activated output neurons.

For the dot product operation of the input neuron vectors represented by discrete data or the dot product operation of the weight vectors represented by discrete data, the device supports to convert the dot product operation into data shift, NOT, Exclusive OR, and other operations. For the representation of data, the device supports discrete or non-discrete representation of data, and users can customize which data in which layer is represented discrete or non-discrete, and can customize the count of bits of discrete data according to specific needs, so as to replace the count of represented real data, for instance, discrete data set to 1 bit, 2 bits, 3 bits, can represent 2, 4, and 8 real data, respectively.

Figure 38:
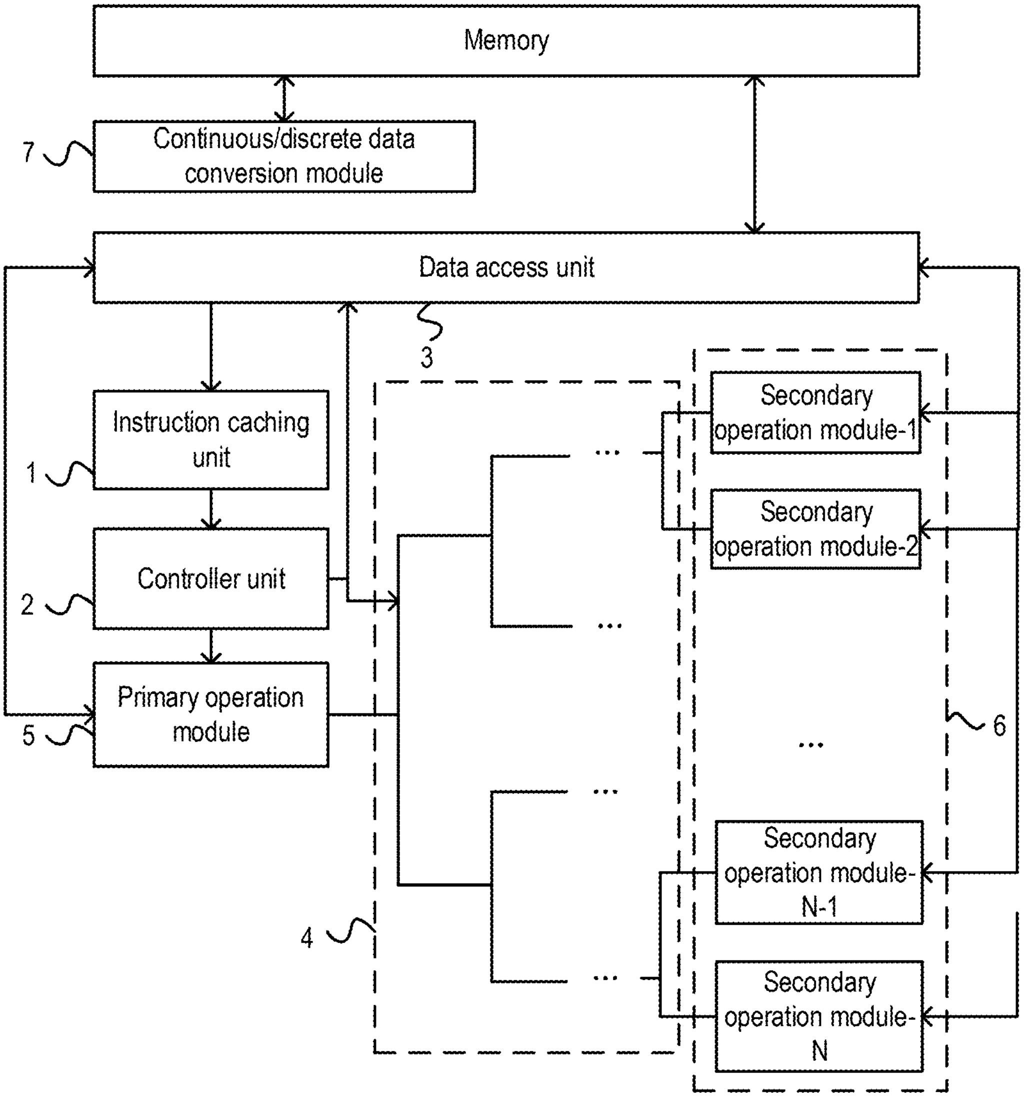
FIG. 38 shows an overall structure of a device for performing a forward operation of an artificial neural network supporting a discrete data representation according to an example of the present disclosure.

FIG. 38 shows an overall structure of a device for performing a forward operation of an artificial neural network supporting a discrete data representation according to an example of the present disclosure. The device for artificial neural network forward operation can be set in the processing system of the neural network. As shown in FIG. 38, in an optional example, the device may be the computation device shown in FIG. 2A, the computation device shown in FIG. 1, and the computation device shown in FIG. 6A. Optionally, a continuous/discrete data conversion module can also be added to the computation device shown in FIG. 2A (the continuous/discrete data conversion module can also be added to the computation device shown in FIG. 1 or FIG. 6A or the artificial neural network computation device for sparse connection), where the continuous/discrete data conversion module is configured to exchange continuous data and discrete data, and is connected to a data access unit to realize data communication. In an optional example, the computation device shown in FIG. 2A can also be expanded, or the modules or units of the device shown in FIG. 38 can also be added to the computation device shown in FIG. 2A. In another optional example, the device includes an instruction caching unit 1, a controller unit 2, a data access unit 3, an interconnection module 4, a primary operation module 5 and a plurality of secondary operation modules 6, optionally, the device may further include a continuous/discrete conversion module 7. The instruction caching unit 1, the controller unit 2, the data access unit 3, the interconnection module 4, the primary operation module 5, the plurality of secondary operation modules 6, and the continuous/discrete conversion module 7 can be implemented by hardware circuits (including but not limited to FPGA, CGRA, application specific integrated circuit (ASIC), analog circuit, memristor, etc.). Particularly, the device can provide storage and operation support for discrete data.

The instruction caching unit is configured to read in an instruction through the data access unit 3 and cache the instruction.

The controller unit 2 is configured to read the instruction from the instruction caching unit 1, and decode instruction into a micro-instruction for controlling the behavior of other modules, such as the data access unit 3, the primary operation module 5, and the secondary operation modules 6.

The data access unit 3 can access the external address space, directly read and write data to each caching unit inside the device, and complete the loading and storage of the data, where the data is represented discretely or non-discretely. This data access unit 3 is configured to read data represented discretely.

The interconnection module 4 is configured to connect the primary operation module and the secondary operation modules, and can be implemented into different interconnection topologies (such as tree structure, ring structure, grid structure, hierarchical interconnection, bus structure, etc.).

Figure 39:
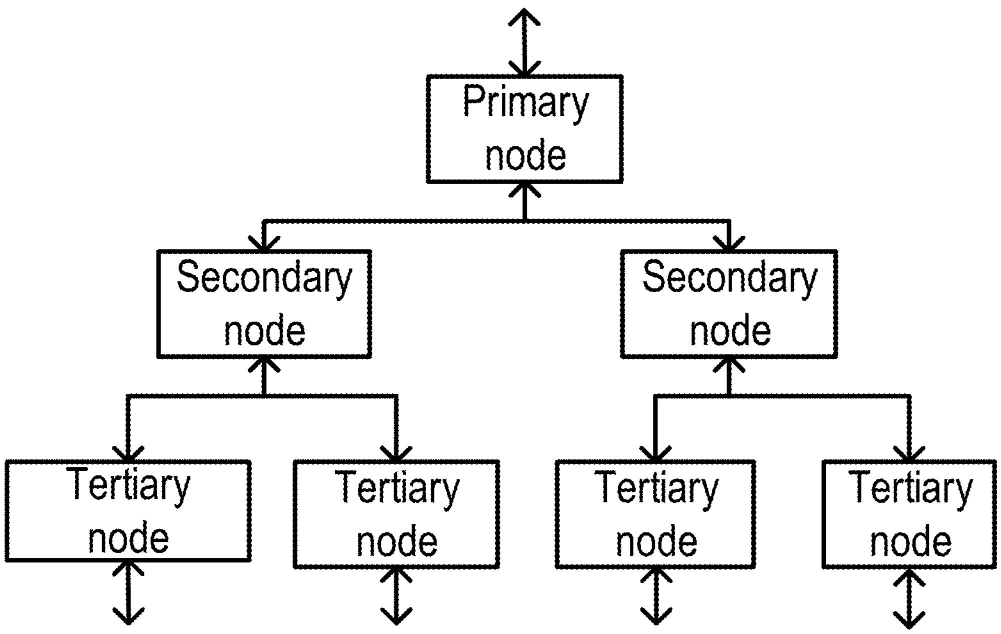
FIG. 39 shows a structure of an H-tree module (an example of an interconnection module) in a device for performing a forward operation of an artificial neural network supporting a discrete data representation according to an example of the present disclosure.

FIG. 39 schematically shows a structure of a tree module (an example of an interconnection module 4) according to an example of the present disclosure. A tree module 4 forms a data channel between the primary operation module 5 and the plurality of secondary operation modules 6, and has a tree structure. Optionally, the tree module may have an n-ary tree structure, such as a binary tree path shown in FIG. 39. Each node can transfer data received from an upstream node to two downstream nodes, and merge data returned by the two downstream nodes and return to an upstream node. For instance, at the beginning of a computational phase of each layer of an artificial neural network, neuron data in the primary operation module 5 may be in a discrete representation or a non-discrete representation. The neuron data is sent to each secondary operation module 6 through the tree module 4. When secondary operation modules 6 finish computing, neuron values of the respective secondary operation modules are spliced stage-by-stage into a complete vector of neurons in the tree module which is an intermediate result vector. For an operation of a discrete data representation, referring to FIG. 44, an operation module dedicated to discrete data operations are included in the primary-secondary operation module. A fully connected layer of a neural network is used for explanation here. It is assumed that there are N secondary operation modules in the device, the intermediate result vector is segmented by N, where each segment includes N elements. An $i^{th}$ secondary operation module computes an $i^{th}$ element of each segment. The N elements are spliced into a vector with a length of N through the tree module and returned to the primary operation module. Therefore, if the network has only N output neurons, each secondary operation unit only needs to output a single neuron value. If the network has m*N output neurons, each secondary operation unit needs to output m neuron values. The tree module supports a discrete data representation in the process of data storing and transferring.

Figure 40:
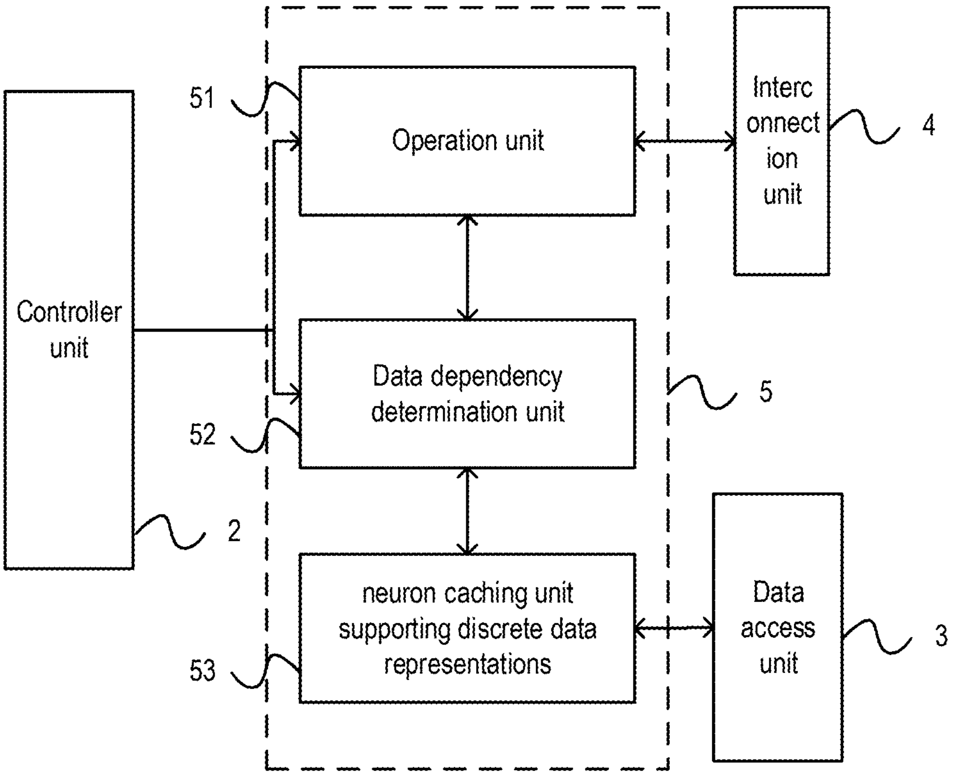
FIG. 40 shows a structure of a primary operation module in a device for performing a forward operation of an artificial neural network supporting a discrete data representation according to an example of the present disclosure.

FIG. 40 shows a structure of a primary operation module 5 in a device for performing a forward operation of an artificial neural network according to an example of the present disclosure. As shown in FIG. 40, the primary operation module 5 includes an operation unit 51, a data dependency determination unit 52, and a neuron caching unit 53 supporting discrete data representations.

The neuron caching unit 53 supporting discrete data representations is configured to cache the input data and output data used by the primary operation module 5 in the computation process.

The operation unit 51 performs various operation functions of the primary operation module 5. For the case where operation factors are all discrete data, the addition, subtraction, multiplication and division of discrete data and discrete data can be realized by looking up tables. For instance, 2-bit discrete data can represent 4 continuous data values, and there are 4*4=16 combinations of the 4 continuous data. For each operation of addition, subtraction, multiplication and division, a 4*4 index table can be made and maintained, and the corresponding computation value can be found through the index table. A total of 4 4*4 index tables are required for the 4 operations.

For the case where the operation factors include both discrete data and continuous data, corresponding bit operations may be preset for addition, subtraction, multiplication, and division operations for different discrete data. For instance, the dot product operation of discrete data and continuous data can be replaced by the method of accumulating and summing after multiplying by a corresponding bit power of 2 after a bitwise Exclusive OR operation. For instance, for the multiplication operation, if there are discrete representations of multiplication factor data, the multiplication operation of continuous data represented by the discrete data can be replaced by the corresponding operations (for instance, bitwise Exclusive OR of data, NOT, data shift, etc.) of discrete data index, so as to reduce the count of multiplier components. For instance, for the multiplication operation of continuous data and discrete data, −½ is multiplied by 16, where traditional multiplier components will directly multiply −½ and 16. In the operation unit 51, the function of operation unit can be replaced by an on-off determination method such as searching index due to the small amount of discrete data. For instance, it can be specified that the discrete data representation of −½ is 01. If an operation factor is −½, the discrete data received by the operation unit 51 is 01, and then the operation unit 51 adopts the operation corresponding to the discrete data 01. 10001000 can be obtained by inverting the sign bit 00010000 represented by the 8-bit fixed-point number of 16 and moving 1 bit to the right, and the decimal representation is −8. For the division operation, 16 is divided by −2, where 16 is continuous data, and −2 is discrete data. If it is specified that the binary representation of the discrete data-2 is 10, the operation unit uses the division operation corresponding to the discrete data 10. 10001000 can be obtained by moving 0001000 represented by 8-bit fixed-point number of 16 1 bit to the right, and then inverting the sign bit, and the decimal representation is −8, and the result is obtained finally. The addition and subtraction operations are similar to the above process. The binary of discrete data is taken as an index, and the bitwise left, right, Exclusive OR, etc. are indexed. After this operation, an addition or subtraction operation with real data represented by discrete data is realized.

The data dependency determination unit 52 is a port for the first operation unit 51 to read/write the neuron caching unit 53, and can ensure consistency in reading data from and writing data to the neuron caching unit. At the same time, the data dependency determination unit 52 is also configured to transfer the read data to the secondary operation modules through the interconnection module 4. Output data of the secondary operation modules 6 is directly sent to the operation unit 51 through the interconnection module 4. An instruction output by the controller unit 2 is sent to the operation unit 51 and the data dependency determination unit 52 to control their behaviors.

Figure 41:
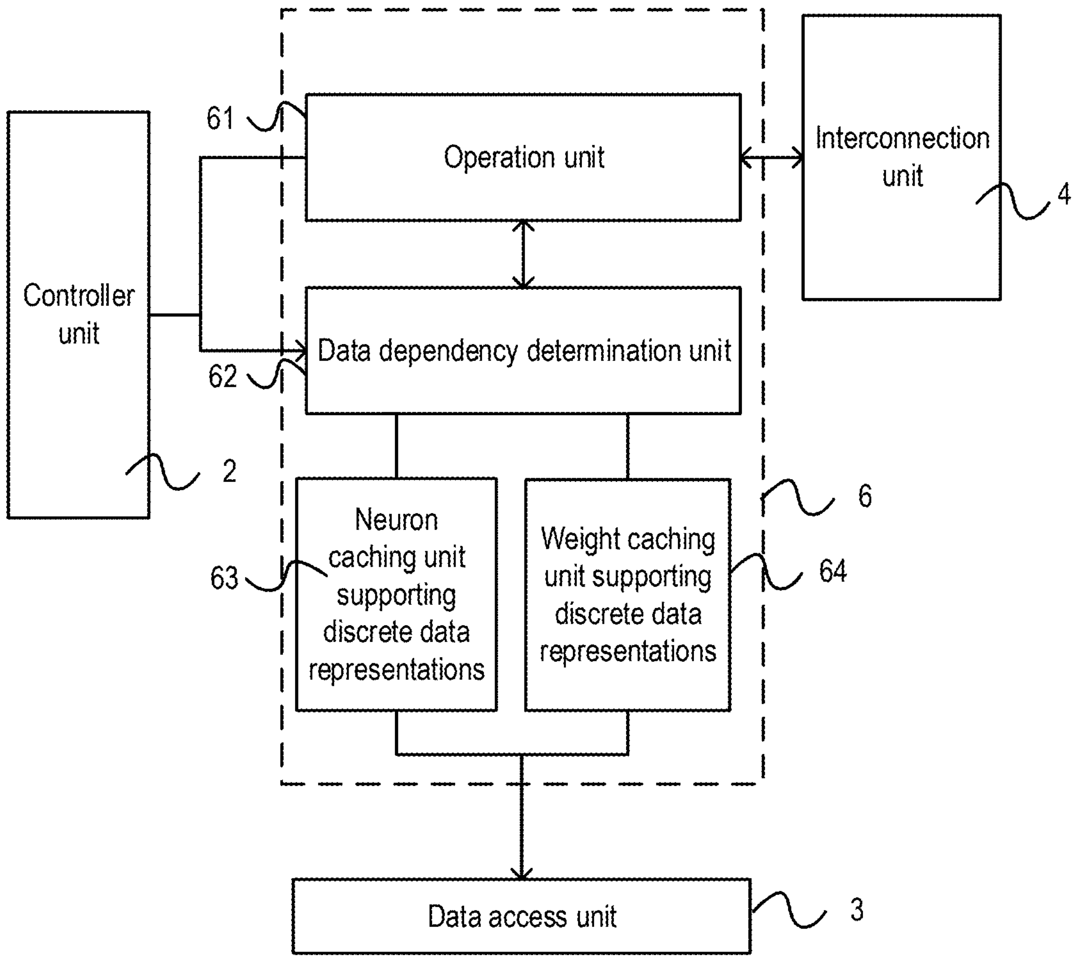
FIG. 41 shows a structure of a secondary operation module in a device for performing a forward operation of an artificial neural network supporting a discrete data representation according to an example of the present disclosure.

FIG. 41 shows a structure of a secondary operation module 6 in a device for performing a forward operation of an artificial neural network supporting a discrete data representation according to an example of the present disclosure. As shown in FIG. 41, each secondary operation module 6 includes an operation unit 61, a data dependency determination unit 62, a neuron caching unit 63 supporting discrete data representations, and a weight caching unit 64 supporting discrete data representations.

The operation unit 61 receives a micro-instruction sent by the controller unit 2 and performs an arithmetic logic operation. For the case where operation factors are all discrete data, the addition, subtraction, multiplication and division of discrete data and discrete data can be realized by looking up tables. For instance, 2-bit discrete data can represent 4 continuous data values, and there are 4*4=16 combinations of the 4 continuous data. For each operation of addition, subtraction, multiplication, and division, a 4*4 index table can be made and maintained, and the corresponding computation value can be found through the index table. A total of four 4*4 index tables are required for the 4 operations.

For the case where the operation factors include both discrete data and continuous data, corresponding bit operations may be preset for addition, subtraction, multiplication, and division operations for different discrete data. For instance, the dot product operation of discrete data and continuous data can be replaced by the method of accumulating and summing after multiplying by a corresponding bit power of 2 after a bitwise Exclusive OR operation. For instance, for the multiplication operation, if there are discrete representations of multiplication factor data, the multiplication operation of continuous data represented by the discrete data can be replaced by the corresponding operations (for instance, bitwise Exclusive OR of data, data shift, NOT, etc.) of discrete data index, so as to reduce the count of multiplier components. For instance, for the multiplication operation of continuous data and discrete data, −½ is multiplied by 16, where traditional multiplier components will directly multiply −½ and 16. In the operation unit 51, the function of operation unit can be replaced by an on-off determination method such as searching index due to the small amount of discrete data. For instance, it can be specified that the discrete data representation of −½ is 01. If an operation factor is −½, the discrete data received by the operation unit 51 is 01, and then the operation unit 51 adopts the operation corresponding to the discrete data 01. 10001000 can be obtained by inverting the sign bit 00010000 represented by the 8-bit fixed-point number of 16 and moving 1 bit to the right, and the decimal representation is −8. For the division operation, 16 is divided by −2, where 16 is continuous data, and −2 is discrete data. If it is specified that the binary representation of the discrete data-2 is 10, the operation unit uses the division operation corresponding to the discrete data 10. 10001000 can be obtained by moving 0001000 represented by 8-bit fixed-point number of 16 1 bit to the right, and then inverting the sign bit, and the decimal representation is −8, and the result is obtained finally. The addition and subtraction operations are similar to the above process. The binary of discrete data is taken as an index, and the bitwise left, right, Exclusive OR, etc. are indexed. After this operation, an addition or subtraction operation with real data represented by discrete data is realized.

The data dependency determination unit 62 is responsible for reading and writing the neuron caching unit during a computation process. Before performing read and write operations, the data dependency determination unit 62 first ensures that there is no consistency conflict between the reading and writing of data used by instructions. For instance, all micro-instructions sent to the data dependency unit 62 are stored in the instruction queue inside the data dependency unit 62. In this queue, if a range of data to be read by a reading instruction conflicts with a range of data to be written by a writing instruction that is located at the front of the queue, the instruction can only be executed until a writing instruction depended by the instruction has been executed.

The neuron caching unit 63 supporting discrete data representations caches the input neuron vector data and output neuron value data of the secondary operation module 6, where the data can be stored and transferred in the form of discrete data.

The weight caching unit 64 supporting discrete data representations caches the weight data required by the secondary operation module 6 in the computation process, where the data can be represented discretely or not according to users' definition. Each secondary operation module 6 only stores the weights between all input neurons and some output neurons. Taking the fully connected layer as an instance, the output neurons are segmented according to the amount N of secondary operation units, and the weight corresponding to the n-th output neuron of each segment is stored in the n-th secondary operation unit.

The secondary operation module 6 implements the first half of the forward operation that can be performed in parallel in each layer of the artificial neural network. The data storage and operations in this module support discrete data representations. The following takes the fully connected layer of the artificial neural network (MLP) as an instance. The process is $y=f(wx+b)$, where the multiplication of the weight matrix w and the input neuron vector x can be classified into unrelated computing subtasks performed in parallel, and out and in are column vectors. Each secondary operation module 6 only computes the product of partial corresponding scalar elements in in and the columns corresponding to the weight matrix w, each output vector obtained is a partial sum to be accumulated, and these partial sums are added step by step in the interconnection module 4 to obtain the final result, where the result can be represented by discrete data. Therefore, the computation process becomes a process of computing the partial sums performed in parallel and the subsequent accumulation process. Each secondary operation module 6 computes an output neuron value, and all output neuron values are combined in the interconnection module 4 to obtain an intermediate result vector. Each secondary operation module 6 only needs to compute the output neuron value corresponding to this module in the intermediate result vector y. The interconnection module 4 sums all the neuron values output from the secondary operation modules 6 to obtain the final intermediate result vector y. The primary operation module 5 performs subsequent computations based on the intermediate result vector y, such as adding bias, pooling (such as MAXPOOLING or AVGPOOLING, etc.), activation, and sampling, etc.

Figure 45:
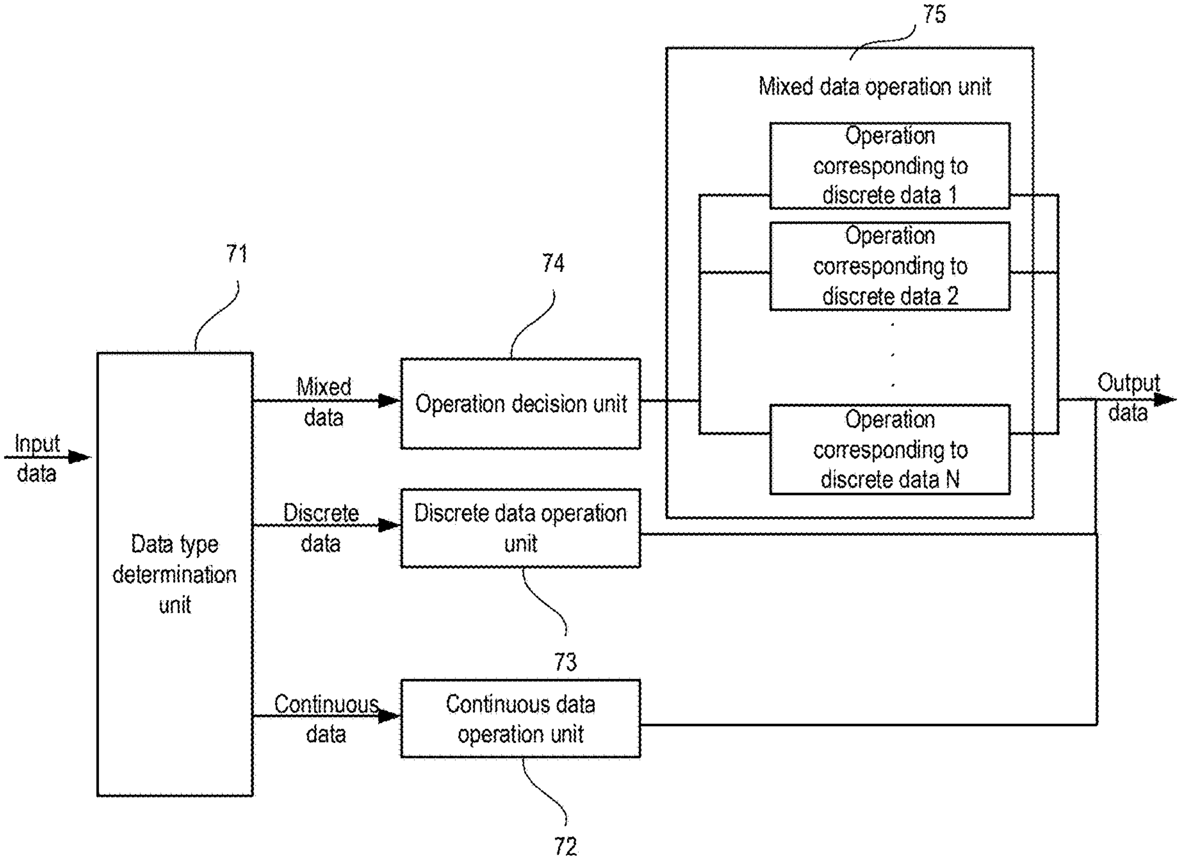
FIG. 45 a structural diagram of an operation unit of the present disclosure.

FIG. 45 shows a structural diagram of an operation unit of the present disclosure, where the structural diagram may be a structural diagram of the operation unit 51 in the primary operation module or the operation unit 61 in the secondary operation modules. The input data during operation can be discrete data or continuous data. A data type determination unit 71 determines that the input data is all continuous data, or all discrete data, or mixed data containing both continuous data and discrete data. When the input data is all continuous data, a continuous data operation unit 72 performs corresponding operations.

When the input data are all discrete data, a discrete data operation unit 73 performs corresponding operations. For the case where operation factors are all discrete data, the addition, subtraction, multiplication, and division of discrete data and discrete data can be realized by looking up tables. For instance, 2-bit discrete data can represent 4 continuous data values, and there are 4*4=16 combinations of the 4 continuous data. For each operation of addition, subtraction, multiplication, and division, a 4*4 index table can be made and maintained, and the corresponding computation value can be found through the index table. A total of four 4*4 index tables are required for the 4 operations.

When input data is mixed data, an operation decision unit 74 decides what kind of operation should be performed on the mixed data according to discrete data in the mixed data. Corresponding operations can be preset for different discrete data. And then, a mixed data operation unit performs a corresponding operation according to a decision result of the operation decision unit 74. For the case where the operation factors include both discrete data and continuous data, corresponding bit operations may be preset for addition, subtraction, multiplication, and division operations for different discrete data. For instance, the dot product operation of discrete data and continuous data can be replaced by the method of accumulating and summing after multiplying by a corresponding bit power of 2 after a bitwise Exclusive OR operation. For instance, for the multiplication operation, if there are discrete representations of multiplication factor data, the multiplication operation of continuous data represented by the discrete data can be replaced by the corresponding operations (for instance, bitwise Exclusive OR of data, NOT, data shift, etc.) of discrete data index, so as to reduce the count of multiplier components. For instance, for the multiplication operation of continuous data and discrete data, −½ is multiplied by 16, where traditional multiplier components will directly multiply −½ and 16. In the operation unit 51, the function of operation unit can be replaced by an on-off judgment method such as searching index due to the small amount of discrete data. For instance, it can be specified that the discrete data representation of −½ is 01. If an operation factor is −½, the discrete data received by the operation unit 51 is 01, and then the operation unit 51 adopts the operation corresponding to the discrete data 01. 10001000 can be obtained by inverting the sign bit 00010000 represented by the 8-bit fixed-point number of 16 and moving 1 bit to the right, and the decimal representation is −8. For the division operation, 16 is divided by −2, where 16 is continuous data, and −2 is discrete data. If it is specified that the binary representation of the discrete data-2 is 10, the operation unit uses the division operation corresponding to the discrete data 10. 10001000 can be obtained by moving 0001000 represented by an 8-bit fixed-point number of 16 1 bit to the right, and then inverting the sign bit, and the decimal representation is −8, and the result is obtained finally. The addition and subtraction operations are similar to the above process. The binary of discrete data is taken as an index, and the bitwise left, right, Exclusive OR, etc., are indexed. After this operation, an addition or subtraction operation with real data represented by discrete data is realized.

Figure 46:
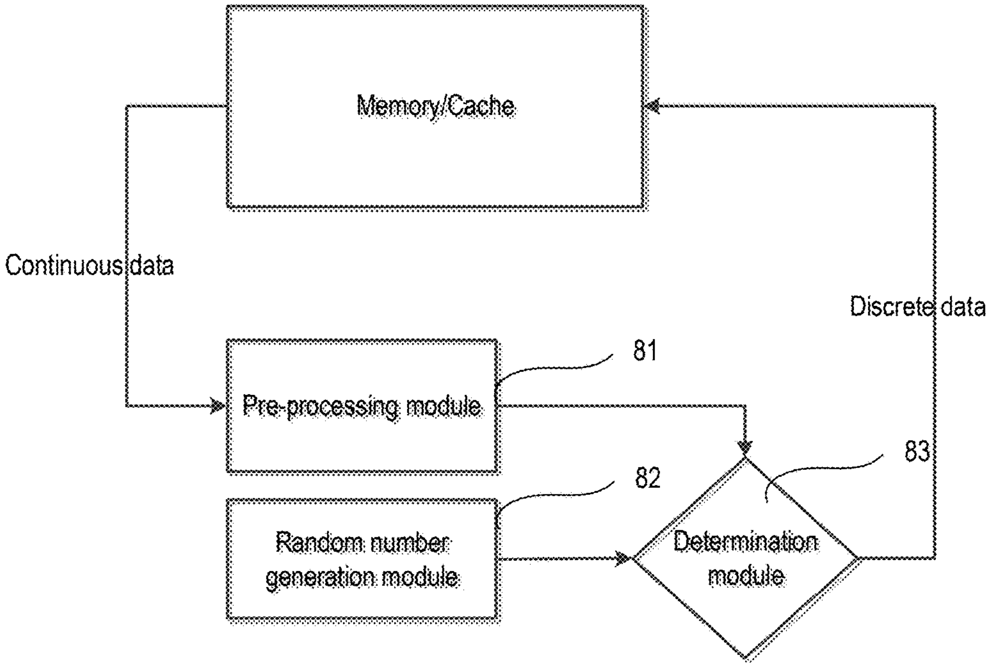
FIG. 46 a structural diagram of a continuous/discrete data conversion unit for converting data between continuous and discrete data according to an example of the present disclosure.

FIG. 46 shows a continuous/discrete data conversion unit. The users can define whether to use this module to convert continuous data to discrete data or not use the module. The continuous data is input, and the discrete data is output. The continuous/discrete data conversion unit includes a random number generation module, a determination module, and an operation module. The input continuous data is processed by the operation module to obtain a result, and the determination module compares the random number with the operation result to determine which interval the random number falls in, thereby determining the specific value of the output discrete data. The following takes a process for generating binary discrete data defined by users as an example. Any input continuous data x is processed by the operation module to obtain a result y=abs(clip(−1,1)), and then the determination module determines that if the random number is greater than y, then the output discrete data is 1, and if the random number is less than or equal to y, the output discrete data is 0, where the discrete data 1 and 0 represent continuous data −1 and +1, respectively. The obtained discrete data is stored back in memory and waits for being used by the operation units in the primary-secondary operation module to generate the corresponding operations.

The weight data and the output/input data during the forward process can be represented by discrete data or not represented by discrete data. The multiplication operation of continuous data can be replaced by Exclusive OR, NOT, and shift based on the discrete data. For instance, the weight is represented by 1-bit discrete data, 0 represents +1, and 1 represents −1; and the multiplication of the weight is realized by performing Exclusive OR operation on the sign bit of the data multiplied by the weight.

An example of the present disclosure further provides an instruction set of performing the forward operation of the artificial neural network on the afore-mentioned devices. The instruction set includes a CONFIG instruction, a COMPUTE instruction, an IO instruction, a NOP instruction, a JUMP instruction, and a MOVE instruction, etc., for specific descriptions of these instructions, please refer to the relevant introductions in the above-mentioned examples, which will not be repeated herein.

Figure 42:
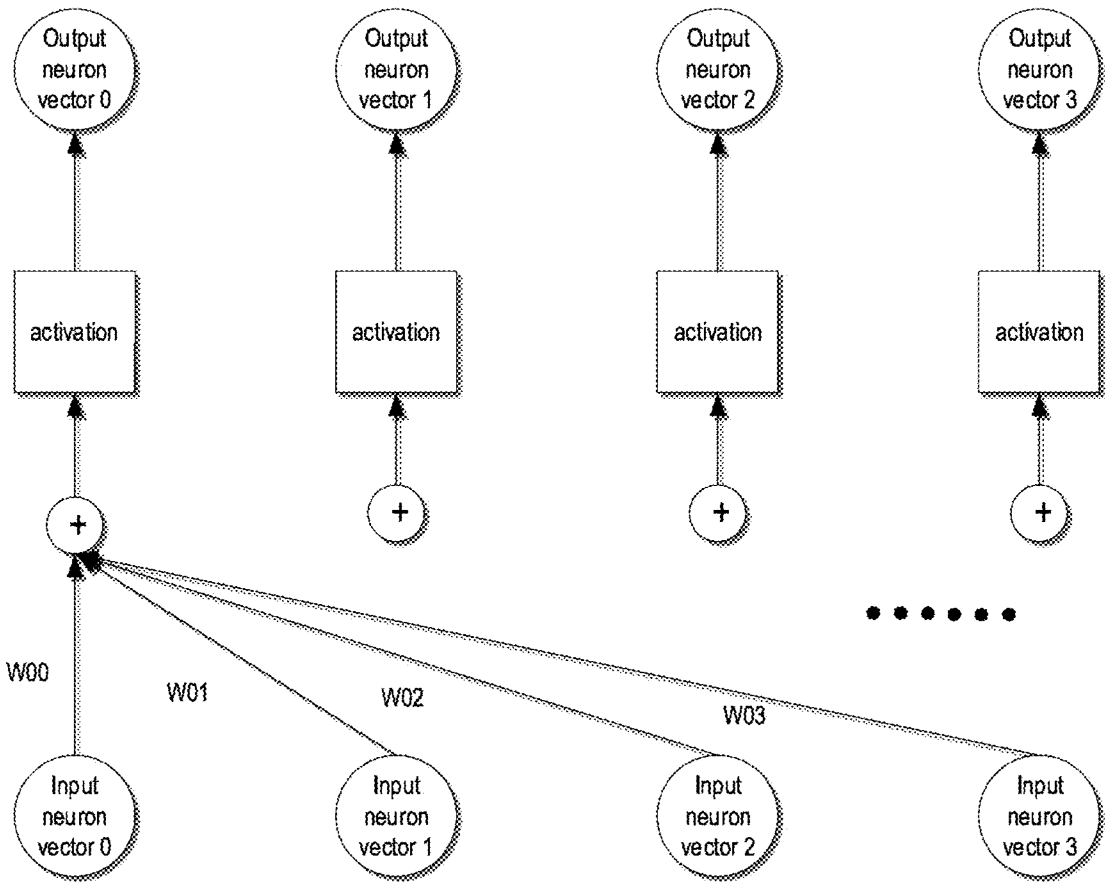
FIG. 42 shows a process of a forward operation of an artificial neural network according to an example of the present disclosure.

FIG. 42 shows a process of a forward operation of an artificial neural network according to an example of the present disclosure. In different secondary operation modules 6, the dot product operation is performed on the input neuron vectors and the weight vectors of the secondary operation modules 6 to obtain the corresponding output neuron values, and all these output neuron values form an intermediate result vector. The intermediate result vector is added with bias vector and is performed the activation operation to obtain the final output neuron vectors of the layer neural network, where the formula is out=ƒ(w*in+b), where out is the output neuron vector, in is the input neuron vector, b is the bias vector, w is the weight matrix, and ƒ is the activation function. The weight vectors of each secondary operation module 6 is a column vector in the weight matrix corresponding to the secondary operation module 6. The interconnection module transfers the input neuron vectors [in0, . . . , inN] to all the secondary operation units, and the input neuron vectors [in0, . . . , inN] are temporarily stored in the neuron caching unit. For an i-th secondary operation unit, the dot product of weight vectors [w_i0, . . . , w_iI] corresponding to the i-th secondary operation unit and the input neuron vectors. Results output from the secondary operation units are assembled into a complete output vector through the interconnection module and returned to the primary operation unit. The activation operation is performed in the primary operation unit to obtain final output neuron vectors [out0, out1, out2, . . . , outN].

Figure 43:
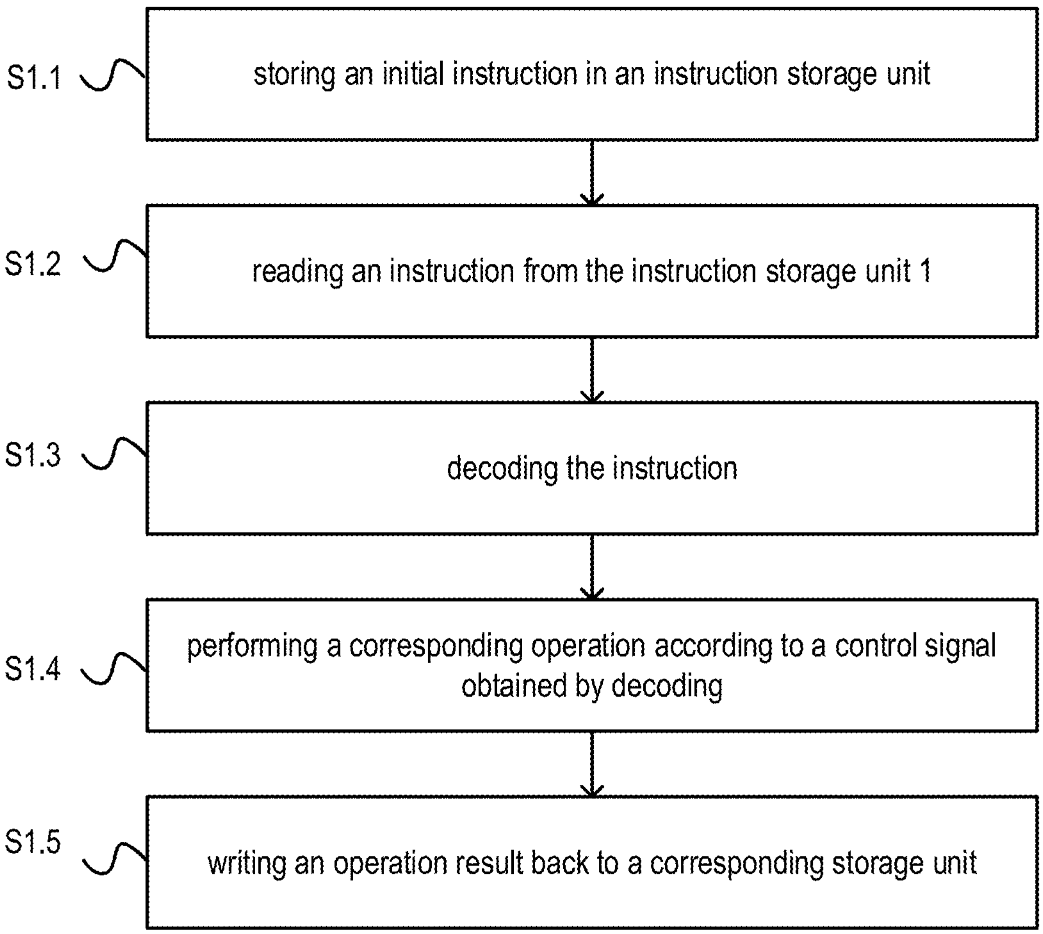
FIG. 43 shows a process of a forward operation of a neural network supporting a discrete data representation according to an example of the present disclosure.

FIG. 43 shows an implementation method of a forward operation of an artificial neural network supporting a single-layer discrete data representation according to an example of the present disclosure. This flowchart describes the process of realizing the forward operation of an artificial neural network represented by a single layer of discrete data shown in FIG. 5 by using the device and instruction set of the present disclosure. The computation method is implemented in the computation devices shown in FIG. 4A, FIG. 5, or FIG. 2A. The computation method includes:

step S1.1: storing an initial instruction in an instruction storage unit 1;

step S1.2: reading an instruction from the instruction storage unit 1;

step S1.3: decoding the instruction;

step S1.4: performing a corresponding operation according to a control signal obtained by decoding; and step S1.5: writing an operation result back to a corresponding storage unit.

In the step S1.1, an initialization IO instruction may be stored for moving subsequent instructions.

In the step S1.2, the readable instructions include but are not limited to a CONFIG instruction, a COMPUTE instruction, an IO instruction, a NOP instruction, a JUMP instruction and a MOVE instruction.

In the step S1.3, a control signal of a corresponding module is obtained by decoding according to the operation type of the instructions (CONFIG, COMPUTE, IO, NOP, JUMP, MOVE, etc.). For the CONFIG instruction, the configuration information for configuring other modules is obtained by decoding. For the COMPUTE instruction, the control signal of the primary-secondary operation module is obtained by decoding to control the corresponding operations taken by different discrete data. For the IO instruction, the control signal of the data access module is obtained by decoding. For the NOP instruction, no actual control signal is generated, and the NOP instruction is only used to clear the control signals in the caching queue of all control signals in the current device to ensure that all instructions before the NOP instruction are executed. For the JUMP instruction, the control signal of the jump instruction flow is obtained. For the MOVE instruction, a control signal for transferring data inside the device is obtained.

In the step S1.4, the above-mentioned modules 2-6 perform corresponding operations according to the control signals. The following takes the execution of the COMPUTE instruction of the neural network supporting the discrete data representation as an example. The interconnection module transfers the input neuron vectors [in0, . . . , inN] to all secondary operation modules, and the input neuron vectors [in0, . . . , inN] are temporarily stored in the neuron caching unit. For an $i^{th}$ secondary operation module, the dot product of weight vectors [w_i0, . . . , w_iN] corresponding to the $i^{th}$ secondary operation module and the input neuron vectors. Results output from the secondary operation modules are assembled into a complete output vector through the interconnection module and returned to the primary operation module. The activation operation is performed in the primary operation module to obtain final output neuron vectors [out0, out1, out2, . . . , outN].

In the step S1.5, each module writes the operation result back to the corresponding caching unit. The following takes the execution of the forward operation of the neural network represented by discrete data as an instance. The output neuron vectors obtained by the primary operation module is written back to the storage unit.

Figure 44:
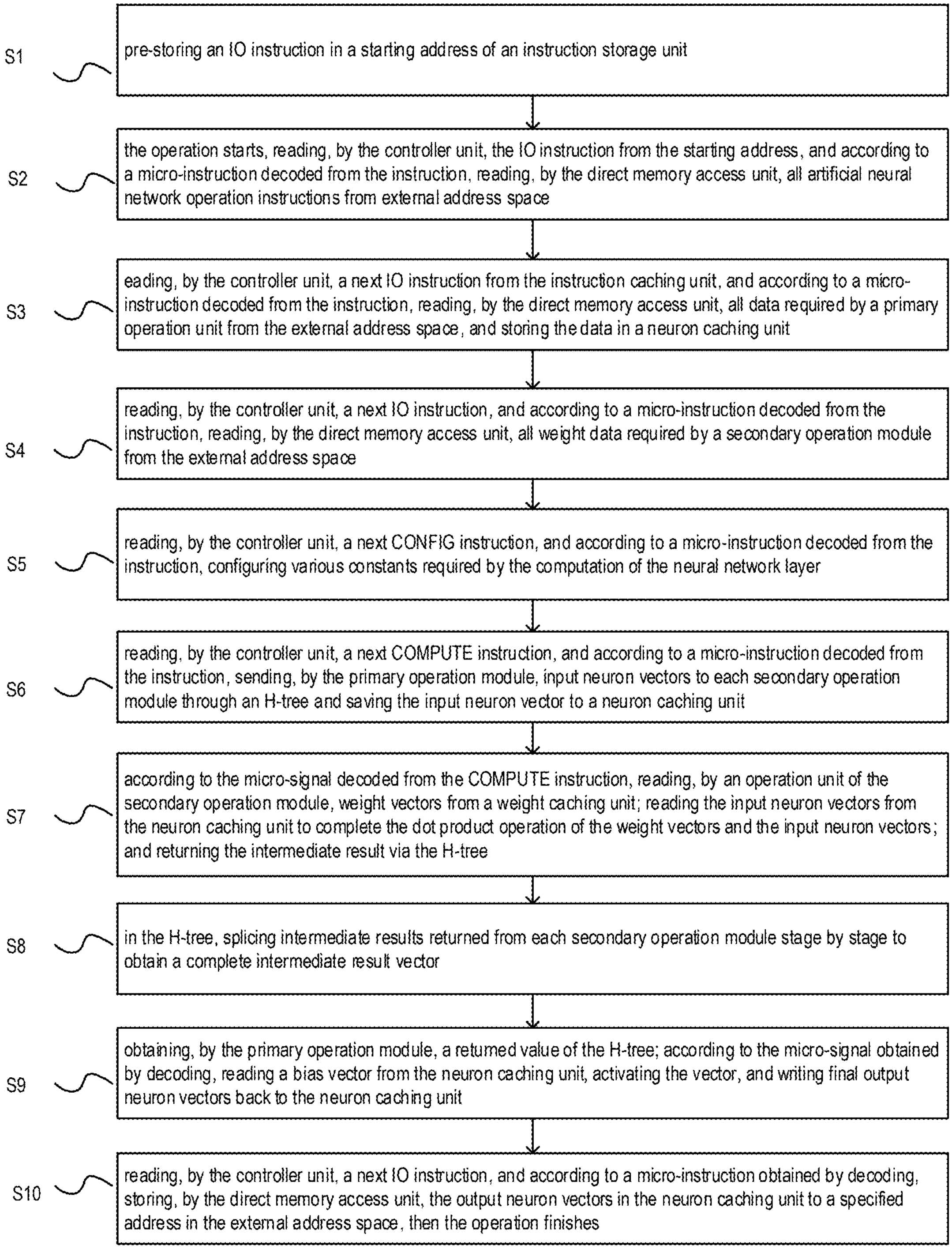
FIG. 44 is a flowchart of a single-layer artificial neural network according to an example of the present disclosure.

FIG. 44 shows another more detailed implementation method of a forward operation of a single-layer artificial neural network according to an example. This flowchart describes the process of implementing the forward operation of the single-layer neural network shown in FIG. 4 by using the device and instruction set of the present disclosure. The process includes the following steps:

step S1: pre-storing an IO instruction in a starting address of an instruction caching unit 1;

step S2: the operation starts, reading, by the controller unit 2, the IO instruction from the starting address of the instruction caching unit 1, and according to a micro-instruction decoded from the instruction, reading, by the data access unit 3, all corresponding artificial neural network operation instructions from external address space, and caching the instructions in the instruction caching unit 1;

step S3: reading, by the controller unit 2, a next IO instruction from the instruction caching unit, and according to a micro-instruction decoded from the instruction, reading, by the data access unit 3, all data (for instance, input neuron vectors, interpolation tables, constant tables, biases, etc.) required by a primary operation unit 5 from the external address space, and storing the data in a neuron caching unit 53 of the primary operation unit 5, where the supporting discrete data representations may include fully discrete data or partially discrete data;

step S4: reading, by the controller unit 2, a next IO instruction from the instruction caching unit, and according to a micro-instruction decoded from the instruction, reading, by the data access unit 3, weight matrix data required by a secondary operation module 6 from the external address space, where the supporting discrete data representations may include fully discrete data or partially discrete data; and step S5: reading, by the controller unit 2, a next CONFIG instruction from the instruction caching unit, and according to a micro-instruction decoded from the instruction, configuring various constants required by the computation of the neural network layer. For instance, the operation units 51 and 61 configure a value of a register in the unit, according to parameters in the microinstruction. The parameters, for instance, include computation precision setting, data of an activation function (for instance, computation precision bit of the layer, rang parameters of the algorithm of the Lrn layer, reciprocal of the window size of the algorithm of the AveragePooling layer, and the like).

The process further includes the following steps:

step S6: reading, by the controller unit 2, a next COMPUTE instruction from the instruction caching unit, and according to a micro-instruction decoded from the instruction, sending, by the primary operation module 5, input neuron vectors to each secondary operation module 6 through an interconnection module 4 and saving the input neuron vector to a neuron caching unit 63 of the secondary operation module 6; and step S7: according to the micro-signal decoded from the COMPUTE instruction, reading, by an operation unit 61 of the secondary operation module 6, weight vectors (column vectors corresponding to the secondary operation module 6 in the weight matrix) from a weight caching unit 64; reading the input neuron vectors from the neuron caching unit to complete the dot product operation of the weight vectors and the input neuron vectors; and returning, by the operation unit 61 of the secondary operation module 6, the intermediate result via the interconnecting module. For the discrete data, the bitwise operations, such as the exclusive-OR operation, may be customizably used to replace the dot product operation or not. For instance, in the case of a 1-bit discrete data representation, 0 represents +1 and 1 represents −1. The multiplication operation on the weight is achieved by means of the exclusive-OR operation performed on the sign bit of the data multiplied by the weight.

The process further includes the following steps:

step S8: in the interconnection module 4, splicing intermediate results returned from each secondary operation module 6 stage by stage to obtain a complete intermediate result vector;

step S9: obtaining, by the primary operation module 5, a returned value of the interconnection module 4; according to the micro-signal decoded from the COMPUTE instruction, reading a bias vector from the neuron caching unit 53, adding with the returned vector of the interconnection module 4, and activating the addition result, where the device supports users to define whether to represent the results after activation in discrete; and writing final output neuron vectors back to the neuron caching unit 53; and step S10: reading, by the controller unit, a next IO instruction from the instruction caching unit, and according to a micro-instruction decoded from the instruction, storing, by the data access unit 3, the output neuron vectors in the neuron caching unit 53 to a specified address in the external address space, then the operation finishes.

The operation steps of the artificial neural network batch normalization are similar to the above process. According to the provided instruction set, a controller completes the following process. The controller controls the data access unit to read in the input data, and then controls the primary-secondary operation module to find a mean and variance of each position according to the batch size or use the set mean variance. The controller then controls the input data at the corresponding position minus the mean and divide by the variance. Finally, the controller controls to multiply the processed data with a learning parameter and add another learning parameter.

For a multi-layer artificial neural network, the implementation process is similar to that of the single-layer neural network. When a previous layer of the artificial neural network is executed, the next layer of operation instructions may take the output neuron address of the previous layer stored in the primary operation unit as the input neuron address of the current layer. Correspondingly, the weight address and bias address in the instruction will be changed to the corresponding address of the current layer.

In the present disclosure, by adopting the device and instruction set for performing the artificial neural network forward operation, the problems of insufficient operation performance of the CPU and GPU and large front-end decoding overhead are solved, and the support for the forward operation of the multi-layer artificial neural network is effectively improved.

In the present disclosure, by using a dedicated on-chip cache for the forward operation of the multi-layer artificial neural network, the reusability of input neurons and weight data is fully tapped, repeated reading of these data to memory is avoided, the memory access bandwidth is reduced, and the problem that memory bandwidth becomes the bottleneck of the performance of the forward operation of the multi-layer artificial neural network.

Compared with the method of floating-point data representation and the method of fixed-point data representation, the present disclosure adopts the method of discrete data representation, which can greatly reduce the overhead of storage energy consumption of the devices, optimize the structural layout in a limited area, and improve the operation speed or performance and energy consumption ratio and other indicators.

It should be noted that the continuous/discrete data conversion module provided in the present disclosure can realize mutual conversion between continuous data and discrete data, and is applied to the above-mentioned method examples. In this way, the computation amount of the deep neural network is greatly reduced without losing the recognition accuracy, thereby improving the operation speed and reducing the power consumption.

Figure 47A:
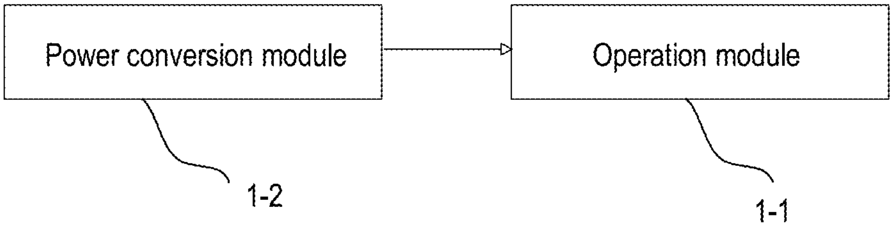
FIG. 47A is a structural diagram of a neural network operation device according to an example of the present disclosure.

An operation device as shown in FIG. 47A according to an example of the present disclosure includes: an operation module 1-1 configured to perform a neural network operation; and a power conversion module 1-2 connected to the operation module and configured to convert input neuron data and/or output neuron data of the neural network operations into power neuron data.

Figure 47B:
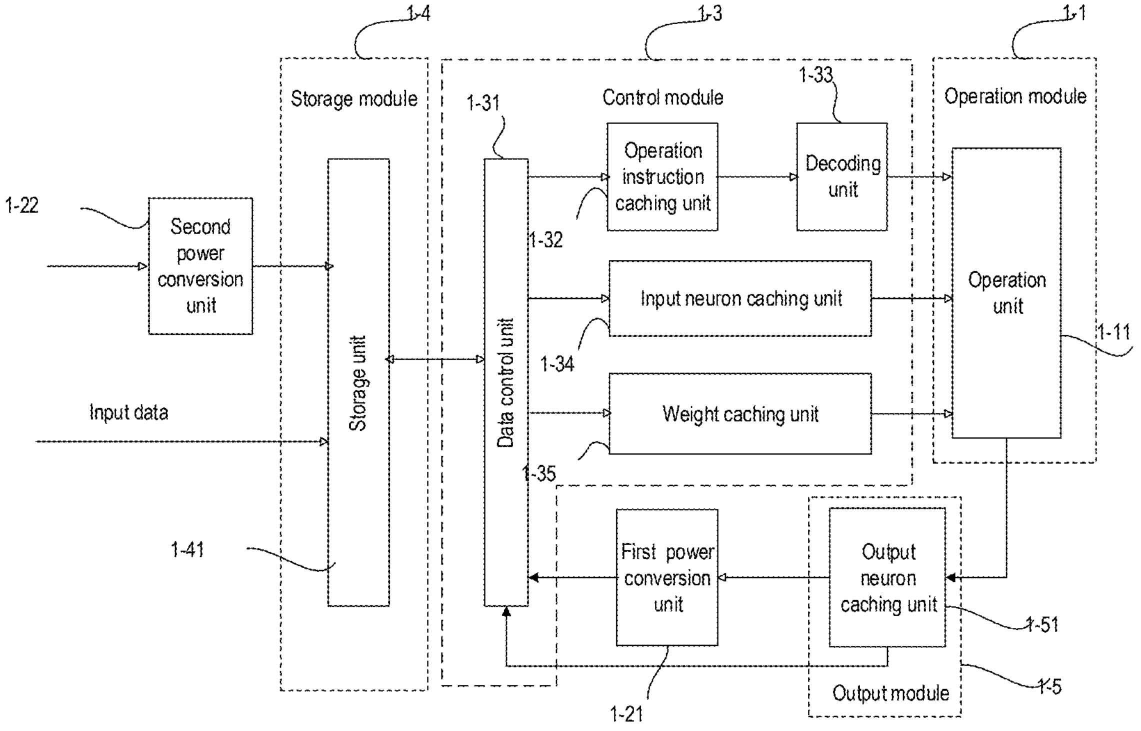
FIG. 47B is a structural diagram of a neural network operation device according to another example of the present disclosure.

An operation device as shown in FIG. 47B according to another example of the present disclosure includes:

a storage module 1-4 configured to store data and operation instructions;

a control module 1-3 connected to the storage module and configured to control the interaction of data and operation instructions, specifically, the control module 1-3 is configured to receive data and operation instructions sent by the storage module, and decode the operation instructions into operation micro-instructions;

an operation module 1-1 connected to the control module and configured to receive data and operation micro-instructions sent by the control module, and perform neural network operations on weight data and neuron data received by the operation module according to the operation micro-instructions; and a power conversion module 1-2 connected to the operation module and configured to convert input neuron data and/or output neuron data of the neural network operations into power neuron data.

Those skilled in the art may understand that the storage module may be integrated inside the operation device, or may be provided as an off-chip memory outside the operation device.

Specifically, as shown in FIG. 47B, the storage module includes a storage unit 1-41 configured to store data and operation instructions.

The control module includes:

an operation instruction caching unit 1-32 connected to a data control unit and configured to receive an operation instruction sent by the data control unit;

a decoding unit 1-33 connected to the operation instruction caching unit and configured to read the operation instruction from the operation instruction caching unit and decode the operation instruction into an operation micro-instruction;

an input neuron caching unit 1-34 connected to the data control unit and configured to receive neuron data sent from the data control unit;

a weight caching unit 1-35 connected to the data control unit and configured to receive weight data sent from the data control unit; and a data control unit 1-31 connected to the storage module and configured to realize the interaction of data and operation instructions between the storage module and the operation instruction caching unit, the weight caching unit, and the input neuron caching unit, respectively.

The operation module includes an operation unit 1-11 connected to the decoding unit, the input neuron caching unit, and the weight caching unit, respectively, and the operation unit 1-11 is configured to receive each operation microinstruction, neuron data and weight data, and to perform corresponding operations on the received neuron data and weight data according to each operation microinstruction.

In an optional example, the operation unit includes, but is not limited to: one or more multipliers in a first part, one or more adders in a second part (more specifically, the adders in the second part can also form an adder tree), an activation function unit in a third part, and/or a vector processing unit in a fourth part. Specifically, the vector processing unit can perform a vector operation and/or a pooling operation. The first part may multiply input data (in1) and input data (in2) to obtain output data (out), where the process is: out=in1*in2. The second part may add the in1 through the adder to obtain the output data (out), specifically, when the second part is an adder tree, the input data in1 is added stage by stage through the adder tree to obtain the output data (out), where in1 is a vector of length N, N is greater than 1, the process is: out=in1[1]+in1[2]+ . . . +in1[N], and/or the input data (in1) is accumulated by the adder tree and then the accumulation result is added with the input data (in2) to obtain the output data (out), where the process is: out=in1[1]+in1[2]+ . . . +in1[N]+in2, or the input data (in1) is added with the input data (in2) to obtain the output data (out), where the process is: out=in1+in2. The third part may perform the activation function on the input data (in) to obtain activation output data (out), where the process is out=active(in), and the activation function may include sigmoid, tan h, relu, softmax, and the like; in addition to the activation operation, the third part may further implement other non-linear functions, for instance, the third part may perform an operation (f) on input data (in) to obtain the output data (out), where the process is: out=f(in). The vector processing unit performs the pooling operation on the input data (in) to obtain the output data (out) after the pooling operation, and the process is out=pool(in), where pool is the pooling operation, and the pooling operation includes, but is not limited to: average value pooling, maximum pooling, median pooling. The input data in is data in a pooling kernel related to the output out.

The operations performed by the operation unit include: the first part: multiplying the input data (in1) and the input data (in2) to obtain a result; and/or the second part: performing an addition operation (specifically, an adder tree operation, for adding the input data (in1) stage by stage through the adder tree), and/or adding the input data (in1) with the input data (in2) to obtain the output data (out); and/or the third part: performing the activation function operation, that is, the activation function is performed on the input data (in) to obtain the output data (out); and/or the fourth part: performing the pooling operation out=pool(in), where pool is the pooling operation, and the pooling operation includes, but is not limited to: average value pooling, maximum pooling, and median pooling. The input data in is data in a pooling kernel related to the output out. The one or more operations of the above-mentioned four parts can be freely selected to make combinations in different orders, so as to realize the operations of various functions. The computation units correspondingly constitute a two-level, three-level, or four-level pipeline architecture.

In another optional example, the operation units may include a primary processing circuit and a plurality of secondary processing circuits.

The primary processing circuit is configured to distribute a piece of input data into a plurality of data blocks, and send at least one data block among the plurality of data blocks and at least one operation instruction among the plurality of operation instructions to the secondary processing circuits.

The plurality of secondary processing circuits are configured to perform an operation on the received data blocks according to the operation instructions to obtain an intermediate result, and transmit the operation result to the primary processing circuit.

The primary processing circuit is configured to process a plurality of intermediate results sent from the secondary processing circuits to obtain the results of the operation instructions, and send the results of the operation instructions to the data control unit.

Figure 47C:
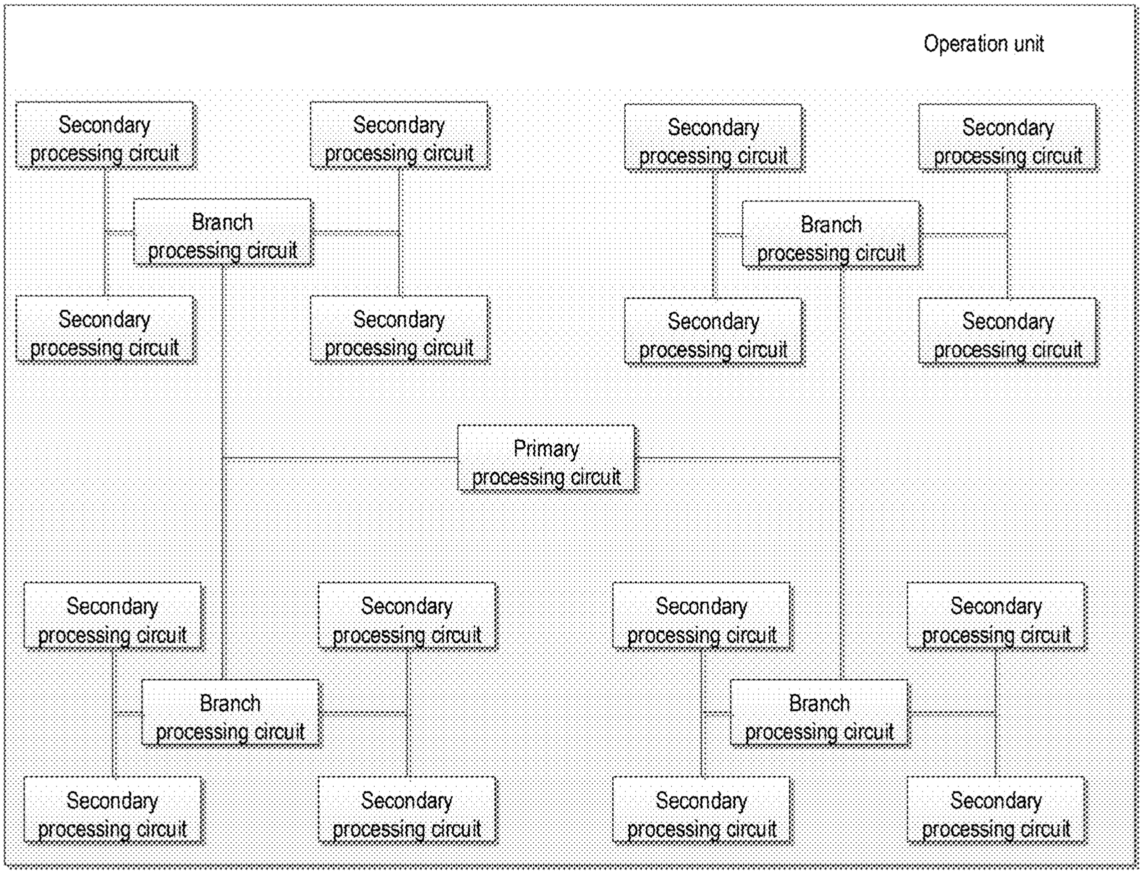
FIG. 47C is a schematic diagram showing a function of an operation unit according to an example of the present disclosure.

In an optional example, as shown in FIG. 47C, the operation units include branch processing circuits, where the primary processing circuit is connected to the branch processing circuits, and the branch processing circuits are connected to the plurality of secondary processing circuits; and The branch processing circuits are configured to forward data or instructions between the primary processing circuit and the secondary processing circuits.

Figure 47D:
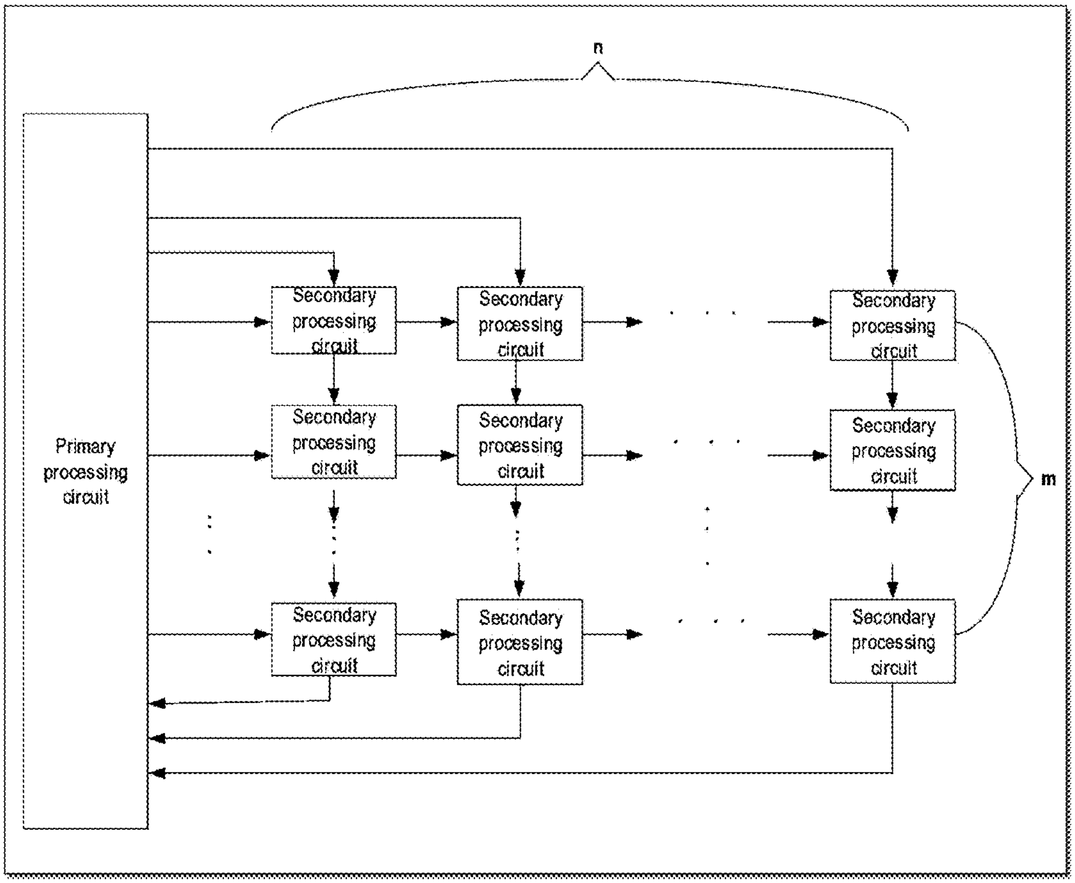
FIG. 47D is a schematic diagram showing another function of an operation unit according to an example of the present disclosure.

In another optional example, as shown in FIG. 47D, the operation units include a primary processing circuit and a plurality of secondary processing circuits. Optionally, the plurality of secondary processing circuits are arranged in the form of an array. Each secondary processing circuit is connected to another adjacent secondary processing circuit, and the primary processing circuit is connected to k secondary processing circuits of the plurality of secondary processing circuits, where the k secondary processing circuits are: n secondary processing circuits in a first row, n secondary processing circuits in an m-th row, and m secondary processing circuits in a first column.

The k secondary processing circuits are configured to forward data and instructions among the primary processing circuit and the plurality of secondary processing circuits.

Figure 47E:
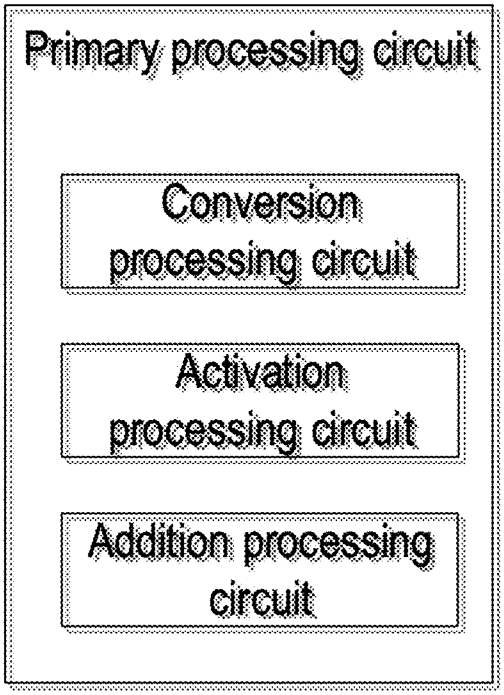
FIG. 47E is a schematic diagram showing a function of a primary processing circuit according to an example of the present disclosure.

Optionally, as shown in FIG. 47E, the primary processing circuit further includes: one or more of a conversion processing circuit, an activation processing circuit, and an addition processing circuit.

The conversion processing circuit is configured to perform interconversion between a first data structure and a second data structure (for instance, interconversion between continuous data and discrete data) on a data block or an intermediate result received by the primary processing circuit, or the conversion processing circuit is configured to perform interconversion between a first data type and a second data type (for instance, interconversion between a fixed-point type and a floating-point type) on a data block or an intermediate result received by the primary processing circuit.

The activation processing circuit is configured to perform an activation operation on data in the primary processing circuit.

The addition processing circuit is configured to perform an addition operation or accumulation operation.

The secondary processing circuit includes:

a multiplication processing circuit configured to perform a product operation on the received data block to obtain a product result;

a forwarding processing circuit (optional) configured to forward the received data block or the product result; and an accumulation processing circuit configured to accumulate the product results to obtain the intermediate results.

In another optional example, the operation instruction may be a computation instruction such as a matrix-multiply-matrix instruction, an accumulation instruction, an activation instruction, and the like.

The output module 1-5 includes: an output neuron caching unit 1-51, which is connected to the operation unit, and is configured to receive neuron data output by the operation unit.

The power conversion module includes:

a first power conversion unit 1-21 connected to the output neuron caching unit and configured to convert neuron data output by the output neuron caching unit into power neuron data; and a second power conversion unit 1-22 connected to the storage module and configured to convert neuron data input to the storage module into power neuron data.

The power neuron data among the input data of the neural network is directly stored in the storage module.

If the neural network operation device utilizes an I/O module to realize data input/output, the first power conversion unit and the second power conversion unit may also be provided between the I/O module and the operation module to convert input neuron data and/or output neuron data of the neural network operation to power neuron data.

Figure 47F:
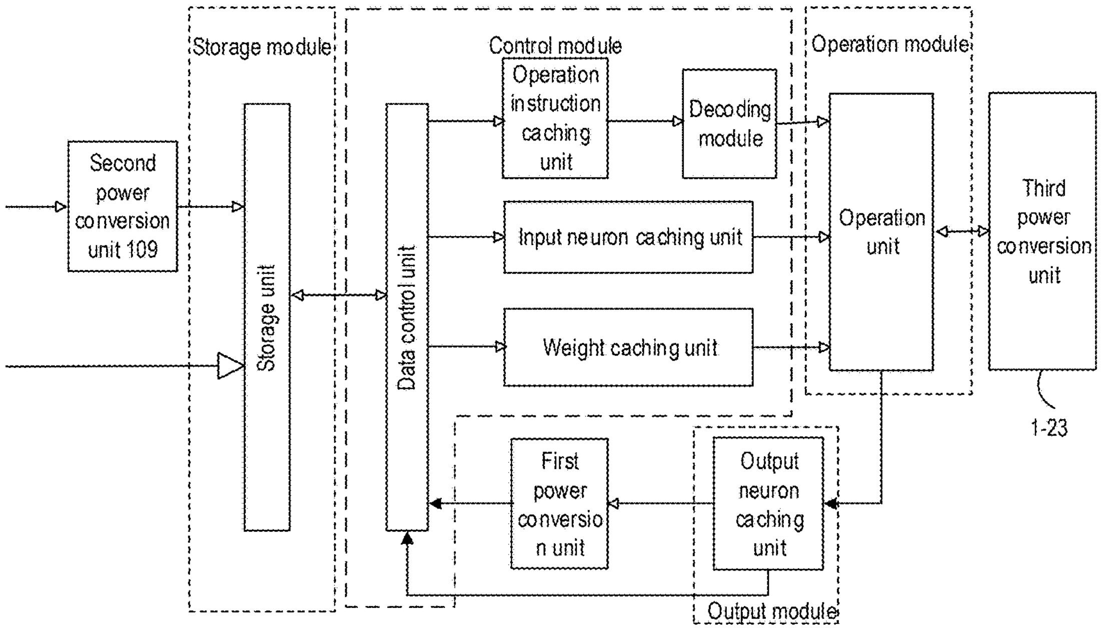
FIG. 47F is another structural diagram of a neural network operation device according to an example of the present disclosure.
Figure 47G:
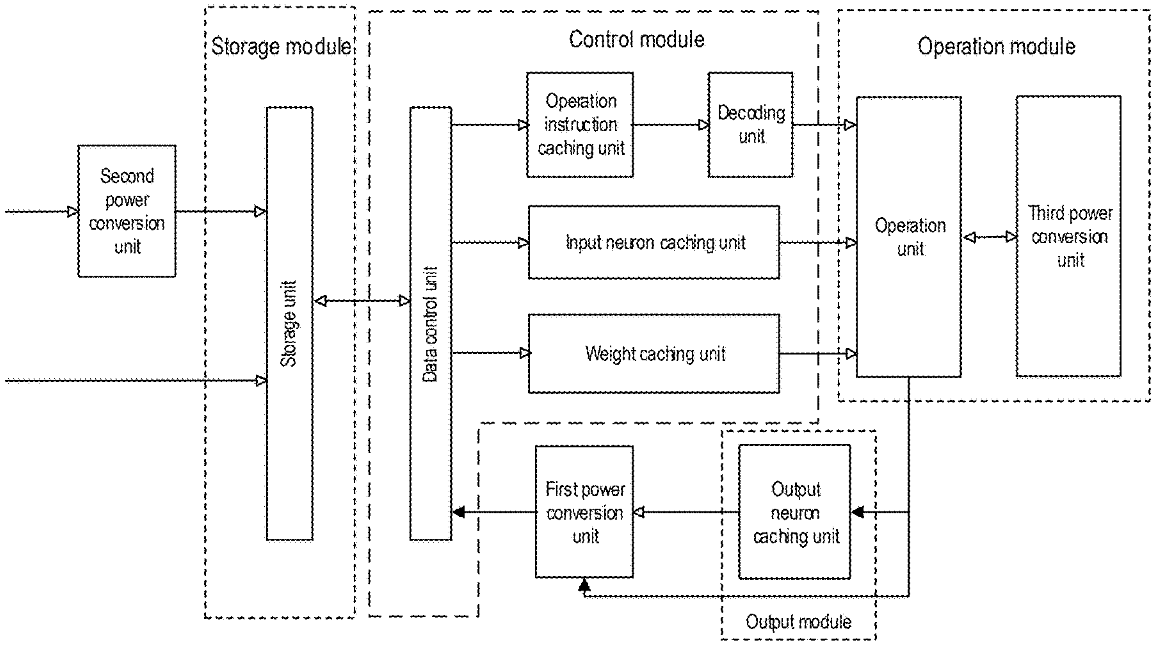
FIG. 47G is another structural diagram of a neural network operation device according to an example of the present disclosure.

Optionally, the operation device further includes a third power conversion unit 1-23 configured to convert power neuron data into non-power neuron data. The non-power neuron data is converted into power neuron data by the second power conversion unit, and then input into the operation unit to perform an operation. During the operation, in order to improve accuracy, a third power conversion unit can be optionally set to convert power neuron data to non-power neuron data. The third power conversion unit may be provided outside the operation module (as shown in FIG. 47F) or inside the operation module (as shown in FIG. 47G). The non-power neuron data output after the operation can be converted into power neuron data through the first power conversion unit, and then fed back to the data control unit to participate in subsequent operations, so as to speed up the operation speed, thereby forming a closed loop.

The data output by the operation module may also be directly sent to the output neuron caching unit, and the output neuron caching unit sends the output data to the data control unit without going through the power conversion unit.

The storage module can receive data and operation instructions from an external address space, and the data includes neural network weight data, neural network input data, and the like.

In addition, there are many options for power conversion operations. Three power conversion operations used in this example are listed below.

A first power conversion method:

$$s_{out}=s_{in}$$

$$d_{out+}=\lfloor \log_2(d_{in+}) \rfloor$$

where $d_{in}$ denotes input data of the power conversion unit, $d_{out}$ denotes output data of the power conversion unit, $s_{in}$ denotes a sign of the input data, $s_{out}$ denotes a sign of the output data, $d_{in+}$ denotes a positive part of the input data $d_{in+}=d_{in}\times s_{in}$, $d_{out+}$ denotes a positive part of the output data, $d_{out+}=d_{out}\times s_{out}$, and $\lfloor x \rfloor$ denotes a rounding down operation on the data x.

A second power conversion method:

$$s_{out}=s_{in}$$

$$d_{out+}=\lceil \log_2(d_{in+}) \rceil$$

where $d_{in}$ denotes input data of the power conversion unit, $d_{out}$ denotes output data of the power conversion unit, $s_{in}$ denotes a sign of the input data, $s_{out}$ denotes a sign of the output data, $d_{in+}$ denotes a positive of the input data, $d_{in+}=d_{in}\times s_{in}$, $d_{out+}$ denotes a positive part of the output data $d_{out+}=d_{out}\times s_{out}$, $\lceil x \rceil$ denotes a rounding up operation on the data x.

A third power conversion method:

$$s_{out}=s_{in}$$

$$d_{out+}=[\log_2(d_{in+})]$$

where $d_{in}$ denotes input data of the power conversion unit, $d_{out}$ denotes output data of the power conversion unit, $s_{in}$ denotes a sign of the input data, $s_{out}$ denotes a sign of the output data, $d_{in+}$ denotes a positive part of the input data $d_{in+}=d_{in}s_{in}$, $d_{out+}$ denotes a positive part of the output data, $d_{out+}=d_{out}\times s_{out}$, and $[x]$ denotes a rounding to the nearest integer operation on the data x.

It should be noted that, in addition to rounding to the nearest integer, rounding up, and rounding down, the power conversion methods in the present disclosure may also include rounding to odd numbers, rounding to even numbers, rounding to zero, and random rounding. Among them, rounding to the nearest integer, rounding to zero, and random rounding are preferred to reduce accuracy loss.

An examples of the present disclosure further includes a neural network operation method including: performing a neural network operation; and prior to performing the neural network operation, converting input neuron data of the neural network operation to power neuron data; and/or after performing the neural network operation, converting output neuron data of the neural network operation to power neuron data.

Optionally, prior to performing the neural network operation, the step of converting the input neuron data of the neural network operation to power neuron data includes: converting non-power neuron data in the input data to power neuron data; and receiving and storing an operation instruction, the power neuron data, and weight data.

Optionally, between the step of receiving and storing the operation instruction, the power neuron data, and the weight data, and the step of performing the neural network operation, the method further includes: reading the operation instruction and decoding the operation instruction to operation micro-instructions.

Optionally, in the step of performing the neural network operation, the method includes performing the neural network operation on the weight data and the power neuron data according to the operation micro-instructions.

Optionally, after performing the neural network operation, the step of converting the output neuron data of the neural network operation to power neuron data includes: outputting neuron data obtained after the neural network operation; and converting non-power neuron data in the neuron data obtained after the neural network operation to power neuron data.

Optionally, the method includes: converting non-power neuron data in the neuron data obtained after the neural network operation to power neuron data and sending the power data to the data control unit, using the power data as input power neurons of a next layer of the neural network operation; repeating the step of performing the neural network operation and the step of converting non-power neuron data into power neuron data until a last layer of the neural network operation is completed.

Figures 47H, 47I, 47J, 47K, 47L:
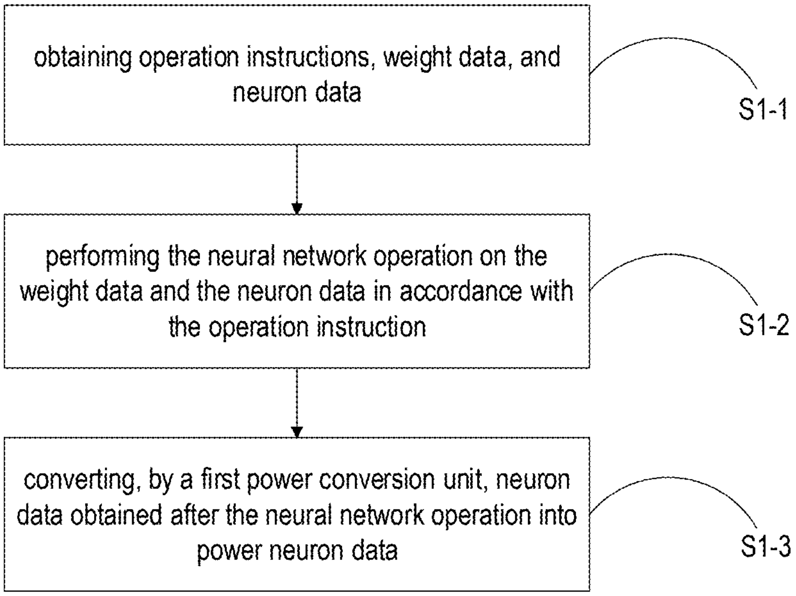
FIG. 47H is a flowchart of a neural network operation method according to an example of the present disclosure.
FIG. 47I is a schematic diagram of an encoding table according to an example of the present disclosure.
FIG. 47J is another schematic diagram of an encoding table according to an example of the present disclosure.
FIG. 47K is another schematic diagram of an encoding table according to an implementation of the present disclosure.
FIG. 47L is another schematic diagram of an encoding table according to an example of the present disclosure.

Specifically, the neural network in the examples of the present disclosure is a multi-layer neural network. In some examples, each layer of neural network can be operated according to the operation method shown in FIG. 47H. The input power neuron data in a first layer of neural network can be read from the external address through the storage module, if the data read from the external address is power data already, the data is directly transferred to the storage module, and if the data read from the external address is not power data, the data has to be converted to power neuron data first through the power conversion unit. Thereafter, the input power neuron data in each subsequent layer of the neural network can be provided by the output power neuron data of one or more layers of the neural network prior to this layer. A single-layer neural network operation method according to an example is shown in FIG. 47H, including:

step S1-1: obtaining operation instructions, weight data, and neuron data, where, the step S1-1 includes the following sub-steps:

S1-11: inputting the operation instructions, the neuron data, and the weight data to the storage module, where the power neuron data is directly input to the storage module, and the non-power neuron data is converted by the second power conversion unit, and then input to the storage module;

S1-12: receiving, by the data control unit, the operation instructions, the power neuron data, and the power weight data sent by the storage module; and

S1-13: receiving, by an operation instruction caching unit, an input neuron caching unit and a weight caching unit respectively, the operation instructions, the power neuron data and the power weight data sent by the data control unit and distributing them to the decoding unit or the operation unit.

The power neuron data indicates that values of the neuron data is represented by exponential values thereof. Specifically, the power neuron data includes sign bits and power bits; the sign bits represent the sign of the power neuron data with one or more bits, and the power bits represent power-bit data of the power neuron data with m bits, m being a positive integer greater than 1. The storage unit in the storage module is pre-stored with an encoding table that provides an exponential value corresponding to each power-bit data of the power neuron data. The encoding table provides one or more power-bit data (i.e. zero setting power-bit data) to make the assigned corresponding power neuron data 0. In other words, when the power-bit data of the power neuron data is zero setting power-bit data in the encoding table, the power neuron data is 0. The encoding table may have a flexible storage method, for instance, the encoding table may be stored in a table form, or may be mapped through a functional relationship.

The correspondence in the encoding table may be arbitrary.

For instance, the correspondence in the encoding table may be scrambled. A part of an encoding table with m being 5 is shown in FIG. 47I, when the power-bit data is 00000, the corresponding exponential value is 0; when the power-bit data is 00001, the corresponding exponential value is 3; when the power-bit data is 00010, the corresponding exponential value is 4; when the power-bit data is 00011, the corresponding exponential value is 1; and when the power-bit data is 00100, the corresponding power neuron data and the power weight data is 0.

The correspondence in the encoding table may also be a positive correlation. The storage module is pre-stored with an integer x and a positive integer y; the exponential value corresponding to the minimum power-bit data is x, and the power neuron data corresponding to any other one or more power-bit data is 0, where x denotes a bias value and y denotes a stride. In one example, the exponential value corresponding to the minimum power-bit data is x, while the power neuron data corresponding to the maximum power-bit data is 0, and the exponential values corresponding to other power-bit data than the minimum and maximum power-bit data are (power-bit data+x)*y. By presetting different x and y as well as by changing the values of x and y, the range of representation by the power becomes configurable and is suitable for different application contexts requiring varied numerical ranges. Therefore, the neural network operation device can be applied in a wider range and its application is more flexible and adjustable according to user requirements.

In one example, y is 1, x equals $-2^{m-1}$, so the exponential range of the value represented by power neuron data is $-2^{m-1}$ to $2^{m-1}-1$.

In one example, a part of an encoding table with m being 5, x being 0 and y being 1 is shown in FIG. 47J, when the power-bit data is 00000, the corresponding exponential value is 0; when the power-bit data is 00001, the corresponding exponential value is 1; when the power-bit data is 00010, the corresponding exponential value is 2; when the power-bit data is 00011, the corresponding exponential value is 3; and when the power-bit data is 11111, the corresponding power neuron data is 0. As another part of an encoding table as shown in FIG. 47K, with m being 5, x being 0 and y being 2, when the power-bit data is 00000, the corresponding exponential value is 0; when the power-bit data is 00001, the corresponding exponential value is 2; when the power-bit data is 00010, the corresponding exponential value is 4; when the power-bit data is 00011, the corresponding exponential value is 6; when the power-bit data is 11111, the corresponding power neuron data is 0.

The correspondence in the encoding table may be a negative correlation. The storage module is pre-stored with an integer x and a positive integer y; the exponential value corresponding to the maximum power-bit data is x, and the power neuron data corresponding to any other one or more power-bit data is 0, where x denotes a bias value and y denotes a stride. In one example, the exponential value corresponding to the maximum power-bit data is x, while the power neuron data corresponding to the minimum power-bit data is 0, and the exponential values corresponding to the other power-bit data than the minimum and maximum power-bit data are (power-bit data−x)*y. By presetting different x and y as well as by changing the values of x and y, a range of representation by the power becomes configurable and is suitable for different application contexts requiring varied numerical ranges. Therefore, the neural network operation device can be applied in a wider range and its application is more flexible and adjustable according to user requirements.

In one example, y is 1, x equals to $2^{m-1}$, so the exponential range of the value represented by power neuron data is $-2^{m-1}-1$ to $2^{m-1}$.

As part of an encoding table as shown in FIG. 47L with m being 5, when the power-bit data is 11111, the corresponding exponential value is 0; when the power-bit data is 11110, the corresponding exponential value is 1; when the power-bit data is 11101, the corresponding exponential value is 2; when the power-bit data is 11100, the corresponding exponential value is 3; when the power-bit data is 00000, the corresponding power neuron data is 0.

The correspondence in the encoding table may be that the most significant bit of the power-bit data represents a zero setting bit, and the other m−1 bits of the power-bit data correspond to exponential values. When the most significant bit of the power-bit data is 0, the corresponding power neuron data is 0; when the most significant bit of the power-bit data is 1, the corresponding power neuron data is not 0. Vice versa, i.e. when the most significant bit of the power-bit data is 1, the corresponding power neuron data is 0; when the most significant bit of the power bit data is 0, the corresponding power neuron data is not 0. In other words, one bit is separated from the power bits of the power neuron data to indicate whether the power neuron data is 0 or not.

Figure 47M:
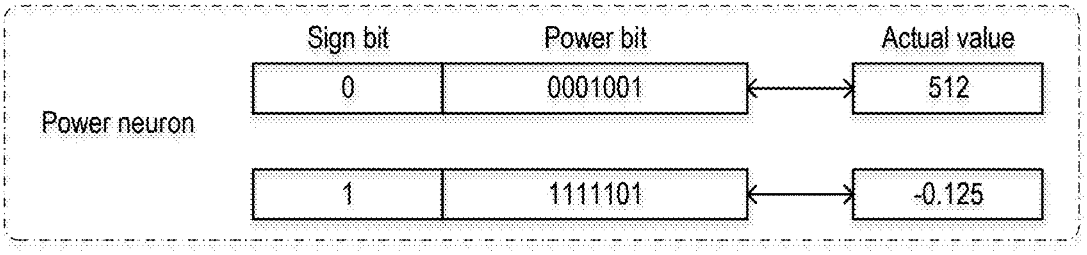
FIG. 47M is a schematic diagram of a method of representing power data according to an example of the present disclosure.

In one specific instance as shown in FIG. 47M, the sign bit has 1 bit, and the power-bit data has 7 bits, i.e., m is 7. In the encoding table, when the power-bit data is 11111111, the corresponding power neuron data is 0, and when the power-bit data is of other values, the power neuron data correspond to a respective binary complement. When the sign bits of power neuron data are 0 and the power bits are 0001001, it represents a specific value of $2^9$, i.e. 512; when the sign bits of power neuron data is 1 and its power bits are 1111101, it represents a specific value of $-2^{-3}$, i.e. −0.125. Compared with floating-point data, the power data only retains the power bits of the data, which significantly reduces the storage space required for data storage.

The power data representation can reduce the storage space required for storing neuron data. In instances of the examples, the power data has 8 bits. It should be recognized that the data length is not constant, but on different occasions, different data lengths are adopted according to the range of the neuron data.

A single-layer neural network operation method according to an example is shown in FIG. 47H, further including:

step S1-2: performing the neural network operation on the weight data and the neuron data in accordance with the operation micro-instructions, where the step S1-2 includes the following sub-steps:

S1-21: reading, by the decoding unit, operation instructions from the operation instruction caching unit, and decoding the instructions into respective operation micro-instructions; and S1-22: receiving, by the operation unit, the operation micro-instructions, the power neuron data and the weight data sent by the decoding unit, the input neuron caching unit and the weight caching unit respectively, and performing the neural network operation on the weight data and the power neuron data according to the operation micro-instructions.

The multiplication of a power neuron and a weight is specifically as follows: the sign bit of the power neuron data and the sign bit of the weight data are subjected to an Exclusive OR operation; in the case where the correspondence in the encoding table is scrambled, searching the encoding table to find out exponential values corresponding to the power bits of the power neuron data; in the case where the correspondence in the encoding table is a positive correlation, the minimum exponential value in the encoding table is recorded and an addition is performed to find out exponential values corresponding to the power bits of the power neuron data a; in the case where the correspondence in the encoding table is a negative correlation, the maximum value in the encoding table is recorded and a subtraction is performed to find out exponential values corresponding to the power bits of the power neuron data; the exponential value and the power bits of the power neuron data are added, where the significant bits of the weight data remain unchanged.

Figure 47N:
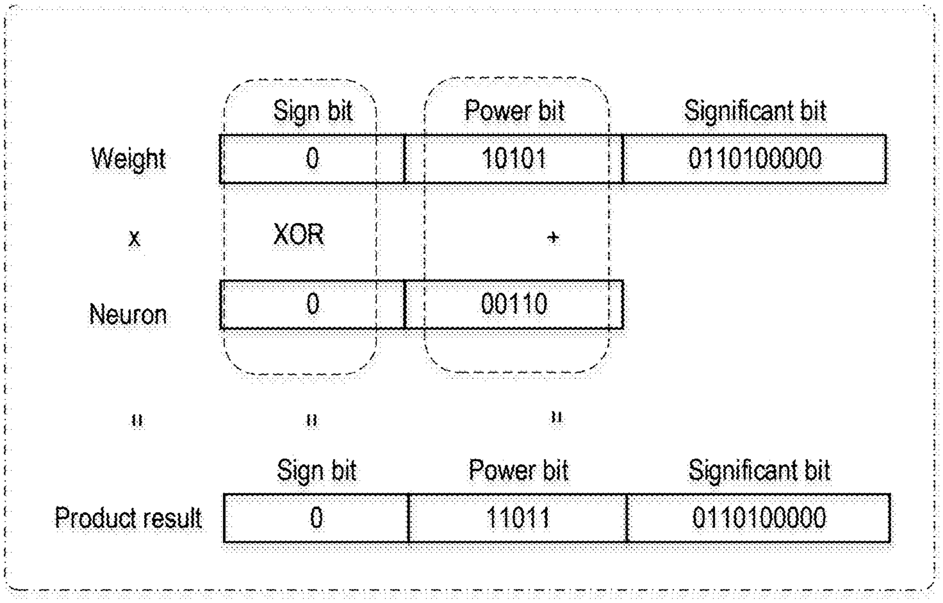
FIG. 47N is a schematic diagram of a multiplication operation of a weight and a power neuron according to an example of the present disclosure.

A specific example one is shown in FIG. 47N. In the example, if the weight data is 16-bit floating-point data, the sign bit is 0, the power bit is 10101, and the significant bit is 0110100000, then the actual value represented by the weight data is $1.40625*2^6$. The sign bit of the power neuron data is 1-bit, and the data bit of the power data is 5-bit, which can be viewed as m=5. In the encoding table, when the power data is 11111, the corresponding power neuron data is 0; and when the power data is not 11111, the power data corresponds to a two's complement. When the power neuron is 000110, the actual value represented by the power neuron is 64, which is $2^6$. When a sum of the power bit of the weight and the power bit of the power neuron is 11011, the actual value of the sum is $1.40625*2^{12}$, which is a product of the neuron and the weight. Through the operation, a multiplication operation becomes an addition operation, which reduces the amount of operation required for computation.

Figure 47O:
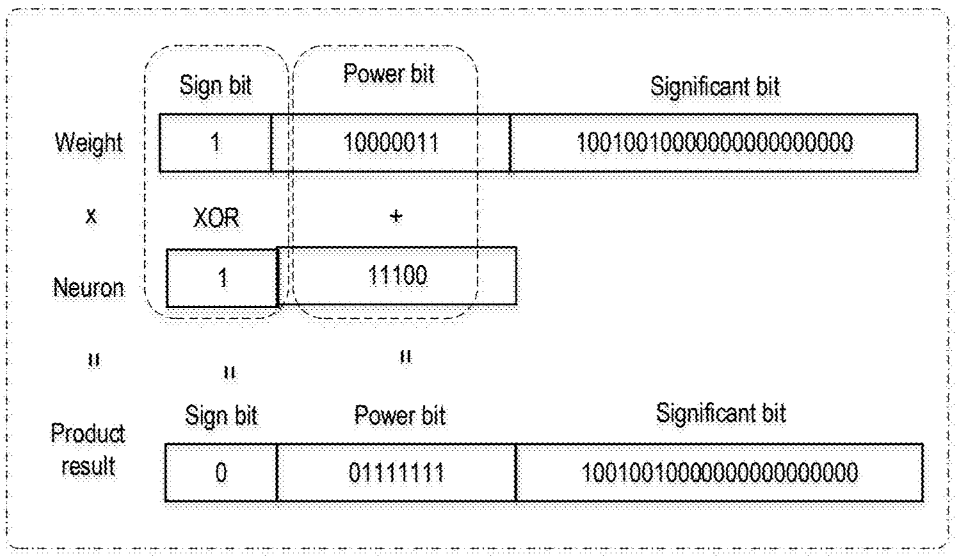
FIG. 47O is a schematic diagram of a multiplication operation of a weight and a power neuron according to an example of the present disclosure.

A specific example two is shown in FIG. 47O. In the example, if the weight data is 32-bit floating-point data, the sign bit is 1, the power bit is 10000011, and the significant bit is 10010010000000000000000, then the actual value represented by the weight data is $-1.5703125*2^4$. The sign bit of the power neuron data is 1-bit, and the data bit of the power data is 5-bit, which can be viewed as m=5. In the encoding table, when the power data is 11111, the corresponding power neuron data is 0; and when the power data is not 11111, the power data corresponds to a two's complement. When the power neuron is 111100, the actual value represented by the power neuron is $-2^{-4}$. When a sum of the power of the weight and the power of the power neuron is 01111111, the actual value of the sum is $1.5703125*2^0$, which is a product of the neuron and the weight.

A step S1-3 includes: converting, by a first power conversion unit, neuron data obtained after the neural network operation into power neuron data.

The step S1-3 includes the following sub-steps:

a step S1-31, receiving, by an output neuron caching unit, the neuron data which is obtained after the neural network operation and transferred by the computation unit; and a step S1-32, receiving, by the first power conversion unit, the neuron data transferred by the output neuron caching unit; and converting, by the first power conversion unit, non-power neuron data in the neuron data into power neuron data.

There are various power conversion operations to be selected according to actual application requirements. Three power conversion operations are listed in this example.

The first power conversion method includes:

$$s_{out}=s_{in}$$

$$d_{out+}=\lfloor \log_2(d_{in+}) \rfloor$$

In this method, $d_{in}$ is input data of the power conversion unit, $d_{out}$ is output data of the power conversion unit, $s_{in}$ a sign of the input data, $s_{out}$ is a sign of the output data, $d_{in+}$ is a is a positive part of the input data where $d_{in+}=d_{in}\times s_{in}$, $d_{out+}$ is a positive part of the output data where $d_{out+}=d_{out}\times s_{out}$, $\lfloor x \rfloor$ and represents performing a flooring operation on the data x.

A second power conversion method includes:

$$s_{out}=s_{in}$$

$$d_{out+}=\lceil \log_2(d_{in+}) \rceil$$

In this method, $d_{in}$ is input data of the power conversion unit, $d_{out}$ output data of the power conversion unit, $s_{in}$ is a sign of the input data, $s_{out}$ is a sign of the output data, $d_{in+}$ is a positive part of the input data where $d_{in+}=d_{in}\times s_{in}$, $d_{out+}$ is a positive part of the output data where $d_{out+}=d_{out}\times s_{out}$, and $\lceil x \rceil$ represents performing a ceiling operation on the data x.

The third power conversion method:

$$s_{out}=s_{in}$$

$$d_{out+}=[\log_2(d_{in+})]$$

In this method, $d_{in}$ is input data of the power conversion unit, $d_{out}$ is output data of the power conversion unit, $s_{in}$ is a sign of the input data, $s_{out}$ is a sign of the output data, $d_{in+}$ is a positive part of the input data where $d_{in+}=d_{in}\times s_{in}$, $d_{out+}$ is a positive part of the output data where $d_{out+}=d_{out}\times s_{out}$, and [x] represents performing a rounding operation on the data x.

In addition, the power neuron data obtained by the power conversion unit can be used as an input power neuron for the operation of a next layer of the neural network, and then the steps 1 to 3 are repeated until the operation of a last layer of the neural network ends. By changing the integer value x and the positive integer value y that are pre-stored in the storage module, a range of the power neuron data that can be represented by the neural network operation device may be adjusted.

In another example, the present disclosure also provides a method for using the neural network operation device. The method includes: changing an integer value x and a positive integer value y that are pre-stored in the storage module to adjust a range of power neuron data that can be represented by the neural network operation device.

In some other examples of the present disclosure, a difference from the foregoing examples is that the power conversion module of the operation device is connected to the operation module and is configured to convert input data and/or output data of a neural network operation into power data.

Specifically, the input data includes input neuron data and input weight data. The output data includes output neuron data and output weight data. The power data includes power neuron data and power weight data.

In other words, on the basis of the foregoing examples, the power conversion module may perform power conversion on both the neuron data and the weight data. In addition, after the weight data in the operation result is converted into the power weight data, the power weight data can be directly transferred to a data control unit for subsequent operations. Other modules, unit compositions, functional uses, and connection relationships of the operation device are similar to those of the previous examples.

Figure 48A:
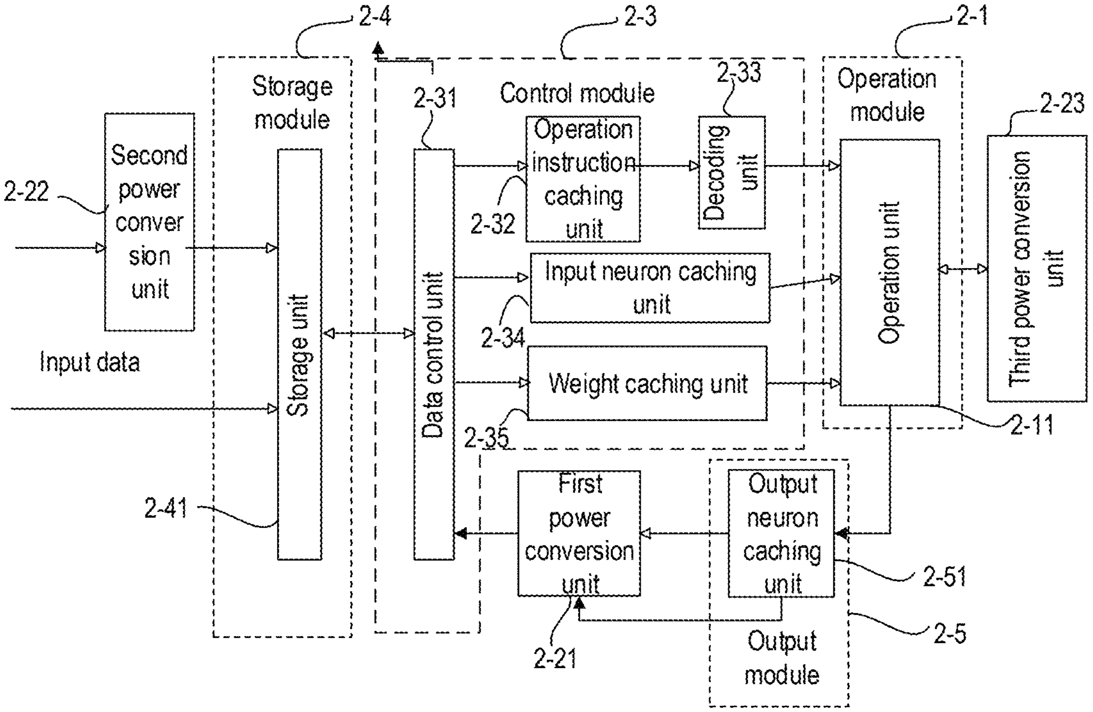
FIG. 48A is a structural diagram of a neural network operation device according to an example of the present disclosure.

As shown in FIG. 48A, the neural network operation device of this example includes a storage module 2-4, a control module 2-3, an operation module 2-1, an output module 2-5, and a power conversion module 2-2.

The storage module includes a storage unit 2-41 configured to store data and instructions.

The control module includes:

a data control unit 2-31 connected to the storage unit and used for data and instruction interaction between the storage unit and each caching unit;

an operation instruction caching unit 2-32 connected to the data control unit and configured to receive an instruction sent by the data control unit;

a decoding unit 2-33 connected to the instruction caching unit and configured to read instructions from the instruction caching unit and decode the instructions into respective operation instructions;

an input neuron caching unit 2-34 connected to the data control unit and configured to receive neuron data transferred by the data control unit; and a weight caching unit 2-35 connected to the data control unit and configured to receive weight data transferred from the data control unit.

The operation module includes an operation unit 2-11 connected to the control module. The operation unit 2-11 is configured to receive the data and the operation instructions sent by the control module, and perform a neural network operation on received neuron data and weight data according to the operation instructions.

The output module includes: an output neuron caching unit 2-51 connected to the operation unit. The output neuron caching unit 2-51 is configured to receive neuron data output by the operation unit and transfer the neuron data to the data control unit. The neuron data can be used as input data for the operation of the next layer of the neural network.

The power conversion module may include:

a first power conversion unit 2-21 connected to the output neuron caching unit and the operation unit, and configured to convert the neuron data output by the output neuron caching unit into power neuron data and convert the weight data output by the operation unit into power weight data; and/or a second power conversion unit 2-22 connected to the storage module and configured to convert the neuron data and the weight data input to the storage module into power neuron data and power weight data respectively.

Optionally, the operation device further includes: a third power conversion unit 2-23 connected to the operation unit and configured to convert the power neuron data and the power weight data into non-power neuron data and non-power weight data respectively.

It should be noted that though in this example, the power conversion module includes all of the first power conversion unit, the second power conversion unit, and the third power conversion unit, it is only used as an instance for description here. In fact, the power conversion module may include any one of the first power conversion unit, the second power conversion unit, and the third power conversion unit, which is similar as the foregoing examples shown in FIGS. 47B, 47F, and 47G.

The non-power neuron data and the non-power weight data are converted into the power neuron data and the power weight data through the second power conversion unit, and are then input to the operation unit for operation. During the operation, in order to improve precision, the power neuron data and the power weight data can be converted into the non-power neuron data and the non-power weight data by setting the third power conversion unit. The third power conversion unit may be set outside or inside the operation module. The non-power neuron data output after the operation can be converted into the power neuron data through the first power conversion unit, and then be fed back to the data control unit for subsequent operations to accelerate the operation speed. In this case, a closed cycle can be formed.

In addition, a specific operation method for power conversion of the weight data is the same as that of the foregoing examples, so the details will not be further described herein.

Figure 48B:
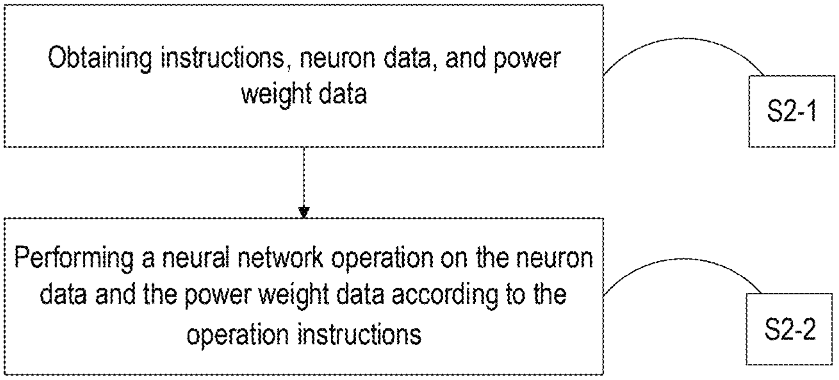
FIG. 48B is a flowchart of a neural network operation method according to an example of the present disclosure.

In some examples, the neural network is a multi-layer neural network. For each layer of the neural network, operations can be performed according to the operation method shown in FIG. 48B. In the method, input power weight data of a first layer of the neural network can be read from an external address through the storage unit. If the weight data read from the external address is power weight data, the weight data is directly transferred to the storage unit; otherwise the weight data needs to be first converted into the power weight data through the power conversion unit. Referring to FIG. 48B, a method for operating a single-layer neural network of this example includes:

a step S2-1, obtaining instructions, neuron data, and power weight data.

The step S2-1 includes the following sub-steps:

a step S2-11, inputting the instructions, the neuron data, and the weight data into the storage unit, where this step specifically includes: directly inputting the power weight data into the storage unit, or converting, by the power conversion unit, the non-power weight data into power weight data and then inputting into the storage unit;

a step S2-12, receiving, by the data control unit, the instructions, the neuron data, and the power weight data sent by the storage unit; and a step S2-13, receiving, by the instruction caching unit, the input neuron caching unit, and the weight caching unit respectively, the instructions, the neuron data, and the power weight data sent by the data control unit; and distributing the same to the decoding unit or the operation unit.

The power weight data indicates that the value of the weight data is represented in the form of a power exponent value. Specifically, the power weight data includes a sign bit and a power bit. The sign bit represents the sign of weight data with one or more bits, and the power bit represents the power data of the weight data with m bits, where m is a positive integer greater than 1. An encoding table is prestored in the storage unit, and provides an exponent value corresponding to each piece of power data of the power weight data. The encoding table sets one or more pieces of power data (zero-setting power data), and corresponding power weight data of the specified power data is 0. In other words, when the power data of the power weight data is the zero-setting power data in the encoding table, it represents that the power weight data is 0. The corresponding relationship in the encoding table is similar to that of the foregoing examples, so details will not be further described herein.

Figure 48C:
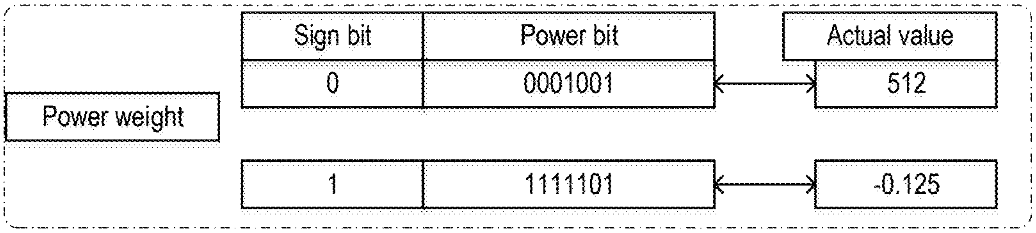
FIG. 48C is a diagram of a method of representing power data according to an example of the present disclosure.

In a specific example shown in FIG. 48C, the sign bit is 1, and the data bit of power data is 7-bit, which can be viewed as m=7. In the encoding table, when the power data is 11111111, the corresponding power weight data is 0; and when the power data is not 11111111, the power weight data corresponds to a two's complement. When the sign bit of the power weight data is 0 and the power bit is 0001001, a specific value represented by the power weight data is $2^9$, which is 512; and when the sign bit of the power weight data is 1 and the power bit is 1111101, a specific value represented by the power weight data is $-2^{-3}$, which is −0.125. Compared with floating-point data, the power data retains only the power bit of the data, which may greatly reduce the storage space required to store data.

By using the power data representation method, the storage space required to store weight data may be reduced. In the instance provided by this example, the power data is 8-bit data. It should be noted that the data length is not fixed. In different situations, different data lengths are adopted according to the data range of the data weight.

A step S2-2 includes: performing a neural network operation on the neuron data and the power weight data according to the operation instructions. The step S2 includes the following sub-steps:

a step S2-21, reading, by the decoding unit, an instruction from the instruction caching unit, and decoding the instruction into respective operation instructions; and a step S2-22, receiving, by the operation unit, the operation instructions, the power weight data, and the neuron data sent by the decoding unit, the input neuron caching unit, and the weight caching unit respectively; and performing the neural network operation on the neuron data and the power weight data according to the operation instructions.

The multiplication operation of the neuron and the power weight specifically includes: performing an exclusive OR operation on the sign bit of the neuron data and the sign bit of the power weight data; if the corresponding relationship in the encoding table is out of order, looking up the encoding table to find the exponent value corresponding to the power bit of the power weight data; if the corresponding relationship in the encoding table is a positive correlation, recording a minimum exponent value in the encoding table and performing an addition operation to find the exponent value corresponding to the power bit of the power weight data; if the corresponding relationship in the encoding table is a negative correlation, recording a maximum exponent value in the encoding table and performing a subtraction operation to find the exponent value corresponding to the power bit of the power weight data; and performing the addition operation on the exponent value and the power bit of the neuron data, where the significant bit of the neuron data remains unchanged.

Figure 48D:
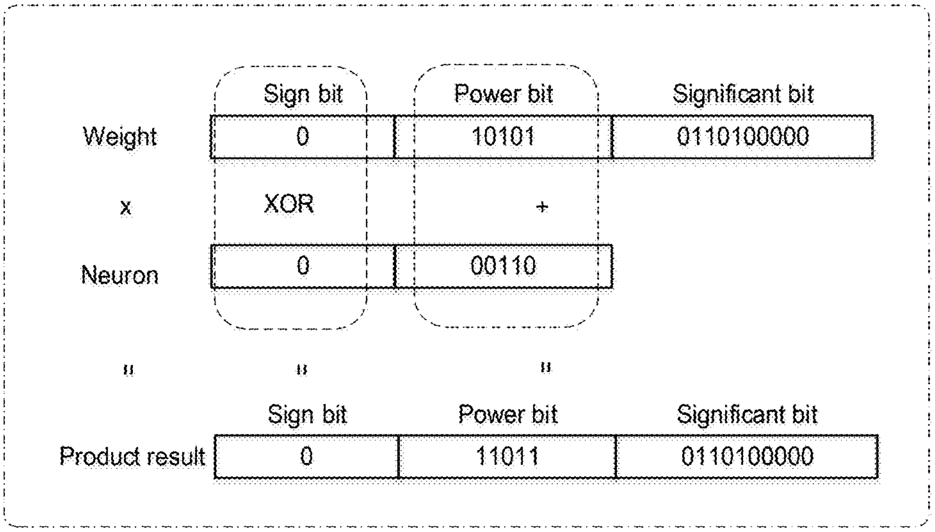
FIG. 48D is a schematic diagram of a multiplication operation of a neuron and a power weight according to an example of the present disclosure.

A specific example one is shown in FIG. 48D. In the example, if the neuron data is 16-bit floating-point data, the sign bit is 0, the power bit is 10101, and the significant bit is 0110100000, then the actual value represented by the neuron data is $1.40625*2^6$. The sign bit of the power weight data is 1-bit, and the data bit of the power data is 5-bit, which can be viewed as m=5. In the encoding table, when the power data is 11111, the corresponding power weight data is 0; and when the power data is not 11111, the power data corresponds to a two's complement. When the power weight is 000110, the actual value represented by the power weight is 64, which is $2^6$. When a sum of the power bit of the power weight and the power bit of the neuron is 11011, the actual value of the sum is $1.40625*2^{12}$, which is a product of the neuron and the power weight. Through the operation, a multiplication operation becomes an addition operation, which may reduce the amount of operation required for computation.

Figure 48E:
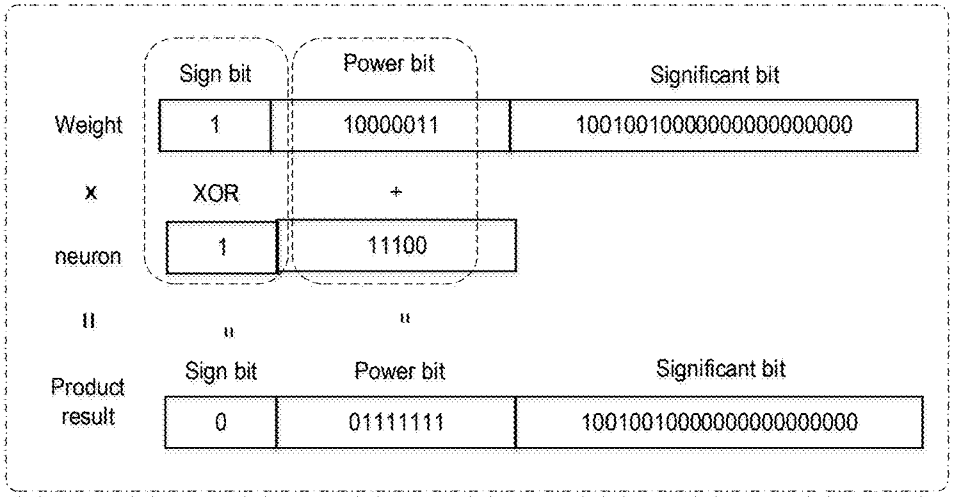
FIG. 48E is a schematic diagram of a multiplication operation of a neuron and a power weight according to an example of the present disclosure.

A specific example two is shown in FIG. 48E. In the example, if the weight data is 32-bit floating-point data, the sign bit is 1, the power bit is 10000011, and the significant bit is 10010010000000000000000, then the actual value represented by the weight data is $-1.5703125*2^4$. The sign bit of the power weight data is 1-bit, the data bit of the power data is 5-bit, which can be viewed as m=5. In the encoding table, when the power data is 11111, the corresponding power neuron data is 0; and when the power data is not 11111, the power data corresponds to a two's complement. When the power neuron is 111100, the actual value represented by the power neuron is $-2^{-4}$. When a sum of the power bit of the neuron and the power bit of the power weight is 01111111, the actual value of the sum is $1.5703125*2^0$, which is a product of the neuron and the power weight.

Optionally, the method further includes a step S2-3: outputting neuron data obtained after the neural network operation and using the neuron data as input data for the operation of the next layer of the neural network.

The step S2-3 includes the following sub-steps:

a step S2-31, receiving, by the output neuron caching unit, the neuron data which is obtained after the neural network operation and transferred by the computation unit; and a step S2-32, transferring the neuron data received by the output neuron caching unit to the data control unit, where the neuron data obtained by the output neuron caching unit can be used as input neuron for the operation of the next layer of the neural network; and then repeating the steps S2-1 to S2-3 until the operation of the last layer of the neural network ends.

In addition, the power neuron data obtained by the power conversion unit can be used as the input power neuron for the operation of the next layer of the neural network, and the steps S2-1 to S2-3 are repeated until the operation of the last layer of the neural network ends. By changing the integer value x and the positive integer value y pre-stored in the storage unit, a range of the power neuron data that can be represented by the neural network operation device may be adjusted.

Figure 48F:
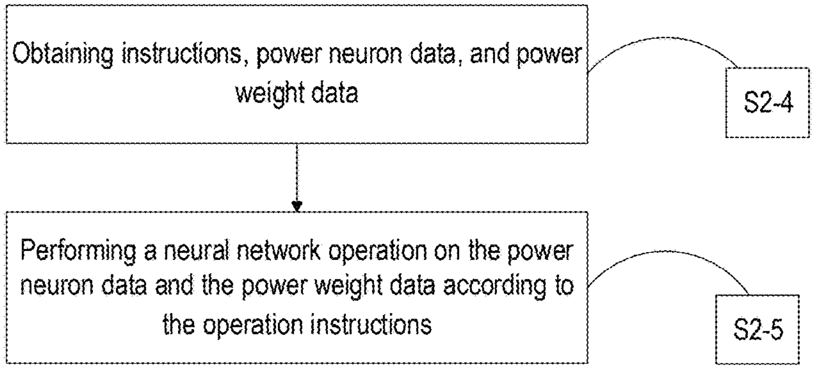
FIG. 48F is a flowchart of a neural network operation method according to an example of the present disclosure.

In some examples, the neural network is a multi-layer neural network. For each layer of the neural network, operations can be performed according to an operation method shown in FIG. 48F. In the method, input power weight data of the first layer of the neural network can be read from an external address through the storage unit. If the weight data read from the external address is power weight data, the weight data is directly transferred to the storage unit; otherwise the weight data needs to be first converted into power weight data through the power conversion unit. Input power neuron data of the first layer of the neural network can be read from an external address through the storage unit. If the neuron data read from the external address is power neuron data, the neuron data is directly transferred to the storage unit; otherwise the neuron data needs to be first converted into power neuron data through the power conversion unit, and then input neuron data of each layer of the neural network can be provided by the output power neuron data of the previous one or more layers of the neural network. Referring to FIG. 48F, the method for operating a single-layer neural network of this example includes:

a step S2-4, obtaining instructions, power neuron data, and power weight data.

The step S2-4 includes the following sub-steps:

a step S2-41, inputting the instructions, the neuron data, and the weight data into the storage unit, where the step specifically includes: directly inputting the power neuron data and the power weight data into the storage unit, or converting, by the first power conversion unit, non-power neuron data and non-power weight data into power neuron data and neuron power data and then inputting the same into the storage unit;

a step S2-42, receiving, by the data control unit, the instructions, the power neuron data, and the power weight data sent by the storage unit; and a step S2-43, receiving, by the instruction caching unit, the input neuron caching unit, and the weight caching unit respectively, the instructions, the power neuron data, and the power weight data sent by the data control unit; and distributing the same to the decoding unit or the operation unit.

The power neuron data and the power weight data indicate that values of the neuron data and the weight data are represented in the form of power exponent values. Specifically, both the power neuron data and the power weight data include a sign bit and a power bit. The sign bit represents the sign of the neuron data and the weight data with one or more bits, and the power bit represents the power data of the neuron data and the weight data with m bits, where m is a positive integer greater than 1. An encoding table is prestored in the storage unit, and provides an exponent value corresponding to each piece of power data of the power neuron data and the power weight data. The encoding table sets one or more pieces of power data (zero-setting power data), and the corresponding power weight data of the specified neuron data and the specified power data is 0. In other words, when the power data of the power neuron data and the power weight data is the zero-setting power data in the encoding table, it represents that the power neuron data and the power weight data are 0.

Figure 48G:
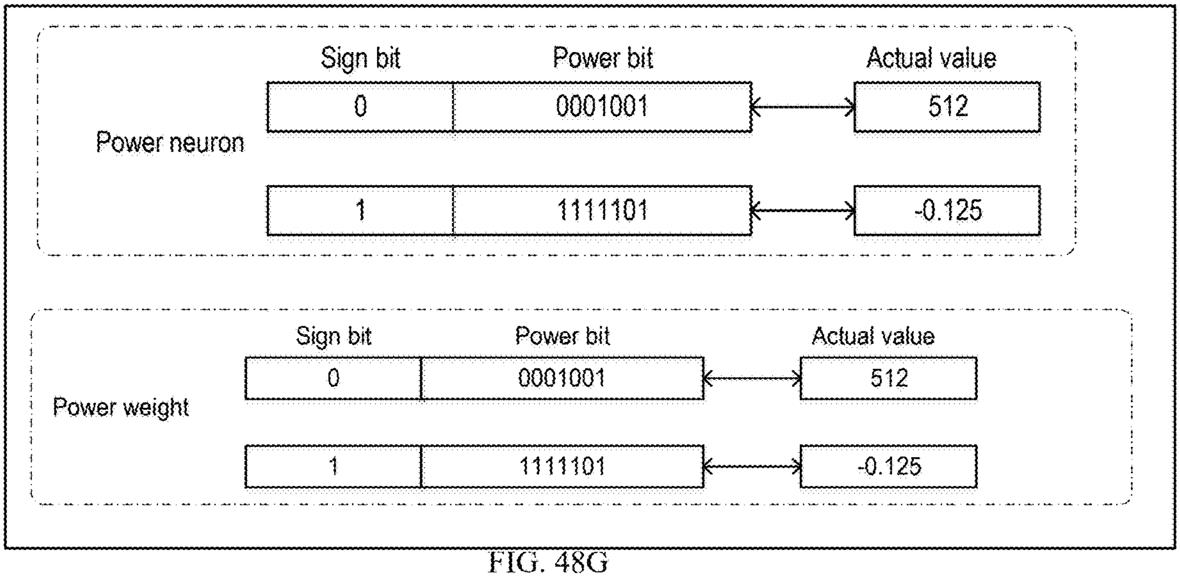
FIG. 48G is a schematic diagram of a method of representing power data according to an example of the present disclosure.

In a specific example, as shown in FIG. 48G, the sign bit is 1-bit, and the data bit of the power data is 7-bit, which can be viewed as m=7. In the encoding table, when the power data is 11111111, the corresponding power neuron data and power weight data are 0. When the power data is not 11111111, the power neuron data and the power weight data correspond to respective two's complements. When the sign bit of the power neuron data and the power weight data are 0 and the power bit is 0001001, a specific value represented by the power neuron data and the power weight data is $2^9$, which is 512; and when the sign bit of the power neuron data and the power weight data is 1 and the power bit is 1111101, a specific value represented by the power neuron data and the power weight data is $-2^{-3}$, which is $-0.125$. Compared with floating-point data, the power data retains only the power bit of the data, which may greatly reduce the storage space required to store data.

By using the power data representation method, the storage space required to store weight data may be reduced. In the instance provided by this example, the power data is 8-bit data. It should be noted that the data length is not fixed. In different situations, different data lengths are adopted according to the data range of the data weight.

A step S2-5 includes: performing a neural network operation on the power neuron data and the power weight data according to the operation instructions. The step includes the following sub-steps:

a step S2-51, reading, by the decoding unit, an instruction from the instruction caching unit; and decoding, by the decoding unit, the instruction into respective operation instructions; and a step S2-52, receiving, by the operation unit, the operation instructions, the power neuron data, and the power weight data sent by the decoding unit, the input neuron caching unit, and the weight caching unit respectively; and performing, by the operation unit, the neural network operation on the power neuron data and the power weight data according to the operation instructions.

The multiplication operation of the power neuron and the power weight specifically includes: performing the exclusive OR operation on the sign bit of the power neuron data and the sign bit of the power weight data; if the corresponding relationship in the encoding table is out of order, looking up the encoding table to find the exponent values corresponding to the power bits of the power neuron data and the power weight data; if the corresponding relationship in the encoding table is a positive correlation, recording the minimum exponent value in the encoding table and performing an addition operation to find the exponent values corresponding to the power bits of the power neuron data and the power weight data; if the corresponding relationship in the encoding table is a negative correlation, recording the maximum exponent value in the encoding table and performing a subtraction operation to find the exponent values corresponding to the power bits of the power neuron data and the power weight data; and performing the addition operation on the exponent value corresponding to the power neuron data and the exponent value corresponding to the power weight data.

Figure 48H:
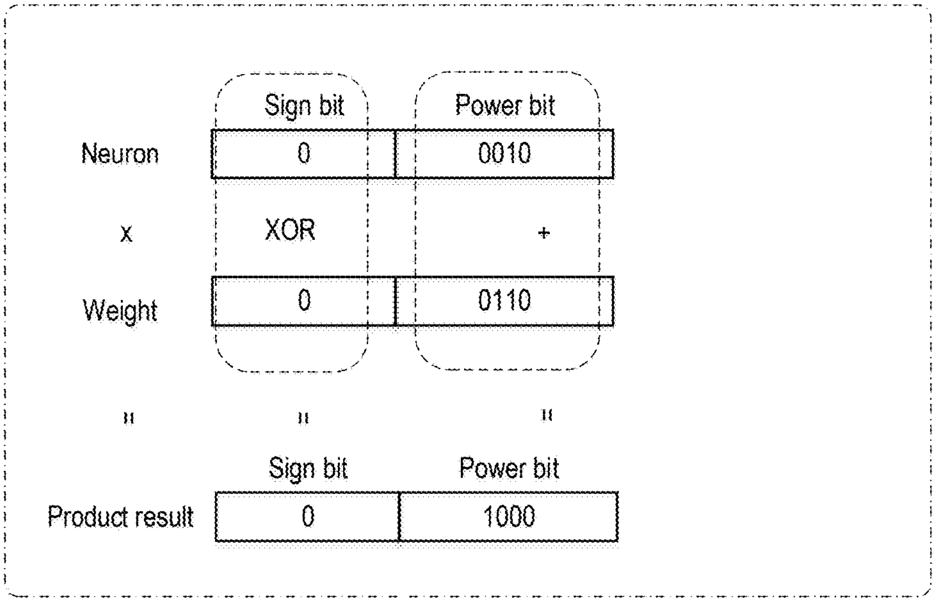
FIG. 48H is a schematic diagram of a multiplication operation of a power neuron and a power weight according to an example of the present disclosure.

A specific example one is shown in FIG. 48H. The sign bit of the power neuron data and the power weight data is 1-bit, and the data bit of the power data is 4-bit, which can be viewed as m=4. In the encoding table, when the power data is 1111, the corresponding power weight data is 0. When the power data is not 1111, the power data corresponds to a two's complement. When the power neuron data is 00010, the actual value represented by the power neuron data is $2^2$; when the power weight data is 00110, the actual value represented by the power weight data is 64, which is $2^6$; and when the product of the power neuron data and the power weight data is 01000, the actual value represented by the power neuron data and the power weight data is $2^8$.

It can be seen that the multiplication of the power neuron data and the power weights is more simple and convenient than the multiplication of floating-point data and the multiplication of the floating-point data and the power data.

The method of this example may further include a step S2-6, outputting neuron data obtained after the neural network operation and using the neuron data as input data for the operation of the next layer of the neural network.

The step S2-6 includes the following sub-steps:

a step S2-61, receiving, by the output neuron caching unit, the neuron data which is obtained after the neural network operation and transferred by the computation unit; and a step S2-62, transferring the neuron data received by the output neuron caching unit to the data control unit, where the neuron data obtained by the output neuron caching unit can be used as the input neuron for the operation of the next layer of the neural network; and then repeating the steps S4 to S6 until the operation of the last layer of the neural network ends.

Since the neuron data obtained after the neural network operation is also power data, bandwidths required to transfer the neuron data to the data control unit are greatly reduced compared with the bandwidths required for the floating-point data, which further reduces the overhead of storage resources and computing resources of the neural network, and thus increasing the operation speed of the neural network.

In addition, the specific operation method of the power conversion is the same as that of the foregoing examples, so details will not be further described herein.

All the units of the disclosed examples may be a hardware structure. The physical implementation of the hardware structure includes, but is not limited to, a physical device. The physical device includes, but is not limited to, a transistor, a memristor, and a DNA computer.

An example of the present disclosure provides an operation device, including:

an operation control module 3-2 configured to determine partitioning information; and an operation module 3-3 configured to perform partitioning, transposing, and merging operations on an operation matrix according to the partitioning information to obtain a transposed matrix of the operation matrix.

Specifically, the partitioning information may include at least one of partitioning size information, partitioning manner information, and partitioning and merging information. The partitioning size information indicates the size information of each partitioned matrix obtained after the operation matrix is partitioned into blocks. The partitioning manner information indicates a manner of partitioning the operation matrix. The partitioning and merging information indicates a manner of re-merging and obtaining the transposed matrix of the operation matrix after performing the transposing operation on each partitioned matrix.

Since the operation device of the present disclosure can partition the operation matrix into blocks, perform the transposing operation on a plurality of partitioned matrices to obtain transposed matrices of the plurality of partitioned matrices, and finally merge the transposed matrices of the plurality of partitioned matrices to obtain the transposed matrix of the operation matrix, the transpose operation of a matrix of any size within a complexity of constant time can be realized by using a single instruction. Compared with traditional implementations of the matrix transposing operation, the present disclosure may reduce the complexity of operation time and also make it simpler and more efficient to perform the matrix transposing operation.

Figure 49A:
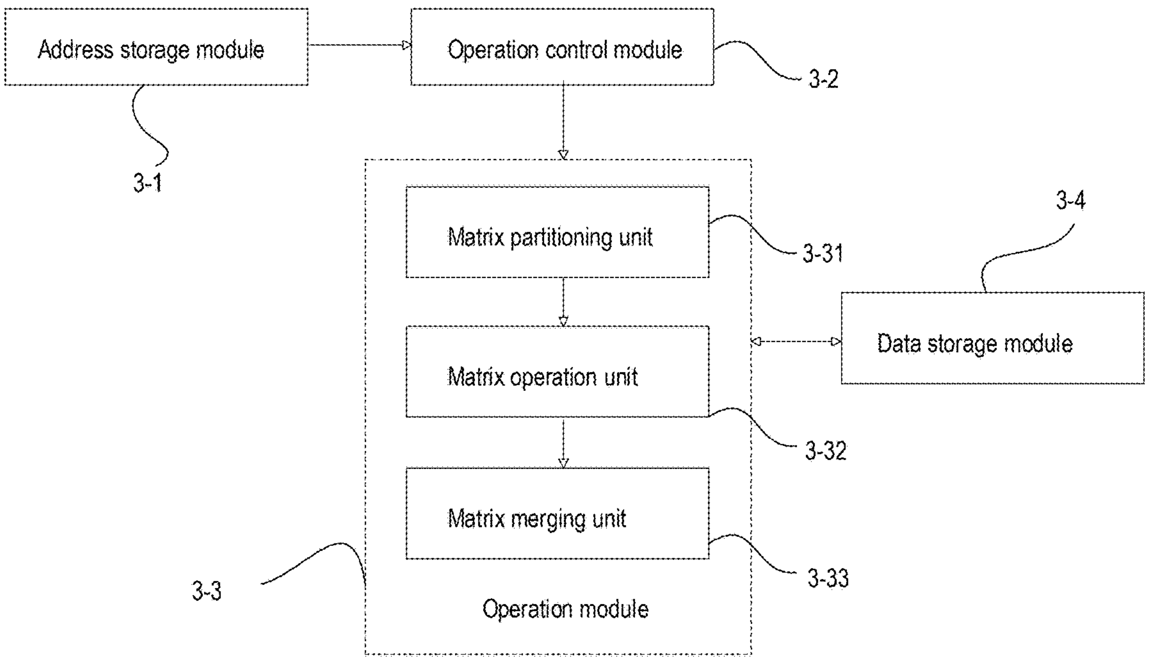
FIG. 49A is a structural diagram of an operation device according to an example of the present disclosure.
Figure 49B:
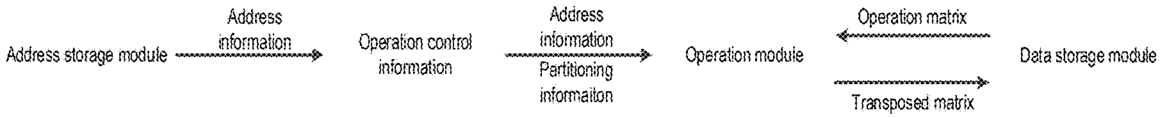
FIG. 49B is a schematic diagram of a information stream of an operation device according to an example of the present disclosure.

As shown in FIG. 49A and FIG. 49B, in some examples of the present disclosure, the operation device further includes:

an address storage module 3-1 configured to store address information of an operation matrix; and a data storage module 3-4 configured to store original matrix data and store an operated transposed matrix, where the original matrix data includes the operation matrix.

The operation control module is configured to fetch address information of the operation matrix from the address storage module, and obtain the partitioning information according to analysis of the address information of the operation matrix. The operation module is configured to obtain the address information and the partitioning information of the operation matrix from the operation control module, fetch the operation matrix from the data storage module according to the address information of the operation matrix, perform partitioning, transposing, and merging operations on the operation matrix according to the partitioning information to obtain the transposed matrix of the operation matrix and feed the same back to the data storage module.

Figure 49C:
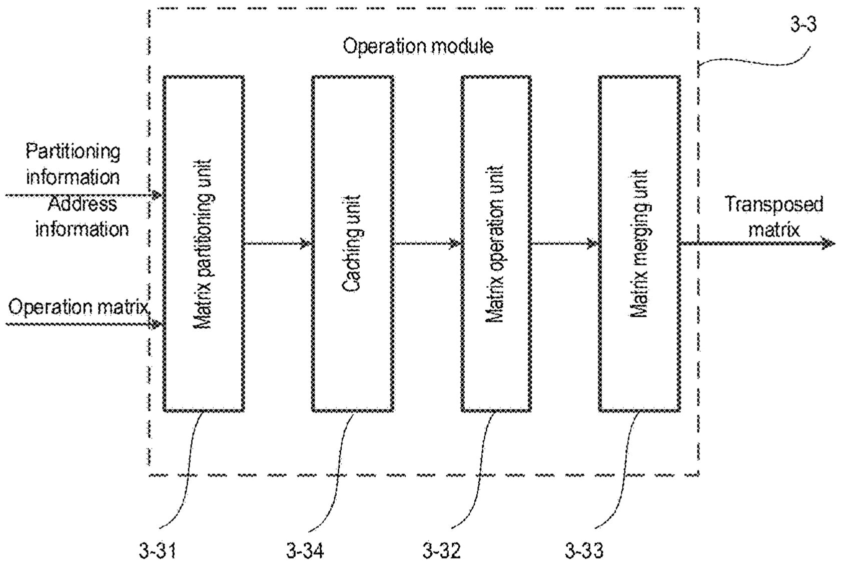
FIG. 49C is a structural diagram of an operation module of an operation device according to an example of the present disclosure.

As shown in FIG. 49C, in some examples of the present disclosure, the above operation module includes a matrix partitioning unit, a matrix operation unit, and a matrix merging unit, where:

a matrix partitioning unit 3-31 is configured to obtain the address information and the partitioning information of the operation matrix from the operation control module, fetch the operation matrix from the data storage module according to the address information of the operation matrix, and performing the partitioning operation on the operation matrix according to the partitioning information to obtain n partitioned matrices;

a matrix operation unit 3-32 is configured to obtain n partitioned matrices and perform the transposing operation on the n partitioned matrices respectively to obtain transposed matrices of the n partitioned matrices; and a matrix merging unit 3-33 is configured to obtain and merge the transposed matrices of the n partitioned matrices to obtain the transposed matrix of the operation matrix, where n is a natural number.

Figure 49D:
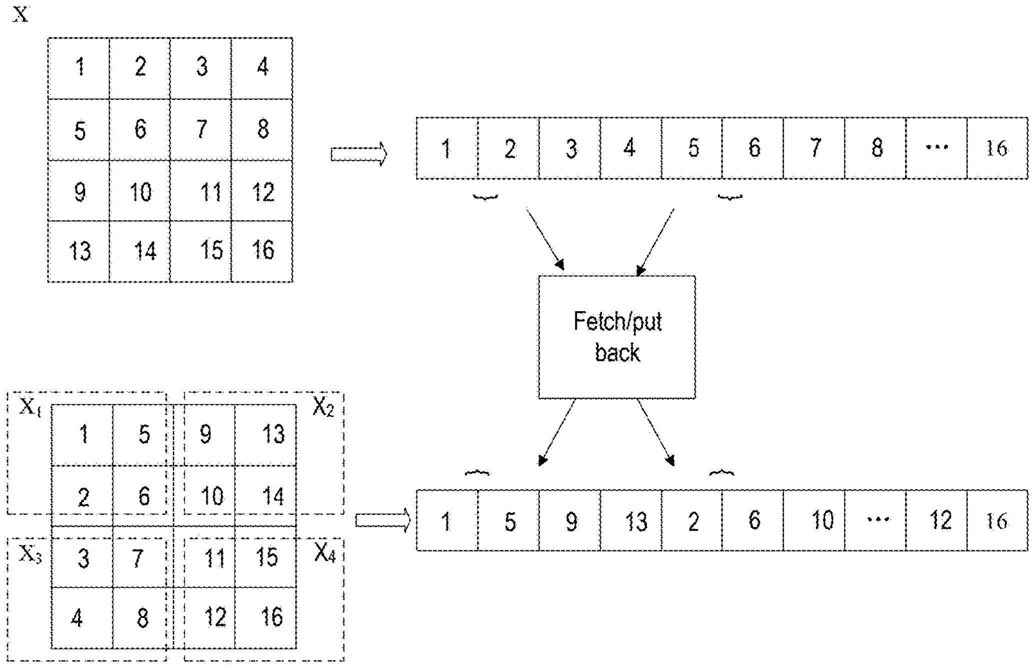
FIG. 49D is a schematic diagram of a matrix operation performed by an operation module of the present disclosure.*

For instance, as shown in FIG. 49D, for an operation matrix X stored in the data storage module, the matrix partitioning unit of the operation module fetches the operation matrix X from the data storage module, performs the partitioning operation on the operation matrix X according to the partitioning information to obtain four partitioned matrices X1, X2, X3, X4, and outputs the same to the matrix operation unit; the matrix operation unit obtains the four partitioned matrices from the matrix partitioning unit, performs the transposing operation on the four partitioned matrices respectively to obtain transposed matrices X1T, X2T, X3T, and X4T of the four partitioned matrices, and outputs the same to the matrix merging unit; and the matrix merging unit obtains and merges the transposed matrices of the four partitioned matrices to obtain a transposed matrix X T of the operation matrix, where the transposed matrix X T can be further output to the data storage module.

In some examples of the present disclosure, the operation module further includes a caching unit 3-34 configured to cache the n partitioned matrices for the matrix operation unit to obtain.

In some examples of the present disclosure, the above matrix merging unit may further include a memory configured to temporarily store an obtained transposed matrix of the partitioned matrix. After the matrix operation unit completes the operations of all the partitioned matrices, the matrix merging unit may obtain transposed matrices of all the partitioned matrices, merge the transposed matrices of the n partitioned matrices to obtain a transposed matrix, and write an output result back to the data storage module.

Those skilled in the art should understand that the above matrix partitioning unit, the matrix operation unit, and the matrix merging unit may be implemented in the form of hardware or software program modules. The matrix partitioning unit and the matrix merging unit may include one or more control elements, and the matrix operation unit may include one or more control elements and computing elements.

Figure 49E:
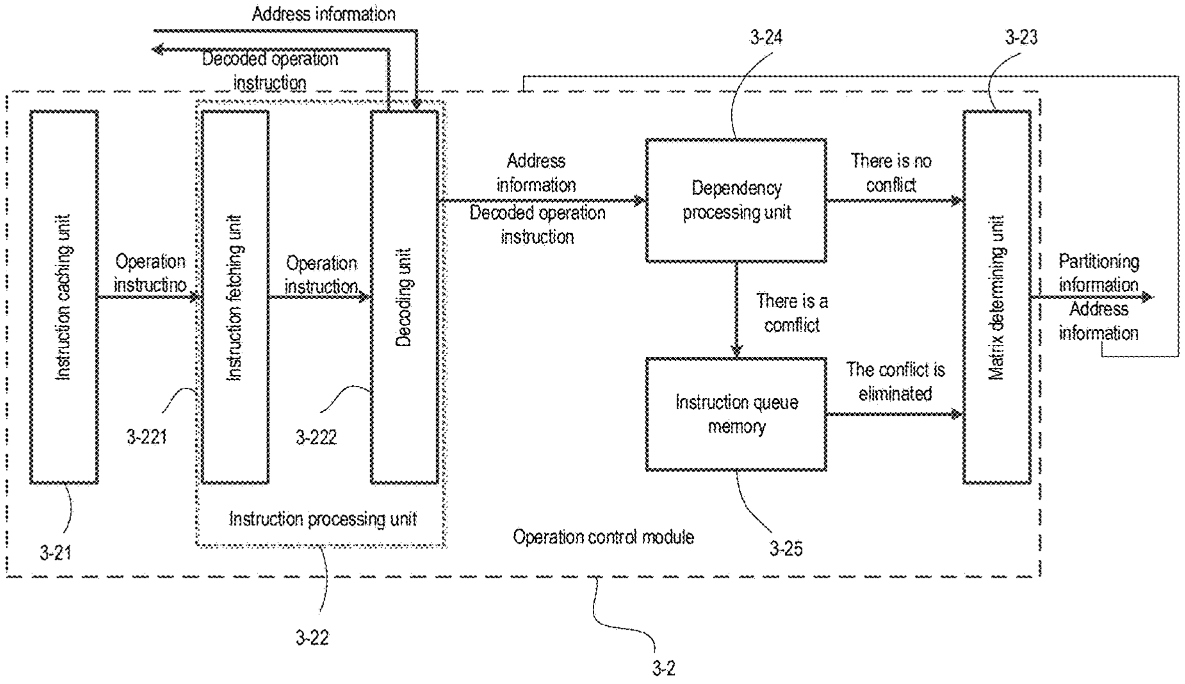
FIG. 49E is a structural diagram of an operation control module in an operation device of the present disclosure.

As shown in FIG. 49E, in some examples of the present disclosure, the above operation control module includes an instruction processing unit 3-22, an instruction caching unit 3-21, and a matrix determination unit 3-23, where:

the instruction caching unit is configured to store matrix operation instructions to be executed;

the instruction processing unit is configured to obtain the matrix operation instructions from the instruction caching unit, decode the matrix operation instructions, and fetch address information of the operation matrix from the address storage module according to decoded matrix operation instructions; and the matrix determination unit is configured to determine whether the operation matrix needs to be partitioned according to the address information of the operation matrix, and obtain the partitioning information according to a determination result.

In some examples of the present disclosure, the operation control module further includes a dependency processing unit 3-24 configured to determine whether the decoded matrix operation instruction and the address information of the operation matrix conflict with a previous operation. If there is a conflict, the decoded matrix operation instruction and the address information of the operation matrix are temporarily stored; and if there is no conflict, the decoded matrix operation instruction and the address information of the operation matrix are sent to the matrix determination unit.

In some examples of the present disclosure, the above-mentioned operation control module further includes an instruction queue memory 3-25 configured to cache the conflicting decoded matrix operation instruction and the address information of the operation matrix. When the conflict is eliminated, the cached decoded matrix operation instruction and the cached address information of the operation matrix are sent to the matrix determination unit.

Specifically, when the matrix operation instruction accesses a data storage module, the previous and following instructions may access the same storage space. In order to ensure correctness of an execution result of the instruction, if a current instruction is detected to have a dependency on the data of the previous instruction, the instruction must wait in an instruction queue memory until the dependency is eliminated.

In some examples of the present disclosure, the instruction processing unit includes an instruction fetching unit 3-221 and a decoding unit 3-222, where:

the instruction fetching unit is configured to obtain a matrix operation instruction from the instruction caching unit and send the matrix operation instruction to the decoding unit; and the decoding unit is configured to decode the matrix operation instruction, fetch address information of the operation matrix from the address storage module according to the decoded matrix operation instruction, and send the decoded matrix operation instruction and the fetched operation matrix to the dependency processing unit.

In some examples of the present disclosure, the operation device further includes an input/output module configured to input the operation matrix to the data storage module, obtain an operated transposed matrix from the data storage module, and output the operated transposed matrix.

In some examples of the present disclosure, the address information of the operation matrix includes starting address information and size information of the matrix.

In some examples of the present disclosure, the address information of the operation matrix is a storage address of the matrix in the data storage module.

In some examples of the present disclosure, the address storage module is a scalar register file or a general-purpose memory unit; and the data storage module is a scratchpad memory or a general-purpose memory unit.

In some examples of the present disclosure, the address storage module may be a scalar register file which provides a scalar register required during an operation. The scalar register not only stores matrix addresses, but also stores scalar data. After large-scale matrices are subject to the transposing operation and the partitioning operation, the scalar data in the scalar register may be configured to record the count of matrix blocks.

In some examples of the present disclosure, the data storage module may be a scratchpad memory capable of supporting matrix data of different sizes.

In some examples of the present disclosure, the matrix determination unit is configured to determine a size of a matrix. If the size exceeds a specified maximum size M, the matrix needs to be subject to the partitioning operation. The matrix determination unit obtains the partitioning information by analyzing the determination result.

In some examples of the present disclosure, the instruction caching unit is configured to store matrix operation instructions to be executed. The instructions are cached in the instruction caching unit during execution. After an instruction is executed, if the instruction is also an earliest one of unsubmitted instructions in the instruction caching unit, the instruction will be submitted. Once the instruction is submitted, changes in the state of the device caused by operations of the instruction cannot be withdrew. In an example, the instruction caching unit may be a reordering cache.

In some examples of the present disclosure, the matrix operation instruction is a matrix transposing operation instruction which includes an opcode and an operation field. The opcode is configured to indicate a function of the matrix transposing operation instruction. The matrix operation control module confirms to perform the matrix transpose operation by identifying the opcode. The operation field is configured to indicate the data information of the matrix transposing operation instruction. The data information may be an immediate or a register number. For instance, when a matrix is obtained, the matrix starting address and the matrix size can be obtained in a corresponding register according to a register serial number, and then a matrix stored at a corresponding address may be obtained in the data storage module according to the matrix starting address and the matrix size.

In the present disclosure, a new operation structure is adopted to simply and efficiently implement a transposing operation on a matrix, which may reduce time complexity of this operation.

The present disclosure also discloses an operation method which includes the following steps:

a step 1, fetching, by an operation control module, address information of an operation matrix from an address storage module;

a step 2, obtaining, by the operation control module, partitioning information according to address information of the operation matrix; and sending, by the operation control module, the address information and the partitioning information of the operation matrix to an operation module;

a step 3, fetching, by the operation module, the operation matrix from a data storage module according to the address information of the operation matrix; and partitioning, by the operation module, the operation matrix into n partitioned matrices according to the partitioning information;

a step 4, performing, by the operation module, a transposing operation on the n partitioned matrices respectively to obtain transposed matrices of the n partitioned matrices; and a step 5, merging, by the operation module, the transposed matrices of the n partitioned matrices to obtain a transposed matrix of the operation matrix; and feeding, by the operation module, the same back to the data storage module, where n is a natural number.

The operation device and method provided by the present disclosure are described in detail through specific examples.

Figure 49F:
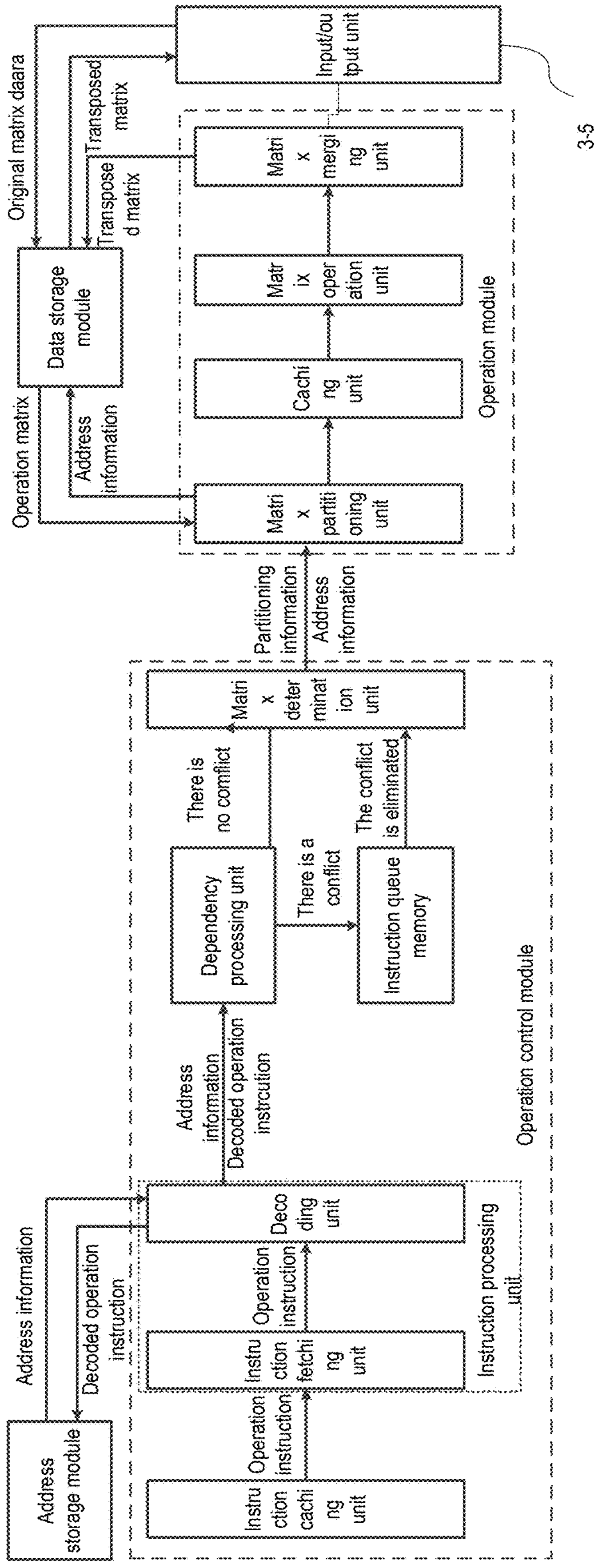

In some examples, as shown in FIG. 49F, this example provides an operation device. The operation device includes an address storage module, an operation control module, an operation module, a data storage module, and an input/output module 3-5.

Optionally, the operation control module includes an instruction caching unit, an instruction processing unit, a dependency processing unit, an instruction queue memory, and a matrix determination unit, where the instruction processing unit includes an instruction fetching unit and a decoding unit.

Optionally, the operation module includes a matrix partitioning unit, a matrix caching unit, a matrix operation unit, and a matrix merging unit.

Optionally, the address storage module is a scalar register file.

Optionally, the data storage module is a scratchpad memory; and the input/output module is an IO direct memory access module.

Each component of the operation device is described in detail below.

The instruction fetching unit is configured to fetch a next operation instruction to be executed from the instruction caching unit and send the operation instruction to the decoding unit.

The decoding unit is configured to decode the operation instruction and send a decoded operation instruction to a scalar register file to obtain address information of an operation matrix fed back by the scalar register file. The decoded operation instruction and the obtained address information of the operation matrix are sent to the dependency processing unit.

The dependency processing unit is configured to process a storage dependency that may exist between the operation instruction and a previous instruction. The matrix operation instruction may access a scratchpad memory, and the previous and the following instruction may access the same storage space. In order to ensure correctness of an execution result of the instruction, if a current operation instruction is detected to have a dependency on data of the previous operation instruction, the operation instruction must be cached in the instruction queue memory and must wait until the dependency is eliminated. If there is no dependency between the current operation instruction and the previous operation instruction, the dependency processing unit directly sends the address information of the operation matrix and the decoded operation instruction to the matrix determination unit.

Considering that there may be a dependency on scalar registers corresponding to/specified by different operation instructions, the instruction queue memory is configured to cache a conflicting decoded operation instruction and the address information of the corresponding operation matrix. After the dependency is satisfied, the decoded operation instruction and the address information of the corresponding operation matrix are sent to the matrix determination unit.

The matrix determination unit is configured to determine a size of a matrix according to the address information of the operation matrix. If a maximum size M is exceeded, the matrix needs to be partitioned into blocks. The matrix determination unit obtains partitioning information by analyzing a determination result, and then sends the address information and obtained partitioning information to the matrix partitioning unit.

The matrix partitioning unit is configured to fetch an operation matrix that needs to be transposed from the scratchpad memory according to the address information of the operation matrix, and partition the operation matrix according to the partitioning information to obtain n partitioned matrices. The matrix caching unit is configured to cache the n partitioned matrices and sequentially send the same to the matrix operation unit for the transposing operation.

The matrix operation unit is configured to sequentially fetch the partitioned matrices from the matrix caching unit for the transposing operation, and send transposed partitioned matrices to the matrix merging unit.

The matrix merging unit is configured to receive and temporarily cache the transposed partitioned matrices. After all the transpose matrices are subject to the transposing operation, the transposed matrices of the n partitioned matrices are subject to a merging operation to obtain a transposed matrix of the operation matrix.

The scalar register file provides the scalar registers required by the device during the operation and provides the address information of the operation matrix for the operation.

The scratchpad memory is a temporary storage device dedicated to matrix data, which can support matrix data of different sizes.

The IO memory access module is configured to directly access the scratchpad memory and read data from or write data to the scratchpad memory.

Figure 49G:
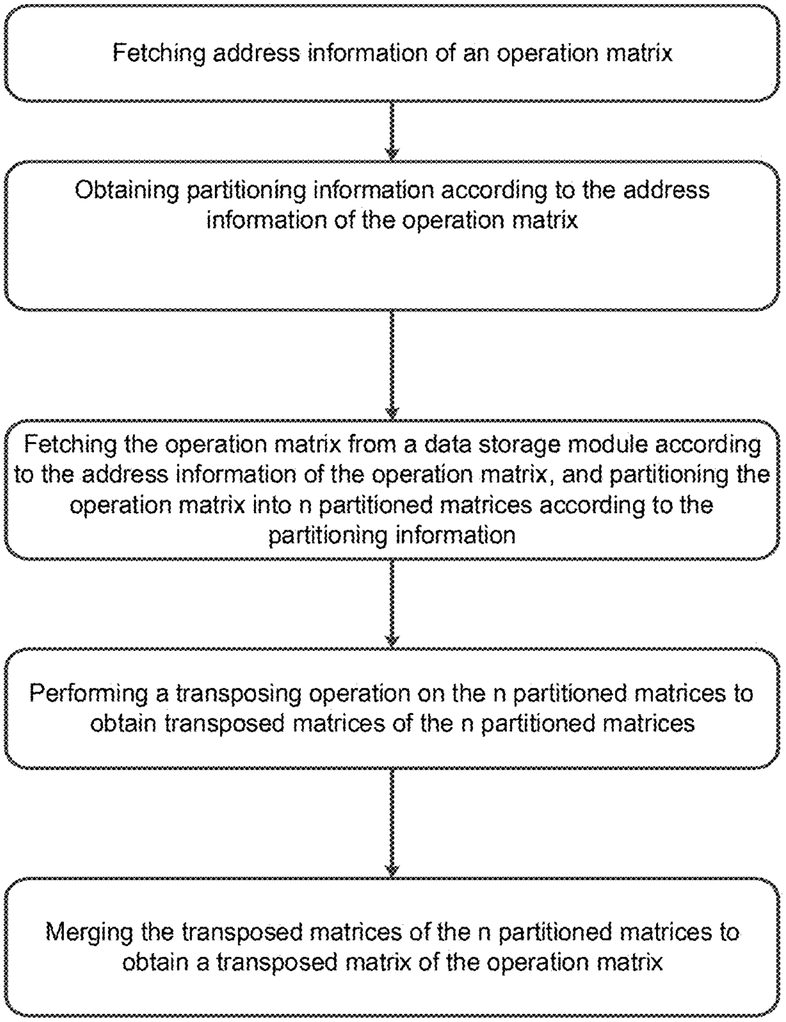

In some examples, as shown in FIG. 49G, this example provides an operation method for performing a transposing operation of large-scale matrices. The method specifically includes the following steps:

a step 1, fetching, by an operation control module, address information of an operation matrix from an address storage module. The step 1 specifically includes the following steps:

a step 1-1, fetching, by an instruction fetching unit, an operation instruction; and sending the operation instruction to a decoding unit;

a step 1-2, decoding, by the decoding unit, the operation instruction; obtaining the address information of the operation matrix from the address storage module according to a decoded operation instruction; and sending, by the decoding unit, the decoded operation instruction and the address information of the operation matrix to a dependency processing unit; and a steps 1-3, analyzing, by the dependency processing unit, whether there is a data dependency between the decoded operation instruction and a previous instruction of which the execution is not completed. Specifically, according to an address of a register required to be read by the operation instruction, the dependency processing unit may determine whether there is a condition where the data is to be written in the register. If there is the condition, a dependency exists, and the operation instruction can only be executed after the data is written back.

If there is a dependency, the decoded operation instruction and the address information of a corresponding operation matrix need to wait in an instruction queue memory until there is no data dependency between the decoded operation instruction and the previous instruction of which the execution is not completed;

The method further includes:

a step 2, obtaining, by the operation control module, partitioning information according to the address information of the operation matrix; specifically, the step 2 includes: after the dependency does not exist, sending, by the instruction queue memory, the decoded operation instruction and the address information of the corresponding operation matrix to the matrix determination unit; determining, by the instruction queue memory, whether the matrix needs to be partitioned; obtaining, by the matrix determination unit, the partitioning information according to a determination result; and sending, by the matrix determination unit, the partitioning information and the address information of the operation matrix to the matrix partitioning unit;

a step 3, fetching, by an operation module, the operation matrix from a data storage module according to the address information of the operation matrix, and partitioning the operation matrix into n partitioned matrices according to the partitioning information; specifically, the step 3 includes: fetching, by the matrix partitioning unit, a required operation matrix from the data storage module according to the address information of the operation matrix sent in; partitioning, by the matrix partitioning unit, the operation matrix into n partitioned matrices according to the partitioning information sent in; and sending, by the matrix partitioning unit, each of the partitioned matrices to the matrix caching unit in turn;

a step 4, performing, by the operation module, a transposing operation on the n partitioned matrices to obtain transposed matrices of the n partitioned matrices; specifically, the matrix operation unit sequentially fetches the partitioned matrix from the matrix caching unit, performs a transposing operation on each of the fetched partitioned matrices, and then passes the fetched transposed matrix of each partitioned matrix to the matrix merging unit; and a step 5, merging, by the operation module, the transposed matrices of the n partitioned matrices to obtain a transposed matrix of the operation matrix, and feeding back the transposed matrix to the data storage module.

The step 5 specifically includes the following steps:

a step 5-1, receiving, by the matrix merging unit, a transposed matrix of each of the partitioned matrices; when the count of received transposed matrices of the partitioned matrices reaches the total count of blocks, performing, by the matrix merging unit, a matrix merging operation on all the blocks to obtain the transposed matrix of the operation matrix; and feeding, by the matrix merging unit, the transposed matrix back to the designated address of the data storage module; and a step 5-2, directly accessing, by the input/output module, the data storage module; and reading, by the input/output module, the transposed matrix of the operation matrix obtained by operating from the data storage module.

The vectors mentioned in the present disclosure may be zero-dimensional vectors, one-dimensional vectors, two-dimensional vectors, or multi-dimensional vectors, where the zero-dimensional vectors may also be called scalars, and the 2-dimensional vectors may also be called matrices.

An example of the present disclosure provides a data filtering device. Referring to FIG. 50A, the device includes:

a storage unit 4-3 configured to store data and instructions, where the data includes data to be filtered and position information data;

a register unit 4-2 configured to store data addresses in the storage unit; and a data filtering module 4-1, which includes a data filtering unit 4-11, configured to obtain the data addresses from the register unit according to the instructions, obtain corresponding data in the storage unit according to the data addresses, and perform a filtering operation according to obtained data to obtain data filtering results.

A schematic diagram of functions of the data filtering unit is shown in FIG. 50B. In the unit, input data includes data to be filtered and position information data, and output data may only include filtered data, or may also include relevant information of the filtered data, where the relevant information may be, for instance, the length of a vector, the size of an array, an occupied space, etc.

Further, referring to FIG. 50C, the data filtering device of this example specifically includes:

the storage unit 4-3 configured to store the data to be filtered, the position information data, and the instructions;

the register unit 4-2 configured to store data addresses in the storage unit;

the data filtering module 4-1, which includes an instruction caching unit 4-12, configured to store instructions;

a control unit 4-13 configured to read the instructions from the instruction caching unit and decode the instructions into specific operation micro-instructions;

an I/O unit 4-16 configured to move the instructions in the storage unit to the instruction caching unit, move the data in the storage unit to an input data caching unit and an output caching unit, or move output data in the output caching unit into the storage unit;

the input data caching unit 4-14 configured to store data moved by the I/O unit, where the data includes data to be filtered and position information data;

the data filtering unit 4-11 configured to receive the micro-instructions from the control unit, obtain the data addresses from the register unit, use the data to be filtered and the position information data sent from the input data caching unit as input data, filter the input data, and then transfer filtered data to the output data caching unit; and the output data caching unit 4-15 configured to store output data, where the output data may only include the filtered data, or may also include relevant information of the filtered data, such as the length of a vector, the size of an array, an occupied space, etc.

The data filtering device of this example is applicable to various filtering objects. The data to be filtered may be a vector, a high-dimensional array, etc. The position information data may be a binary code, a vector, or a high-dimensional array, each component of which is 0 or 1. The components of the data to be filtered and the components of the position information data may have one-to-one correspondence. Those skilled in the art should understand that each component of the position information data being 1 or 0 is only an exemplary representation of the position information, and the representation of the position information is not limited to this representation.

Optionally, when each component in the position information data is represented by 0 or 1, a filtering operation performed by the data filtering unit on the input data specifically includes: scanning, by the data filtering unit, each component of the position information data; if a component is 0, deleting a component of the data to be filtered corresponding to the component 0; if a component is 1, retaining a component of the data to be filtered corresponding to the component 1; or, if a component of the position information data is 1, deleting a component of the data to be filtered corresponding to the component 1; and if a component of the position information data is 0, retaining a component of the data to be filtered corresponding to the component 0. When the data filtering unit finishes scanning, the filtering operation is completed, the data filtering unit obtains filtered data for outputting. In addition, when the filtering operation is being performed, the relevant information of the filtered data, such as the length of a vector, the size of an array, an occupied space, etc., can also be recorded, and whether to record and output the relevant information synchronously are determined according to specific situations. It should be noted that when each component of the position information data is represented in other representation manners, the data filtering unit may further configure a filtering operation corresponding to the representation manners.

The process of data filtering is illustrated through the examples below.

Example 1

If the data to be filtered is a vector (1 0 101 34 243) and components less than 100 are to be filtered, the input position information data is also a vector, that is, a vector (1 1 0 1 0). The filtered data may still maintain a vector structure, and a vector length of the filtered data can be output at the same time.

A position information vector may be externally input or internally generated. Optionally, the device of the present disclosure may further include a position information generation module, and the position information generation module may be configured to generate a position information vector, where the position information generation module is connected to the data filtering unit. Specifically, the position information generation module may generate a position information vector through a vector operation, where the vector operation may be a vector comparison operation, which can be viewed as obtaining the position information vector by comparing the size of components of vectors to be filtered with the size of a preset value one by one. It should be noted that the position information generation module may also select other vector operations to generate the position information vector according to a preset condition. In this example, if a component of the position information data is 1, a component of the corresponding data to be filtered is retained; and if a component of the position information data is 0, a component of the corresponding data to be filtered is deleted.

The process further includes:

initializing, by the data filtering unit, a variable length=0 to record the vector length of the filtered data;

reading, by the data filtering unit, data of the input data caching unit; scanning, by the data filtering unit, a first component of the position information vector; and if a value of the first component is 1, retaining a value of the first component of the vector to be filtered, which is 1, and length=length+1;

scanning, by the data filtering unit, a second component of the position information vector; and if a value of the second component is 1, retaining a value of the second component of the vector to be filtered, which is 0, and length=length+1;

scanning, by the data filtering unit, a third component of the position information vector;

and if a value of the third component is 0, deleting a value of the third component of the vector to be filtered, which is 101, and the length remains unchanged;

scanning, by the data filtering unit, a fourth component of the position information vector; and if a value of the fourth component is 1, retaining a value of the fourth component of the vector to be filtered, which is 34, and length=length+1;

scanning, by the data filtering unit, a fifth component of the position information vector; and if a value of the fifth component is 0, retaining a value of the fifth component of the vector to be filtered, which is 243, and the length remains unchanged; and forming the retained values into a filtered vector (1 0 34), where the vector length of the filtered vector is length=3; and storing the filtered vector in the output data caching unit.

In the data filtering device of this example, the data filtering module may further include a structure transformation unit 4-17 configured to transform a storage structure of input data of the input data caching unit and output data of the output data caching unit, such as extending a high-dimensional array into a vector, transforming a vector into a high-dimensional array, etc. Optionally, a method of extending high-dimensional data may be row-first or column-first, and other extension methods may be selected according to specific situations.

Example Two

If the data to be filtered is a four-dimensional array $$\begin{pmatrix} 1 & 4 \\ 61 & 22 \end{pmatrix}$$

and even values need to be filtered, the input position information array is $$\begin{pmatrix} 0 & 1 \\ 0 & 1 \end{pmatrix},$$

the filtered data is a vector structure, and relevant information is not output. In this example, if a component of the position information data is 1, a component of the corresponding data to be filtered is retained; and if a component of the position information data is 0, a component of the corresponding data to be filtered is deleted.

The process further includes:

reading, by the data filtering unit, data of the input data caching unit; scanning, by the data filtering unit, a $(1,1)^{th}$ component of the position information array; and if a value of the $(1,1)^{th}$ component is 0, deleting a value of the $(1,1)^{th}$ component of an array to be filtered, $$\begin{pmatrix} 1 & \begin{pmatrix} 14 \\ 622 \end{pmatrix} & 4 \\ 61 & & 22 \end{pmatrix} \begin{pmatrix} 1 & 4 \\ 61 & 22 \end{pmatrix}$$

which is 1;

scanning, by the data filtering unit, a $(1,2)^{th}$ component of the position information array;

and if a value of the $(1,2)^{th}$ component is 1, retaining the value of a $(1,2)^{th}$ component of an array to be filtered, which is 4;

scanning, by the data filtering unit, a $(2,1)^{th}$ component of the position information array;

and if a value of the $(2,1)^{th}$ component is 0, deleting the value of a $(2,1)^{th}$ component of an array to be filtered, which is 61;

scanning, by the data filtering unit, a $(2,2)^{th}$ component of the position information array;

and if a value of a $(2,2)^{th}$ component is 1, retaining the value of the $(\mathbf{2,2})^{th}$ component of the array to be filtered, which is 22; and transforming, by the structure transformation unit, the retained values into a vector, that is, the filtered data is a vector (4, 22); and storing, by the output data caching unit, the filtered data.

In some examples, as shown in FIG. 50D, the data filtering module may further include a computation unit 4-18. Therefore, the device of the present disclosure can also perform data filtering and processing, and thus a data filtering and processing device may be obtained. The specific structure of the computation unit is the same as that of the foregoing examples, so details will not be further described herein.

The present disclosure provides a data filtering method using the data filtering device. The method includes:

obtaining, by a data filtering module, data addresses from a register unit;

obtaining corresponding data from a storage unit according to the data addresses; and performing a filtering operation on obtained data to obtain a data filtering result.

In some examples, the step of obtaining the data addresses from the register unit by the data filtering module includes: obtaining, by the data filtering unit, addresses of data to be filtered and addresses of position information data from the register unit.

In some examples, the step of obtaining corresponding data from the storage unit according to the data address includes the following sub-steps:

transferring, by an I/O unit, the data to be filtered and the position information data from the storage unit to an input data caching unit; and transferring, by the input data caching unit, the data to be filtered and the position information data to a data filtering unit.

Optionally, a step between the sub-step of transferring the data to be filtered and the position information data from the storage unit to the input data caching unit by the I/O unit and the sub-step of transferring the data to be filtered and the position information data to the data filtering unit by the input data caching unit further includes: determining whether to transform a storage structure.

If the storage structure is determined to be transformed, the input data caching unit transfers the data to be filtered to a structure transformation unit, and the structure transformation unit transforms the storage structure, returns the transformed data to be filtered to the input data caching unit, and then executes the sub-step of transferring the data to be filtered and the position information data to the data filtering unit by the input data caching unit; and if it is determined that the storage structure does not need to be transformed, the sub-step of transferring the data to be filtered and the position information data to the data filtering unit by the input data caching unit is directly executed.

In some examples, the step of performing the filtering operation on the obtained data to obtain a data filtering result includes: performing, by the data filtering unit, the filtering operation on the data to be filtered according to the position information data, and transferring output data to the output data caching unit.

As shown in FIG. 50E, in a specific example of the present disclosure, the steps of the data filtering method are as follows:

a step S4-1, reading, by the control unit, a data filtering instruction from the instruction caching unit; decoding, by the control unit, the data filtering instruction into a specific operation micro-instruction, and sending the same to the data filtering unit;

a step S4-2, obtaining, by the data filtering unit, addresses of the data to be filtered and the position information data from the register unit;

a step S4-3, reading, by the control unit, an I/O instruction from the instruction caching unit; decoding, by the control unit, the I/O instruction into a specific operation micro-instruction, and sending the same to the I/O unit;

a step S4-4, transferring, by the I/O unit, the data to be filtered and the position information data in the storage unit to the input data caching unit; determining whether to transform the storage structure; if it is determined that the storage structure is to be transformed, executing a step S4-5; otherwise, directly executing a step S4-6;

the step S4-5, transferring, by the input data caching unit, the data to the structure transformation unit; performing, by the input data caching unit, the corresponding transformation on the storage structure; returning, by the input data caching unit, transformed data to the input data caching unit; and then executing the step S4-6;

the step S4-6, transferring, by the input data caching unit, the data to the data filtering unit; and performing, by the data filtering unit, the filtering operation on the data to be filtered according to the position information data; and a step S4-7, transferring the output data to the output data caching unit, where the output data may only include the filtered data, or may also include relevant information of the filtered data, such as the length of a vector, the size of an array, an occupied space, etc.

The examples of the present disclosure have been described in detail with reference to the accompanied drawings. Based on the above descriptions, those skilled in the art should have a clear understanding of the data filtering device and method of the present disclosure.

An example of the present disclosure provides a neural network processor, including: a memory, a scratchpad memory, and a heterogeneous kernel. The memory is configured to store data and instructions for a neural network operation; the scratchpad memory is connected to the memory through a memory bus; and the heterogeneous kernel is connected to the scratchpad memory through a scratchpad memory bus, read the data and the instructions of the neural network operation through the scratchpad memory, complete the neural network operation, return an operation result to the scratchpad memory, and control the scratchpad memory to write the operation result back to the memory.

The heterogeneous kernel includes kernels with at least two different types, which can be viewed as kernels with two different structures.

In some examples, the heterogeneous kernel includes: a plurality of operation kernels with at least two different types configured to perform a neural network operation or a neural network layer operation; and one or more logical control kernels configured to determine whether a neural network operation or a neural network layer operation is performed by the dedicated kernel and/or the general-purpose kernel according to data of the neural network operation.

Further, the plurality of operation kernels include m general-purpose kernels and n dedicated kernels, where the dedicated kernels are dedicated to perform a specified neural network operation or neural network layer operation, and the general-purpose kernels are configured to execute an arbitrary neural network operation or neural network layer operation. Optionally, the general-purpose kernel may be a cpu, and the dedicated kernel may be an npu.

In some examples, the scratchpad memory includes a shared scratchpad memory and/or a non-shared scratchpad memory. The shared scratchpad memory is correspondingly connected to at least two kernels of the heterogeneous kernel through the scratchpad memory bus, and the non-shared scratchpad memory is correspondingly connected to one kernel of the heterogeneous kernel through the scratchpad memory bus.

Specifically, the scratchpad memory may include only one or more shared scratchpad memories, and each of the shared scratchpad memories is connected to a plurality of kernels (logical control kernels, dedicated kernels, or general-purpose kernels) in the heterogeneous kernel. The scratchpad memory may also include only one or more non-shared scratchpad memory memories, and each of the non-shared scratchpad memories is connected to a kernel (a logical control kernel, a dedicated kernel, or a general-purpose kernel) in the heterogeneous kernel. The scratchpad memory may also simultaneously include one or more shared scratchpad memories and one or more non-shared scratchpad memories, where each of the shared scratchpad memories is connected to a plurality of kernels (logical control kernels, dedicated kernels, or general-purpose kernels) in the heterogeneous kernel and each of the non-shared scratchpad memories is connected to a kernel (a logical control kernel, a dedicated kernel, or a general-purpose kernel) in the heterogeneous kernel.

In some examples, the logical control kernel, which is connected to the scratchpad memory through the scratchpad memory bus, is configured to read data of the neural network operation through the scratchpad memory, and determine whether a dedicated kernel and/or a general-purpose kernel is used as a target kernel to perform the neural network operations and/or neural network layer operations according to the type and parameters of neural network models in the data of the neural network operation. Paths may be added among the kernels, and the logical control kernels may directly send signals to the target kernel through a control bus, or may send signals to the target kernel through the scratchpad memory, so as to control the target kernel to perform the neural network operation and/or the neural network layer operation.

An example of the present disclosure proposes a heterogeneous multi-core neural network processor. Referring to FIG. 50F, the processor includes a memory 11, a non-shared scratchpad memory 12, and a heterogeneous kernel 13.

The memory 11 is configured to store data and instructions for the neural network operation. The data includes biases, weights, input data, output data, and types and parameters of neural network models, where the output data may not be stored in the memory; and the instructions include various instructions corresponding to the neural network operation, such as a CONFIG instruction, a COMPUTE instruction, an IO instruction, an NOP instruction, a JUMP instruction, a MOVE instruction, etc. The data and the instructions stored in the memory 11 may be sent to the heterogeneous kernel 13 through the non-shared scratchpad memory 12.

The non-shared scratchpad memory 12 includes a plurality of scratchpad memory memories 121. Each scratchpad memory 121 is connected to the memory 11 through a memory bus, and is connected to the heterogeneous kernel 13 through the scratchpad memory bus, so as to implement data exchange between the heterogeneous kernel 13 and the non-shared scratchpad memory 12 and data exchange between the non-shared scratchpad memory 12 and the memory 11. When neural network operation data or instructions required by the heterogeneous kernel 13 are not stored in the non-shared scratchpad memory 12, the non-shared scratchpad memory 12 first reads the required data or instructions from the memory 11 through the memory bus, and then send the same to the heterogeneous kernel 13 through the scratchpad memory bus.

The heterogeneous kernel 13 includes a logical control kernel 131, a general-purpose kernel 132, and a plurality of dedicated kernels 133. The logical control kernel 131, the general-purpose kernel 132, and each of the dedicated kernels 133 are correspondingly connected to one scratchpad memory 121 through the scratchpad memory bus.

The heterogeneous kernel 13 is configured to read the instructions and the data of the neural network operation from the non-shared scratchpad memory 12, complete the neural network operation, return an operation result to the non-shared scratchpad memory 12, and control the non-shared scratchpad memory 12 to write the operation result back to the memory 11.

The logical control kernel 131 reads the neural network operation data and instructions from the non-shared scratchpad memory 12, and determines whether there is a dedicated kernel 133 that can support the neural network operation and complete the neural network operation scale according to the types and parameters of the neural network models in the data. If there is a dedicated kernel 133, the corresponding dedicated kernel 133 completes the neural network operation; otherwise, the general-purpose kernel 132 completes the neural network operation. In order to determine the position of the dedicated kernel and whether the dedicated kernel is idle, a table (called a dedicated/general-purpose kernel information table) may be set for each type of kernels (the dedicated kernels that support a same layer belong to a type, and the general-purpose kernels belong to a type). The table records serial numbers (or addresses) of kernels of the same type and whether the kernels are currently idle. Initially, all the kernels are idle, and then changes in the idle state are maintained by direct or indirect communication between the logical control kernels and the kernels. The serial numbers of the kernels in the table may be obtained by this network processor scanning once during initialization, so that dynamic configuration of the heterogeneous kernel can be supported (in other words, the type and the count of dedicated processors in the heterogeneous kernel can be changed at any time, and the kernel information table is scanned and updated after the change). Optionally, if the dynamic configuration of the heterogeneous kernel is not be supported, only the serial numbers of the kernels in the table need to be fixed while a plurality of times of scanning and update are not necessary. Optionally, if the serial numbers of each type of dedicated kernels are always continuous, a base address can be recorded, and then a number of consecutive bits can be configured to represent the dedicated kernels, and a bit 0 or 1 can be configured to represent whether the kernels are in an idle state. In order to determine the type and parameters of the network models, a decoder can be set in the logical control kernel to determine the type of a network layer according to instructions, determine whether the instructions are general-purpose kernel instructions or a dedicated kernel instructions, and parse the instructions to obtain parameters, data addresses, and the like. Optionally, the data can also be provided with a data header which includes a serial number and a scale of each network layer, and the address of corresponding computing data and instructions, and a dedicated parser (software or hardware)

can be set to parse the information. Optionally, parsed information is stored in a specified area. In order to determine which kernel to use according to the serial number and the scale of a parsed network layer, a content addressable memory (CAM) can be set in the logical control kernel. Contents of the CAM can be configurable, which requires the logical control kernel to provide some instructions to configure/write the CAM. The contents of the CAM include the serial number of a network layer, a maximum size that each dimension can support, and addresses of a dedicated kernel information table supporting this layer and a general-purpose kernel information table supporting the layer. In this solution, the serial number of the layer obtained by parsing is used to find a corresponding entry of the table and compare scale limits. If the above conditions are satisfied, the address of the dedicated kernel information table is fetched, then an idle dedicated kernel is looked up in the table and a control signal is sent according to the serial number of the idle dedicated kernel to assign computing tasks to idle dedicated kernel; if a corresponding layer is not found in the CAM, or the scale limit is exceeded, or there is no idle kernel in the dedicated kernel information table, then an idle general-purpose kernel needs to be looked up in the general-purpose kernel information table, and a control signal is sent according to the serial number of the idle general-purpose kernel to assign computing tasks to idle general-purpose kernel; and if no idle kernel is found in both tables, this task is added to a waiting queue with some necessary information added, and once there is an idle kernel that can compute the task, the task is assigned to the idle kernel for computation.

There may be a plurality of methods to determine the position of a dedicated kernel and whether the dedicated kernel is idle. The above-mentioned determining methods are merely described as an instance. Each dedicated kernel 133 may independently complete a neural network operation such as a spiking neural network (SNN) operation or another specified neural network operations, write an operation result back to a corresponding scratchpad memory 121, and control the scratchpad memory 121 to write the operation result back to the memory 11.

The general-purpose kernel 132 may independently complete a neural network operation that exceeds the scale of operations supported by the dedicated kernels or that is not supported by all the dedicated kernels 133, write an operation result back to a corresponding scratchpad memory 121, and control the scratchpad memory 121 to write the operation result back to the memory 11.

An example of the present disclosure provides a heterogeneous multi-core neural network processor. Referring to FIG. 50H, the processor includes: a memory 21, a shared scratchpad memory 22, and a heterogeneous kernel 23.

The memory 21 is configured to store data and instructions of the neural network operation. The data includes biases, weights, input data, output data, and types and parameters of the neural network models. The instructions include various instructions corresponding to the neural network operation. The data and instructions stored in the memory are sent to the heterogeneous kernel 23 through the shared scratchpad memory 22.

The shared scratchpad memory 22 is connected to the memory 21 through a memory bus, and is connected to the heterogeneous kernel 23 through a shared scratchpad memory bus, so as to realize data exchange between the heterogeneous kernel 23 and the shared scratchpad memory 22 and data exchange between the shared scratchpad memory 22 and the memory 21.

When the neural network operation data or instructions required by the heterogeneous kernel 23 are not stored in the shared scratchpad memory 22, the shared scratchpad memory 22 first reads required data or instructions from the memory 21 through the memory bus, and then sends the same to the heterogeneous kernel 23 through the scratchpad memory bus.

The heterogeneous kernel 23 includes a logical control kernel 231, a plurality of general-purpose kernels 232, and a plurality of dedicated kernels 233. The logical control kernel 231, the plurality of general-purpose kernels 232, and the plurality of dedicated kernels 233 are all connected to the shared scratchpad memory 22 through the scratchpad memory bus.

The heterogeneous kernel 23 is configured to read the neural network operation data and instructions from the shared scratchpad memory 22, complete the neural network operation, return an operation result to the scratchpad memory 22, and control the shared scratchpad memory 22 to write the operation result back to the memory 21.

In addition, when data transfer is required between the logical control kernel 231 and the general-purpose kernels 232, between the logical control kernel 231 and the dedicated kernels 233, among the general-purpose kernels 232, and among the dedicated kernels 233, the kernel which transfers data can first transfer the data to the shared scratchpad 22 through the shared scratchpad bus, and then transfer the data to the kernel which receives the data without passing through the memory 21.

For neural network operations, a neural network model generally includes a plurality of neural network layers, and each neural network layer uses an operation result of a previous neural network layer to perform a corresponding operation, and the operation result is output to a next neural network layer. The operation result of a neural network layer is used as a result of the entire neural network operation. In the heterogeneous multi-core neural network processor of this example, both the general-purpose kernels 232 and the dedicated kernels 233 can perform a neural network layer operation, and the logical control kernel 231, the general-purpose kernels 232, and the dedicated kernels 233 jointly perform a neural network operation. For convenience of description, the neural network layer is simply referred to as a layer below.

Each of the dedicated kernels 233 can independently perform operations of a layer, such as a convolution operation, a fully connected layer, a splicing operation, a bitwise addition/multiplication operation, a Relu operation, a pooling operation, a Batch Norm operation, and the like of a neural network layer. The scale of a neural network operation layer cannot be too large, that is, it cannot exceed the scale of a neural network operation layer that can be supported by a corresponding dedicated kernel. In other words, the count of neurons and synapses of the layer is limited by the dedicated kernel operation. After the operation of the layer is completed, the operation result is written back to the shared scratchpad memory 22.

The general-purpose kernels 232 are configured to perform a layer operation that exceeds the operation scale supported by the dedicated kernels 233 or that is not supported by all dedicated kernels, write an operation result back to the shared scratchpad memory 22, and control the shared scratchpad memory 22 to write the operation result back to the memory 21.

Further, after the dedicated kernels 233 and the general-purpose kernels 232 write the operation result back to the memory 21, the logical control kernel 231 sends a start-operation signal to the dedicated kernels or general-purpose kernels that perform the operation of the next layer as a notification of starting the operation.

Further, the dedicated kernels 233 and the general-purpose kernels 232 start the operation when receiving the start-operation signal sent by the dedicated kernels or the general-purpose kernels that perform the operation of the previous layer and there is currently no ongoing layer operation. If a layer operation is currently being performed, the operation is started after the current layer operation is completed and the operation result is written back to the shared scratchpad memory 22.

The logical control kernel 231 is configured to: read the neural network operation data from the shared scratchpad memory 22, for a type and parameters of a neural network model therein, parse each layer of the neural network model, for each layer, determine whether there is a dedicated kernels 233 which supports the operation of this layer and can complete the operation scale of this layer, if such dedicated kernel exists, assign the operation of this layer to the corresponding dedicated kernel 233, otherwise, assign the operation of this layer to a general-purpose kernel 232 for operation. The logical control kernel 231 also sets corresponding addresses of data and instructions required by the general-purpose kernels 232 and the dedicated kernels 233 for the layer operation The general-purpose kernels 232 and the dedicated kernels 233 read the data and the instructions at the corresponding addresses for the layer operation.

For a dedicated kernel 233 and a general-purpose kernel 232 that perform the operation of a first layer, the logical control kernel 231 sends a start-operation signal to the dedicated kernel 233 or the general-purpose kernel 232 when the operation starts. After the neural network operation ends, a dedicated kernel 233 or a general-purpose kernel 232 that perform the operation of a last layer send a start-operation signal to the logical control kernel 231. After receiving the start-operation signal, the logical control kernel 231 controls the shared scratchpad memory 22 to write the operation result back to the memory 21.

An example of the present disclosure provides a method for performing a neural network operation by using the heterogeneous multi-core neural network processor of the first example. Referring to FIG. 50H, the steps are as follows:

a step S5-11, reading, by the logical control kernel 131 in the heterogeneous kernel 13, data and instructions of the neural network operation from the memory 11 through the non-shared scratchpad memory 12;

a step S5-12, determining, by the logical control kernel 131 in the heterogeneous kernel 13, whether there is a dedicated kernel that meets a condition according to a type and parameters of a neural network model in the data, where the meeting condition refers to that the dedicated kernel supports the neural network operation and can complete the neural network operation scale (a scale limit may be inherent in the dedicated kernels, and can be obtained by querying the kernel manufacturer; or the limit may be artificially specified, which for instance, it may be found from experiments that if a certain scale is exceeded, the general-purpose kernels are more effective; and the limit can be set when configuring the CAM=; if a dedicated kernel m meets the condition, using the dedicated kernel m as a target kernel and executing a step S5-13; otherwise, executing a step S5-15, where m is a serial number of the dedicated kernels, 1≤m≤M, and M is the count of the dedicated kernels;

a step S5-13, sending, by the logical control kernel 131 in the heterogeneous kernel 13, a signal to the target kernel to activate the target kernel; and simultaneously sending addresses corresponding to the data and instructions of the neural network operation to be performed to the target kernel; and a step S5-14, obtaining, by the target kernel, the data and instructions of the neural network operation from the memory 11 through the non-shared scratchpad memory 12 according to obtained addresses for the neural network operation; outputting, by the target kernel, an operation result through the non-shared scratchpad memory 12 to the memory 11; and the operation is completed.

Further, following the step S5-12, if there are no dedicated kernels that meet the condition, the steps S5-15 to S5-16 are executed. The steps are as follows:

the step S5-15, sending, by the logical control kernel 131 in the heterogeneous kernel 13, a signal to the general-purpose kernel 132 to activate the general-purpose kernel 132; and simultaneously sending the addresses corresponding to the data and instructions of the neural network operation to be performed to the general-purpose kernel 132; and the step S5-16, obtaining, by the general-purpose kernel 132, the data and instructions of the neural network operation from the memory 11 through the non-shared scratchpad memory 12 according to the obtained addresses for the neural network operation; outputting, by the general-purpose kernel 132, an operation result through the non-shared scratchpad memory 12 to the memory 11; and the operation is completed.

An example of the present disclosure provides a method for performing a neural network operation by using the heterogeneous multi-core neural network processor of the second example. Referring to FIG. 50I, the steps are as follows:

a step S5-21, reading, by the logical control kernel 231 in the heterogeneous kernel 23, the data and instructions of the neural network operation from the memory 21 through the shared scratchpad memory 22; and a step S5-22, parsing, by the logical control kernel 231 in the heterogeneous kernel 23, a type and parameters of a neural network model in the data; and for a first layer to an $I^{th}$ layer of the neural network model, determining whether there is a dedicated kernel that meets a condition, where I is the count of layers of the neural network model, and the meeting the condition refers to that the dedicated kernels can support the operation of this layer, complete the operation scale of this layer, and assign corresponding general-purpose or dedicated kernels for the operation of each layer.

For the $i^{th}$ layer operation of the neural network model, 1≤i≤I. If a dedicated kernel m meets the condition, the dedicated kernel m is selected to perform the $i^{th}$ layer operation of the neural network model, where m is the serial number of the dedicated kernel, 1≤m≤M, and M is the count of the dedicated kernels; otherwise, a general-purpose kernel M+n is selected to perform the $i^{th}$ layer operation of the neural network model, where M+n is the serial number of the general-purpose kernels, 1≤n≤N, and N is the count of the general-purpose kernels. The dedicated kernels 233 and the general-purpose kernels 232 are uniformly numbered (in other words, the dedicated kernels and the general-purpose kernels are numbered together; for instance, x dedicated kernels and y general-purpose kernels can be numbered from 1 to x+y, each of which corresponds to a serial number from 1 to x+y), The dedicated kernels and the general-purpose kernels can also be numbered separately (for instance, for x dedicated kernels and y general-purpose kernels, the dedicated kernels can be numbered from 1 to x and the general-purpose kernels can be numbered from 1 to y, and each dedicated kernel or general-purpose kernel corresponds to a serial number). In this case, a dedicated kernel may have the same serial number as that of a general-purpose kernel, however, the dedicated kernel and the general-purpose kernel merely have the same logical serial number and may be addressed according to physical addresses. Finally a kernel sequence corresponding to the first to the $I^{th}$ layer operation of the neural network model may be obtained. In other words, the kernel sequence includes I elements in total, and each element is a dedicated kernel or a general-purpose kernel which sequentially corresponds to the first to the $I^{th}$ layer operation of the neural network model. For instance, there is a kernel sequence 1a, 2b, . . . i1, where 1, 2, and i represent the serial numbers of the neural network layer, and a, b, and 1 represent the serial numbers of the dedicated kernels or the general-purpose kernels.

The method further includes:

a step S5-23, sending, by the logical control kernel 231 in the heterogeneous kernel 23, the addresses corresponding to the data and instructions of a layer operation to be performed to the dedicated kernel or general-purpose kernel that performs the operation of the layer; and sending, by the logical control kernel 231 in the heterogeneous kernel 23, a serial number of a next dedicated kernel or general-purpose kernel in the kernel sequence to the dedicated kernel or general-purpose kernel that performs the operation of the layer, where the serial number sent to a dedicated kernel or a general-purpose kernel that perform the operation of a last layer is the serial number of the logical control kernel;

a step S5-24, sending, by the logical control kernel 231 in the heterogeneous kernel 23, a start-operation signal to a first kernel in the kernel sequence; after receiving the start-operation signal, if there is an uncompleted operation currently, completing, by a first dedicated kernel 233 or general-purpose kernel 232, the operation and then continuing to read data and instructions from the addresses corresponding to the data and instructions for the operation of a current layer;

a step S5-25, after completing the operation of the current layer, sending, by the first dedicated kernels 233 or the general-purpose kernels 232, an operation result to a specified address of the shared scratchpad memory 22; and simultaneously sending, by the first dedicated kernels 233 or the general-purpose kernels 232, the start-operation signal to a second kernel in the kernel sequence;

a step S5-26, analogically, after each kernel in the kernel sequence receives the start-operation signal, if there is an uncompleted operation currently, completing the operation; reading the data and instructions from the addresses corresponding to the data and instructions for corresponding layer operation; sending an operation result to a specified address of the shared scratchpad memory 22; and sending the start-operation signal to a next kernel in the kernel sequence, where a last kernel in the kernel sequence sends the start-operation signal to the logical control kernel 231; and a step S5-27, after receiving the start-operation signal, controlling, by the logical control kernel 231, the shared scratchpad memory 22 to write operation results of each neural network layer back to the memory 21; and the operation is completed.

As shown in FIG. 50J, this example is a further extension of the first example described above. In the first example, one scratchpad memory 121 is dedicated to each kernel. For instance, a dedicated kernel 1 can only access a scratchpad memory 3 and cannot access other scratchpad memories, and the situation is similar for other kernels. Therefore, a component 12 composed of the scratchpad memories 121 has a nature of non-sharing. However, if a kernel j wants to use a computation result of a kernel i (i j) (the result is initially stored in the scratchpad memory corresponding to the kernel i), the kernel i must first write the result from the scratchpad memory to the memory 11, and then the kernel j needs to read the result from the memory 11 to the scratchpad memory that can be accessed by the kernel j. After this process, the kernel j can use this result. To simplify the process, an N×N data exchange network 34 can be added to the processor, for instance, a crossbar may be used for implementation, so that each kernel (331 or 332 or 333) can access all scratchpad memories (321). In this case, a scratchpad memory 32 has a shared nature.

A method of performing the neural network operation by using the device of this example (corresponding to FIG. 50J) is as follows:

a step S5-31, reading, by the logical control kernel 331 in the heterogeneous kernel 33, the data and instructions of the neural network operation from the memory 31 through the scratchpad memory 32;

a step S5-32, determining, by the logical control kernel 331 in the heterogeneous kernel 33, whether there is a dedicated kernel that meets a condition according to a type and parameters of a neural network model in the data, where the meeting the condition refers to that the dedicated kernels support a neural network operation and can complete the neural network operation scale; if a dedicated kernel m meets the condition, using the dedicated kernel m as a target kernel and executing a step S5-33; otherwise, executing a step S5-35, where m is a serial number of the dedicated kernel;

a step S5-33, sending, by the logical control kernel 331 in the heterogeneous kernel 33, a signal to the target kernel to activate the target kernel; and simultaneously sending addresses corresponding to the data and instructions of the neural network operation to be performed to the target kernel; and a step S5-34, obtaining, by the target kernel, the data and instructions of the neural network operation (from the scratchpad memory 32) according to the obtained addresses for the neural network operation; storing, by the target kernel, an operation result in the scratchpad memory 32; and the operation is completed.

The method further includes:

the step S5-35, sending, by the logical control kernel 331 in the heterogeneous kernel 33, a signal to the general-purpose kernel 332 to activate the general-purpose kernel 332; and simultaneously sending the addresses corresponding to the data and instructions of the neural network operation to be performed to the general-purpose kernel 332; and the step S5-36, obtaining, by the general-purpose kernel 332, the data and instructions of the neural network operation (from the scratchpad memory 32) according to the obtained addressed for the neural network operation; storing, by the general-purpose kernel 332, an operation result in scratchpad memory 32; and the operation is completed.

Further, a connection manner between the memory and the scratchpad memory can be changed, which may generate a new example as shown in FIG. 50K. A difference of the example in FIG. 50K compared with the example in FIG. 50J is the connection manner between the memory 41 and the scratchpad memory 42. Originally a bus connection is adopted, and the plurality of scratchpad memories 321 have to be queued when writing the memory 31, which results in low efficiency (see FIG. 50J). Currently, the structure here is abstracted into a data exchange network with one input and N outputs, a variety of topological structures can be adopted to achieve this function, such as a star structure (the memory 41 has a dedicated path connection to each of the N scratchpads memories 421), a tree structure (the memory 41 is at a root of the tree and the scratchpad memories 421 are at the position of leaves), etc.

It should be noted that the count of logical control kernels, the count of dedicated kernels, the count of general-purpose kernels, the count of shared or non-shared scratchpad memories, and the count of memories are not limited in the present disclosure, and can be adjusted according to specific requirements of neural network operations.

The examples of the present disclosure have been described in detail with reference to the accompanied drawings. Based on the above descriptions, those skilled in the art should have a clear understanding of the heterogeneous multi-core neural network processor and neural network computation methods of the present disclosure.

In some examples, the present disclosure also provides a chip which includes the above operation device.

In some examples, the present disclosure also provides a chip package structure which includes the above chip.

In some examples, the present disclosure also provides a board card which includes the above chip package structure.

In some examples, the present disclosure also provides an electronic device which includes the above board card.

It should be noted here that coarse-grained pruning (or coarse-grained sparsification) refers to obtaining at least two pieces of data (weights or neurons), and when the at least two pieces of data satisfy a preset condition, part or all of the at least two pieces of data are set to 0.

According to the basic concept of the present disclosure, a processing method, a processing device, and an acceleration device for performing coarse-grained pruning (sparsification) on a neural network are provided to reduce the weight storage and the operation amount.

FIG. 51 is a schematic structural diagram of a processing device for performing coarse-grained pruning (sparsification) on a neural network according to an example of the present disclosure. As shown in FIG. 51, the processing device includes:

a coarse-grained pruning unit configured to perform coarse-grained pruning on weights of a neural network to obtain pruned weights.

Specifically, the coarse-grained pruning unit is specifically configured to:

select M weights from the weights of the neural network through a sliding window, where M is an integer greater than 1; when the M weights satisfy a preset condition, set all or part of the M weights to 0.

The preset condition is that an information amount of the M weights satisfies a preset determination condition.

In an optional implementation, the preset determination condition includes a threshold determination condition, where the threshold determination condition may include one or more of: being less than a given threshold, being less than or equal to a given threshold, being greater than a given threshold, being greater than or equal to a given threshold, being within a given value range, or out of a given value range.

Specifically, in a condition where the information amount of the M weights is less than a given threshold, the information amount of the M weights includes, but is not limited to, an arithmetic mean, a geometric mean, and a maximum value of absolute values of the M weights. The arithmetic mean of the absolute values of the M weights is less than a first threshold; or the geometric mean of the absolute values of the M weights is less than a second threshold; or the maximum value of the absolute values of the M weights is less than a third threshold. For the selection of the first threshold, the second threshold, and the third threshold, those skilled in the art can preset the thresholds according to situations, or obtain the thresholds from computation by changing input parameters in a preset formula, or obtain the thresholds by machine learning. A manner of obtaining the first threshold, the second threshold, and the third threshold is not limited in the present disclosure.

In an optional implementation, the preset determination condition includes a function mapping determination condition, where the function mapping determination condition refers to determining whether the M weights satisfy the given condition after function transformation.

Further, the above neural network includes a fully connected layer, a convolution layer, and a long-short-term memory (LSTM) layer. The weights of the fully connected layer are a two-dimensional matrix (Nin, Nout), where Nin is the count of input neurons, Nout is the count of output neurons, and the fully connected layer has Nin*Nout weights; the weights of the convolution layer are a four-dimensional matrix (Nfin, Nfout, Kx, Ky), where Nfin is the count of input feature maps, Nfout is the count of output feature maps, (Kx, Ky) is the size of convolution kernels, and the convolution layer has Nfin*Nfout*Kx*Ky weights; and the weights of the LSTM layer are composed of weights of m fully connected layers, where m is an integer greater than 0, the weight of an $i^{th}$ fully connected layer is (Nin_i, Nout_i), where i is an integer greater than 0 and less than or equal to m, Nin_i represents the count of input neurons of the $i^{th}$ fully connected layer, and Nout_i is the count of output neurons of the $i^{th}$ fully connected layer.

When a coarse-grained pruning operation is performed on the weight of the fully connected layer, the size of the sliding window is Bin*Bout, where Bin is an integer greater than 0 and less than or equal to Nin, and Bout is an integer greater than 0 and less than or equal to Nout, the coarse-grained pruning unit is specifically configured to:

enable the sliding window to slide along a direction of Bin according to a stride Sin, or slide along in a direction of Bout according to a stride Sout, where Sin is a positive integer greater than 0 and less than or equal to Bin, and Sout is a positive integer greater than 0 and less than or equal to Bout; and select M values from the Nin*Nout weights through the sliding window, and when the M weights satisfy the preset condition, set all or part of the M weights to 0, where M=Bin*Bout; and a specific process is shown in FIG. 51A.

When the coarse-grain pruning operation is performed on the weight of the convolution layer, the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky, the coarse-grained pruning unit is specifically configured to:

enable the sliding window to slide along a direction of Bfin according to a stride Sfin, or slide along a direction of Bfout according to a stride Sfout, or slide along a direction of Bx according to a stride S, or slide along a direction of By according to a stride Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By; and select M weights from the Nfin*Nfout*Kx*Ky weights through the sliding window, and when the M weights satisfy the preset condition, set all or part of the M weights to 0, where M=Bfin*Bfout*Bx*By; and the specific process is shown in FIG. 52B.

When the coarse-grain pruning operation is performed on the weight of the LSTM layer, the size of the sliding window is Bin_i*Bout_i, where Bin_i is an integer greater than 0 and less than or equal to Nin_i, and Bout_i is greater than 0 and less than or equal to Nout_i, the coarse-grained pruning unit is specifically configured to:

enable the sliding window to slide along a direction of Bin_i according to a stride Sin_i, or slide along a direction of Bout_i according to a stride Sout_i, where Sin_i is a positive integer greater than 0 and less than or equal to Bin_i, and Sout_i is a positive integer greater than 0 and less than or equal to Bout_i; and select M weights from the Bin_i*Bout_i weights through the sliding window, and when the M weights satisfy the preset condition, set all or part of the M weights to 0, where M=Bin_i*Bout_i.

Further, the M weights are the weights included in the sliding window in the sliding process. The coarse-grained pruning unit setting all or part of the M weights to 0 include:

the coarse-grained pruning unit sets all weights (that is, the M weights) in the sliding window to 0, or sets the weights on a diagonal of the sliding window to 0, or sets part of the weights in the middle of the sliding window to 0, for instance, if the size of the sliding window is 5*5, the coarse-grained pruning unit sets the weights in a 3*3 area in the middle of the 5*5 sliding window to 0, or randomly selects at least one weight from the sliding window to set to 0. This operation contributes to the precision of subsequent training operations.

Further, the above coarse-grained pruning unit and the operation unit are configured to repetitively perform coarse-grained pruning on the neural network and train the neural network according to the pruned weights until no weights satisfy the above preset condition under the premise that precision does not suffer a loss of a preset amount.

The above preset amount of precision is x %, where x is a number greater than 0 and less than 100, and there may be different options of x according to different neural networks and different applications.

In a preferable example, a value range of x is 0-5.

Further, the above processing device further includes:

a quantization unit configured to, after the coarse-grained pruning unit performs coarse-grained pruning on the weights of the neural network and before the operation unit trains the neural network according to the pruned weights, quantize the weights of the neural network and/or perform a first operation on the weights of the neural network to reduce a count of bits of the weights.

In a feasible example, quantizing the weights of the neural network specifically includes replacing a weight W1 that satisfies a condition with a weight W0, where the condition is $|1-W0|\leq\nabla W$, and $\nabla W$ is a preset value.

The first operation may be reducing a value range of a data format corresponding to the weights or reducing a precision range of the data format corresponding to the weights.

Further, the above operation unit is specifically configured to:

retrain the above neural network according to the pruned weights by using a back propagation algorithm.

Specifically, the operation unit may be configured to execute a neural network backward training algorithm, receive a pruned neural network, and train the neural network by using the back propagation algorithm. The pruned weights during the training process remain 0. The operation unit sends the trained neural network to the coarse-grained pruning unit for further pruning operation, or directly outputs the trained neural network.

Specifically, the operation unit sequentially performs a backward computation on each layer of the neural network in a reverse order of a forward operation, and finally updates the weights by using gradients of weights obtained from the computation. The above process is a sequential iteration of training of a neural network, and the entire training process needs to be repeated for many times. The backward operation performed on each layer includes two operation parts: one part is to compute output neuron gradients with input neurons to obtain weight gradients, and the other part is to compute the output neuron gradients with weights to obtain the input neuron gradients (which are used as output neuron gradients of a next layer in the backward operation). After the backward operation of the neural network is performed, the weight gradients of each layer are obtained from the computation, and then the operation unit updates the weights according to the weight gradients.

It should be pointed out that during the process of training the neural network by the operation unit, the weights which are set to 0 remain 0.

In the examples of the present disclosure, the coarse-grained pruning unit of the processing device performs the coarse-grained pruning operation on the weights of the neural network to obtain pruned weights, and the operation unit retrains the neural network according to the pruned weights. Through the coarse-grain pruning operation performed on the weights of the neural network, the subsequent storage and access to values and the subsequent operation amount may be reduced, which may improve operating efficiency and reduce power consumption.

FIG. 51C is a schematic structural diagram of an acceleration device according to an example of the present disclosure. As shown in FIG. 51C, the acceleration device includes:

a storage unit configured to store input neurons, output neurons, weights, and instructions of a neural network; and a coarse-grained pruning unit configured to perform coarse-grained pruning on weights of the neural network to obtain pruned weights, and store the pruned weights and position information of target weights in the storage unit.

It should be noted that a specific process of performing the coarse-grained pruning operation on the weights of the neural network by the coarse-grained pruning unit will not be further described herein. For details, please refer to relevant descriptions of the example shown in FIG. 51.

The operation unit is configured to train the neural network according to the pruned weights.

The coarse-grained selection unit is configured to receive input neurons and position information of the target weights, and select the target weights and corresponding input neurons of the target weights.

The above target weights are weights whose absolute values are greater than a second preset threshold.

Further, the coarse-grained selection unit only selects the target weights and the corresponding neurons of the target weights to transfer to the operation unit.

The above operation unit is further configured to receive the input target weights and the corresponding neurons, complete the neural network operation through a multiply-add operation unit according to the target weights and the corresponding neurons to obtain output neurons, and retransfer the output neurons to the above storage unit.

The storage unit is further configured to store intermediate results generated in the process of the operation unit performing the neural network operation.

Further, the above acceleration device further includes:

an instruction control unit configured to receive the instructions and decode the instructions to generate control information, so as to control the coarse-grained selection unit to perform data selection, and control the operation unit to perform the operation.

Further, when the storage unit stores the weights, only the target weights and the position information of the target weights are stored.

It should be pointed out that the storage unit, the coarse-grained pruning unit, the instruction control unit, the coarse-grained selection unit, and operation unit are all physical hardware devices instead of functional software units.

FIG. 51D is a schematic structural diagram of another acceleration device according to an example of the present disclosure. As shown in FIG. 51D, the above acceleration device further includes: a pre-processing unit, a storage unit, a direct memory access (DMA) unit, an instruction caching unit, an instruction control unit, a coarse-grained pruning unit, a first caching unit, a second caching unit, a third caching unit, a coarse-grained selection unit, an operation unit, and a fourth caching unit.

The pre-processing unit is configured to pre-process original data and input pre-processed data into the storage unit, where the original data includes input neurons, output neurons, and weights, and the pre-processing includes data segmentation, Gaussian filtering, binarization, regularization, and/or normalization.

The storage unit is configured to store neurons, weights, and instructions of the neural network. When the storage unit stores the weights, only the target weights and the position information of the target weights are stored.

The DMA unit is configured to read and write data or instructions between the storage unit and the instruction caching unit, or the coarse-grained pruning unit, or the first caching unit, or the second caching unit, or the third caching unit, or the fourth caching unit.

The coarse-grained pruning unit is configured to obtain the weights of the neural network from the storage unit through the DMA unit, and then perform coarse-grain pruning on the weights of the neural network to obtain pruned weights. The coarse-grained pruning unit stores the pruned weights in the first caching unit.

It should be noted that a specific process of performing the coarse-grained pruning operation on the weights of the neural network by the coarse-grained pruning unit will not be further described herein. For details, please refer to relevant descriptions of the example shown in FIG. 51.

The instruction caching unit is configured to cache the instructions.

The first caching unit is configured to cache target weights, where the target weights are weights whose absolute values are greater than the second preset threshold.

The second caching unit is configured to cache position data of the target weights; and a target weight position caching unit maps each connection weight in the input data to a corresponding input neuron one to one.

Optionally, the one-to-one correspondence method used by the target weight position caching unit may include: using 1 to indicate there is a weight connection between an output neuron and an input neuron, using 0 to indicate there is no weight connection between an output neuron and an input neuron, and using a string of 0 and 1 formed by the connection state between each group of output neurons and all input neurons to indicate a connection relationship of the output neuron.

Optionally, the one-to-one correspondence method used by the target weight position caching unit may include: using 1 to indicate there is a weight connection between an input neuron and an output neuron, using 0 to indicate there is no weight connection between an input neuron and an output neuron, and using a string of 0 and 1 formed by the connection state between each group of input neurons and all output neurons to indicate a connection relationship of the input neuron.

Optionally, the one-to-one correspondence method used by the target weight position caching unit may include: using a distance from the location of an input neuron where first connection of a group of outputs is to a first input neuron, a distance from a second group of input neurons of the outputs to a previous input neuron, a distance from a third group of input neurons of the outputs to a previous input neuron . . . in a similar fashion, until all inputs of the outputs are exhausted, so as to represent connection relations of the outputs.

The third caching unit is configured to cache the input neurons input to the coarse-grained selection unit.

The fourth caching unit is configured to cache the output neuron output by the operation unit and the output neuron gradient obtained from the output neuron.

The instruction control unit is configured to receive instructions from the instructions caching unit, decode the instructions to generate control information, so as to control the operation unit to perform the operation.

The coarse-grained selection unit is configured to receive the input neurons and the position information of the target weights, and select input neurons that need to be operated according to the position information of the target weights. The coarse-grained selection unit only selects the input neurons corresponding to the target weights and transfers the same to the operation unit.

The operation unit is configured to operate the input neurons and the target weights according to the control information sent by the instruction control unit to obtain an output neuron, store the output neuron in the fourth caching unit, obtain an output neuron gradient according to the output neuron, and store the output neuron gradient in the fourth caching unit.

Specifically, the coarse-grained selection unit is configured to select the input neurons corresponding to the target weights from the input neurons input by the input neuron caching unit according to the position information of the target weights, and then transfer the target weights and the corresponding input neurons to the operation unit.

In an example, the operation unit may include a plurality of processing units, so as to implement a parallel computation to obtain different output neurons, and store obtained output neurons into the output neuron caching unit. Each of the plurality of processing units includes a local weight selector module configured to further process dynamic coarse-grained sparse data. The above coarse-grained selection unit is configured to process static sparsity by selecting required input neurons. For the specific working process of the coarse-grained selection unit, please refer to relevant descriptions of FIG. 51E.

Referring to FIG. 51E, firstly, the coarse-grained selection unit generates neuron indexes according to values of the input neurons, where each of the indexes indicates whether a corresponding neuron is useful ("0"). Secondly, the above coarse-grained selection unit combines a generated neuron index and the position information of a weight (that is, a weight index) by performing an And operation to obtain a neuron mark, where each bit of the neuron mark indicates whether to select the corresponding neuron. Thirdly, the coarse-grained numbering unit adds the each bit of the neuron mark to obtain an accumulated character string, and then performs an And operation on the accumulated character string and the neuron mark to generate a target character string for selecting the input neuron. Finally, the coarse-grained selection unit selects an actual input neuron by using the target character string for subsequent computation in the operation unit. At the same time, the coarse-grained selection unit generates an index character string according to the target character string and an accumulated character string of the weight index (that is, the position information of a weight), and transfers the index character string to the operation unit.

The above operation unit is mainly configured to process the dynamic sparsity and effectively execute all operations of the neural network. The neuron functional unit includes a plurality of processing units. As shown in FIG. 51F, each processing unit includes a weight buffer, a weight decoder module, a weight selector module, and a neuron functional unit of the processing unit. Each processing unit loads the weights from the local weight buffer. Since the weights are independent among different output neurons, the processing is independent from each other. The weight decoder module with a lookup table is placed next to the weight buffer to extract actual weights according to compressed values in a codebook and a dictionary which are used in local quantization.

As shown in FIG. 52A, the weight selector module receives the index character string and the weights from the weight decoder module to select weights that are useful for a computation to be performed by the neuron functional unit of the processing unit. As shown in FIG. 52B, the neuron functional unit of each processing unit is composed of a Tm multiplier, an adder tree, and a non-linear function module. The neuron functional unit maps a neural network to the processing unit by using a time-sharing method, in other words, each processing unit processes the output neuron in parallel, and M/Tm cycles are required for the computation of the output neuron that requires M multiplication operations because the processing unit can implement the Tm multiplication in one cycle. The neuron functional unit then collects and compiles output of all processing units for subsequent computations or storage in the output neuron caching unit.

The weight selector module selects required weights only when dynamic sparsification is considered, because the above weight buffer stores the weights compactly to achieve static sparsity. Referring to FIG. 52A, based on the index string of the neuron selector module which includes the position information of weights, the weights are further filtered so that weights required for computations are selected. Each processing unit works on different output neurons to generate different weights. Therefore, the weight selector module and weight buffer can be implemented inside the processing unit to avoid high bandwidth and delay.

It should be pointed out that the dynamic sparsification generally refers to input neuron sparsification, because values of input neurons vary with inputs. A main source for dynamic sparsification is an excitation function relu, because the operation of this function includes setting input neurons whose absolute values are less than a threshold to 0. The static sparsification generally refers to weight sparsification, because a topology is no longer changed after the weights are pruned.

The above instruction caching unit, the input neuron caching unit, the target weight caching unit, the target weight position caching unit, and the output neuron caching unit are all on-chip caches.

Specifically, the operation unit includes, but is not limited to, three parts: a first part: a multiplier; a second part: an adder tree; and a third part: an activation function unit. The first part multiplies first input data (in1) and second input data (in2) to obtain an output (out1), and the process can be represented as: out1=in1*in2. The second part accumulates third input data (in3) through the adder tree level by level to obtain second output data (out2), where in3 is a vector with a length being N and N is greater than 1, and the process can be represented as: out2=in3 [1]+in3 [2]+ . . . +in3 [N]; and/or the second part accumulates the third input data (in3) through the adder tree and then adds fourth input data (in4) to obtain the second output data (out2), and the process can be represented as: out2=in3 [1]+in3 [2]+ . . . +in3 [N]+in4; or the second part adds the third input data (in3) and the fourth input data (in4) to obtain the second output data (out2), and the process can be represented as: out2=in3+in4. The third part performs an activation function (active) operation on fifth input data (in5) to obtain activation output data (out3), and the process can be represented as: out3=active (in5). The activation function (active) may be sigmoid, tan h, relu, softmax, etc. In addition to performing the activation operation, the third part may realize other non-linear functions, for instance, may perform an operation (f) on input data (in) to obtain output data (out), and the process can be represented as: out=f (in).

Further, the operation unit may further include a pooling unit configured to perform a pooling operation on the input data (in) to obtain the output data (out), and the process can be represented as: out=pool (in), where pool refers to the pooling operation. The pooling operation includes, but is not limited to, average pooling, maximum pooling, and median pooling. The input data (in) is data in a pooling core related to the output (out).

The operation performed by the operation unit includes several parts: the first part includes multiplying the first input data and the second input data to obtain output data; the second part includes performing an adder tree operation, which specifically includes accumulating the third input data through the adder tree level by level, or adding the third input data and the fourth input data to obtain output data; and the third part includes performing an activation function operation, which specifically includes performing the active function (active) operation on the fifth input data to obtain output data. The operations of the above parts can be freely combined to achieve various functions.

It should be noted that the pre-processing unit, the storage unit, the DMA unit, the coarse-grained pruning unit, the instruction caching unit, the instruction control unit, the first caching unit, the second caching unit, the third caching unit, the fourth caching unit, the coarse-grained selection unit, and the operation unit are physical hardware devices instead of functional software units.

FIG. 52C is a schematic structural diagram of another acceleration device according to an example of the present disclosure. As shown in FIG. 52C, the acceleration device includes: a pre-processing unit, a storage unit, a direct memory access (DMA) unit, an instruction caching unit, an instruction control unit, a coarse-grained pruning unit, a target weight caching unit, a target weight position caching unit, an input neuron caching unit, a coarse-grained selection unit, an operation unit, an output neuron caching unit, and an output neuron gradient caching unit.

The pre-processing unit is configured to pre-process original data and input pre-processed data into the storage unit, where the original data includes input neurons, output neurons, and weights, and the pre-processing includes data segmentation, Gaussian filtering, binarization, regularization, and/or normalization.

The storage unit is configured to store neurons, weights, and instructions of the neural network. When the storage unit stores the weights, only the target weights and position information of the target weights are stored.

The DMA unit is configured to read and write data or instructions between the storage unit and the instruction caching unit, or the coarse-grained pruning unit, or the target weight caching unit, or the target weight position caching unit, or the input neuron caching unit, or the output neuron caching unit.

The coarse-grained pruning unit is configured to obtain the weights of the neural network from the storage unit through the DMA unit, and then perform coarse-grain pruning on the weights of the neural network to obtain pruned weights. The coarse-grained pruning unit stores the pruned weights in the target weight caching unit.

It should be noted that a specific process of performing the coarse-grained pruning operation on the weights of the neural network by the coarse-grained pruning unit will not be further described herein. For details, please refer to relevant descriptions of the example shown in FIG. 51.

The instruction caching unit is configured to cache the instructions.

The target weight caching unit is configured to cache the target weights.

The target weight position caching unit is configured to cache position data of the target weights, and map each connection weight in the input data to a corresponding input neuron one to one.

Optionally, the one-to-one correspondence method used by the target weight position caching unit may include: using 1 to indicate there is a weight connection between the output neuron and the input neuron, using 0 to indicate there is no weight connection between the output neuron and the input neuron, and using a string of 0 and 1 formed by the connection state between each group of output neurons and all input neurons to indicate a connection relationship of the output neuron.

Optionally, the one-to-one correspondence method used by the target weight position caching unit may include: using 1 to indicate there is a weight connection between the input neuron and the output neuron, using 0 to indicate there is no weight connection between the input neuron and the output neuron, and using a string of 0 and 1 formed by the connection state between each group of input neurons and all output neurons to indicate a connection relationship of the input neuron.

Optionally, the one-to-one correspondence method used by the target weight position caching unit may include: using a distance from the location of an input neuron where first connection of a group of outputs is to a first input neuron, a distance from a second group of input neurons of the outputs to a previous input neuron, a distance from a third group of input neurons of the outputs to a previous input neuron . . . in a similar fashion, until all inputs of the outputs are exhausted, so as to represent connection relations of the outputs.

The input neuron caching unit is configured to cache the input neurons input to the coarse-grained selection unit.

The output neuron caching unit is configured to cache the output neuron output by the operation unit.

The output neuron gradient caching unit is configured to cache a gradient of the output neuron.

The instruction control unit is configured to receive instructions from the instructions caching unit, decode the instructions to generate control information, so as to control the operation unit to perform the operation.

The coarse-grained selection unit is configured to receive the input neurons and the position information of the target weights, and select input neurons that need to be operated according to the position information of the target weights. The coarse-grained selection unit only selects the input neurons corresponding to the target weights and transfers the same to the operation unit.

The operation unit is configured to perform the operation according to the target weights and the corresponding input neurons obtained in the target weight caching unit to obtain output neurons, and store the output neurons in the output neuron caching unit.

The operation unit is further configured to train the neural network according to the output neuron gradient and the pruned weights.

It should be noted that functions of each unit of the acceleration device will not be further described herein. For details, please refer to relevant descriptions of the example shown in FIG. 51D.

It should be pointed out that the pre-processing unit, the storage unit, the DMA unit, the instruction caching unit, the instruction control unit, the coarse-grained pruning unit, the target weight caching unit, the target weight position caching unit, the input neuron caching unit, the output neuron gradient caching unit, the output neuron caching unit, the coarse-grained selection unit, and the operation unit are all physical hardware devices instead of functional software units.

FIG. 52D is a schematic structural diagram of another acceleration device according to an example of the present disclosure. As shown in FIG. 52D, the acceleration device includes:

a pre-processing unit, a storage unit, a direct memory access (DMA) unit, an instruction caching unit, an instruction control unit, a coarse-grained pruning unit, a target weight caching unit, a target weight position caching unit, an input neuron caching unit, a coarse-grained selection unit, an operation unit, and an output neuron caching unit.

The pre-processing unit is configured to pre-process original data and input pre-processed data into the storage unit, where the original data includes input neurons, output neurons, and weights, and the pre-processing includes data segmentation, Gaussian filtering, binarization, regularization, and/or normalization.

The storage unit is configured to store neurons, weights, and instructions of the neural network. When the storage unit stores the weights, only the target weights and position information of the target weights are stored.

The DMA unit is configured to read and write data or instructions between the storage unit and the instruction caching unit, or the coarse-grained pruning unit, or the target weight caching unit, or the target weight position caching unit, or the input neuron caching unit, or the output neuron caching unit.

The coarse-grained pruning unit is configured to obtain the weights of the neural network from the storage unit through the DMA unit, and then perform coarse-grain pruning on the weights of the neural network to obtain pruned weights. The coarse-grained pruning unit stores the pruned weights in the target weight caching unit.

It should be noted that a specific process of performing the coarse-grained pruning operation on the weights of the neural network by the coarse-grained pruning unit will not be further described herein. For details, please refer to relevant descriptions of the example shown in FIG. 51.

The instruction caching unit is configured to cache the instructions.

The target weight caching unit is configured to cache the target weights.

The target weight position caching unit is configured to cache position data of the target weights, and map each connection weight in the input data to a corresponding input neuron one to one.

Optionally, the one-to-one correspondence method used by the target weight position caching unit may include: using 1 to indicate there is a weight connection between the output neuron and the input neuron, using 0 to indicate there is no weight connection between the output neuron and the input neuron, and using a string of 0 and 1 formed by the connection state between each group of output neurons and all input neurons to indicate a connection relationship of the output neuron.

Optionally, the one-to-one correspondence method used by the target weight position caching unit may include: using 1 to indicate there is a weight connection between the input neuron and the output neuron, using 0 to indicate there is no weight connection between the input neuron and the output neuron, and using a string of 0 and 1 formed by the connection state between each group of input neurons and all output neurons to indicate a connection relationship of the input neuron.

Optionally, the one-to-one correspondence method used by the target weight position caching unit may include: using a distance from the location of an input neuron where first connection of a group of outputs is to a first input neuron, a distance from a second group of input neurons of the outputs to a previous input neuron, a distance from a third group of input neurons of the outputs to a previous input neuron . . . in a similar fashion, until all inputs of the outputs are exhausted, so as to represent connection relations of the outputs. The input neuron caching unit is configured to cache the input neurons input to the coarse-grained selection unit.

The output neuron caching unit is configured to cache the output neuron output by the operation unit.

The output neuron gradient caching unit is configured to cache a gradient of the output neuron.

The instruction control unit is configured to receive instructions from the instructions caching unit, decode the instructions to generate control information, so as to control the operation unit to perform the operation.

The coarse-grained selection unit is configured to receive the input neurons and the position information of the target weights, and select input neurons that need to be operated according to the position information of the target weights. The coarse-grained selection unit only selects the input neurons corresponding to the target weights and transfers the same to the operation unit.

The operation unit is configured to perform the operation according to the target weights and the corresponding input neurons obtained in the target weight caching unit to obtain output neurons, and store the output neurons in the output neuron caching unit.

It should be noted that functions of each unit of the acceleration device will not be further described herein. For details, please refer to relevant descriptions of the example shown in FIG. 51D.

It should be pointed out that the pre-processing unit, the storage unit, the DMA unit, the instruction caching unit, the instruction control unit, the coarse-grained pruning unit, the target weight caching unit, the target weight position caching unit, the input neuron caching unit, the output neuron caching unit, the output neuron gradient caching unit, the coarse-grained selection unit, and the operation unit are all physical hardware devices instead of functional software units.

An example of the neural network processor is listed below to specifically describe a processing method of the present disclosure, but the example should not be considered as limiting the present disclosure. Any equivalent structure or equivalent process transformation made by using the specific examples, or direct or indirect applications of the examples in other related technical fields shall fall within the protection scope of the present disclosure.

FIG. 52E is a schematic diagram of a specific example of a processing method according to an example of the present disclosure. FIG. 52E illustrates a result of a coarse-grained pruning operation performed on a fully connected layer of a neural network. The fully connected layer has a total of eight input neurons n1~n8 and three output neurons o1~o3. The weights between the four input neurons n3, n4, n7, and n8 and the three output neurons o1, o2, and o3 are set to 0 by coarse-grained sparsification; n1 is connected to o1, o2, and o3 by the three weights s11, s12, and s13; n2 is connected to o1, o2 and o3 by the three weights s21, s22, and s23; n5 is connected to o1, o2 and o3 by the three weights s31, s32 and s33; n6 is connected to o1, o2, and o3 by the three weights s41, s42, and s43; and a bit string 11001100 is used to represent a connection relationship between the input neurons and the output neurons (which can also be viewed as position information of target weights), where 1 indicates that the input neuron is connected to all three output neurons and 0 indicates that no output neurons are connected to the three input neurons. Table 1 describes information of the neurons and weights in the example, and Formula 1 describes operation formulas of the three output neurons o1, o2, and o3. It can be seen from Formula 1 that o1, o2, and o3 receive identical neurons for the operation.

Fine-grained pruning includes regarding each weight as an independent individual, and pruning a certain weight that meets a condition; and coarse-grained pruning includes grouping the weights in a certain way, where each group includes a plurality of weights, and if a group of weights meets a condition, pruning the whole group of weights.

TABLE 1

| Input | Output Neuron | | | Position of |
|---|---|---|---|---|
| Neuron | o1 | o2 | o3 | Target Weight |
| n1 | s11 | s21 | s31 | 1 |
| n2 | s12 | s22 | s32 | 1 |
| n3 | 0 | 0 | 0 | 0 |
| n4 | 0 | 0 | 0 | 0 |
| n5 | s13 | s23 | s33 | 1 |
| n6 | s14 | s24 | s34 | 1 |
| n7 | 0 | 0 | 0 | 0 |
| n8 | 0 | 0 | 0 | 0 |

Formula 1—Operation Formulas of Output Neurons $$o1=n1*s11+n2*s12+n5*s13+n6*s14$$

$$o2=n1*s21+n2*s22+n5*s23+n6*s24$$

$$o3=n1*s31+n2*s32+n5*s33+n6*s34$$

When the processing device performs an operation, the eight input neurons, the twelve weights, the 8-bit position information, and corresponding instructions are sent to the storage unit. The coarse-grained selection unit receives the eight input neurons and target weight positions, and selects four neurons n1, n2, n5, and n6 that need to be involved in the operation. The operation unit receives four selected neurons and weights, completes the operation of output neurons through Formula 1, and then transfers the output neurons back to a storage part.

In some examples of the present disclosure, an acceleration device is disclosed. The device includes: a memory configured to store executable instructions; and a processor configured to execute the executable instructions in the storage unit according to the above processing method.

The processor may be a single processing unit, or may include two or more processing units. In addition, the processor may also include a general-purpose processor (CPU), or a graphics processor (GPU), or a field-programmable logical gate array (FPGA), or an application-dedicated integrated circuit (ASIC) to set up and operate a neural network. The processor may also include an on-chip memory for caching (including a memory in the processing device).

This present disclosure also discloses a neural network computation device which includes one or more acceleration devices or processing devices mentioned in this present disclosure. The neural network computation device is configured to obtain data to be operated and control information from other processing devices, and execute a specified neural network operation and/or training, and transfer an execution result to peripheral equipment through an I/O interface. The peripheral equipment includes, for instance, a camera, a monitor, a mouse, a keyboard, a network card, a wifi interface, and a server. When more than one computation device is included, the computation devices can interconnect and transfer data through a specific structure such as a PCIE bus to support a larger-scale neural network operations and/or training. In this case, the computation devices may share a same control system or have separate control systems; and a memory may be shared, or each accelerator has its own memory. In addition, the interconnection method can be any interconnection topology.

The neural network computation device has high compatibility, and can be connected to various types of servers through the PCIE interface.

The present disclosure also discloses a combined processing device which includes the neural network computation device, a universal interconnection interface, and other processing devices. The neural network computation device interacts with other processing devices to complete operations specified by users. FIG. 53A is a schematic diagram of the combined processing device.

Other processing devices include one or more types of general-purpose/special-purpose processors such as a central processor CPU, a graphics processor GPU, a neural network processor, and the like. The count of processors included in other processing devices is not limited. Other processing devices are used as the interface between the neural network computation device and external data and control, and are configured to complete basic control of starting, stopping, data movement of the neural network computation device. Other processing devices can also cooperate with the neural network computation device to complete the operating tasks.

The universal interconnection interface is configured to send data and control instructions between the neural network computation device and other processing devices. The neural network computation device obtains required input data from other processing devices and writes the required input data to an on-chip storage device of the neural network computation device; or obtains the control instructions from other processing devices and writes the control instructions to an on-chip cache of the neural network computation device; or reads data in the storage module of the neural network computation device and transfers the data to other processing devices.

Optionally, as shown in FIG. 53B, the structure may further include a storage device connected to the neural network computation device and the other processing devices respectively. The storage device is configured to store data stored in the neural network computation device and the other processing devices, and is particularly suitable for storing data that needs to be operated and cannot be wholly stored in an internal storage of the neural network computation device or other processing devices.

The combined processing device can be used as an SOC on-chip system for a mobile phone, a robot, a drone, video surveillance equipment, etc., which may effectively reduces a core area of a control part, increase processing speed, and reduce overall power consumption. In this case, the universal interconnection interface of the combined processing device is connected to some components of the device, where components include, for instance, a camera, a monitor, a mouse, a keyboard, a network card, and a wifi interface.

In some examples, a neural network processor is disclosed, which includes the neural network computation device or the combined processing device.

In some examples, a chip is disclosed, which includes the neural network processor.

In some examples, a chip package structure is disclosed, which includes the above chip.

In some examples, a board card is disclosed, which includes the above chip package structure.

In some examples, an electronic device is disclosed, which includes the above board card.

FIG. 53C is a schematic structural diagram of a board card of a neural network processor according to an example of the present disclosure. As shown in FIG. 53C, the board card of the neural network processor includes the chip package structure, a first 1, and a first substrate.

A specific structure of the chip package structure is not limited in the present disclosure. Optionally, as shown in FIG. 53D, the above chip package structure includes: a chip, a second electrical and non-electrical connection device, and a second substrate.

A specific form of the chip involved is not limited in the present disclosure. The above chip includes, but is not limited to, a neural network chip which integrates neural network processors. The above chip may be made of silicon materials, germanium materials, quantum materials, molecular material, etc. According to actual situations (such as harsh environment) and different application requirements, the above neural network chip may be packaged so as to cover most of the neural network chip, and pins on the neural network chip are connected to an outside of the package structure through conductors such as gold wire for circuit connection with an outer layer.

The second substrate of the present disclosure is configured to carry the neural network chip, and the neural network chip package structure obtained by connecting the neural network chip and the second substrate through the second electrical and non-electrical connection device is configured to protect the chip, so as to facilitate further packaging of the neural network chip package structure and the first substrate.

Specific packaging modes and corresponding structure of the second electrical and non-electrical connection device are not limited hereto. According to actual situations and different application requirements, appropriate packaging modes can be selected and simply improved, such as a Flip Chip Ball Grid Array Package (FCBGAP), a Low-profile Quad Flat Package (LQFP), a Quad Flat Package with Heat sink (HQFP), a Quad Flat Non-lead Package (QFN), a Fine-pitch Ball Grid Package (FBGA), or other packaging methods.

The Flip Chip may be suitable for cases where a requirement on the area after packaging is high or inductance of a conductive wire and transmission time of a signal are sensitive. In addition, the packaging mode of Wire Bonding may be adopted to reduce the cost and increase flexibility of the package structure.

The Ball Grid Array may provide more pins, and conductive wires of the pins are short on average, which has a function of transmitting signals at high speed, where a Pin Grid Array (PGA), a 0 Insertion Force (ZIF), a Single Edge Contact Connection (SECC), a Land Grid Array (LGA), and other package method may be adopted.

Optionally, the packaging mode of Flip Chip Ball Grid Array may be adopted to package the neural network chip and the second substrate. FIG. 53E is a schematic diagram of a neural network chip package structure. As shown in FIG. 53E, the chip package structure includes a neural network chip 21, a pad 22, a bump 23, a second substrate 24, a connection point 25 on the second substrate 24, and a pin 26.

The pad 22 is connected to the neural network chip 21, and the bump 23 is formed by welding between the pad 22 and the connection point 25 on the second substrate 24 to connect the neural network chip 21 and the second substrate 24, thereby realizing the package of chip 21.

The pin 26 may be configured to connect with an external circuit of the package structure (such as the first substrate on the board card) to transfer external data and internal data, which may facilitate the chip 21 or the processor processing corresponding to the chip 21 processing data. The type and count of pins are not limited in the present disclosure. Different types of pins can be selected according to different packaging technologies, and are arranged according to certain rules.

Optionally, the neural network chip package structure may further include an insulating filler disposed in a gap between the pad 22, the bump 23, and the connection point 25 to prevent interference between bumps. The material of the insulating filler may be silicon nitride, silicon oxide, or silicon oxynitride; and the interference may include electromagnetic interference, inductance interference, and the like.

Optionally, the neural network chip package structure may further include a heat dissipation device configured to dissipate heat generated by the neural network chip 21, where the heat dissipation device may be a piece of metal with good thermal conductivity, a fin, or a radiator such as a fan.

For instance, as shown in FIG. 53F, the chip package structure may include the neural network chip 21, the pad 22, the bump 23, the second substrate 24, the connection point 25 on the second substrate 24, the pin 26, an insulating filler 27, thermal grease 28, and a fin 29 with metal housing, where the thermal grease 28 and the fin 29 with metal housing are configured to dissipate the heat generated by the neural network chip 21.

Optionally, the chip package structure may further include a reinforcing structure, which is connected to the pad 22 and is buried in the bump 23 to enhance the connection strength between the bump 23 and the pad 22. The reinforcing structure may be a metal wire structure or a columnar structure, which is not limited hereto.

The specific form of the first electrical and non-electrical device is not limited in the present disclosure. Please refer to the description of the second electrical and non-electrical device, that is, the chip package structure may be packaged by welding, or by connecting the second substrate and the first substrate through a connecting line or an inserting method, so as to subsequently replace the first substrate or the chip package structure.

Optionally, the first substrate may include a memory unit interface configured to extend a storage capacity, for instance, a Synchronous Dynamic Random Access Memory (SDRAM), and a Double Date Rate (DDR) SDRAM, and the like. By extending the memory, the processing capacity of the neural network processor may be improved.

The first substrate may further include a Peripheral Component Interconnect-Express (PCI-E or PCIe) interface, a Small Form-factor Pluggable (SFP) interface, and an Ethernet interface, a Controller Area Network (CAN) interface, etc. for data transfer between the package structure and an external circuit, which may improve operating speed and convenience of operation.

In the present disclosure, functions of the neural network processor are implemented and the chip is protected by packaging the neural network processor as the chip, packaging the chip as the chip package structure, packaging the chip package structure as the board card, and performing data interaction between an interface (a slot or a ferrule) on the board card and the external circuit (such as a computer motherboard), in other words, by directly using the board card, of the neural network processor. Other modules may be added to the board card, which may increase the application scope and operating efficiency of the neural network processor.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance, and/or medical equipment.

The transportation means may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner, and/or an electrocardiograph.

FIG. 54 is a flowchart of a processing method according to an example of the present disclosure. The processing method is used for sparsification of a neural network. As shown in FIG. 54, the processing method includes:

a step S1801, selecting, by a processing device, M weights from a neural network through a sliding window, where M is an integer greater than 1.

The above neural network includes a fully connected layer, a convolution layer convolution layer, and a long-short-term memory (LSTM) layer.

The process of selecting M weights from the fully connected layer of the neural network includes:

when the weight of the fully connected layer is a two-dimensional matrix (Nin, Nout) as shown in FIG. 51A, where Nin is the count of input neurons, Nout is the count of output neurons, and the fully connected layer has Nin*Nout weights; and when a size of the sliding window is Bin*Bout, where Bin is an integer greater than 0 and less than or equal to Nin, and Bout is an integer greater than 0 and less than or equal to Nout, enabling the sliding window to slide along a direction of Bin according to a stride Sin, or slide along in a direction of Bout according to a stride Sout, where Sin is a positive integer greater than 0 and less than or equal to Bin, and Sout is a positive integer greater than 0 and less than or equal to Bout; and selecting M values from the Nin*Nout weights through the sliding window, where M=Bin*Bout.

The process of selecting M weights from the convolution layer convolution layer of the neural network includes:

when the weight of the convolution layer convolution layer is a four-dimensional matrix (Nfin, Nfout, Kx, Ky) as shown in FIG. 51B, where Nfin is the count of input feature maps, Nfout is the count of output feature maps, (Kx, Ky) is the size of convolution kernels, and the convolution layer convolution layer has Nfin*Nfout*Kx*Ky weights; and when the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky, enabling the sliding window to slide along a direction of Bfin according to a stride Sfin, or slide along a direction of Bfout according to a stride Sfout, or slide along a direction of Bx according to a stride S, or slide along a direction of By according to a stride Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By; and selecting M weights from the Nfin*Nfout*Kx*Ky weights through the sliding window, where M=Bfin*Bfout*Bx*By.

The process of selecting M weights from the LSTM layer of the neural network includes:

when the weight of the LSTM layer is composed of weights of m fully connected layers, where m is an integer greater than 0, the weight of an $i^{th}$ fully connected layer is (Nin Nout_i), i is an integer greater than 0 and less than or equal to m, Nin_i represents the count of input neurons of the $i^{th}$ fully connected layer, and Nout_i is the count of output neurons of the $i^{th}$ fully connected layer; and when the size of the sliding window is Bin_i*Bout_i, where Bin_i is an integer greater than 0 and less than or equal to Nin_i, and Bout_i is greater than 0 and less than or equal to Nout enabling the sliding window to slide along a direction of Bin_i according to a stride Sin_i, or slide along a direction of Bout_i according to a stride Sout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window, where M=Bin_i*Bout_i.

The processing method further includes:

a step S1802, when the M weights satisfy a preset condition, setting, by the processing device, all or part of the M weights to 0 to obtain pruned weights.

The preset condition is that the information amount of the M weights satisfies a preset determination condition.

In an optional implementation, the preset determination condition includes a threshold determination condition, where the threshold determination condition may include one or more of: less than a given threshold, less than or equal to a given threshold, greater than a given threshold, greater than or equal to a given threshold, within a range of given values, or out of a range of given values.

Specifically, in a condition where the information amount of the M weights is less than a given threshold, the information amount of the M weights includes, but is not limited to, an arithmetic mean, a geometric mean, and a maximum value of absolute values of the M weights. The arithmetic mean of the absolute values of the M weights is less than a first threshold; or the geometric mean of the absolute values of the M weights is less than a second threshold; or the maximum value of the absolute values of the M weights is less than a third threshold. For the selection of the first threshold, the second threshold, and the third threshold, those skilled in the art can preset the threshold according to situations, or obtain the threshold from computation by changing input parameters in a preset formula, or obtain the threshold by machine learning. A manner of obtaining the first threshold, the second threshold, and the third threshold is not limited in the present disclosure.

In an optional implementation, the preset determination condition includes a function mapping determination condition, where the function mapping determination condition refers to determining whether the M weights satisfy the given condition after function transformation.

It should be pointed out that the step S1801 and the step S1802 can be regarded as performing coarse-grained pruning on the neural network by the processing device until no weights satisfy the above preset condition under the premise that precision does not suffer a loss of a preset amount.

Further, the processing device is configured to repetitively perform coarse-grained pruning on the neural network and train the neural network according to the pruned weights.

The above preset amount of precision is x %, where x is a number greater than 0 and less than 5.

The processing method further includes:

a step S1803, training, by the processing device, the neural network according to the pruned weights, which specifically includes retraining, by the processing device, the above neural network according to the pruned weights by using a back propagation algorithm.

Optionally, a step between performing coarse-grained pruning on the neural network and training the neural network includes:

quantizing and/or reducing, by the processing device, a count of bits of the weights.

It should be noted that in the process of the processing device training the neural network, the weights that are set to 0 remain 0.

It should be understood that the devices and the methods disclosed may be implemented in other manners. For instance, the described device examples are merely illustrative; for instance, the modules and the units are all set to be hardware configured to implement certain functions, the division of the functions is only a logical function division and the functions can be divided in other manners during actual implementations; for instance, a plurality of units or components may be combined or integrated into another system, or some features may be ignored, or not executed.

Through the examples of the present disclosure, a processing method of coarse-grained sparsification of a neural network and a corresponding processing device, as well as a chip, a chip package structure, a board card, and an electronic device are provided. The processing method of coarse-grained sparsification may enable the sparsification of the neural network to be more regular, which facilitates acceleration by hardware and simultaneously reduces the storage space of the target weight position. The neural network processor can fully exploit characteristics of coarse-grained sparsification, reduce memory access and operation amount, so as to obtain an acceleration ratio and reduce energy consumption.

In the examples of the present disclosure, the target weights are weights whose absolute values are greater than the second preset threshold.

FIG. 54 is a flowchart of a processing method according to an example of the present disclosure. The processing method is used for sparsification of a neural network. As shown in FIG. 54, the processing method includes:

a step S1801, selecting, by a processing device, M weights from a neural network through a sliding window, where M is an integer greater than 1.

The above neural network includes a fully connected layer, a convolution layer, and a long-short-term memory (LSTM) layer.

The process of selecting M weights from the fully connected layer of the neural network includes:

when the weight of the fully connected layer is a two-dimensional matrix (Nin, Nout) as shown in FIG. 51A, where Nin is the count of input neurons, Nout is the count of output neurons, and the fully connected layer has Nin*Nout weights; and when a size of the sliding window is Bin*Bout, where Bin is an integer greater than 0 and less than or equal to Nin, and Bout is an integer greater than 0 and less than or equal to Nout, enabling the sliding window to slide along a direction of Bin according to a stride Sin, or slide along in a direction of Bout according to a stride Sout, where Sin is a positive integer greater than 0 and less than or equal to Bin, and Sout is a positive integer greater than 0 and less than or equal to Bout; and selecting M values from the Nin*Nout weights through the sliding window, where M=Bin*Bout.

The process of selecting M weights from the convolution layer convolution layer of the neural network includes:

when the weight of the convolution layer convolution layer is a four-dimensional matrix (Nfin, Nfout, Kx, Ky) as shown in FIG. 51B, where Nfin is the count of input feature maps, Nfout is the count of output feature maps, (Kx, Ky) is the size of convolution kernels, and the convolution layer convolution layer has Nfin*Nfout*Kx*Ky weights; and when the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky, enabling the sliding window to slide along a direction of Bfin according to a stride Sfin, or slide along a direction of Bfout according to a stride Sfout, or slide along a direction of Bx according to a stride S, or slide along a direction of By according to a stride Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By; and selecting M weights from the Nfin*Nfout*Kx*Ky weights through the sliding window, where M=Bfin*Bfout*Bx*By.

The process of selecting M weights from the LSTM layer of the neural network includes:

when the weight of the LSTM layer is composed of weights of m fully connected layers, where m is an integer greater than 0, the weight of an $i^{th}$ fully connected layer is (Nin Nout_i), i is an integer greater than 0 and less than or equal to m, Nin_i represents the count of input neurons of the $i^{th}$ fully connected layer, and Nout_i is the count of output neurons of the $i^{th}$ fully connected layer; and when the size of the sliding window is Bin_i*Bout_i, where Bin_i is an integer greater than 0 and less than or equal to Nin_i, and Bout_i is greater than 0 and less than or equal to Nout enabling the sliding window to slide along a direction of Bin_i according to a stride Sin_i, or slide along a direction of Bout_i according to a stride Sout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window, where M=Bin_i*Bout_i.

The processing method further includes:

a step S1802, when the M weights satisfy a preset condition, setting, by the processing device, all or part of the M weights to 0 to obtain pruned weights.

The preset condition is that the information amount of the M weights satisfies a preset determination condition.

In an optional implementation, the preset determination condition includes a threshold determination condition, where the threshold determination condition may include one or more of: less than a given threshold, less than or equal to a given threshold, greater than a given threshold, greater than or equal to a given threshold, within a range of given values, or out of a range of given values.

Specifically, in a condition where the information amount of the M weights is less than a given threshold, the information amount of the M weights includes, but is not limited to, an arithmetic mean, a geometric mean, and a maximum value of absolute values of the M weights. The arithmetic mean of the absolute values of the M weights is less than a first threshold; or the geometric mean of the absolute values of the M weights is less than a second threshold; or the maximum value of the absolute values of the M weights is less than a third threshold. For the selection of the first threshold, the second threshold, and the third threshold, those skilled in the art can preset the threshold according to situations, or obtain the threshold from computation by changing input parameters in a preset formula, or obtain the threshold by machine learning. A manner of obtaining the first threshold, the second threshold, and the third threshold is not limited in the present disclosure.

In an optional implementation, the preset determination condition includes a function mapping determination condition, where the function mapping determination condition refers to determining whether the M weights satisfy the given condition after function transformation.

It should be pointed out that the step S1801 and the step S1802 can be regarded as performing coarse-grained pruning on the neural network by the processing device until no weights satisfy the above preset condition under the premise that precision does not suffer a loss of a preset amount.

Further, the processing device is configured to repetitively perform coarse-grained pruning on the neural network and train the neural network according to the pruned weights. The above preset amount of precision is x %, where x is a number greater than 0 and less than 5.

The processing method further includes:

a step S1803, training, by the processing device, the neural network according to the pruned weights, which specifically includes retraining, by the processing device, the above neural network according to the pruned weights by using a back propagation algorithm.

Further, the processing device performs the operation on a trained neural network and an output neuron obtained from operation is stored into the processing device.

FIG. 51 is a schematic structural diagram of a processing device which includes a coarse-grained pruning unit and an operation unit according to an example of the present disclosure. The processing device includes:

the coarse-grained pruning unit configured to perform coarse-grained pruning on weights of a neural network to obtain pruned weights, where the target weights are weights whose absolute values are greater than a preset threshold.

Specifically, the coarse-grained pruning unit is specifically configured to:

select M weights from the weights of the neural network through a sliding window, where M is an integer greater than 1; and when the M weights satisfy a preset condition, set all or part of the M weights to 0.

The preset condition is that an information amount of the M weights satisfies a preset determination condition.

In an optional implementation, the preset determination condition includes a threshold determination condition, where the threshold determination condition may include one or more of: less than a given threshold, less than or equal to a given threshold, greater than a given threshold, greater than or equal to a given threshold, within a range of given values, or out of a range of given values.

Specifically, in a condition where the information amount of the M weights is less than a given threshold, the information amount of the M weights includes, but is not limited to, an arithmetic mean, a geometric mean, and a maximum value of absolute values of the M weights. The arithmetic mean of the absolute values of the M weights is less than a first threshold; or the geometric mean of the absolute values of the M weights is less than a second threshold; or the maximum value of the absolute values of the M weights is less than a third threshold. For the selection of the first threshold, the second threshold, and the third threshold, those skilled in the art can preset the threshold according to situations, or obtain the threshold from computation by changing input parameters in a preset formula, or obtain the threshold by machine learning. A manner of obtaining the first threshold, the second threshold, and the third threshold is not limited in the present disclosure.

In an optional implementation, the preset determination condition includes a function mapping determination condition, where the function mapping determination condition refers to determining whether the M weights satisfy the given condition after function transformation.

Further, the above neural network includes a fully connected layer, a convolution layer convolution layer, and a long-short-term memory (LSTM) layer. The weights of the fully connected layer are a two-dimensional matrix (Nin, Nout), where Nin is the count of input neurons, Nout is the count of output neurons, and the fully connected layer has Nin*Nout weights; the weights of the convolution layer are a four-dimensional matrix (Nfin, Nfout, Kx, Ky), where Nfin is the count of input feature maps, Nfout is the count of output feature maps, (Kx, Ky) is the size of convolution kernels, and the convolution layer has Nfin*Nfout*Kx*Ky weights; and the weights of the LSTM layer are composed of weights of m fully connected layers, where m is an integer greater than 0, the weight of an $i^{th}$ fully connected layer is (Nin_i, Nout_i), where i is an integer greater than 0 and less than or equal to m, Nin_i represents the count of input neurons of the $i^{th}$ fully connected layer, and Nout_i is the count of output neurons of the $i^{th}$ fully connected layer.

When a coarse-grained pruning operation is performed on the weight of the fully connected layer, the size of the sliding window is Bin*Bout, where Bin is an integer greater than 0 and less than or equal to Nin, and Bout is an integer greater than 0 and less than or equal to Nout, the coarse-grained pruning unit is specifically configured to:

enable the sliding window to slide along a direction of Bin according to a stride Sin, or slide along in a direction of Bout according to a stride Sout, where Sin is a positive integer greater than 0 and less than or equal to Bin, and Sout is a positive integer greater than 0 and less than or equal to Bout; and select M values from the Nin*Nout weights through the sliding window, and when the M weights satisfy the preset condition, set all or part of the M weights to 0, where M=Bin*Bout; and the specific process is shown in FIG. 51A.

When the coarse-grain pruning operation is performed on the weight of the convolution layer, the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky, the coarse-grained pruning unit is specifically configured to:

enable the sliding window to slide along a direction of Bfin according to a stride Sfin, or slide along a direction of Bfout according to a stride Sfout, or slide along a direction of Bx according to a stride S, or slide along a direction of By according to a stride Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By; and select M weights from the Nfin*Nfout*Kx*Ky weights through the sliding window, and when the M weights satisfy the preset condition, set all or part of the M weights to 0, where M=Bfin*Bfout*Bx*By; and the specific process is shown in FIG. 52B.

When the coarse-grain pruning operation is performed on the weight of the LSTM layer, the size of the sliding window is Bin_i*Bout_i, where Bin_i is an integer greater than 0 and less than or equal to Nin_i, and Bout_i is greater than 0 and less than or equal to Nout_i, the coarse-grained pruning unit is specifically configured to:

enable the sliding window to slide along a direction of Bin_i according to a stride Sin_i, or slide along a direction of Bout_i according to a stride Sout_i, where Sin_i is a positive integer greater than 0 and less than or equal to Bin_i, and Sout_i is a positive integer greater than 0 and less than or equal to Bout_i; and select M weights from the Bin_i*Bout_i weights through the sliding window, and when the M weights satisfy the preset condition, set all or part of the M weights to 0, where M=Bin_i*Bout_i.

The processing device further includes:

the operation unit configured to train the neural network according to the pruned weights; where in the training process, the weights which are set to 0 remain 0.

The operation unit is integrated with a neural network backward training algorithm, receive a pruned neural network, and is configured to receive a neural network after coarse-grained pruning and train the neural network by using the back propagation algorithm. The pruned weights during the training process remain 0. The operation unit sends the trained neural network to the coarse-grained pruning unit for further pruning operation, or directly outputs the trained neural network.

The present disclosure provides a processing device (such as an artificial neural network chip). FIG. 51C is a schematic structural diagram of a processing device according to an example of the present disclosure. The processing device as shown in FIG. 51C may accelerate processing a neural network after the course-grained sparsification, fully exploit characteristics of coarse-grained sparsification, reduce memory access and operation amount, so as to obtain an acceleration ratio and reduce energy consumption.

The processing device includes: a storage unit, a coarse-grained pruning unit, a coarse-grained selection unit, and an operation unit. The processing device may be configured to process a neural network.

The storage unit is configured to store neurons, weights, and instructions of a neural network.

The coarse-grained pruning unit is configured to perform coarse-grained pruning on weights of the neural network to obtain pruned weights, and store the pruned weights and position information of target weights in the storage unit. The target weights are weights whose absolute values are greater than the second preset threshold.

The coarse-grained pruning unit is specifically configured to:

select M weights from the weights of the neural network through a sliding window, where M is an integer greater than 1; and when the M weights satisfy a preset condition, set all or part of the M weights to 0.

Further, the information amount of the M weights is smaller than the first preset threshold.

Further, the information amount of the M weights includes the arithmetic mean of the absolute values of the M weights, the geometric mean of the absolute values of the M weights, or the maximum value of the M weights. The first preset threshold is the first threshold, the second threshold, or the third threshold, and the information amount of the M weights being less than the first preset threshold includes:

the arithmetic mean of the absolute values of the M weights is less than the first threshold, or the geometric mean of the absolute values of the M weights is less than the second threshold, or the maximum value of the M weights is less than the third threshold.

Further, the coarse-grained pruning unit and the operation unit are configured to:

repetitively perform coarse-grained pruning on the neural network and train the neural network according to the pruned weights until no weights satisfy the above preset condition and a preset precision is simultaneously ensured.

Further, the above neural network includes a fully connected layer, a convolution layer, and a long-short-term memory (LSTM) layer. The weights of the fully connected layer are a two-dimensional matrix (Nin, Nout), where Nin is the count of input neurons, Nout is the count of output neurons, and the fully connected layer has Nin*Nout weights; the weights of the convolution layer are a four-dimensional matrix (Nfin, Nfout, Kx, Ky), where Nfin is the count of input feature maps, Nfout is the count of output feature maps, (Kx, Ky) is the size of convolution kernels, and the convolution layer has Nfin*Nfout*Kx*Ky weights; and the weights of the LSTM layer are composed of weights of m fully connected layers, where m is an integer greater than 0, the weight of an $i^{th}$ fully connected layer is (Nin_i, Nout_i), where i is an integer greater than 0 and less than or equal to m, Nin_i represents the count of input neurons of the $i^{th}$ fully connected layer, and Nout_i is the count of output neurons of the $i^{th}$ fully connected layer.

When a coarse-grained pruning operation is performed on the weight of the fully connected layer, the size of the sliding window is Bin*Bout, where Bin is an integer greater than 0 and less than or equal to Nin, and Bout is an integer greater than 0 and less than or equal to Nout, the coarse-grained pruning unit is specifically configured to:

enable the sliding window to slide along a direction of Bin according to a stride Sin, or slide along in a direction of Bout according to a stride Sout, where Sin is a positive integer greater than 0 and less than or equal to Bin, and Sout is a positive integer greater than 0 and less than or equal to Bout; and select M values from the Nin*Nout weights through the sliding window, and when the M weights satisfy the preset condition, set all or part of the M weights to 0, where M=Bin*Bout; and the specific process is shown in FIG. 51A.

When the coarse-grain pruning operation is performed on the weight of the convolution layer, the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky, the coarse-grained pruning unit is specifically configured to:

enable the sliding window to slide along a direction of Bfin according to a stride Sfin, or slide along a direction of Bfout according to a stride Sfout, or slide along a direction of Bx according to a stride S, or slide along a direction of By according to a stride Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By; and select M weights from the Nfin*Nfout*Kx*Ky weights through the sliding window, and when the M weights satisfy the preset condition, set all or part of the M weights to 0, where M=Bfin*Bfout*Bx*By; and the specific process is shown in FIG. 52B.

When the coarse-grain pruning operation is performed on the weight of the LSTM layer, the size of the sliding window is Bin_i*Bout_i, where Bin_i is an integer greater than 0 and less than or equal to Nin_i, and Bout_i is greater than 0 and less than or equal to Nout_i, the coarse-grained pruning unit is specifically configured to:

enable the sliding window to slide along a direction of Bin_i according to a stride Sin_i, or slide along a direction of Bout_i according to a stride Sout_i, where Sin_i is a positive integer greater than 0 and less than or equal to Bin_i, and Sout_i is a positive integer greater than 0 and less than or equal to Bout_i; and select M weights from the Bin_i*Bout_i weights through the sliding window, and when the M weights satisfy the preset condition, set all or part of the M weights to 0, where M=Bin_i*Bout_i.

The operation unit is configured to train the neural network according to the pruned weights, where the weights that are set to 0 in the training process remain 0.

The instruction control unit is configured to receive the instructions in the storage unit and decode the instructions to generate control information, so as to control the coarse-grained selection unit to perform a number selection operation, and control the operation unit to perform the operation.

The coarse-grained selection unit is configured to receive input neurons and position data of the target weights, select a group of weights in the neural network through the sliding window, set selected weights to 0, and select corresponding neurons of the target weights.

The above operation unit is further configured to receive input neurons and target weights that are selected, complete the neural network operation through a multiply-add operation unit to obtain output neurons, and re-transfer the output neurons to the above storage unit.

Further, when the storage unit stores the weights, only the target weights and the position data of the target weights are stored.

Further, the coarse-grained selection unit only selects corresponding neurons of the target weights to transfer to the operation unit.

Further, as shown in FIG. 52D, the processing device includes a pre-processing unit configured to pre-process original data, where the pre-processing includes data segmentation, Gaussian filtering, binarization, regularization, normalization, and the like.

Further, the processing device includes a direct memory access (DMA) unit.

Further, the processing device includes an instruction caching unit, an input weight caching unit, a target weight caching unit, a target weight position caching unit, and an output neuron caching unit.

Specifically, the storage unit is configured to store neurons, weights, and instructions of the neural network. When the storage unit stores the weights, only the target weights and position data of the target weights are stored.

Specifically, the DMA unit is configured to read and write data or instructions between the storage unit and the instruction caching unit, or the target weight caching unit, or the target weight position caching unit, or the input neuron caching unit, or the output neuron caching unit.

The instruction caching unit is configured to cache dedicated instructions.

The target weight caching unit is configured to cache the target weights.

The target weight position caching unit is configured to cache position information of the target weights, and map each connection weight in the input data to a corresponding input neuron one to one.

Optionally, the one-to-one correspondence method used by the target weight position caching unit may include: using 1 to indicate there is a weight connection, using 0 to indicate there is no weight connection, and using a string of 0 and 1 formed by the connection state between each group of outputs and all inputs to indicate a connection relationship of the output. Optionally, the one-to-one correspondence method used by the target weight position caching unit may include: using 1 to indicate there is a weight connection, using 0 to indicate there is no weight connection, and using a string of 0 and 1 formed by the connection state between each group of inputs and all outputs to indicate a connection relationship of the input. Optionally, the one-to-one correspondence method used by the target weight position caching unit may include: using a distance from the location of an input neuron where first connection of a group of outputs is to a first input neuron, a distance from a second group of input neurons of the outputs to a previous input neuron, a distance from a third group of input neurons of the outputs to a previous input neuron . . . in a similar fashion, until all inputs of the outputs are exhausted, so as to represent connection relations of the outputs.

The input neuron caching unit is configured to cache the input neurons input to the coarse-grained selection unit.

The output neuron caching unit is configured to cache the output neuron output by the operation unit.

The operation unit is configured to perform a corresponding operation on the data according the instruction stored in the storage unit.

The operation unit includes, but is not limited to, three parts: a first part: a multiplier, a second part: an adder tree, and a third part: an activation function unit. The first part multiplies first input data (in1) and second input data (in2) to obtain an output (out1), and the process can be represented as: out1=in1*in2. The second part accumulates third input data (in3) through the adder tree level by level to obtain second output data (out2), where in3 is a vector with a length being N and N is greater than 1, and the process can be represented as: out2=in3 [1]+in3 [2]+ . . . +in3 [N]; and/or the second part accumulates the third input data (in3) through the adder tree and then adds fourth input data (in4) to obtain the second output data (out2), and the process can be represented as: out2=in3 [1]+in3 [2]+ . . . +in3 [N]+in4; or the second part adds the third input data (in3) and the fourth input data (in4) to obtain the second output data (out2), and the process can be represented as: out2=in3+in4. The third part performs an activation function (active) operation on fifth input data (in5) to obtain activation output data (out3), and the process can be represented as: out3=active (in5). The activation function (active) may be sigmoid, tan h, relu, softmax, etc. In addition to performing the activation operation, the third part may realize other non-linear functions, for instance, may perform an operation (f) on input data (in) to obtain output data (out), and the process can be represented as: out=f (in).

Further, the operation unit may further include a pooling unit configured to perform a pooling operation on the input data (in) to obtain the output data (out), and the process can be represented as: out=pool (in), where pool refers to the pooling operation. The pooling operation includes, but is not limited to, average pooling, maximum pooling, and median pooling. The input data (in) is data in a pooling core related to the output (out).

The operation performed by the operation unit includes several parts: the first part includes multiplying the first input data and the second input data to obtain output data; the second part includes performing an adder tree operation, which specifically includes accumulating the third input data through the adder tree level by level, or adding the third input data and the fourth input data to obtain output data; and the third part includes performing an activation function operation, which specifically includes performing the active function (active) operation on the fifth input data to obtain output data. The operations of the above parts can be freely combined to achieve various functions.

It should be pointed out that the pre-processing unit, the storage unit, the DMA unit, the instruction caching unit, the instruction control unit, the coarse-grained pruning unit, the target weight caching unit, the target weight position caching unit, the input neuron caching unit, the output neuron caching unit, the coarse-grained selection unit, and the operation unit are all physical hardware devices instead of functional software units.

An example of the neural network processor is listed below to specifically describe the processing method of the present disclosure, but the example should not be considered as limiting the present disclosure. Any equivalent structure or equivalent process transformation made by using the specific examples, or direct or indirect applications of the examples in other related technical fields shall fall within the protection scope of the present disclosure.

FIG. 52E is a schematic diagram of a specific example of a processing method according to an example of the present disclosure. FIG. 52E illustrates a result of a coarse-grained pruning operation performed on a fully connected layer of a neural network. The fully connected layer has a total of eight input neurons n1~n8 and three output neurons o1~o3. The weights between the four input neurons n3, n4, n7, and n8 and the three output neurons o1, o2, and o3 are set to 0 through coarse-grained sparsification; n1 is connected to o1, o2, and o3 by the three weights s11, s12, and s13; n2 is connected to o1, o2 and o3 by the three weights s21, s22, and s23; n5 is connected to o1, o2 and o3 by the three weights s31, s32 and s33; n6 is connected to o1, o2, and o3 by the three weights s41, s42, and s43; and a bit string 11001100 is used to represent a connection relationship between the input neurons and the output neurons (which can also be viewed as position information of target weights), where 1 indicates that the input neuron is connected to all three output neurons and 0 indicates that no output neurons are connected to the input neuron. Table 1 describes information of the neurons and weights in the example, and Formula 1 describes operation formulas of the three output neurons o1, o2, and o3. It can be seen from Formula 1 that o1, o2, and o3 receive identical neurons for the operation.

It should be noted that fine-grained pruning includes regarding each weight as an independent individual, and pruning a certain weight that meets a condition; and coarse-grained pruning includes grouping the weights in a certain way, where each group includes a plurality of weights, and if a group of weights meets a condition, pruning the whole group of weights.

TABLE 1

| Input | Output Neuron | | | Position of |
|---|---|---|---|---|
| Neuron | o1 | o2 | o3 | Target Weight |
| n1 | s11 | s21 | s31 | 1 |
| n2 | s12 | s22 | s32 | 1 |
| n3 | 0 | 0 | 0 | 0 |
| n4 | 0 | 0 | 0 | 0 |
| n5 | s13 | s23 | s33 | 1 |
| n6 | s14 | s24 | s34 | 1 |
| n7 | 0 | 0 | 0 | 0 |
| n8 | 0 | 0 | 0 | 0 |

Formula 1—Operation Formulas of Output Neurons $$o1=n1*s11+n2*s12+n5*s13+n6*s14$$

$$o2=n1*s21+n2*s22+n5*s23+n6*s24$$

$$o3=n1*s31+n2*s32+n5*s33+n6*s34$$

When the processing device performs an operation, the eight input neurons, the twelve weights, the 8-bit position information, and corresponding instructions are sent to the storage unit. The coarse-grained selection unit receives the eight input neurons and target weight positions, and selects four neurons n1, n2, n5, and n6 that need to be involved in the operation. The operation unit receives four selected neurons and weights, completes the operation of output neurons through Formula 1, and then transfers the output neurons back to a storage part.

In some examples of the present disclosure, a processing device is disclosed. The device includes: a memory configured to store executable instructions; and a processor configured to execute the executable instructions in the storage unit according to the above processing method.

The processor may be a single processing unit, or may include two or more processing units. In addition, the processor may also include a general-purpose processor (CPU), or a graphics processor (GPU), or a field-programmable logical gate array (FPGA), or an application-dedicated integrated circuit (ASIC) to set up and operate a neural network. The processor may also include an on-chip memory for caching (including a memory in the processing device).

In some examples, a chip is disclosed, which includes the processing device.

In some examples, a chip package structure is disclosed, which includes the above chip.

In some examples, a board card is disclosed, which includes the above chip package structure.

In some examples, an electronic device is disclosed, which includes the above board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance, and/or medical equipment.

The transportation means may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner, and/or an electrocardiograph.

Based on a technical problem that a quantization operation is only performed in a unit of neural network layer in the prior art, the present disclosure provides a data quantization method. A complete quantization method provided by the present disclosure includes: grouping weights of a neural network through grouping and clustering operations, dividing each group of the weights into m clusters, calculating a central weight of each cluster, replacing all the weights of each cluster with the central weight corresponding to the cluster; and encoding the central weights to obtain a codebook and a weight dictionary.

In addition, in the present disclosure, a neural network can be retrained. Only the codebook needs to be retrained, while content of the weight dictionary remains unchanged, which reduces the workload. Quantized weights obtained by using the quantization method can also be applied to the processing device provided by the present disclosure. A lookup table unit is added so that weights do not need to be input during each time of processing, and the weight dictionary and the codebook can be looked up according to a lookup control instruction to obtain the quantized weights, which realizes a systematic operation. By fully exploiting the characteristics of weight distribution of the neural network, low-bit quantized weights are obtained, which may greatly improve the processing speed and reduce the weight storage overhead and memory access overhead.

Some examples of the present disclosure will be described more comprehensively hereinafter with reference to the accompanied drawings, where some rather than all of the examples will be shown. In fact, various examples of the present disclosure can be implemented in many different forms and should not be construed to be limited to the examples set forth herein; correspondingly, the provision of these examples allows the present disclosure to meet applicable legal requirements.

In this specification, various examples below that describe the principles of the present disclosure are illustrative only and should not be construed in any way as limiting the scope of the disclosure. The following description with reference to the accompanied drawings is used to facilitate a comprehensive understanding of exemplary examples of the present disclosure as defined by the claims and their equivalents. The following description includes a variety of details to facilitate understanding, but these details should be considered merely exemplary. Therefore, those of ordinary skill in the art should understand that various changes and modifications can be made to the examples described herein without departing from the scope and spirit of the present disclosure. In addition, descriptions of well-known functions and structures are omitted for clarity and conciseness. Further, throughout the accompanied drawings, identical reference numerals are used for similar functions and operations. In this disclosure, the terms "includes" and "contains" and derivatives thereof mean inclusion rather than limitation.

In order to make the purpose, technical solutions, and advantages of the present disclosure more clear, the present disclosure is described below in detail with reference to specific examples and with reference to the accompanied drawings.

An aspect of examples of the present disclosure provides a data quantization method. FIG. 54A is a schematic diagram of steps of a data quantization method according to an example of the present disclosure. As shown in FIG. 54A, the method includes the following steps:

a step S1901, grouping weights of a neural network, where a grouping method may include: grouping into a group, layer-type grouping, inter-layer grouping, intra-layer grouping, mixed grouping, etc.; and a step S1902, performing a clustering operation on each group of the weights according to a clustering algorithm, and representing weights of each cluster with a central weight.

Specifically, the step S1902 includes: dividing each group of the weights into m clusters, calculating the central weight of each cluster, and replacing all the weights of each cluster with the central weight corresponding to the cluster.

The clustering algorithm includes, but is not limited to, K-means, K-medoids, Clara, and Clarans.

Further, a method for selecting a central weight of a cluster is to minimize a cost function $J(w, w_0)$.

Optionally, the cost function may be a squared distance, which can be represented as $$J(w, w_0) = \sum_{i=1}^{n} (w_i - w_0)^2,$$

where w refers to all weights of a cluster, w0 refers to a central weight of the cluster, n refers to a count of weights in the cluster, wi refers to the $i^{th}$ weight in the cluster, and i is an integer greater than or equal to 1 and less than or equal to n.

The method further includes:

a step S1903, encoding the central weights to obtain a codebook and a weight dictionary.

By using the weight quantization method, the neural network may be retrained. During the retraining process, only the codebook is trained, and the content of the weight dictionary remains unchanged. Specifically, a backward propagation algorithm can be used for retraining.

FIG. 54B is a schematic diagram of a data quantization process according to an example of the present disclosure. As shown in FIG. 54B, the process includes: grouping weights of a neural network according to a grouping strategy to obtain ordered weight matrices; performing an intra-group sampling operation and the clustering operation on the grouped weight matrices, so as to cluster the weights with similar values into a same cluster and obtain four central weights 1.50, −0.13, −1.3, and 0.23, where the four central weights correspond to weights of four clusters; encoding the central weights, specifically, encoding the cluster with a central weight being −1.3 as 00, encoding the cluster with a central weight being −0.13 as 01, encoding the cluster with a central weight being 0.23 as 10, and encoding the cluster with a central weight being 1.50 as 11, all of which are the content of the codebook; and using encoding content (00, 01, 10, and 11) corresponding to the four central weights to represent the weights of the corresponding clusters respectively, so as to obtain the weight dictionary.

In this quantization process, similarity of the inter-layer weights of the neural network and local similarity of intra-layer weights of the neural network are fully exploited to obtain the characteristics of weight distribution of the neural network for low-bit quantization, which reduces the count of bits representing each weight and thus reducing the weight storage overhead and memory access overhead.

Examples are listed below to describe the data quantization method of the neural network.

Example 1 the method includes grouping all the weights of the neural network into one group; clustering each group of weights by using the K-means clustering algorithm; calculating a central weight of each cluster; replacing all the weights of each cluster with the central weight; according to quantized weights, generating a weight dictionary and a codebook; and retraining the neural network. In the retraining process, only the codebook is trained and the weight dictionary is not trained. Specifically, the retraining operation is performed by using the back propagation algorithm.

Example 2 the method includes grouping the weights of the neural network according to layer types. For instance, the neural network may include fully connected layers, convolution layers, and long-short-term memory (LSTM) layers. Weights of all convolution layers are grouped into one group, weights of all fully connected layers are grouped into one group, and weights of all LSTM layers are grouped into one group.

If a neural network has i convolution layers, j fully connected layers, m LSTM layers, which means the neural network has a total of t different types of layers, where i, j, m are all integers greater than or equal to 0 and satisfy i+j+m>=1, and t is an integer greater than or equal to 1 and satisfies t=i+j+m, then the weights of the neural network are grouped into t groups. Then the method includes: clustering weights of each of the t groups by using the K-medoids clustering algorithm; calculating a central weight of each cluster; replacing all the weights of each cluster with the central weight; according to quantized weights of each group, generating a weight dictionary and a codebook; and retraining the neural network. In the retraining process, only the codebook is trained and the weight dictionary is not trained. Specifically, the retraining operation is performed by using the back propagation algorithm.

Example 3 the method includes grouping the weights of the neural network according to the inter-layer structure.

Specifically, the method includes: grouping one or a plurality of successive convolution layers into one group, grouping one or a plurality of successive fully connected layers into one group, and grouping one or a plurality of successive LSTM layers into one group; clustering each group of weights by using the Clarans clustering algorithm; allocating weights with similar values into one cluster; calculating a central weight of each cluster; replacing all the weights of each cluster with the central weight; according to quantized weights of each group, generating a weight dictionary and a codebook; and retraining the neural network. In the retraining process, only the codebook is trained and the weight dictionary is not trained. Specifically, the retraining operation is performed by using the back propagation algorithm.

Example 4 the method includes grouping the weights of the neural network according to the intra-layer structure.

Specifically, the convolution layer of the neural network is a four-dimensional matrix (Nfin, Nfout, Kx, Ky), where Nfin, Nfout, Kx, and Ky are positive integers, Nfin is the count of input feature maps, and Nfout is the count of output feature maps, (Kx, Ky) is the size of a convolution kernel. The weights of the convolution layer are grouped into Nfin*Nfout*Kx*Ky/(Bfin*Bfout*Bx*By) different groups according to a group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky.

The fully connected layer of the neural network is a two-dimensional matrix (Nin, Nout), where Nin is the count of input neurons, Nout is the count of output neurons, and the fully connected layer has Nin*Nout weights. The weights of the fully connected layer are grouped into (Nin*Nout)/(Bin*Bout) different groups according to the group size of (Bin, Bout), where Bin is a positive integer less than or equal to Nin, and Bout is a positive integer less than or equal to Nout.

The weights of the LSTM layer of the neural network can be regarded as a combination of weights of the plurality of fully connected layers. If the weights of the LSTM layer are composed of weights of n fully connected layer weights, where n is a positive integer, then each LSTM layer may be grouped according to the grouping manner of the fully connected layer.

Specifically, the method includes: clustering each group of weights by using the Clarans clustering algorithm; calculating a central weight of each cluster; replacing all the weights of each cluster with the central weight; according to quantized weights of each group, generating a weight dictionary and a codebook; and retraining the neural network. In the retraining process, only the codebook is trained and the weight dictionary is not trained. Specifically, the retraining operation is performed by using the back propagation algorithm.

Example 5 the method includes grouping the weights of the neural network in a mixed manner, for instance, grouping all convolution layers into one group, grouping all fully connected layers according to the intra-layer structure, and grouping all LSTM layers according to the inter-layer structure; clustering each group of weights by using the Clarans clustering algorithm; calculating a central weight of each cluster; replacing all the weights of each cluster with the central weight; according to quantized weights of each group, generating a weight dictionary and a codebook; and retraining the neural network. In the retraining process, only the codebook is trained and the weight dictionary is not trained. Specifically, the retraining operation is performed by using the back propagation algorithm.

In another aspect of examples of the present disclosure, a data quantization device is provided. FIG. 54C is a schematic structural diagram of a data quantization device according to an example of the present disclosure. As shown in FIG. 54C, the device includes:

a memory 1 configured to store operation instructions, where the operation instructions are generally represented in a form of binary numbers and are composed of opcodes and address codes, and the opcodes indicate an operation to be performed by a processor 2 and the address codes indicate an address where the processor 2 can read data involved in the operation from the memory 1; and a processor 2 configured to execute the operation instructions in the memory 1 according to the data quantization method.

In the data quantization device of the present disclosure, by executing the operation instructions in the memory 1 according to the data quantization method, the processor 2 may quantize disordered weights to obtain low-bit and normalized quantized weights. Similarity of the inter-layer weights of the neural network and local similarity of intra-layer weights of the neural network are fully exploited to obtain the characteristics of weight distribution of the neural network for performing low-bit quantization, which reduces the count of bits representing each weight and thus reducing the weight storage overhead and memory access overhead.

In yet another aspect of examples of the present disclosure, a processing device is provided. FIG. 54D is a schematic structural diagram of a processing device according to an example of the present disclosure. As shown in FIG. 54D, the processing device includes: a control unit 1, a lookup table unit 2, and an operation unit 3.

The control unit 1 is configured to receive instructions and decode the instructions to generate lookup control information and operation control information.

The above instructions are dedicated instruction for neural networks, and include all instructions dedicated to completing an artificial neural network operation. The dedicated instructions for neural networks include, but are not limited to, control instructions, data transfer instructions, operation instructions, and logical instructions, where the control instructions are configured to control the execution process of a neural network.

The data transfer instructions are configured to complete data transfer between different storage media; and data formats include, but are not limited to, matrices, vectors and scalars.

Operation instructions are configured to complete arithmetic operations of neural networks, including but not limited to matrix operation instructions, vector operation instructions, scalar operation instructions, convolution neural network operation instructions, fully connected neural network operation instructions, pooling neural network operation instructions, RBM (Restricted Boltzmann Machine) neural network operation instructions, LRN (Local Response Normalization) neural network operation instructions, LCN (Local Contrast Normalization) neural network operation instructions, LSTM neural network operation instructions, RNN (Recurrent Neural Networks) neural network operation instructions, RELU (Rectified linear unit) neural network operation instructions, PRELU (Parametric Rectified Linear Unit) neural network operation instructions, SIGMOID neural network operation instructions, TAN H neural network operation instructions, and MAXOUT neural network operation instructions.

Logical instructions are configured to complete neural network logical operations, including but not limited to vector logical operation instructions and scalar logical operation instructions.

RBM neural network operation instructions are configured to implement RBM neural network operation.

LRN neural network operation instructions are configured to implement LRN neural network operation.

LSTM neural network operation instructions are configured to implement LSTM neural network operation.

RNN neural network operation instructions are configured to implement RNN neural network operation.

RELU neural network operation instructions are configured to implement RELU neural network operation.

PRELU neural network operation instructions are configured to implement PRELU neural network operation.

SIGMOID neural network operation instructions are configured to implement SIGMOID neural network operation.

TAN H neural network operation instructions are configured to implement TAN H neural network operation.

MAXOUT neural network operation instructions are configured to implement MAXOUT neural network operation.

Further, the neural network dedicated instructions include the Cambricon instruction set.

The Cambricon instruction set includes at least one Cambricon instruction. The length of the Cambricon instruction may be 64 bits or be changed according to actual needs. The Cambricon instruction consists of opcodes and operands, and contains four types of instructions, which are Cambricon control instructions, Cambricon data transfer instructions, Cambricon computational instructions, and Cambricon logical instructions.

The Cambricon control instructions are configured to control the execution process, and include jump instructions and conditional branch instructions.

The Cambricon data transfer instructions are configured to complete data transfer between different storage media, and include load instructions, store instructions, and move instructions.

The load instructions are configured to load data from a primary memory to a cache, and the store instructions are configured to store data from a cache to a primary memory, and the move instructions are configured to move data between a cache and a cache, or between a cache and a register, or between a register and a register. The data transfer instructions support three different ways of data organization, including matrices, vectors, and scalars.

The Cambricon computational instructions are configured to complete arithmetic operation of a neural network, and include Cambricon matrix operation instructions, Cambricon vector operation instructions, and Cambricon scalar operation instructions.

The Cambricon matrix operation instructions are configured to complete matrix operations in neural networks, including matrix multiply vector operations, vector multiply matrix operations, matrix multiply scalar operations, outer product operations, matrix add matrix operations, and matrix subtract matrix operations.

The Cambricon vector operation instructions are configured to complete vector operations in neural networks, including vector elementary arithmetic operations, vector transcendental function operations, dot product operations, random vector generator operations, and an operation of finding a maximum/minimum of a vector, where the vector elementary arithmetic operations include vector addition operations, subtraction operations, multiplication operations, and division operations. The vector transcendental functions refer to the functions of polynomial equations that cannot take polynomials as a coefficients, including but not limited to exponential functions, logarithmic functions, trigonometric functions, and inverse trigonometric functions.

The Cambricon scalar operation instructions are configured to complete scalar operations in neural networks, including scalar elementary arithmetic operations and scalar transcendental function operations, where the scalar elementary arithmetic operations include scalar addition subtraction operations, multiplication operations, and division operations. The scalar transcendental functions refer to functions of polynomial equations that cannot take polynomials as coefficients, including but not limited to exponential functions, logarithmic functions, trigonometric functions, and inverse trigonometric functions.

The Cambricon logical instructions are configured to complete logical operations of neural networks, including Cambricon vector logical operation instructions and Cambricon scalar logical operation instructions.

The Cambricon vector logical operation instructions include vector comparison operations, vector logical operations, and vector greater than merge operations, where vector comparison operations include but are not limited to "greater than", "less than", "equal to", "greater than or equal to (≥)", "less than or equal to (≤)", and "not equal to". The vector logical operations include "and", "or", and "not".

The Cambricon scalar logical operation instructions include scalar comparison operations and scalar logical operations, where the scalar comparison operations include but are not limited to "greater than", "less than", "equal to", "greater than or equal to (≥)", "less than or equal to (≤)", and "not equal to". The scalar logical operations include "and", "or", and "not".

The lookup table unit 2 is configured to receive the lookup control information, the weight dictionary, and the codebook, and perform a table lookup operation on the weight dictionary and the codebook according to the lookup control information to obtain the quantized weights.

The operation unit 3 is configured to receive the operation control information and the input neurons, and perform arithmetic operations on the quantized weights and the input neurons according to the operation control information to obtain output neurons for output.

The operation unit 3 may include four operation parts: a first operation part is configured to multiply the quantized weights and the input neurons;

a second operation part is configured to add the quantized weights and the input neurons through one or more adders (further, the adders may also form an adder tree, so as to realize the operation function of different levels of adder trees);

a third operation part is configured to perform a non-linear function operation on the quantized weights and the input neurons; and a fourth operation part is configured to perform a pooling operation on the quantized weights and the input neurons.

The present disclosure adopts dedicated SIMD instructions for multi-layer artificial neural network operations and the customized operation unit 3 that are used for local quantization, which may effectively solve the problems of insufficient computing performance of CPU and GPU and large front-end decoding overhead, and improve support for multi-layer artificial neural network operation algorithms.

FIG. 54E is a schematic diagram of a process of looking up a table according to an example of the present disclosure. As shown in FIG. 54E, the quantized weight is divided into four clusters according to the codebook: a central weight of a cluster coded as 00 is −1.30, a central weight of a cluster coded as 01 is −0.13, a central weight of a cluster coded as 10 is −0.23, a central weight of a cluster coded as 11 is −1.50. According to the weight dictionary, the distribution of weights of the same cluster can be obtained, and the central weight of each cluster is used to replace a corresponding code in the weight dictionary, so as to obtain quantized weights.

In the above operation, similarity of the inter-layer weights of the neural network and local similarity of intra-layer weights of the neural network are fully exploited. The weight dictionary and the codebook may be obtained through the quantization steps to look up the table and thus restoring the quantized weights, which is operational and normative.

In order to optimize the processing device of the present disclosure, a storage unit 4, a pre-processing unit 5, and a caching unit 7 are added to make data processing more orderly and facilitate the operation of the processing device.

FIG. 54F is a schematic structural diagram of a processing device according to a specific example of the present disclosure. As shown in FIG. 54F, based on an original structure shown in FIG. 54D, the processing device provided in this specific example further includes: the storage unit 4, the pre-processing unit 5, a DMA (direct memory access) unit 6, and the caching unit 7.

The storage unit 4 is configured to store input neurons, a weight dictionary, a codebook, and instructions input from the external, and receive output neurons which are output by the operation unit 3.

In addition, the storage unit 4 may also store unquantized weights, where the unquantized weights are directly output to the operation unit 3 through a bypass. Therefore, it can be seen that the processing device of the present disclosure can process not only quantized weights but also unquantized weights, which can be selected according to different actual needs.

The pre-processing unit 5 is configured to pre-process input information input from the external to obtain the input neurons, the weight dictionary, the codebook, and the instructions, where the pre-processing includes segmentation, Gaussian filtering, binarization, regularization, normalization, and the like.

The caching unit 7 includes:

an instruction caching unit 71 configured to cache the instructions;

a weight dictionary caching unit 72 configured to cache the weight dictionary;

a codebook caching unit 73 configured to cache the codebook;

an input neuron caching unit 74 configured to cache the input neurons; and an output neuron caching unit 75 configured to cache the output neurons.

After the input data of the external input is pre-processed by the pre-processing unit 5, the input neurons, the weight dictionary, the codebook, and the instructions are obtained and output to the storage unit 4 for storage. The DMA unit 6 directly reads the input neurons, the weight dictionary, the codebook, and the instructions from the storage unit 4, outputs the instructions to the instruction caching unit 71 for caching, outputs the weight dictionary to the weight dictionary caching unit 72 for caching, outputs the codebook to the codebook caching unit 73 for caching, and outputs the input neurons to the input neuron caching unit 74 for caching.

The control unit 1 decodes the received instructions, and obtains lookup table control information and operation control information for outputting. The lookup table unit 2 performs a table lookup operation on the weight dictionary and the codebook according to the received lookup table control information, obtains the quantized weights, and outputs the quantized weights to the operation unit 3. The operation unit 3 selects an operation part and an operation order of each operation part according to the received operation control information, performs the operation on the quantized weights and the input neurons, obtains the output neurons, and outputs the output neurons to the output neuron caching unit 75. Finally, the output neuron caching unit 75 outputs the output neurons to the storage unit 4 for storage.

The operations of the first operation part specifically includes: multiplying input data 1 (in1) and input data 2 (in2) to obtain an output (out), which is represented as: out=in1*in2.

The second operation part may be composed of one or more adders to implement the addition operation. In addition, a plurality of adders may also form an adder tree to implement operational functions of different levels of adder trees. The operations specifically includes: accumulating the input data 1 (in1) level by level through the adder tree to obtain output data (out1), where the input data 1 may be a vector with the length being N and N is greater than 1, and the process can be represented as: out1=in1[1]+in1[2]+ . . . +in1[N]; or accumulating the input data 1 (in1) through the adder tree, where the in1 may be a vector with the length being N and N is greater than 1, and then adding input data 2 (in2) to obtain second output data (out2), and the process can be represented as: out2=in1[1]+in1[2]+ . . . +in1[N]+in2; or adding the input data 1 (in1) and the input data 2 (in2) to obtain output data (out3), where both the in1 and the in2 are a numerical value, and the process can be represented as: out3=in1+in2.

The third operation part includes: performing a different function operation on the input data (in) through a non-linear function (f) to obtain the output data (out), and the process can be: out=f (in), where the non-linear function includes an activation function and the process can be represented as:

out=active (in). The activation function (active) includes, but is not limited to, sigmoid, tan h, relu, and/or softmax.

The fourth operation part includes: performing a pooling operation on the input data (in) to obtain the output data (out), and the process can be represented as: out=pool (in), where pool refers to the pooling operation. The pooling operation includes, but is not limited to, average pooling, maximum pooling, and median pooling. The input data (in) is data in a pooling core related to the output (out).

In the above operations parts, one or more parts may be selected and combined in different orders to realize various operations with different functions. The operation unit 3 of the present disclosure includes, but is not limited to, the above four operation parts, and may further include logical operations such as exclusive OR, inclusive OR, OR, and the like. The operation control information can control one or more operation parts in each of the operation parts and combine the same in different orders to realize various operations with different functions.

In still another aspect of the examples of the present disclosure, a processing method is provided. FIG. 54G is a schematic diagram of steps of a processing method according to an example of the present disclosure. As shown in FIG. 54G, the steps include:

a step S701, receiving input neurons, a weight dictionary, a codebook, and instructions;

where the input neurons, the weight dictionary, the codebook, and the instructions can be information obtained after pre-processing input information which is input from the external, and the pre-processing includes, but is not limited to, segmentation, Gaussian filtering, binarization, regularization, normalization, and the like; and a step S702, decoding the instructions to obtain lookup control information and operation control information;

where the instructions are dedicated instructions for neural networks and include all instructions dedicated to completing an artificial neural network operation.

The dedicated instructions for the neural networks include, but are not limited to, control instructions, data transfer instructions, operation instructions, and logical instructions, where the control instructions are configured to control the execution process of a neural network.

The data transfer instructions are configured to complete data transfer between different storage media; and data formats include, but are not limited to, matrices, vectors and scalars. Operation instructions are configured to complete arithmetic operations of neural network, including but not limited to matrix operation instructions, vector operation instructions, scalar operation instructions, convolution neural network operation instructions, fully connected neural network operation instructions, pooling neural network operation instructions, RBM (Restricted Boltzmann Machine) neural network operation instructions, LRN (Local Response Normalization) neural network operation instructions, LCN (Local Contrast Normalization) neural network operation instructions, LSTM neural network operation instructions, RNN (Recurrent Neural Networks) neural network operation instructions, RELU (Rectified linear unit) neural network operation instructions, PRELU (Parametric Rectified Linear Unit) neural network operation instructions, SIGMOID neural network operation instructions, TAN H neural network operation instructions, and MAXOUT neural network operation instructions.

Logical instructions are configured to complete neural network logical operations, including but not limited to vector logical operation instructions and scalar logical operation instructions.

RBM neural network operation instructions are configured to implement RBM neural network operation.

LRN neural network operation instructions are configured to implement LRN neural network operation.

LSTM neural network operation instructions are configured to implement LSTM neural network operation.

RNN neural network operation instructions are configured to implement RNN neural network operation.

RELU neural network operation instructions are configured to implement RELU neural network operation.

PRELU neural network operation instructions are configured to implement PRELU neural network operation.

SIGMOID neural network operation instructions are configured to implement SIGMOID neural network operation.

TAN H neural network operation instructions are configured to implement TAN H neural network operation.

MAXOUT neural network operation instructions are configured to implement MAXOUT neural network operation.

Further, the neural network dedicated instructions include the Cambricon instruction set.

The Cambricon instruction set includes at least one Cambricon instruction. The length of the Cambricon instruction may be 64 bits or be changed according to actual needs. The Cambricon instruction consists of opcodes and operands, and contains four types of instructions, which are Cambricon control instructions, Cambricon data transfer instructions, Cambricon computational instructions, and Cambricon logical instructions.

The Cambricon control instructions are configured to control the execution process, and include jump instructions and conditional branch instructions.

The Cambricon data transfer instructions are configured to complete data transfer between different storage media, and include load instructions, store instructions, and move instructions.

The load instructions are configured to load data from a primary memory to a cache, and the store instructions are configured to store data from a cache to a primary memory, and the move instructions are configured to move data between a cache and a cache, or between a cache and a register, or between a register and a register. The data transfer instructions support three different ways of data organization, including matrices, vectors, and scalars.

The Cambricon computational instructions are configured to complete arithmetic operation of a neural network, and include Cambricon matrix operation instructions, Cambricon vector operation instructions, and Cambricon scalar operation instructions.

The Cambricon matrix operation instructions are configured to complete matrix operations in neural network, including matrix multiply vector operations, vector multiply matrix operations, matrix multiply scalar operations, outer product operations, matrix add matrix operations, and matrix subtract matrix operations.

The Cambricon vector operation instructions are configured to complete vector operations in neural network, including vector elementary arithmetic operations, vector transcendental function operations, dot product operations, random vector generator operations, and an operation of finding a maximum/minimum of a vector, where the vector elementary arithmetic operations include vector addition operations, subtraction operations, multiplication operations, and division operations. The vector transcendental functions refer to functions of polynomial equations that cannot take polynomials as coefficients, including but not limited to exponential functions, logarithmic functions, trigonometric functions, and inverse trigonometric functions.

The Cambricon scalar operation instructions are configured to complete scalar operations in neural networks, including scalar elementary arithmetic operations and scalar transcendental function operations, where the scalar elementary arithmetic operations include scalar addition subtraction operations, multiplication operations, and division operations. The scalar transcendental functions refer to functions of polynomial equations that cannot take polynomials as coefficients, including but not limited to exponential functions, logarithmic functions, trigonometric functions, and inverse trigonometric functions.

The Cambricon logical instructions are configured to complete logical operations of neural networks, including Cambricon vector logical operation instructions and Cambricon scalar logical operation instructions.

The Cambricon vector logical operation instructions include vector comparison operations, vector logical operations, and vector greater than merge operations, where vector comparison operations include but are not limited to “greater than”, “less than”, “equal to”, “greater than or equal to (≥)”, “less than or equal to (≤)”, and “not equal to”. The vector logical operations include “and”, “or”, and “not”.

The Cambricon scalar logical operation instructions include scalar comparison operations and scalar logical operations, where the scalar comparison operations include but are not limited to “greater than”, “less than”, “equal to”, “greater than or equal to (≥)”, “less than or equal to (≤)”, and “not equal to”. The scalar logical operations include “and”, “or”, and “not”.

The processing method further includes:

a step S703, according to the lookup control information, looking up the weight dictionary and the codebook to obtain quantized weights, and performing the operation on the quantized weights and the input neurons according to the operation control information to obtain output neurons for outputting.

In addition, in order to optimize the processing method of the present disclosure and make the processing more convenient and orderly, several steps are added to some examples of the present disclosure. FIG. 54H is a schematic diagram of the steps of a processing method according to an example of the present disclosure. As shown in FIG. 54H:

before the step S701, the processing method includes a step S700, preprocessing the input information which is input from the external to obtain the input neurons, the weight dictionary, the codebook, and the instructions;

where the preprocessing includes segmentation, Gaussian filtering, binarization, regularization, normalization, and the like.

After the step S702, the processing method includes:

a step S7021: storing the input neurons, the weight dictionary, the codebook, the instructions, and output neurons; and a step S7022: caching the instructions, the input neurons, the output neurons, the weight dictionary, and the codebook. The subsequent steps are the same as those of the processing method shown in FIG. 54H, and will not be further described herein.

The operation in the step S703 includes: adding the weights and the input neurons, and the addition function is implemented by one or a plurality of adders. In addition, the plurality of adders may also form an adder tree to implement addition of the weights and the input neuron addition level by level; and/or multiplying the weights and the input neurons; and/or performing a non-linear function operation on the weights and the input neurons, where the non-linear function operation includes an activation function and the activation function may be sigmoid, tan h, relu, and/or softmax; and/or performing a pooling operation on the weights and the input neurons, where the weights include quantized weights and unquantized weights, and the pooling operation includes, but is not limited to, average pooling, maximum pooling, and median pooling. The input data (in) is data in a pooling core related to the output (out).

In the above operations parts, one or more parts may be selected and combined in different orders to realize various operations with different functions. The operation steps include, but are not limited to, the above four operations, and may further include logical operations such as OR, exclusive OR, inclusive OR, and the like.

In addition, the processing method may also be used to process unquantized weights, and the unquantized weights and the input neurons may be operated according to the operation control information to obtain output neurons for outputting.

In an example, the present disclosure also provides a chip which includes the above processing device. The chip may simultaneously perform a plurality of operations on the quantized weights and the unquantized weights to realize diversification of operations. In addition, by using a dedicated on-chip cache for the multi-layer artificial neural network operation algorithm, reusability of the input neurons and the weights is fully exploited, which may avoid repetitive reading of the data to a memory, reduce memory access bandwidth, and avoid a problem of the memory bandwidth becoming a performance bottleneck of multi-layer artificial neural network operations and training algorithms.

In some examples, a chip package structure is disclosed, which includes the above chip.

In some examples, a board card is disclosed, which includes the above chip package structure.

In some examples, an electronic device is disclosed, which includes the above board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance, and/or medical equipment.

The transportation means may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner, and/or an electrocardiograph.

All modules in the examples of the present disclosure may be a hardware structure, and physical implementations of the hardware structure include, but are not limited to, physical devices. The physical devices include, but are not limited to, transistors, memristors, and DNA computers.

Based on a technical problem that a quantization operation is only performed in a unit of neural network layer in the prior art, the present disclosure provides a data quantization method. A complete quantization method provided by the present disclosure includes: grouping weights of a neural network through grouping and clustering operations, dividing each group of the weights into m clusters, calculating a central weight of each cluster, replacing all the weights of each cluster with the central weight corresponding to the cluster; and encoding the central weights to obtain a codebook and a weight dictionary.

In addition, in the present disclosure, a neural network can be retrained. Only the codebook needs to be retrained, while content of the weight dictionary remains unchanged, which may reduce the workload. Quantized weights obtained by using the quantization method can also be applied to the processing device provided by the present disclosure. A lookup table unit is added so that weights do not need to be input during each time of processing, and the weight dictionary and the codebook can be looked up according to a lookup control instruction to obtain the quantized weights, which realizes a systematic operation. By fully exploiting the characteristics of weight distribution of the neural network, low-bit quantized weights are obtained, which may greatly improve the processing speed and reduce the weight storage overhead and memory access overhead.

Some examples of the present disclosure will be described more comprehensively hereinafter with reference to the accompanied drawings, where some rather than all of the examples will be shown. In fact, various examples of the present disclosure can be implemented in many different forms and should not be construed to be limited to the examples set forth herein; correspondingly, the provision of these examples allows the present disclosure to meet applicable legal requirements.

In this specification, various examples below that describe the principles of the present disclosure are illustrative only and should not be construed in any way as limiting the scope of the disclosure. The following description with reference to the accompanied drawings is used to facilitate a comprehensive understanding of exemplary examples of the present disclosure as defined by the claims and their equivalents. The following description includes a variety of details to facilitate understanding, but these details should be considered merely exemplary. Therefore, those of ordinary skill in the art should understand that various changes and modifications can be made to the examples described herein without departing from the scope and spirit of the present disclosure. In addition, descriptions of well-known functions and structures are omitted for clarity and conciseness. Further, throughout the accompanied drawings, identical reference numerals are used for similar functions and operations. In this disclosure, the terms "includes" and "contains" and derivatives thereof mean inclusion rather than limitation.

In order to make the purpose, technical solutions, and advantages of the present disclosure more clear, the present disclosure is described below in detail with reference to specific examples and with reference to the accompanied drawings.

An aspect of examples of the present disclosure provides a data quantization method. FIG. 54A is a schematic diagram of steps of a data quantization method according to an example of the present disclosure. As shown in FIG. 54A, the method includes the following steps:

a step S1901, grouping weights of a neural network, where a grouping method may include: grouping into one group, layer-type grouping, inter-layer grouping, intra-layer grouping, mixed grouping, etc.;

a step S1902, perform a clustering operation on each group of the weights according to a clustering algorithm, and representing weights of each cluster with a central weight.

Specifically, the step S1902 includes: dividing each group of the weights into m clusters, calculating the central weight of each cluster, and replacing all the weights of each cluster with the central weight corresponding to the cluster.

The clustering algorithm includes, but is not limited to, K-means, K-medoids, Clara, and Clarans.

Further, a method for selecting a central weight of a cluster is to minimize a cost function $J(w, w_0)$.

Optionally, the cost function may be a squared distance, which can be represented as $$J(w, w_0) = \sum_{i=1}^{n} (w_i - w_0)^2,$$

where w refers to all weights of a cluster, w0 refers to a central weight of the cluster, n refers to a count of weights in the cluster, wi refers to the $i^{th}$ weight in the cluster, and i is an integer greater than or equal to 1 and less than or equal to n.

The method further includes:

a step S1903, encoding the central weight to obtain a codebook and a weight dictionary.

By using the weight quantization method, the neural network may be retrained. During the retraining process, only the codebook is trained, and the content of the weight dictionary remains unchanged. Specifically, a backward propagation algorithm can be used for retraining.

FIG. 54B is a schematic diagram of a data quantization process according to an example of the present disclosure. As shown in FIG. 54B, the process includes: grouping weights of a neural network according to a grouping strategy to obtain ordered weight matrices; performing an intra-group sampling operation and the clustering operation on the grouped weight matrices, so as to cluster the weights with similar values into a same cluster and obtain four central weights 1.50, −0.13, −1.3, and 0.23, where the four central weights correspond to weights of four clusters; encoding the central weights, specifically, encoding the cluster with a central weight being −1.3 as 00, encoding the cluster with a central weight being −0.13 as 01, encoding the cluster with a central weight being 0.23 as 10, and encoding the cluster with a central weight being 1.50 as 11, all of which are the content of the codebook; and using encoding content (00, 01, 10, and 11) corresponding to the four central weights to represent the weights of the corresponding clusters respectively, so as to obtain the weight dictionary. In this quantization process, similarity of the inter-layer weights of the neural network and local similarity of intra-layer weights of the neural network are fully exploited to obtain the characteristics of weight distribution of the neural network for low-bit quantization, which may reduce the count of bits representing each weight and thus reducing the weight storage overhead and memory access overhead.

Examples are listed below to describe the data quantization method of the neural network.

Example 1 the method includes grouping all the weights of the neural network into one group; clustering each group of weights by using the K-means clustering algorithm; calculating a central weight of each cluster; replacing all the weights of each cluster with the central weight; according to quantized weights, generating a weight dictionary and a codebook; and retraining the neural network. In the retraining process, only the codebook is trained and the weight dictionary is not trained. Specifically, the retraining operation is performed by using the back propagation algorithm.

Example 2 the method includes grouping the weights of the neural network according to layer types. For instance, the neural network may include fully connected layers, convolution layers, and long-short-term memory (LSTM) layers. Weights of all convolution layers are grouped into one group, weights of all fully connected layers are grouped into one group, and weights of all LSTM layers are grouped into one group.

If a neural network has i convolution layers, j fully connected layers, m LSTM layers, which means the neural network has a total of t different types of layers, where i, j, m are all integers greater than or equal to 0 and satisfy i+j+m>=1, and t is an integer greater than or equal to 1 and satisfies t=i+j+m, then the weights of the neural network are grouped into t groups. Then the method includes: clustering weights of each of the t groups by using the K-medoids clustering algorithm; calculating a central weight of each cluster; replacing all the weights of each cluster with the central weight; according to quantized weights of each group, generating a weight dictionary and a codebook; and retraining the neural network. In the retraining process, only the codebook is trained and the weight dictionary is not trained. Specifically, the retraining operation is performed by using the back propagation algorithm.

Example 3 the method includes grouping the weights of the neural network according to the inter-layer structure.

Specifically, the method includes: grouping one or a plurality of successive convolution layers into one group, grouping one or a plurality of successive fully connected layers into one group, and grouping one or a plurality of successive LSTM layers into one group; clustering each group of weights by using the Clarans clustering algorithm; allocating weights with similar values into one cluster; calculating a central weight of each cluster; replacing all the weights of each cluster with the central weight; according to quantized weights of each group, generating a weight dictionary and a codebook; and retraining the neural network. In the retraining process, only the codebook is trained and the weight dictionary is not trained. Specifically, the retraining operation is performed by using the back propagation algorithm.

Example 4 the method includes grouping the weights of the neural network according to the intra-layer structure.

Specifically, the convolution layer of the neural network is a four-dimensional matrix (Nfin, Nfout, Kx, Ky), where Nfin, Nfout, Kx, and Ky are positive integers, Nfin is the count of input feature maps, and Nfout is the count of output feature maps, (Kx, Ky) is the size of a convolution kernel. The weights of the convolution layer are grouped into Nfin*Nfout*Kx*Ky/(Bfin*Bfout*Bx*By) different groups according to a group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky.

The fully connected layer of the neural network is a two-dimensional matrix (Nin, Nout), where Nin is the count of input neurons, Nout is the count of output neurons, and the fully connected layer has Nin*Nout weights. The weights of the fully connected layer are grouped into (Nin*Nout)/(Bin*Bout) different groups according to the group size of (Bin, Bout), where Bin is a positive integer less than or equal to Nin, and Bout is a positive integer less than or equal to Nout.

The weights of the LSTM layer of the neural network can be regarded as a combination of weights of the plurality of fully connected layers. If the weights of the LSTM layer are composed of weights of n fully connected layer weights, where n is a positive integer, then each LSTM layer may be grouped according to the grouping manner of the fully connected layer.

Specifically, the method includes: clustering each group of weights by using the Clarans clustering algorithm; calculating a central weight of each cluster; replacing all the weights of each cluster with the central weight; according to quantized weights of each group, generating a weight dictionary and a codebook; and retraining the neural network. In the retraining process, only the codebook is trained and the weight dictionary is not trained. Specifically, the retraining operation is performed by using the back propagation algorithm.

Example 5 the method includes grouping the weights of the neural network in a mixed manner, for instance, grouping all convolution layers into one group, grouping all fully connected layers according to the intra-layer structure, and grouping all LSTM layers according to the inter-layer structure; clustering each group of weights by using the Clarans clustering algorithm; calculating a central weight of each cluster; replacing all the weights of each cluster with the central weight; according to quantized weights of each group, generating a weight dictionary and a codebook; and retraining the neural network. In the retraining process, only the codebook is trained and the weight dictionary is not trained. Specifically, the retraining operation is performed by using the back propagation algorithm.

In another aspect of examples of the present disclosure, a data quantization device is provided. FIG. 54C is a schematic structural diagram of a data quantization device according to an example of the present disclosure. As shown in FIG. 54C, the device includes:

a memory 1 configured to store operation instructions, where the operation instructions are generally represented in a form of binary numbers and are composed of opcodes and address codes, and the opcodes indicate an operation to be performed by a processor 2 and the address codes indicate an address where the processor 2 can read data involved in the operation from the memory 1; and a processor 2 configured to execute the operation instructions in the memory 1 according to the data quantization method.

In the data quantization device of the present disclosure, by executing the operation instructions in the memory 1 according to the data quantization method, the processor 2 may quantize disordered weights to obtain low-bit and normalized quantized weights. Similarity of the inter-layer weights of the neural network and local similarity of intra-layer weights of the neural network are fully exploited to obtain the characteristics of weight distribution of the neural network for low-bit quantization, which may reduce the count of bits representing each weight and thus reducing the weight storage overhead and memory access overhead.

In yet another aspect of examples of the present disclosure, a processing device is provided. FIG. 54D is a schematic structural diagram of a processing device according to an example of the present disclosure. As shown in FIG. 54D, the processing device includes: a control unit 1, a lookup table unit 2, and an operation unit 3.

The control unit 1 is configured to receive instructions and decode the instructions to generate lookup control information and operation control information.

The above instructions are dedicated instruction for the neural networks, and include all instructions dedicated to completing an artificial neural network operation. The dedicated instructions for the neural network include, but are not limited to, control instructions, data transfer instructions, operation instructions, and logical instructions, where the control instructions are configured to control the execution process of the neural network. The data transfer instructions are configured to complete data transfer between different storage media; and data formats include, but are not limited to, matrices, vectors and scalars. Operation instructions are configured to complete arithmetic operations of neural network, including but not limited to matrix operation instructions, vector operation instructions, scalar operation instructions, convolution neural network operation instructions, fully connected neural network operation instructions, pooling neural network operation instructions, RBM (Restricted Boltzmann Machine) neural network operation instructions, LRN (Local Response Normalization) neural network operation instructions, LCN (Local Contrast Normalization) neural network operation instructions, LSTM neural network operation instructions, RNN (Recurrent Neural Networks) neural network operation instructions, RELU (Rectified linear unit) neural network operation instructions, PRELU (Parametric Rectified Linear Unit) neural network operation instructions, SIGMOID neural network operation instructions, TAN H neural network operation instructions, and MAXOUT neural network operation instructions. Logical instructions are configured to complete neural network logical operations, including but not limited to vector logical operation instructions and scalar logical operation instructions.

RBM neural network operation instructions are configured to implement RBM neural network operation.

LRN neural network operation instructions are configured to implement LRN neural network operation.

LSTM neural network operation instructions are configured to implement LSTM neural network operation.

RNN neural network operation instructions are configured to implement RNN neural network operation.

RELU neural network operation instructions are configured to implement RELU neural network operation.

PRELU neural network operation instructions are configured to implement PRELU neural network operation.

SIGMOID neural network operation instructions are configured to implement SIGMOID neural network operation.

TAN H neural network operation instructions are configured to implement TAN H neural network operation.

MAXOUT neural network operation instructions are configured to implement MAXOUT neural network operation.

Further, the neural network dedicated instructions include the Cambricon instruction set.

The Cambricon instruction set includes at least one Cambricon instruction. The length of the Cambricon instruction may be 64 bits or be changed according to actual needs. The Cambricon instruction consists of opcodes and operands, and contains four types of instructions, which are Cambricon control instructions, Cambricon data transfer instructions, Cambricon computational instructions, and Cambricon logical instructions.

The Cambricon control instructions are configured to control the execution process, and include jump instructions and conditional branch instructions.

The Cambricon data transfer instructions are configured to complete data transfer between different storage media, and include load instructions, store instructions, and move instructions.

The load instructions are configured to load data from a primary memory to a cache, and the store instructions are configured to store data from a cache to a primary memory, and the move instructions are configured to move data between a cache and a cache, or between a cache and a register, or between a register and a register. The data transfer instructions support three different ways of data organization, including matrices, vectors, and scalars.

The Cambricon computational instructions are configured to complete arithmetic operation of a neural network, and include Cambricon matrix operation instructions, Cambricon vector operation instructions, and Cambricon scalar operation instructions.

The Cambricon matrix operation instructions are configured to complete matrix operations in neural networks, including matrix multiply vector operations, vector multiply matrix operations, matrix multiply scalar operations, outer product operations, matrix add matrix operations, and matrix subtract matrix operations.

The Cambricon vector operation instructions are configured to complete vector operations in neural network, including vector elementary arithmetic operations, vector transcendental function operations, dot product operations, random vector generator operations, and maximum/minimum of a vector operation, where the vector elementary arithmetic operations include vector addition operations, subtraction operations, multiplication operations, and division operations. The vector transcendental functions refer to the functions of polynomial equations that cannot take polynomials as coefficients, including but not limited to exponential functions, logarithmic functions, trigonometric functions, and inverse trigonometric functions.

The Cambricon scalar operation instructions are configured to complete scalar operations in neural networks, including scalar elementary arithmetic operations and scalar transcendental function operations, where the scalar elementary arithmetic operations include scalar addition subtraction operations, multiplication operations, and division operations. The scalar transcendental functions refer to the functions of polynomial equations that cannot take polynomials as coefficients, including but not limited to exponential functions, logarithmic functions, trigonometric functions, and inverse trigonometric functions.

The Cambricon logical instructions are configured to complete logical operations of neural networks, including Cambricon vector logical operation instructions and Cambricon scalar logical operation instructions.

The Cambricon vector logical operation instructions include vector comparison operations, vector logical operations, and vector greater than merge operations, where vector comparison operations include but are not limited to "greater than", "less than", "equal to", "greater than or equal to (≥)", "less than or equal to (≤)", and "not equal to". The vector logical operations include "and", "or", and "not".

The Cambricon scalar logical operation instructions include scalar comparison operations and scalar logical operations, where the scalar comparison operations include but are not limited to "greater than", "less than", "equal to", "greater than or equal to (≥)", "less than or equal to (≤)", and "not equal to". The scalar logical operations include "and", "or", and "not".

The lookup table unit 2 receives the lookup control information, the weight dictionary, and the codebook, and performs a table lookup operation on the weight dictionary and the codebook according to the lookup control information to obtain the quantized weights.

The operation unit 3 receives the operation control information and the input neurons, and performs arithmetic operations on the quantized weights and the input neurons according to the operation control information to obtain output neurons for outputting.

The operation unit 3 may include four operation parts: a first operation part is configured to multiply the quantized weights and the input neurons; a second operation part is configured to add the quantized weights and the input neurons through one or more adders (further, the adders may also form an adder tree, so as to realize the operation function of different levels of adder trees); a third operation part is configured to perform a non-linear function operation on the quantized weights and the input neurons; and a fourth operation part is configured to perform a pooling operation on the quantized weights and the input neurons. The present disclosure adopts dedicated SIMD instructions for multi-layer artificial neural network operations and the customized operation unit 3 that are used for local quantization, which may solve the problems of insufficient computing performance of CPU and GPU and large front-end decoding overhead, and may effectively improve support for multi-layer artificial neural network operation algorithms.

FIG. 54E is a schematic diagram of a process of looking up a table according to an example of the present disclosure. As shown in FIG. 54E, the quantized weight is divided into four clusters according to the codebook: a central weight of a cluster coded as 00 is −1.30, a central weight of a cluster coded as 01 is −0.13, a central weight of a cluster coded as 10 is −0.23, a central weight of a cluster coded as 11 is −1.50. According to the weight dictionary, the distribution of weights of the same cluster can be obtained, and the central weight of each cluster is used to replace a corresponding code in the weight dictionary, so as to obtain quantized weights. In the above operation, similarity of the inter-layer weights of the neural network and local similarity of intra-layer weights of the neural network are fully exploited. The weight dictionary and the codebook may be obtained through the quantization steps to look up the table and thus restoring the quantized weights, which is operational and normative.

In order to optimize the processing device of the present disclosure, a storage unit 4, a pre-processing unit 5, and a caching unit 7 are added to make data processing more orderly and facilitate the operation of the processing device. FIG. 54F is a schematic structural diagram of a processing device according to a specific example of the present disclosure. As shown in FIG. 54F, based on an original structure shown in FIG. 54D, the processing device provided in this specific example further includes: the storage unit 4, the pre-processing unit 5, a DMA (direct memory access) unit 6, and the caching unit 7.

The storage unit 4 is configured to store input neurons, a weight dictionary, a codebook, and instructions input from the external, and receive output neurons which are output by the operation unit 3. In addition, the storage unit 4 may also store unquantized weights, where the unquantized weights are directly output to the operation unit 3 through a bypass. Therefore, it can be seen that the processing device of the present disclosure can process not only quantized weights but also unquantized weights, which can be selected according to different actual needs.

The pre-processing unit 5 is configured to pre-process input information which is input from the external to obtain the input neurons, the weight dictionary, the codebook, and the instructions, where the pre-processing includes segmentation, Gaussian filtering, binarization, regularization, normalization, and the like.

The caching unit 7 includes:

an instruction caching unit 71 configured to cache the instructions;

a weight dictionary caching unit 72 configured to cache the weight dictionary;

a codebook caching unit 73 configured to cache the codebook;

an input neuron caching unit 74 configured to cache the input neurons; and an output neuron caching unit 75 configured to cache the output neurons.

After the input data which is input from the external is pre-processed by the pre-processing unit 5, the input neurons, the weight dictionary, the codebook, and the instructions are obtained and output to the storage unit 4 for storage. The DMA unit 6 directly reads the input neurons, the weight dictionary, the codebook, and the instructions from the storage unit 4, outputs the instructions to the instruction caching unit 71 for caching, outputs the weight dictionary to the weight dictionary caching unit 72 for caching, outputs the codebook to the codebook caching unit 73 for caching, and outputs the input neurons to the input neuron caching unit 74 for caching. The control unit 1 decodes the received instructions, and obtains lookup table control information and operation control information for outputting. The lookup table unit 2 performs a table lookup operation on the weight dictionary and the codebook according to the received lookup table control information, obtains the quantized weights, and outputs the quantized weights to the operation unit 3. The operation unit 3 selects an operation part and an operation order of each operation part according to the received operation control information, performs the operation on the quantized weights and the input neurons, obtains the output neurons, and outputs the output neurons to the output neuron caching unit 75. Finally, the output neuron caching unit 75 outputs the output neurons to the storage unit 4 for storage.

The operations of the first operation part specifically includes: multiplying input data 1 (in1) and input data 2 (in2) to obtain an output (out), which is represented as: out=in1*in2.

The second operation part may be composed of one or more adders to implement the addition operation. In addition, a plurality of adders may also form an adder tree to implement operational functions of different levels of adder trees. The operations specifically includes: accumulating the input data 1 (in1) level by level through the adder tree to obtain output data (out1), where the input data 1 may be a vector with the length being N and N is greater than 1, and the process can be represented as: out1=in1[1]+in1[2]+ . . . +in1[N]; or accumulating the input data 1 (in1) through the adder tree, where the in1 may be a vector with the length being N and N is greater than 1, and then adding input data 2 (in2) to obtain second output data (out2), and the process can be represented as: out2=in1[1]+in1[2]+ . . . +in1[N]+in2; or adding the input data 1 (in1) and the input data 2 (in2)

to obtain output data (out3), where both the in1 and the in2 are a numerical value, and the process can be represented as: out3=in1+in2.

The third operation part includes: performing different function operations on the input data (in) through a non-linear function (f) to obtain the output data (out), and the process can be: out=f (in), where the non-linear function includes an activation function and the process can be represented as: out=active (in). The activation function (active) includes, but is not limited to, sigmoid, tan h, relu, and/or softmax.

The fourth operation part includes: performing a pooling operation on the input data (in) to obtain the output data (out), and the process can be represented as: out=pool (in), where pool refers to the pooling operation. The pooling operation includes, but is not limited to, average pooling, maximum pooling, and median pooling. The input data (in) is data in a pooling core related to the output (out).

In the above operations parts, one or more parts may be selected and combined in different orders to realize various operations with different functions. The operation unit 3 of the present disclosure includes, but is not limited to, the above four operation parts, and may further include logical operations such as exclusive OR, inclusive OR, OR, and the like. The operation control information can control one or more operation parts in each of the operation parts and combine the same in different orders to realize various operations with different functions.

In still another aspect of the examples of the present disclosure, a processing method is provided. FIG. 54G is a schematic diagram of steps of a processing method according to an example of the present disclosure. As shown in FIG. 54G, the steps include:

a step S701, receiving input neurons, a weight dictionary, a codebook, and instructions;

where the input neuron, the weight dictionary, the codebook, and the instructions can be information obtained after pre-processing input information of an external input, and the pre-processing includes, but is not limited to, segmentation, Gaussian filtering, binarization, regularization, normalization, and the like; and a step S702, decoding the instructions to obtain lookup control information and operation control information;

where the instructions are dedicated instructions for a neural network and include all instructions dedicated to completing an artificial neural network operation.

The dedicated instructions for the neural network include, but are not limited to, control instructions, data transfer instructions, operation instructions, and logical instructions, where the control instructions are configured to control the execution process of the neural network.

The data transfer instructions are configured to complete data transfer between different storage media; and data formats include, but are not limited to, matrices, vectors and scalars. Operation instructions are configured to complete arithmetic operations of neural network, including but not limited to matrix operation instructions, vector operation instructions, scalar operation instructions, convolution neural network operation instructions, fully connected neural network operation instructions, pooling neural network operation instructions, RBM (Restricted Boltzmann Machine) neural network operation instructions, LRN (Local Response Normalization) neural network operation instructions, LCN (Local Contrast Normalization) neural network operation instructions, LSTM neural network operation instructions, RNN (Recurrent Neural Networks) neural network operation instructions, RELU (Rectified linear unit) neural network operation instructions, PRELU (Parametric Rectified Linear Unit) neural network operation instructions, SIGMOID neural network operation instructions, TAN H neural network operation instructions, and MAXOUT neural network operation instructions. Logical instructions are configured to complete neural network logical operations, including but not limited to vector logical operation instructions and scalar logical operation instructions.

RBM neural network operation instructions are configured to implement RBM neural network operation.

LRN neural network operation instructions are configured to implement LRN neural network operation.

LSTM neural network operation instructions are configured to implement LSTM neural network operation.

RNN neural network operation instructions are configured to implement RNN neural network operation.

RELU neural network operation instructions are configured to implement RELU neural network operation.

PRELU neural network operation instructions are configured to implement PRELU neural network operation.

SIGMOID neural network operation instructions are configured to implement SIGMOID neural network operation.

TAN H neural network operation instructions are configured to implement TAN H neural network operation.

MAXOUT neural network operation instructions are configured to implement MAXOUT neural network operation.

Further, the neural network dedicated instructions include the Cambricon instruction set.

The Cambricon instruction set includes at least one Cambricon instruction. The length of the Cambricon instruction may be 64 bits or be changed according to actual needs. The Cambricon instruction consists of opcodes and operands, and contains four types of instructions, which are Cambricon control instructions, Cambricon data transfer instructions, Cambricon computational instructions, and Cambricon logical instructions.

The Cambricon control instructions are configured to control the execution process, and include jump instructions and conditional branch instructions.

The Cambricon data transfer instructions are configured to complete data transfer between different storage media, and include load instructions, store instructions, and move instructions. The load instructions are configured to load data from a primary memory to a cache, and the store instructions are configured to store data from a cache to a primary memory, and the move instructions are configured to move data between a cache and a cache, or between a cache and a register, or between a register and a register. The data transfer instructions support three different ways of data organization, including matrices, vectors, and scalars.

The Cambricon computational instructions are configured to complete arithmetic operation of a neural network, and include Cambricon matrix operation instructions, Cambricon vector operation instructions, and Cambricon scalar operation instructions.

The Cambricon matrix operation instructions are configured to complete matrix operations in neural network, including matrix multiply vector operations, vector multiply matrix operations, matrix multiply scalar operations, outer product operations, matrix add matrix operations, and matrix subtract matrix operations.

The Cambricon vector operation instructions are configured to complete vector operations in neural network, including vector elementary arithmetic operations, vector transcendental function operations, dot product operations, random vector generator operations, and maximum/minimum of a vector operation, where the vector elementary arithmetic operations include vector addition operations, subtraction operations, multiplication operations, and division operations. The vector transcendental functions refer to the functions of polynomial equations that cannot take polynomials as coefficients, including but not limited to exponential functions, logarithmic functions, trigonometric functions, and inverse trigonometric functions.

The Cambricon scalar operation instructions are configured to complete scalar operations in neural networks, including scalar elementary arithmetic operations and scalar transcendental function operations, where the scalar elementary arithmetic operations include scalar addition subtraction operations, multiplication operations, and division operations. The scalar transcendental functions refer to the functions of polynomial equations that cannot take polynomials as coefficients, including but not limited to exponential functions, logarithmic functions, trigonometric functions, and inverse trigonometric functions.

The Cambricon logical instructions are configured to complete logical operations of neural networks, including Cambricon vector logical operation instructions and Cambricon scalar logical operation instructions.

The Cambricon vector logical operation instructions include vector comparison operations, vector logical operations, and vector greater than merge operations, where vector comparison operations include but are not limited to "greater than", "less than", "equal to", "greater than or equal to (≥)", "less than or equal to (≤)", and "not equal to". The vector logical operations include "and", "or", and "not".

The Cambricon scalar logical operation instructions include scalar comparison operations and scalar logical operations, where the scalar comparison operations include but are not limited to "greater than", "less than", "equal to", "greater than or equal to (≥)", "less than or equal to (≤)", and "not equal to". The scalar logical operations include "and", "or", and "not".

The processing method further includes:

a step S703, according to the lookup control information, looking up the weight dictionary and the codebook to obtain quantized weights, and performing the operation on the quantized weights and the input neurons according to the operation control information to obtain output neurons for outputting.

In addition, in order to optimize the processing method of the present disclosure and make the processing more convenient and orderly, several steps are added to some examples of the present disclosure. FIG. 54H is a schematic diagram of the steps of a processing method according to an example of the present disclosure. As shown in FIG. 54H:

before the step S701, the processing method includes a step S700, preprocessing the input information of the external input to obtain the input neurons, the weight dictionary, the codebook, and the instructions, where the preprocessing includes segmentation, Gaussian filtering, binarization, regularization, normalization, and the like;

after the step S702, the processing method includes:

a step S7021: storing the input neurons, the weight dictionary, the codebook, the instructions, and output neurons; and a step S7022: caching the instructions, the input neurons, the output neurons, the weight dictionary, and the codebook. The subsequent steps are the same as those of the processing method shown in FIG. 51F, and will not be further described herein.

The operation in the step S703 includes: adding the weights and the input neurons, and the addition function is implemented by one or a plurality of adders. In addition, the plurality of adders may also form an adder tree to implement addition of the weights and the input neuron addition level by level; and/or multiplying the weights and the input neurons; and/or performing a non-linear function operation on the weights and the input neurons, where the non-linear function operation includes an activation function and the activation function may be sigmoid, tan h, relu, and/or softmax; and/or performing a pooling operation on the weights and the input neurons, where the weights include quantized weights and unquantized weights, and the pooling operation includes, but is not limited to, average pooling, maximum pooling, and median pooling. The input data (in) is data in a pooling core related to the output (out). In the above operations, one or more operations may be selected and combined in different orders to realize various operations with different functions. The operation steps provided by the present disclosure include, but are not limited to, the above four operations, and may further include logical operations such as OR, exclusive OR, inclusive OR, and the like.

In addition, the processing method may also be used to process unquantized weights, and the unquantized weights and the input neurons may be operated according to the operation control information to obtain output neurons for output.

In an example, the present disclosure also provides a chip which includes the above processing device. The chip may simultaneously perform a plurality of operations on the quantized weights and the unquantized weights to realize diversification of operations. In addition, by using a dedicated on-chip cache for the multi-layer artificial neural network operation algorithm, reusability of the input neurons and the weights is fully exploited, which may avoid repetitive reading of the data to a memory, reduces memory access bandwidth, and avoids a problem of the memory bandwidth becoming a performance bottleneck of multi-layer artificial neural network operations and training algorithms.

In some examples, a chip package structure is disclosed, which includes the above chip.

In some examples, a board card is disclosed, which includes the above chip package structure.

In some examples, an electronic device is disclosed, which includes the above board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance, and/or medical equipment.

The transportation means may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner, and/or an electrocardiograph.

All modules in the examples of the present disclosure may be a hardware structure, and physical implementations of the hardware structure include, but are not limited to, physical devices. The physical devices include, but are not limited to, transistors, memristors, and DNA computers.

In order to make the purpose, technical solutions, and advantages of the present disclosure more clear, the present disclosure is described below in detail with reference to specific examples and with reference to the accompanied drawings.

All modules in the examples of the present disclosure may be a hardware structure, and physical implementations of the hardware structure include, but are not limited to, physical devices. The physical devices include, but are not limited to, transistors, memristors, and DNA computers.

According to the basic concept of the present disclosure, a method for compressing a neural network is provided. The method includes two steps: a first step is coarse-grained pruning and a first retraining, and the other step is local quantization and a second retraining. Compared with traditional methods, the method of the present disclosure regularizes a sparse neural network, which facilitates acceleration using hardware and simultaneously reduces a storage space of a target weight position; local quantization helps to fully exploit the characteristics of weight distribution of the neural network, which reduces a count of bits representing each weight and thus further reduces storage overhead and memory access overhead.

FIG. 54I is a flowchart of a data compression method according to an example of the present disclosure. The data compression method includes:

a step S2701, selecting M weights from the neural network according to a sliding window, and when the M weights satisfy a preset condition, setting all or part of the M weights to 0; performing the first retraining on the neural network, where the weights that have been set to zero during training remain 0; and a step S2702, grouping the weights of the neural network, then clustering and encoding the weights in the groups, and performing the second training on clustered and coded neural network.

The step S2701 can be summarized as coarse-grained pruning and the first training, and may include:

a step S27011, selecting M weights from the weights of the trained neural network through the sliding window; and a step S27012, when the M weights satisfy the preset condition, setting all or part of the M weights to 0.

The preset condition is that an information amount of the M weights satisfies a preset determination condition.

In an optional implementation, the preset determination condition includes a threshold determination condition, where the threshold determination condition may include one or more of: being less than a given threshold, being less than or equal to a given threshold, being greater than a given threshold, being greater than or equal to a given threshold, being within a given value range, or being out of a given value range.

Specifically, in a condition where the information amount of the M weights is less than a given threshold, the information amount of the M weights includes, but is not limited to, an arithmetic mean, a geometric mean, and a maximum value of absolute values of the M weights. The arithmetic mean of the absolute values of the M weights is less than a first threshold; or the geometric mean of the absolute values of the M weights is less than a second threshold; or the maximum value of the absolute values of the M weights is less than a third threshold. For the selection of the first threshold, the second threshold, and the third threshold, those skilled in the art can preset the threshold according to situations, or obtain the threshold from computation by changing input parameters in a preset formula, or obtain the threshold by machine learning. A manner of obtaining the first threshold, the second threshold, and the third threshold is not limited in the present disclosure.

In an optional implementation, the preset determination condition includes a function mapping determination condition, where the function mapping determination condition refers to determining whether the M weights satisfy the given condition after function transformation.

Further, the above neural network includes a fully connected layer, a convolution layer, and a long-short-term memory (LSTM) layer.

As shown in FIG. 51A, in the case where the weight of the fully connected layer can be regarded as a two-dimensional matrix (Nin, Nout), where Nin is the count of input neurons, Nout is the count of output neurons, and the fully connected layer has Nin*Nout weights; and when a size of the sliding window is Bin*Bout, where Bin is an integer greater than 0 and less than or equal to Nin, and Bout is an integer greater than 0 and less than or equal to Nout;

the pruning the weight of the fully connected layer includes:

enabling the sliding window to slide along a direction of Bin according to a stride Sin, or slide along in a direction of Bout according to a stride Sout, where Sin is an integer greater than 0 and less than or equal to Bin, and Sout is an integer greater than 0 and less than or equal to Bout; and selecting M values from the Nin*Nout weights through the sliding window; and when the M weights satisfy the preset condition, setting all or part of the M weights to 0, where M=Bin*Bout.

As shown in FIG. 51B, in the case where the weight of the convolution layer can be regarded as a four-dimensional matrix (Nfin, Nfout, Kx, Ky), where Nfin is the count of input feature maps, Nfout is the count of output feature maps, (Kx, Ky) is the size of a convolution kernel, and the convolution layer has Nfin*Nfout*Kx*Ky weights; and when the sliding window is a four-dimensional sliding window with a size of Bfin*Bfout*Bx*By, where Bfin is an integer greater than 0 and less than or equal to Nfin, Bfout is an integer greater than 0 and less than or equal to Nfout, Bx is an integer greater than 0 and less than or equal to Kx, and By is an integer greater than 0 and less than or equal to Ky;

the pruning the weight of the convolution layer includes:

enabling the sliding window to slide along a direction of Bfin according to a stride Sfin, or slide along a direction of Bfout according to a stride Sfout, or slide along a direction of Bx according to a stride S, or slide along a direction of By according to a stride Sy, where Sfin is an integer greater than 0 and less than or equal to Bfin, Sfout is an integer greater than 0 and less than or equal to Bfout, Sx is an integer greater than 0 and less than or equal to Bx, and Sy is an integer greater than 0 and less than or equal to By; and selecting M weights from the Nfin*Nfout*Kx*Ky weights through the sliding window; and when the M weights satisfy the preset condition, setting all or part of the M weights to 0, where M=Bfin*Bfout*Bx*By.

In the case where the weight of the LSTM layer is composed of weights of m fully connected layers, if the weight of the LSTM layer is composed of weights of i fully connected layers and i is an integer greater than 0, the weight of each of the i fully connected layers is a two-dimensional matrix (Nin_i, Nout_i), where Nin_i represents the count of input neurons of the $i^{th}$ fully connected layer, and Nout_i is the count of output neurons of the $i^{th}$ fully connected layer; and when the size of the sliding window is Bin_i*Bout_i, where Bin_i is an integer greater than 0 and less than or equal to Nin_i, and Bout_i is greater than 0 and less than or equal to Nout_i;

the pruning the weight of the LSTM layer includes:

enabling the sliding window to slide along a direction of Bin_i according to a stride Sin_i, or slide along a direction of Bout_i according to a stride Sout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window; and when the M weights satisfy the preset condition, setting all or part of the M weights to 0, where M=Bin_i*Bout_i.

The method further includes:

a step S27013, retraining the pruned neural network by using a back propagation algorithm, where the weights that have been set to 0 during training remain 0.

The first retraining: retraining the pruned neural network by using the back propagation algorithm, where the weights that have been set to 0 during training remain 0; and repeating coarse-grained pruning and retraining until no weight can be set to 0 without precision loss of x %, where x is a number greater than 0 and less than 100. In an example, a value range of x may be 0-5.

The step S2702 can be summarized as quantization and retraining and may include:

a step S27021, grouping the weights of the neural network;

a step S27022, clustering each group of weights by using a clustering algorithm, dividing a group of weights into m clusters, calculating a central weight of each cluster, and replacing all the weights of each cluster with the central weight corresponding to the cluster, where m is an integer greater than 0;

a step S27023, encoding the central weights to obtain a codebook and a weight dictionary; and a step S27024, retraining the neural network by using the back propagation algorithm, where the weights that have been set to 0 during training remain 0, only the codebook is trained, and the weight dictionary is not trained.

In the step S27021, the grouping the weights of the neural network includes:

grouping the weights of the neural network into a group; and/or grouping the weights of the neural network according to layer types; and/or grouping the weights of the neural network according to an inter-layer structure and/or an intra-layer layer.

FIG. 54E is a schematic diagram of a process of weight quantization according to an example of the present disclosure. As shown in FIG. 54E, the process includes: grouping weights of a neural network according to a grouping strategy to obtain ordered weight matrices; performing an intra-group sampling operation and the clustering operation on the grouped weight matrices, so as to cluster the weights with similar values into a same cluster and obtain four central weights 1.50, −0.13, −1.3, and 0.23, where the four central weights correspond to weights of four clusters; encoding the central weights, specifically, encoding the cluster with a central weight being −1.3 as 00, encoding the cluster with a central weight being −0.13 as 01, encoding the cluster with a central weight being 0.23 as 10, and encoding the cluster with a central weight being 1.50 as 11, all of which are the content of the codebook; and using encoding content (00, 01, 10, and 11) corresponding to the four central weights to represent the weights of the corresponding clusters respectively, so as to obtain the weight dictionary. In this quantization process, similarity of the inter-layer weights of the neural network and local similarity of intra-layer weights of the neural network are fully exploited to obtain the characteristics of weight distribution of the neural network for low-bit quantization, which may reduce the count of bits representing each weight, thus reducing the weight storage overhead and memory access overhead.

Further, a method for selecting a central weight of a cluster is to minimize a cost function $J(w, w_0)$, $$J(w, w_o) = \sum_{i=1}^{n} (w_i - w_0)^2$$

where w refers to all weights of a cluster, w0 refers to a central weight of the cluster, n refers to a count of weights in the cluster, wi refers to an $i^{th}$ weight in the cluster, and i is an integer greater than or equal to 1 and less than or equal to n.

Further, during local quantization, the weights of the neural network are grouped according to data types. For instance, the weights of all the convolution layers are grouped into one group, the weights of all the fully connected layers are grouped into one group, and the weights of all the LSTM layers are grouped into one group.

If a neural network has i convolution layers, j fully connected layers, m LSTM layers, which means the neural network has a total of t different types of layers, where i, j, m are all integers greater than or equal to 0 and satisfy i+j+m>=1, and t is an integer greater than or equal to 1 and satisfies t=i+j+m, then the weights of the neural network are grouped into t groups.

Further, during local quantization, the weights of the neural network are grouped according to the inter-layer structure. For instance, one or a plurality of successive convolution layers are grouped into one group, one or a plurality of successive fully connected layers are grouped into one group, and one or a plurality of successive LSTM layers are grouped into one group.

Further, during local quantization, the weights of the neural network are grouped according to the intra-layer structure so that the convolution layers, the fully connected layers, and the LSTM layers are grouped and quantized internally.

Further, each of the convolution layers of the neural network is a four-dimensional matrix (Nfin, Nfout, Kx, Ky), where Nfin, Nfout, Kx, and Ky are positive integers, Nfin is the count of input feature maps, and Nfout is the count of output feature maps, (Kx, Ky) is the size of convolution kernels. The weights of the convolution layer are grouped into Nfin*Nfout*Kx*Ky/(Mfin*Mfout*Mx*My) different groups according to a group size of (Mfin, Mfout, Mx, My), where Mfin is a positive integer less than or equal to Nfin, Mfout is an integer less than or equal to Nfout, Mx is an integer greater than 0 and less than or equal to Kx, and My is an integer greater than 0 and less than or equal to Ky.

Further, each of the fully connected layers of the neural network is a two-dimensional matrix (Nin, Nout), where both Nin and Nout are integers greater than 0, Nin is the count of input neurons, Nout is the count of output neurons. The fully connected layer has Nin*Nout weights. The weights of the fully connected layer are grouped into (Nin*Nout)/(Min*Mout) different groups according to the group size of (Min, Mout), where Min is an integer greater than 0 and less than or equal to Nin, and Mout is an integer greater than 0 and less than or equal to Nout.

Further, the weights of each of the LSTM layer of the neural network can be regraded as a combination of weights of the plurality of fully connected layers. If the weights of the LSTM layer are composed of weights of n fully connected layer weights, where n is a positive integer, then each LSTM layer may be grouped according to the grouping manner of the fully connected layers.

In another aspect of examples of the present disclosure, a data compression device is provided. FIG. 54C is a schematic structural diagram of a data compression device according to an example of the present disclosure. As shown in FIG. 54C, the device includes:

a memory 1 configured to store operation instructions, where the operation instructions are generally represented in a form of binary numbers and are composed of opcodes and address codes, and the opcodes indicate an operation to be performed by a processor 2 and the address codes indicate an address where the processor 2 can read data involved in the operation from the memory 1; and the processor 2 configured to execute the operation instructions stored in the memory 1 according to the above method for processing weights.

In the data compression device of the present disclosure, according to the coarse-grained pruning and the quantization method, the processor 2 may regularly perform the sparsification on the neural network, reduce parameters of the neural network, and quantize disordered weights to obtain low-bit and normalized quantized weights. Similarity of the inter-layer weights of the neural network and local similarity of intra-layer weights of the neural network are fully exploited to obtain the characteristics of weight distribution of the neural network for low-bit quantization, which may reduce the count of bits representing each weight, thus reducing the weight storage overhead and memory access overhead.

FIG. 55A is a schematic structural diagram of a processing device according to an example of the present disclosure. The present disclosure provides a processing device applied to a neural network processor, so that a neural network processor may fully exploit characteristics of coarse-grained selection and local quantization, reduce memory access and computation amount, thereby obtaining an acceleration ratio and reducing energy consumption.

The processing device of the example of the present disclosure includes a coarse-grained selection unit, a lookup table unit, and an operation unit.

The coarse-grained selection unit is configured to receive input neurons and position information of target weights, and select neurons that need to be computed.

The lookup table unit is configured to receive a target weight dictionary and a target weight codebook, and perform a table lookup operation to obtain the target weights of the neural network.

The operation unit is configured to receive selected neuron and the target weights, complete a neural network operation, and retransfer output neurons to the storage unit.

Further, the coarse-grained selection unit is specifically configured to receive the input neurons and the position information of the target weights, select the neurons corresponding to the target weights (i.e., the selected neurons) according to the position information of the target weights, and transfer the corresponding neurons to the operation unit.

Further, for quantized target weights, the lookup table unit is configured to look up the target weights according to the codebook and the dictionary and transfer the target weights to the operation unit. For unquantized target weights, the lookup table unit is configured to directly transfer the same to the operation unit through a bypass.

Further, the operation performed by the operation unit includes: a first part, multiplying input data 1 and input data 2 to obtain output data; and/or a second part, performing an adder tree operation, which specifically is accumulating the input data 1 level by level through the adder tree, or adding the input data 1 and the input data 2 to obtain output data; and/or a third part, performing an activation function (active) operation on the input data to obtain the output data; and/or a fourth part, performing a pooling operation on the input data, out=pool (in), where pool refers to the pooling operation. The pooling operation includes, but is not limited to, average pooling, maximum pooling, and median pooling. The input data (in) is data in a pooling core related to the output (out). One or more of the above operations parts may be selected and combined in different orders to realize various operations with different functions.

Specifically, the operation unit includes, but is not limited to, three parts: a first part: a multiplier, a second part: an adder tree, and a third part: an activation function unit. The first part multiplies input data 1 (in1) and input data 2 (in2) to obtain an output (out), and the process can be represented as: out=in1*in2. The second part accumulates the input data (in1) through the adder tree level by level to obtain the output data (out), where in1 is a vector with a length being N and N is greater than 1, and the process can be represented as: out=in1 [1]+in1 [2]+ . . . +in1 [N]; and/or the second part accumulates the input data (in1) through the adder tree and then adds the input data (in2) to obtain the output data (out), and the process can be represented as: out=in1 [1]+in1 [2]+ . . . +in1 [N]+in2; or the second part adds the input data (in1) and the input data (in2) to obtain the output data (out), and the process can be represented as: out=in1+in2. The third part performs an activation function (active) operation on the input data (in) to obtain activation output data (out), and the process can be represented as: out=active (in). The activation function (active) may be sigmoid, tan h, relu, softmax, etc. In addition to performing the activation operation, the third part may realize other non-linear functions, for instance, may perform an operation (f) on the input data (in) to obtain the output data (out), and the process can be represented as: out=f (in). The operation unit may further include a pooling unit configured to perform a pooling operation on the input data (in) to obtain the output data (out), and the process can be represented as: out=pool (in), where pool refers to the pooling operation. The pooling operation includes, but is not limited to, average pooling, maximum pooling, and median pooling. The input data (in) is data in a pooling core related to the output (out).

Further, as shown in FIG. 55B, the neural network processor further includes a pre-processing unit configured to pre-process original data. The pre-processing includes data segmentation, Gaussian filtering, binarization, regularization, normalization, and the like.

Further, the storage unit is configured to store neurons, weights, and instructions of the neural network.

Further, when the storage unit stores the weights, only the target weights and the position information of the target weights are stored. When the storage unit stores the quantized target weights, only the target weight codebook and the target weight dictionary are stored.

Further, the processor further includes an instruction control unit configured to receive instructions in the storage unit, decode the instructions, and generate control information to control the coarse-grained selection unit to perform the number selection operation, control the lookup table to perform the operation of looking up the table, and control the operation unit to perform the computation.

Optionally, the above instructions are dedicated instruction for the neural network, and include all instructions dedicated to completing an artificial neural network operation. The dedicated instructions for the neural network include, but are not limited to, control instructions, data transfer instructions, operation instructions, and logical instructions, where the control instructions are configured to control the execution process of the neural network. The data transfer instructions are configured to complete data transfer between different storage media; and data formats include, but are not limited to, matrices, vectors and scalars. Operation instructions are configured to complete arithmetic operations of neural network, including but not limited to matrix operation instructions, vector operation instructions, scalar operation instructions, convolution neural network operation instructions, fully connected neural network operation instructions, pooling neural network operation instructions, RBM (Restricted Boltzmann Machine) neural network operation instructions, LRN (Local Response Normalization) neural network operation instructions, LCN (Local Contrast Normalization) neural network operation instructions, LSTM neural network operation instructions, RNN (Recurrent Neural Networks) neural network operation instructions, RELU (Rectified linear unit) neural network operation instructions, PRELU (Parametric Rectified Linear Unit) neural network operation instructions, SIGMOID neural network operation instructions, TAN H neural network operation instructions, and MAXOUT neural network operation instructions. Logical instructions are configured to complete neural network logical operations, including but not limited to vector logical operation instructions and scalar logical operation instructions.

Specifically, the dedicated instructions for the neural network include the Cambricon instruction set.

A length of each instruction in the Cambricon instruction set is fixed, for instance, the length of an instruction may be 64-bit. The instruction consists of opcodes and operands. The instruction set includes four types of instructions, which are control instructions, data transfer instructions, computational instructions, and logical instructions.

Further, the control instructions are configured to control the execution process, and include jump instructions and conditional branch instructions.

Further, the data transfer instructions are configured to complete data transfer between different storage media, and include load instructions, store instructions, and move instructions. The load instructions are configured to load data from a primary memory to a cache, and the store instructions are configured to store data from a cache to a primary memory, and the move instructions are configured to move data between a cache and a cache, or between a cache and a register, or between a register and a register. The data transfer instructions support three different ways of data organization, including matrices, vectors, and scalars.

Further, the computational instructions are configured to complete arithmetic operation of a neural network, and include matrix operation instructions, vector operation instructions, and scalar operation instructions.

Further, the matrix operation instructions are configured to complete matrix operations in neural network, including matrix multiply vector operations, vector multiply matrix operations, matrix multiply scalar operations, outer product operations, matrix add matrix operations, and matrix subtract matrix operations.

Further, the vector operation instructions are configured to complete vector operations in neural network, including vector elementary arithmetic operations, vector transcendental function operations, dot product operations, random vector generator operations, and maximum/minimum of a vector operation, where the vector elementary arithmetic operations include vector addition operations, subtraction operations, multiplication operations, and division operations. The scalar transcendental functions refer to functions of polynomial equations that cannot take polynomials as coefficients, including but not limited to exponential functions, logarithmic functions, trigonometric functions, and inverse trigonometric functions.

Further, the scalar operation instructions are configured to complete scalar operations in neural networks, including scalar elementary arithmetic operations and scalar transcendental function operations, where the scalar elementary arithmetic operations include scalar addition subtraction operations, multiplication operations, and division operations. The scalar transcendental functions refer to functions of polynomial equations that cannot take polynomials as coefficients, including but not limited to exponential functions, logarithmic functions, trigonometric functions, and inverse trigonometric functions.

Further, the logical instructions are configured to complete logical operations of neural networks, including vector logical operation instructions and scalar logical operation instructions.

Further, the vector logical operation instructions include vector comparison operations, vector logical operations, and vector greater than merge operations, where vector comparison operations include but are not limited to "greater than", "less than", "equal to", "greater than or equal to (≥)", "less than or equal to (≤)", and "not equal to". The vector logical operations include "and", "or", and "not".

Further, the scalar logical operation instructions include scalar comparison operations and scalar logical operations, where the scalar comparison operations include but are not limited to "greater than", "less than", "equal to", "greater than or equal to (≥)", "less than or equal to (≤)", and "not equal to". The scalar logical operations include "and", "or", and "not".

Further, as shown in FIG. 55B, the neural network processing device includes a direct memory access (DMA) unit.

Further, as shown in FIG. 55B, the neural network processing device includes an instruction caching unit, an input weight caching unit, a target weight codebook caching unit, a target weight dictionary caching unit, a target weight position caching unit, and an output neuron caching unit.

Specifically, the storage unit is mainly configured to store neurons, weights, and instructions of the neural network. When the storage unit stores the weights, only the target weights and position data of the target weights are stored. When the storage unit stores the quantized target weights, only the target weight codebook and the target weight dictionary are stored.

Specifically, the DMA unit is configured to read and write data or instructions between the storage unit and the instruction caching unit, or the target weight codebook caching unit, or the target weight dictionary caching unit, or the target weight position caching unit, or the input neuron caching unit, or the output neuron caching unit.

The instruction caching unit is configured to cache the dedicated instructions.

The target weight codebook caching unit is configured to cache the target weight codebook.

The target weight dictionary caching unit is configured to cache the target weight dictionary.

The target weight position caching unit is configured to cache position information of the target weights, and map each connection weight in the input data to a corresponding input neuron one to one.

In a situation, the one-to-one correspondence method used by the target weight position caching unit includes: using 1 to indicate there is a connection, using 0 to indicate there is no connection, and using a string of 0 and 1 formed by the connection state between each group of outputs and all inputs to indicate a connection relationship of the output. In another situation, the one-to-one correspondence method used by the target weight position caching unit may include: using 1 to indicate there is a connection, using 0 to indicate there is no connection, and using a string of 0 and 1 formed by the connection state between each group of inputs and all outputs to indicate a connection relationship of the input. In still another situation, the one-to-one correspondence method used by the target weight position caching unit may include: using a distance from the location of an input neuron where first connection of a group of outputs is to a first input neuron, a distance from a second group of input neurons of the outputs to a previous input neuron, a distance from a third group of input neurons of the outputs to a previous input neuron . . . in a similar fashion, until all inputs of the outputs are exhausted, so as to represent connection relations of the outputs.

The input neuron caching unit is configured to cache the input neurons input to the coarse-grained selection unit.

The output neuron caching unit is configured to cache the output neuron output by the operation unit.

The lookup table unit is configured to receive the target weight codebook and the target weight dictionary and perform the table lookup operation to obtain the target weights. For unquantized target weights, the lookup table unit is configured to directly transfer the same to the operation unit through a bypass.

It should be pointed out that the pre-processing unit, the storage unit, the DMA unit, the instruction caching unit, the instruction control unit, the target weight caching unit, the target weight position caching unit, the input neuron caching unit, the output neuron caching unit, the coarse-grained selection unit, and the operation unit are all physical hardware devices instead of functional software units.

The present disclosure also provides a neural network data compression device which includes a storage device, an instruction decoding device, and a computation device. An instruction sequence of a compressed neural network is stored in the storage device. The instruction sequence, which corresponds to a format compression task, includes control instructions, data transfer instructions, computation instructions, etc., and may control the computation device to complete format conversion of a neural network. The instruction decoding device receives instructions in the storage device and decodes the instruction to generate a control signal to control the computation device. The computation device receives the control signal to perform the above coarse-grained pruning and quantization operations on the neural network. The computation device is configured to execute executable instructions in the storage device according to the data compression method described above.

The present disclosure also provides a method for processing neural network data. As shown in FIG. 56, the processing method includes:

a step S3001, receiving input neurons, a target weight dictionary, a target weight codebook, and instructions, where the target weights are weights whose absolute values are greater than a preset threshold;

a step S3002, decoding the instructions to obtain data selection control information, lookup control information, and operation control information; and a step S3003, selecting the input neurons and the target weights according to the data selection control information, the lookup control information, and the operation control information, and performing an operation on the input neurons and the target weights to obtain output neurons.

In some examples, the processing method further includes: receiving unquantized target weights to perform a neural network operation.

In some examples, the processing method further includes: receiving instructions, and decoding the instructions to generate control information to control the neural network operation.

In some examples, the operation includes at least one of the following: a multiplication operation, which includes multiplying first input data and second input data to obtain data after multiplication; an addition operation, which includes accumulating third input data through an adder tree level by level, or adding the third input data and fourth input data to obtain an output; and an activation function operation, which includes performing the activation function operation on fifth data to obtain output data, where the activation function includes sigmoid, tan h, relu, or softmax functions.

In some examples, the operation further includes a pooling operation, which includes performing the pooling operation on sixth input data to obtain output data. The pooling operation includes average pooling, maximum pooling, and median pooling.

In some examples, the instructions are dedicated instructions for the neural network, which include, but are not limited to, control instructions, data transfer instructions, operation instructions, and logical instructions.

In some examples, the control instructions are configured to control the execution process of the neural network, and include jump instructions and conditional branch instructions.

In some examples, the data transfer instructions are configured to complete data transfer between different storage media, and include load instructions, store instructions, and move instructions.

In some examples, the operation instructions are configured to complete arithmetic operations of neural network, including but not limited to matrix operation instructions, vector operation instructions, scalar operation instructions, convolution neural network operation instructions, fully connected neural network operation instructions, pooling neural network operation instructions, RBM (Restricted Boltzmann Machine) neural network operation instructions, LRN (Local Response Normalization) neural network operation instructions, LCN (Local Contrast Normalization) neural network operation instructions, LSTM neural network operation instructions, RNN (Recurrent Neural Networks) neural network operation instructions, RELU (Rectified linear unit) neural network operation instructions, PRELU (Parametric Rectified Linear Unit) neural network operation instructions, SIGMOID neural network operation instructions, TAN H neural network operation instructions, and MAXOUT neural network operation instructions.

RBM neural network operation instructions are configured to implement RBM neural network operation.

LRN neural network operation instructions are configured to implement LRN neural network operation.

LSTM neural network operation instructions are configured to implement LSTM neural network operation.

RNN neural network operation instructions are configured to implement RNN neural network operation.

RELU neural network operation instructions are configured to implement RELU neural network operation.

PRELU neural network operation instructions are configured to implement PRELU neural network operation.

SIGMOID neural network operation instructions are configured to implement SIGMOID neural network operation.

TAN H neural network operation instructions are configured to implement TAN H neural network operation.

MAXOUT neural network operation instructions are configured to implement MAXOUT neural network operation.

In some examples, the neural network dedicated instructions include the Cambricon instruction set. Each instruction in the Cambricon instruction set has a fixed length, such as 64-bit, and the instruction consists of opcodes and operands.

In some example, the logical instructions are configured to complete logical operations of the neural network, and include vector logical operation instructions and scalar logical operation instructions.

In some examples, the vector logical operation instructions include vector comparison operations, vector logical operations, and vector greater than merge operations, where vector comparison operations include but are not limited to "greater than", "less than", "equal to", "greater than or equal to" (≥), "less than or equal to" (≤), and "not equal to". The vector logical operations include logical "and", logical "or", and logical "not".

In some examples, the scalar logical operation instructions include scalar comparison operations and scalar logical operations, where the scalar comparison operations include but are not limited to "greater than", "less than", "equal to", "greater than or equal to" (≥), "less than or equal to" (≤), and "not equal to". The scalar logical operations include logical "and", logical "or", and logical "not".

In some examples, the processing method includes: preprocessing the input neurons and the position information of the target weights, where the pre-processing includes data segmentation, Gaussian filtering, binarization, regularization, and/or normalization.

In some examples, the processing method further includes: after receiving selected neurons and target weights, storing the input neurons, the weight dictionary, the codebook, and the instructions; and caching the instructions, the input neurons, and the output neurons.

In some examples, the present disclosure discloses a chip which includes the above neural network processing device.

In some examples, a chip package structure is disclosed, which includes the above chip.

In some examples, a board card is disclosed, which includes the above chip package structure.

In some examples, an electronic device is disclosed, which includes the above board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance, and/or medical equipment.

The transportation means may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner, and/or an electrocardiograph.

All modules in the examples of the present disclosure may be a hardware structure, and physical implementations of the hardware structure include, but are not limited to, physical devices. The physical devices include, but are not limited to, transistors, memristors, and DNA computers.

By using the data compression method and the processing method in the present disclosure, a neural network can be compressed regularly with a high compression ratio. The acceleration device integrates a compression method inside to perform compression on the neural network. The acceleration device may fully exploit characteristics of a compressed neural network, reduce memory access and computation amount, thereby obtaining an acceleration ratio and reducing energy consumption.

In this specification, various examples below that describe the principles of the present disclosure are illustrative only and should not be construed in any way as limiting the scope of the disclosure. The following description with reference to the accompanied drawings is used to facilitate a comprehensive understanding of exemplary examples of the present disclosure as defined by the claims and their equivalents. The following description includes a variety of details to facilitate understanding, but these details should be considered merely exemplary. Therefore, those of ordinary skill in the art should understand that various changes and modifications can be made to the examples described herein without departing from the scope and spirit of the present disclosure. In addition, descriptions of well-known functions and structures are omitted for clarity and conciseness. Further, throughout the accompanied drawings, identical reference numerals are used for similar functions and operations. In this disclosure, the terms "includes" and "contains" and derivatives thereof mean inclusion rather than limitation.

The meaning of "row/column" in this specification includes rows or columns, and nouns containing "row/column"; and "row" corresponds to rows, "column" corresponds to columns. For instance, a connection state array of rows/columns in a feature map composed of output neurons and input neurons filters out rows/columns in the feature map used for computation and corresponding weight rows/columns has the following meaning: a connection state array of rows in the feature map composed of output neurons and input neurons filters out rows in the feature map used for computation and the corresponding weight rows, or a connection state array of columns in a feature map composed of output neurons and input neurons filters out columns in the feature map used for computation and corresponding weight columns.

The disclosure provides an operation device, an operation method, and a chip. A structure is first clipped by using a connection state array of a feature map composed of output neurons and input neurons, and then by setting a filtering unit between the input neurons and the output neurons, a feature map involved in subsequent operations in an artificial neural network and weights corresponding to the feature map are filtered out. In this case, computational redundancy and memory access redundancy caused by all input neurons and weights participating in the network operation may be avoided, and the problems of insufficient computing performance of CPU and GPU as well as large front-end decoding overhead may be solved. in addition, reusability of input neurons and weight data can be fully exploited, which may reduce memory access bandwidth, operation amount, and memory access amount, and achieve efficient output.

In order to make purposes, technical solutions, and advantages of the present disclosure clearer, the present disclosure will be described in further detail with reference to specific examples and the accompanied drawings.

In the first example of the present disclosure, an operation device is provided. FIG. 56A is a schematic diagram of functions of a filtering unit of the computation device according to an example of the present disclosure. FIG. 56B is a schematic diagram of functions of a filtering unit of the operation device according to another example of the present disclosure. FIG. 56C is a schematic diagram of functions of a filtering unit of the operation device according to still another example of the present disclosure; FIG. 56D is a schematic diagram of functions of a filtering unit of the operation device according to yet another example of the present disclosure. FIG. 56E is a comparison diagram of operations of a convolution layer in an artificial neural network before the structure is clipped according to an example of the present disclosure; FIG. 56F is a comparison diagram of operations of the convolution layer in the artificial neural network after the structure is clipped according to the example of the present disclosure. FIG. 57 is a schematic structural diagram of the operation device according to a first example of the present disclosure.

Referring to FIGS. 56A to 56D, FIG. 56E, FIG. 56F, and FIG. 57, the operation device includes:

a storage unit 100 configured to store data and instructions;

a caching unit 300, including an input caching unit 310, and an output neuron caching unit 320, where the input caching unit 310 includes an instruction caching unit 311, a weight caching unit 312, and an input neuron caching unit 313;

a filtering unit 400 configured to select a feature map (Input map) and corresponding weights (Kernel) according to a connection state array (Index) of the feature map (input map) composed of the output neurons and the input neurons, and output the feature map and the corresponding weights to an operation unit;

a control unit 500 configured to read dedicated instructions from the instruction caching unit 311, decode the dedicated instructions into operation unit instructions, and input the operation unit instructions to the operation unit;

an operation unit 600 configured to perform a corresponding operation on input data according to the instructions stored in the storage unit 100; and a DMA (direct memory access) unit 200 configured to perform data or instruction reading and writing between the storage unit 100 and the instruction caching unit 311, or the weight caching unit 312, or the input neuron caching unit 313, and the output neuron caching unit 320, and send the connection state array to the filtering unit 400, where the connection state array of the feature map composed of the output neurons and the input neuron is transferred from the storage unit 100 to the filtering unit 400 by the DMA unit 200; the input neurons are sequentially transferred from the storage unit 100 to the filtering unit 400 via the DMA unit 200 and the input neuron caching unit 313; and the weights are sequentially transferred from the storage unit 100 to the filtering unit 400 via the DMA unit 200 and the weight caching unit 312.

Each part of the operation device is described below in detail.

The data stored in the storage unit 100 includes: a feature map composed of input neurons, weights, a connection state array, and output neurons, etc.;

the instruction caching unit 311 is configured to store dedicated instructions;

the weight caching unit 312 is configured to cache the weights;

the input neuron caching unit 313 is configured to cache the input neurons; and the output neuron caching unit 320 is configured to cache the output neurons.

As shown in FIGS. 56A to 56D, the functions of the filtering unit 400 and the operation unit 600 are as follows:

in a case where the weights are not filtered offline, the filtering unit 400 selects a feature map that participates in the subsequent operations and corresponding weights (Kernel) according to a connection state array (Index) of the feature map (Input map) composed of the output neurons and the input neurons; and according to the scale, transfers the input neurons in the feature map that is selected and the corresponding weights to the operation unit 600 at a time or in batches, of which the process corresponds to the situation shown in FIG. 56A; or in the case where the weights are not filtered offline, the filtering unit 400 selects rows/columns in a feature map that participates in subsequent operations and corresponding weight rows/columns according to the connection state array of the row/column in the feature map composed of the output neurons and the input neurons; and according to the scale, transfers the input neurons in the feature map that is selected and the corresponding weights to the operation unit 600 at a time or in batches, of which the process corresponds to the situation shown in FIG. 56C;

in a case where the weights are filtered offline, the filtering unit 400 selects a feature map that participates in the subsequent operations according to the connection state array of the feature map composed of the output neurons and the input neurons; according to the scale, transfers the input neurons in the feature map that is selected to the operation unit 600 at a time or in batches; and directly transfers weights that are filtered offline to the operation unit, of which the process corresponds to the situation shown in FIG. 56B; or in the case where the weights are filtered offline, the filtering unit 400 selects rows/columns in a feature map that participates in subsequent operations and corresponding weight rows/columns according to the connection state array of the row/column in the feature map composed of the output neurons and the input neurons; and according to the scale, transfers the input neurons in the feature map that is selected and the corresponding weights to the operation unit 600 at a time or in batches; and directly transfers the weight rows/columns that are filtered offline to the operation unit 600, of which the process corresponds to the situation shown in FIG. 56D.

Taking the convolution layer as an instance, comparison diagrams of operations of the convolution layer before and after the structure is clipped by the filtering unit is shown in FIGS. 56E and 56F. Before the structure is clipped, all the feature maps (Input map) and weights (Kernel) are involved in the operations. After the filtering operation performed by the filtering unit, only the input neurons that have a connection relationship with output neurons are selected as effective feature maps to participate in subsequent operations, which may reduce the amount of computation and memory access, achieve structural tailoring, improve operation efficiency, and reduce memory access bandwidth.

The tailoring operation performed by the structure of an artificial neural network and representations of the array of the connection state are introduced in details below. FIG. 57A is a schematic structural diagram of a convolution layer of an artificial neural network according to an example of the present disclosure. FIG. 57B is a structural schematic diagram of implementing structure tailoring on an artificial neural network by the filtering unit according to an example of the present disclosure. FIG. 57C is a schematic diagram of implementing the structure tailoring as shown in FIG. 57B by using a representation of the connection state array according to an example of the present disclosure. FIG. 57D is a schematic diagram of implementing the structure tailoring as shown in FIG. 57B by using another representation of the connection state array according to an example of the present disclosure Referring to FIG. 57A, the artificial neural network is mainly based on convolution operations. Taking a convolution layer as an instance, if an input layer is composed of N input neurons $I_1, I_2, \ldots$, IN and an output layer is composed of M output neurons $O_1, O_2, \ldots, O_M$, there are NM weights $W_{ij}$, where i=1, 2, . . . , N and j=1, 2, . . . , M. Before the filtering operation is performed, an output neuron $O_j$ is generated by the feature map $W_{1j}, W_{2j}, \ldots, W_{Nj}$ composed of all the N input neurons and the weights $W_{1j}, W_{2j}, \ldots, W_{Nj}$. The generation process includes: sliding, by $W_{ij}$, on $I_i$ to perform an inner product operation to obtain N intermediate result feature maps, where i=1, 2, . . . , N and the size of each intermediate result feature map is the same as that of $O_j$, and then performing an element-wise addition on the intermediate result feature maps to accumulate into a feature map composed of output neurons, that is, $O_j$. The output neurons in may share a connection state array, or each of the output neurons corresponds to a connection state array. All the NM weights $W_{ij}$ are the weights before being filtered.

The weights may be filtered by the filtering unit, or may be filtered offline in advance.

The connection state array of the feature map composed of the output neurons and the input neurons, that is, Index, may have a plurality of representations. Optionally, a first representation is as follows: for an Index A corresponding to each output neuron, since an input layer includes nodes, A has N bits and the value of each bit is 1 or 0. A value of an $i^{th}$ bit is $A_i$, the value $A_i$ being 1 indicates that there is a connection between $I_i$ and the output neuron, and the value $A_i$ being 0 indicates that there is no connection between $I_i$ and the output neuron. In the filtering unit, the Index is known, and each $I_k$ and each $W_{kj}$ that are obtained from filtering and are configured to calculate the output neuron satisfy: $A_k=1$ and $k\in\{1, 2, \ldots, N\}$. The output neuron is included $O_j$. In addition, 0 can also be used to indicate there is a connection and 1 to indicate there is no connection, and the analysis is the same as above.

A second representation of the connection state array is as follows: for an Index A corresponding to each output neuron, the value of each bit is a non-negative integer. If a feature map composed of the input neurons connected to the output neuron is $I_{k_1}, I_{k_2}, \ldots, I_{k_n}$, n≤N, and $k_1, k_2, \ldots, k_n\in\{1, 2, \ldots, N\}$, values of which are unknown, then the Index A has n bits, the value of a first bit is $A_1$ which indicates a distance between an input neuron where a first connection is located and $I_1$, and the value of a $p_{th}$ bit is $A_P$, where p=2, 3, . . . , n indicating a distance between an input neuron where a current connection is located and an input neuron where a previous connection is located. In the filtering unit, the connection state array is known, and a feature map composed of input neurons that are obtained from filtering and are configured to calculate the output neuron is $I_{k_1}, I_{k_2}, \ldots, I_{k_n}$, and corresponding weights are $W_{k_1j}, W_{k_2j}, \ldots, W_{k_nj}$, all of which satisfy: and $k_1=A_1+1$ and $k_p=A_p+k_{p-1}$. The output neuron is included in $O_j$.

It can be understood that, in addition to the above-mentioned first and second representations, those skilled in the art may also select other representations to represent the connection state array according to requirements.

In order to facilitate understanding of functions of the filtering unit provided by the present disclosure, a specific artificial neural network is described as an instance. Referring to FIG. 57B, N==4, M=2 are used as an instance to introduce a data operation process in the filtering unit. N=4, M=2 refer to that the input layer is composed of four input neurons $I_1, I_2, I_3, I_4$ and the output layer is composed of two outputs $O_1, O_2$.

The convolution layer has four input neurons $I_1, I_2, I_3, I_4$ and two output neurons $O_1, O_2$, all of which are configured to generate weights of $O_1, O_2$ before being filtered, which are $W_{11}, W_{21}, W_{31}, W_{41}$ and $W_{12}, W_{22}, W_{32}, W_{42}$. If the output neurons in each feature map composed of input neurons share a connection state array, a corresponding connection state array of $O_1, O_2$ is $A^{(1)}, A^{(2)}$. A dotted quadrilateral in FIG. 57B represents the weights removed after the structure is clipped, that is, the weights after being filtered are $W_{11}, W_{31}, W_{41}$, and $W_{22}, W_{32}$, and the result is shown in FIG. 57B.

If the first representation is used to represent the connection state array, 1 represents there is a connection, and 0 represents there is no connection:

as shown in FIG. 57C, the Index $A^{(1)}$ corresponding to the output neuron in $O_1$ is 1011. Since $A_1^{(1)}=A_3^{(1)}=A_4^{(1)}=1$, a feature map composed of input neurons that are obtained from filtering for calculating $O_1$ is $I_1, I_3, I_4$, and corresponding weights are $W_{11}, W_{31}, W_{41}$.

If the second representation is used to represent the connection state array:

as shown in FIG. 57D, the Index $A^{(1)}$ corresponding to the output neuron in $O_1$ is 021. Therefore, for $I_1$, $k_1=0+1=1$, $k_2=2+1=3$, and $k_3=1+3=4$; for $O_2$, $k_1=1+1=2$, and $k_2=1+2=3$, then a feature map composed of input neurons that are obtained from filtering for calculating $O_1$ is $I_1, I_3, I_4$, and corresponding weights are $W_{11}, W_{31}, W_{41}$.

Both the above two representations of Index can implement filtering of the feature maps composed of input neurons and the weights.

The operation unit 600 includes, but is not limited to, three parts: a first part: a multiplier, a second part: an adder tree, and a third part: an activation function unit.

The first part (the multiplier) multiplies input data 1 and input data 2 to obtain an output result, and the process can be represented as: out=in1*in2. The input data 1 is denoted as in1, the input data 2 is denoted as in2, and the output result is denoted as out.

The second part (the adder tree) accumulates the input data (in1) through the adder tree level by level to obtain the output data, where in1 is a vector with a length being N and N is greater than 1, and the process can be represented as: out'=in1 [1]+in1 [2]+ . . . +in1 [N]; and/or the second part accumulates the input data (in1) through the adder tree level by level and then adds the input data (in2) to obtain output data, and the process can be represented as: out"=in1 [1]+in1 [2]+ . . . +in1 [N]+in2; or the second part adds the input data (in1) and the input data (in2) to obtain output data, and the process can be represented as: out'"=in1+in2, where out', out", and out'" represent three output results.

The third part (activation function unit) performs an activation function (active) operation on the input data (in) to obtain activation output data (out), and the process can be represented as: out=active (in). The activation function (active) may be sigmoid, tan h, relu, softmax, etc. In addition to performing the activation operation, the third part may realize other non-linear functions, for instance, may perform an operation (f) on the input data (in) to obtain the output data (out), and the process can be represented as: out=f (in). The operation unit may further perform a pooling operation on the input data (in) to obtain the output data (out), and the process can be represented as: out=pool (in), where pool refers to the pooling operation. The pooling operation is performed by a pooling unit which is set in parallel to the activation function unit in the third part. The pooling operation includes, but is not limited to, average pooling, maximum pooling, and median pooling. The input data is data in a pooling core related to the output.

The operation performed by the operation unit includes a neural network operation. The neural network operation includes: a first part, multiplying input data 1 and input data 2 to obtain data after multiplication; the second part, performing an adder tree operation, which specifically is accumulating the input data 1 level by level through the adder tree, or adding the input data 1 and the input data 2 to obtain output data; the third part, performing an activation function operation on the input data to obtain the output data; the fourth part, performing a pooling operation on the input data, which can be represented as out=pool (in), where pool refers to the pooling operation. The pooling operation includes, but is not limited to, average pooling, maximum pooling, and median pooling. The input data (in) is data in a pooling core related to the output (out). One or more of the above operations parts may be selected and combined in different orders to realize various operations with different functions.

FIG. 57E is a flowchart of an operation method of the computation device shown in FIG. 57. FIG. 57F is a flowchart of implementation sub-steps corresponding to a step S808 shown in FIG. 57E. Referring to FIGS. 57, 57E, and 57F, the operation method of the operation device includes:

a step S802, transferring, by the DMA unit 200, input neurons and weights in the storage unit 100 to the input neuron caching unit 313 and the weight caching unit 312, respectively; and simultaneously transferring, by the DMA unit 200, corresponding instructions to the instruction caching unit 311;

a step S804, transferring, by the DMA unit 200, a connection state array in the storage unit 100 to the filtering unit 400; obtaining, by the filtering unit 400, feature maps composed of the input neurons and the weights from the input neuron caching unit 313 and the weight caching unit 312 respectively; filtering, by the filtering unit, the feature maps that participate in subsequent operations and the corresponding weights according to the connection state array; and transferring, by the filtering unit, the same to the operation unit 600;

a step S806, reading, by the control unit 500, dedicated instruction from the instruction caching unit 311; decoding, by the control unit 500, the dedicated instructions into operation unit instructions; and inputting, by the control unit 500, the operation unit instructions to the operation unit 600; and a step S808, retrieving, by the operation unit 600, the filtered feature maps and the weights; and performing, by the operation unit 600, operations on the same to obtain output neurons.

Based on the above steps, the operation process of the operation unit 600 can be divided into the following sub-steps:

a sub-step S808*a*, multiplying the input neurons in the feature maps composed of the filtered input neurons and the corresponding weights to obtain results of multiplying each piece of data and the weights;

a sub-step S808*b*, performing the adder tree operation on the results of multiplying each piece of data and the weights to obtain a weighted sum, and adding a bias to the weighted sum or not as needed;

a sub-step S808*c*, performing the activation function operation on the weighted sum obtained in the previous step to obtain the output neurons.

The process further includes:

a step S810, putting, by the operation unit 600, obtained output neurons into the output neuron caching unit 320; and a step S812, transferring, by the DMA unit 200, data in the output neuron caching unit 320 to the storage unit 100.

The above steps are repeated until an output of a final layer of the network is obtained.

It is worth emphasizing that the input neurons and the output neurons mentioned in the present disclosure refer to neurons of any two adjacent layers in the network rather than neurons in the input layer and output layer of the entire neural network. The neurons in a lower layer of a front end of the network feed-forward operation are input neurons, and the neurons in an upper layer of a back end of the network feed-forward operation are output neurons. Specifically, if a convolutional neural network is set to have L layers and K=1, 2, . . . , L−1, $K^{th}$ a layer is regarded as the input layer, where the neurons of the $K^{th}$ layer are the input neurons, and a $K+1^{th}$ layer is considered as the output layer, where the neurons of the $K+1^{th}$ layer are the output neurons. In other words, each layer except a last layer can be used as an input layer, a next layer is the corresponding output layer, and the count of neurons of each layer is known.

As mentioned above, the weights can be filtered by the filtering unit or can be filtered offline in advance. In the first example, the weights are filtered by the filtering unit. In the second example of the present disclosure, another computation device is provided and is suitable for the case where the weights are filtered offline instead of being filtered by the filtering unit. FIG. 58A is a schematic structural diagram of an operation device according to the second example of the present disclosure. As shown in FIG. 58A, each module/unit included in the operation device provided in this example is the same as that of the first example. The difference between the second example and the first example is that the function of the filtering unit 400 is different. In this example, the weights are not filtered by the filtering unit 400, but are directly transferred from the weight caching unit 312 to the operation unit 600.

The operation method corresponding to the operation device shown in this example, still referring to FIGS. 57E and 57F, is substantially the same as the operation method of the operation device in the first example, and only the step S804 is replaced with the following step:

a step S804', transferring, by the DMA unit 200, the connection state array in the storage unit 100 to the filtering unit 400; obtaining, by the filtering unit 400, the feature maps composed of the input neurons from the input neuron caching unit 313; filtering, by the filtering unit 400, feature maps that participate in subsequent operations according to the connection state array; transferring, by the filtering unit 400, the feature maps that participate in subsequent operations to the operation unit 600; and simultaneously transferring the weights that are filtered offline from the weight caching unit 312 to the operation unit 600.

Both the operation devices shown in the above two examples read the weights and the feature maps composed of the input neurons from the weight caching unit 312 and the input neuron caching unit 313 respectively, and transfer the same to the filtering unit 400. In actual operations, the weights and the feature maps composed of the input neurons may also be directly read into the filtering unit 400 from the DMA unit 200. In this case, an operation device is also provided in a third example of the present disclosure.

FIG. 58B is a schematic structural diagram of an operation device according to the third example of the present disclosure. As shown in FIG. 58B, the operation device provided in this example has the same modules/units as the first example does, while the differences between the operation device of this example and the operation device of the first example include the following two points.

1. Position setting: the filtering unit 400 is set to be directly connected to the DMA unit 200. The weights and the feature maps composed of the input neurons are directly transferred from the DMA unit 200 to the filtering unit 400 for filtering, and are then respectively transferred to the weight caching unit 312 and the input neuron caching unit 313, and finally to the operation unit 600.

2. Function setting: an additional data processing path for filtering weights offline is set in the device of this example. In this case, in addition to being filtered by the filtering unit 400, and then being transferred to the weight caching unit 312 and finally to the operation unit 600, can also be directly transferred to the operation unit 600 through the weight caching unit 312, where the latter situation is applicable to the weights that are already filtered offline.

Based on the above settings, the operation device provided in the third example can simultaneously implement data processing with and without filtering the weights offline. Referring to FIG. 57E, FIG. 57F, the operation method of the operation device provided in the first example, a method of the operation device provided in the third example may be obtained by merely replacing S803 and S804 with the following steps:

a step S802", transferring, by the DMA unit 200, the instructions in the storage unit 100 to the instruction caching unit 311;

a step S804"*a*, transferring, by the DMA unit 200, the connection state array in the storage unit 100, the feature maps composed of the input neurons, and the weights to the filtering unit 400; filtering, by the filtering unit 400, the feature maps that participate in subsequent operations and the corresponding weights respectively according to the connection state array; and transferring, by the filtering unit, the input neurons in the filtered feature maps composed of the input neurons and the corresponding weights to the input neuron caching unit 313 and the weight caching unit 312 respectively; and a step S804"*b*, transferring, by the DMA unit 200, the connection state array in the storage unit 100 and the feature maps composed of the input neurons to the filtering unit 400; filtering, by the filtering unit 400, the feature maps configured to perform computations to obtain the output neurons according to the connection state array; transferring, by the filtering unit 400, the input neurons in the filtered feature maps to the input neuron caching unit 313; and simultaneously transferring, by the DMA unit 200, the filtered weights in the storage unit 100 to the weight caching unit 312.

The execution process of the above steps is as follows: if the weights are not filtered offline, the step S804"*a* is performed after the step S802"; and if the weights are filtered offline, the step S804"*b* is performed after the step S802".

In an example, the above operation device further includes a connection relationship generation unit configured to generate a connection relationship according to the input neurons, the weights, and the output neurons.

In an example, the connection relationship generation unit is independent of the operation device, and may be included in a main processor, while the operation device is included in a co-processor; or the connection relationship generation unit may be included in the co-processor, and the operation device is included in the main processor and the co-processor.

A fourth example of the present disclosure provides an electronic device which includes a board card. The board card includes a chip package structure, the chip package structure includes a chip, and the chip includes the operation device provided in the example of the present disclosure.

In practical applications, the electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a transportation means, a household electrical appliance, medical equipment, and the like.

The transportation means may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner, and/or an electrocardiograph.

In summary, the examples of the present disclosure provide an operation device and an operation method. By setting the filtering unit between the input neurons and the output neurons, the structure is clipped by using a connection state array of a feature map composed of output neurons and input neurons, and the feature maps that participate in the subsequent operations and the corresponding weights in the artificial neural network are selected after the structure is clipped. In this case, the redundancy of operation amount and memory access caused by all input neurons and weights participating in the network operation may be avoided, and the operation device and the operation method are applicable to both the situations where the weights are filtered offline and are not filtered offline. In addition, the problems of insufficient computing performance of CPU and GPU as well as large front-end decoding overhead may be solved, the reusability of input neurons and weight data can be fully exploited, which may reduce memory access bandwidth, operation amount, and memory access amount, and achieve efficient output.

The present disclosure also discloses a device for performing an artificial neural network forward operation. In an optional example, the device may be set in the computation device shown in FIG. 2A, FIG. 1, or FIG. 6A. In practical applications, the device may also be set in the artificial neural network computation device for sparse connection. The computation device or the computing chip for performing the artificial neural network forward operation may also form a neural network processing system. In practical applications, the device for performing the artificial neural network forward operation may also be set in another chip, computation device, or processor in the field of neural network, where the computation device may also include a fixed-point data conversion module and a corresponding fixed-point data operation module. The fixed-point data conversion module includes a floating-point data statistics module and a data conversion unit. The computation device shown in FIG. 2A may also include units or modules as shown in FIG. 59 or FIG. 60. The floating-point data statistics module is used for statistics and calculation to obtain exponential bit offsets required for storing various types of data in the artificial neural network forward operation and the count of bits required in the exponential bit; the floating-point data conversion unit is configured to implement conversion between short-bit floating-point data types and long-bit floating-point data types, such as the conversion of 32-bit floating-point data type; and the floating-point data operation module is configured to complete various operations required by short-bit floating-point data.

The "long-bit floating-point data" refers to original floating-point data, such as 32-bit floating-point data, or standard 64-bit or 16-bit floating-point data, etc., and 32-bit is only used as a specific example for description herein; and "floating-point data with short bits", also known as "short-bit floating-point data", refers to floating-point data that is represented with fewer bits compared to the original floating-point data.

The forward operation of a multi-layer artificial neural network according to the example of the present disclosure includes a plurality of neurons of two or more layers. Data required in the forward operation, such as input neurons, weights, and biases, is represented by the short-bit floating-point data type and participates in operations among various layers.

FIG. 59 shows a specific representation method of a short-bit floating-point data structure for storing data according to an example of the present disclosure. The bit 1 is used to represent a sign, M bits are used to represent an exponent part, and the N bits are used to represent a significant bit part. Since the floating-point representation requires that a significant value in the first bit cannot be 0, then for a binary representation, the value can only be 1. Therefore, the bit 1, as the most significant bit in the significant bits can be used as a hidden bit and is not written into a memory, so the actual count of significant bits of floating-point data are (N+1) bits. Compared with the 32-bit floating-point data representation, the short-bit floating-point data representation used in the present disclosure not only occupies fewer bits, but also sets two additional flag bits including a flag bit offset and a flag bit EL for data of the same layer and the same type in the neural network, such as all the weight data of a first convolution layer. The flag bit offset is used to record an initial offset of the exponent bit, and the actual representation of the exponent bit=data represented in the exponent bit+offset; and the flag bit EL is used to record the count of M bits occupied by the exponent bit, then the count of bits occupied by the significant bits N=X−1−M.

FIG. 60A is an exemplary block diagram of a device for performing an artificial neural network forward operation. As shown in FIG. 60A, the device includes:

a floating-point data statistics module 11 configured to perform data analysis on input neurons, weights, and/or biased data in the neural network forward operation to obtain an exponent bit offset of the floating-point data and a length EL of the exponent bit;

a floating-point data conversion module 12 configured to convert the input neuron, weight and/or biased data from the long-bit floating-point data type to the short-bit floating-point data type according to the exponent bit offset of the floating-point data and the length EL of the exponent bit; and a floating-point data operation module 13 configured to perform the artificial neural network forward operation according to the input neurons, the weights, and/or the biased data that are converted to data of the short-bit floating-point data type.

FIG. 60 is an exemplary block diagram of a floating-point data statistics module which includes a data extraction unit 21, a statistics unit 22, and an analysis unit 23. This module is configured to extract all long-bit floating-point data in a neural network represented by the long-bit floating-point data type, such as input neurons, weights, and/or biased data, and analyze the long-bit floating-point data to obtain the exponential bit offset and the length EL of the exponent bit required by various types of data (such as the input neurons, the weights, and the offset data) represented by the short-bit floating-point data type in the neural network, so as to facilitate the forward operation of the short-bit floating-point data.

The data extraction unit 21 is configured to extract data of various types in the process of the forward operation of the long-bit floating-point data; the statistics unit 22 is configured to analyze a data range of data of the same type and data distribution of each data segment; and the analysis unit 23 is configured to obtain the exponent bit length EL and the exponent bit offset that should be set when the short-bit floating-point data type is used to represent each type of data according to statistical results obtained by the statistics unit 22. The setting of the exponent bit length EL enables the representable data range to include all data of this type.

In a feasible example, the device for performing the artificial neural network forward operation obtains data of various types including input neurons, weights, and biased data represented by the long-bit floating-point data type from another unit or device such as a CPU; then analyzes the data range data of the same type and the distribution of each data segment; and according to the statistical results, obtains the exponent bit length EL and the exponent bit offset that should be set when the short-bit floating-point data type is used to represent each type of data or each type of data of each layer; or the device for performing the artificial neural network forward operation obtains the exponent bit length EL and the exponent bit offset that should be set when the short-bit floating-point data type is used to represent each type of data or each type of data of each layer in the artificial neural network from another unit or device such as the CPU.

FIG. 61 is an exemplary block diagram of a short-bit floating-point computation part of a forward operation module. The computation part includes an operation caching unit 31, a data conversion unit 32, and a rounding unit 33. The operation caching unit 31 is configured to store intermediate results of the forward operation represented by a data type with higher precision, because in the forward operation, the addition or multiplication operation may lead to extension of the data range; after the operation is completed, the data beyond the precision range represented by the short-bit floating-point data type is subject to a rounding operation, and then the data stored in the operation caching unit is converted from the long-bit floating-point data type to the short-bit floating-point by the data conversion unit 32.

The rounding unit 33 can perform a rounding operation on the data exceeding the short-bit floating-point precision range. This rounding unit may be a random rounding unit, a rounding to the nearest integer unit, a rounding up unit, a rounding down unit, and a rounding off unit. Different rounding units can be used to perform different rounding operations on data beyond the representation precision range of the short-bit floating-point data type.

The random rounding unit performs the following operations:

$$y = \begin{cases} \lfloor x \rfloor & w.p.\ 1 - \frac{x - \lfloor x \rfloor}{\varepsilon} \\ \lfloor x \rfloor + \varepsilon & w.p.\ \frac{x - \lfloor x \rfloor}{\varepsilon} \end{cases};$$

where Y represents the short-bit floating-point data after random rounding, x represents the long-bit floating-point data before random rounding, ε is a smallest positive integer that the current short-bit floating-point data type can represent, i.e., $2^{offset-(X-1-EL)}$, $\lfloor x \rfloor$ represents the short-bit floating-point data obtained by directly truncating the original data (equivalent to performing a rounding down operation on the decimal); w.p. represents a probability, i.e., the probability that the randomly rounded data y is $\lfloor x \rfloor$ is $$1 - \frac{x - \lfloor x \rfloor}{\varepsilon},$$

and the probability that the randomly rounded data is $\lfloor x \rfloor + \varepsilon$ is $$\frac{x - \lfloor x \rfloor}{\varepsilon}.$$

The rounding to the nearest integer unit performs the following operations:

$$y = \begin{cases} \lfloor x \rfloor & \text{if } \lfloor x \rfloor \le x \le \lfloor x \rfloor + \frac{\varepsilon}{2} \\ \lfloor x \rfloor + \varepsilon & \text{if } \lfloor x \rfloor + \frac{\varepsilon}{2} \le x \le \lfloor x \rfloor + \varepsilon \end{cases};$$

where y represents the short-bit floating-point data after rounding to the nearest integer, x represents the long-bit floating-point data before rounding to the nearest integer, and ε is the smallest positive integer that the current short-bit floating-point data type can represent, i.e., $2^{offset-(X-1-EL)}$, $\lfloor x \rfloor$ is an integer multiple of ε, of which the value is the maximum number less than or equal to x.

The rounding up unit performs the following operations:

$$y = \lceil x \rceil;$$

where y represents the short-bit floating-point data after rounding up, x represents the long-bit floating-point data before rounding up, $\lceil x \rceil$ is an integer multiple of ε, of which the value is the minimum number more than or equal to x; and ε is the smallest positive integer that the current short-bit floating-point data type can represent, i.e., $2^{offset-(X-1-EL)}$.

The rounding down unit performs the following operations:

$$y = \lfloor x \rfloor;$$

where y represents the short-bit floating-point data after rounding down, x represents the long-bit floating-point data before rounding down, [x] is an integer a plurality of ε, of which the value is the maximum number less than or equal to x; and ε is the smallest positive integer that the current short-bit floating-point data type can represent, i.e., $2^{offset-(X-1-EL)}$.

The rounding off unit performs the following operations:

$$y = [x];$$

where y represents the short-bit floating-point data after rounding off, x represents the long-bit floating-point data before rounding off, and [x] represents the short-bit floating-point number obtained by directly rounding off the original data x.

The present disclosure further discloses a method of performing an artificial neural network forward operation. The method includes specific steps of:

obtaining data represented by the long-bit floating-point data type of each layer of the neural network through a trained long-bit floating-point model of the neural network, where the data includes the weights, biases, input neurons, output neurons, and other data parameters of each layer; and performing statistical analysis respectively on the data of different layers and different types to obtain the various parameters required when the short-bit floating-point data type is used to represent data of different layers and different types where the parameters include the bit width of the exponent bit, the bit width of the significant bit, and the data range to be represented by the exponent bit, and the like.

The short-bit floating-point data type obtained by statistical analysis is used for the neural network forward operation, that is, all data in the neural network forward operation is represented by the short-bit floating-point data type. Simultaneously, a copy represented by long-bit floating-point data type is reserved for the weights and biased data of the neural network, and then a forward operation is performed. For the forward operation, some operations such as the addition operation and the multiplication operation may cause extension of the data range. Therefore, a cache space is needed to store intermediate computation results in the format of long-bit floating-point data, and after the computation is completed, the intermediate computation results are converted back to the corresponding short-bit floating-point data format. The process of converting the long-bit floating-point data type to the short-bit floating-point data type requires a rounding operation including random rounding, rounding to the nearest integer, rounding up, rounding down, rounding off, and the like.

The specific operations of random rounding includes:

$$y = \begin{cases} \lfloor x \rfloor & w.p.\ 1 - \frac{x - \lfloor x \rfloor}{\varepsilon} \\ \lfloor x \rfloor + \varepsilon & w.p.\ \frac{x - \lfloor x \rfloor}{\varepsilon} \end{cases};$$

where Y represents the short-bit floating-point data after random rounding, x represents the long-bit floating-point data before random rounding, ε is a smallest positive integer that the current short-bit floating-point data type can represent, i.e., $2^{offset-(X-1-EL)}$, $\lfloor x \rfloor$ represents the short-bit floating-point data obtained by directly truncating the original data (equivalent to performing a rounding down operation on the decimal); w.p. represents a probability, i.e., the probability that the randomly rounded data y is $\lfloor x \rfloor$ is $$1 - \frac{x - \lfloor x \rfloor}{\varepsilon},$$

and the probability that the randomly rounded data is $\lfloor x \rfloor+\varepsilon$ is $$\frac{x-\lfloor x\rfloor}{\varepsilon}.$$

The specific operations of rounding to the nearest integer includes:

$$y=\begin{cases}\lfloor x\rfloor & \text{if } \lfloor x\rfloor \le x \le \lfloor x\rfloor+\frac{\varepsilon}{2}\\ \lfloor x\rfloor+\varepsilon & \text{if } \lfloor x\rfloor+\frac{\varepsilon}{2} \le x \le \lfloor x\rfloor+\varepsilon\end{cases};$$

where y represents the short-bit floating-point data after rounding to the nearest integer, x represents the long-bit floating-point data before rounding to the nearest integer, and ε is the smallest positive integer that the current short-bit floating-point data type can represent, i.e. $2^{offset-(X-1-EL)}$, $\lfloor x \rfloor$ is an integer multiple of ε, of which the value is the maximum number less than or equal to x.

The specific operations of rounding up includes $y=\lceil x\rceil;$ where y represents the short-bit floating-point data after rounding up, x represents the long-bit floating-point data before rounding up, $\lceil x \rceil$ is an integer multiple of ε, of which the value is the minimum number more than or equal to x; and ε is the smallest positive integer that the current short-bit floating-point data type can represent, i.e., $2^{offset-(X-1-EL)}$.

The specific operations of rounding down includes:

$y=\lfloor x\rfloor;$ where y represents the short-bit floating-point data after rounding down, x represents the long-bit floating-point data before rounding down, $\lfloor x \rfloor$ is an integer multiple of ε, of which the value is the maximum number less than or equal to x; and ε is the smallest positive integer that the current short-bit floating-point data type can represent, i.e., $2^{offset-(X-1-EL)}$.

The specific operations of rounding off includes:

$y=[x];$ where y represents the short-bit floating-point data after rounding off, x represents the long-bit floating-point data before rounding off, and [x] represents the short-bit floating-point number obtained by directly rounding off the original data x.

After the forward operation is completed, in the process of backward operation, data represented by the short-bit floating-point data type in the forward operation needs to be converted to data represented by the long-bit floating-point data type for the backward operation, where the weights and the biased data participating in the backward operation adopt a copy represented by the long-bit floating-point data type reserved during the forward operation. After the backward operation ends, the data represented by the long-bit floating-point data type is converted to the data represented by the short-bit floating-point data type for subsequent forward operation. Simultaneously, the copy of the long-bit floating-point data type is still reserved for the weights and the biased data of the neural network during the forward operation. The rounding operation is needed during the conversion process, and the process is the same as that of the rounding operation in the forward operation described above.

The forward and backward operations as described above are repeated until the neural network training is completed.

FIG. 62 is a flowchart of a forward operation of a single-layer artificial neural network according to an example of the present disclosure. This flowchart describes the process of a single-layer neural network forward operation implemented by a device and an instruction set of the present disclosure. The operation process is implemented in the computation device shown in FIG. 4A, FIG. 5, or FIG. 6A. For each layer, a weighted sum of input neuron vectors is obtained to calculate intermediate result vectors of this layer, and the intermediate result vectors are biased and activated to obtain output neuron vectors, where the output neuron vectors are used as input neuron vectors of a next layer.

FIG. 63 schematically shows a block diagram of an operation process according to an example of the present disclosure. All the data represented by the short-bit floating-point data type except the weight and the biased data obtained by a forward operation module 51 in the forward operation need to be first converted to data of the long-bit floating-point data through a short-bit to long-bit floating-point data conversion unit 53 for a backward operation. After the backward operation performed by the backward operation module 53 is completed, a long-bit to short-bit floating-point data conversion unit 54 converts the data represented by the long-bit floating-point data type into the data represented by the short-bit floating-point data type. During the conversion process, data beyond the precision range that can be represented by the short-bit floating-point data type needs to be subject to the rounding operation. The rounding operation is performed by a rounding unit 55, and the process is the same as that of the rounding operation performed by the rounding unit in FIG. 62.

It should be noted that the forward operation can also adopt input neurons, weights, and/or biased data represented by the long-bit floating-point data type, and the backward training can also adopt input neurons, weights, and/or biased data represented by the short-bit floating-point data type.

It should be noted that the short-bit floating-point data type is relative to the long-bit floating-point data type. When the short-bit floating-point data type is a 16-bit floating-point data type, the long-bit floating-point data type can be a 32-bit floating-point data type or a 64-bit floating-point data type; when the short-bit floating-point data type is a 32-bit floating-point data type, the long-bit floating-point data type is a 64-bit floating-point data type.

By representing data of forward operation by the short-bit floating-point data type, the data range space of the short-bit floating-point data type is fully utilized. Compared with the long-bit floating-point data representation, the space required for storage of network parameters is greatly reduced and the area-to-power ratio of the hardware is optimized.

The present disclosure provides a device for performing a forward operation of artificial neural network. In an optional example, the device may be set in the computation device as shown in FIG. 2A, FIG. 1, or FIG. 6A. In practical applications, the device may also be set in the computation device for sparsely connected artificial neural network. The computation device or the computing chip in which the device for performing the artificial neural network forward operation is set may also form a neural network processing system. In practical applications, the device for performing the artificial neural network forward operation may also be set in other chips, computation devices, or processors in the field of neural network, where the computation devices may also include a fixed-point data conversion module and a corresponding fixed-point data operation module, which includes a fixed-point data conversion module and a corresponding fixed-point data operation module, where the fixed-point data conversion module includes a floating-point data statistics module and a data conversion unit. The computation device shown in FIG. 2A may further include modules or units of the device shown in FIG. 64, FIG. 65, and FIG. 66. The floating-point data statistics module is configured to perform a statistical analysis and computation on various types of data required for the forward operation of artificial neural network to obtain a decimal point location; the data conversion unit is configured to convert data between the long-bit floating-point data type and the short-bit fixed-point data type according to the decimal point location; and the fixed-point operation module is configured to complete various forward operations required for short-bit fixed-point data.

The "long-bit floating-point data" refers to original floating-point data, such as 32-bit floating-point data, or standard 64-bit or 16-bit floating-point data, etc., and 32-bit is only used as a specific example for description herein; and "fixed-point data with short bits", also known as "short-bit fixed-point data", refers to fixed-point data that is represented with fewer bits compared to the original floating-point data.

The forward operation of a multi-layer artificial neural network according to the example of the present disclosure includes a plurality of neurons of two or more layers. Data required in the forward operation, such as input neurons, weights, and biases, is represented by the short-bit fixed-point data type and participates in operations among various layers.

FIG. 64 illustrates a specific representation method of the short-bit fixed-point data structure used for data storage according to an example of the present disclosure, where the bit 1 is used to represent a sign, M bits are used to represent an integer part, and N bits are used to represent a decimal part. Compared with the 32-bit floating-point data representation, the short-bit fixed-point data representation not only occupies fewer bits, but also sets a flag bit Point location to record the location of decimal point for the data of the same layer and the same type in the neural network such as all weight data of a first convolution layer, which can adjust the precision and representable data range of the data representation according to actual distribution of data.

FIG. 65A is a schematic block diagram of the device for performing the forward operation of the artificial neural network. As shown in FIG. 65A, the device includes:

a floating-point data statistics module 11 configured to perform data analysis on input neurons, weights, and/or biased data in the forward operation of the artificial neural network to obtain a decimal point location of the fixed-point data;

a floating-point data statistics module 12 configured to convert the input neurons, the weights, and/or the biased data from the long-bit floating-point data type to the short-bit fixed-point data type according to the decimal point location of the fixed-point data; and a fixed-point data statistics module 13 configured to perform the forward operation of the artificial neural network according to the input neurons, the weights, and/or the biased data converted to short-bit fixed-point data type.

FIG. 65 illustrates an exemplary block diagram of the floating data statistics module which includes a data extraction unit 21, a statistics unit 22, and an analysis unit 23. This module is configured to extract all long-bit floating-point data such as input neurons, weights, and/or biased data in a neural network by using the long-bit floating-point data type, and analyze the long-bit floating-point data to obtain the decimal point location required by each type of data in a neural network represented by the short-bit fixed-point data type, so as to facilitate subsequent forward operation of short-bit fixed-point data.

The data extraction unit 21 is configured to extract various data of various types in the forward operation of long-bit floating-point data; the statistics unit 22 is configured to analyze a data range for data of the same type and a data distribution of each data segment; the analysis unit 23 is configured to obtain the decimal point location that should be set for each type of data represented by the short-bit fixed-point data type according to statistical results obtained by the statistics unit 23.

In a feasible example, the device for performing the artificial neural network forward operation obtains data of various types including input neurons, weights, and biased data represented by the long-bit floating-point data type from another unit or device such as a CPU; then analyzes the data range data of the same type and the distribution of each data segment; and according to the statistical results, obtains the decimal point location that should be set when the short-bit fixed-point data type is used to represent each type of data or each type of data of each layer; or the device for performing the artificial neural network forward operation obtains the exponent bit length EL and the exponent bit offset that should be set when the short-bit floating-point data type is used to represent each type of data or each type of data of each layer in the artificial neural network from another unit or device such as the CPU.

FIG. 66 is an exemplary block diagram of a short-bit fixed-point computation part of a forward operation module. The computation part includes an operation caching unit 31, a data conversion unit 32, and a rounding unit 33. The operation caching unit 31 is configured to store intermediate results of the forward operation represented by a data type with higher precision, because in the forward operation, the addition or multiplication operation may lead to extension of the data range; after the operation is completed, the data beyond the precision range represented by the short-bit fixed-point data type is subject to a rounding operation, and then the data stored in the operation caching unit is converted from the long-bit floating-point data type to the short-bit fixed-point by the data conversion unit 32.

The rounding unit 33 is configured to perform a rounding operation on the data beyond the short-bit floating-point precision range. This rounding unit may be a random rounding unit, a rounding to the nearest integer unit, a rounding up unit, a rounding down unit, a rounding off unit, and the like. Different rounding units can be used to perform different rounding operations on data beyond the representation precision range of the short-bit floating-point data type.

The random rounding unit performs the following operations:

$$y = \begin{cases} \lfloor x \rfloor & w.p.\ 1 - \dfrac{x - \lfloor x \rfloor}{\varepsilon} \\ \lfloor x \rfloor + \varepsilon & w.p.\ \dfrac{x - \lfloor x \rfloor}{\varepsilon} \end{cases};$$

where y represents the short-bit fixed-point data after random rounding, x represents the long-bit floating-point data before random rounding, ε is the smallest positive integer that the current short-bit fixed-point data type can represent, i.e., $2^{-Point\_location}$, $\lfloor x \rfloor$ represents the short-bit fixed-point data obtained by directly truncating the original data (equivalent to performing a rounding down operation on the decimal); w.p. represents a probability, i.e., the probability that the randomly rounded data y is $\lfloor x \rfloor$ is $$1 - \frac{x - \lfloor x \rfloor}{\varepsilon},$$

and the probability that the randomly rounded data is $\lfloor x \rfloor + \varepsilon$ is $$\frac{x - \lfloor x \rfloor}{\varepsilon}.$$

The rounding to the nearest integer unit performs the following operations:

$$y = \begin{cases} \lfloor x \rfloor & \text{if } \lfloor x \rfloor \le x \le \lfloor x \rfloor + \frac{\varepsilon}{2} \\ \lfloor x \rfloor + \varepsilon & \text{if } \lfloor x \rfloor + \frac{\varepsilon}{2} \le x \le \lfloor x \rfloor + \varepsilon \end{cases};$$

where y represents the short-bit fixed-point data after rounding to the nearest integer, x represents the long-bit floating-point data before rounding to the nearest integer, and ε is the smallest positive integer that the current short-bit fixed-point data type can represent, i.e., $2^{-Point\_location}$, $\lfloor x \rfloor$ is an integer multiple of ε, of which the value is the maximum number less than or equal to x.

The rounding up unit performs the following operations:

$$y = \lceil x \rceil;$$

where y represents the short-bit fixed-point data after rounding up, x represents the long-bit floating-point data before rounding up, $\lceil x \rceil$ is an integer multiple of ε, of which the value is the minimum number more than or equal to x; and ε is the smallest positive integer that the current short-bit fixed-point data type can represent, i.e. $2^{-Point\_location}$.

The rounding down unit performs the following operations:

$$y = \lfloor x \rfloor;$$

where y represents the short-bit fixed-point data after rounding down, x represents the long-bit floating-point data before rounding down, $\lfloor x \rfloor$ is an integer multiple of ε, of which the value is the maximum number less than or equal to x; and ε is the smallest positive integer that the current short-bit fixed-point data type can represent, i.e., $2^{-Point\_location}$.

The rounding off unit performs the following operations:

$$y = [x];$$

where y represents the short-bit fixed-point data after rounding off, x represents the long-bit floating-point data before rounding off, and [x] represents the short-bit fixed-point number obtained by directly rounding off the original data x.

The present disclosure further discloses a method of performing an artificial neural network forward operation. The method includes specific steps of:

obtaining data represented by the 32-bit floating-point data type of each layer of the neural network through a trained 32-bit floating-point model of the neural network, where the data includes the weights, biased data, the input and output values, and other data parameters of each layer; and extracting input data of the same type in each layer of a multi-layer network model; analyzing and obtaining a distribution ratio of the input data of the same type in each layer of the multi-layer network model in a preset interval; and obtaining the decimal point location of the input data of the same type in each layer of the multi-layer network model according to the distribution ratio.

The preset interval may be $[-2^{X-1-i}, 2^{X-1-i}-2^{-i}]$, where i=0, 1, 2, . . . , n, n is a preset positive integer, and X is the count of bits occupied by the fixed-point data. The preset interval $[-2^{X-1-i}, 2^{X-1-i}-2^{-i}]$ includes n+1 sub-intervals. The method includes analyzing the distribution information of the input data of the same type in each layer of the multi-layer network model in the n+1 sub-intervals, and obtaining a first distribution ratio according to the distribution information. The first distribution ratio is $p_0$, $p_1$, $p_2$, . . . , $p_n$ where the n+1 values are distribution ratios of the input data of the same type in each layer of the multi-layer network model in the n+1 sub-intervals. An overflow rate EPL is set in advance, and then a largest value is obtained from 0, 1, . . . , n so that $p_i \ge 1-EPL$ where the largest value i is the decimal point location of the input data of the same type in each layer of the multi-layer network model. In other words, a process of fetching the decimal point location of the input data of the same type in each layer of the multi-layer network model is represented as: $\max\{i \mid p_i \ge 1-EPL, i \in \{0, 1, 2, \ldots, n\}\}$, that is, among the $p_i$ which is greater than or equal to 1−EPL, the largest subscript value i is selected as the decimal point location of the input data of the same type in each layer of the multi-layer network model.

It should be noted that the $p_i$ is a ratio of the count of input data of the same type in each layer of the multi-layer network model in the interval $[-2^{X-1-i}, 2^{X-1-i}-2^{-i}]$ to the total number count of input data of the same type in each layer of the multi-layer network model. For instance, if there are m2 pieces of input data whose values are within the interval $[-2^{X-1-i}, 2^{X-1-i}-2^{-i}]$ m1 in pieces of input data of the same type in each layer of the multi-layer network model, $$p_i = \frac{m2}{m1}.$$

According to the decimal point location, all data represented by the long-bit floating-point data type is represented by the short-bit fixed-point data type.

The short-bit fixed-point data type obtained by statistical analysis is used for the neural network forward operation, that is, all data in the neural network forward operation is represented by the short-bit fixed-point data type. Simultaneously, a copy represented by the long-bit floating-point data type is reserved for the weights and biased data of the neural network, and then a forward operation is performed. For the forward operation, some operations such as the addition operation and the multiplication operation may cause extension of the data range. Therefore, a cache space is needed to store intermediate computation results in the format of long-bit floating-point data, and after the computation is completed, the intermediate computation results are converted back to the corresponding short-bit fixed-point data format. The process of converting the long-bit floating-point data type to the short-bit floating-point data type requires a rounding operation including random rounding, rounding to the nearest integer, rounding up, rounding down, rounding off, and the like.

The random rounding unit performs the following operations:

$$y = \begin{cases} \lfloor x \rfloor \ w.p.\ 1 - \frac{x - \lfloor x \rfloor}{\varepsilon} \\ \lfloor x \rfloor + \varepsilon \ w.p.\ \frac{x - \lfloor x \rfloor}{\varepsilon} \end{cases};$$

where Y represents the short-bit fixed-point data after random rounding, x represents the long-bit floating-point data before random rounding, ε is the smallest positive integer that $2^{-Point\_location}$, $\lfloor x \rfloor$ the current short-bit floating-point data type can represent, i.e., represents the short-bit fixed-point data obtained by directly truncating the original data (equivalent to performing a rounding down operation on the decimal); w.p. represents a probability, i.e., the probability that the randomly rounded data y is $\lfloor x \rfloor$ is $$1 - \frac{x - \lfloor x \rfloor}{\varepsilon},$$

and the probability that the randomly rounded data is $\lfloor x \rfloor + \varepsilon$ is $$\frac{x - \lfloor x \rfloor}{\varepsilon}.$$

The rounding to the nearest integer unit performs the following operations:

$$y = \begin{cases} \lfloor x \rfloor & \text{if } \lfloor x \rfloor \le x \le \lfloor x \rfloor + \frac{\varepsilon}{2} \\ \lfloor x \rfloor + \varepsilon & \text{if } \lfloor x \rfloor + \frac{\varepsilon}{2} \le x \le \lfloor x \rfloor + \varepsilon \end{cases};$$

where y represents the short-bit fixed-point data after rounding to the nearest integer, x represents the long-bit floating-point data before rounding to the nearest integer, and ε is the smallest positive integer that the current short-bit fixed-point data type can represent, i.e., $2^{-Point\_location}$, $\lfloor x \rfloor$ is an integer multiple of ε, of which the value is the maximum number less than or equal to x.

The rounding up unit performs the following operations:

$$y = \lceil x \rceil;$$

where y represents the short-bit fixed-point data after rounding up, x represents the long-bit floating-point data before rounding up, $\lceil x \rceil$ is an integer multiple of ε, of which the value is the minimum number more than or equal to x; and ε is the smallest positive integer that the current short-bit floating-point data type can represent, i.e. $2^{-Point\_location}$.

The rounding down unit performs the following operations:

$$y = \lfloor x \rfloor;$$

where y represents the short-bit floating-point data after rounding down, x represents the long-bit floating-point data before rounding down, [x] is an integer multiple of ε, of which the value is the maximum number less than or equal to x; and ε is the smallest positive integer that the current short-bit fixed-point data type can represent, i.e., $2^{-Point\_location}$.

The rounding off unit performs the following operations:

$$y = [x];$$

where y represents the short-bit fixed-point data after rounding off, x represents the long-bit floating-point data before rounding off, and [x] represents the short-bit fixed-point number obtained by directly rounding off the original data x.

After the forward operation is completed, in the process of a backward operation, data represented by the short-bit fixed-point data type in the forward operation needs to be converted to data represented by the long-bit floating-point data type for the backward operation, where the weights and the biased data participating in the backward operation adopt the copy represented by the long-bit floating-point data type reserved during the forward operation. After the backward operation ends, the data represented by the long-bit floating-point data type is converted to the data represented by the short-bit fixed-point data type for subsequent forward operation. Simultaneously, the copy of the long-bit floating-point data type is still reserved for the weights and the biased data of the neural network during the forward operation. The rounding operation is needed during the conversion process, and the process is the same as that of the rounding operation in the forward operation described above.

The forward and backward operations as described above are repeated until the neural network training is completed.

FIG. 67 is a flowchart of a forward operation of a single-layer artificial neural network according to an example of the present disclosure. This flowchart describes the process of a single-layer neural network forward operation implemented by a device and an instruction set of the present disclosure. The operation process is implemented in the computation device shown in FIG. 4A, FIG. 5, or FIG. 6A. For each layer, a weighted sum of input neuron vectors is obtained to calculate intermediate result vectors of this layer, and the intermediate result vectors are biased and activated to obtain output neuron vectors, where the output neuron vectors are used as input neuron vectors of a next layer.

FIG. 68 schematically shows a block diagram of an operation process according to an example of the present disclosure. All the data represented by the short-bit floating-point data type except the weight and the biased data obtained by a forward operation module 51 in the forward operation need to be first converted to data of the long-bit floating-point data through a short-bit to long-bit floating-point data conversion unit 53 for backward operation. After the backward operation performed by the backward operation module 53 is completed, a long-bit to short-bit floating-point data conversion unit 54 converts the data represented by the long-bit floating-point data type into the data represented by the short-bit floating-point data type. During the conversion process, data beyond the precision range that can be represented by the short-bit floating-point data type needs to be subject to the rounding operation similar to the rounding operation shown in FIG. 68. The rounding operation is performed by the random rounding unit 55.

FIG. 69 is an overall flowchart of algorithm implementations according to an example of the present disclosure. The operation process is implemented by the computation devices shown in FIG. 4A, FIG. 5, or FIG. 6A. The detailed operations are described in the specifications of FIGS. 64 to 68. The specific steps are the same as the specific implementations in the present disclosure and will not be further described herein.

It should be noted that the forward operation can also adopt input neurons, weights, and/or biased data represented by the long-bit floating-point data type, and the backward training can also adopt input neurons, weights, and/or biased data represented by the short-bit fixed-point data type.

It should be noted that the short-bit floating-point data type is relative to the long-bit floating-point data type. When the short-bit floating-point data type is a 16-bit floating-point data type, the long-bit floating-point data type can be a 32-bit floating-point data type or a 64-bit floating-point data type; when the short-bit floating-point data type is a 32-bit floating-point data type, the long-bit floating-point data type is a 64-bit floating-point data type.

By representing data of forward operation by the short-bit fixed-point data type, the data range space of the short-bit floating-point data type is fully utilized. Compared with the long-bit floating-point data representation, the space required for storage of network parameters is greatly reduced and the area-to-power ratio of the hardware is optimized.

The present disclosure includes a device for on-chip repetitive data addressing and a method for scheduling and using the device. In the computation device shown in FIG. 2A, if the storage medium is a memory, the data scheduling method between a data access unit and the memory may adopt the device for on-chip repetitive data addressing and the method for scheduling and using the device. The above method can also be applied to the computation device shown in FIG. 1 or FIG. 6A for data scheduling between a data access unit and the memory inside the computation device, or data scheduling among a plurality of computation devices in a neural network processing system. The method may also be applied to a computation device of sparsely connected artificial neural network or an artificial neural network forward operation device shown in FIG. 26, FIG. 28, and FIG. 30 for data scheduling. In the device shown in the figures, the method includes efficiently reading and writing the repetitive data, such that on-chip repetitive addressing can be effectively achieved while on-chip and off-chip data exchange are supported. By means of data and address partitioning, a space for the on-chip data repetitive addressing can be extended to an off-chip address space. The present disclosure may reduce memory access bandwidth requirements while providing good flexibility, thus reducing the on-chip storage overhead. Moreover, the present disclosure can be adapted to different scenarios, and is not merely limited to machine learning processors.

Meanwhile, the present disclosure can cut on-chip cache overhead by reasonably scheduling data, so as to provide a support for the design of more efficient processors. Reasonably scheduling data not only refers to a data replacement strategy, but also includes partitioning computation and rearranging a computation order, such that centralized accessed data can be arranged in a same data block. The present disclosure utilizes on-chip repetitive addressing to reduce memory access bandwidth in the heterogeneous environment, and relates to implementation and scheduling of a storage unit and an addressing unit.

FIG. 70 is an exemplary block diagram of an overall structure of a preferable example. In practical applications, the example shown in FIG. 70 may include the interconnection module and the operation unit shown in FIG. 2A, where the operation unit includes a plurality of arithmetic units. For the overall structure shown in FIG. 70, for instance, in a heterogeneous platform, data which can be stored in an on-chip storage medium 20 of a processor is limited, and generally, limited resources on a chip limit a possibility of storing all data on the chip. Therefore, a large storage medium (cheap, slow in speed) is placed off the chip, while a small storage medium (expensive, fast in speed) is integrated on the chip. All data needs to be partitioned into data blocks that can be stored in the on-chip storage medium 20. A required data block is read or written through data exchange between an off-chip storage medium 10 with a large storage capacity and the on-chip storage medium 20 with a small storage capacity. Meanwhile, an on-chip address indexing unit 40 provides an on-chip data address to an on-chip processing unit 30 as required. The memory of the present disclosure is not limited, and may be a common storage medium such as a Static Random Access Memory (SRAM), a Dynamic Random Access Memory (DRAM), an Enhanced Dynamic Random Access Memory (eDRAM), a Register file (RF), and the like, or may be a novel storage device such as a Non-Volatile Memory (NVM), or a 3D storage device.

The present disclosure provides a method for on-chip repetitive addressing, where the method is a data management strategy adopted when a size of total data is larger than the storage capacity of the on-chip storage medium 20. The off-chip data can be read into the chip for rapid repetitive addressing by using the method, and off-chip repetitive addressing can also be achieved. However, an efficient method is to put centralized accessed data together, carry the centralized accessed data into the chip at a time, and then directly perform on-chip rapid addressing. The method includes:

a data partitioning step for partitioning data on an on-chip storage medium and/or an off-chip storage medium into different data blocks according to a preset data partitioning principle, where the data partitioning principle includes partitioning data with a reuse distance less than a preset distance threshold value into the same data block. The reuse distance refers to a distance between two times of using a piece of data, and the distance refers to a number of times of memory accesses. Data with a short reuse distance is accessed in a short time of running, which can be viewed as having a strong correlation in time. The data partitioned into the same data block can be loaded on a chip at a time for storage, and is then used as many times as possible, so that the memory access is more efficient. In each data block, the data is stored in the medium according to a preset principle such as a sequential storage.

The method further includes:

a data indexing step for successively loading the different data blocks to at least one on-chip processing unit according a preset sequential relation of a replacement strategy, where repetitive data in a loaded data block is subjected to on-chip repetitive addressing. The data in a data block may be subjected to direct repetitive addressing on the chip, which may avoid storing off the chip, or several times of reading and writing (slow speed, high power consumption) of the IO. The effective data partitioning principle may help to reduce times of replacement as many as possible (the effective data partitioning principle may reduce replacement times, and on such basis, an effective data replacement strategy may further reduce the replacement times). Preferably, FIG. 71 is a diagram of data address partitioning. An index address 50 for the data includes a data block address 51 and an in-block address 52; in other words, the address for each piece of data is spliced by the current data block address 51 and the in-block address 52. After the data is partitioned into reasonable data blocks, the on-chip repetitive addressing becomes more efficient by partitioning the address into data block address and in-block addresses. The technology used by address indexing is not limited to simple data indexing, and also includes partitioning solutions such as codebook and the like.

The data indexing step include: successively loading different data blocks to the at least one on-chip processing unit 30 according to the sequential relation of the replacement strategy and the data block address 51, where the repetitive data in a loaded data block is subjected to on-chip repetitive addressing; and when all indexing of the in-block address 52 of the data block is completed, loading a new data block until no data block needs to be loaded. During indexing in the data block, if the in-block address 52 of the data is useful, an indexed hardware unit does not need to use the data block address 51, but the data block address 51 still needs to be recorded for subsequent use.

Preferably, the on-chip storage medium 20 exchanges data with the on-chip processing unit 30 through an on-chip data path; the on-chip storage medium 20 exchanges data with the off-chip storage medium 10 through an on-chip and off-chip data path; and the on-chip storage medium 20 or the off-chip storage medium 10 performs at least one reading and writing from inside or outside; and the data is carried between the on-chip storage medium 20, the off-chip storage medium 10, and/or the on-chip processing unit 30 in a unit of data block.

Preferably, a data size of the data block is smaller than a capacity of the on-chip storage medium 20, and is divisible by the capacity of the on-chip storage medium 20.

Preferably, the on-chip storage medium 20 adopts a design in which a read port is separated from a write port, such that reading and writing of the data are independent from each other, and can be performed simultaneously.

Preferably, the method is applied to a learning processor.

Preferably, the method is applied to a heterogeneous environment.

Preferably, the on-chip processing unit 30 is an on-chip operation module. The data is selected according to a preset condition, and the data satisfying the preset condition is included in the same data block during partitioning. Specifically, the preset condition includes a simple partitioning condition, a condition with an average preset number of data blocks, a condition associated with different output neurons, or a condition satisfying a preset mathematics relation, which are specific data partitioning principles under different circumstances and are still within the range defined by the data partitioning principle.

FIG. 72 is a schematic diagram of data partitioning according to an example of the present disclosure. For instance, in a common neural network (a vector operation), weight data required for different output neurons is stored in different data blocks, and during operation, different data blocks are loaded at different times for indexing. Values of input neurons are reused, and the same input is used to compute the two output neurons. During the computation of the output neurons, an associated weight is loaded, and after computation, the part of weight is completely not required; and during the computation of the output neurons, the associated weight is loaded. The value of the same input neuron is only stored for one portion, in other words, repetitive addressing is required during the computation. Only one copy is stored for the same weight, which also needs to be obtained by repetitive addressing.

FIG. 73 is a schematic diagram of data partitioning according to an example of the present disclosure. For instance, in the common neural network (the vector operation), a weight connection that satisfies a specified condition is partitioned and stored in the same data block, such as a solid line weight connection and an dashed line weight connection. At different times, different data blocks are loaded, and the operation unit selects data according to the specified condition. For instance, all output neurons first perform an associated computation of the solid line weight connection, and then perform an associated computation of the dashed line weight connection after replacement of the data block.

Preferably, the replacement strategy includes a sequential replacement, a reversed order replacement, or an unordered replacement. FIG. 74 is a schematic diagram of the replacement strategy according to an example of the present disclosure. The data is partitioned into different data blocks, and at different times, different data blocks are loaded according to different replacement strategies. For instance, in the sequential replacement, the data blocks are loaded according to an order of #1, #2, #3, and the like; in the reversed order replacement, the data blocks are loaded according to an order of #N, #(N−1), #(N−2); and in the unordered replacement, the data blocks are read according to a specified order. Optionally, the replacement strategy includes data writing back, which writes a final result or an intermediate result back to the on-chip storage medium, the off-chip storage medium and/or the on-chip processing unit after the data is processed. Different replacement strategies shall be decided with consideration of data consistency.

The present disclosure further provides a device which implements the method for on-chip repetitive addressing. The device includes:

a data partitioning module configured to partition data on an on-chip storage medium and/or an off-chip storage medium into different data blocks according to a preset data partitioning principle, where the preset data partitioning principle includes partitioning data with a reuse distance less than a preset distance threshold value into a same data block; and a data indexing module configured to successively load different data blocks to at least one on-chip processing unit according to a preset sequential relation of a replacement strategy, where repetitive data in the loaded data block is subjected to on-chip repetitive addressing.

Preferably, an index address for the data is composed of a data block address and an in-block address.

The data indexing module is configured to successively load the different data blocks to the at least one on-chip processing unit according to the preset sequential relation of the replacement strategy and the data block address, where the repetitive data in the loaded data block is subjected to on-chip repetitive addressing. When all indexing of the in-block address of the data block is completed, a new data block is loaded until no data block needs to be loaded.

Preferably, the on-chip storage medium exchanges data with the on-chip processing unit through an on-chip data path.

The on-chip storage medium exchanges data with the off-chip storage medium through an on-chip and off-chip data path, and the on-chip storage medium or the off-chip storage medium performs at least one reading and writing from inside or outside; and the data is carried between the on-chip storage medium, the off-chip storage medium, and/or the on-chip processing unit in a unit of data block.

Preferably, a data size of the data block is smaller than a capacity of the on-chip storage medium.

Preferably, the on-chip storage medium adopts a design in which a read port is separated from a write port.

Preferably, the device is applied to a learning processor.

Preferably, the device is applied to a heterogeneous environment.

Preferably, the on-chip processing unit is an on-chip operation module. Data is selected according to a preset condition, and the data satisfying the preset condition is included into the same data block during partitioning.

Preferably, the preset condition includes a simple partitioning condition, a condition with an average preset number of data blocks, a condition associated with different output neurons, or a condition satisfying a preset mathematics relation.

Preferably, the replacement strategy includes an sequential replacement, a reversed order replacement, or an unordered replacement; or the replacement strategy includes data writing back, that is, writing a final result or an intermediate result back to the on-chip storage medium, the off-chip storage medium, and/or the on-chip processing unit after the data is processed.

FIG. 75 is a flowchart of a device utilizing on-chip data repetitive addressing to reduce memory access bandwidth requirements according to an example of the present disclosure. After the computation starts, the process includes:

a step S101, partitioning data into different data blocks according to a preset data partitioning principle, a step S102, loading the different data blocks to the on-chip storage medium 20; at a certain time, only loading one data block to the on-chip storage medium 20 for on-chip computation; and according to different replacement strategies, loading different data blocks for computation according to different orders;

a step S103, performing the on-chip computation on obtained data; and a step S104, determining whether all computations are completed and no data block needs to be loaded; if all computations are completed and no data block needs to be loaded, all computations end; otherwise, returning to the step S102.

FIG. 76 is a block diagram of repetitive addressing performed by a computation unit based on addresses according to an example of the present disclosure. According to address indexing, data stored at an address DA is required by computation units #0, #2, and #4, so the example is indexed to the address DA, and data in the DA is propagated to required computation units which are #0, #2, and #4. In this example, since data required by the three computation units are identical, only one portion is stored on the chip. In other words, repetitive addressing needs to be performed on one piece of data for three times. The way of transferring the data to the on-chip computation units in FIG. 76 is not limited to a connection way of BUS, and also includes other connection ways such as a Crossbar structure, a FAT-TREE, an H-TREE, and the like.

In conclusion, the present disclosure partitions data with a reuse distance less than a preset distance threshold value into the same data block, where the reuse distance refers to a distance between two times of using a piece of data, and the distance refers to a number of times of memory accesses. The data with a short reuse distance is accessed in a short time of running, which can be viewed as having a strong correlation in time. The data partitioned on the same data block can be loaded on a chip once for storage, and is then used as many times as possible, so that the memory access is more efficient. The present disclosure aims to utilize on-chip repetitive addressing to reduce memory access bandwidth. The device and the related method for using the device in the present disclosure can effectively satisfy requirements of data reusability and flexible addressing, can be adapted to different scenes, and are not merely limited to machine learning processors.

It should be noted that the examples of on-chip repetitive data addressing proposed in the present disclosure can be applied to the method examples provided above (method examples in various application scenarios), which may reduce memory access bandwidth requirements and provide good flexibility, and thus reducing on-chip storage overhead.

By implementing the examples of the present disclosure, the following beneficial effects may be obtained: relevant data obtained by terminal devices and operation results can be partitioned according to reuse distances, and then partitioned data blocks are correspondingly processed and stored as a whole. In this case, the on-chip storage can be loaded at a time and used as many times as possible. For application to various application scenarios, the operation of instructions can be simplified to make memory access more efficient.

For current heterogeneous platforms, data which can be stored on a chip of a processor is limited. Therefore, all data needs to be partitioned into data blocks that can be stored on the chip, and a required data block is read in or written out through data interaction on an off-chip large storage medium and an on-chip small storage medium.

In order to achieve the above purpose, FIG. 77 illustrates an on-chip data partitioning read-write system 100 according to the present disclosure. The on-chip data partitioning read-write system shown in FIG. 77 can be applied to the devices shown in FIG. 2A, FIG. 1, FIG. 4A, FIG. 6A, FIG. 26, FIG. 28, and FIG. 30, or be applied to other computation devices in the field of neural network, such as an artificial neural network forward operation device or a computation device for sparsely connected artificial neural network. The memory of the computation device shown in FIG. 2A is an off-chip storage system, and the computation device shown in FIG. 2A may include the on-chip data partitioning read-write system as shown in FIG. 77. The system includes:

a data partitioning module 10 configured to, according to a data partitioning strategy, partition on-chip storage data into different areas, and store the on-chip data in an on-chip storage medium and an off-chip storage medium respectively;

a pre-operation module 20 configured to perform an operation on an on-chip address index of the on-chip storage data in advance when implementing data splicing; and a data splicing module 30 configured to splice the on-chip storage data and off-chip input data to obtain a representation of the original data according to a data splicing strategy.

For the heterogeneous platform, the data which can be stored on a chip of a processor is limited. Therefore, all data needs to be partitioned into data blocks that can be stored on the chip, and the required data block is read in or written out through data interaction on the off-chip large storage medium and the on-chip small storage medium. Meanwhile, an on-chip data address is provided to an on-chip computation unit (the operation unit as shown in FIG. 2A) based on the on-chip address index depending on requirements, and a physical frame is illustrated in FIG. 81. Partitioning shown in examples of FIG. 78, FIG. 79A, and FIG. 79B is only typical circumstances of the present disclosure. The present disclosure is not limited to specific data partitioning. For instance, extreme circumstances in which all data is on the chip after partitioning, or all data is off the chip after partitioning are also within the range of implementing the present disclosure.

Furthermore, the on-chip data partitioning read-write system 100 of the present disclosure further includes:

a storage module 40 configured to store and move the on-chip storage data of the on-chip storage medium and the off-chip input data from the off-chip storage medium.

The pre-processing module 20 further includes:

an on-chip processing sub-module 21 configured to perform an operation on the on-chip storage data; and an off-chip processing sub-module 22 configured to operate external input data, where the external input data includes the off-chip input data and data directly read from the read-write ports.

Further, the storage module 40 further includes:

an address index interface 41 configured to index the on-chip storage data according to the on-chip address index;

a data read-out interface 42 configured to output the indexed on-chip storage data to an exit; and a data write-in interface 43 configured to write data to be stored into a corresponding storage position according to a writing address.

In the on-chip data partitioning read-write system 100, preferably, the data partitioning module 10 further includes:

an address partitioning sub-module 11 configured to partition an address space into an off-chip data space and an on-chip data space; and a data replacement sub-module 12 configured to perform data replacement between the on-chip storage medium and the off-chip storage medium according to a data replacement strategy, where the data replacement strategy includes a sequential replacement, a reversed order replacement, and a random replacement.

The data partitioning strategy includes fixed-point number partitioning and floating-point number partitioning. As a typical example, FIG. 79A illustrates exemplary data partitioning of fixed-point data, where the fixed-point data is partitioned into an integer part and a decimal part. FIG. 79B illustrates exemplary data partitioning of floating-point data, where the floating-point data is partitioned into an exponent part and a decimal part. Partitioning in examples of FIG. 79A, and FIG. 79B is only for typical circumstances of the present disclosure. The present disclosure is not limited to specific data partitioning. For instance, extreme circumstances in which all data is on the chip after partitioning, or all data is off the chip are also within the range of implementing the present disclosure. The address partitioning sub-module 11 partitions the indexed address space into the corresponding off-chip data space and on-chip data space, and if required, the data replacement sub-module 12 performs data exchange to transfer the data to be accelerated into the chip. The data partitioning module 10 is implemented based on one or more on-chip computation units in the chip, and the on-chip computation units initiate a reading and writing request, and process the original data obtained by splicing.

The data splicing module 30 further includes:

an index splicing sub-module 31 configured to convert an on-chip and off-chip data transfer form from a representation of the original data into all or partial data index, so as to splice results of the all or partial data index on a chip to obtain the representation of the original data.

The reading and writing of the data splicing module 30 are implemented through an on-chip and off-chip data path, or an on-chip data path. The on-chip and off-chip data path includes a Peripheral Component Interconnect (PCI), a Peripheral Component Interface Express (PCIE), and a Hyper Transport (HT, which is a new interconnection bus technology having a novel end-to-end integrated circuit with upgradability, high speed, and high performance) interconnection technology. The on-chip data path includes a FAT-TREE and an H-TREE (hierarchy tree) interconnection technologies, while the on-chip and off-chip connection way includes a multi-chip interconnection structure. The on-chip and off-chip data connection illustrated in FIG. 77 may include a multi-chip interconnection structure such as an on-chip network other than the PCIE bus connection. The data path of the on-chip computation units and the on-chip storage medium illustrated in FIG. 77 are not limited to the interconnection technologies of H-TREE, or FAT-TREE. By means of the on-chip and off-chip data path, off-chip addressing can be performed, such that the on-chip data partitioning read-write system 100 can accurately restore various data to be spliced to the original data, and different data partitioning strategies can be effectively supported, thereby reducing exchange of the on-chip and off-chip data.

The data in the on-chip storage medium or the off-chip storage medium is read and written once or for many times, and the data is read into one or more on-chip computation units; the on-chip storage medium or the off-chip storage medium is read and written from outside once or for many times, and the on-chip medium is read and written from inside once or for many times.

FIG. 80 is a flowchart of a specific example of the on-chip data partitioning read-write method according to the present disclosure. The specific example can be implemented by the on-chip data partitioning read-write system 100 of the present disclosure. As shown in FIG. 83, the on-chip data partitioning read-write method includes:

a step S701, a data partitioning step for, according to a data partitioning strategy, storing on-chip data in different areas and storing the on-chip data in an on-chip storage medium and an off-chip storage medium respectively;

a step S702, a pre-operation step for performing an operation on an on-chip address index of the on-chip storage data in advance when implementing data splicing; and a step S703, a data splicing step for splicing the on-chip storage data and the off-chip input data to obtain a representation of the original data according to the data splicing strategy.

The above steps are implemented by the data partitioning module 10, the pre-operation module 20, and the data splicing module 30 respectively, and the original data is restored on the chip without loss.

Preferably, the on-chip data partitioning read-write method of the present disclosure requires storage management, and the splicing process is supported by the storage module 40. The data partitioning read-write method further includes:

a step of storing data, specifically, storing and carrying the on-chip storage data of the on-chip storage medium and the off-chip input data from the off-chip storage medium, where a reading port is separated from a writing port, and the reading and writing of the data are independent from each other in the data storing step. Specifically, the step of storing data further includes:

firstly, indexing the on-chip storage data according to the on-chip address index;

secondly, outputting indexed data to an exit; and thirdly, writing data to be stored into a corresponding storage positions according to a writing address.

During reading and writing of the data, support is provided by the address index interface 41, the data read-out interface 42, and the data write-in interface 43 to cooperate with the on-chip and off-chip data path, and the on-chip data path, so as to achieve data communication in and out of the module, and independent read-write ports can achieve reading and writing simultaneously. The on-chip data looks up the on-chip storage data stored in the chip and obtains final complete data after splicing operation with data input from outside into the chip according to the on-chip address index that may go through a certain operation (such as address offset computation) of the pre-operation module 20.

In a specific example, FIG. 84 is a flowchart of a preferable example of the preferable on-chip data partitioning read-write method of the present disclosure. The on-chip data partitioning read-write method includes:

a step S801, partitioning an address space into an off-chip data space and an on-chip data space;

a step S802, performing data replacement between the on-chip storage medium and the off-chip storage medium according to a data replacement strategy, where the data replacement strategy includes a sequential replacement, a reversed order replacement, and a random replacement; and the data partitioning strategy includes partitioning of fixed-point data and floating-point data;

a step S803, performing an operation on the on-chip storage data;

a step S804, performing an operation on external input data, where the external input data includes the off-chip input data and data directly read from the read-write ports; and a step S805, converting an on-chip and off-chip data transfer form from a representation of the original data into all or partial data index, so as to splice results of the all or partial data index on a chip to obtain the representation of the original data.

Only if processed on-chip storage data and off-chip input data are spliced together can the original data be processed by subsequent modules to achieve the function of the processor.

Furthermore, to facilitate understanding, a diagram showing physical design of a specific example shown in FIGS. 80-82 is explained below.

For the heterogeneous platform, the data which can be stored on a chip of an accelerator is limited. Therefore, all the data needs to be partitioned into data blocks that can be stored on the chip. A required data block is read in or written out through data interaction on an off-chip large storage medium (the off-chip storage medium) and an on-chip small storage medium (the on-chip storage medium). Sizes of the data blocks are different, so the data blocks are partitioned and stored in different areas, and the off-chip storage medium is added according to different requirements of capacity. Meanwhile, an on-chip data address is provided to on-chip computation units through the on-chip address index depending on requirements. As shown in FIG. 82, an index and data corresponding to the index are obtained through the address index interface 41. FIG. 80 illustrates an on-chip data indexing process according to an example, where a device indexes 256 storage positions to obtain 32-bit data according to an 8-bit address, and the device is not limited to a bit width of the address index and a bit width of the on-chip data storage illustrated in the figures. Implementation of the flow further depends on intercommunication between the on-chip storage medium, the off-chip storage medium, the on-chip and off-chip data path, and the on-chip data path in hardware.

FIG. 82 is a data splicing process according to an example of the present disclosure. The process includes: processing, by an on-chip data processing sub-module 31 that is 32-bit as shown in FIG. 82, the on-chip storage data that is 32-bit as shown in FIG. 82, where the on-chip data processing sub-module 31 may implement other operations such as arithmetic calculation other than an addressing operation; processing, by an off-chip data processing sub-module 32 that is 32-bit in the as shown in FIG. 82, the off-chip input data that is 32-bit as shown in FIG. 82; splicing processed on-chip storage data and the off-chip input data into 64-bit data as shown in the FIG. 82; and transferring the 64-bit data to subsequent modules such as an on-chip computation unit for processing. The bit widths of the processed on-chip storage data and off-chip input data are not limited to that shown in the figure, and the data bit width of the data block is not limited to a specific data bit width. The data processing may include complex operations other than the simple splicing operation.

Specifically, the data splicing step is implemented through an on-chip and off-chip data path, or an on-chip data path. Specifically, the on-chip and off-chip data path includes the PCI, PCIE and HT interconnection technologies to achieve a data flow on and off the chip; the on-chip data path includes the FAT-TREE and H-TREE interconnection technologies; and the on-chip and off-chip connection way includes a multi-chip interconnection structure such as an on-chip network.

The data in the on-chip storage medium or the off-chip storage medium can be read and written once or for many times, and the data can be read into one or more on-chip computation units; the on-chip storage medium or the off-chip storage medium can be read and written from outside once or for many times, and the medium can be read and written from inside once or for many times.

The present disclosure provides an on-chip read-write device including the on-chip data partitioning read-write system 100. The on-chip read-write device includes an on-chip storage medium, an off-chip storage medium, an on-chip and off-chip data path, and an on-chip data path. Preferably, the on-chip read-write device further includes common storage mediums, such as a Static Random Access Memory (SRAM), a Dynamic Random Access Memory (DRAM), an Enhanced Dynamic Random Access Memory (eDRAM), a Register file (RF) and the like, and may also be a novel storage device, such as a Non-Volatile Memory (NVM), a 3D storage device, and the like.

The present disclosure converts a representation of data into an index, which may efficiently perform repetitive addressing in the on-chip address space, and perform addressing in the off-chip address. The device for on-chip repetitive addressing and a strategy used by the device in the heterogeneous environment are different from directly accelerating cache of the data itself, and the hardware support includes the on-chip storage medium, the off-chip storage medium, the address indexing device, the on-chip and off-chip data path, and the on-chip data path.

Finally, the present disclosure is intended for different data partitioning strategies, devices, and methods. According to different partitioning strategies, data is partitioned into different parts, and the devices in the present disclosure support devices of different partitioning strategies.

In conclusion, the devices and related methods of use provided in the present disclosure can effectively satisfy requirements of data reusability and flexible addressing, and effectively reduce memory access bandwidth requirements. The devices and related use methods can be adapted to different scenes, and are not merely limited to machine learning processors. Meanwhile, the present disclosure can cut on-chip cache overhead by reasonably scheduling data, so as to provide a support for the design of more efficient processors.

It should be noted that the relevant examples of the on-chip data partitioning reading and writing provided by the present disclosure can be applied to the method examples provided above (the method examples corresponding to each application scenario). In the present disclosure, the terminal device obtains data, then partitions the data according to a data partitioning strategy, and stores the data in the on-chip and off-chip storage medium accordingly. Then, each time data is written, the corresponding data partitioning operation is completed; and when data is read, an original data representation is obtained through the pre-operation steps and the data splicing steps, so as to efficiently read and write the repetitive data, which may reduce the memory access bandwidth requirements, provide good flexibility, and thus reducing on-chip storage overhead.

FIG. 85 illustrates a computing system for inference and training of a neural network algorithm based on multiprocessor cooperation. The system may include n processors (n is an integer greater than or equal to 2), an interconnected device, and a memory. The n processors may be any device with a computing part of a neural network algorithm, such as a neural network processor, a GPU, a CPU, an FPGA, and a DSP. In practical applications, the above neural network processor may also be a special-purpose processor (the devices for performing the forward operation of the artificial neural network or the computation devices for sparsely connected artificial neural network as shown in the figures), a computation device (the computing devises shown in FIG. 1, FIG. 2A, or FIG. 6A), and the like in the present disclosure. The interconnection device is configured to connect the processors and is responsible for communication and data transfer among the processors. The processors may be connected through various on-chip interconnection technologies (such as a bus, an optical interconnection, etc.), SoC integration, or other ways. The storage module is configured to store input data, output data, model parameters for training, intermediate data generated during the operation process, and computation instructions required by each of the processors of a neural network.

The interconnection module may use a topology including, but not limited to, ring, tree, crossbar, mesh, or torus, etc.

A connection mode and a storage mode between different processors are not limited to one type. In other words, there may be more than one type of interconnection devices or memories in the system.

Referring to FIG. 85, the processor in FIG. 85 may be a device for performing a forward operation of an artificial neural network. The specific structure of the device for performing a forward operation of the artificial neural network may be a specific structure of the computation device shown in FIG. 2A. In practical applications, the device may further include an instruction caching unit, a controller unit, a direct memory access unit, a tree module, a primary operation module, and a plurality of secondary operation modules. The instruction caching unit is configured to read and cache a training instruction through the memory access unit; the controller unit is configured to read the instruction from the instruction caching unit and decode the instruction into micro-instructions for controlling the behavior of the tree module, the primary operation module, and the secondary operation modules; the direct memory access unit is configured to write data from an external address space to corresponding data caching units of the primary operation module and each of the secondary operation modules, or read data from a data caching unit to the external address space; at a stage where a backward operation of each layer of the neural network starts, the primary operation module transfers input neuron vectors of this layer to all secondary operation modules through the H tree module, and after the operation of a secondary operation modules is completed, the tree module is configured to splice values of output neurons of each secondary operation module into an intermediate result vector; and the primary operation module is configured to complete subsequent computations by using the intermediate result vector.

As a computing processor, the device for performing a forward operation of the artificial neural network can be combined with other types of processors (such as GPU and CPU) to form a new neural network task processing system.

FIG. 86A and FIG. 86B illustrate a possible implementation. FIG. 86A includes three modules: a control module configured to perform logic control, generate an instruction, and call other processors, and the module includes a control processor such as a CPU; a forward processing module configured to perform a neural network forward operation, and the module includes n (n is greater than or equal to 1) forward operation modules (special-purpose forward operation devices of the artificial neural network); and m (m is greater than or equal to 1) backward operation modules (using a general-purpose processor such as a GPU/DSP/FPGA, etc.) configured to perform a neural network backward operation. The control module is connected and communicated with the operation modules through an interconnection device 1, and the forward operation module is connected and communicated with the backward operation module through an interconnection device 2.

Alternatively, the forward operation module and the backward operation module use a special-purpose processor of the artificial neural network, and weights are updated by using a general-purpose processor such as a GPU, a DSP, or an FPGA.

FIG. 86B illustrates a multiprocessor coordination device when n=1 and m=1. The device includes a CPU, a neural network processor, and a GPU, and can be used for inference and training of a neural network.

FIG. 87 illustrates a more specific multiprocessor coordination device for training and inference of a neural network. 1 is a control module configured to control an entire execution process, and includes a control processor, which is usually a CPU; 3 is a forward processing module configured to perform an operation on forward neurons during the training and inference process, and includes n forward processing modules for the forward operation, which are usually forward operation devices of the artificial neural network; 2 is a backward processing module configured to perform backward gradient transfer and weight update operations during the training process, and includes m backward operation modules and backward processors, which are usually GPU/FPGA/DSP; and 5 is memory. The forward processing module obtains data such as neurons, weights, and the like from a storage unit 1; the control processor obtains data such as instructions, network models, and the like from a storage unit 3; and the backward processor obtains data such as target labels, weights, gradients, and the like from a storage unit 2.

The forward operation modules are connected with each other through an interconnection module 1. The backward operation modules are connected with each other through an interconnection module 2. The control module is connected with the forward processing module and the backward processing module through an interconnection module 3 for communication.

FIG. 88 is a transformation of the device in FIG. 87. Since in a neural network algorithm, neurons, synapses, and biased data that are required for the backward operation are operated in the forward process, separate storage of forward data and backward data may lead to additional data transfer overhead. In other words, before the backward operation starts, the data needs to be transferred from the forward processing module to a storage unit which is accessible by the backward processing module, which may result in a decrease in the overall processing speed and an increase in power. Therefore, a device in which the forward processing module and the backward processing module share a same storage unit is designed, where the data (including original input data, neurons, synapses, gradients, labels, etc.) required by the forward processing module and the backward processing module during the operation are stored in the storage unit 1. The medium of the storage unit 1 may be of the type previously described.

FIG. 89 illustrates another memory organization structure. In this structure, the control module, the forward processing module, and the backward processing module share a same storage unit 1, which removes a process of moving data from the control processor (CPU) memory to other processor memories.

FIG. 89 is an exemplary block diagram of an overall structure of an artificial neural network forward processing module according to the present disclosure. As shown in FIG. 89, the device includes an instruction caching unit 1, a controller unit 2, a direct memory access unit 3, a tree module 4, a primary operation module 5, and a plurality of secondary computing operation modules 6. The instruction caching unit 1, the controller unit 2, the direct memory access unit 3, the tree module 4, the primary operation module 5, and the secondary operation modules 6 may all be implemented as hardware circuits such as an application specific integrated circuit (ASIC).

The instruction caching unit 1 reads an instruction through the direct memory access unit 3 and caches the read instruction.

The controller unit 2 reads the instruction from the instruction caching unit 1 and decodes the instruction into a micro-instruction that controls behavior of other modules such as the direct memory access unit 3, the primary operation module 5, and the secondary operation modules 6, etc.

The direct memory access unit 3 can access an external address space, directly read and write data to various caching units inside the device, and complete data loading and storage.

A system shown in FIG. 90 may include: a control module 1, a storage unit module 2, an interconnection module 3, and a neural network operation module 4. The control module is generally a CPU, and the storage unit 1 is a memory of the CPU; and the neural network computation module is a computation module composed of several neural network processors, and is configured to perform computations of the neural network algorithm in a task, such as convolution, pooling, one or more of the above neural network dedicated instructions, and the like. The control processor is connected to and communicates with the neural network computation module through the interconnect module 2. The processors in the neural network computation module are connected and communicate with each other through the interconnect module 1. The neural network computation module reads data required for computation, such as weights, input data, and the like, from the storage unit 2.

The present disclosure guarantees flexibility, efficiency, and scalability of a neural network processing device by setting a plurality of classes and a plurality of processors. In other words, a simple neural network algorithm can be efficiently executed by the neural network processing device, and through multi-processor writing, complex tasks such as target recognition can also be implemented. By allocating computing tasks with different characteristics to different processors, the maximum efficiency of the neural network processor can be exerted while the scalability, compatibility, computing precision, and computing efficiency of the device are guaranteed. The above structures shown in FIG. 85, FIG. 86A, FIG. 86B, FIG. 87, FIG. 88, FIG. 89, and FIG. 90 can be applied to any computations of neural network computation instructions or neural network applications. Application scenarios of the structures shown in FIG. 85, FIG. 86, FIG. 87, FIG. 88, and FIG. 89 are not limited in the present disclosure. In addition, other functional modules may be added or extended for the execution of different neural network computation instructions, and specific forms of the adding or extending of other functional modules are not limited in the present disclosure. For instance, an extended functional module may be a module or a unit as shown in FIG. 2A.

It should be noted that the multi-processor collaborative processing architecture proposed in this disclosure can perform computations of various neural network algorithms such as convolution of training and prediction, pooling, and other algorithms. The GPU and CPU that may be included in the architecture can guarantee support for various kinds of deep learning algorithms. The architecture can be applied to the method examples provided above (the corresponding method examples in each application scenario).

By implementing the examples of the present disclosure, the following beneficial effects may be obtained.

(1) In this disclosure, various types of processors are provided to ensure the flexibility, efficiency, and scalability of the neural network processing device. In other words, simple neural network algorithms can be efficiently completed, and through the cooperation of a plurality of processors, complex tasks, such as target recognition, may be completed (the task herein can be replaced with any scenarios).

(2) By allocating the computing tasks of different characteristics into different processors, the neural network processor can maximize the efficiency while ensuring the scalability, compatibility, computation precision, and the computation efficiency.

(3) For the training process of a target task, the neural network accelerator can be used in the forward operation, and the GPU can be used in the backward operation, which not only ensures the flexibility and completeness of the system (the CPU and GPU in the system can perform any kind of computations), but also guarantees the speed of operation (by using a neural network accelerator as a forward accelerator).

The data processing device of an interconnection circuit provided by the present disclosure may be connected to a plurality of computation devices as shown in FIG. 2A, and in practical applications, it may also be connected to the devices shown in FIG. 1, FIG. 1A, and FIG. 6A. In practical applications, if there are a plurality of processors or computation devices in the field of neural network, the data processing device of the interconnection circuit may be, for instance, used for connections among a plurality of processors of an operating system for inference and training of neural network algorithms based on multi-processor collaboration, or be used for connections among the plurality of computation devices of the processing system of the neural network shown in FIG. 32, or be used in interconnection circuits with one or more transaction data sources and one or more transaction data destinations as a convergence node of the interconnection circuits. FIG. 91 schematically shows an integrated circuit 2 that includes transaction data sources, transaction data destinations, and data processing devices 10 and 11. It should be understood that the examples of the present disclosure can be used anywhere in a multi-way interconnection of multi-transactional data sources and destinations, and an interconnection topology is much more complex than that shown in FIG. 91. As shown in FIG. 91, transaction data sources or destinations 4, 5, 6, 7 may be neural network chips (in this case, the device may be an inter-chip data routing device), various computation devices described in the present disclosure (such as the computation devices shown in FIG. 1, FIG. 2A, or FIG. 6A), or operation units (in this case, the device is an on-chip data routing device). The interconnection circuit illustrated in FIG. 91 includes two data processing devices 10 and 11, where the two data processing devices are directly connected, can send transaction data to each other, and are upstream and downstream nodes of each other. The data processing device 10 is connected to transaction data sources and destinations 4, 6, and the data processing device 11 is connected to transaction data sources and destinations 5, 7.

It should be noted that the upstream and downstream of a data processing device may be a data source or destination, or another data processing device. FIG. 91 only shows two data processing devices and four data sources/destinations. In practical applications, the integrated circuit may be extended to n data processing devices and m data sources/destinations, or be extended to any n-to-n topology, and is not limited in the present disclosure.

As shown in FIG. 91, when the transaction data nodes 4 and 6 communicate with each other, only the data processing device 10 is needed as a convergence node to forward data, and data transferred between 5 and 7 also needs to be forwarded by the data processing device 11. When any one of the transaction data nodes 4, 6 sends data to any of the nodes 5 and 7, the data must first be sent to the data processing device 10, and forwarded by a transfer path established within the data processing device 10 to the data processing device 11, and then forwarded to the destination nodes 5 or 7.

The data processing device of the interconnection circuit provided by the present disclosure includes: a buffer memory which is configured to temporarily store transaction data via the device and preferably includes a plurality of static RAM storage circuits, where each of the static RAM storage circuits includes a plurality of storage bodies; a buffer memory allocator circuit configured to allocate specific locations for temporary storage of transaction data entering the device for flow control; a routing selection circuit configured to select an output data path for the transaction data entering the device according to the data destination; an arbitration circuit configured to perform an arbitration operation among a plurality of data transfer requests passing through the device to enable the plurality of data transfer requests that compete for a same transfer path to sequentially obtain an occupation right according to a preset arbitration method; and a multiplexer circuit configured to connect a plurality of transaction data sources and transaction data destinations for relaying data transfer in interconnection circuits. FIG. 92 is a micro-architecture of the device, where the device includes the following three components: the buffer memory, the multiplexer circuit, and the arbitration circuit. Optionally, other parts may also be included, such as the routing circuit, the buffer memory allocator circuit, the plurality of static RAM storage circuits, and the like. FIG. 92 is only a specific implementation of the present disclosure, and the actual micro-architecture should not be limited hereto. For instance, the buffer memory does not necessarily exist in each input processing module, instead, a plurality of input processing modules may share one buffer memory, or each input processing module includes n buffer memories. Therefore, the micro-architecture may be extended to include any count of buffer memories, while only one buffer memory and one multiplexer circuit may be needed in the arbitration circuit.

The data processing device of the present disclosure includes a plurality of inputs and output ends, where each of the input ends corresponds to a transaction data source or an upstream node of the data processing device by which transaction data passes when being transferred from the source to the destination in the interconnection circuit. Each input end includes a plurality of input ports, output ports, at least two multiplexers, and at least two buffer memories. Each output end corresponds to a transaction data destination or a downstream node of transaction data transfer. In an example, the upstream node may simultaneously serve as the downstream node of transaction data transfer, that is, all nodes connected to the data processing device can transfer data with the device in a full-duplex manner. Optionally, the input end may be designed as an input processing module.

Any piece of transaction data arriving at the data processing device is only associated with one data input end. When the transaction data arrives, the transaction data is allocated a storage position by the buffer memory allocator circuit according to a state of the data buffer memory device of the input end for temporarily storage of data, and simultaneously all the data that arrives at the input end are formed into one or more waiting queues in order to wait for a corresponding data path to be allocated.

In the storage part associated with each input end, all transaction data form a queue in an order of arrival. The routing selection circuit performs a routing selection operation on transaction data at a head of each queue in each clock cycle to determine an output end. An identifier of the output end is temporarily stored in a corresponding port identification register of a corresponding storage queue to indicate that all the data in the storage queue is to be output from this output end. When all the original transaction data in the storage queue are sent, the port identification register is cleared, and will be updated after new transaction data arrives.

The arbitration circuit checks the transfer state of all channels and processes the data transfer request of each storage position every cycle to control the transfer of transaction data at each input end in a preset order. The arbitration circuit determines an output order of data to be sent in the n buffer memories of the device, which can be viewed as determining which data in the buffer memories is allowed to be sent to the output end at a certain moment.

The multiplexer circuit connects the storage parts of all the input ends to all the output ends. When the transaction data in one or more of the storage parts (the buffer memory queues) obtains the occupation right of the channel, the multiplexer circuit establishes a transfer channel between the storage queues and requested output ends to enable the transaction data to be transferred from the data processing device to the downstream nodes of the interconnection circuit.

As an example of the data processing device of the interconnection circuit in the present disclosure, FIG. 92 schematically shows the data processing device 10 with more details. The data processing device includes three input ends 11, 12, and 13 and three output ends 1050, 1100, and 1150. Each of the three input ends includes: input ports 51, 52, and 53; output ports 54, 55, and 56; two multiplexers 30, 35, 40, 45, 50, and 60; and two buffer memories 22, 24, 26, 28, 30, and 32. The multiplexers 30, 40, 50 store transaction data arriving at the data processing device from respective input ports in allocated storage parts according to the current state of the buffer memories, and the allocation process is implemented by the buffer memory allocator circuits 23, 25, and 27 associated with the multiplexers respectively controlling the multiplexers. If the buffer memory allocator circuit 23 allocates a storage position for the transaction data currently arriving at the data processing device according to the storage state of the buffer memories 22 and 24, and the buffer memory 22 is idle, the arrival data is stored in the buffer memory 22 and a register that identifies a data destination in the memory is set to be the transaction data destination; and if the buffer memory 22 is not idle, the data destination register is queried, if the register is the same as that of the arrival data, the data is stored in the data destination register, otherwise, the buffer memory 24 is subject to the operations in the same manner.

As shown in FIG. 92, the routing selection circuits 41, 42, and 43 are associated with the multiplexer 35, 45, and 60 and the plurality of buffer memories 22, 24, 26, 28, 30, and 32, respectively. 41, 42, and 43 allocate an output end to data at the head of each buffer memory queue (if there is no data in the buffer queue, it is not needed to allocate an output end), and write an output end identifier required by the transaction data in each buffer queue for transfer to a corresponding output end identifier register. The arbitration circuit 36 is associated with three input ends and the routing selection circuits. In each cycle, buffer memories at the three input ends are arbitrated to determine which buffer memory queue has a prior transfer right. For instance, if both the buffer memories 22 and 24 are not idle, the arbitration circuit 36 determines that one of the buffer memories has a prior transfer right according to a preset rule, and writes the buffer memory identifier into a prior transfer identification register; and if data is stored in only one buffer memory, this buffer memory has a prior transfer right. Similarly, the buffer memories 26 and 28 and the buffer memories 30, 32 are arbitrated in the same manner to obtain the buffer memory which has a prior transfer right. Then, the arbitration circuit checks the output end identification register s associated with each buffer memory that has a prior transfer right, and simultaneously checks the state of the output ends 105, 110, and 115. If identification numbers of output ends required by transaction data to be transferred in the buffer memories do not conflict and all the requested output ends are idle, the arbitration circuit allows all transaction data to be transferred; if part of the output ends is occupied by transaction data of other buffer memories, the arbitration circuit postpones the transfer of transaction data that requests the part of output ends; and if a plural pieces of transaction data request the same output end, the arbitration circuit adopts the preset arbitration method to transfer the transaction data in different clock cycles.

Still referring to FIG. 92, the multiplexer circuit 38 is connected to the multiplexers 35, 45, and 55 and the output ends 105, 110, and 115. After the arbitration circuit 36 allocates the occupation right of the outputs for part of buffer memory queues, the transaction data in each storage queue is transferred to the corresponding outputs by the multiplexer circuit 38, and then transferred to the downstream nodes of the interconnection circuit.

In addition, the present disclosure also provides a data processing method of an interconnection circuit. As shown in FIG. 93, the data processing device performs data processing by using the interconnection circuit, where the data processing includes the following steps:

a step S1, receiving, by a multiplexer module, new transaction data;

a step S2, allocating, by a buffer memory allocator module, a temporary storage position for the transaction data;

a step S3, selecting, by a routing selection module, an output data path for the transaction data;

a step S4, performing, by an arbitration module, an arbitration operation according to a plurality of data transfer requests of transaction data to enable the plurality of transaction data competing for a same transfer channel to sequentially obtain occupation right of the data path according to a preset arbitration method; and a step S5, allocating, by the multiplexer module, a transfer channel for the transaction data that obtains the occupation right of the data path, and transferring the transaction data to downstream nodes of the interconnection circuit.

The step S4 further includes:

a step 41, obtaining, by the arbitration circuit, the prior transfer right for different buffer queues in each cycle in a polling manner; or enabling another buffer queue to obtain the prior transfer right after the transfer of one buffer queue is completed.

The step 4 further includes:

a step 42: determining, by the arbitration circuit, whether an output end requested by the transaction data that obtains the prior transfer right is occupied; if the output is occupied, waiting for a next cycle of arbitration processing; otherwise, checking, by the arbitration circuit, whether there are a plurality of transaction data competing for the same output end according to the transaction data transfer requests; if there are a plurality of transaction data competing for the same output, enabling, by the arbitration circuit, the plurality of transaction data competing for the same transfer channel to sequentially obtain the occupation rights of the output channel; otherwise, executing the step 5 above.

FIG. 94 is a flowchart of transaction data from reaching the data processing device, obtaining the occupation right of the transfer channel, to being output to downstream nodes according to an example of the present disclosure. As shown in FIG. 94, steps 64, 66, 68, 78, and 80 are necessary in this disclosure, while the remaining steps are optional in this disclosure. Specifically, in a step 62, an input end receives new transaction data. In the step 64, the buffer memory allocator circuit allocates buffer memories for newly arrived transaction data based on destinations of the transaction data. In the step 66, the routing selection circuit selects an output end for data at the head of the queue stored in the buffer queue in the step 64 and stores the data in a corresponding register. In the step 68, the arbitration circuit arbitrates the buffer memory corresponding to each input end respectively to obtain a buffer queue with the prior transfer right. In a step 70, the arbitration circuit determines whether the output end requested by the transaction data before obtaining the prior transfer right is occupied by data transfer of other storage parts; if the output end is occupied, the arbitration circuit executes a step 72, waiting for the next cycle of arbitration processing; otherwise the arbitration circuit executes a step 74. In the step 74, the arbitration circuit checks whether there are a plurality of data transfer requests competing for the same output end according to all transaction data transfer requests; if there are a plurality of data transfer requests competing for the same output end, the arbitration circuit executes a step 76, determining, by the arbitration circuit, which transfer request obtains the channel occupation right, and then executes the step 78, allocating the transfer channel for the data that obtains the channel occupation right and returning the data that does not obtain the occupation right to the step 74. If there is no data competing for the same output end, the step 78 is performed directly. In the step 78, the multiplexer circuit establishes a data path from the buffer memory to the output end for the transaction data that obtains the occupation right of the output path, and in the step 80, the multiplexer circuit transfers the transaction data to the downstream nodes of the interconnection circuit.

With the disclosed example, the device may be used as a data convergence node to support data transfer between one or more transaction data sources and one or more transaction data destinations. A main function of the device is to allocate the bus occupation right by adopting a reasonable arbitration logic when a plurality of nodes connected to the device (the convergence node) simultaneously send intensive data transfer requests.

This disclosure can be used in many general-purpose or special-purpose computing system environments or configurations, such as personal computers, server computers, handheld or portable devices, tablet devices, multi-processor systems, microprocessor-based systems, set-top boxes, programmable consumer electronics devices, network PCs, small computers, mainframe computers, distributed computing environment including any of the above systems or devices, and the like.

It should be noted that the examples related to data processing in the present disclosure can be applied to the method examples provided above to implement data transfer between source nodes and destination nodes.

By implementing the examples of the present disclosure, the following beneficial effects may be obtained: the data processing device provided in the present disclosure may be used as a data convergence node to support data transfer between one or more transaction data sources and one or more transaction data destinations. A main function of the device is to allocate the bus occupation right by adopting a reasonable arbitration logic when a plurality of nodes connected to the device (the convergence node) simultaneously send intensive data transfer requests.

FIG. 95 is a structural diagram of a non-linear function operation device of the present disclosure. The device is mainly used for processing fixed-point data, and includes three parts: a first part, a second part, and a third part. The non-linear function operation device can be added to the operation units shown in FIG. 1, FIG. 1A, and FIG. 6A. In practical applications, the device can also be added to an operation unit of a neural network processing chip. When the operation unit includes the non-linear function operation, the non-linear function operation device can be loaded into the chip or the operation unit of the processor. The non-linear function operation device is mainly used for processing fixed-point data.

The first part is used for domain conversion and is implemented by a domain conversion unit 10. The domain conversion unit 10 includes a multiplier 1 and an adder 2, and is configured to convert input arguments into corresponding values within a range of a lookup table. The second part is used for table lookup and is implemented by a table lookup component 20. The table lookup component 20 includes a slope array storage unit 3, an intercept array storage unit 4, an index generation unit 5, and an index unit 6, and is configured to look up corresponding slopes and intercepts of piecewise liner fitting according to values of the arguments input from the first part. The third part is used for linear fitting and is implemented by a linear fitting component 30. The linear fitting component 30 includes a multiplier 7 and an adder 8, and is configured to obtain a final result by performing linear fitting on the slopes and the intercepts obtained from table lookup in the second part.

The multiplier 1 is configured to scale an input domain.

The adder 2 is configured to offset an input domain.

The slope array storage unit 3 is configured to store slope data of piecewise linear fitting.

The intercept array storage unit 4 is configured to store intercept data of piecewise linear fitting.

The index generating unit 5 is configured to calculate index values of the lookup table according to input values.

The index unit 6 is configured to output the corresponding slopes and intercepts according to the index values.

The multiplier 7 is configured to calculate k*x.

The adder 8 is configured to calculate k*x+b.

The calculation of a non-linear function can be divided into the following situations.

(1) The domain needs to be converted, and the input domain of piecewise linear fitting is the input data of the first part.

(2) The domain needs to be converted, and the input domain of piecewise linear fitting is the output data of the first part.

(3) The domain does not needed to be converted.

(4) The domain needs to be converted, and values of the domain before or after conversion can be selected for linear fitting.

(5) It can be determined whether to perform domain conversion, and values of the domain before or after conversion can be selected for linear fitting.

FIG. 96 shows an internal structure of a domain conversion component in the present disclosure. The structure of the domain conversion component is as follows.

As shown in the figure, the domain conversion component 10 is a domain conversion component, and includes three inputs x, i, and j, where x is an argument of the non-linear function, and i and j are two constants related to the domain range of the non-linear function. new_x is an output result after the domain is converted. The operation implemented by the above component is: new_x=x*i+j. The purpose of the domain conversion is to facilitate the following table lookup operation.

For a case where the domain does not need to be converted, i.e., new_x=x*i+j, i=1, and j=0, the input argument does not needed to be converted, and can be directly used as an input argument of kx of the multiplier 7.

FIG. 97 shows an internal structure of a table lookup component in the present disclosure. The structure of the table lookup components is as follows.

As shown in the figure, the input of the table lookup component 20 is an argument of the non-linear function, or a second argument obtained after a first argument of the non-linear function is subject to the domain conversion.

The slope array storage unit and the intercept array storage unit store the straight slope (i.e., K) and the intercept (i.e., b) of the piecewise linear fitting of the non-linear function respectively. Before the calculation starts, both the slope array storage unit and the intercept array storage unit have stored valid data of the slopes and intercepts.

The valid data of the slope and intercept can be implemented by linearly fitting least squares method of the non-linear function. In specific examples of the present disclosure, other methods can also be used to obtain the valid data of the slope and intercept.

The index generation unit calculates the value of the input x to obtain an index value. The index unit queries the slope and the intercept corresponding to the index value from the slope array storage unit and the intercept array storage unit according to the index value, and outputs the corresponding slope and intercept.

FIG. 98 shows an internal structure of a linear fitting component in the present disclosure. The structure of the linear fitting component is as follows.

As shown in the figure, the linear fitting component 30 includes three inputs. x represents an argument, which may be converted or unconverted (that is, x may be the first argument of the non-linear function or the second argument obtained after the first argument is subject to the domain conversion), k and b are the intercept and the slope obtained from the table lookup operation respectively, and the output is a final result f (x). The calculation implemented by the linear fitting component 30 is: f (x)=k*x+b.

FIG. 99 shows a first example of the non-linear function operation in the present disclosure.

In this example, the input of the table lookup component 20 is an argument x, and the lookup component 20 looks up the corresponding slope k and intercept b according to the value of x, and outputs k and b. The multiplier 7 performs k*x and outputs the result and b, and the adder 8 performs k*x+b to obtain the final result.

FIG. 100 shows a second example of the non-linear function operation in the present disclosure.

In this example, the multiplier 1 scales the input argument x, and the adder 2 offsets x. The input of the table lookup component 20 is the output of the adder 2, and the lookup component 20 looks up the corresponding slope k and intercept b according to the output value of the adder 2, and outputs k and b. The multiplier 7 performs k*new_x, and outputs the result and b, and the adder 8 performs k*new_x+b to obtain the final result.

FIG. 101 shows a third example of the non-linear function operation in the present disclosure.

In this example, the multiplier 1 scales the input argument x, and the adder 2 offsets x. The input of the table lookup component 20 is the output of the adder 2, and the lookup component 20 looks up the corresponding slope k and intercept b according to the output value of the adder 2, and outputs k and b. The multiplier 7 performs k*x, and outputs the result and b, and the adder 8 calculates k*x+b to obtain the final result.

FIG. 102 shows a fourth example of the non-linear function operation in the present disclosure.

In this example, the multiplier 1 scales the input argument x, and the adder 2 offsets x. The input of the table lookup component 20 is the output of the adder 2, and the lookup component 20 looks up the corresponding slope k and intercept b according to the output value of the adder 2, and outputs k and b. The multiplier 7 performs k*x or k*new_x, and outputs the result and b, and the adder 8 calculates k*x+b or k*new_x+b to obtain the final result.

In this example, an argument multiplexer (MUX) is set to select an argument required by the multiplier 7 for operation to be the input argument x or the argument new_x which is output after being processed by the adder 2. Specifically, if the argument multiplexer is closed, the value of x in the multiplier 7 may be the second argument obtained after the first argument of the non-linear function is subject to the domain conversion; if the argument multiplexer is disconnected, the value of x in the multiplier 7 may be the first argument of the non-linear function.

FIG. 103 shows a fifth example of the non-linear function operation of the present disclosure.

In this example, the multiplier 1 scales the input argument x, and the adder 2 offsets x. The input of the table lookup component 20 may be an original input x or new_x that is subject to the domain conversion, and the lookup component 20 looks up the corresponding slope k and intercept b according to the output value of the adder 2, and outputs k and b. The multiplier 7 calculates k*x or k*new_x, and outputs the result and b, and the adder 8 calculates k*x+b or k*new_x+b to obtain the final result.

In this example, an argument multiplexer (MUX) is set to select the input of the table lookup component 20 to be the input argument x or the argument new_x that is output after being processed by the adder 2, and to select an argument required by the multiplier 7 for operation to be the input argument x or the argument new_x which is output after being processed by the adder 2

The beneficial effects of the present disclosure are further described below through a specific example.

$$\frac{1}{1+e^{-x}}$$

In this example, the domain is: (−∞, +∞), and the range is: (−1,1). This function is also called a Sigmoid function.

As described above, during calculation of the above non-linear function, the present disclosure needs three calculation steps: table lookup, multiplication, and addition.

The calculation steps required in FPU are as follows:

a step 1, negating: x=−x;

a step 2, calculating $\log_2 x$;

a step 3, calculating $\log_2 e$;

a step 4, dividing the result of the step 2 by the result of the step 3;

a step 5, adding 1 and the result of the step 4; and a step 6, dividing 1 by the result of the step 5.

Referring to a curve of the Sigmoid function, f (−7.75) =0.00043, f (7.75)=0.99957.

Then an interpolation range can be set to [−7.75, 7.75], because the value of f (x) outside this interval is basically close to 0 and 1. This interval is set to [−a, a], that is, a=7.75.

If a non-linear function device can store 64 groups of k and b in total, this variable is defined as N. In practical applications, for calculation accuracy, 128 groups of K and b can also be stored. For function calculation, the more the values of K and b are assigned, the higher the calculation accuracy is.

According to a and N, partition of the interpolation interval may be as follows:

segment 1: (−∞, 7);

segment 2 to segment 63: proportionally partitioning (−7.75, 7.75) into 62 intervals, that is, x is partitioned into a segment (7.75*2/62=0.25) every 0.25; and segment 64: (7.75, +∞).

A method for obtaining slopes and intercepts of the 64 groups of segments is:

according to the partitioned 64 intervals of x, adopting the least squares method for linear fitting to obtain 64 groups of K and b respectively.

Specifically, for segment 0: k: 3.56478084049e-05, b: 0.000464867209246; and for segment 63: k: 0.000380432718501 b: 0.996623118445. Since there are many values corresponding to K and b, the segment 0 and the segment 63 are used as instances.

In other words, 64 segments are used to perform piecewise fitting on f (x).

If f (x) is represented by 64 segments, it can be regarded as a piecewise function.

$$f(x) = \begin{cases} 3.565e-5 * x + 0.00046, & x < -7.75 \\ \dots & \\ 0.00038 * x + 0.9966, & x > 7.75 \end{cases}.$$

After 64 groups of k and b are obtained, the values of k and b need to be stored in the register of the operation device before the device is used. In other words, a mapping relationship between the 64 values of k and corresponding index values is stored in the slope array storage unit, and the mapping relationship between the 64 values of b and corresponding index values is stored in the intercept array storage unit.

After the above steps are completed, the operation device can perform an approximate calculation off (x). For this calculation, the domain does not need to be converted, that is, x=new x.

The operation device receives an input x. If x is a 32-bit fixed-point number, a format of 32-bit fixed-point is as follows:

| Sign bit 1 | Integer bits 2 to16 | Decimal bits 17 to 32 |
|---|---|---|

Since a lookup range of the table lookup component is [−7.75, 7.75], the count of bits corresponding to x are the sign bit 1 and the bits 14 to 18, and the table lookup component determines the index according to the values of these bits.

| Sign bit 1 | Bits 14 to 18 | Index |
|---|---|---|
| 1 | 00000 | 0 |
| 1 | 00001 | 1 |
| . . . | . . . | . . . |
| 1 | 11111 | 31 |
| 0 | 00000 | 32 |
| 0 | 00001 | 33 |
| 0 | 00010 | 34 |
| . . . | . . . | . . . |
| 0 | 11111 | 63 |

Specifically, if the input x is −8, a fixed-point binary format of x is represented as: 1111 1111 1111 1000 0000 0000 0000 0000. The sign bit is 1, the bits 14-18 are 00000, and through the table lookup, the index is 0 when x is −8. Therefore, it can be obtained that k is 3.56478084049e-05 and b is 0.00046. Finally, the multiplier and the adder of the device perform the operation of k*x+b to obtain the value of f (x), which can be represented as 3.56478084049e-05*8+ 0.00046=0.0001748.

It can be seen from the above operations that the advantages of this disclosure are as follows.

(1) The computation process is accelerated. The computation method of the present disclosure includes: determining the index value, obtaining values of k and b through table lookup, and performing the multiplication operation and the addition operation, which is simpler than the existing computation process. The computation amount of this method is also much smaller.

(2) Complex hardware designs, such as computation components of $\log_2 x$, may be avoided, which reduces chip area and power consumption.

The present disclosure provides a non-linear function computation device and method, where the device includes a controller, a table lookup component, and a linear fitting component. The device may be added to the operation units shown in FIGS. 1, 1A, and 6A, and in practical applications, may also be added to the operation unit of the neural network processing chip. When the operation unit includes a non-linear function operation, the non-linear function operation device may be loaded on a chip or an operation unit of a processor. The non-linear function operation device is mainly used for floating-point data processing.

The controller is configured to control operations of the table lookup component and the linear fitting component, and control behaviors such as data transfer. The table lookup component is a memory configured to store slopes and intercepts of a plurality of linear functions, and obtain corresponding slope k and intercept b according to floating-point data. The linear fitting component is configured to obtain a corresponding linear function y=k×x+b according to the slope k and the intercept b obtained through the table lookup operation, and substitute the floating-point data into the linear function to obtain a value of the linear function as the function value of the floating-point data in the non-linear function. In this disclosure, a non-linear function is fitted into a plurality of linear functions, and it is only needed to select corresponding linear functions for different arguments, so only simple addition and multiplication operations need to be performed during the operation, which simplifies the hardware design, increases the operation speed, and simultaneously reduces the power consumption and area of the chip.

The present disclosure provides a non-linear function operation device for computing a value of a non-linear function according to input floating-point data. The device includes:

the controller configured to control the table lookup component and the linear fitting component. The controller can be a dedicated module of the device. When the device is used as part of other devices (i.e., as a sub-module), the controller can also be part of a controller of other devices; in other words, the controller may control the table lookup component and the linear fitting component through a controller of a parent module.

The device further includes:

the table lookup component which includes a slope and intercept storage component and a selection component. The slope and intercept storage component stores slopes and intercepts of a plurality of linear functions, where the plurality of linear functions are obtained by piecewise linear fitting of non-linear functions. The selection component obtains storage positions of corresponding slope k and intercept b according to the floating-point data to obtain the corresponding slope and intercept. Since a linear function can be determined by a group of slopes and intercepts, there must be a corresponding relationship between the slope and the intercept when stored.

The device further includes:

the linear fitting component configured to obtain the slope k and the intercept b obtained from the slope and intercept storage component according to positions of the slope and the intercept output from the table lookup component, and then calculate a linear function $y=k\times x+b$, where x is input floating-point data of the device (i.e., argument) and y is an output of the device. The linear fitting component includes a multiplier and an adder configured to calculate the above linear function. The principle of the present disclosure is to fit a complex non-linear function into a multi-segment linear function. It should be known that the smaller a segmented interval is, the closer a value of linear function and a value of a non-linear function are, which can be viewed as higher precision. According to a segment which the input floating-point data is in, the linear function corresponding to this segment is determined, and then the floating-point data is substituted into the linear function to obtain the corresponding function value.

According to an example of the present disclosure, the table lookup component includes a slope intercept and storage component and a selection component, where the slope intercept storage component is configured to store slopes and intercepts corresponding to a plurality of linear functions and the selection component is configured to perform a computation according to the floating-point data to obtain positions of the slope k and the intercept b that should be selected in the slope and intercept storage component. The selection component includes a configuration component configured to configure parameters required in the selection process, where the parameters include slopes, intercepts, and other parameters. The configuration component also includes a parameter storage component configured to store parameters except the slopes and the intercepts.

Other parameters configured by the configuration component include N, R, and bias.

N: The count of intervals. N is used to partition the argument of the non-linear function into N intervals, fit the non-linear function into a linear function in each interval to obtain N linear functions, and obtain slopes and intercepts of the N linear functions. The slopes and the intercepts of the N linear functions are stored in the slope and intercept storage component, and each group of slope and intercept corresponds one-to-one to a serial number index of one of the N intervals, where the serial number index is stored in the selection component. The value range of the serial number index is [0, N−1]. Therefore, according to an interval which the floating-point data is in, the selection component obtains the serial number index of the corresponding interval, and obtains the corresponding slope k and intercept b in the slope and interception storage component according to the serial number index.

r: The value range of the argument. When the parameter is set to r, the value range of the non-linear function argument is (−r, r), and an exponential part of a boundary value r is input to the selection component as a bias value. The selection component determines the serial number index according to the floating-point data and the bias value, and obtains the corresponding slope and intercept according to the serial number index. It should be noted that a linear function cannot cover values of all non-linear functions, so the value range of the non-linear function argument can be set to (−r, r), and linear fitting is implemented in the range of (−r, r). Then, the input floating-point data is within the range of (−r, r), so that only the interval which the floating-point data is in is needed to obtain in the serial number index.

bias: Bias value, which is used to deal with situation when the input is not within the range of the argument. The situation specifically includes:

before the selection component performs the selection, the configuration component stores data input from an external device into the parameter storage component in the configuration component and the slope and intercept storage component. A source of the data may be a register, an on-chip memory, an off-chip memory, and the like. Data transfer is controlled by the controller.

A specific execution process of the selection component is as follows. All data such as bias and exp are stored in a storage component (such as a register) of the selection component, and the computation is performed by the operation component in the selection component.

If bias−exp <0, the index is N−1 when the floating-point data is positive, and the index is 0 when the floating-point data is negative, where exp is the exponential part of the floating-point data;

$$\text{if } 0<\text{bias}-\text{exp}<W-1,$$

$$\text{index}=2^{W-1}+2^{W-1-m-1}\text{frac}[F-1:F-(W-1-m-1)+1].$$

where frac is a mantissa part of the floating-point data, W is a bit width of the serial number index, $W=\log_2 N$, m=bias−exp, F is the bit width of the mantissa of the floating-point data, and each bit of the index and the sign bit of the floating-point data are subject to an exclusive OR operation; and if bias−exp>W−1, a highest bit of index is a negated sign bit of the floating-point data, and the lower W−1 bits are the sign bits of the floating-point data.

According to an example of the present disclosure, the linear fitting component includes a multiplier and an adder, where the multiplier is configured to multiply the slope k output by the table lookup component with the floating-point data to obtain a multiplication result, and the adder is configured to add the multiplication result obtained by the multiplier and the intercept b output from the table lookup component to obtain a final function value y.

The present disclosure also provides a non-linear function operation method for computing a value of a non-linear function according to input floating-point data. The method includes:

a step S0, controlling, by the controller, the configuration component to configure the device, which includes controlling the above parameters, slopes, and intercepts of different linear functions;

a step S1, controlling, by the controller, the selection component to calculate the corresponding serial number index according to the input floating-point data for selecting the corresponding slope k and intercept b, where the slopes and the intercepts are prepared in advance by performing piecewise interpolation on the non-linear function to be fitted and are pre-stored in an external memory connected to the device; and a step S2, according to the slope k and the intercept b obtained from the step S1, controlling, by the controller, the linear fitting component to calculate the linear function $y=k\times x+b$.

Specifically, in the above steps:

the configuration method of the configuration component in the step S0 specifically includes:

segmenting, by the configuration component, the argument of the non-linear function into N intervals by configuring the parameter N; in each interval, calculating by the selection component, a serial number of an interval corresponding to the input floating-point data according to the configured parameters bias and N; according to this serial number, looking up the corresponding slope and intercept in the slope intercept storage component; multiplying, by the linear fitting component, the slope and the input floating-point data to obtain a result; and adding the result and the intercept to obtain the final output result (the fitting result of the non-linear function). The device fits a non-linear function into a linear function to obtain N linear functions respectively and slopes and intercepts of the N linear functions, where each group of slope and intercept corresponds one-to-one to the serial number index of one of the N intervals. The value range of the serial number index is [0, N−1].

The step S0 also includes: the configuration part configuring the parameter r, setting the value range of the non-linear function argument to (−r, r), and using the exponential part of the boundary value r as a bias. This step also includes: according to the floating-point data and the bias, determining the serial number index, and obtaining the corresponding slope and intercept according to the serial number index.

In the above step S1, the selection component determines the serial number index according to the floating-point data and the parameter bias in the configuration component, including:

if bias−exp<0, the index is N−1 when the floating-point data is positive, and the index is 0 when the floating-point data is negative, where exp is the exponential part of the floating-point data;

$$\text{if } 0<\text{bias}-\text{exp}<W-1,$$

$$\text{index}=2^{W-1}+2^{W-1-m-1}\text{frac}[F-1:F-(W-1-m-1)+1].$$

where frac is a mantissa part of the floating-point data, W is a bit width of the serial number index, $W=\log_2 N$, m=bias−exp, F is the bit width of the mantissa of the floating-point data, and each bit of the index and the sign bit of the floating-point data are subject to an exclusive OR operation; and if bias−exp>W−1, the highest bit of index is a negated sign bit of the floating-point data, and the lower W−1 bits are the sign bits of the floating-point data.

In order to make the purpose, technical solutions, and advantages of the present disclosure more clear, the present disclosure are further described in detail below with specific examples and with reference to the accompanied drawings.

FIG. 103A is a structural diagram of a non-linear function computation device according to an example of the present disclosure. As shown in FIG. 103A, the device includes a table lookup component 5 and a linear fitting component 6, where the table lookup component 5 is configured to look up corresponding slopes and intercepts of piecewise linear fitting according to the input argument value x and the bias configured from the outside.

The table lookup component 5 includes a serial number selection component 1 and a slope intercept storage component 2. The serial number selection component 1 is configured to calculate the index according to the input argument value x and the configured bias, and the slope intercept storage component 2 is configured to select the slope and the intercept according to the index obtained from the computation of the serial number selection component 1.

The linear fitting component 6 is configured to obtain the final result by linear fitting according to the slope and intercept obtained by the table lookup component 5. The linear fitting component 6 includes a multiplier 3 and an adder 4, where the multiplier 3 is configured to calculate k*x, and the adder 4 is configured to calculate k*x+b.

FIG. 103B is an internal structure diagram of the nonlinear function computation device according to an example of the present disclosure. As shown in FIG. 103B, the inputs of the table lookup component 5 are the argument and the bias of the nonlinear function. The serial number selection component 1 calculates the index according to the argument x and the bias.

In the slope intercept storage component 2, Table_k and Table b store linear slopes and intercepts of the piecewise linear fitting of the nonlinear function. The values in Table_k and Table b are configurable. Before the computation starts, configuration of the values should be completed. According to the above index obtained from computation, a slope Table_k [index] and an intercept Table_b [index] to be used cam be selected.

FIG. 103C is an internal structure diagram of the linear fitting component according to an example of the present disclosure. As shown in FIG. 103C, the linear fitting component 6 has three inputs. x represents an argument, which can be viewed as a value that is input from an external device and needs to be subject to a nonlinear conversion, k and b are the intercept and the slope respectively obtained from the table lookup operation, and the output is a final result f (x). The calculation implemented by the linear fitting component 6 is: f (x)=k*x+b.

FIG. 103D shows the principle of the nonlinear function operation according to an example of the present disclosure. As shown in 103D, the input of the table lookup component 3 is an argument x, and the lookup component 3 looks up the corresponding slope k and intercept b according to the value of x, and outputs k and b. The multiplier 4 performs k*x and outputs the result and b, and the adder 5 performs k*x+b to obtain the final result.

The nonlinear function $$\frac{1}{1+e^{-x}}$$

is calculated to further explain the present disclosure. The argument of the nonlinear function is segmented into N intervals, where N=64. The value range of r is set to 7.75, in other words, the value interval is (−7.75, 7.75). Interpolation tables obtained by linearly fitting the above function are:

| | | |
|---|---|---|
| table_k = [0, | 0.00048656316525353121, | 0.00061973162484223741, |
| 0.00078928936655365655, | 0.0010051440297105911, | 0.0012798783909594086, |
| 0.0016294587358847128, | 0.0020741221116775564, | 0.0026394821537513336, |
| 0.0033578984220486922, | 0.0042701575375603202, | 0.0054275134806431417, |
| 0.0068941251757849761, | 0.0087499054356052815, | 0.011093746329263701, |
| 0.014046996903534316, | 0.017756918346970331, | 0.022399600632704755, |
| 0.028181459980468879, | 0.035337917880121604, | 0.044127182785956003, |
| 0.054816271160400852, | 0.067655703617413618, | 0.082839110694275894, |
| 0.10044501610076587, | 0.12036137423557895, | 0.14220006304664759, |

-continued

| | | |
|---|---|---|
| 0.16521866898611015, | 0.18827848066541336, | 0.20987496057486665, |
| 0.22827132183028082, | 0.24173985504038351, | 0.24887167444405783, |
| 0.24887167444405978, | 0.24173985504038323, | 0.22827132183028037, |
| 0.20987496057486754, | 0.18827848066541422, | 0.16521866898610904, |
| 0.14220006304664773, | 0.1203613742355779, | 0.10044501610076662, |
| 0.082839110694276047, | 0.067655703617414242, | 0.054816271160399312, |
| 0.044127182785955642, | 0.035337917880122131, | 0.028181459980469011, |
| 0.022399600632704762, | 0.017756918346970005, | 0.014046996903534123, |
| 0.011093746329263798, | 0.0087499054356035919, | 0.0068941251757841807, |
| 0.0054275134806434523, | 0.0042701575375596592, | 0.0033578984220488948, |
| 0.0026394821537508726, | 0.002074122111678265, | 0.0016294587358859139, |
| 0.0012798783909593549, | 0.001005144029710878, | 0.00078928936655333173, |
| 0.00061973162484123137, | 0.00048656316525207165,0] | |

| | | |
|---|---|---|
| table_b = [0, | 0.0041993251816466815, | 0.0051986385576176901, |
| 0.0064299574345850303, | 0.0079452052890187242, | 0.009807238238936004, |
| 0.012091883136726765, | 0.01489024369806616, | 0.018311254971669941, |
| 0.022484429652995856, | 0.027562682295467392, | 0.033725030746198308, |
| 0.041178847029904868, | 0.050161149061534412, | 0.060938175678893231, |
| 0.073802158887859029, | 0.089063797665378613, | 0.10703847125951904, |
| 0.12802378192384653, | 0.15226575415464311, | 0.17991125218316206, |
| 0.21094542275377304, | 0.24511595347355658, | 0.28185147996324666, |
| 0.32019008490568668, | 0.35874483153772002, | 0.39574347031640295, |
| 0.42918193126900617, | 0.45711585573612518, | 0.47807264767380625, |
| 0.4915012059787659, | 0.49811232472098371, | 0.49994440545964863, |
| 0.50005559454035076, | 0.50188767527901634, | 0.50849879402123443, |
| 0.52192735232619281, | 0.54288414426387344, | 0.57081806873099528, |
| 0.60425652968359678, | 0.6412551684622817, | 0.67980991509431143, |
| 0.71814852003675334, | 0.75488404652644192, | 0.78905457724623107, |
| 0.82008874781683905, | 0.84773424584535517, | 0.87197621807615311, |
| 0.8929615287404804, 0.9109362023346228, | 0.92619784111214154, | 0.93906182432110619, |
| 0.94983885093847398, | 0.95882115297009929, | 0.96627496925379974, |
| 0.97243731770453612, | 0.97751557034700309, | 0.98168874502833281, |
| 0.98510975630192921, | 0.98790811686326541, | 0.99019276176106386, |
| 0.9920547947109799, | 0.99357004256541748, | 0.99480136144239018, |
| 0.99580067481836443, 1] | | |

If the input argument x is set to a 16-bit floating-point decimal 0.25, the exponent part exp is set to 13, the mantissa part frac is set to b'0000000000, the bias is set to 17, and m is set to bias−exp=4 and is in the interval of 0<bias−exp<W−1, then the index can be obtained as follows:

$$2^{6-1}+2^{6-1-4-1}+\text{frac}[16-1:16-(6-1-4-1]+1, \text{ which is } 2^{5}+2^{0}+0=33.$$

According to the index, k [33]=0.248871674444 is selected from the above interpolation table as the slope k, b [33]=0.50005559454 is selected as the intercept b, the value of k×x+b is 0.562273513151, and a result obtained by linear fitting according to the function is 0.562176500886 with an error of −9.7012265e-05.

In summary, the present disclosure may avoid complex operations such as logarithmic calculation by adopting the linear fitting method, and increase the operation speed by adopting faster operations such as the multiplication and addition operations. In addition, complex hardware designs such as computing components of $\log_2 x$ may be avoided, which reduces chip area and power consumption.

In an aspect of an example of the present disclosure, a device for obtaining a function value is provided, where the device can piecewise fit a complex function into a simple linear function according to a range of data. When calculating the function value, the lookup module loads the interpolation table in the storage module, and looks up the corresponding slope and intercept according to the value range of the argument for basic operations (i.e., addition and multiplication operations). According to the large interval which the argument is in, the above process is repetitive to obtain the interpolation result, in other words, a function value approximately obtained. Therefore, the disclosure simplifies the hardware design, improves the operation speed, and reduces the area-to-power ratio of the chip.

The above device for obtaining a function value can be added to the operation units shown in FIGS. 1, 1A, and 6A, and in practical applications, can also be added to the operation unit of a neural network processing chip. When the operation unit includes the nonlinear function calculation, the device for obtaining the function value can be loaded on a chip or an operation unit of a processor. The device for obtaining a function value is mainly used for processing of floating-point data and fixed-point data.

FIG. 104A is an exemplary block diagram of an overall structure of a device for linear piecewise interpolation according to an example of the present disclosure. As shown in FIG. 104A, the device includes an I/O module A, a lookup module C, a storage module B, and a calculation module D, all of which can be implemented by hardware circuits, as shown in FIG. 36.

The I/O module A, also known as the input/output module, is configured to input data (the argument) $x_1$, transfer the $x_1$ to the lookup module C, and receive a final computation result Y from the calculation module D for output. It should be noted that $x_1$ may be original data, or be the data after the original data $x_0$ is preprocessed. For the sake of concise description, the preprocessing process is not described herein.

Interpolation functions $f_1, f_2, \ldots, f_N$ required for the computation process are stored in the storage module B, and $f_p$ corresponds to a $p_{th}$ segment of the interpolation function.

The range of data is partitioned into N large intervals $A_1$, $A_2$, . . . , $A_N$ in advance, and left and right endpoints of the large interval $A_p$ are represented by inf $A_p$ and sup $A_p$ respectively. Each large interval $A_p$ is partitioned into M small intervals $a_1^{(p)}, a_2^{(p)}, \ldots, a_M^{(p)}$. $f_p$ is defined as follows:

$$f_p(x) = \begin{cases} k_q^{(p)}x + b_q^{(p)} & \text{if } x \in a_q^{(p)}, q = 1, 2, \ldots, M \\ k_{M+1}^{(p)}x + b_{M+1}^{(p)} & \text{if } x > sup\ A_p \\ k_{M+2}^{(p)}x + b_{M+2}^{(p)} & \text{if } x < inf\ A_p \end{cases}.$$

This module stores all slopes $k_q^{(n)}$ and intercepts $b_q^{(p)}$, where p=1, 2, . . . , N and q=1, 2, . . . , M+2. The value of M is determined by the precision of the data. The larger the value of M is, the higher the precision is. In other words, a function value approximately obtained from the interpolation result is closer to a true value.

In the lookup module C, the data range is partitioned into N large intervals $A_1$, $A_2$, . . . , $A_N$ in advance, where i is obtained first so that the argument $x_1$ is in the interval $A_1$. Then the $p_{th}$ segment of the interpolation table in the storage module is sequentially loaded, where 1≤p≤i−1. For an argument $x_p$ used for the $p_{th}$ lookup, the corresponding slope $k_q^{(n)}$ and intercept are looked up and transferred to the calculation module D with the argument $x_p$. Then the lookup module C receives a computation result obtained from the calculation module D as an argument for a $p+1_{th}$ lookup. Finally, an $i_{th}$ segment of the interpolation table in the storage module is loaded for a last lookup.

$$x_{p+1}=f_p(x_p)=k_q^{(p)}x_p+b_q^{(p)}.$$

The calculation module D receives the argument $x_p$, the slope $k_q^{(p)}$, and the intercept $b_q^{(p)}$ obtained from the lookup module; 1≤p≤i−1, transfers the computation result $x_{p+1}$ to the lookup module C for a next lookup; and if p=i, transfers the computation result $x_{i+1}$ to the I/O module as the final output result Y, i.e., $y=x_{i+1}$.

In another aspect of the example of the present disclosure, a flowchart of a method for obtaining a function value is provided. FIG. 104B is a flowchart of performing piecewise interpolation according to an example of the present disclosure, and the method can be applied to the devices described above. The specific data transfer process is shown in FIG. 104C and includes the following steps:

a step S1, inputting, by the I/O module A, data $x_1$ (argument); transferring the data to the lookup module C; and proceeding to a step S2;

the step S2, obtaining, by the lookup module C, i first to make the argument $x_1$ in a large interval $A_i$; initializing a loop flag variable p, where p=0; and proceeding to a step S3;

the step S3, storing, by the storage module B, N segments of the interpolation table; loading, by the lookup module C, the $p_{th}$ segment of the interpolation table in the lookup module B for a lookup result; transferring, by the lookup module C, the lookup result (the corresponding slope $k_q^{(p)}$ and intercept $b_q^{(p)}$ in the function interpolation table) and the argument $x_p$ to the calculation module D; and proceeding to a step S4;

the step S4, calculating, by the calculation module D, a corresponding interpolation function value:

$$x_{p+1}=f_p(x_p)=k_q^{(p)}xp+b_q^{(p)} \text{ and}$$

a loop flag variable p=p+1; determining the value of P; if p<i, proceeding to a step S5; otherwise, proceeding to a step S6;

the step S5, transferring the calculation result $x_{p+1}$ to the lookup module C (the result is currently used as an argument for subsequent lookup and calculations); and proceeding to the step S3;

the step S6, transferring the calculation result $x_{i+1}$ to the I/O module A; and proceeding to a step S7; and the step S7, outputting, by the I/O module A, the result $y=x_{i+1}$.

The interpolation function in the above method includes, but is not limited to, linear functions or polynomials functions, as long as the function can convert a complex function operation into a simple one by interpolation.

Specific examples are listed below for description.

Example 1 performing linear piecewise interpolation on a function F(x)=exp(x) in an interval of [0,18].

First, the data range is partitioned into three large intervals (i.e., N=3), where A1=[0, 10), A2=[10, 15), A3=[15, 18). It should be pointed out that the three large intervals are not evenly partitioned here. Since a greater value of an argument leads to a larger derivative function of a curve (i.e., a steeper curve), in order to ensure precision of the approximation, the intervals can be partitioned smaller where the curve is steep and partitioned larger where the curve is gentle. Each of the large intervals are further partitioned into ten small intervals evenly: $a_1^{(1)}, a_2^{(1)}, \ldots, a_{10}^{(1)}, \ldots, a_1^{(2)}, a_2^{(2)}, \ldots a_{10}^{(2)}, \ldots, a_1^{(3)}, a_2^{(3)}, \ldots, a_{10}^{(3)}$, for instance, $a_1^{(1)}$=[0,1) and Then, definitions of the interpolation functions $f_1(x)$, $f_2(x)$, $f_3(x)$ are given:

$$f_1(x) = \begin{cases} k_q^{(1)}x + b_q^{(1)} & \text{if } x \in a_q^{(1)},\ q = 1, 2, \ldots, 10 \\ x & \text{else} \end{cases}$$

$$f_2(x) = \begin{cases} k_q^{(2)}x + b_q^{(2)} & \text{if } x \in a_q^{(2)},\ q = 1, 2, \ldots, 10 \\ x & \text{else} \end{cases}$$

$$f_1(x) = \begin{cases} k_q^{(3)}x + b_q^{(3)} & \text{if } x \in a_q^{(3)},\ q = 1, 2, \ldots, 10 \\ x & \text{else} \end{cases}$$

The rules for assigning values to the slope $k_q^{(1)}$ and the intercept $b_q^{(1)}$ are: at left and right endpoints of an interval $a_q^{(p)}$, the value of $f_p(x)$ is equal to the value of F(x)=exp(x). For instance, an effect of interpolation on the large interval $A_2$ is shown in FIG. 104D.

Finally, for the given argument $x_i$, the method steps shown in FIG. 104B and described above are executed sequentially.

Example 2 for a neural network applied to image classification, performing linear piecewise interpolation on an activation function F(x)=sigmoid(x) in an image gray scale of [0,255].

First, the data range is partitioned into eight large intervals (i.e., N=8), where A1 =[0, 31), A2=[32, 63), A3=[64, 95), . . . , A8=[224, 255]. It should be pointed out that the eight large intervals are not evenly partitioned here. Since a greater value of an argument leads to a larger derivative function of a curve (i.e., a steeper curve), in order to ensure precision of the approximation, the intervals can be partitioned smaller where the curve is steep and partitioned larger where the curve is gentle. Each of the large intervals can be further partitioned into 32 or 64 intervals evenly (determined according to a required precision, and may be partitioned into other number of small intervals). The interpolation function is similar to that in Example 1, where the rules for assigning values to the slope $k_q^{(p)}$ and the intercept $b_q^{(p)}$ are: at left and right endpoints of an interval $a_q^{(p)}$, the value of $f_p(x)$ is equal to the value of F(x)=sigmoid(x)

Finally, for the given argument $x_1$, the method steps described above are executed sequentially.

Based on the same concept, the present disclosure also provides a dedicated neural network device. The device is configured to calculate an activation function that uses an inner product of a neuron input value and a weight value as an argument through piecewise interpolation in a feed-forward operation of an artificial neural network.

FIG. 104E is a structural block diagram of a neural network device according to an example of the present disclosure. The neural network device 100 calculates the activation function that uses an inner product of a neuron input value and a weight value as an argument through piecewise interpolation. The device includes:

a memory 101 configured to store executable instructions;

a processor 102 configured to execute the executable instructions stored in the memory to execute the following operation steps:

a step 1, inputting data as an argument; and proceeding to a step 2;

the step 2, partitioning the data range of the argument into N large intervals: $A_1, A_2, \ldots, A_N$; partitioning each of the large intervals into M small intervals, where N and M are natural numbers; obtaining i to make the argument $x_1$ in a large interval $A_1$; initializing a loop flag variable p, where p=0; and proceeding to a step 3;

the step 3, according to the N segments of the interpolation table stored in the memory, loading the $p_{th}$ segment of the interpolation table for lookup; looking up corresponding parameter values in the function interpolation table according to the argument; and proceeding to a step 4;

the step 4, calculating a corresponding interpolation function value and a loop flag variable p=p+1 according to the parameter values and the argument; determining the value of p; if p<i, proceeding to the step 3; otherwise, proceeding to a step 5; and the step 5, outputting the interpolation function value.

The processor may include a general-purpose microprocessor, an instruction set processor, and/or related chipsets, and/or a dedicated microprocessor such as an application specific integrated circuit (ASIC). The processor may also include on-board memory for caching. Preferably, a dedicated neural network processor is used.

The processor is used for a single processing unit (a CPU or a GPU) or a plurality of processing units that perform different actions of the flow described in this example.

The execution of operation steps can be seen by reference to the flowchart of the piecewise interpolation method shown in FIG. 35, where the activation function is a hyperbolic tangent function or a Sigmoid function.

The device of this example may also include an input/output unit 103 configured to input original or preprocessed data, and output the function value after the interpolation operation.

The present disclosure provides a device configured to automatically correct and access data of a storage device. The storage device may specifically be a storage medium of the computation device shown in FIG. 1 or FIG. 6A, and in practical applications, may also be a storage medium of the computation device shown in FIG. 1F. The storage device may also be a storage medium shown in FIG. 2A. The device configured to automatically correct and access data of a storage device may be applied to other computation devices in the field of neural network, such as a device for a forward operation of an artificial neural network, an artificial neural network computation device for sparse connection, and the like. The device configured to automatically correct and access data of a storage device includes:

a storage device module configured to store data, where the storage device module includes an area for storing data and an area for storing supervisory bits;

an encoder module configured to obtain data and generate corresponding supervision bits according to the data;

a decoder module configured to check correctness of the data according to the supervision bits when the storage device module reads the data, send an error signal when error data is found in the data, correct the error data, and send corrected data to a reading/writing unit, where the reading/writing unit writes the corrected data back to the storage device to avoid an increase of data errors; and a reading/writing unit module configured to read/write data and supervision bits corresponding to the data.

The encoder module includes a supervisory bit generation module and a merging module, where the supervisory bit generation module is configured to generate supervisory bits according to the data, and the merger module is configured to merge the data and the supervisory bits in a specific order and output the merged data.

The decoder module includes a syndrome generation module, a data parsing module, an error correction code generation module, and a data error correction module. The syndrome generation module is configured to generate syndromes according to the data and the supervisory bits, where the syndromes are used to generate an error correction code; the data parsing module is configured to separate the data from the supervisory bits, and output data to be checked; the error correction code generation module is configured to generate an error correction code and error information according to the syndromes; and the data error correction module is configured to correct the data to be checked according to the error correction code.

The present disclosure also provides a method for automatically correcting and accessing data of a storage device. The method includes:

a step 1, obtaining data and generate corresponding supervision bits according to the data; and a step 2, checking, by the decoder, correctness of the data according to the supervision bits when the storage device module reads the data; sending an error signal when error data is found in the data; correcting the error data; sending corrected data to a reading/writing unit; writing, by the reading/writing unit, the corrected data back to the storage device to avoid an increase of data errors.

The method further includes reading/writing data and supervision bits corresponding to the data.

The step 1 includes: generating supervisory bits according to the data; merging the data and the supervisory bits in a specific order; and outputting the merged data.

The step 2 includes: generating syndromes according to the data and the supervisory bits, where the syndromes are used to generate an error correction code; separating the data from the supervisory bits, and outputting data to be checked; generating an error correction code and error information according to the syndromes; and correcting the data to be checked according to the error correction code.

In an example, the present disclosure provides a method for generating supervision bits during accessing data. The method includes returning an error signal when an uncorrectable error occurs, correcting the error, and writing the corrected data back to the storage device; or rewriting the corrected data back to the storage device when a correctable error occurs to achieve a purpose of automatic correction.

The specific technologies of this disclosure are as follows: in the process of ECC decoding, simultaneously generating an error signal, where the error signal indicates the amount of errors in the data and whether the errors can be corrected; when a correctable error occurs, rewiring the corrected data back to the storage device.

The principle of the present disclosure is: in the process of ECC decoding, using an error correction code to check whether an uncorrectable error occurs; when an uncorrectable error occurs, outputting, by the ECC decoding module, an error signal; and when a correctable error occurs, rewriting the corrected data back to the storage device.

The method for generating supervised bits provided by the present disclosure enables uncorrectable data errors that occur during the decoding process to be timely displayed; and when a correctable error occurs, the corrected data is written back to the storage device. In this case, automatic correction of data can be realized, which may avoid a situation where the increase of data errors leads to the failure of correction.

FIG. 104E is a structural diagram of the present disclosure. When writing data, the ECC encoder generates supervisory bits according to the write data, and sends the data and the supervisory bits together to the reading/writing unit; and the reading/writing unit writes the data and the supervisory bits together to storage device. When reading data, the reading/writing unit reads the data and the supervision bits together from the storage device and transfer the same to the ECC decoder. The ECC decoder determines whether there is an error according to the data supervision bits. If the error is correctable, the corrected data and an error signal are output; and if the error is uncorrectable, a signal of uncorrectable error is output. When a correctable error occurs, the corrected data is transferred to the ECC encoder for re-encoding, and then the reading/writing unit rewrites the data back to the storage device.

FIG. 105 shows a structure diagram and functions of the ECC encoder in this disclosure. The ECC encoder generates output data with supervisory bits according to input data. The supervisory bit generation module generates supervisory bits according to the input data. The merging module merges the input data and the supervisor bits in a specific order and outputs the merged data.

Functions of ECC encoder sub-module are shown as follows.

1. The supervision bit generation module is configured to generate supervision bits according to input data;

2. The merging module is configured to merge the input data and the supervision bits in a specific order.

FIG. 105A is a flowchart of ECC encoding according to the present disclosure. The process includes: a step 101, obtaining, by the ECC encoder, input data; a step 102, computing, by the ECC encoder, the supervisory bits according to the input data; a step 103, merging, by the ECC encoder, the supervisory bits and the data in a specific order; and a step 104, outputting, by the ECC encoder, the merged data and the supervisory bits to the reading/writing module.

FIG. 106 shows a structure diagram of the ECC decoder and functions of each module.

The ECC decoder corrects data according to the input data and the supervision bits. The functions of each module are as follows.

1. The syndrome generation module is configured to generate syndromes according to the input data and the supervision bits, where the syndromes are used to generate error correction codes.
2. The data parsing module is configured to separate the input data and the supervision bits, and output the data to be checked.
3. The error correction code generation module is configured to generate error correction codes and error information according to the syndromes.
4. The data error correction module is configured to correct the data to be checked according to the error correction code.

As shown in FIG. 107, the ECC decoding process specifically includes: obtaining, by the ECC decoder, input data and supervision bits; generating, by the ECC decoder, syndromes according to the data and the supervision bits; generating, by the ECC decoder, data to be checked according to the data and the supervision bits; generating, by the ECC decoder, error correction codes according to the syndromes; correcting, by the ECC decoder, the data to be checked according to the error correction codes; and outputting, by the ECC decoder, the error information and the corrected data.

For instance, two random errors are detected in 8-bit data and one error is corrected. It can be seen from the above description that the random error p=2, the amount of corrected errors q=1, and the ECC supervision bit m=2*p+q=5.

Symbols for the following operations are shown as follows:

^: an XOR operation

!: an Inversion operation

|: an OR operation

&: an AND operation

<<: a Move Left operation

Encoding:

in the ECC encoder, the supervisory bit generation module generates a 5-bit supervisory code c [5] according to the input data d [8], and the generation rules are as follows:

$$c[0]=d[0]\hat{}d[1]\hat{}d[3]\hat{}d[4]\hat{}d[6];$$

$$c[1]=d[0]\hat{}d[2]\hat{}d[3]\hat{}d[5]\hat{}d[6];$$

$$c[2]=d[1]\hat{}d[1]\hat{}d[3]\hat{}d[7];$$

$$c[3]=d[4]\hat{}d[5]\hat{}d[6]\hat{}d[7];$$

$$c[4]=d[0]\hat{}d[1]\hat{}d[2]\hat{}d[4]\hat{}d[5]\hat{}d[7];$$

the merging module in the ECC encoder merges the data and the supervisory bits in a specific order, and for the above instance, a merged result is:

c [0], c [1], d [0], [c2], d [1], d [2], d [3], c [7], d [4], d [5], d [6], d [7], [c4]; and the merged result is stored in the storage device, and the merged data is represented by e [13].

Decoding:

the syndrome generation module generates a 5-bit syndrome s [5] according to the 13-bit data e [13] with supervision bits, and the generation rules are as follows:

$$s[0]=e[0]\hat{}e[2]\hat{}e[4]\hat{}e[6]\hat{}e[8]\hat{}e[10];$$

$$s[1]=e[1]\hat{}e[2]\hat{}e[5]\hat{}e[6]\hat{}e[9]\hat{}e[10];$$

$$s[2]=e[3]\hat{}e[4]\hat{}e[5]\hat{}e[6]\hat{}e[11]\hat{}0;$$

$$s[3]=e[7]\hat{}e[8]\hat{}e[9]\hat{}e[10]\hat{}e[11]\hat{}0;$$

$$s[4]=e[0]\hat{}e[1]\hat{}e[2]\hat{}e[3]\hat{}e[4]\hat{}e[5]\hat{}e[6]\hat{}e[7]\hat{}[8]\hat{}e[9]\hat{}e[10]\hat{}e[11]\hat{}e[12];$$

the data parsing module parses corresponding data to be corrected according to the rules of the merging module in the ECC encoder;

the error correction code generation module generates the error information and the error data location according to the syndromes, where the error location is: location=(! S [4]) <<4+s [3: 0];

the identification of an uncorrectable error is: fatal=(|s [3: 0]) &! S [4];

for the identification of data error: error, if the error is located at the data to be checked, 1 is returned, otherwise 0 is returned;

the data error correction module corrects the data according to the error location generated by the error correction codes, which can be viewed as inverting the corresponding data according to the error location:

*d*[location]=!*d*[location]; and the decoding ends. If the identification of data error is 1, a correctable error occurs. The ECC decoder transfers the corrected data to the ECC encoder for re-encoding and then the ECC encoder writes the data back to the storage device.

FIG. 108 is a schematic structural diagram of an operation device provided by the present disclosure. The instructions in the operation device may be any instruction or any combination of instructions provided by the present disclosure, including but not limited to: vector instructions, matrix instructions, nonlinear operation instructions, and the like. As shown in FIG. 108, the device includes an instruction module 10, a data module 20, and an operation module 30. The instruction module 10 is configured to cache instructions and provide instructions to the data module 20 and the operation module 30. The instructions in the instruction module 10 control a direction of a data flow of the data module 20. The data in the data module 20 affects the processing of a dependency in the instruction module 10. Simultaneously, the instructions in the instruction module 10 control specific operations of the operation module 30. Whether the operations of the module 30 are completed controls whether the instruction module 10 reads a new instruction. The data module 20 provides specific operation data for the operation module 30, and the operation module 30 sends an operation result back to the data module 20 for storage.

FIG. 109 is a schematic diagram of an instruction module of the device provided by the present disclosure. As shown in FIG. 109, the instruction module 10 includes an instruction caching unit 11, an instruction processing unit 12, a dependency processing unit 13, and a storage queue unit 14. The instruction processing unit 12 is composed of three components: an instruction fetching component 121, a decoding component 122, and an instruction queue component 123. The instruction caching unit 11 is configured to cache an instruction during execution of the instruction. After an instruction is executed, if the instruction is also an earliest one of unsubmitted instruction in the instruction caching unit 11, the instruction will be submitted. Once the instruction is submitted, changes in the state of the device caused by operations of the instruction cannot be withdrew. The instruction fetching component 121 is configured to fetch a next instruction to be executed from the instruction caching unit 11 and send the instruction to the decoding component 122; the decoding component 122 is configured to decode the instruction and send the decoded instruction to the instruction queue component 123; considering that there may be a dependency among different instructions on an included scalar register 124, the instruction queue component 123 is set to cache the decoded instruction, and the instructions are issued after the dependency is satisfied. The scalar register 124 provides the scalar register required by the device during the operation.

The dependency processing unit 13 is configured to process the data dependency that may exist between a current instruction and a previous instruction. For instance, when accessing data from the data module 20, two adjacent instructions may access the data in the same storage space, and if an operation is performed on the data before the execution of the previous instruction is completed, the consistency of the data may be affected, which may affect correctness of the operation result. Therefore, if the current instruction is detected by the dependency processing unit 13 to have a dependency with the data of the previous instruction, the instruction must wait in a storage queue unit 14 until the dependency is eliminated, where the storage queue unit 14 is an ordered queue. The instruction that has a dependency with the previous instruction on the data is stored in the queue until the dependency is eliminated.

FIG. 110 is a schematic structural diagram of a data module in this disclosure. As shown in FIG. 3, the data module 20 includes a data I/O unit 21 and a data temporary storage unit 22.

Preferably, a data processing unit 23 is also included. The data I/O unit 21 is configured to interact with a memory, in other words, the data I/O unit 21 can read data directly from the memory or write data directly into the memory. The data temporary storage unit 22 may be implemented by various storage devices (a SRAM, an eDRAM, a DRAM, a memristor, a 3D-DRAM, a non-volatile storage, etc.). The data temporary storage unit 22 is configured to store operation data of any size, such as vector data of different lengths. The data I/O unit 21 is configured to read necessary operation data according to an instruction and temporarily store the instruction in the data temporary storage unit 22. The scratchpad memory can store operation data of different/identical lengths. During the operation process, the data temporary storage unit 22 transfers the data to the data processing unit 23, and the data processing unit processes data to be operated according to the instruction, where the processing includes segmentation processing, loop processing, etc., and then transfers the data to an operation module 30.

Specifically, when both the lengths of two pieces of operation data involved in the operation are less than or equal to an operation scale of the operation module, the data temporary storage unit 22 inputs the data to be operated to the data processing unit 23; the data processing unit 23 obtains that the size of the data to be operated is not larger than the data size that the operation module can process at a time according to the instruction, and then directly transfers the data to the operation module 30. For instance, an operation scale of the operation unit 30 is an operation that can process two sets of vectors at a time, where each set of vectors includes four elements, such as (A1, A2, A3, A4) and (B1, B2, B3, B4), then the operation between (A1, A2, A3, A4) and (B1, B2, B3, B4) is the operation scale of the operation unit 30; both the two pieces of operation data are vectors with less than 4 elements, such as (A1, A2, A3) and (B1, B2), then (A1, A2, A3) and (B1, B2) can be transferred to the operation module 30 for operation.

When both the lengths of two pieces of operation data involved in the operation are larger than an operation scale of the operation module, the data temporary storage unit 22 inputs the data to be operated to the data processing unit 23; the data processing unit 23 obtains that the size of the data to be operated is larger than the data size that the operation module can process at a time according to the instruction, then splits each piece of operation data into a plurality of sub-operation data whose lengths are less than or equal to the operation scale, and controls the sub-operation data to be sequentially transferred to the operation module for operation. For instance, the operation scale of the operation unit 30 is an operation that can process two sets of vector operations at a time, where each set of vectors includes four elements, such as (A1, A2, A3, A4) and (B1, B2, B3, B4). Then the operation between (A1, A2, A3, A4) and (B1, B2, B3, B4) is the operation scale of the operation unit 30. Both the two pieces of operation data are larger than the operation scale, such as (A1, A2, A3, A4, A5) and (B1, B2, B3, B4, B5). Then (A1, A2, A3, A4, A5) can be split into D1 (A1, A2, A3, A4) and D2 (A5), (B1, B2, B3, B4, B5) can be split into d1 (B1, B2, B3, B4) and d2 (B5). Then the above four pieces of sub-operation data are transferred to the operation unit 30 in two separate times, where D1 (A1, A2, A3, A4) and d1 (B1, B2, B3, B4)) are transferred at first for operation and then D2 (A5) and d2 (B5) are transferred. In the above instance, both the two pieces of operation data larger than the operation scale are spilt into two segments, and sub-operation data of a corresponding segment is provided each time. When the amount of split segments for the two pieces of operation data is inconsistent, for instance, the first piece of operation data is split into three segments expressed as D1, D2, and D3, and the second piece of operation data is split into two segments expressed as d1 and d2, then the first operation data D1, D2, and D3 are transferred to the operation unit in three separate times, where the second piece of operation data d1 and d2 need to be transferred in cycles during the three times of transfer. In other words, D1 and d1 are transferred at first, D2 and d2 are transferred secondly, and D3 and d1 are transferred thirdly. For another instance, the first piece of operation data is split into five segments expressed as D1, D2, D3, D4, and D5, and the second piece of operation data is split into three segments expressed as d1, d2 and d3, then all the above operation data are transferred to the operation unit in five separate times. In other words, D1 and d1 are transferred at first, D2 and d2 are transferred secondly, D3 and d3 are transferred thirdly, D4 and d1 are transferred fourthly, and D5 and d2 are transferred fifthly.

When the length of one of the two pieces of operation data involved in the operation is larger than the operation scale of the operation module, and the length of the other piece of operation data is less than or equal to the operation scale of the operation module, the operation data whose length is larger than the operation scale is split into a plurality of sub-operation data whose lengths are less than or equal to the operation scale, and the plurality of sub-operation data and the operation data whose length is less than or equal to the operation scale are cyclically processed, in other words, all the above data are cyclically transferred to the operation module. For instance, if the length of the first piece of operation data is larger than the operation scale, the data is split into three segments DI, D2, and D3; if the length of the second piece of operation data is less than or equal to the operation scale, the data does not need to be split and is expressed as d, and the data is read in cycles. The first and the second piece of operation data are transferred to the operation unit in three separate times, in other words, D1 and d are transferred at first, D2 and d are transferred secondly, and D3 and d are transferred thirdly.

In general, the adjustment of the operation data performed by the data processing unit 23 include: when the length of the operation data is not larger than the operation scale of the operation unit, the data to be operated can be directly transferred to the operation unit 30 through the memory; otherwise, in each operation, data matching the operation scale of the operation unit 30 is transferred to the operation unit 30; and after the operation is completed or the batch of data enters a next pipeline stage, the memory transfers a new batch of data matching the operation scale of the operation unit 30 to the operation unit 30. In addition, when the lengths of two pieces of data to be operated are identical, both the data are directly transferred, or split and then transferred, to the operation unit 30 for operation; otherwise, the data with a larger length is split into segments and then read in order, while the data with a smaller length is split into segments and then read in cycles until the operation ends.

FIG. 111 is a schematic structural diagram of an operation module of the device provided by the present disclosure. As shown in FIG. 4, the operation module is composed of several different operation components, such as several vector addition components, several vector subtraction components, several vector Logical AND components, several vector dot product components, and the like. By using these operation components, the operation module may support various vector operations.

FIG. 112 is a flowchart of a method for an instruction supporting operation data of different lengths in the present disclosure. The process of executing the instruction includes:

a step 51, fetching, by the instruction fetching component 121 in the instruction processing unit 12, a vector operation instruction from the instruction caching unit 1; and sending the instruction to the decoding component 122 in the instruction processing unit;

a step S2, decoding, by the decoding component 122, the instruction; splitting the instruction into an opcode and different operation fields according to customized instruction rules, where the customized instruction rules includes that the instruction contains an opcode and at least one operation field, the opcode defines a type of vector operation, the operation fields store a value of data to be operated, a storage address of data, a length of data, or a storage address of an operation result, etc., and meanings of specific operation fields vary according to the opcode; and sending the operation instruction to the instruction queue component 123;

a step S3, in the instruction queue component 123, obtaining data to be operated according to the opcode and the operation fields of the instruction; and sending the data to be operated to the dependency processing unit 13 for analysis and determination of the data dependency;

a step S4, in the dependency processing unit 13, analyzing whether there is a dependency between the instruction and a previous instruction of which the execution is not completed; if there is no dependency, directly sending the instruction to the operation unit 30; otherwise, storing the instruction in the storage queue unit and waiting until there is no dependency between the instruction and the previous instruction of which the execution is not completed on the data; and sending the instruction to the operation unit 30;

a step S5, when the instruction is sent to the operation unit 30 for operation, adjusting, by the data temporary storage unit 22 in the data module 20, the data according to the length of the data and the operation scale of the operation unit 30, in other words, when a vector length is not larger than the operation scale of the operation unit 30, directly sending the vector to be operated into the operation unit 30; otherwise, in each operation, transferring the data matching the operation scale of the operation unit 30 to the operation unit 30, and after the operation is completed, transferring a new batch of data matching the operation scale of the operation unit 30 to the operation unit 30 for operation until the operation ends; when the lengths of two pieces of data to be operated are identical, transferring both the data directly to the operation unit 30 for operation; otherwise, reading the data with a larger length in order, and reading the data with a smaller length in cycles until the operation ends; and if the vector to be operated needs to be adjusted simultaneously according to the operation scale of the operation unit and the length also needs to be adjusted, ensuring that the vector with a larger length is read in order and the vector with a smaller length is read in cycles, and reading the data matching the operation scale in order; and a step S6, after the operation is completed, writing a result back to a specified address in the data temporary storage unit 22; and simultaneously submitting the instruction in the instruction caching unit 11.

To make the process clearer, a specific example is described below, and the process is further described in detail with reference to FIG. 113.

Example One

This example describes a specific process of performing a Vector-AND-Vector operation by using the operation device. First, a format of the Vector-AND-Vector operation instruction in this example is:

| Opcode | Operation field 1 | Operation field 2 | Operation field 3 | Operation field 4 | Operation field 5 |
|---|---|---|---|---|---|
| VAV | Start Storage address of Vector 1 | Length of Vector 1 | Start storage address of Vector2 | Length of Vector2 | Storage address of the operation result |

If each address of the register can store 16-bit data and the operation unit includes four VAV arithmetic units, each of the arithmetic units can simultaneously perform the VAV operation of 16-bit data. For instance, the operation instruction VAV 00001 01000 01001 01000 10001 indicates that vector 0 and vector 1 perform the VAV operation (Vector-AND-Vector operation). Specifically, the process of the VAV operation includes:

a step S1, fetching, by the instruction fetching component 121 in the instruction processing unit 11, a vector operation instruction from the instruction caching unit 11, in other words, VAV 00001 01000 01001 01000 10001; and sending the instruction to the decoding component 122 in the instruction processing unit 12;

a step S2, decoding, by the decoding component 122, the instruction to obtain the instruction opcode VAV, where the opcode VAV represents performing the Vector-AND-Vector operation, and to obtain five operation fields, where the five operation fields respectively represent a starting address and a length of a vector vin0 to be operated, a starting address and a length of a vector vin1, and a storage address of an operation result; and sending the operation instruction to the instruction queue component 123;

a step S3, in the instruction queue component 13, obtaining data to be operated according to the opcode and the operation fields of the instruction. Specifically, the instruction opcode is VAV, which represents performing the Vector-AND-Vector logical operation; and then obtaining an address and a length of the data to be operated from operation fields 1, 2, 3, and 4 (a starting address 00001 of the vector vin0, a length 01000 of the vector vin0, a starting address 01001 of vector vin1, and a length 01000 of the vector vin1, respectively). In other words, the vector vin0 starts reading data with a length of eight addresses, in other words, data at addresses 00001 to 01000, from the address 00001; the vector vin1 starts reading data with a length of eight addresses from the address 0100. The step S3 further includes: sending the data to the dependency processing unit 13 for analysis and determination of the data dependency.

The process further includes:

a step S4, in the dependency processing unit 123, analyzing whether there is a dependency between the instruction and a previous instruction of which the execution is not completed; if there is no dependency, directly sending the instruction to the operation unit 30; otherwise, storing the instruction in the storage queue unit and waiting until there is no dependency between the instruction and the previous instruction of which the execution is not completed on the data; and sending the instruction to the operation unit 30;

a step S5, obtaining, by the data I/O unit 21 in the data module 20, data from an external memory in advance, and temperately storing the obtained data in the data temporary storage unit 22; when the instruction is sent to the operation unit 30 for operation, looking up, by the data temporary storage unit 22, corresponding data according to the data address indicated by the instruction, and transferring the data to the operation unit 30. Before transferring the data to the operation unit 30, the data temporary storage unit 22 can transfer the data to the data processing unit 23, then the data processing unit 23 can adjust the data according to the length of the data and the operation scale of the operation unit 30, and then transfer the data to the operation module 30. The operation unit 30 can only process the VAV operation of four groups of 16-bit vectors at a time, so the data sent to the operation unit 30 for the first time includes the data of the first four address lengths indicated by vin0 and the first four addresses indicated by vin1, in other words, the data at addresses 00001 to 00100 and 01001 to 01100. The step S5 further includes: after the operation is completed, loading the data of the last four address lengths of vin0 and the last four address lengths of vin1 for operation, in other words, performing the VAV operation on the data at addresses 00001 to 00100 and 01001 to 01100.

The process further includes:

a step S6, after the operation is completed, writing the result back to a specified address 10001 in the data temporary storage unit 22, and simultaneously submitting the Vector-AND-Vector logical instruction in the instruction caching unit.

In this example, the VAV instruction can be replaced by any neural network logical instruction with two or more operands of the same length or different lengths.

Example Two

This example describes a specific process of performing a vector addition operation by using the operation device. First, a format of the Vector Addition operation instruction in this example is:

| Opcode | Operation field 1 | Operation field 2 | Operation field 3 | Operation field 4 | Operation field 5 |
|---|---|---|---|---|---|
| VA | Start Storage address of Vector 1 | Length of Vector 1 | Start storage address of Vector2 | Length of Vector2 | Storage address of the operation result |

If each address of the register can store 16-bit data and the operation unit includes four addition arithmetic units, each of the arithmetic units can simultaneously perform the addition operation of 16-bit data. For instance, the operation instruction VA 00001 01000 01001 01000 10001 indicates that vector 0 and vector 1 perform the VA operation (Vector Addition operation). Specifically, the process of the VA operation includes:

a step S1, fetching, by the instruction fetching component 121 in the instruction processing unit 11, a vector operation instruction from the instruction caching unit 11, in other words, VA 00001 01000 01001 01000 10001; and sending the instruction to the decoding component 122 in the instruction processing unit;

a step S2, decoding, by the decoding component 12, the instruction to obtain the instruction opcode VA, where the opcode VA represents performing the Vector Addition operation, and to obtain five operation fields, where the five operation fields respectively represent a starting address and a length of a vector vin0 to be operated, a starting address and a length of a vector vin1, and a storage address of an operation result; and sending the operation instruction to the instruction queue component 123;

a step S3, in the instruction queue component 123, obtaining data to be operated according to the opcode and the operation fields of the instruction. Specifically, the instruction opcode is VA, which represents performing the Vector Addition operation; and then obtaining an address and a length of the data to be operated from operation fields 1, 2, 3, and 4 (a starting address 00001 of the vector vin0, a length 01000 of the vector vin0, a starting address 01001 of vector vin1, and a length 01000 of the vector vin1, respectively). In other words, the vector vin0 starts reading data with a length of eight addresses, in other words, data at addresses 00001 to 01000, from the address 00001; the vector vin1 starts reading data with a length of two addresses from the address 0100. The step S3 further includes: sending the data to the dependency processing unit 13 for analysis and determination of the data dependency.

The process further includes:

a step S4, in the dependency processing unit 13, analyzing whether there is a dependency between the instruction and a previous instruction of which the execution is not completed; if there is no dependency, directly sending the instruction to the operation unit; otherwise, storing the instruction in the storage queue unit and waiting until there is no dependency between the instruction and the previous instruction of which the execution is not completed on the data; and sending the instruction to the operation unit;

a step S5, when the dependency is eliminated, sending the Vector Add Vector instruction to the operation unit 30; fetching, by the operation unit 30, vectors to be operated from the data temperate storage unit 22 according to the address and the length of data to be operated, and performing the addition operation in the operation unit. Since the operation unit 30 can only process the addition operation of four groups of 16-bit vectors at a time, the data cannot all be sent to the operation unit for operation at a time, but for a plurality of times. In addition, the length of vin1 is smaller than that of vin0, so the data of vin1 needs to be read in cycles. As shown in FIG. 112, the data sent to the operation unit 30 for the first time includes the data of the first four address lengths indicated by vin0 and the first two addresses indicated by vin1, in other words, the data at addresses 00001 to 00100 and addresses 01001 to 01100. The correspondence of the addition operation is: performing the addition operation on the data at the address 00001 and the data at the address 01001, performing the addition operation on the data at the address 00010 and the data at the address 01010, performing the addition operation on the data at the address 00011 and the data at the address 01001, and performing the addition operation on the data at the address 00100 and the data at the address 01010. After the operation is completed, the data sent to the operation unit 30 for the second time includes the data of the last four address lengths indicated by vin0 and the data of two address lengths indicated by vin1, in other words, the data at addresses 00101 to 01000 and addresses 01001 to 01010. The correspondence of the operation is: performing the addition operation on the data at the address 00101 and the data at the address 01001, performing the addition operation on the data at the address 00110 and the data at the address 01010, performing the addition operation on the data at the address 00111 and the data at the address 01001, and performing the addition operation on the data at the address 01000 and the data at the address 01010.

The process further includes:

a step S6, after the operation is completed, writing the result back to a specified address 10001 in the data temporary storage unit 22, and simultaneously submitting the Vector Addition instruction in the instruction caching unit.

The addition instruction in this example can be replaced by any neural network dedicated instruction with two or more operands of the same length or different lengths.

An instruction processed by the operation device can process data of the same or different lengths, which effectively improves flexibility of the instruction, reduces the amount of instructions at runtime (one operation can be completed by only one instruction), and mines the correlation of data when the instruction is executed. In this case, the method of calling data can be optimized, for instance, the data with a relatively small length does not need to be repetitively read or called, and the efficiency of data usage can be improved, etc.

FIG. 113A shows a structure of a serial carry addition tree. Specifically, a structure of a binary tree is used to add operands to be operated in pairs, and then propagate up results until a final result is obtained. Obviously, this structure supports parallel addition of a plurality of floating-point numbers, which speeds up the addition operation. However, during carry propagation, a large amount of clock delay is consumed. In addition, the operation result is related to the order of operands, and there may be a big precision loss of the operation result.

FIG. 114 shows a structure of a carry save addition tree. Specifically, a structure of Wallace tree is used to connect a component generated by a carry of each level of full adder to a more significant bit of a next level. The carry propagation is implemented by connection, which avoids complex carry propagation logic and reduces delay of carry propagation. However, this method cannot be directly used for the addition of floating-point numbers, and different orders of the operands may also cause computation errors.

FIG. 115 is a schematic diagram of a device for performing an addition operation on a plurality of floating-point numbers according to the present disclosure. As shown in FIG. 115, the device includes a pre-processing module, an addition operation module, and a normalization processing module, where the preprocessing module includes a comparison selection module and a computation shift module, the addition module includes a Wallace tree module, a final result accumulation module, and a leading zero anticipation module. The device for adding a plurality of floating-point numbers may be set in the computation device shown in FIG. 1, FIG. 4A, FIG. 2A, or FIG. 6A, and in practical applications, may also be set in the device for artificial neural network forward operation, an artificial neural network computation device for sparse connection, or other computation devices, chips, or processing devices in the field of neural networks.

There are x y-bit floating-point numbers of a same standard that are added, and an $i^{th}$ floating-point number is represented by fi, where x, y, and i are positive integers, and 1≤i≤x.

In the pre-processing module, each floating-point number fi is split into a sign bit part si, an exponent bit part ei, and a mantissa bit part mi, in other words, fi=(si, ei, mi). The comparison selection module performs a pairwise comparison operation. As shown in FIG. 116, if ea>eb, a is selected, otherwise b is selected. Then, as shown in FIG. 117, the binary tree structure is used to sequentially select a floating-point number fmax with a largest exponent bit, where the sign bit, the exponent bit, and the mantissa bit of fmax are smax, emax, and mmax, respectively.

FIG. 118 is a schematic diagram of the computation shift module according to the present disclosure. Specifically, differences Ae between each floating-point number fi and exponents of the floating-point number fmax with the largest exponent bit are separately obtained. If fmax is a normalized floating-point number and fi is a non-normalized floating-point number, the amount of bits for logical shift of the mantissa part of fi is represented as: n=Δe−1; otherwise, n=Δe. Then, the mantissa part mi of each floating-point number fi is subject to the logical shift accordingly. After the shift operation is completed, the exponent bits corresponding to the x floating-point numbers are the same, and the mantissa bit can be directly operated. The specific operations are shown as follows. Firstly, a hidden bit is added in front of a most significant bit of the mantissa bit mi. When the floating-point number fi is a normalized floating-point number, the value of the hidden bit is 1; when the floating-point number fi is a non-normalized floating-point number, the value of the hidden bit is 0; and k "0"s are added behind a least significant bit of the mantissa bit as significant bits. In this case, the total amount of mantissa bits is equal to the total amount of bits after the shift, in other words, the amount of original mantissa bits+the amount of hidden bits+the amount of added significant bits. Secondly, each floating-point number fi is shifted according to the amount n of bits to be logically shifted that is obtained before. Specifically, fi is shifted to the right by n bits to discard the least significant n bits of the mantissa bits; then the least significant bit after the shift is used as a sticky bit, on which an OR operation is performed with the discarded n bits; and the operation result is updated to the value of the sticky bit, in other words, a final result of required mantissa bits after the shift is obtained. Finally, it is determined whether the sign bit part si of each floating-point number fi is the same as the sign bit part smax of the floating-point number fmax with the largest exponent bit. If si is the same as smax, no operation is needed, otherwise, a complement of the mantissa part is fetched for the adder to perform subsequent operations directly.

In the addition operation module, the Wallace tree structure shown in FIG. 114 is used to accumulate the mantissa of each floating-point number after the shift until reduced to two numbers (denoted as sum1 and carry1), and output the two numbers to the final result accumulation module and the leading zero anticipation module. The Wallace tree structure quickly reduces a plurality of processed floating-point numbers to two numbers for accumulation by using simple hardware, in other words, i full adders are used each time to convert the j i-bit numbers into 2*j/3 i+l-bit numbers for accumulation, and then full adders of a layer are converted into 4*j/9 numbers until converted into 2 numbers.

The final result accumulation module uses dual channels for computation to obtain the operation result. The structure is shown in FIG. 119. A first channel adds sum1 and carry1 directly, and a second channel adds the inverse codes of sum 1 and carry1. Finally, according to the most significant bit of a result of the first channel, if the value of the most significant bit is 0, the result of the first channel is selected to be the final result tmp_sum of the accumulation part for output, otherwise, the result of the second channel is selected to be the final result tmp_sum of the accumulation part for output. Through the leading zero anticipator (LZA) method, the leading zero anticipation module first performs a bitwise operation on input sum1 and carry1 to obtain a propagation function T=sum1⊕carry1, then generates a function G=sum1·carry1, and kills the value of a function Z=(sum1·carry1)'; calculates the value of an indicator for each bit, where the $i^{th}$ bit is represented by fi, and $f_0=\overline{T_o}T_i$, $f_i=T_{i-1}(G_i\overline{Z_{i+1}}\vee Z_i\overline{G_{i+1}})\vee\overline{T_{i-1}}(Z_i\overline{Z_{i+1}}\vee G_i\overline{G_{i+1}})i>0$ are obtained through the following formula; and finally sets parameters.

$$F_i=\sum_{j=0}^{i} f_i$$

Then a position parameter can be obtained a $L_1=\overline{F_{i-1}}\square f$, a first value of a subscript of the position parameter that is not 0 is a position num_shift of the first significant bit of the final result tmp_sum of the accumulation part, anc can be output in a binary form.

In the normalization processing module, the final result tmp_sum is logically shifted according to the position num_shift of the first significant bit partitioned by the leading zero anticipation module, the amount of shifted bits is num_shift, and then the final result is normalized to obtain a sign bit sresult, an exponent bit eresult, and a mantissa bit mresult of the final result respectively, all of which are combined to obtain the final result sumresult={sresult, eresult, mresult}.

In an example, four 16-bit floating-point numbers are accumulated, in other words, x=4 and y=16. The floating-point numbers adopts an IEEE754 standard for half-type floating-point numbers, in other words, each floating-point number is composed of 1 sign bit, 5 exponent bits, and 10 mantissa bits.

In the device shown in FIG. 115, four floating-point numbers are input and are represented in a binary form as f1=0001001010000001, f2=0001110011110000, f3=0001100101111111, f4=0010010011011001. The binary form of the four numbers is split into a format of sign bit, exponent bit, and mantissa bit, that is {s,e,m}, so f1={0, 00100, 1010000001}, f2={0, 00111, 0011110000}, f3={0, 00110, 01011111111}, and f4={0, 01001, 0011011001}. The device shown in FIG. 116 is configured to compare exponent bits e1=00100 and e2=00111 of f1 and f2 respectively and select a larger exponent value emax (e1,e2)=00111, and compare the exponent bits e3=00110 and e4=01001 of f3 and f4 respectively and select a larger exponent value emax (e3,e4)=01001; then the tree structure shown in FIG. 43 is used to compare emax(e1,e2)=00111 and emax(e3, e4)=01001 and select a larger exponent bit emax=01001. The floating-point number is represented by fmax=f4=0010010011011001, and the sign bit and the mantissa bit are smax=0 and mmax=0011011001, respectively.

Then, differences between exponential bits e1, e2, e3, and e4 of f1, f2, f3, and f4 respectively and emax are calculated separately, which are Δe1=5, Δe2=2, Δe3=3, Δe4=0. Since f1, f2, f3, and f4 are all normalized floating-point numbers, the amount of bits to be shifted is n=Δe, in other words, n1=Δe1=5, n2=Δe2=2, n3=Δe3=3, and n4=Δe4=0. In order to reduce the precision loss during the operation, three significant bits are added, in other words, k=3, and the least significant bit is set to be a sticky bit. During the shift, since the IEEE754 standard is adopted in the example, 1 hidden bit is firstly added in front of the most significant bit of the mantissa part of fmax, f1, f2, f3, and f4 and the numbers are determined whether to be normalized floating-point numbers. Since f1, f2, f3, and f4 are all normalized floating-point numbers, the values of hidden bits of fmax, f1, f2, f3, and f4 are set to 1, then three "0"s are added behind the least significant bit of the mantissa bits, in other words, the preset total amount of bits are reached: original mantissa bits+the hidden bit+added significant bits=10+1+3=14 bits. Secondly, the floating-point numbers are shifted to the right according to the exponent difference n to discard the least significant n bits; then an OR operation is performed on the discarded n bits and a last sticky bit; and the value of the sticky bit is updated by using the operation result to obtain a final result of required mantissa bits after the shift. Taking f1 as an instance, the mantissa part of f1 is 1010000001, and 1 hidden bit is added in front of the most significant bit. Since f1 is a normalized floating-point number, the value of the hidden bit is 1 and then 11010000001 is obtained; three "0"s are added behind the least significant bit, where the least significant bit is defined as the sticky bit, then 11010000001000 is obtained. Since n1=5, 5 bits need to be shifted, so all the right-most 5 bits 01000 need to be discarded, then 00000110100000 is obtained; the OR operation is performed on the discarded 5 bits 01000 and the sticky bit 0, then 1 is obtained; this result is used to update the value of the sticky bit to be 1, so a result after the shift is 00000110100001. Taking f2 as another instance, the mantissa part can be obtained from the above as 0011110000, and 1 hidden bit is added in front of the most significant bit. Since f2 is a normalized floating-point number, the value of the hidden bit is 1; three "0"s are added behind the least significant bit, where the least significant bit is defined as the sticky bit, then 10011110000000 is obtained. Since n2=2, 2 bits need to be shifted, so all the right-most 2 bits 00 need to be discarded, then 00100111100000 is obtained; the OR operation is performed on the discarded 2 bits 00 and the sticky bit 0, then 1 is obtained; this result is used to update the value of the sticky bit to be 0, and the result after the shift is 00100111100000. Finally, the sign bits s1, s2, s3, and s4 of the floating-point numbers f1, f2, f3, and f4 are compared with smax, where all the results are 0, in other words, all the numbers are positive numbers, so there is no need to perform a complement operation on the mantissa part.

As shown in FIG. 115, the pre-processing result is input to the addition operation module. The Wallace tree structure shown in FIG. 114 is used to process four 14-bit pre-processed mantissas. In the present disclosure, a two-level Wallace tree structure is used. Specifically, the addition operation is performed through a first-level 4-2 Wallace tree structure, and then the results are sent to a second-level 3-2 Wallace tree structure and the leading zero anticipation module for operation. The 3-2 Wallace tree structure finally reduces the operation result to two numbers, in other words, sum1=11011000000100 and carry1=110100010, and outputs the two numbers to the final result accumulation module. The final result accumulation module uses dual channels for computation to obtain the operation result. The first channel adds sum1 and carry1 directly, and the second channel adds the inverse codes of sum1 and carry1. Since the most significant bit of a result of the first channel is 0, the result of the first channel is selected to be the final result of the accumulation part, in other words, tmp_sum=0011100101001000, and is output to the third module. The leading zero anticipation module is configured to calculate an output result of the first level 4-2 Wallace tree by using the leading zero anticipation algorithm (LZA algorithm) to obtain a final result of the accumulation part, normalize the final result, where the amount of bits to be shifted is expressed in a binary form as num_shift=10, and output the final result to the third module. The leading zero anticipation part and the second-level Wallace tree part are executed in parallel.

As shown in FIG. 115, by using the LZA algorithm, the normalization processing module performs a logical operation according to tmp_sum and the fmax obtained by the first module to obtain a sign bit sresult=0 of the final result; performs a logical operation according to the fmax obtained by the first module, the tmp_sum obtained by the accumulated part of the second module, and the output result num_shift of the leading zero anticipation part to obtain the exponent bit eresult=01001 of the final result; shifts and normalizes the tmp_sum obtained by the second module according to the output result num_shift of the leading zero anticipation part and the fmax obtained by the first module to obtain the mantissa mresult=11001100101001 of the final result; and finally combines the above obtained sresult, eresult, and mresult to obtain the final result sumresult={sresult, eresult, mresult}={0, 01001, 11001100101001}=00100111001100101001.

In summary, by using the above device, the addition operation of a plurality of floating-point numbers of the same standard can be quickly and efficiently performed, the amount of operands supported by one operation is increased, the operation delay can be reduced, the operation process can be accelerated, and the precision loss of the operation result can be reduced.

FIG. 119 is a schematic structural diagram of a device for performing a neural network operation according to the present disclosure. As shown in FIG. 119, the device includes a plurality of neural network processing modules 10 and an on-chip interconnection module 20, where the plurality of neural network processing modules 10 are communicatively connected with the on-chip interconnection unit 20. The above neural network processing unit may specifically be an operation unit as shown in FIG. 2A, and in practical applications, may also be an operation unit as shown in FIG. 1A, FIG. 1B, or FIG. 6A, or an operation unit that supports operation data of different bit widths. In practical applications, the device for performing a neural network operation may be set in the device for artificial neural network forward operation, an artificial neural network computation device for sparse connection, or other computation devices, chips, or processing devices in the field of neural networks.

The neural network processing module 10 can read and write data from other neural network processing modules 10 through the on-chip interconnection module 20, and can also read and write data from a local. When a neural network operation is to be performed, each neural network processing module 10 is used as a kernel to perform a corresponding operation, where data required for the operation can be obtained directly from the local, or be read from other neural network processing modules 10 through the communication between the on-chip interconnect module 20 and other neural network processing modules 10. After reading the data required for the operation, each neural network processing module 10 performs a corresponding operation to obtain respective operation results. In a single-layer neural network operation, each neural network processing module 10 can summarize the respective operation results to one neural network processing module 10 for accumulation to obtain a final result. In a multi-layer neural network operation, each neural network processing module 10 of a current layer calculates an operation result and the operation result may be used by other neural network processing modules 10 as the data required for the operation of the next layer, so after the neural network operation of the current layer is completed, each neural network processing module 10 may perform data interaction to prepare for a neural network operation of the next layer.

FIG. 120 is a schematic structural diagram of a neural network processing module according to the present disclosure. As shown in FIG. 60, the neural network processing module 10 includes a neural network processing unit 11 and a storage unit 12, where the storage unit 12 may specifically be a high-speed storage unit, such as a scratchpad memory. When the neural network processing module 10 performs a neural network operation, the neural network processing unit 11 directly reads data from a corresponding high-speed storage unit 12, and/or reads data from the neural network processing unit 11 in other neural network processing modules 10 through the on-chip interconnect unit 20, and/or reads data from the high-speed storage unit 12 in other neural network processing modules 10 through the on-chip interconnect unit 20; the neural network processing unit 11 in each neural network processing module 10 performs the neural network operation according to the read data to obtain respective operation results; after the operation is completed, the neural network processing unit 11 writes the operation results directly to the corresponding high-speed storage unit 12, and/or writes the operation results to the neural network processing unit 11 in the other neural network processing module 10 through the on-chip interconnection unit 20, and/or write the operation result data to the high-speed storage unit 12 in the other neural network processing module 10 through the on-chip interconnection unit 20. In summary, the neural network processing unit 11 can directly obtain data from the corresponding high-speed storage unit, and can also obtain data from other positions through the on-chip interconnect module 20, which avoids repetitively reading data from the memory and reduces memory access bandwidth.

As shown in FIG. 121, the device for performing a neural network operation according to the present disclosure further includes an external storage module 30, where the external storage module 30 is communicatively connected to the on-chip interconnect unit 20. The neural network processing module 10 can also read and write data from the external storage module through the on-chip interconnect unit. The external storage module 30 can be used to import new data from an external into the device, and the final execution result obtained by the device can also be written to the external storage module 30 for external export. The external storage module 30 may be implemented by hardware, including but not limited to, an FPGA, a CGRA, an application-specific integrated circuit (ASIC), an analog circuit, a memristor, and the like.

FIG. 122 is a schematic structural diagram of a neural network processing unit 11 according to the present disclosure. As shown in FIG. 122, the neural network processing unit 11 includes an instruction queue 111, a neural network computation unit 112, an IO reading unit 113, a caching unit 114, and a synchronization relationship unit 115. The instruction queue 111 stores various types of instructions, and the neural network processing unit 11 performs different operations according to different instructions. The following table describes the instructions:

| Name of Instruction | Opcode 1 | Opcode 2 | Opcode 3 | Opcode 4 | Opcode 5 | . . . |
|---|---|---|---|---|---|---|
| ACK | 0/1 | 0/1 | 0/1 | 0/1 | 0/1 | . . . |
| FENCE | 0/1 | 0/1 | 0/1 | 0/1 | 0/1 | . . . |
| SYNC | 0/1 | 0/1 | 0/1 | 0/1 | 0/1 | . . . |
| COMPUTE | MLP | addr1 | size1 | addr2 | size2 | . . . |
| IO | src | dest | size | | | |

An instruction includes the name of instruction and a plurality of opcodes.

A data transfer acknowledgment instruction is named ACK. Each of the opcodes indicates whether to send a data transfer acknowledgement signal (ACK signal) to the neural network processing unit 11; the neural network processing unit 11 writes data to other neural network processing unit 11, and then executes the data transfer acknowledgment instruction to send the data transfer acknowledgment signal to a corresponding neural network processing unit 11 and indicate that the data has been transferred in place.

A data dependency instruction is named FENCE. Each of the opcodes indicates whether to check the ACK signal sent from the neural network processing unit 11; the neural network processing unit 11 executes the data dependency instruction to detect whether all the dependent data are transferred to the neural network processing unit.

A data synchronization instruction is named SYNC. Each of the opcodes indicates whether the neural network processing unit participates in a synchronization operation; the neural network processing unit 11 executes the data synchronization instruction to force the plurality of neural network processing units 11 to perform the synchronization operation, in other words, only after all neural networks execute a current instruction can the neural network processing units execute subsequent instructions.

A computation instruction is named COMPUTE. The first opcode represents a specific computation task such as MLP, CONV, POOL, etc., while remaining opcodes indicate the address and size of input and output data, and configuration information of the neural network computation instruction. The COMPUTE instruction may also include other computation instructions to perform nonlinear and linear activation operations, and in actual application, may also be other neural network instructions such as a vector instruction or a matrix instruction. A specific expression form of the instructions specifically included in the COMPUTE instruction is not limited in the present disclosure.

An input and output instruction is named IO. The opcodes respectively represent information of a starting address, an end address, and data size of moved data. The neural network processing unit 11 executes the input and output instruction to communicate data with the remaining modules.

The IO reading unit 113 reads data from an external of the neural network processing unit 11 (such as the high-speed storage unit 12, other neural network processing unit 11, etc.) according to the operation instruction in the instruction queue 111, and caches the read data to the high-speed caching unit 114. The neural network operation unit 112 reads cached data from the caching unit 114 according to the operation instruction, and executes the neural network operation to obtain the corresponding operation result.

The neural network operation unit 112 writes the operation result to the caching unit 114, and when the operation result data needs to be transferred to the external (such as other neural network processing unit 11 and the like), the IO reading unit 113 reads the operation result from the caching unit 114 and writes the operation result to the external of the neural network processing unit 11.

FIG. 123 is a schematic structural diagram of an on-chip interconnection unit in this disclosure. The on-chip interconnection unit includes N-level interconnection modules cascaded with each other, and the amount of interconnection modules at each level is not limited. Specifically, FIG. 123 only shows an on-chip interconnection module in which one first-level interconnection module and a plurality of second-level interconnection modules are interconnected. As shown in FIG. 123, the on-chip interconnection module 20 includes a first-level interconnection module 21 and a plurality of second-level interconnection modules 22 communicatively connected to the first-level interconnection module 21. The first-level interconnection module 21 is also communicatively connected to an external storage module 30, and the second-level interconnection modules 22 correspond one-to-one with a plurality of neural network processing modules 10, where each second-level interconnection module 22 is communicatively connected to the neural network processing unit 11 and the high-speed storage unit 12 in the corresponding neural network processing module, respectively. Specifically, one port of the second-level interconnect module 22 is connected to the neural network processing unit 11, one port is connected to the high-speed storage unit 12 corresponding to the neural network processing unit, the other port is connected to the first-level interconnection module 21; and the plurality of second-level interconnection modules 22 are connected to the external storage module 30 through the first-level interconnection module. In this case, data paths among these modules are ensured, thus communication among each neural network processing unit 11, the high-speed storage unit 12, and the external storage module 30 may be ensured, and less area overhead is occupied.

The single-layer neural network operation can be performed by using the device described above in this present disclosure, and the specific process includes:

a step S1, reading, by each neural network processing module 10, data directly from a local according to computation instructions stored in the instruction queue 11 of the neural network processing module 10 and according to addresses indicated by opcodes in the instructions; and/or reading data from other neural network processing modules 10 through the on-chip interconnect module 20;

a step S2, performing, by each neural network processing module 10, partial operation of the single-layer neural network according to the read data to obtain respective operation result; and a step S3, storing, by each neural network processing module 10, the respective operation result in the local; and/or writing the respective operation result to other neural network processing modules 10 through the on-chip interconnection module 20.

The implementation process of a multi-layer neural network operation is similar to that of the single-layer neural network operation. After the artificial neural network of a previous layer is executed, during the operation of a next layer, each neural network processing module 10 reads new data from new addresses according to new operation instructions for computation, and distributes computation tasks among a plurality of cores (i.e., a plurality of neural network processing modules 10) according to new instructions. For the neural network operation of each layer, the above steps S1-S3 are executed, and the operation result obtained by each neural network processing module 10 of this layer is used for the neural network operation of the next layer.

In order to make the purpose, technical solutions, and advantages of the disclosure clearer, the disclosure will be further described in detail with specific examples and with reference to the accompanied drawings.

FIG. 124 is a flowchart of executing an operation of a fully connected layer according to an example of the present disclosure. The execution process is shown in FIG. 64, which includes:

a step 1: reading, by each neural network processing unit 11, data from a corresponding high-speed storage unit 12 according to fully connected operation instructions; and computing partial operation results of the fully connected layer respectively.

In each neural network processing unit 11, the instruction queue 111 sends the computation instruction COMPUTE to the neural network operation unit 112 and the IO reading unit 113, and the neural network operation unit 112 determines the operation of a fully connected layer is to be performed according to the first opcode of the fully connected operation instructions. Specifically, the IO reading unit 113 reads the data required for the operation from the corresponding high-speed storage unit 12 according to the address in the computation instruction COMPUTE, and stores the read data in the high-speed caching unit 114; the neural network operation unit 112 reads the corresponding data from the high-speed caching unit 114, and then performs partial operations of the fully connected layer according to the read data to obtain the partial operation results of the fully connected layer as output data.

The process further includes:

a step 2, transferring, by each neural network processing unit 11, obtained partial operation results to the corresponding neural network processing unit 11 through the on-chip interconnection module 20 according to the input/output instruction IO. Since each neural network processing unit 11 only computes partial operation results, the partial output data needs to be transferred to the corresponding neural network processing unit 11 for addition operation.

Specifically, in the step 1, the neural network operation unit 112 stores the obtained partial operation results in the high-speed caching unit 114, and after the instruction queue 111 sends the input/output instruction IO to the IO reading unit 113, the IO reading unit 113 outputs the instruction IO to read partial operation results stored in the high-speed caching unit 114 and transfer the same to the corresponding external neural network processing unit 11. It should be noted that each neural network processing unit 11 may transfer the partial operation results to a corresponding neural network processing unit 11, or to a plurality of corresponding neural network processing units 11. In other words, each neural network processing unit 11 may receive partial operation results transferred by one or a plurality of neural network processing units 11.

The process further includes:

a step 3, after transferring the obtained partial operation results to the corresponding neural network processing unit 11, executing, by each neural network processing unit 11, the data transfer acknowledgement instruction ACK to send a data transfer acknowledgment signal to the corresponding neural network processing unit 11, where each neural network processing unit 11 needs to send a data transfer acknowledgment signal to the neural network processing unit 11 that receives the transferred data to indicate the data dependency;

a step 4, detecting, by each neural network processing unit 11, whether the sent data transfer acknowledgment signal reaches the corresponding neural network processing unit 11 according to the data dependency instruction FENCE; if the sent data transfer acknowledgment signal does not reach the corresponding neural network processing unit 11, waiting for the corresponding data transfer acknowledgment signal to reach the corresponding neural network processing unit 11, where only when each neural network processing unit 11 that is to perform an addition operation receives all the data transfer acknowledgment signals sent by other neural network processing units 11, does it indicate that all the needed input data reach the corresponding neural network processing units 11 for the addition operation;

a step 5, according to the computation instruction COMPUTE, collecting, by each neural network processing unit 11, partial operation results of other neural network processing units 11; and performing the addition operation on the above collected partial operation results and partial operation results obtained from the operation of each neural network processing unit 11 to obtain final operation results; and a step 6, according to the input/output instruction IO, writing, by each neural network processing unit 11, the obtained final operation results into the external storage module 30 as output data, where the execution process of writing the final operation results into the external storage module 30 in each neural network processing unit 11 is similar to the step 2, and will not be further described herein.

In summary, the device and the instruction set provided by this disclosure solve the problems of insufficient operation performance and large front-end decoding overhead of CPU and GPU, and can effectively support the operation of multi-layer artificial neural network. In addition, by using a dedicated on-chip cache for the multi-layer artificial neural network operation, reusability of neurons and weights is fully exploited, which avoids repetitive reading of the data to a memory, reduces memory access bandwidth, and avoids a problem of the memory bandwidth becoming a performance bottleneck of the multi-layer artificial neural network operation.

Due to the use of a multi-core neural network processing module, a single-layer neural network is allowed to distribute tasks to be executed on a plurality of neural network processing modules; and dedicated instructions are used to allow data obtained from computation transferred among a plurality of neural network processors when a multi-layer neural network is executed, so as to implement the multi-layer and multi-core neural network operation.

Due to the use of the multi-core neural network processing module, the problem of insufficient processing performance of a single processor when performing the multi-core and multi-layer neural network processing operation can be solved, and the multi-core and multi-layer neural network operation is significantly accelerated.

Due to the use of dedicated data instructions, the problem of a large amount of data interaction among a plurality of processors when performing the multi-core and multi-layer neural network operation can be solved, and the multi-core and multi-layer neural network operation is significantly accelerated.

In different technical scenarios, the following technical effects may be achieved.

Scenario Recognition

In scenario recognition, due to the need to recognize feature information of a scenario, such as texture, outline, tone, and other feature information of an image, and then obtain information of the scenario based on the feature information, the image can be cut by comparison and placed in different processing units for processing, so that the feature extraction may be accelerated or even be implemented in real time.

Super Resolution

In super resolution, due to the need to recognize some feature information such as texture, outline, and tone of an image, and simultaneously fill in the features in subsequent networks based on the extracted features to obtain a super-resolution image, the image can be cut by comparison and placed in different processing units for processing, so that the feature extraction may be accelerated or even be implemented in real time, and a next image super-resolution operation can be performed in subsequent networks.

Image Retouching

In image retouching, due to the need to recognize and then retouch some feature information such as texture, outline, and tone of an image, the image can be cut by comparison and placed in different processing units for processing, so that the feature extraction may be accelerated or even be implemented in real time, and a next image retouching operation can be performed based on the extracted features in subsequent networks.

Style Transfer

In style transfer, due to the need to recognize some feature information such as texture, outline, and tone of an image, the image can be cut by comparison and placed in different processing units for processing, so that the feature extraction may be accelerated or even be implemented in real time, and a next style transfer operation can be performed in subsequent networks.

Speech Recognition

In speech recognition, an audio can be split into a plurality of segments and placed into different processing units for processing to accelerate feature extraction or even implement feature extraction in real time, thus synthesis features across time and spectrum scales can be obtained. By using these features, the accuracy of neural network speech recognition may be effectively improved.

Translation

In translation, the text can be split into a plurality of segments and placed into different processing units for processing to accelerate feature extraction or even implement feature extraction in real time, thus obtaining synthesis features across a scale of contexts. By using these features, the accuracy of neural network translation may be effectively improved.

Object Recognition

In object recognition, due to the need to recognize feature information of an object, such as texture, outline, tone, and other feature information of an image, and then obtain information of the object based on the features, the image can be cut by comparison and placed in different processing units for processing, so that the feature extraction may be accelerated or even be implemented in real time, and a next object recognition operation can be performed in subsequent networks by using the obtained features.

Object Detection

In object detection, due to the need to recognize feature information of a scenario, such as texture, outline, tone, and other feature information of an image, then obtain information of an object in the scenario based on the features, and precisely recognize the object after the object is detected, the image can be cut by comparison and placed in different processing units for processing, so that the feature extraction may be accelerated or even be implemented in real time, and the object detection can be performed and the neural network can be used again for precise recognition in subsequent networks by using the obtained features.

Outline Detection

In outline detection, due to the need to recognize feature information of a scenario, such as texture, outline, tone, and other feature information of an image, then obtain information of an object in the scenario based on the features, and precisely recognize the object after the object is detected to obtain the outline of the object, the image can be cut by comparison and placed in different processing units for processing, so that the feature extraction may be accelerated or even be implemented in real time, and the object detection can be performed and the neural network can be used again for precise recognition in subsequent networks by using the obtained features.

Advertisement Recommendation

Since technologies of object recognition, scenario recognition, and text recognition need to be comprehensively used in advertisement recommendation algorithms, the neural network is needed for support. The text recognition, in particular, requires a neural network to perform feature extraction on an encoded segment of text. The text can be split into a plurality of segments and placed in different processing units for processing, so that the feature extraction may be accelerated or even be implemented in real time, and text information across the scale of context can be obtained.

Chatbot

The chatbot need to comprehensively use object detection, object recognition, scenario recognition, speech recognition, translation, outline recognition, text recognition, and other technologies, so such neural network processing module with a plurality of processing units is particularly needed.

The present disclosure provides an operation unit, an operation method, and an operation device that can support operation data of different bit widths. The bit width of operation data participating in the operation is configured by configuring a bit width field in an instruction. When performing the operation according to the instruction, it is first determined whether there is an arithmetic unit of which the bit width is same as that of the operation data; if there is such an arithmetic unit, the operation data is directly transferred to a corresponding arithmetic unit; otherwise, an arithmetic unit merging strategy is generated and a plurality of arithmetic units are merged into a new one according to the arithmetic unit merging strategy to enable the bit width of the new arithmetic unit to match the bit width of the operation data, and then the operation data is transferred to the new arithmetic unit; then, the arithmetic unit that obtains the operation data performs a neural network operation/a matrix operation/a vector operation. The present disclosure can support the operation of operation data of different bit widths to achieve efficient neural network operation, matrix operation, and vector operation, and simultaneously save the amount of arithmetic units and reduce the hardware area. The operation unit that supports operation data of different bit widths may be set in the computation device as shown in FIG. 1, FIG. 2A, or FIG. 6A, and in practical applications, may also be set in the device for artificial neural network forward operation shown in FIG. 38, an artificial neural network computation device for sparse connection, or other computation devices, chips, or processing devices in the field of neural networks.

In order to make the purpose, technical solutions, and advantages of the disclosure clearer, the disclosure will be further described in detail with specific examples and with reference to the accompanied drawings.

FIG. 125 is a schematic structural diagram of an operation device provided by the present disclosure. As shown in FIG. 125, the operation device includes:

a storage unit configured to store neurons/matrices/vectors. In an example, the storage unit may be a scratchpad memory, and can support neurons/matrices/vectors data of different lengths and bit widths, and temporarily store necessary operation data in the scratchpad memory. Therefore, the operation device can support data of different lengths and bit widths more flexibly and effectively in the process of neural network operations and matrix/vector operations. The scratchpad memory can be implemented by different storage devices (SRAM, eDRAM, DRAM, memristor, 3D-DRAM, or non-volatile storage, etc.).

The operation device further includes:

a register unit configured to store a neuron/matrix/vector address, where the neuron address is the address of a neuron stored in the storage unit, the matrix address is the address of a matrix stored in the storage unit, and the vector address is the address of a vector stored in the storage unit. In an example, the register unit may be a scalar register which provides a scalar register required in the operation process. The scalar register not only stores the neuron/matrix/vector address, but also stores scalar data. For matrix/vector and scalar operations, the operation unit not only obtains the matrix/vector address from the register unit, but also obtains a corresponding scalar from the register unit.

The operation device includes:

a control unit configured to control behaviors of each module in the device; in an example, the control unit reads prepared instructions, decodes, and generates a plurality of micro-instructions, and sends the micro-instructions to other modules in the device, where the other modules perform corresponding operations according to the obtained micro-instructions; and an operation unit configured to obtain instructions, obtain the neuron/matrix/vector address from the register unit according to the instructions, and then obtain a corresponding neuron/matrix/vector in the storage unit according to the neuron/matrix/vector address to perform an operation on the operation data (neuron/matrix/vector). The operation performed by the operation unit includes, but is not limited to: the operations discussed in the operation instructions dedicated to neural networks in the present disclosure During the operation, the operation unit selects corresponding one or more arithmetic units to perform the operation according to the bit width of operation data indicated by an operand in the instruction, where the one or more arithmetic units have different bit widths. For instance, some arithmetic units support 16-bit data operations, and some arithmetic units support 32-bit data operations. The arithmetic units may be vector multiplication components, accumulation components, and scalar multiplication components. As shown in FIG. 126, the operation unit includes a determination sub-module, an arithmetic unit merging sub-module, and an operation sub-module.

The determination sub-module is configured to determine whether there is an arithmetic unit of which the bit width is the same as that of the operation data indicated by the operand. If there is such an arithmetic unit, the operand is transferred to a corresponding arithmetic unit; otherwise, the arithmetic unit merging strategy and the operand are transferred to the arithmetic unit merging sub-module.

The arithmetic unit merging sub-module is configured to merge a plurality of arithmetic units into a new arithmetic unit according to the arithmetic unit merging strategy to enable the bit width of the new arithmetic unit to match the bit width of the operand, and then transfer the operand to the new arithmetic unit. Specifically, the arithmetic unit merging strategy refers to preferentially merging the arithmetic units with larger bit widths. If there is an arithmetic unit with the same bit width as a required bit width, the corresponding arithmetic unit is used directly; otherwise, available arithmetic units with bit widths smaller than and closest to a required bit width are merged. For instance, if the bit widths of available arithmetic units for merging are 8, 16, and 32 bits, when a required bit width of an arithmetic unit is 32 bits, the 32-bit arithmetic unit is used directly; when a required bit width of an arithmetic unit is 64 bits, two 32-bit arithmetic units are merged; when a required bit width of an arithmetic unit is 48 bits, a 32-bit arithmetic unit and a 16-bit arithmetic unit are merged; and when a required bit width of an arithmetic unit is 40 bits, a 32-bit operation unit and an 8-bit operation unit are merged.

The operation sub-module is configured to enable the arithmetic unit that obtains the operand to perform an operation.

The instructions of the present disclosure are implemented in two ways: one is to directly adopt an instruction, where the instruction includes both operands and bit width fields, and the operation unit can directly obtain the operands and an arithmetic unit with a corresponding bit width according to the instruction to perform a corresponding operation; another is to adopt two instructions, and the operation unit first obtains or constructs an arithmetic unit with a corresponding bit width according to the bit width configuration instruction, and then obtains the operand according to the operation instruction to perform a corresponding operation.

It should be noted that the instruction set of this disclosure adopts a Load/Store structure, and the operation unit does not operate on the data in the memory. This instruction set adopts an ultra-long instruction word architecture, and by configuring instructions differently, can perform both complex neural network operations and simple matrix/vector operations. In addition, this instruction set also adopts fixed-length instructions.

FIG. 127 shows a schematic diagram of an instruction format for performing an operation by using one instruction according to the present disclosure. As shown in FIG. 127, the instruction includes at least one opcode, at least three operands, and at least two bit width fields. The amount of bit width fields is the same as that of operands during operations of the arithmetic unit. The opcode is used to indicate a function of the operation instruction, and the operation unit can perform different operations by identifying one or more opcodes. The operand is used to indicate data information of the operation instruction, and the bit width field is used to indicate a bit width of a corresponding operand, where the data information may be an immediate number or a register serial number. For instance, to obtain a matrix, a starting address and a matrix length can be obtained from a corresponding register according to the register serial number, and then a matrix stored in a corresponding address can be obtained from the storage unit according to the matrix starting address and matrix length.

FIG. 128 is a schematic diagram of a format of a neural network operation instruction according to the present disclosure. The instruction is an instantiated instruction of the instruction shown in FIG. 127. As shown in FIG. 128, the neural network operation instruction includes at least one opcode, 16 operands, and four bit width fields. The opcode is used to indicate a function of the operation instruction, and the operation unit can perform different neural network operations by identifying one or more opcodes. The operand is used to indicate data information of the neural network operation instruction, where the data information may be an immediate number or a register serial number. The bit width field is used to indicate a bit width of an operand in the operation, and also indicate a bit width of a corresponding arithmetic unit in the operation process and whether arithmetic units with low bit widths need to be merged into an arithmetic unit with a high bit width.

FIG. 129 is a schematic diagram of a format of a matrix-matrix operation instruction according to the present disclosure. The instruction is an instantiated instruction of the instruction shown in FIG. 127. As shown in FIG. 129, the neural network operation instruction includes at least one opcode, at least four operands, and two bit width fields. The opcode is used to indicate a function of the matrix-matrix operation instruction, and the operation unit can perform different matrix operations by identifying one or more opcodes. The operand is used to indicate data information of the matrix-matrix operation instruction, where the data information may be an immediate number or a register serial number. The bit width field is used to indicate a bit width of an operand in the operation, and also indicate a bit width of a corresponding arithmetic unit in the operation process and whether arithmetic units with low bit widths need to be merged into an arithmetic unit with a high bit width.

FIG. 130 is a schematic diagram of a format of a vector-vector operation instruction according to the present disclosure. The instruction is an instantiated instruction of the instruction shown in FIG. 127. As shown in FIG. 309, the neural network operation instruction includes at least one opcode, at least three operands, and at least two bit width fields. The opcode is used to indicate a function of the vector-vector operation instruction, and the operation unit can perform different vector operations by identifying one or more opcodes. The operand is used to indicate data information of the vector-vector operation instruction, where the data information may be an immediate number or a register serial number. The bit width field is used to indicate a bit width of an operand in the operation, and also indicate a bit width of a corresponding arithmetic unit in the operation process and whether arithmetic units with low bit widths need to be merged into an arithmetic unit with a high bit width.

FIG. 131 is a schematic diagram of a format of a matrix-vector operation instruction according to the present disclosure. The instruction is an instantiated instruction of the instruction shown in FIG. 127. As shown in FIG. 131, the neural network operation instruction includes at least one opcode, at least six operands, and at least three bit width fields. The opcode is used to indicate a function of the matrix-vector operation instruction, and the operation unit can perform different matrix and vector operations by identifying one or more opcodes. The operand is used to indicate data information of the matrix-vector operation instruction, where the data information may be an immediate number or a register serial number. The bit width field is used to indicate a bit width of an operand in the operation, and also indicate a bit width of a corresponding arithmetic unit in the operation process and whether arithmetic units with low bit widths need to be merged into an arithmetic unit with a high bit width.

FIG. 132 is a schematic structural diagram of a computation device according to a preferable example of the present disclosure. As shown in FIG. 132, the device includes an instruction fetching module, a decoding module, an instruction queue, a scalar register, a dependency processing unit, a storage queue, and a reordering cache, an operation unit, a scratchpad storage, an IO memory access module.

The instruction fetching module is configured to fetch a next instruction to be executed from an instruction sequence and send the instruction to the decoding module.

The decoding module is configured to decode instructions and send decoded instructions to the instruction queue. As shown in FIG. 73, the decoding module includes: an instruction receiving module, a micro-instruction generation module, a micro-instruction queue, a micro-instruction issue module; where the instruction receiving module is configured to receive the instructions obtained from the instruction fetching module; the micro-instruction decoding module decodes the instructions obtained from the instruction receiving module into micro-instructions that control various functional components; the micro-instruction queue is configured to store the micro-micro-instructions sent from the instruction decoding module; the micro-instruction issue module is configured to issue the micro-instructions to various functional components.

The instruction queue is configured to sequentially cache the decoded instructions and send the same to the dependency processing unit.

The scalar register is configured to provide a scalar register required by the device during the operation process.

The dependency processing unit is configured to process a possible storage dependency between an instruction and a previous instruction. If a matrix operation instruction accesses the scratchpad memory, the previous and the next instruction may access a same block of storage space. In order to ensure the correctness of an execution result of the instruction, if the current instruction is detected to have a dependency with data of the previous instruction, the instruction must wait in the storage queue until the dependency is eliminated.

The storage queue is an ordered queue. Instructions that have a dependency with the previous instruction on data are stored in the queue until the dependency is eliminated, and then the instruction is submitted.

The reordering cache is configured to cache the instruction during execution. After an instruction is executed, if the instruction is also an earliest instruction in unsubmitted instructions in the reordering cache, the instruction will be submitted. Once the instruction is submitted, changes in the state of the device caused by operations of the instruction cannot be withdrew. The instruction in the reordering cache serves as a placeholder, if there is data dependency in a first instruction that is included in the reordering cache, the instruction will not be submitted (released); although a plurality of instructions will continuously enter the reordering cache later, only part of the instructions (controlled by a size of the reordering cache) can be accepted. The entire operation process cannot proceed smoothly until the first instruction is submitted.

The operation unit is configured to perform all neural network operations and matrix/vector operations of the device, including but not limited to, a convolutional neural network forward operation, a convolutional neural network training operation, a neural network pooling operation, a full connection neural network forward operation, a full connection neural network training operation, a batch normalization operation, a RBM neural network operation, a matrix-vector multiplication operation, a matrix-matrix addition/subtraction operation, a vector outer product (tensor) operation, a vector inner product operation, vector four fundamental operations, a vector logic operation, a vector transcendental function operation, a vector comparison operation, a vector maximum/minimum value calculation operation, a vector cyclic shift operation, and an operation of generating random vectors subject to a certain distribution. The operation instruction is sent to the operation unit for execution. First, the operation unit determines whether there is an arithmetic unit of which a length of a bit width field is the same as that of an operand in the instruction; if there is such an arithmetic unit, the corresponding arithmetic unit is selected; otherwise, a plurality of arithmetic units are merged into an arithmetic unit with a required bit width; then, according to the opcode in the instruction, a corresponding operation is performed on the operand by using selected arithmetic units to obtain a corresponding result.

The scratchpad memory is a temporary storage device dedicated to data, and can support data of different lengths and bit widths.

The IO memory access module is configured to directly access the scratchpad memory, and read data from or write data to the scratchpad memory.

FIG. 134 is a flowchart of a computation device adopting one instruction for operation according to an example of the present disclosure. As shown in FIG. 134, the process includes:

a step S1, fetching, by the instruction fetching module, an instruction; and sending, by the instruction fetching module, the instruction to the decoding module;

a step S2, decoding, by the decoding module, the instruction; and sending, by the decoding module, the instruction to the instruction queue; where the step S2 may include: a step S2.1, in the decoding module, sending the instruction to the instruction receiving module; a step S2.2, sending, by the instruction receiving module, the instruction to the micro-instruction generation module to generate micro-instructions; and a step S2.3, obtaining, by the micro-instruction generation module, neural network operation opcodes and neural network operation operands of the instruction from the scalar register; and simultaneously decoding the instruction into micro-instructions that control each functional component and sending the micro-instructions to the micro-instruction issue queue; where the micro-instructions can also be referred to as parameter-containing machine codes, which refers to a series of 01 codes that can be identified by hardware, including results of the instruction after being decoded;

a step S3, after obtaining required data, sending the instruction to the dependency processing unit; analyzing, by the dependency processing unit, whether there is a dependency between the instruction and a previous instruction of which the execution is not completed; where the instruction needs to wait in the storage queue until the instruction no longer has a dependency on the data with the previous instruction of which the execution is not completed;

a step S4, after the dependency is eliminated, sending the neural network operation and the micro-instructions corresponding to the matrix/vector instructions to the functional components such as the operation unit;

a step S5, fetching, by the operation unit, required data from the scratchpad memory according to the address and size of the required data; and then determining whether there is an arithmetic unit of which the bit width field is the same as that of the instruction; if there is such an arithmetic unit, selecting the corresponding arithmetic unit to complete a corresponding operation of the instruction; otherwise, merging arithmetic units with low bit widths into an arithmetic unit with a required bit width to complete a corresponding operation of the instruction; and a step S6, after the operation is completed, writing output data back to a specified address of the scratchpad memory; and submitting the instruction in the reordering cache.

FIGS. 135 and 136 are schematic diagrams of an instruction format for adopting two instructions for operation according to the present disclosure. FIG. 135 is a schematic diagram of a format of a bit width configuration instruction. The bit width configuration instruction includes at least one opcode and at least two bit width fields, where the bit width field is used to indicate a bit width of an arithmetic unit used in the next operation instruction. FIG. 136 is a schematic diagram of a format of an operation instruction. The operation instruction includes at least one opcode and at least three operands, where the opcode is used to indicate a function of the operation instruction, and the operation unit can perform different operations by identifying one or more opcodes. The operand is used to indicate data information of the operation instruction, and the bit width field is used to indicate a bit width of a corresponding operand, where the data information may be an immediate number or a register serial number. For instance, to obtain a matrix, a starting address and a matrix length can be obtained from a corresponding register according to the register serial number, and then a matrix stored in a corresponding address can be obtained from the storage unit according to the matrix starting address and matrix length.

FIGS. 137 and 138 are instantiations of FIGS. 135 and 136, and are schematic diagrams of formats of a neural network bit width configuration instruction and a neural network operation instruction respectively. As shown in FIGS. 137 and 138, the bit width configuration instruction includes at least one opcode and at least four bit width fields, where the bit width field is used to indicate a bit width of an arithmetic unit used in the next operation instruction. The configuration instruction includes at least one opcode and 16 operands, where the opcode is used to indicate the function of the neural network operation instruction, and the operation unit can perform different neural network operations by identifying one or more opcodes. The operand is used to indicate data information of the neural network operation instruction, where the data information may be an immediate number or a register serial number.

FIGS. 139 and 140 are instantiations of FIGS. 135 and 136, and are schematic diagrams of formats of a matrix-matrix bit width configuration instruction and a matrix-matrix operation instruction respectively. As shown in FIGS. 139 and 140, the bit width configuration instruction includes at least one opcode and at least two bit width fields, where the bit width field is used to indicate a bit width of an arithmetic unit used in the next matrix-matrix operation instruction. The matrix-matrix operation instruction includes at least one opcode and at least four operands, where the opcode is used to indicate the function of the matrix-matrix operation instruction, and the operation unit can perform different matrix operations by identifying one or more opcodes. The operand is used to indicate data information of the matrix-matrix operation instruction, where the data information may be an immediate number or a register serial number.

FIGS. 141 and 142 are instantiations of FIGS. 135 and 136, and are schematic diagrams of formats of a vector-vector bit width configuration instruction and a vector-vector operation instruction respectively. As shown in FIGS. 141 and 142, the bit width configuration instruction includes at least one opcode and at least two bit width fields, where the bit width field is used to indicate a bit width of an arithmetic unit used in the next vector-vector operation instruction. The vector-vector operation instruction includes at least one opcode and at least three operands, where the opcode is used to indicate the function of the vector-vector operation instruction, and the operation unit can perform different vector operations by identifying one or more opcodes. The operand is used to indicate data information of the vector-vector operation instruction, where the data information may be an immediate number or a register serial number.

FIGS. 143 and 144 are instantiations of FIGS. 135 and 136, and are schematic diagrams of formats of a matrix-vector bit width configuration instruction and a matrix-vector operation instruction respectively. As shown in FIGS. 143 and 144, the bit width configuration instruction includes at least one opcode and at least three bit width fields, where the bit width field is used to indicate a bit width of an arithmetic unit used in the next matrix-vector operation instruction. The matrix-vector operation instruction includes at least one opcode and at least six operands, where the opcode is used to indicate the function of the matrix-vector operation instruction, and the operation unit can perform different matrix-vector operations by identifying one or more opcodes. The operand is used to indicate data information of the matrix-vector operation instruction, where the data information may be an immediate number or a register serial number.

FIG. 145 is a flowchart of the operation device adopting two instructions for operation according to an example of the present disclosure. As shown in FIG. 145, the process includes:

a step S1, fetching, by the instruction fetching module, a bit width configuration instruction; and sending, by the instruction fetching module, the instruction to the decoding module;

a step S2, decoding, by the decoding module, the instruction; and sending, by the decoding module, the instruction to the instruction queue; where the step S2 may include: a step S2.1, in the decoding module, sending the instruction to the instruction receiving module; a step S2.2, sending, by the instruction receiving module, the instruction to the micro-instruction decoding module to decode micro-instructions; and a step S2.3, decoding, by the micro-instruction decoding module, the instruction into micro-instructions that control the operation unit to select arithmetic units with specified bit widths; and sending, by the micro-instruction decoding module, the micro-instructions to the micro-instruction issue queue;

a step S3, fetching, by the instruction fetching module, a neural network operation instruction and a matrix/vector instruction; and sending, by the instruction fetching module, the instruction to the decoding module;

a step S4, decoding, by the decoding module, the instruction; and sending, by the decoding module, the instruction to the instruction queue; where the step S4 includes: a step S4.1, in the decoding module, sending the instruction to the instruction receiving module; a step S4.2, sending, by the instruction receiving module, the instruction to the micro-instruction decoding module to decode micro-instructions; and a step S4.3, obtaining, by the micro-instruction decoding module, neural network operation opcodes and neural network operation operands of the instruction from the scalar register; and simultaneously decoding the instruction into micro-instructions that control each functional component and sending the micro-instructions to the micro-instruction issue queue;

a step S5, after obtaining required data, sending the instruction to the dependency processing unit; analyzing, by the dependency processing unit, whether there is a dependency between the instruction and a previous instruction of which the execution is not completed; where the instruction needs to wait in the storage queue until the instruction no longer has a dependency on the data with the previous instruction of which the execution is not completed;

a step S6, sending the micro-instructions corresponding to the instruction and the micro-instructions of previous arithmetic units with specified bit widths to the operation unit;

a step S7, fetching, by the operation unit, required data from the scratchpad memory according to the address and size of the required data; and then determining whether there is an arithmetic unit of which the bit width field is the same as that of the bit width configuration instruction; if there is such an arithmetic unit, selecting the corresponding arithmetic unit to complete corresponding neural network operations and/or matrix/vector operations of the instruction; otherwise, merging arithmetic units with low bit widths into an arithmetic unit with a required bit width to complete corresponding neural network operations and/or matrix/vector operations of the instruction; and a step S8, after the operation is completed, writing output data back to a specified address of the scratchpad memory; and submitting the instruction in the reordering cache.

The present disclosure provides a device which has arithmetic units with configurable bit widths and a method for performing neural network operations and matrix/vector operations, which can be applied to other operation methods or computation devices of neural networks. Application scenarios of the above methods or devices are not limited in the present disclosure.

In summary, the present disclosure provides a device which has arithmetic units with configurable bit widths and a method for performing neural network operations and matrix/vector operations. With corresponding instructions, problems of current neural network algorithms and a large amount of matrix/vector operations can be properly solved. Compared with existing traditional solutions, the present disclosure has the following advantages: instructions are configurable; the solutions are easy to use; bit widths of arithmetic units are selectable; a plurality of arithmetic units can be merged; bit widths of arithmetic units can be configured through a dedicated bit width configuration instruction or by specifying the bit width field in the operation instruction; supported neural network scales, and matrix/vector bit widths and scales are flexible; the on-chip cache is sufficient, etc. By specifying the bit width of the operation data through the bit width field in the instruction, the bit width of the operation data can be arbitrarily configured as required. For the operation data with a certain bit width, if there is an arithmetic unit that matches the bit width, the arithmetic unit can be directly called for operation; if the bit width of the operation data is too large and there is no arithmetic unit that matches the bit width, a plurality of arithmetic units with lower bit widths can be merged into a new arithmetic unit for operation, where the new arithmetic unit can support operations of operation data with different bit widths. Therefore, efficient neural network operations, matrix operations, and vector operations can be implemented, and simultaneously, the amount of arithmetic units may be saved, and the hardware area may be reduced. The scratchpad memory can store operation data (such as neurons, vectors, and matrices) of different lengths and bit widths.

As shown in FIG. 146, the computation device includes: a storage medium 611 (optional), a register unit 612, an interconnect module 613, an operation unit 614, a controller unit 615, and a data access unit 616.

As shown in FIG. 147, the operation unit 614 includes: an addition arithmetic unit, a multiplication arithmetic unit, an addition arithmetic unit of complex numbers (optional), and a multiplication arithmetic unit of complex numbers (optional). For the operation unit, the included addition arithmetic unit, multiplication arithmetic unit, addition arithmetic unit of complex numbers, multiplication arithmetic unit of complex numbers, a non-linear arithmetic unit, or the like can be determined whether to be set in the operation unit based on specific non-linear operation formulas.

Specifically, as shown in FIG. 147, a first pipeline stage includes, but is not limited to, a matrix multiplication arithmetic unit and the like.

A second pipeline stage includes, but is not limited to, a matrix addition arithmetic unit, a size comparator (such as a comparator), and the like.

A third pipeline stage includes, but is not limited to, a non-linear arithmetic unit (such as an activation arithmetic unit) and the like.

The interconnection module 613 is configured to control connection relationships of arithmetic units in the operation unit 614 to enable at least two types of arithmetic units to form different computation topologies.

The instruction storage unit (which may be a register unit, an instruction cache, and a scratchpad memory) 612 is configured to store the operation instruction, an address of a data block in the storage medium, and a computation topology corresponding to the operation instruction.

The storage medium 611 may be an off-chip memory, and in practical applications, may also be an on-chip memory. The storage medium 611 is configured to store data blocks, where the data blocks may be discontinuous data blocks.

The controller unit 615 is configured to fetch an operation instruction, an operation field corresponding to the operation instruction, and a first computation topology corresponding to the operation instruction from the register unit 612, and decode the operation instruction into an execution instruction. The execution instruction is configured to control the operation unit for operation, transfer the operation field to the data access unit 616, and transfer the computation topology to the interconnection module 613.

The data access unit 616 is configured to randomly access the storage medium 611, fetch a plurality of data corresponding to the operation field from the storage medium 611, merge the plurality of data into data blocks, and transfer the data locks to the interconnection module 613.

The interconnection module 613 is configured to receive the first computation topology and the data blocks. In an example, the interconnect module 613 also rearranges the data blocks according to the first computation topology.

The operation unit 614 is used by the execution instruction to call the operation unit 614 to perform the operation on the data blocks to obtain an operation result, transfers the operation result to the data access unit, and stores the operation result in the storage medium. In an example, the operation unit 614 is configured to call the arithmetic units according to the first computation topology and the execution instruction to perform an operation on the rearranged data blocks to obtain an operation result, transfers the operation result to the data access unit, and stores the operation result in the storage medium.

In another example, the interconnection module 613 is configured to form the first computation topology according to the connection relationships of the arithmetic units in the control computation unit 614.

An interconnection module is set in the computation device provided by the present disclosure. The interconnecting module can connect the arithmetic units in the computation unit to obtain a computation topology corresponding to the computation instruction according to the needs of the computation instruction, so that there is no need to store or fetch intermediate data of the computation in subsequent operations of the operation unit. Through this structure, a single instruction can implement a single input and perform operations of a plurality of arithmetic units to obtain a computation result, which improves the computation efficiency.

The present disclosure also provides an extension computation instruction which includes an opcode and an operation field, where the opcode includes: an identifier (such as ROT) that identifies a first operation instruction, and the operation field includes: an input data address of the first computation instruction, an output data address of the first computation instruction, an identifier of a second computation instruction, input data of the second computation instruction, a data type, and a data length N.

Optionally, the extension instruction may specifically include: a third computation instruction and input data of the third computation instruction.

It should be noted that the above computation instruction may be a vector instruction or a matrix instruction, and a specific expression form of the above computation instruction is not limited in specific examples of the present disclosure.

FIG. 148 provides an implementation method of an extension computation instruction. The extension computation instruction in the method may include an opcode and an operation field, where the opcode includes: an identifier (such as ROT) that identifies a first operation instruction, and the operation field includes: an input data address of the first computation instruction, an output data address of the first computation instruction, an identifier of the second computation instruction, input data of the second computation instruction, the data type, and the data length N (the value of which is set by users, and this disclosure does not limit a specific form of N); this method is executed by a computation device shown in FIG. 1A or a computation chip. The method is shown in FIG. 1 and includes the following steps:

a step S101, obtaining, by the computation device, an extension computation instruction; parsing, by the computation device, the extension computation instruction to obtain the first computation instruction and the second computation instruction; and a step S102, determining, by the computation device, a computation order according to the first computation instruction and the second computation instruction; and executing, by the computation device, the first computation instruction and the second computation instruction in the computation order to obtain a result of the extension computation instruction.

The technical solutions provided by the present disclosure provide an implementation method of the extension computation instruction, which enables a computation device to perform calculation of two computation instructions on the extension computation instruction, enables a single extension computation instruction to implement two types of computations. Therefore, the computation overhead and power consumption can be reduced.

Optionally, the above computation order may specifically include: any one of out-of-order computation, positive-order computation, or reverse-order computation. In the out-of-order computation, the first computation instruction and the second computation instruction do not have a corresponding requirement of execution order; in the positive-order computation, the first computation instruction is executed before the second computation instruction; and in the reverse-order computation, the second computation instruction is executed before the first computation instruction.

A specific implementation manner of the above computation device determining the computation order according to the first computation instruction and the second computation instruction may include: the computation device identifies whether the output data of the first computation instruction and the input data of the second computation instruction are the same; if the output data of the first computation instruction and the input data of the second computation instruction are the same, the computation order is determined to be a positive-order computation; otherwise, the computation order is determined to be a reverse-order computation; the computation device identifies whether the input data of the first computation instruction is correlated to the output data of the second computation instruction; if the input data of the first computation instruction is not correlated to the output data of the second computation instruction, the computation order is determined to be an out-of-order computation.

Specifically, for instance, F=A*B+C, the first computation instruction is a matrix multiplication instruction, and the second computation instruction is a matrix addition instruction. Since the matrix addition instruction of the second computation instruction needs to be applied to the result of the first computation instruction, in other words, output data, so the computation is determined to be a positive-order computation. For another instance, F=OP(A)*OP(B), where the first operation instruction is a matrix multiplication instruction, and the second operation instruction is a transformation such as transposition or conjugation; since the first operation instruction uses the second the output of the second computation instruction, the computation is the reverse-order computation. If there is no corresponding correlation, in other words, the output data of the first computation instruction is different from the input data of the second computation instruction, and the input data of the first computation instruction is different from the input data of the second computation instruction, it is determined not to be correlated.

The extension of vector instructions provided by the present disclosure strengthens functions of the instructions and replaces a plurality of original instructions with one instruction. In this case, the amount of instructions required for complex vector and matrix operations is reduced and the use of vector instructions is simplified; compared to a plurality of instructions, intermediate results do not need to be stored, which saves storage space and avoids additional read/write overhead.

If the first computation instruction is a vector instruction, the instruction adds a function of scaling input vectors or matrices in the vector instruction, in other words, the instruction adds operands representing scaling coefficients in the operation field, and first scales the vector according to the scaling coefficients when reading the vector (i.e., the second computation instruction is a scaling instruction). If the vector instruction includes multiplication operations of a plurality of input vectors or matrices, the scaling coefficients corresponding to the input vectors or matrices can be merged into one.

If the first computation instruction is a vector instruction, the instruction adds a function of transposing input matrices in the vector instruction (i.e., the second computation instruction is a transposition instruction). Operands representing whether to transpose the input matrices are added in the instruction, which indicates whether to transpose the matrices before the operation.

If the first computation instruction is a vector instruction, the instruction adds a function of adding original output vectors or matrices and output vectors or matrices in the vector instruction (i.e., the second computation instruction is an addition instruction). Coefficients representing scaling the original output vectors or matrices in the instruction (i.e., adding the third computation instruction, where the third computation instruction may be a scaling instruction). The instruction indicates that after a vector or matrix operation is performed, a result is added to a scaled original output as a new output.

If the first computation instruction is a vector instruction, for input vectors in the vector instruction, the instruction adds a function of reading according to a fixed stride. Operands representing the input vectors reading the stride are added in the instruction (i.e., the second computation instruction reads the vectors according to a fixed stride), which indicates a difference between addresses of two adjacent elements in the vector.

If the first computation instruction is a vector instruction, for result vectors in the vector instruction, the instruction adds a function of writing result according to a fixed stride (i.e., the second computation instruction writes the vectors in according to a fixed stride). Operands representing the result vectors reading the stride in the instruction are added, which indicates a difference between addresses of two adjacent elements in the vector. If a vector is both an input and a result, the vector uses the same stride when used as the input and the result.

If the first computation instruction is a vector instruction, for input matrices in the vector instruction, the instruction adds a function of reading row or column vectors according to a fixed stride (i.e., the second computation instruction reads a plurality of vectors according to a fixed stride). Operands representing the matrices reading the stride in the instruction are added, which indicates a difference between starting addresses of the matrix row or column vectors.

If the first computation instruction is a vector instruction, for result matrices in the vector instruction, the instruction adds a function of reading row or column vectors according to a fixed stride (i.e., the second computation instruction writes a plurality of vectors in according to a fixed stride). Operands representing the matrices reading the stride in the instruction are added, which indicates a difference between starting addresses of the matrix row or column vectors. If a vector is both an input and a result matrix, the vector uses the same stride when used as the input and the result.

An actual structure of the above extension computation instruction is explained below with some actual computation instructions.

The above extension instructions include a plane rotation instruction configured to perform a rotation coordinate transformation of a plurality of points in a plane.

The above plane rotation instruction can be expressed as: ROT (TYPE1, N1, X1, INCX1, Y1, INCY1, C1, S). An opcode of the plane rotation instruction is ROT, which is used to instruct the plane rotation operation. The operation fields of the above plane rotation instruction include: TYPE1, N1, X1, INCX1, Y1, INCY1, C1 and S.

TABLE 1-1

| Operation field | Descriptions of function |
|---|---|
| TYPE1 | Type of data, supporting real and complex numbers |
| N1 | Length of a vector |
| X1 | Starting address of vector x1 |
| INCX1 | Address interval between elements of vector x1 |
| Y1 | Starting address of vector y1 |
| INCY1 | Address interval between elements of vector y1 |
| C1 | Starting address of scalar c1 |
| S | Starting address of scalar s |

The operation field TYPE1 is used to indicate the data type of data participating in the plane rotation calculation.

After obtaining the plane rotation instruction, the controller unit 615 parses the plane rotation instruction to obtain the opcode and the operation field. The controller unit 615 obtains the vector x1 from the storage medium 611 according to the length of the vector, the starting address of the vector x1, and the address interval between the elements of the vector x1; obtains the vector y1 from the storage medium 611 according to the length of the vector, the starting address of the vector y1, the address interval between elements of the vector y1; obtains the scalar c1 and the scalar s from the storage medium 611 according to the starting address of the scalar c1 and the starting address of the scalar s; and transfers the vector x1, vector y1, scalar c1, and scalar s to the operation unit 614.

The operation unit 614 performs the operation according to a formula (1). The formula (1) is as follows:

$$x_i = c1*x_i + s*y_i$$

$$y_i = c1*y_i - s*x_i \quad (1)$$

The above operation unit 614 stores a computation result obtained by $c1*x_i+s*y_i$ in a storage space corresponding to a storage address of an $i^{th}$ element of the vector x1, and stores a computation result obtained by $c1*y_i-s*x_i$ in a storage space corresponding to a storage address of an $i^{th}$ element of the vector y1, where $x_i$ is the $i^{th}$ element of the vector x1, and $y_i$ is the $i^{th}$ element of the vector y1.

The length of the vector in the plane rotation instruction format shown in Table 1-1 is variable, which can reduce the amount of instructions and simplify the use of instructions. The vector format stored at a certain interval is supported, which avoids the execution overhead of transforming the vector format and the space occupation for storing intermediate results. Operations of complex numbers are supported, which expands functions of the instruction.

In an example, the extension instruction further includes a Givens rotation instruction configured to perform the Givens rotation operation of a plurality of points in a plane.

The above Givens rotation instruction can be expressed as: ROTM (TYPE2, N2, X2, INCX2, Y2, INCY2, FLAG, PARAM). An opcode of the Givens rotation instruction is ROTM, which is used to instruct the Givens rotation operation. The operation fields of the above Givens rotation instruction include: TYPE2, N2, X2, INCX2, Y2, INCY2, FLAG, and PARAM.

TABLE 1-2

| Operation field | Descriptions of function |
|---|---|
| TYPE2 | Type of data, supporting real numbers |
| N2 | Length of a vector |
| X2 | Starting address of vector x2 |
| INCX2 | Address interval between elements of vector x2 |
| Y2 | Starting address of vector y2 |
| INCY2 | Address interval between elements of vector y2 |
| FLAG | Parameter flag, representing a type of parameters (param) |
| PARAM | param represents elements h11, h12, h21, h22 in a Givens matrix H. In different FLAGs, the elements in H are defined as follows: when FLAG = −1.0, $H = \begin{bmatrix} h_{11} & h_{12} \\ h_{21} & h_{22} \end{bmatrix}$ when FLAG = 0.0, $H = \begin{bmatrix} 1.0 & h_{12} \\ h_{21} & 1.0 \end{bmatrix}$ when FLAG = 1.0, $H = \begin{bmatrix} h_{11} & 1.0 \\ -1.0 & h_{22} \end{bmatrix}$ when FLAG = −2.0, $H = \begin{bmatrix} 1.0 & 0.0 \\ 0.0 & 1.0 \end{bmatrix}$ |

The operation field TYPE2 is used to indicate the data type of data participating in the Givens rotation operation. The elements in the Givens matrix H are determined by the parameter flag FLAG and the operation field PARAM.

After obtaining the Givens rotation instruction, the controller unit 615 parses the Givens rotation instruction to obtain the opcode and the operation field. The controller unit 615 obtains the vector x2 from the storage medium 611 according to the length of the vector, the starting address of the vector x2, and the address interval between the elements of the vector x2; obtains the vector y2 from the storage medium 611 according to the length of the vector, the starting address of the vector y2, the address interval between elements of the vector y2; obtains the Givens matrix H according to the parameter flag FLAG and the operation field PARAM; and transfers the vector x, vector y, and the Givens matrix H to the operation unit 614.

The operation unit 614 performs the operation according to a formula (2). The formula (2) is as follows:

$$\begin{bmatrix} x_i \\ y_i \end{bmatrix} = H\begin{bmatrix} x_i \\ y_i \end{bmatrix} \quad (2)$$

In the above formula, $x_i$ is the $i^{th}$ element of the vector x2, and $y_i$ is the $i^{th}$ element of the vector y2. The above operation unit 614 stores a computation result in a storage space corresponding to a storage address of the $i^{th}$ element of the vector x2, and stores a computation result in a storage space corresponding to a storage address of the $i^{th}$ element of the vector y2

The length of the vector in the Givens rotation instruction format shown in Table 1-2 is variable, which can reduce the amount of instructions and simplify the use of instructions. The vector format stored at a certain interval is supported, which avoids the execution overhead of transforming the vector format and the space occupation for storing intermediate results. General forms of Givens rotation are distinguished from various special forms, which not only guarantees versatility, but also facilitates optimization for special situations.

In an example, the extension instruction further includes a Vector Swap instruction configured to swap elements of two vectors.

The above Vector Swap instruction can be expressed as: SWAP (TYPE3, N3, X3, INCX3, Y3, INCY3). An opcode of the Vector Swap instruction is SWAP, which is used to instruct the vector swap operation. The operation fields of the above Vector Swap instruction include: TYPE3, N3, X3, INCX3, Y3, and INCY3.

TABLE 1-3

| Operation field | Descriptions of function |
|---|---|
| TYPE3 | Type of data, supporting real and complex numbers |
| N3 | Length of a vector |
| X3 | Starting address of vector x3 |
| INCX3 | Address interval between elements of vector x3 |
| Y3 | Starting address of vector y3 |
| INCY3 | Address interval between elements of vector y3 |

The operation field TYPE3 is used to indicate the data type of data participating in the vector swap operation.

After obtaining the Vector Swap instruction, the controller unit 615 parses the Vector Swap instruction to obtain the opcode and the operation field. The controller unit 615 obtains the vector x3 from the storage medium 611 according to the length of the vector, the starting address of the vector x3, and the address interval between the elements of the vector x3; obtains the vector y3 from the storage medium 611 according to the length of the vector, the starting address of the vector y3, the address interval between elements of the vector y3; and transfers the vector x3 and vector y3 to the operation unit 614.

The above operation unit 614 stores an $i^{th}$ element of the vector x3 in a storage space corresponding to a storage address of the $i^{th}$ element of the vector y3, and stores an $i^{th}$ element of the vector y3 in a storage space corresponding to a storage address of the $i^{th}$ element of the vector x3.

The length of the vector in the Vector Swap instruction format shown in Table 1-3 is variable, which can reduce the amount of instructions and simplify the use of instructions. The vector format stored at a certain interval is supported, which avoids the execution overhead of transforming the vector format and the space occupation for storing intermediate results.

In an example, the extension instruction further includes a Vector Scale instruction configured to multiply a vector and a scalar to obtain a result.

The above Vector Scale instruction can be expressed as: SCAL (TYPE4, N4, X4, INCX4, C2). An opcode of the Vector Scale instruction is SCAL, which is used to instruct the vector scaling operation. The operation fields of the above Vector Scale instruction include: TYPE4, N4, X4, INCX4, and C2.

TABLE 1-4

| Operation field | Descriptions of function |
|---|---|
| TYPE4 | Type of data, supporting real numbers |
| N4 | Length of a vector |
| X4 | Starting address of vector x4 |
| INCX4 | Address interval between elements of vector x4 |
| C2 | Starting address of scalar c2 |

The operation field TYPE4 is used to indicate the data type of data participating in the vector scaling operation.

After obtaining the Vector Scale instruction, the controller unit 615 parses the Vector Scale instruction to obtain the opcode and the operation field. The controller unit 615 obtains the vector x4 from the storage medium 611 according to the length of the vector, the starting address of the vector x4, and the address interval between the elements of the vector x4; obtains the vector c2 from the storage medium 611 according to the starting address of the scalar c2; and transfers the vector x4 and scalar c2 to the operation unit 614.

The above operation unit 614 performs the scaling operation on each element $x_i$ of the vector x4 according to $x_i=x_i*c2$, and stores the obtained result in a storage space corresponding to a storage address of the element $x_i$.

The length of the vector in the Vector Scale instruction format shown in Table 1-4 is variable, which can reduce the amount of instructions and simplify the use of instructions. The vector format stored at a certain interval is supported, which avoids the execution overhead of transforming the vector format and the space occupation for storing intermediate results.

In an example, the extension instruction further includes a Vector Copy instruction configured to copy a vector in another vector.

The above Vector Copy instruction can be expressed as: COPY (TYPE5, N5, X5, INCX5, Y5, INCY5). An opcode of the Vector Copy instruction is COPY, which is used to instruct a vector copy operation. The operation fields of the above Vector Copy instruction include: TYPE5, N5, X5, INCX5, Y5, and INCY5.

TABLE 1-5

| Operation field | Descriptions of function |
|---|---|
| TYPE5 | Type of data, supporting real and complex numbers |
| N5 | Length of a vector |
| X5 | Starting address of vector x5 |
| INCX5 | Address interval between elements of vector x5 |
| Y5 | Starting address of vector y5 |
| INCY5 | Address interval between elements of vector y5 |

The operation field TYPE3 is used to indicate the data type of data participating in the vector copy operation.

After obtaining the Vector Copy instruction, the controller unit 615 parses the Vector Copy instruction to obtain the opcode and the operation field. The controller unit 615 obtains the vector x5 from the storage medium 611 according to the length of the vector, the starting address of the vector x5, and the address interval between the elements of the vector x5; and transfers the vector x5 to the operation unit 614.

The above operation unit 614 stores an $i^{th}$ element of the vector x5 in a storage space corresponding to a storage address of the $i^{th}$ element of the vector y5.

The length of the vector in the Vector Copy instruction format shown in Table 1-5 is variable, which can reduce the amount of instructions and simplify the use of instructions. The vector format stored at a certain interval is supported, which avoids the execution overhead of transforming the vector format and the space occupation for storing intermediate results.

In an example, the extension instruction further includes a Vector Multiply-Add instruction configured to multiply a vector and a scalar to obtain a result, and add the result and another vector.

The above Vector Multiply-Add instruction can be expressed as: AXPY (TYPE6, N6, X6, INCX6, Y6, INCY6, C3). An opcode of the Vector Multiply-Add instruction is AXPY, which is used to instruct the vector multiply-add operation. The operation fields of the above Vector Multiply-Add instruction include: TYPE6, N6, X6, INCX6, and C3.

TABLE 1-6

| Operation field | Descriptions of function |
|---|---|
| TYPE6 | Type of data, supporting real and complex numbers |
| N6 | Length of a vector |
| X6 | Starting address of vector x6 |
| INCX6 | Address interval between elements of vector x6 |
| Y6 | Starting address of vector y6 |
| INCY6 | Address interval between elements of vector y6 |
| C3 | Starting address of scalar c3 |

The operation field TYPE6 is used to indicate the data type of data participating in the vector multiply-add operation.

After obtaining the Vector Multiply-Add instruction, the controller unit 615 parses the Vector Multiply-Add instruction to obtain the opcode and the operation field. The controller unit 615 obtains the vector x6 from the storage medium 611 according to the length of the vector, the starting address of the vector x6, and the address interval between the elements of the vector x6; obtains the vector y6 from the storage medium 611 according to the length of the vector, the starting address of the vector y6, and the address interval between the elements of the vector y6; obtains the vector c3 from the storage medium 611 according to the starting address of the scalar c3; and transfers the vector x6, the vector y6, and scalar c3 to the operation unit 614.

The above operation unit 614 performs the operation according to $y_i=x_i*c3+y_i$. Specifically, the operation unit 614 multiplies the $i^{th}$ element of the vector x6 and the scalar c3 to obtain a result, adds the result and the $i^{th}$ element of the vector y6 to obtain a new result, and stores the new result to a storage space corresponding to the storage address of the $i^{th}$ element of the vector y6.

The length of the vector in the Vector Multiply-Add instruction format shown in Table 1-6 is variable, which can reduce the amount of instructions and simplify the use of instructions. The vector format stored at a certain interval is supported, which avoids the execution overhead of transforming the vector format and the space occupation for storing intermediate results.

In an example, the extension instruction further includes a Vector Dot Product instruction configured to calculate a dot product of two vectors.

The above Vector Dot Product instruction can be expressed as: DOT (TYPE7, N7, X7, INCX7, Y7, INCY7, C4). An opcode of the Vector Dot Product instruction is DOT, which is used to instruct a vector dot product operation. The operation fields of the above Vector Dot Product instruction include: TYPE7, N7, X7, INCX7, Y7, INCY7, and C4.

TABLE 1-7

| Operation field | Descriptions of function |
|---|---|
| TYPE7 | Type of data, supporting real and complex numbers |
| N7 | Length of a vector |
| X7 | Starting address of vector x7 |
| INCX7 | Address interval between elements of vector x7 |
| Y7 | Starting address of vector y7 |
| INCY7 | Address interval between elements of vector y7 |
| C4 | Starting address of scalar c4 |

The operation field TYPE7 is used to indicate the data type of data participating in the vector dot product operation.

After obtaining the Vector Dot Product instruction, the controller unit 615 parses the Vector Dot Product instruction to obtain the opcode and the operation field. The controller unit 615 obtains the vector x7 from the storage medium 611 according to the length of the vector, the starting address of the vector x7, and the address interval between the elements of the vector x7; obtains the vector y7 from the storage medium 611 according to the length of the vector, the starting address of the vector y7, and the address interval between the elements of the vector y7; and transfers the vector x7 and the vector y7 to the operation unit 614.

The above operation unit 614 performs the operation according to $c4=\Sigma_{i=1}^{n} x_i*y_i$, and stores the computation result to a storage space corresponding to the starting address of the scalar c4.

The $x_i$ and $y_i$ are the $i^{th}$ element of the vector x7 and the $i^{th}$ element of the vector y7 respectively.

The length of the vector in the Vector Dot Product instruction format shown in Table 1-7 is variable, which can reduce the amount of instructions and simplify the use of instructions. The vector format stored at a certain interval is supported, which avoids the execution overhead of transforming the vector format and the space occupation for storing intermediate results.

In an example, the extension instruction further includes a Vector Norm instruction configured to calculate an Euclidean norm of a vector.

The above Vector Norm instruction can be expressed as: NORM2 (TYPE8, N8, X8, INCX8, C5). An opcode of the Vector Norm instruction is NORM2, which is used to instruct a vector norm operation. The operation fields of the above Vector Norm instruction include: TYPE8, N8, X8, INCX8, and C5.

TABLE 1-8

| Operation field | Descriptions of function |
|---|---|
| TYPE8 | Type of data, supporting real and complex numbers |
| N8 | Length of a vector |
| X8 | Starting address of vector x8 |
| INCX8 | Address interval between elements of vector x8 |
| C5 | Starting address of scalar c5 |

The operation field TYPE8 is used to indicate the data type of data participating in the vector norm operation.

After obtaining the Vector Norm instruction, the controller unit 615 parses the Vector Norm instruction to obtain the opcode and the operation field. The controller unit 615 obtains the vector x8 from the storage medium 611 according to the length of the vector, the starting address of the vector x8, and the address interval between the elements of the vector x8; and transfers the vector x8 to the operation unit 614.

The above operation unit 614 calculates the elements of the vector x8 according to $$c5 = \|X\| = \sqrt[2]{\sum_{i=1}^{n} x_i^2}$$

to obtain a computation result, and stores the result to a storage space corresponding to the starting address of the $i^{th}$ element of the scalar c5.

The length of the vector in the Vector Norm instruction format shown in Table 1-8 is variable, which can reduce the amount of instructions and simplify the use of instructions. The vector format stored at a certain interval is supported, which avoids the execution overhead of transforming the vector format and the space occupation for storing intermediate results.

In an example, the extension instruction further includes a Vector Sum instruction configured to calculate a sum of all elements of a vector.

The above Vector Sum instruction can be expressed as: ASUM (TYPE9, N9, X9, INCX9, C6). An opcode of the Vector Sum instruction is ASUM, which is used to instruct a vector sum operation. The operation fields of the above Vector Sum instruction include: TYPE9, N9, X9, INCX9, and C6.

TABLE 1-9

| Operation field | Descriptions of function |
|---|---|
| TYPE9 | Type of data, supporting real numbers |
| N9 | Length of a vector |
| X9 | Starting address of vector x9 |
| INCX9 | Address interval between elements of vector x9 |
| C6 | Starting address of scalar c6 |

The operation field TYPE9 is used to indicate the data type of data participating in the vector sum operation.

After obtaining the Vector Sum instruction, the controller unit 615 parses the Vector Sum instruction to obtain the opcode and the operation field. The controller unit 615 obtains the vector x9 from the storage medium 611 according to the length of the vector, the starting address of the vector x9, and the address interval between the elements of the vector x9; and transfers the vector x9 to the operation unit 614.

The above operation unit 614 calculates the elements of the vector x9 according to $c6=\Sigma_{i=1}^{n} x_i$ to obtain a sum of all elements of the vector x9, and stores the sum to a storage space corresponding to the starting address of the $i^{th}$ element of the scalar c6.

The length of the vector in the Vector Sum instruction format shown in Table 1-9 is variable, which can reduce the amount of instructions and simplify the use of instructions. The vector format stored at a certain interval is supported, which avoids the execution overhead of transforming the vector format and the space occupation for storing intermediate results.

In an example, the extension instruction further includes a Vector Min instruction configured to compute a position of a minimum value in all elements of a vector.

The above Vector Min instruction can be expressed as: AMIN (TYPE10, N10, X10, INCX10, C7). An opcode of the Vector Min instruction is AMIN, which is used to instruct a vector min operation. The operation fields of the above Vector Min instruction include: TYPE10, N10, X10, INCX10, and C7.

TABLE 1-10

| Operation field | Descriptions of function |
|---|---|
| TYPE10 | Type of data, supporting real numbers |
| N10 | Length of a vector |
| X10 | Starting address of vector x10 |
| INCX10 | Address interval between elements of vector x10 |
| C7 | Starting address of scalar c7 |

The operation field TYPE10 is used to indicate the data type of data participating in the vector min operation.

After obtaining the Vector Min instruction, the controller unit 615 parses the Vector Min instruction to obtain the opcode and the operation field. The controller unit 615 obtains the vector x10 from the storage medium 611 according to the length of the vector, the starting address of the vector x10, and the address interval between the elements of the vector x10; and transfers the vector x10 to the operation unit 614.

The above operation unit 614 obtains a position of the minimum element of the vector x10 through a pairwise method or other methods, and stores the position to a storage space corresponding to the starting address of the $i^{th}$ element of the scalar c7.

The length of the vector in the Vector Min instruction format shown in Table 1-10 is variable, which can reduce the amount of instructions and simplify the use of instructions. The vector format stored at a certain interval is supported, which avoids the execution overhead of transforming the vector format and the space occupation for storing intermediate results.

In an example, the extension instruction further includes a Vector Max instruction configured to compute a position of a maximum value in all elements of a vector.

The above Vector Max instruction can be expressed as: AMAX (TYPE11, N11, X11, INCX11, C8). An opcode of the Vector Max instruction is AMAX, which is used to instruct a vector max operation. The operation fields of the above Vector Max instruction include: TYPE11, N11, X11, INCX11, and C8.

TABLE 1-11

| Operation field | Descriptions of function |
|---|---|
| TYPE11 | Type of data, supporting real numbers |
| N11 | Length of a vector |
| X11 | Starting address of vector x11 |
| INCX11 | Address interval between elements of vector x11 |
| C8 | Starting address of scalar c8 |

The operation field TYPE11 is used to indicate the data type of data participating in the vector max operation.

After obtaining the Vector Max instruction, the controller unit 615 parses the Vector Max instruction to obtain the opcode and the operation field. The controller unit 615 obtains the vector x11 from the storage medium 611 according to the length of the vector, the starting address of the vector x11, and the address interval between the elements of the vector x11; and transfers the vector x11 to the operation unit 614.

The above operation unit 614 obtains a position of the maximum element of the vector x11 through a pairwise method or other methods, and stores the position to a storage space corresponding to the starting address of the $i^{th}$ element of the scalar c8. The length of the vector in the Vector Max instruction format shown in Table 1-11 is variable, which can reduce the amount of instructions and simplify the use of instructions. The vector format stored at a certain interval is supported, which avoids the execution overhead of transforming the vector format and the space occupation for storing intermediate results.

In an example, the extension instruction further includes a Matrix Mult Vector instruction configured to multiply a matrix and a vector.

The above Matrix Mult Vector instruction can be expressed as: GEMV (TYPE12, LAYOUT1, M1, N12, C9, A1, LDA1, X12, INCX12, C10, Y12, INCY12). An opcode of the Matrix Mult Vector is GEMV, which is used to instruct a matrix mult vector operation. The operation fields of the above Matrix Mult Vector instruction include: TYPE12, LAYOUT1, M1, N12, C9, A1, LDA1, X12, INCX12, C10, Y12, and INCY12. The computation result can be expressed as: $\alpha*A*x+\beta*y$.

TABLE 1-12

| Operation field | Descriptions of function |
|---|---|
| TYPE12 | Type of data, supporting real and complex numbers |
| LAYOUT 1 | Storage layout of a matrix: row as a main sequence or column as a main sequence |
| TRANS1 | Information of matrix transformation: whether to transpose a matrix, conjugate a complex matrix, etc. |
| M1 | The amount of rows of matrix A1 |
| N12 | The amount of columns of matrix A1 |
| C9 | Starting address of scalar C9 |
| Al | Starting address of matrix A1 |
| LDA1 | Low-dimensional length of matrix A, in other words, starting address interval between vectors in two adjacent rows (row as a main sequence) or between vectors in two adjacent columns (column as a main sequence) |
| X12 | Starting address of vector x12 |
| INCX12 | Address interval between elements of vector x12 |
| C10 | Starting address of scalar c10 |
| Y12 | Starting address of vector y12 |
| INCY12 | Address interval between elements of vector y12 |

The operation field TYPE12 is used to indicate the data type of data participating in the matrix multi vector operation.

After obtaining the Matrix Mult Vector instruction, the controller unit 615 parses the Matrix Mult Vector instruction to obtain the opcode and the operation field. The controller unit 615 obtains the matrix A1 from the storage medium 611 according to the starting address of the matrix A, the storage layout of the matrix, and the low-dimensional length of matrix A, where the amount of elements in the matrix A1 is the product of the amount of rows and columns of the matrix A1; obtains the vector x12 from the storage medium 611 according to the starting address of the vector x12 and the address interval between the elements of the vector x12; obtains the vector y12 from the storage medium 611 according to the starting address of the vector y12 and the address interval between the elements of the vector y12; obtains the scalar c9 and the scalar c10 from the storage medium 611 according to the starting address of the scalar c9 and the starting address of the scalar c10 respectively; and transfers the transformed matrix A1 or matrix A1, vector x12, vector y12, scalar c9, and scalar c10 to the operation unit 614.

The operation unit 104 performs a vector dot product operation on the above matrix A1, vector x12, vector y12, scalar c9, and scalar c10 according to the following formula (3):

$$y12:=c9*A1*x12+c10*y12 \tag{3}$$

The operation unit 104 obtains a vector B1 according to the formula c9*A1*x12, and obtains a vector B2 according to the formula c10*y12, where a sum of the vector B1 and the vector B2 is a vector B3; the amount of elements of the vector B3 is consistent with that of elements of the vector y12. The operation unit 104 stores the $i^{th}$ element of the vector B3 in the storage space corresponding to the starting address of the $i^{th}$ element in the vector y12.

As shown in Table 1-12, the scalar c9 and the scalar c10 in the Matrix Mult Vector instruction format can scale matrices and vectors, which increases flexibility of the instruction and avoids additional overhead of scaling with the scaling instruction. The scale of vectors and matrices is variable, which can reduce the amount of instructions and simplify the use of instructions. Matrices with different storage formats (row as a main sequence or column as a main sequence) can be processed, which avoids overhead of the matrix transformation; the transformation such as transposition and conjugation of matrices can also be implemented, which avoids additional overhead of separate matrix transformation; the vector format stored at a certain interval is supported, which avoids the execution overhead of transforming the vector format and the space occupation for storing intermediate results; and the matrix format stored at a certain interval is supported, which avoids the execution overhead of transforming the matrix format and the space occupation for storing intermediate results.

In an example, the extension instruction further includes a Vector Outer Product instruction configured to calculate a tensor product (an outer product) of two vectors.

The above Vector Outer Product instruction can be expressed as: GER (TYPE13, LAYOUT2, M2, N13, C11, X13, INCX13, Y13, INCY13, A2, LDA2). An opcode of the Vector Outer Product instruction is GER, which is used to instruct a vector outer product operation. The operation fields of the above Vector Outer Product instruction include: TYPE13, LAYOUT2, M2, N13, C11, X13, INCX13, Y13, INCY13, A2, and LDA2.

TABLE 1-13

| Operation field | Descriptions of function |
|---|---|
| TYPE13 | Type of data, supporting real numbers |
| LAYOUT2 | Storage layout of a matrix: row as a main sequence or column as a main sequence |
| M2 | The amount of rows of matrix A2 |
| N13 | The amount of columns of matrix A2 |
| C11 | Starting address of scalar c11 |
| X13 | Starting address of vector x13 |
| INCX13 | Address interval between elements of vector x13 |
| Y13 | Starting address of vector y13 |
| INCY13 | Address interval between elements of vector y13 |
| A2 | Starting address of matrix A2 |
| LDA2 | Low-dimensional length of matrix A2, in other words, starting address interval between vectors in two adjacent rows (row as a main sequence) or between vectors in two adjacent columns (column as a main sequence) |

The operation field TYPE13 is used to indicate the data type of data participating in the vector outer product operation.

After obtaining the vector outer product instruction, the controller unit 615 parses the vector outer product instruction to obtain the opcode and the operation field. The controller unit 615 obtains the matrix A2 from the storage medium 611 according to the starting address of the matrix A2, the storage layout of the matrix, and the low-dimensional length of matrix A2, where the amount of elements in the matrix A2 is the product of the amount of rows and columns of the matrix A2; obtains the vector x13 from the storage medium 611 according to the starting address of the vector x13 and the address interval between the elements of the vector x13; obtains the vector y13 from the storage medium 611 according to the starting address of the vector y13 and the address interval between the elements of the vector y13; obtains the scalar c11 from the storage medium 611 according to the starting address of the scalar c11; and transfers the matrix A2, vector x13, vector y13, scalar c11 to the operation unit 614.

The operation unit 104 performs a vector dot product operation on the filtered sparse vector x13, sparse vector y13, scalar c10, and the matrix A1 according to the following formula (4):

$$A2:=c11*x13*y13^T+A2 \tag{4}$$

The operation unit 104 obtains a vector A' according to the formula $c11*x13*y13^T$, and the format of the matrix A' is the same as of that matrix A2. The operation unit 104 stores a sum of the $i^{th}$ element of the matrix A' and the $i^{th}$ element of the matrix A2 in the storage space corresponding to the starting address of the $i^{th}$ element in the matrix A2.

As shown in Table 1-13, the scalar c11 in the vector outer product instruction format can scale result matrices, which increases flexibility of the instruction and avoids additional overhead of scaling with the scaling instruction. The scale of vectors and matrices is variable, which can reduce the amount of instructions and simplify the use of instructions. Matrices with different storage formats (row as a main sequence or column as a main sequence) can be processed, which avoids overhead of the matrix transformation; and the vector format stored at a certain interval is supported, which avoids the execution overhead of transforming the vector format and the space occupation for storing intermediate results.

In an example, the extension instruction further includes a Matrix Mult Matrix instruction configured to perform a matrix mult matrix operation.

The above Matrix Mult Matrix instruction can be expressed as: GEMM (TYPE14, LAYOUT3, TRANSA, TRANSB, M3, N14, K, C12, A3, LDA3, B, LDB, C13, C, LDC). An opcode of the Matrix Mult Matrix instruction is GEMM, which is used to instruct a matrix mult matrix operation. The operation fields of the above Matrix Mult Matrix instruction include: TYPE14, LAYOUT3, TRANSA, TRANSB, M3, N14, K, C12, A3, LDA3, B, LDB, C13, C, and LDC.

TABLE 1-14

| Operation field | Descriptions of function |
|---|---|
| TYPE14 | Type of data to be operated, supporting real and complex numbers |
| LAYOUT3 | Storage layout of a matrix: row as a main sequence or column as a main sequence |
| TRANSA | Information of transformation of matrix A3: whether to transpose or conjugate the matrix. |
| TRANSB | Information of transformation of matrix B: whether to transpose or conjugate the matrix. |
| M3 | The amount of rows of matrix op (A3) and matrix C |
| N14 | The amount of columns of matrix op (A3) and matrix C |
| C12 | Start address of scalar c12 |
| A3 | Start address of matrix A3 |
| LDA3 | Low-dimensional length of matrix B, in other words, start address interval between vectors in two adjacent rows (row as a main sequence) or between vectors in two adjacent columns (column as a main sequence) |
| B | Start address of matrix B |
| LDB | Low-dimensional length of matrix B, in other words, start address interval between vectors in two adjacent rows (row as a main sequence) or between vectors in two adjacent columns (column as a main sequence) |
| C13 | Start address of scalar 13 |
| C | Start address of matrix C |
| LDC | Low-dimensional length of matrix C, in other words, start address interval between vectors in two adjacent rows (row as a main sequence) or between vectors in two adjacent columns (column as a main sequence) |

The operation field TYPE14 is used to indicate the data type of data participating in the matrix mult matrix operation.

After obtaining the matrix mult matrix instruction, the controller unit 615 parses the matrix mult matrix instruction to obtain the opcode and the operation field. The controller unit 615 obtains the matrix A3 from the storage medium 611 according to the start addresses of elements in each row of the matrix A3, the constant M3, the storage layout LAYOUT3 of the matrix, and the low-dimensional length of matrix A3; transforms the matrix A3 according to the transformation information of the matrix A3 to obtain op (A3); obtains the matrix B from the storage medium 611 according to the start address of the matrix B, the storage layout LAYOUT3 of the matrix, and the low-dimensional length of matrix B, where the amount of elements in the matrix B is the product of the constant N14 and the constant K; obtains the matrix C from the storage medium 611 according to the start address of the matrix C, the storage layout LAYOUT3 of the matrix, and the low-dimensional length of matrix C, where the amount of elements in the matrix C is the product of the constant M3 and the constant N14; transforms the matrix A3 according to the transformation information of the matrix A3 to obtain op (A3); transforms the matrix B according to the transformation information of the matrix B to obtain op (B); obtains the scalar c12 and scalar 13 from the storage medium 611 according to the start address of the scalar c12 and scalar 13, respectively; and transfers the op (A3), op (B), matrix C, scalar c12, and scalar c13 to the operation unit 614.

The operation unit 104 performs the operation on the op (A3), op (B), matrix C, scalar c12, and scalar c13 according to the following formula (5):

$$A5 := c13 * op(sA3) * op(sA4) + c14 \qquad (5)$$

The operation unit 104 performs the operation on the scalar c12, op (A3), and op (B) according to the formula c12*op(A3)*op(B) to obtain a matrix Mx. The operation unit 614 performs the operation on the matrix C and the scalar c13 according to the formula c13*C to obtain a matrix MA5; adds the matrix Mx and the matrix MA5 to obtain a matrix MA5'; and stores the $i^{th}$ element of the matrix MA5' in the storage space corresponding to the start address of the $i^{th}$ element in the matrix C.

The op (A3) and op (B) respectively represents results obtained by performing transposition, conjugation, or other operations on the matrix A3 and the matrix B.

As shown in Table 1-14, the scalars alpha and beta in the matrix mult matrix instruction format can scale matrices, which increases flexibility of the instruction and avoids additional overhead of scaling with the scaling instruction. The scale of matrices is variable, which can reduce the amount of instructions and simplify the use of instructions. The transformation such as transposition and conjugation of matrices can also be implemented, which avoids additional overhead of separate matrix transformation. Matrices with different storage formats (row as a main sequence or column as a main sequence) can be processed, which avoids overhead of the matrix transformation; and the vector format stored at a certain interval is supported, which avoids the execution overhead of transforming the vector format and the space occupation for storing intermediate results.

It should be noted that vectors or matrices in the same instruction of any one of the above tables may be of different data types, including floating-point, fixed-point, bit widths, complex numbers, and the like. The transformation in the instruction may include transposition, conjugation of complex numbers, or other operations such as matrix inversion, where the transformations can be combined with each other. For vector operations, operators can be replaced by other types of operations, such as replacing vector addition with multiplication, division, etc., or replacing intermediate value calculation with MAX calculation.

During execution of an extension computation instruction, the computation device shown in FIG. 1 computes a specific structure of the expansion instruction. In other words, execution of a combination of a plurality of computation instructions can be implemented through execution of one extension computation instruction. It should be noted that, during execution of the extension computation instruction, the computation device does not split the extension computation instruction into a plurality of computation instructions.

The present disclosure provides a data transfer device to solve problems in the prior art, including low efficiency of two-dimensional data transfer and plenty of missing data during alternate transfer of a plurality of groups of data, so as to enable 2D DMA to be more widely and efficiently used in applications such as images and videos. The above data transfer device may replace the DMA module in the computation device or the processing device to achieve beneficial effects of transferring two-dimensional data. In practical applications, ordinary data can also be transferred through the data transfer device, in other words, the data transfer device may be a device including all functions of the DMA module. It should be noted that, as long as a chip, a computation device, a processor, or an arithmetic unit in the field of neural networks includes DMA, DMA can be replaced by a data transfer device. For instance, DMA can be added in the computation device shown in FIG. 1, FIG. 4A, FIG. 2A, or FIG. 6A, or be added in a device for artificial neural network forward computation or an artificial neural network computation device for sparse connection. The type of hardware on which DMA is loaded and the form in which the DMA is loaded are not limited in the present disclosure. In practical applications, the above data transfer device may also be called DMA, during which the specific structure of the data transfer device may be as shown in FIG. 149.

In order to make the purpose, technical solutions, and advantages of the disclosure clearer, the disclosure will be further described in detail with specific examples and with reference to the accompanied drawings.

FIG. 149 is a schematic structural diagram of a data transfer device according to an example of the present disclosure. As shown in FIG. 149, the data transfer device includes a register module and a DMA control module.

The register module is configured to store parameters such as a source address of two-dimensional data, a destination address of two-dimensional data, amount of two-dimensional data transferred each time, and the like.

The above two-dimensional data may be image data or video data.

Specifically, the source address of the two-dimensional data is a storage address of the two-dimensional data in a source memory, and the destination address of the two-dimensional data is an address corresponding to the storage space to which the two-dimensional data is transferred. The amount of transferred two-dimensional data is the amount of data transferred each time by the data transfer device.

It should be noted that the source memory is a storage space of the two-dimensional data, and the destination memory is configured to store the transferred two-dimensional data. The source memory may be an internal register or an external register, the destination memory may be an internal register or an external register, and the source memory and the destination memory may be the same storage space or different storage spaces.

The above register module includes:

scalar registers, which include registers that provide required addresses during a process of two-dimensional data transfer, registers that store scales of the two-dimensional data, and registers that store parameters such as the amount of data. The scalar register may be configured to store information such as the addresses or the scales of two-dimensional data.

The addresses of two-dimensional data include addresses where the data is stored in the memory or the external storage, in other words, the source and destination addresses of the above two-dimensional data. The scales of two-dimensional data includes sizes of rows and columns of the two-dimensional data stored in the memory or the external storage; and may also include the amount of bytes, bits, and the like that are stored in the computer for the above two-dimensional data.

It should be noted that the above two-dimensional data, which may be image data or video data, is ultimately stored in the source memory in the form of image data. A smallest unit of image data stored in the source memory is one pixel of the image data in the form of RGB. The image data can be regarded as pixels of M rows and N columns.

The DMA control module is configured to receive a DMA instruction and obtain the source address, the destination address, and the amount of two-dimensional data transferred each time from the register module according to the DMA instruction or directly from the DMA instruction;

obtain the two-dimensional data from the source memory according to the source address of the two-dimensional data; and transfer the two-dimensional data to a storage space corresponding to the destination address in the destination memory according to the amount of the two-dimensional data transferred each time.

As shown in FIG. 150, the DMA control module includes:

an instruction unit configured to process an original DMA instruction to obtain a processed DMA instruction;

an addition unit configured to compute the source address and the destination address of the two-dimensional data according to the processed DMA instruction; and a reading/writing unit configured to read the two-dimensional data from the source memory according to the source address, and write the two-dimensional data into the destination memory according to the destination address of the two-dimensional data.

Further, the reading unit obtains the amount of the transferred two-dimensional data from the register module according to the processed DMA instruction, and transfers the two-dimensional data to the destination memory in a plurality of times according to the amount of the two-dimensional data transferred each time.

Both the addition unit and the reading/writing unit have a multi-pipeline stage structure, where the addition unit is at the first pipeline stage and the reading/writing unit is at the second pipeline stage. When a plurality of serial DMA instructions arrive, operations required by the series of DMA instructions can be realized more efficiently. The DMA control module is responsible for all DMA operations of the above data transfer device, including but not limited to one-dimensional read operation, one-dimensional write operation, two-dimensional read operation, and two-dimensional write operation.

Further, the instruction unit includes:

an instruction extension unit configured to extend an original DMA instruction into a system DMA instruction, where the system DMA instruction is a control instruction of the DMA control module.

When DMA is required to transfer two-dimensional data, the DMA control module receives a DMA instruction, where the DMA instruction indicates a source address of required two-dimensional data, a destination address and a size of the two-dimensional data. The source address and the destination address also need to mark the storage space to which the data belongs, including a memory and an external storage; if the data is stored in an external storage, a stream to which the data belongs also needs to be marked. The "stream" refers to the grouping during alternate transfer of the plurality of groups of data. The processor's demand for all data may be discontinuous, but may be continuous for a specific stream.

The instruction unit further includes:

an instruction caching unit configured to store the system DMA instruction. In other words, the DMA instruction is cached in the instruction caching unit during execution. After an instruction is executed, if the instruction is also an earliest one of unsubmitted instructions in the instruction caching unit, the instruction will be submitted. Once the instruction is submitted, changes in the state of the device caused by operations of the instruction cannot be withdrew.

In an example, the instruction caching unit may be a reordering cache or other caching units.

The instruction unit further includes:

an instruction processing unit configured to process the system DMA instruction in the instruction caching unit.

The instruction processing unit may include:

a fetching unit configured to obtain a system DMA instruction from the instruction caching unit;

a decoding unit configured to decode the system DMA instruction; and an instruction queue configured to sequentially store a decoded system direct memory access instruction.

In addition, the DMA control module can also be configured to obtain two-dimensional data from the original data in the processor module according to the DMA instruction and transfer the two-dimensional data to a position where the two-dimensional data in the memory module is not stored, or obtain two-dimensional data from processing data in the processor module and transfer the two-dimensional data to the memory module.

It should be noted that the processor module may be a source memory. The position where the two-dimensional data is not stored in the memory module is a destination memory, or the memory module is the destination memory.

The above data transfer device may further include a data caching unit for data transfer with the memory of the source address storage space and the DMA control module. The data caching unit, which may be a scratchpad memory, is configured to transfer data of different sizes and temporarily store data to be written in the scratchpad memory, where the data is actually written to the memory module later.

The above data transfer device may further include a data conversion unit configured to perform data conversion on data retrieved from the source memory, where the data conversion includes, but is not limited to, data precision conversion, fixed-point and floating-point mutual conversion, data arrangement conversion, and data size conversion.

In a feasible example, after obtaining the two-dimensional data and the destination address of the two-dimensional data, the reading/writing unit directly writes the two-dimensional data into the destination memory according to the destination address of the two-dimensional data.

In a feasible example, after obtaining the two-dimensional data and the destination address of the two-dimensional data, the reading/writing unit transfers the two-dimensional data and the destination address to the data conversion unit. The data conversion unit processes the two-dimensional data, and then directly writes the two-dimensional data into the destination memory according to the destination address of the two-dimensional data.

In a feasible example, after obtaining the two-dimensional data and the destination address of the two-dimensional data, the reading/writing unit transfers the two-dimensional data and the destination address to the data conversion unit. The data conversion unit processes the two-dimensional data, stores converted two-dimensional data and the destination address in the data caching unit. The data caching unit writes the two-dimensional data into the destination memory according to the destination address of the two-dimensional data.

The above data transfer device may further include an address mapping unit. The address mapping unit is configured to map a source address when the source address is a virtual address, and convert the source address to a physical address corresponding to the source address; and map a destination address when the destination address is a virtual address, and convert the destination address to a physical address corresponding to the destination address.

The DMA instruction set of the device provided by the example of the present disclosure adopts a Load/Store structure, and the reading/writing unit does not perform the operation on data in the memory. Preferably, the DMA instruction set adopts fixed-length instructions.

Another aspect of the example of the present disclosure also provides a data transfer method for the DMA control module to obtain and store two-dimensional data. FIG. 151 is a flowchart of steps according to the example of the present disclosure. As shown in FIG. 151, the steps include:

a step S301, obtaining, by the data transfer device, a source address and a destination address of two-dimensional data according to a received DMA instruction.

Specifically, the data transfer device receives a DMA instruction, and obtains the source address and the destination address of the two-dimensional data from the register module according to the DMA instruction, or obtains the source address and the destination address of the two-dimensional data from the DMA instruction.

It should be noted that the above data transfer method can be applied to other computation methods or computation devices of a neural network, and the present disclosure does not limit the specific expression form of the above method. The register module stores the source address and the destination address of the two-dimensional data storage, and the amount of the two-dimensional data transferred each time.

Optionally, the data transfer device obtains the amount of the two-dimensional data transferred from the register module according to the DMA instruction.

The steps further include:

a step S302, obtaining, by the data transfer device, the two-dimensional data according to the source address of the two-dimensional data.

Specifically, all data is pre-stored in a specific source memory, where the source memory may include various storage modules inside the chip and external storage modules. The data transfer device obtains the two-dimensional data from the source memory according to the source address of the obtained two-dimensional data.

In a feasible example, before obtaining the two-dimensional data according to the source address of the two-dimensional data, if the source address of the two-dimensional data is determined to be a virtual address, the data transfer device maps the source address to obtain a physical address of the above source address, and then obtains the two-dimensional data from the source memory according to the physical address of the source address.

The steps further include:

a step S303, transferring, by the data transfer device, the two-dimensional data to the destination memory according to the destination address of the two-dimensional data.

Specifically, after obtaining the destination address of the two-dimensional data from the register module or from the fields of the DMA instruction, the data transfer device transfers the two-dimensional data to the destination memory according to the destination address of the two-dimensional data, where the destination memory may include various storage modules inside the chip and external storage modules.

The source memory and the destination memory are not the same register.

In a feasible example, the data transfer device transfers the two-dimensional data to the storage space corresponding to the destination address in the destination memory in a plurality of times according to the amount of the two-dimensional data transferred each time.

In a feasible example, before transferring the two-dimensional data to the destination memory according to the destination address of the two-dimensional data, if the destination address of the two-dimensional data is determined to be a virtual address, the data transfer device maps the destination address to obtain a physical address of the above destination address, and then obtains the two-dimensional data from the destination memory according to the physical address of the destination address.

In a feasible example, the data transfer device transfers the two-dimensional data to the storage space corresponding to the physical address corresponding to the destination address in the destination memory in a plurality of times according to the amount of the two-dimensional data transferred each time.

FIG. 152 is a schematic diagram of a format of an instruction set according to an example of the present disclosure. As shown in FIG. 152, each instruction includes an opcode and five operation fields, where the operation code is used to indicate the function of the instruction. The DMA control module can perform corresponding operations by identifying the opcode, and the operation field is used to indicate the data address information of the instruction. The instruction set includes DMA instructions with different functions:

DTT instruction: According to this instruction, the reading/writing unit reads a word from the source address, and writes the word to the destination address and the data caching unit. The data transfer instruction includes five operation fields, including a first operation field, a second operation field, a third operation field, a fourth operation field, and a fifth operation field. The first operation field is used to indicate the storage space to which the source address of the two-dimensional data belongs, the second operation field is used to indicate the source address of the two-dimensional data, and the third operation field is used to indicate the storage space to which the destination address of the two-dimensional data belongs, the fourth operation field is used to indicate the destination address of the two-dimensional data, and the fifth operation field is used to indicate the amount of the two-dimensional data transferred each time. Each instruction completes the transfer of one word of data.

ADJ instruction: According to the instruction, the above addition unit adds the values in any two registers (including an address register and a jump value register) in the above register module, and then writes the result back to the above address register, so as to complete a line feed operation in the 2D DMA task.

The address register is used to store the source address, and the jump value register is used to store the jump value of the source address.

The above ADJ instruction includes two operation fields, including a sixth operation field and a seventh operation field. The sixth operation field is used to indicate a serial number of the address register, and the seventh operation field is used to indicate a serial number of the jump value register. The above ADJ instruction adds the value in the address register and the value in the jump value register, and writes the result back to the above address register.

FIG. 153 schematically shows a pipeline time-space diagram of the DMA control module executing a 2D DMA command according to an example of the present disclosure. As shown in FIG. 151, if the 2D DMA command needs to transfer a piece of data with a size of 3×3, the whole process needs a total of 9 beats. In other words, if the size of the data block transferred by the 2D DMA command is m×n, where m and n are positive integers, the data transfer process of the example of the present disclosure requires a total of m×n beats.

It should be noted that the above one beat is one clock cycle of the data transfer device.

In some examples, a board card is provided, and it includes the above chip package structure. FIG. 154 provides a board card, where the board card may include the chip 389 and other supporting components. The supporting components include, but are not limited to, a storage device 390, an interface device 391, and a control device 392.

The storage device 390 is connected to the chip in the chip package structure through a bus, and is configured to store data. The storage device may include a plurality of groups of storage units 393. Each group of the storage units and the chip are connected through a bus. It can be understood that each group of the storage units may be DDR SDRAM (Double Data Rate Synchronous Dynamic Random Access Memory).

DDR can double the speed of SDRAM without increasing the clock frequency. DDR allows data to be read on the rising and falling edges of the clock pulse. The speed of DDR is twice the speed of standard SDRAM. In an example, the memory device may include 4 groups of storage units. Each group of storage units may include a plurality of DDR4 particles (chips). In an example, four 72-bit DDR4 controllers may be arranged inside the chip, where 64 bits of each 72-bit DDR4 controller are for data transfer and 8 bits are for ECC parity. It can be understood that when each group of the storage units adopts DDR4-3200 particles, the theoretical bandwidth of data transfer may reach 25600 MB/s.

In one example, each group of the storage units may include a plurality of DDR SDRAMs (Double Data Rate Synchronous Dynamic Random Access Memory) arranged in parallel. DDR can transfer data for two times per clock cycle. A DDR controller may be arranged inside the chip. The DDR controller is configured to control the data transfer and the data storage of each storage unit.

The interface means may be electrically connected to the chip inside the chip package structure. The interface means is configured to realize data transfer between the chip and an external device (such as a server or a computer). In one example, the interface means may be a standard PCIE interface. For instance, data to be processed may be transferred by a server through the standard PCIE interface to the chip, thereby realizing data transfer. Alternatively, when a PCIE 3.0 X 16 interface is adopted for transferring, the theoretical bandwidth may reach 16000 MB/s. In another example, the interface means may also be another interface. The present disclosure does not restrict a specific form of the another interface as long as the interface unit can realize the transferring function. In addition, a computation result of the chip may still be transferred by the interface means to an external device (such as a server).

The control component is electrically connected to the chip. The control component is configured to monitor a state of the chip. Specifically, the chip and the control component can be electrically connected through a SPI interface. The control component may include MCU (Micro Controller Unit). If the chip includes a plurality of processing chips, a plurality of processing cores, or a plurality of processing circuits, the chip is capable of driving a plurality of loads. In this case, the chip can be in different working state such as multi-load state and light-load state. The working state of the plurality of processing chips, the plurality of processing cores, or a plurality of processing circuits can be regulated and controlled by the control device.

In some examples, the disclosure further provides an electronic device including the above board card.

The electronic device includes a data processing device, a robot, a computer, a printer, a scanner, a tablet computer, an intelligent terminal, a mobile phone, a drive recorder, a navigator, a sensor, a webcam, a cloud server, a camera, a video camera, a projector, a watch, an earphone, a mobile storage, a wearable device, a transportation means, a household electrical appliance, and/or a medical device.

The transportation means includes an airplane, a ship, and/or a vehicle. The household electrical appliance includes a television, an air conditioner, a microwave oven, a refrigerator, an electric rice cooker, a humidifier, a washing machine, an electric lamp, a gas cooker, and a range hood. The medical device includes a nuclear magnetic resonance spectrometer, a B-ultrasonic scanner, and/or an electrocardiograph.

It should be noted that any method disclosed in this disclosure can be applied to another method disclosed in this disclosure. Any device, equipment, unit, or module disclosed in this disclosure can also be set in another device, equipment, unit, or module disclosed in the present disclosure. Any method disclosed in the present disclosure may also be implemented by any device, equipment, unit, or module of the present disclosure.

Another example of the present disclosure provides a computer-readable storage medium on which a computer program is stored. When executed by a processor, the computer program implements the method steps described in the method examples described above.

The computer-readable storage medium may be an internal storage unit of the terminal device described in any of the foregoing examples, such as a hard disk or a memory of the terminal device. The computer-readable storage medium may also be an external storage device of the terminal device, such as a plug-in hard disk, a Smart Media Card (SMC), a Secure Digital (SD) Card, a Flash Card, and the like equipped on the terminal device. Further, the computer-readable storage medium may also include both an internal storage unit of the terminal device and an external storage device. The computer-readable storage medium is configured to store the computer program and other programs and data required by the terminal device, and may also be configured to temporarily store data that has been or will be output.

Those of ordinary skill in the art may realize that the units and algorithm steps in the instances described with the examples disclosed herein can be implemented by electronic hardware, computer software, or a combination of the two. In order to clearly explain the interchangeability of hardware and software, the composition and steps of each instance are described generally in terms of functions in the above description. Whether these functions are executed in the form of hardware or software depends on specific applications and design constraints of technical solutions. Those skilled in the art can implement the described functions for each specific application by using different methods, but such implementation should not be considered beyond the scope of this disclosure.

Those skilled in the art can clearly understand that for the sake of simple description, specific working processes of the terminal device and the units described above can be referred to the corresponding processes in the foregoing method examples, and will not be further described herein.

In the examples of the present disclosure, it should be understood that the terminal devices and methods disclosed may be implemented in other manners. For instance, the described device examples are merely illustrative; for instance, division of the unit is only a logical function division and can be divided in other manners during actual implementations, for instance, a plurality of units or components may be combined or integrated into another system, or some features may be ignored, or not performed. In addition, coupling or direct coupling or communication connection among the illustrated or discussed components may be indirect coupling or communication connection through some interfaces, devices or units, and may be electrical connection or other forms of connection.

The units described as separate components may or may not be physically separated and the components illustrated as units may or may not be physical units, in other words, the units or the components may be in the same place or may be distributed to a plurality of network units. All or part of the units may be selected according to actual needs to achieve the purpose of the technical solutions of the examples.

In addition, functional units in various examples of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various examples of the present disclosure. The storage medium includes various medium capable of storing program codes, such as a Read-Only Memory (ROM), a Random Access Memory (RAM), a Programmable Read-only Memory (PROM), an Erasable Programmable Read Only Memory (EPROM), a One-time Programmable Read-Only Memory (OTPROM), an Electrically-Erasable Programmable Read-Only Memory (EEPROM), a Compact Disc Read-Only Memory (CD-ROM), a USB (universal serial bus) flash drive, a mobile HDD (hard disk drive), a disk, a compact disc (CD), or the like. It should be understood that storing software products in the read-only memory (ROM) can reduce the power consumption of the device and accelerate processing; in addition, user programming is not required, which reduces users' threshold, which is suitable for ordinary users (ordinary consumers, in other words, 2C).

The above descriptions are merely specific examples of the present disclosure, and a protection scope of the present disclosure is not limited hereto. Within the skill scope of the present disclosure, those skilled in the art may make any equivalent modifications or replacements within the protection scope of the disclosure. Therefore, the protection scope shall be subject to the protection scope defined by the claims.

What is claimed is:

1. An information processing method, wherein the method is applied to a terminal device that includes a computation device, and the computation device stores an instruction set which includes at least one operation instruction stream, wherein the instruction set includes a matrix-multiply-vector instruction, a vector-multiply-matrix instruction, a matrix-multiply-scalar instruction, a tensor operation instruction, a matrix addition instruction, a matrix subtraction instruction, a matrix retrieving instruction, a matrix loading instruction, a matrix saving instruction, and a matrix moving instruction, and the method includes:

obtaining first information, wherein the first information is to be processed by the terminal device;

calling the operation instruction stream in the computation device to process the first information to obtain second information, wherein the calling of the operation instruction stream includes;

obtaining a basic operation sequence of a neural network structure, obtaining a first instruction descriptor stream based on the basic operation sequence, simplifying the first instruction descriptor stream to obtain a second instruction descriptor stream, and calling the operation instruction stream based on the second instruction descriptor stream; and outputting the second information, wherein the obtaining the first information includes:

pre-processing raw information to obtain the first information, wherein the first information is in a preset format, and the pre-processing includes data deduplication, data encoding, data conversion, and normalization.

2. The method of claim 1, wherein when the first information is voice information, the calling of the operation instruction stream in the computation device to process the first information to obtain the second information includes:

calling a voice recognition algorithm in the computation device to recognize the voice information to obtain the second information, wherein the second information is text information, and the voice recognition algorithm includes at least one operation instruction for voice recognition.

3. The method of claim 1, wherein when the first information is image information, the calling of the operation instruction stream in the computation device to process the first information to obtain the second information includes:

calling an image style conversion algorithm in the computation device to convert the style of the image information to obtain the second information, wherein the style of the second information differs from that of the first information, and the image style conversion algorithm includes at least one operation instruction for converting a painting style or the image style.

4. The method of claim 1, wherein when the first information is image information that includes at least one object to be recognized, the calling of the operation instruction stream in the computation device to process the first information to obtain the second information includes:

calling an object detection algorithm in the computation device to perform object detection on the image information to obtain the second information, wherein the second information includes at least a location of an object, and the object detection algorithm includes at least one operation instruction for object detection.

5. The method of claim 1, wherein when the first information is voice information to be translated, the calling of the operation instruction stream in the computation device to process the first information to obtain the second information includes:

calling a language translation algorithm in the computation device to translate the voice information to obtain the second information, wherein the first information differs from the second information, and the language translation algorithm includes at least one operation instruction for language translation.

6. The method of claim 1, wherein the simplifying of the first instruction descriptor stream to obtain the second instruction descriptor stream includes:

traversing instruction descriptors in the first instruction descriptor stream to obtain a plurality of instruction descriptors;

searching for a redundant operation in the plurality of instruction descriptors; and deleting an instruction descriptor corresponding to the redundant operation to obtain the second instruction descriptor stream.

* * * * *